US009562614B2

(12) United States Patent
Hu et al.

(10) Patent No.: US 9,562,614 B2
(45) Date of Patent: Feb. 7, 2017

(54) FLOW CONTROL APPARATUS

(71) Applicants: Xiaozong Hu, Yuyao (CN); Jizong Hu, Yuyao (CN); Zehong Tu, Yuyao (CN)

(72) Inventors: Xiaozong Hu, Yuyao (CN); Jizong Hu, Yuyao (CN); Zehong Tu, Yuyao (CN)

( * ) Notice: Subject to any disclaimer, the term of this patent is extended or adjusted under 35 U.S.C. 154(b) by 50 days.

(21) Appl. No.: 14/388,814

(22) PCT Filed: Mar. 28, 2013

(86) PCT No.: PCT/CN2013/073396

§ 371 (c)(1),
(2) Date: Sep. 28, 2014

(87) PCT Pub. No.: WO2013/143484

PCT Pub. Date: Oct. 3, 2013

(65) Prior Publication Data

US 2015/0211645 A1 Jul. 30, 2015

(30) Foreign Application Priority Data

Mar. 28, 2012 (CN) .......................... 2012 1 0086397
Mar. 29, 2012 (CN) .......................... 2012 1 0087497
(Continued)

(51) Int. Cl.
*F16K 11/072* (2006.01)
*F16K 11/074* (2006.01)
(Continued)

(52) U.S. Cl.
CPC ............... *F16K 11/072* (2013.01); *F16K 3/30* (2013.01); *F16K 11/074* (2013.01); *F16K 11/18* (2013.01); *Y10T 137/86694* (2015.04)

(58) Field of Classification Search
CPC ........ F16K 3/30; F16K 11/072; F16K 11/074; F16K 11/18; Y10T 137/86694
(Continued)

(56) References Cited

U.S. PATENT DOCUMENTS 2,825,359 A * 3/1958 Williams ............... B01D 23/10 137/489
5,814,130 A * 9/1998 Lemcoff ............. B01D 53/047 95/130
(Continued)

*Primary Examiner* — Michael R Reid
*Assistant Examiner* — Christopher Ballman
(74) *Attorney, Agent, or Firm* — Raymond Y. Chan; David and Raymond Patent Firm

(57) ABSTRACT

The flow control apparatus has first to eleventh channels, wherein the first to fifth channels are respectively provided in a first flow controlling body of a first flow controlling element. The ninth to eleventh channels are respectively provided in a second flow controlling body of a second flow controlling element. The first to fifth channels are extended downwardly from a first flow controlling side of the first flow controlling element. The ninth channel is extended upwardly from a second controlling side of a bottom end of the second flow controlling body and extended from the second middle portion of the bottom end of the second flow controlling body to the second edge portion and defines a ninth opening communicated with an outer space thereof. The tenth and eleventh channels are extended upwardly from the second flow controlling side of the bottom end of the second flow controlling body.

33 Claims, 99 Drawing Sheets

(30) Foreign Application Priority Data

Sep. 17, 2012 (CN) .......................... 2012 1 0344035
Mar. 28, 2013 (CN) .......................... 2012 1 0086515

(51) Int. Cl.
*F16K 3/30* (2006.01)
*F16K 11/18* (2006.01)

(58) Field of Classification Search
USPC .......................... 137/625.42, 625.46, 625.67
See application file for complete search history.

(56) References Cited

U.S. PATENT DOCUMENTS 7,654,096 B2 * 2/2010 Xu ........................ F16K 11/074
137/625.46
2008/0295525 A1 * 12/2008 Xu ........................ F16K 31/041
62/6

* cited by examiner

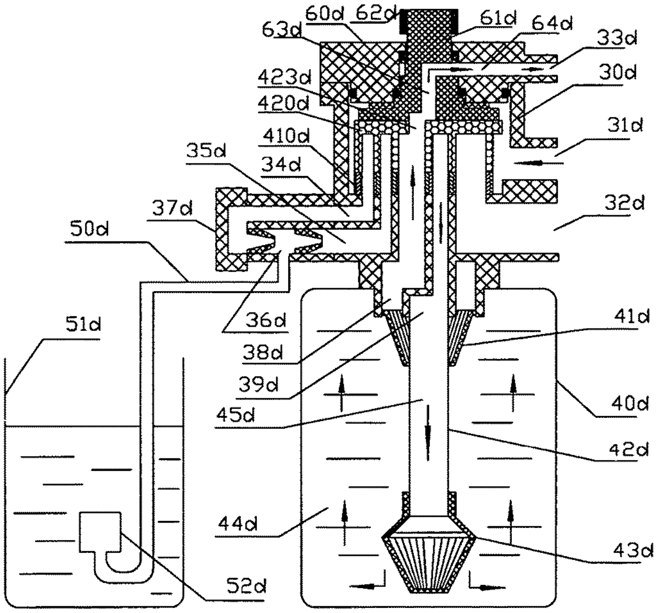
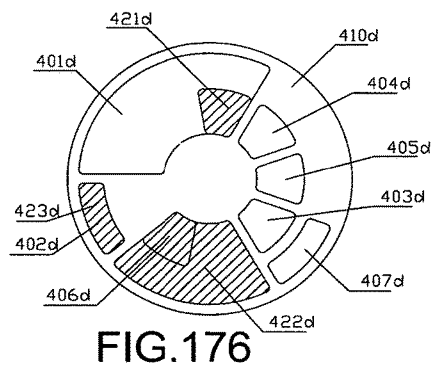
FIG.176
FIG.175
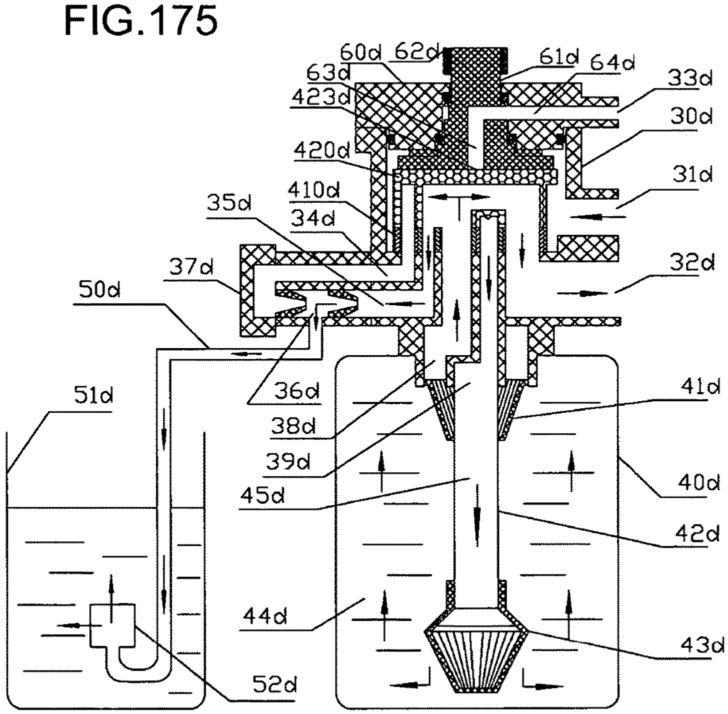
FIG.177

FLOW CONTROL APPARATUS

CROSS REFERENCE OF RELATED APPLICATION

This is a non-provisional application that claims the benefit of priority under 35 U.S.C. §119 to a non-provisional application, application number PCT/CN2013/073396, filed Mar. 28, 2013.

BACKGROUND OF THE PRESENT INVENTION

Field of Invention

The present invention relates to a water treatment system technical field, and more particularly to a multifunction flow control apparatus.

Description of Related Arts

When a system for controlling and/or treating flow, such as a water treating system, is processing flow, it always needs to control the direction of flow so as to achieve the purpose of the flow treatment. In a practical application, people generally use a single-function valve and/or a multifunction valve for controlling the fluid flow to flow in a whole industrial system.

A single-function valve can only achieve the single-direction control of flow in general. With the development of industrial technologies, the modernized flow treatment equipment is becoming more and more sophisticated and complicated, and when people use single-function valves for the whole flow treatment system, the huge number of valves will increase difficulties in the automatical control of the whole system and bring a lot of inconveniences to the industrial control of the treatment system.

CN Pat. No. CN200420078956.5 describes or discloses a multifunction valve, which is able to control a fluid to flow in multiple directions or control multiple fluids to flow in multiple directions. The patent teaches a multifunction single valve for a water treatment system, wherein the valve comprises a valve body, a valve core and an injector, wherein the valve body has multiple ports provided therein for allowing water to flow in and out, the valve core is used for controlling the flow directions of water and the injector to make brine flow from the brine container of the water treatment system to the softening container of the water treatment system and elute the softening materials of the water treatment system, such as resin, and allow the water flow from the inlet port of the valve to flow into the brine container so as to add water into the brine container.

But the patent has disadvantages. Firstly, when supplementing water for the water treatment system by controlling the water flow to flow through the valve core of the valve, the blind recess of the valve core of the valve is communicated with the injector such that when the supplementing water flows to the brine container, the water flows into the blind recess via the injector and flows out from the effluent outlet so as to make the water supplementing efficiency be decreased and even result in a water supplementing failure. Secondly, the flow channels of the valve are unreasonably aligned and the effluent channel is provided in the center thereof and extended from top to bottom such that the lower space of the valve room of the valve is taken up and the diameter of the water channels provided in the lower space is decreased, which impacts the flow of water in the water channels of the lower space of the valve room and enlarges the size of the valve. Thirdly, the valve has not a stopping position. In other words, the valve has no function for stopping the water flows flowing through the different channels of the valve, which inconvenienced users. Lastly, the different water channels of the valve have different diameters, but the volume rate of water flow is determined by the water channel having the smallest diameter, which decrease the stability of the water flowing through the water channels of the valve and restrict the volume of water flowing through the water channels of the valve per unit time.

In the practical application of water treatment, a multifunction valve is widely used, especially in the water softening filed, for achieving five functions: softening, back flushing, brine intaking and upflow regenerating or brine intaking and downflow regenerating, raw water supplementing or softened water supplementing, forward flushing and so on. Because a planer sealing multiport valve has a simple structure and a high reliability, so it becomes an important kind of valves in a multifunction control valve filed in recent years. Firstly, because of the structure limit in the planar valve, the planar valve having brine intaking and upflow regenerating, softened water supplementing function, and brine intaking and downflow regenerating and softened water supplementing function; secondly, the number of equal division is bigger, the diameters of the inner channels of the valve are smaller, and the flow of water is badly blocked, which impact the supply of water of the planar valve; thirdly, current softened water supplementing valve having two discs cannot achieve five functions of softening, back flushing, downflow brine intaking or upflow brine intaking regenerating, forward flushing and softened water supplementing in a proper order after experiencing a complete cycle, and if the five functions are achieved in an improper order, which results in that a user has to rotate the softening valve disc in a reciprocating manner for multiple times to achieve a regenerating cycle and impacts the service life of the softening valve.

SUMMARY OF THE PRESENT INVENTION

The invention is advantageous in that it provides a flow control apparatus, which is adapted for controlling fluid to flow in multiple directions, wherein the flow control apparatus is adapted to control flows to flow in different directions without interfering with each other.

Another advantage of the invention is to provide a flow control apparatus adapted for controlling fluid to flow in multiple directions, wherein the flow control apparatus comprises a first flow controlling element and a second flow controlling element, wherein each of the first flow controlling element and the second flow controlling element has multiple flow channels, and when the second flow controlling element rotates relative to the first flow controlling element, the flow channels of the first flow controlling element are selectively communicated with the flow channels of the second flow controlling element to control the water to flow in the first flow controlling element and the second flow controlling element in multiple directions.

Another advantage of the invention is to provide a flow control apparatus adapted for controlling fluid to flow in multiple directions, wherein the flow control apparatus of the present invention can help the water treatment apparatus to be switched among the often-used states, such as a stop working state, a regenerate working state and make the switching actions be successive in action so as to enable a user to accomplish the switching of the often-used working states of the water treatment apparatus employing the flow control apparatus of the present invention to minimize the rotary path of the second flow controlling element relative to the first flow controlling element so as to decrease the friction between the first flow controlling element and the second flow controlling element and prolong the life-span of the water treatment apparatus employing the flow control apparatus of the present invention.

Another advantage of the invention is to provide a flow control apparatus adapted for controlling fluid to flow in multiple directions, wherein the flow control apparatus is adapted to be used for water processing equipment, such as a water treatment apparatus, wherein a user may enable the water treatment apparatus to utilize selectably raw water or treated water to supplement water to the brine container thereof. Another advantage of the invention is to provide a flow control apparatus adapted for controlling fluid to flow in multiple directions, wherein the flow control apparatus is adapted to be used for water processing equipment, such as a water treatment apparatus, wherein the water treatment apparatus employing the flow control apparatus of the present invention can provide treated water for a user while supplementing treated water to the brine container.

Another advantage of the invention is to provide a flow control apparatus adapted for controlling fluid to flow in multiple directions, wherein the flow control apparatus do not need sophisticated components and complex structure, and it is easy to manufacture and short in manufacturing cost.

Additional advantages and features of the invention will become apparent from the description which follows, and may be realized by means of the instrumentalities and combinations particular point out in the appended claims.

According to the present invention, the foregoing and other objects and advantages are attained by a flow control apparatus of the present invention, which comprising:

a first flow controlling element, wherein the first flow controlling element comprises a first flow controlling body, wherein the first flow controlling body comprises a top end, wherein the top end defines a first flow controlling side; and a second flow controlling element provided rotatably on the first flow controlling element, wherein the second flow controlling element comprises a second flow controlling body, wherein the second flow controlling body has a bottom end and an upper end extended from the bottom end, wherein the bottom end defines a second flow controlling side, wherein the first flow controlling side of the first flow controlling element is adapted for contacting physically with the second flow controlling side of the second flow controlling element, wherein the top end of the first flow controlling body of the first flow controlling element comprises a first center portion, a first edge portion and a first middle portion extended between the first center portion and the first edge portion, and the bottom end of the second flow controlling body of the second flow controlling element comprises a second center portion, a second edge portion and a second middle portion extended between the second center portion and the second edge portion, wherein the flow control apparatus has a first channel, a second channel, a third channel, a fourth channel, a fifth channel, a ninth channel, a tenth channel and an eleventh channel, wherein the first channel, the second channel, the third channel, the fourth channel and the fifth channel are respectively provided in the first flow controlling body of the first flow controlling element; the ninth channel, the tenth channel and the eleventh channel are respectively provided in the second flow controlling body of the second flow controlling element, wherein the first channel is extended downwardly from the first flow controlling side; the second channel is extended downwardly from the first flow controlling side; the third channel is extended downwardly from the first flow controlling side; the fourth channel is extended downwardly from the first flow controlling side; the fifth channel is extended downwardly from the first flow controlling side, wherein the ninth channel is extended upwardly from the second flow controlling side of the bottom end of the second flow controlling body and extended from the second middle portion of the bottom end of the second flow controlling body to the second edge portion and forms a ninth opening communicated with an outer space thereof; the tenth channel is extended upwardly from the second flow controlling side of the bottom end of the second flow controlling body to the upper end and extended from the second center portion of the bottom end of the second flow controlling body to the second edge portion; the eleventh channel is extended upwardly from the second flow controlling side of the bottom end of the second flow controlling body and penetrates through the second flow controlling body of the second flow controlling element.

(1) The Technical Problems to be Solved

The technical problems to be solved by the present invention is to provide a multifunction softening valve for overcoming the disadvantages of current upflow softening valves, which include the small rate of flow resulted from the excessive equal divisions of current upflow softening valves, the short life-span caused by the unsatisfying arrangement order of the five working states of the softening valve supplemented with softened water and the drainage via an uneconomic position.

(2) The Technical Solutions

In order to achieve the above objects, the present invention provides a multifunction softening valve, comprising a valve body (30*a*), a cover (60*a*), an injector (37*a*), a fixed valve disc (10*a*) and a moving valve disc (20*a*), wherein the fixed valve disc (10*a*) and the moving valve disc (20*a*) are respectively provided in the valve body (30*a*), wherein the head faces of the fixed valve disc (10*a*) and the moving valve disc (20*a*) are hermetically and rotationally aligned with each other, a driving device for controlling the moving valve disc (20*a*) to rotate, the softening valve has a water inlet port (31*a*), a water outlet port (32*a*), an effluent outlet (33*a*), a first filter port (38*a*), a second filter port (39*a*) and a brine drawing port (36*a*) provided therein, wherein the softening valve further has an injector outlet (34*a*) and an injector inlet (35*a*) provided therein, wherein the injector outlet (34*a*) and the injector inlet (35*a*) are communicated with the injector (37*a*) therein, wherein the fixed valve disc (10*a*) has six through holes: a first through hole (1*a*), a second through hole (2*a*), a third through hole (3*a*), a fourth through hole (4*a*), a fifth through hole (5*a*) and a sixth through hole (6*a*) provided therein, and within the softening valve, the first through hole (1*a*) is adapted for being communicated with the first filter port (38*a*); the second through hole (2*a*) and the fifth through hole (5*a*) are communicated with each other and each of the second through hole (2*a*) and the fifth through hole (5*a*) is adapted for being communicated with the second filter port (39*a*); the third through hole (3*a*) is communicated with the injector inlet (35*a*); the fourth through hole (4*a*) is communicated with the injector outlet (34*a*); the sixth through hole (6*a*) is communicated with the water outlet port (32*a*), wherein the first through hole (1*a*) is neighboring to the second through hole (2*a*); the second through hole (2*a*) is neighboring to the third through hole (3*a*); the third through hole (3*a*) is neighboring to the fourth through hole (4*a*); the fourth through hole (4*a*) is neighboring to the fifth through hole (5*a*); the fifth through hole (5*a*) is neighboring to the sixth through hole (6*a*); the sixth through hole (6*a*) is neighboring to the first through hole (1*a*), wherein the moving valve disc (20*a*) has a water inlet channel (21*a*) communicated with the water inlet port (31*a*), wherein the moving valve disc (20*a*) further has a communicating blind recess (22*a*) and a draining channel provided therein, wherein the draining channel (22*a*) is communicated with the effluent outlet (33*a*).

Further, the fitting relations include: the water inlet channel (21*a*) is communicated with the first through hole (1*a*); the communicating blind recess (22*a*) is communicated with the fifth through hole (5*a*) and the sixth through hole (6*a*); the draining channel is communicated with the third through hole (3*a*), or the water inlet channel (21*a*) is communicated with the fifth through hole (5*a*); the communicating blind recess (22*a*) is communicated with the third through hole (3*a*) and the fourth through hole (4*a*); the draining channel is communicated with the first through hole (1*a*), or the water inlet channel (21*a*) is communicated with the fourth through hole (4*a*); the communicating blind recess (22*a*) is communicated with the second through hole (2*a*) and the third through hole (3*a*); the draining channel is communicated with the first through hole (1*a*), or the water inlet channel (21*a*) is communicated with the third through hole (3*a*); the communicating blind recess (22*a*) is communicated with the first through hole (1*a*) and the second through hole (2*a*); the draining channel is communicated with the first through hole (1*a*), or the water inlet channel (21*a*) is communicated with the first through hole (1*a*); the communicating blind recess (22*a*) is communicated with the first through hole (1*a*); the draining channel is communicated with the fifth through hole (5*a*).

Further, the draining channel is a draining through hole (23*a*), the driving device is a valve rod (61*a*), the effluent outlet (33*a*) is provided in the valve body (30*a*), the draining through hole (23*a*) is communicated with the effluent outlet (33*a*) by the first pollution hole (63*a*) provided in the valve rod (61*a*) and the second pollution hole (64*a*) provided in the cover (60*a*).

Alternatively, the draining channel is a draining blind recess (231*a*), wherein the fixed valve disc (10*a*) further has a seventh through hole (7*a*) provided therein, wherein the effluent outlet (33*a*) is provided in the valve body (30*a*), wherein the draining blind recess (231*a*) is communicated with the effluent outlet (33*a*) via the seventh through hole (7*a*).

The present invention further provides a multifunction softening valve, comprising a valve body (30*a*), a cover (60*a*), an injector, a fixed valve disc (10*a*) and a moving valve disc (20*a*), wherein the fixed valve disc (10*a*) and the moving valve disc (20*a*) are respectively provided in the valve body (30*a*), wherein the head faces of the fixed valve disc (10*a*) and the moving valve disc (20*a*) are hermetically and rotationally aligned with each other, a driving device for controlling the moving valve disc (20*a*) to rotate, the softening valve has a water inlet port (31*a*), a water outlet port (32*a*), an effluent outlet (33*a*), a first filter port (38*a*), a second filter port (39*a*) and a brine drawing port (36*a*) provided therein, wherein the softening valve further has an injector outlet (34*a*) and an injector inlet (35*a*) provided therein, wherein the injector outlet (34*a*) and the injector inlet (35*a*) are communicated with the injector (37*a*) therein, wherein the fixed valve disc (10*a*) has six through holes: a first through hole (1*a*), a second through hole (2*a*), a third through hole (3*a*), a fourth through hole (4*a*), a fifth through hole (5*a*) and a sixth through hole (6*a*) provided therein, and within the softening valve, the first through hole (1*a*) is adapted for being communicated with the first filter port (38*a*); the second through hole (2*a*) and the fifth through hole (5*a*) are communicated with each other and each of the second through hole (2*a*) and the fifth through hole (5*a*) is adapted for being communicated with the second filter port (39*a*); the third through hole (3*a*) is communicated with the injector inlet (35*a*); the fourth through hole (4*a*) is communicated with the injector outlet (34*a*); the sixth through hole (6*a*) is communicated with the water outlet port (32*a*), wherein the first through hole (1*a*) is neighboring to the second through hole (2*a*); the second through hole (2*a*) is neighboring to the third through hole (3*a*); the third through hole (3*a*) is neighboring to the fifth through hole (5*a*); the fifth through hole (5*a*) is neighboring to the sixth through hole (6*a*); the sixth through hole (6*a*) is neighboring to the fourth through hole (4*a*); the fourth through hole (4*a*) is neighboring to the first through hole (1*a*), wherein the moving valve disc (20*a*) has a water inlet channel (21*a*) communicated with the water inlet port (31*a*), wherein the moving valve disc (20*a*) further has a communicating blind recess (22*a*) and a draining channel provided therein, wherein the draining channel (22*a*) is communicated with the effluent outlet (33*a*).

Further, the fitting relations include: the water inlet channel (21*a*) is communicated with the first through hole (1*a*); the communicating blind recess (22*a*) is communicated with the fifth through hole (5*a*) and the sixth through hole (6*a*); the draining channel is communicated with the third through hole (3*a*), or the water inlet channel (21*a*) is communicated with the fifth through hole (5*a*); the communicating blind recess (22*a*) is communicated with the first through hole (1*a*); the draining channel is communicated with the first through hole (1*a*), or the water inlet channel (21*a*) is communicated with the fourth through hole (4*a*); the communicating blind recess (22*a*) is communicated with the second through hole (2*a*) and the third through hole (3*a*); the draining channel is communicated with the first through hole (1*a*), or the water inlet channel (21*a*) is communicated with the first through hole (1*a*); the communicating blind recess (22*a*) is communicated with the third through hole (3*a*); the draining channel is communicated with the second through hole (2*a*), or the water inlet channel (21*a*) is communicated with the first through hole (1*a*); the communicating blind recess (22*a*) is communicated with the third through hole (3*a*) and the fifth through hole (5*a*).

Further, the draining channel is a draining through hole (23*a*), the driving device is a valve rod (61*a*), the effluent outlet (33*a*) is provided in the valve body (30*a*), the draining through hole (23*a*) is communicated with the effluent outlet (33*a*) by the first pollution hole (63*a*) provided in the valve rod (61*a*) and the second pollution hole (64*a*) provided in the cover (60*a*).

Alternatively, the draining channel is a draining blind recess (231*a*), wherein the fixed valve disc (10*a*) further has a seventh through hole (7*a*) provided therein, wherein the effluent outlet (33*a*) is provided in the valve body (30*a*), wherein the draining blind recess (231*a*) is communicated with the effluent outlet (33*a*) via the seventh through hole (7*a*).

The present invention further provides a multifunction softening valve, comprising a valve body (30*a*), a cover (60*a*), an injector (37*a*), a fixed valve disc (10*a*) and a moving valve disc (20a), wherein the fixed valve disc (10a) and the moving valve disc (20a) are respectively provided in the valve body (30a), wherein the head faces of the fixed valve disc (10a) and the moving valve disc (20a) are hermetically and rotationally aligned with each other, a driving device for controlling the moving valve disc (20a) to rotate, the softening valve has a water inlet port (31a), a water outlet port (32a), an effluent outlet (33a), a first filter port (38a), a second filter port (39a) and a brine drawing port (36a) provided therein, wherein the softening valve further has an injector outlet (34a) and an injector inlet (35a) provided therein, wherein the injector outlet (34a) and the injector inlet (35a) are communicated with the injector (37a) therein, wherein the fixed valve disc (10a) has six through holes: a first through hole (1a), a second through hole (2a), a third through hole (3a), a fourth through hole (4a), a fifth through hole (5a) and a sixth through hole (6a) provided therein, and within the softening valve, the first through hole (1a) is adapted for being communicated with the first filter port (38a); the second through hole (2a) and the fifth through hole (5a) are communicated with each other and each of the second through hole (2a) and the fifth through hole (5a) is adapted for being communicated with the second filter port (39a); the third through hole (3a) is communicated with the injector inlet (35a); the fourth through hole (4a) is communicated with the injector outlet (34a); the sixth through hole (6a) is communicated with the water outlet port (32a), wherein the first through hole (1a) is neighboring to the third through hole (3a); the third through hole (3a) is neighboring to the fourth through hole (4a); the fourth through hole (4a) is neighboring to the second through hole (2a); the second through hole (2a) is neighboring to the sixth through hole (6a); the sixth through hole (6a) is neighboring to the fifth through hole (5a); the fifth through hole (5a) is neighboring to the first through hole (1a), wherein the moving valve disc (20a) has a water inlet channel (21a) communicated with the water inlet port (31a), wherein the moving valve disc (20a) further has a communicating blind recess (22a) and a draining channel provided therein, wherein the draining channel (22a) is communicated with the effluent outlet (33a).

Further, the fitting relations include: the water inlet channel (21a) is communicated with the first through hole (1a); the communicating blind recess (22a) is communicated with the fifth through hole (5a) and the sixth through hole (6a); the draining channel is communicated with the third through hole (3a), or the water inlet channel (21a) is communicated with the second through hole (2a); the communicating blind recess (22a) is communicated with the third through hole (3a) and the fourth through hole (4a); the draining channel is communicated with the first through hole (1a), or the water inlet channel (21a) is communicated with the fourth through hole (4a); the communicating blind recess (22a) is communicated with the first through hole (1a) and the third through hole (3a); the draining channel is communicated with the fifth through hole (5a), or the water inlet channel (21a) is communicated with the third through hole (3a); the communicating blind recess (22a) is communicated with the first through hole (1a); the draining channel is communicated with the sixth through hole (6a), or the water inlet channel (21a) is communicated with the first through hole (1a); the communicating blind recess (22a) is communicated with the first through hole (1a); the draining channel is communicated with the second through hole (2a).

Further, the draining channel is a draining through hole (23a), the driving device is a valve rod (61a), the effluent outlet (33a) is provided in the valve body (30a), the draining through hole (23a) is communicated with the effluent outlet (33a) by the first pollution hole (63a) provided in the valve rod (61a) and the second pollution hole (64a) provided in the cover (60a).

Alternatively, the draining channel is a draining blind recess (231a), wherein the fixed valve disc (10a) further has a seventh through hole (7a) provided therein, wherein the effluent outlet (33a) is provided in the valve body (30a), wherein the draining blind recess (231a) is communicated with the effluent outlet (33a) via the seventh through hole (7a).

The present invention further provides a multifunction softening valve, comprising a valve body (30a), a cover (60a), an injector (37a), a fixed valve disc (10a) and a moving valve disc (20a), wherein the fixed valve disc (10a) and the moving valve disc (20a) are respectively provided in the valve body (30a), wherein the head faces of the fixed valve disc (10a) and the moving valve disc (20a) are hermetically and rotationally aligned with each other, a driving device for controlling the moving valve disc (20a) to rotate, the softening valve has a water inlet port (31a), a water outlet port (32a), an effluent outlet (33a), a first filter port (38a), a second filter port (39a) and a brine drawing port (36a) provided therein, wherein the softening valve further has an injector outlet (34a) and an injector inlet (35a) provided therein, wherein the injector outlet (34a) and the injector inlet (35a) are communicated with the injector (37a) therein, wherein the fixed valve disc (10a) has six through holes: a first through hole (1a), a second through hole (2a), a third through hole (3a), a fourth through hole (4a), a fifth through hole (5a) and a sixth through hole (6a) provided therein, and within the softening valve, the first through hole (1a) is adapted for being communicated with the first filter port (38a); the second through hole (2a) and the fifth through hole (5a) are communicated with each other and each of the second through hole (2a) and the fifth through hole (5a) is adapted for being communicated with the second filter port (39a); the third through hole (3a) is communicated with the injector inlet (35a); the fourth through hole (4a) is communicated with the injector outlet (34a); the sixth through hole (6a) is communicated with the water outlet port (32a), wherein the first through hole (1a) is neighboring to the fourth through hole (4a); the fourth through hole (4a) is neighboring to the second through hole (2a); the second through hole (2a) is neighboring to the sixth through hole (6a); the sixth through hole (6a) is neighboring to the fifth through hole (5a); the fifth through hole (5a) is neighboring to the third through hole (3a); the third through hole (3a) is neighboring to the first through hole (1a), wherein the moving valve disc (20a) has a water inlet channel (21a) communicated with the water inlet port (31a), wherein the moving valve disc (20a) further has a communicating blind recess (22a) and a draining channel (23a) provided therein, wherein the draining channel (23a) is communicated with the effluent outlet (33a).

Further, the fitting relations include: the water inlet channel (21a) is communicated with the first through hole (1a); the communicating blind recess (22a) is communicated with the fifth through hole (5a) and the sixth through hole (6a), or the water inlet channel (21a) is communicated with the fifth through hole (5a); the communicating blind recess (22a) is communicated with the second through hole (2a); the draining channel is communicated with the first through hole (1a), or the water inlet channel (21a) is communicated with the fourth through hole (4a); the communicating blind recess (22a) is communicated with the first through hole (1a) and the third through hole (3a); the draining channel is communicated with the fifth through hole (5*a*), or the water inlet channel (21*a*) is communicated with the first through hole (1*a*); the communicating blind recess (22*a*) is communicated with the third through hole (3*a*) and the fifth through hole (5*a*); the draining channel is communicated with the sixth through hole (6*a*), or the water inlet channel (21*a*) is communicated with the first through hole (1*a*); the communicating blind recess (22*a*) is communicated with the fifth through hole (5*a*); the draining channel is communicated with the second through hole (2*a*).

Further, the draining channel is a draining through hole (23*a*), the driving device is a valve rod (61*a*), the effluent outlet (33*a*) is provided in the valve body (30*a*), the draining through hole (23*a*) is communicated with the effluent outlet (33*a*) by the first pollution hole (63*a*) provided in the valve rod (61*a*) and the second pollution hole (64*a*) provided in the cover (60*a*).

Alternatively, the draining channel is a draining blind recess (231*a*), wherein the fixed valve disc (10*a*) further has a seventh through hole (7*a*) provided therein, wherein the effluent outlet (33*a*) is provided in the valve body (30*a*), wherein the draining blind recess (231*a*) is communicated with the effluent outlet (33*a*) via the seventh through hole (7*a*).

The present invention further provides a multifunction softening valve, comprising a valve body (30*b*), a cover (60*b*), an injector (37*b*), a fixed valve disc (10*b*) and a moving valve disc (20*b*), wherein the fixed valve disc (10*b*) and the moving valve disc (20*b*) are respectively provided in the valve body (30*b*), wherein the head faces of the fixed valve disc (10*b*) and the moving valve disc (20*b*) are hermetically and rotationally aligned with each other, wherein the moving valve disc (20*b*) is provided with a valve rod (61*b*), the softening valve has a water inlet port (31*b*), a water outlet port (32*b*), an effluent outlet (33*b*), a filter outside port (38*b*), a filter inside port (39*b*) and a brine drawing port (36*b*) provided therein, wherein the softening valve further has an injector outlet (34*b*) and an injector inlet (35*b*) provided therein, wherein the injector outlet (34*b*) and the injector inlet (35*b*) are communicated with the injector (37*b*) therein, wherein the fixed valve disc (10*b*) has five through holes: a first through hole (1*b*), a second through hole (2*b*), a third through hole (3*b*), a fourth through hole (4*b*) and a fifth through hole (5*b*) provided therein, and the five through holes of the fixed valve disc (10*b*) are respectively communicated with the water outlet port (32*b*), the injector outlet (34*b*), the injector inlet (35*b*), the filter outside port (38*b*) and the filter inside port (39*b*), wherein the moving valve disc (20*b*) has a water inlet channel (21*b*) communicated with the water inlet port (31*b*), wherein the moving valve disc (20*b*) further has a communicating blind recess (22*b*) and a draining channel provided therein, wherein the draining channel is communicated with the effluent outlet (33*b*).

Further, within the softening valve, the first through hole (1*b*) of the fixed valve disc (10*b*) is communicating with the filter outside port (38*b*); the second through hole (2*b*) is communicated with the water outlet port (32*b*), the third through hole (3*b*) is communicating with the filter inside port (39*b*), the fourth through hole (4*b*) is communicated with the injector outlet (34*b*); the fifth through hole (5*b*) is communicated with the injector inlet (35*b*).

Alternatively, within the softening valve, the first through hole (1*b*) of the fixed valve disc (10*b*) is communicating with the filter inside port (39*b*); the second through hole (2*b*) is communicated with the water outlet port (32*b*), the third through hole (3*b*) is communicating with the filter outside port (38*b*), the fourth through hole (4*b*) is communicated with the injector outlet (34*b*); the fifth through hole (5*b*) is communicated with the injector inlet (35*b*).

Further, the draining channel is a draining through hole (23*b*), wherein the effluent outlet (33*b*) is provided in the valve body (30*b*), wherein the draining through hole (23*b*) is communicated with the effluent outlet (33*b*) by the first pollution hole (63*b*) provided in the valve rod (61*b*) and the second pollution hole (64*b*) provided in the cover (60*b*) in proper order.

Alternatively, the draining channel is a draining through hole (23*b*), wherein the effluent outlet (33*b*) is provided in the cover (60*b*), wherein the draining through hole (23*b*) is communicated with the effluent outlet (33*b*) by the first pollution hole (63*b*) provided in the valve rod (61*b*) and the second pollution hole (64*b*) provided in the cover (60*b*) in proper order.

Further, the draining channel is a draining blind recess (231*b*), wherein the fixed valve disc (10*b*) further has a sixth through hole (6*b*) provided therein, wherein the draining blind recess (231*b*) is communicated with the effluent outlet (33*b*) via the sixth through hole (6*b*).

Further, the sixth through hole (6*b*) of the fixed valve disc (10*b*) is provided in a center thereof, wherein one end of the draining blind recess (223*b*) of the moving valve disc (20*b*) is provided in a center of the moving valve disc (20*b*), wherein the first through hole (1*b*) is neighboring to the fourth through hole (4*b*), wherein the fourth through hole (4*b*) is neighboring to the second through hole (2*b*), wherein the second through hole (2*b*) is neighboring to the third through hole (3*b*), wherein the third through hole (3*b*) is neighboring to the fifth through hole (5*b*).

Alternatively, the third through hole (3*b*) is radially arranged, wherein one end of the third through hole (3*b*) is provided in a center of the fixed valve disc (10*b*), wherein the communicating blind recess (22*b*) is radially arranged, and wherein one end of the communicating blind recess (22*b*) is provided in a center of the moving valve disc (20*b*), wherein the first through hole (1*b*) is neighboring to the fifth through hole (5*b*), wherein the second through hole (2*b*) is neighboring to the third through hole (3*b*), wherein the third through hole (3*b*) is neighboring to the fourth through hole (4*b*).

Alternatively, the third through hole (3*b*) is radially arranged, wherein one end of the third through hole (3*b*) is provided in a center of the fixed valve disc (10*b*), wherein the communicating blind recess (22*b*) is radially arranged, and wherein one end of the communicating blind recess (22*b*) is provided in a center of the moving valve disc (20*b*), wherein the first through hole (1*b*) is neighboring to the fifth through hole (5*b*), wherein the second through hole (2*b*) is neighboring to the third through hole (3*b*), wherein the third through hole (3*b*) is neighboring to the fourth through hole (4*b*).

Alternatively, the first through hole (1*b*) is neighboring to the fourth through hole (4*b*), wherein the fourth through hole (4*b*) is neighboring to the second through hole (2*b*), wherein the second through hole (2*b*) is neighboring to the third through hole (3*b*), wherein the third through hole (3*b*) is neighboring to the fifth through hole (5*b*).

Alternatively, the first through hole (1*b*) is neighboring to the fourth through hole (4*b*), wherein the fourth through hole (4*b*) is neighboring to the second through hole (2*b*), wherein the second through hole (2*b*) is neighboring to the third through hole (3*b*), wherein the third through hole (3*b*) is neighboring to the fifth through hole (5*b*).

The present invention further provides a multifunction softening valve, comprising a valve body (30*c*), a cover (60*c*), an injector (37*c*), a fixed valve disc (10*c*) and a moving valve disc (20*c*), wherein the fixed valve disc (10*c*) and the moving valve disc (20*c*) are respectively provided in the valve body (30*c*), wherein the head faces of the fixed valve disc (10*c*) and the moving valve disc (20*c*) are hermetically and rotationally aligned with each other, wherein the moving valve disc (20*c*) is provided with a valve rod (61*c*), the softening valve has a water inlet port (31*c*), a water outlet port (32*c*), an effluent outlet (33*c*), a filter outside port (38*c*), a filter inside port (39*c*) and a brine drawing port (36*c*) provided therein, wherein the softening valve further has an injector outlet (34*c*) and an injector inlet (35*c*) provided therein, wherein the injector outlet (34*c*) and the injector inlet (35*c*) are communicated with the injector (37*c*) therein, wherein the fixed valve disc (10*c*) has six through holes: a first through hole (1*c*), a second through hole (2*c*), a third through hole (3*c*), a fourth through hole (4*c*), a fifth through hole (5*c*) and a sixth through hole (6*c*) provided therein, and within the softening valve, the first through hole (1*c*) and the second through hole (2*c*) are communicated with each other and each of the first through hole (1*c*) and the second through hole (2*c*) is adapted to be communicated with the filter outside port (38*c*), the third through hole (3*c*) is communicated with the filter inside port (39*c*), the fourth through hole (4*c*) is communicated with the water outlet port (32*c*), the fifth through hole (5*c*) is communicated with the injector outlet (34*c*), the sixth through hole (6*c*) is communicated with the injector inlet (35*c*), wherein the moving valve disc (20*c*) has a water inlet channel (21*c*) communicated with the water inlet port (31*c*), wherein the moving valve disc (20*c*) further has a communicating blind recess (22*c*) and a draining channel provided therein, wherein the draining channel is communicated with the effluent outlet (33*c*).

Further, the first through hole (1*c*) is neighboring to the third through hole (3*c*), wherein the third through hole (3*c*) is neighboring to the fourth through hole (4*c*), wherein the fourth through hole (4*c*) is neighboring to the fifth through hole (5*c*), wherein the fifth through hole (5*c*) is neighboring to the second through hole (2*c*), wherein the second through hole (2*c*) is neighboring to the sixth through hole (6*c*), wherein the sixth through hole (6*c*) is neighboring to the first through hole (1*c*).

Further, the draining channel is a draining through hole (23*c*), wherein the effluent outlet (33*c*) is provided in the cover (60*c*), wherein the draining through hole (23*c*) is communicated with the effluent outlet (33*c*) by the first pollution hole (63*c*) provided in the valve rod (61*c*) and the second pollution hole (64*c*) provided in the cover (60*c*) in proper order.

Alternatively, the draining channel is a draining through hole (23*c*), wherein the effluent outlet (33*c*) is provided in the valve body (30*c*), wherein the draining through hole (23*c*) is communicated with the effluent outlet (33*c*) by the first pollution hole (63*c*) provided in the valve rod (61*c*) and the second pollution hole (64*c*) provided in the cover (60*c*) in proper order.

Alternatively, the draining channel is a draining blind recess (323*c*), wherein the fixed valve disc (10*c*) further has a seventh through hole (7*c*) provided therein, wherein the effluent outlet (33*c*) is provided in the valve body (30*c*), wherein the draining blind recess (323*c*) is communicated with the effluent outlet (33*c*) via the seventh through hole (7*c*).

Further, the seventh through hole (7*c*) is provided in a center of the fixed valve disc (10*c*), wherein one end of the draining blind recess (323*c*) is provided in a center of the moving valve disc (20*c*).

The present invention further provides a softened water supplementing multifunction softening valve, comprising a valve body (30*d*), a cover (60*d*), an injector (37*d*), a fixed valve disc and a moving valve disc, wherein the fixed valve disc and the moving valve disc are respectively provided in the valve body (30*d*), wherein the head faces of the fixed valve disc and the moving valve disc are hermetically and rotationally aligned with each other, wherein the moving valve disc is provided with a valve rod (61*d*), wherein the softening valve has a water inlet port (31*d*), a water outlet port (32*d*), an effluent outlet port (33*d*), a filter outside port (38*d*), a filter inside port (39*d*) and a brine drawing port (36*d*) provided therein, wherein the softening valve further has an injector outlet (34*d*) and an injector inlet (35*d*) provided therein, wherein the injector outlet (34*d*) and the injector inlet (35*d*) are communicated with the injector (37*d*) therein, wherein the fixed valve disc (10*d*) has seven through holes: a first through hole (1*d*), a second through hole (2*d*), a third through hole (3*d*), a fourth through hole (4*d*), a fifth through hole (5*d*), a sixth through hole (6*d*) and a seventh through hole (7*d*) provided therein, and each of the seven through holes of the fixed valve disc (10*d*) are respectively communicated with at least one of the water outlet port (32*d*), the injector outlet (34*d*), the injector inlet (35*d*), the filter outside port (38*d*) and the filter inside port (39*d*) via an inner channel, wherein the moving valve disc has a water inlet channel (21*d*) communicated with the water inlet port (31*d*), wherein the moving valve disc further has a communicating blind recess (22*d*) and a draining channel provided therein, wherein the draining channel is communicated with the effluent outlet (33*d*).

Further, the sixth through hole (6*d*) is neighboring to the second through hole (2*d*), wherein the second through hole (2*d*) is neighboring to the first through hole (1*d*), wherein the first through hole (1*d*) is neighboring to the fourth through hole (4*d*), wherein the fourth through hole (4*d*) is neighboring to the fifth through hole (5*d*), wherein the fifth through hole (5*d*) is neighboring to the third through hole (3*d*), wherein the third through hole (3*d*) is neighboring to the seventh through hole (7*d*).

Further, the seven through holes of the fixed valve disc are aligned therein in a circular distributed manner.

Further, the seven through holes of the fixed valve disc are respectively aligned in an outer ring and an inner ring.

Further, the first through hole (1*d*), the second through hole (2*d*), the third through hole (3*d*), the fourth through hole (4*d*), the fifth through hole (5*d*) and the sixth through hole (6*d*) are provided in the inner ring, and the seventh through hole (7*d*) is provided in the outer ring.

Alternatively, the first through hole (1*d*) is provided in the inner ring and the outer ring, the second through hole (2*d*) is provided in the outer ring, the third through hole (3*d*), the fourth through hole (4*d*), the fifth through hole (5*d*) and the sixth through hole (6*d*) are provided in the inner ring, and the seventh through hole (7*d*) is provided in the outer ring.

Further, the draining channel is a draining through hole (23*d*), wherein the effluent outlet (33*d*) is provided in the cover (60*d*), wherein the draining through hole (23*d*) is communicated with the effluent outlet (33*d*) by the first pollution hole (63*d*) provided in the valve rod (61*d*) and the second pollution hole (64*d*) provided in the cover (60*d*) in proper order.

Alternatively, the draining channel is a draining through hole (23*d*), wherein the effluent outlet (33*d*) is provided in the valve body (30*d*), wherein the draining through hole (23*d*) is communicated with the effluent outlet (33*d*) by the first pollution hole (63*d*) provided in the valve rod (61*d*) and the second pollution hole (64*d*) provided in the cover (60*d*) in proper order.

Alternatively, the draining channel is a draining blind recess, and one end of the draining blind recess is provided in a center of the moving valve disc, wherein the effluent outlet (33*d*) is provided in the valve body (30*d*), wherein the fixed valve disc further has an eighth through hole (8*d*) provided in a center of the fixed valve disc, wherein the draining blind recess is communicated with the effluent outlet (33*d*) via the eighth through hole (8*d*).

Further, within the valve body (30*d*), the first through hole (1*d*) is communicated with the filter outside port (38*d*), wherein the second through hole (2*d*) and the third through hole (3*d*) are communicated with each other and each of the second through hole (2*d*) and the third through hole (3*d*) is adapted to be communicated with the filter inside port (39*d*), wherein the fourth through hole (4*d*) is communicated with the injector outlet (34*d*), wherein the fifth through hole (5*d*) and the sixth through hole (6*d*) are communicated with each other and each of the fifth through hole (5*d*) and the sixth through hole (6*d*) is adapted to be communicated with the injector inlet (35*d*), wherein the seventh through hole (7*d*) is communicated with the water outlet port (32*d*).

Alternatively, within the valve body (30*d*), the first through hole (1*d*) is communicated with the filter inside port (39*d*), wherein the second through hole (2*d*) and the third through hole (3*d*) are communicated with each other and each of the second through hole (2*d*) and the third through hole (3*d*) is adapted to be communicated with the filter outside port (38*d*), wherein the fourth through hole (4*d*) is communicated with the injector outlet (34*d*), wherein the fifth through hole (5*d*) and the sixth through hole (6*d*) are communicated with each other and each of the fifth through hole (5*d*) and the sixth through hole (6*d*) is adapted to be communicated with the injector inlet (35*d*), wherein the seventh through hole (7*d*) is communicated with the water outlet port (32*d*).

Alternatively, within the valve body (30*d*), the first through hole (1*d*) is communicated with the filter outside port (38*d*), wherein the second through hole (2*d*) and the third through hole (3*d*) are communicated with each other and each of the second through hole (2*d*) and the third through hole (3*d*) is adapted to be communicated with the filter inside port (39*d*), wherein the fourth through hole (4*d*) is communicated with the injector outlet (34*d*), wherein the fifth through hole (5*d*) and the sixth through hole (6*d*) are communicated with each other and each of the fifth through hole (5*d*) and the sixth through hole (6*d*) is adapted to be communicated with the injector inlet (35*d*), wherein the seventh through hole (7*d*) is communicated with the water outlet port (32*d*).

Alternatively, within the valve body (30*d*), the first through hole (1*d*) is communicated with the filter inside port (39*d*), wherein the second through hole (2*d*) and the third through hole (3*d*) are communicated with each other and each of the second through hole (2*d*) and the third through hole (3*d*) is adapted to be communicated with the filter outside port (38*d*), wherein the fourth through hole (4*d*) is communicated with the injector outlet (34*d*), wherein the fifth through hole (5*d*) and the sixth through hole (6*d*) are communicated with each other and each of the fifth through hole (5*d*) and the sixth through hole (6*d*) is adapted to be communicated with the injector inlet (35*d*), wherein the seventh through hole (7*d*) is communicated with the water outlet port (32*d*).

Alternatively, within the valve body (30*d*), the first through hole (1*d*) is communicated with the filter outside port (38*d*), wherein the second through hole (2*d*) and the third through hole (3*d*) are communicated with each other and each of the second through hole (2*d*) and the third through hole (3*d*) is adapted to be communicated with the filter inside port (39*d*), wherein the fourth through hole (4*d*) is communicated with the injector outlet (34*d*), wherein the fifth through hole (5*d*) and the sixth through hole (6*d*) are communicated with each other and each of the fifth through hole (5*d*) and the sixth through hole (6*d*) is adapted to be communicated with the injector inlet (35*d*), wherein the seventh through hole (7*d*) is communicated with the water outlet port (32*d*).

Alternatively, within the valve body (30*d*), the first through hole (1*d*) is communicated with the filter inside port (39*d*), wherein the second through hole (2*d*) and the third through hole (3*d*) are communicated with each other and each of the second through hole (2*d*) and the third through hole (3*d*) is adapted to be communicated with the filter outside port (38*d*), wherein the fourth through hole (4*d*) is communicated with the injector outlet (34*d*), wherein the fifth through hole (5*d*) and the sixth through hole (6*d*) are communicated with each other and each of the fifth through hole (5*d*) and the sixth through hole (6*d*) is adapted to be communicated with the injector inlet (35*d*), wherein the seventh through hole (7*d*) is communicated with the water outlet port (32*d*).

Still further objects and advantages will become apparent from a consideration of the ensuing description and drawings.

These and other objectives, features, and advantages of the present invention will become apparent from the following detailed description, the accompanying drawings, and the appended claims.

(3) Advantageous Effects

The advantageous effects of the present disclosure are as follows: firstly, in a planar softening valve which may be divided to have eight equal portions, wherein the planar softening valve has three equal portions communicated with water inlet port, wherein the brine intaking upflow regeneration function can be achieved, wherein comparing with a valve which may be divided to have nine equal portions, the planar softening valve which may be divided to have eight equal portions can provided a high rate of flow, and comparing with the downflow regeneration function, the brine intaking upflow regeneration function can effectively improve the regeneration efficiency of resin and decrease the brine consumption; secondly, in a planar softening valve which may be divided to have nine equal portions, the brine intaking upflow regeneration and softened water supplement function, the brine intaking downflow regeneration and softened water supplement function can be achieved, wherein the regenerating liquid made from the softened water not only improves the regeneration efficiency, but may not result in the residue of hardness and stain in the brine container; thirdly, in a planar softening valve which may be divided to have eight equal portions, the brine intaking downflow regeneration function can be achieved, and comparing with the brine intaking upflow regeneration, the brine intaking downflow regeneration can effectively prevent the resin layer being thrown into disorder; fourthly, the five important function what a softening valve should have may be achieved in a valve of the present disclosure after the moving valve disc of the valve is rotated for a cycle, the excessive friction between the moving valve disc and the fixed valve disc is decreased, which is resulted from the back and fourth rotation of the moving valve disc, and the life-span of the softening valve is effectively ensured; fifthly, in each the five effective function states, no unnecessary draining when draining is not needed, no unnecessary water supplement when water supplement is not needed, which are helpful in saving water, using five through holes in the fixed valve disc for achieving a brine intaking upflow regeneration function and so on so as to make the inner channels of the valve body more concise and practical and the flow rate bigger; the channels having consistent diameters may make the flows in the valve body flow smoothly and more environment-friendly; because of the new channel structure employed, the function of the softened water supplementing to the brine container, the softened water provision function while the softened water supplementing to the brine container, and the upflow brine intaking regeneration function and so on may be performed, and it is convenient use and installation.

BRIEF DESCRIPTION OF THE DRAWINGS

FIG. 120 is a structural diagram of the valve according to the eighteenth embodiment, wherein the valve is under a brine intaking upflow regeneration working state.

Figure 120:
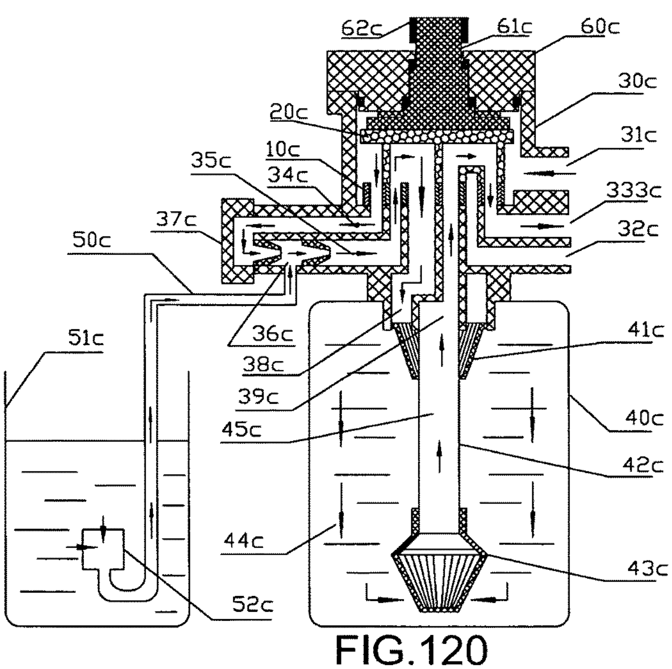
Figure 121:
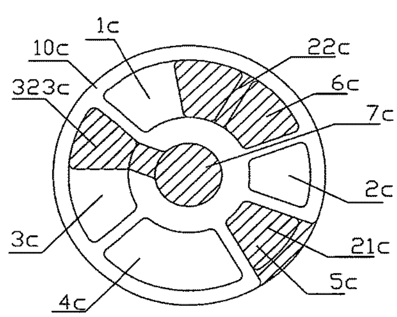

FIG. 121 is a location diagram of the moving valve disc 20*c* relative to the fixed valve disc 10*c*, wherein the moving valve disc 20*c* shown in FIG. 120.

Figure 122:
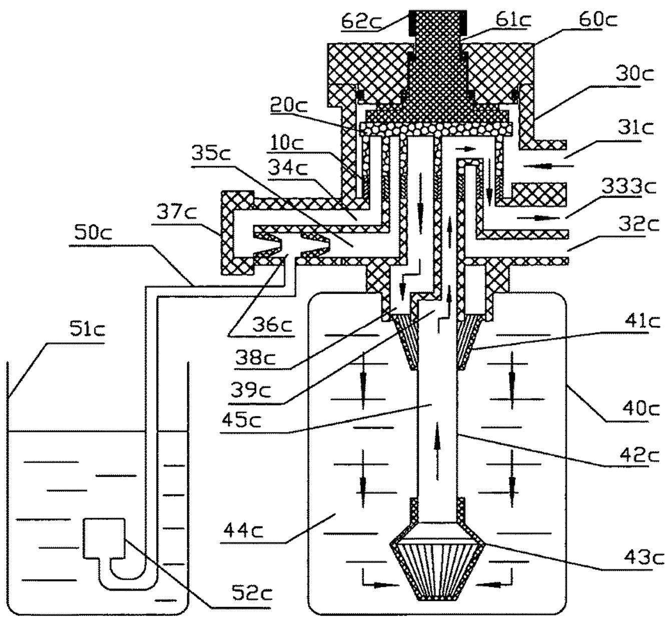

FIG. 122 is a structural diagram of the valve according to the eighteenth embodiment, wherein the valve is under a forwardwash working state.

Figure 123:
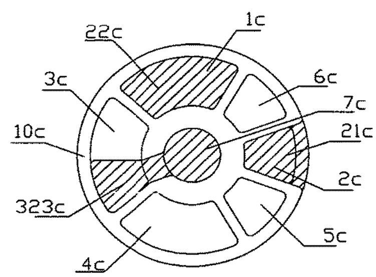

FIG. 123 is a location diagram of the moving valve disc 20*c* relative to the fixed valve disc 10*c*, wherein the moving valve disc 20*c* shown in FIG. 122.

Figure 124:
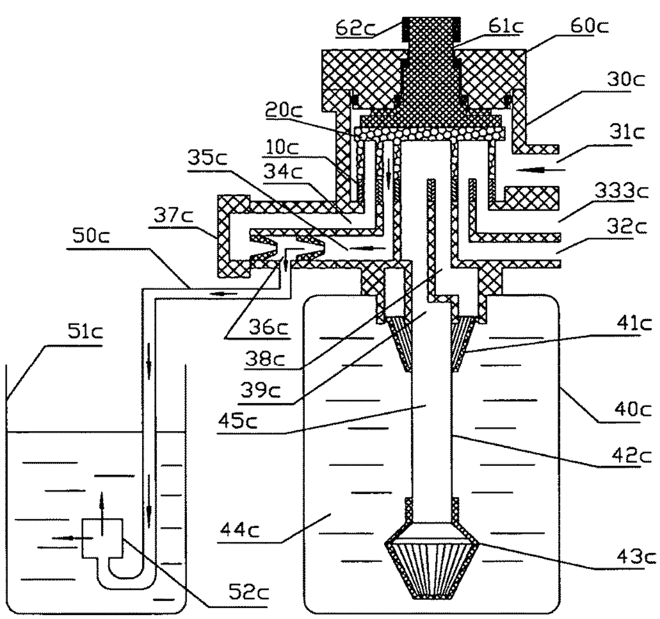

FIG. 124 is a structural diagram of the valve according to the eighteenth embodiment, wherein the valve is under a brine container water supplement working state.

Figure 125:
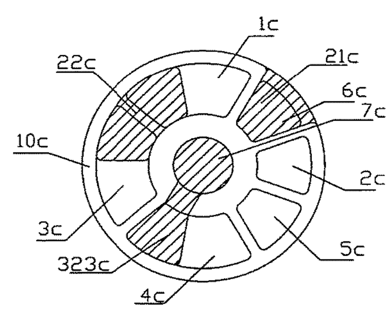

FIG. 125 is a location diagram of the moving valve disc 20*c* relative to the fixed valve disc 10*c*, wherein the moving valve disc 20*c* shown in FIG. 124.

Figure 126:
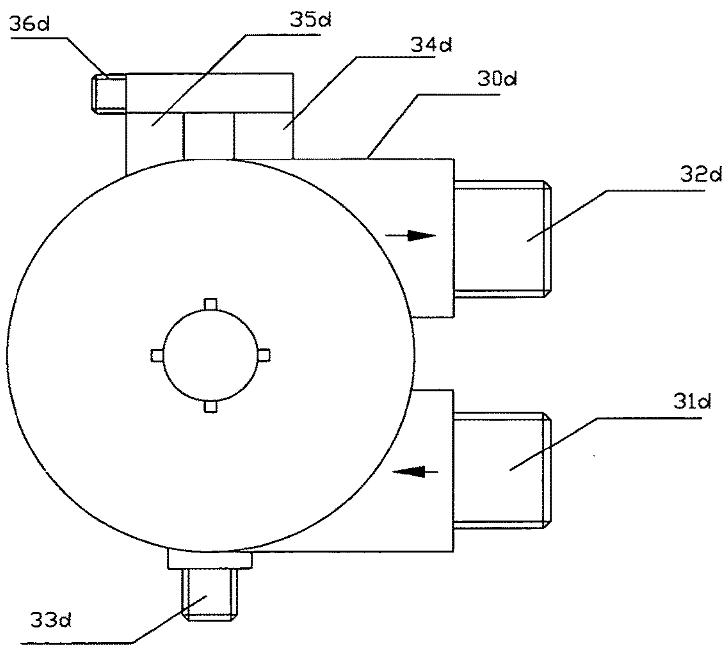

FIG. 126 is a top view of the valve body 30*d* according to the nineteenth embodiment to the twenty-eighth embodiment.

Figure 127:
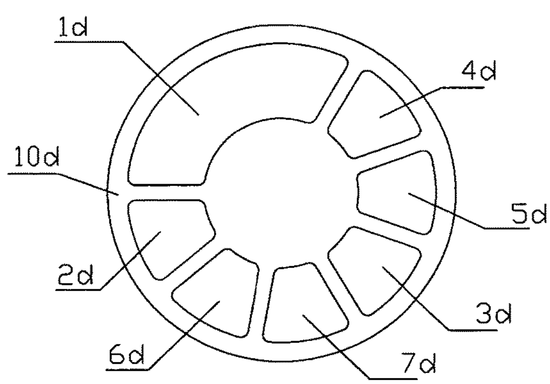

FIG. 127 is a flat structural diagram of the fixed valve disc 10*d* according to the nineteenth embodiment and the twentieth embodiment.

Figure 128:
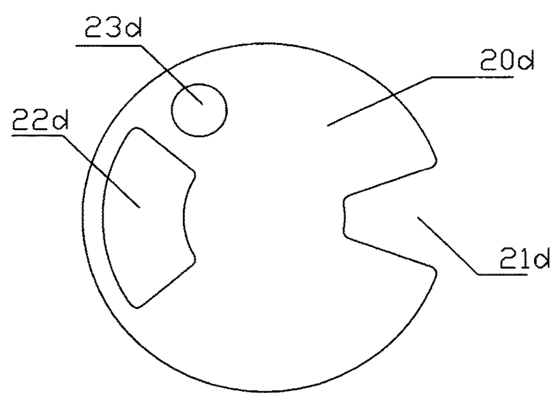

FIG. 128 is a top view of the moving valve disc 20*d* according to the nineteenth embodiment and the twentieth embodiment.

Figure 129:
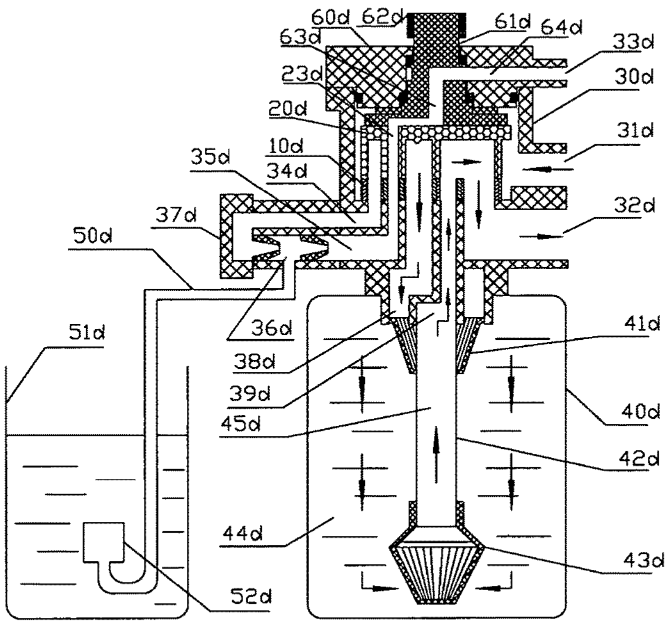

FIG. 129 is a structural diagram of the valve according to the nineteenth embodiment, wherein the valve is under the softening working state.

Figure 130:
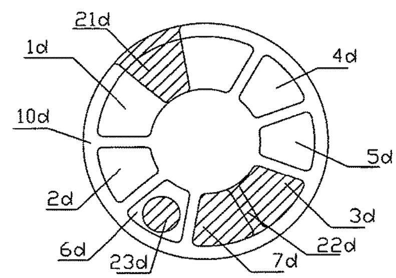

FIG. 130 is a location diagram of the moving valve disc 20*d* relative to the fixed valve disc 10*d* according to the nineteenth embodiment and the twentieth embodiment, wherein the moving valve disc 20*d* is under a softening working state.

Figure 131:
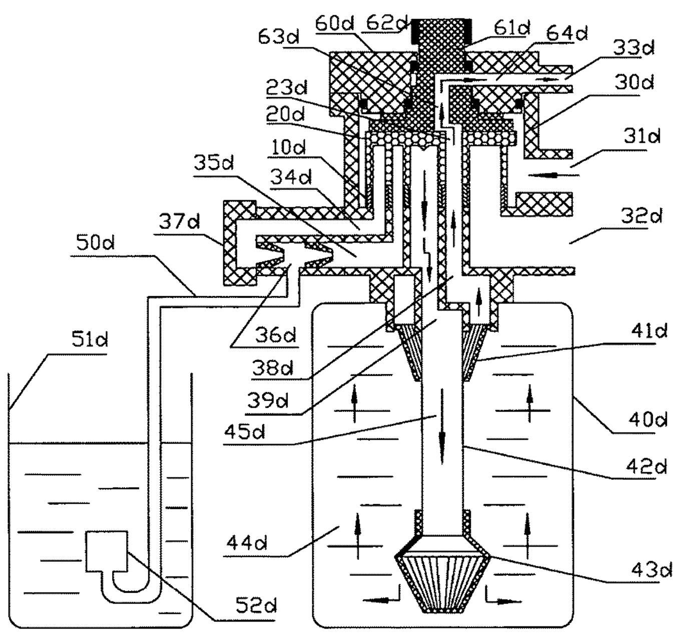

FIG. 131 is a structural diagram of the valve according to the nineteenth embodiment, wherein the valve is under a backwash working state.

Figure 132:
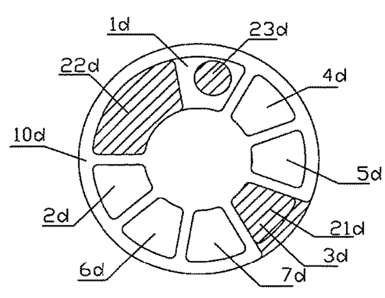

FIG. 132 is a location diagram of the moving valve disc 20*d* relative to the fixed valve disc 10*d* according to the nineteenth embodiment and the twentieth embodiment, wherein the moving valve disc 20*d* is under a backwash working state.

Figure 133:
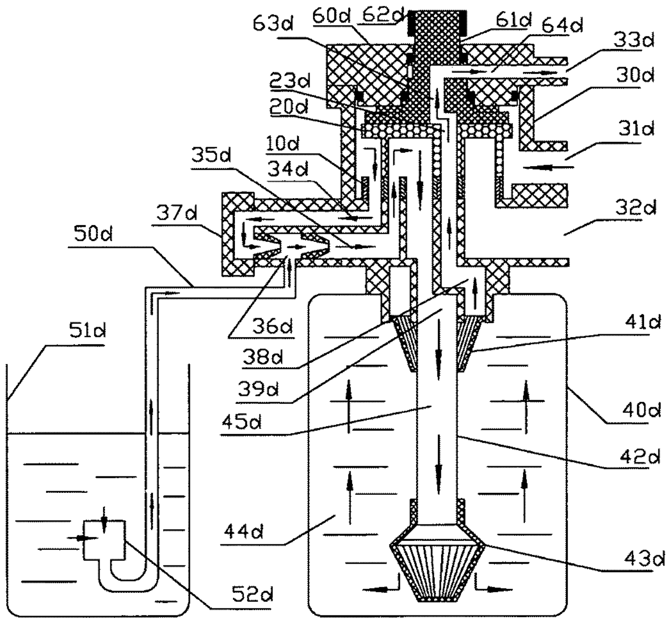

FIG. 133 is a structural diagram of the valve according to the nineteenth embodiment, wherein the valve is under a brine intaking upflow regeneration working state.

Figure 134:
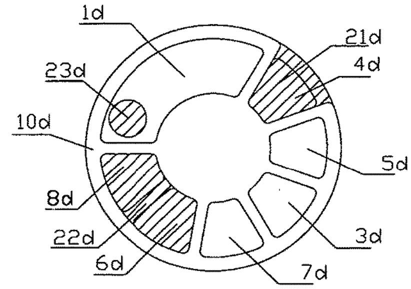

FIG. 134 is a location diagram of the moving valve disc 20*d* relative to the fixed valve disc 10*d* according to the nineteenth embodiment and the twentieth embodiment, wherein the moving valve disc 20*d* is under a brine intaking upflow regeneration working state.

Figure 135:
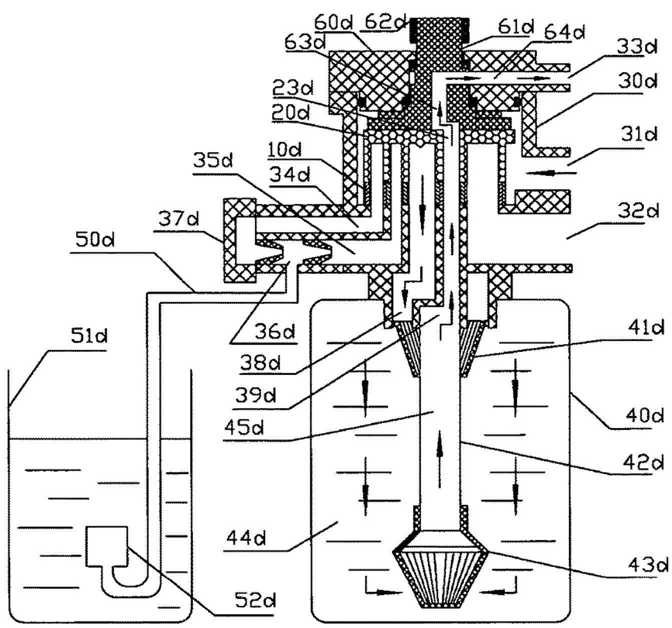

FIG. 135 is a structural diagram of the valve according to the nineteenth embodiment, wherein the valve is under a forwardwash working state.

Figure 136:
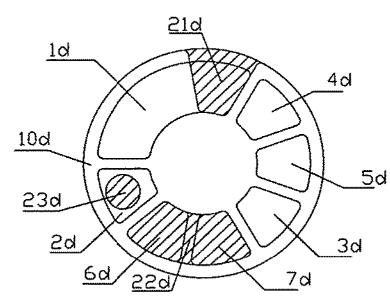

FIG. 136 is a location diagram of the moving valve disc 20*d* relative to the fixed valve disc 10*d* according to the nineteenth embodiment and the twentieth embodiment, wherein the moving valve disc 20*d* is under a forwardwash working state.

Figure 137:
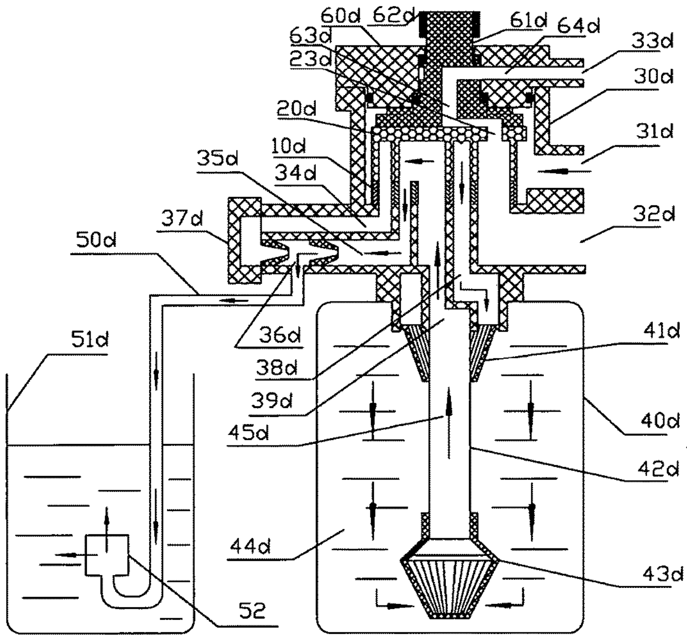

FIG. 137 is a structural diagram of the valve according to the nineteenth embodiment, wherein the valve is under a brine container water supplement working state.

Figure 138:
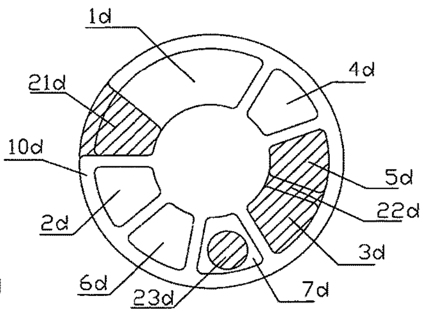

FIG. 138 is a location diagram of the moving valve disc 20*d* relative to the fixed valve disc 10*d* according to the nineteenth embodiment and the twentieth embodiment, wherein the moving valve disc 20*d* is under a brine container softened water supplement working state.

Figure 139:
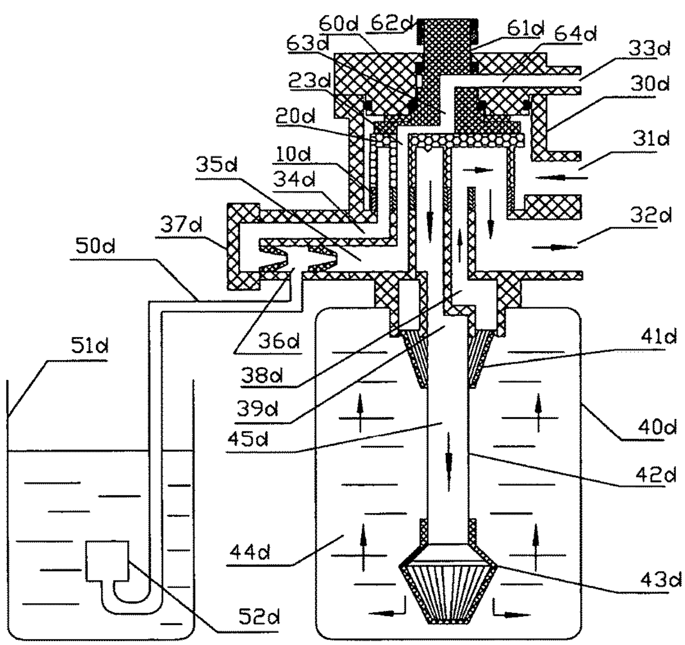

FIG. 139 is a structural diagram of the valve according to the twentieth embodiment, wherein the valve is under the softening working state.

Figure 140:
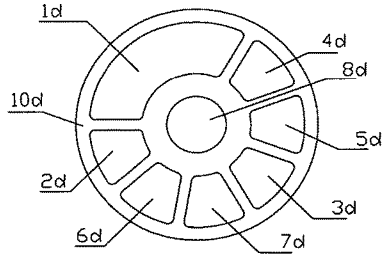

FIG. 140 is a flat structural diagram of the fixed valve disc 10*d* according to the twenty-first embodiment.

Figure 141:
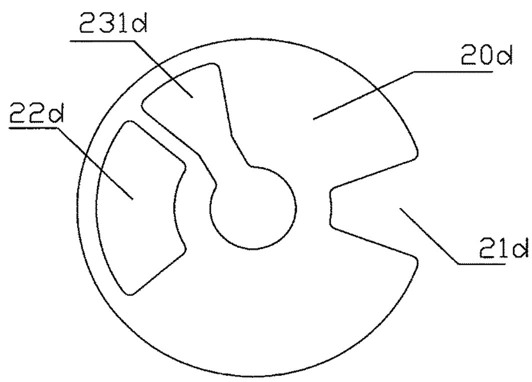

FIG. 141 is a top view of the moving valve disc 20*d* according to the twenty-first embodiment.

Figure 142:
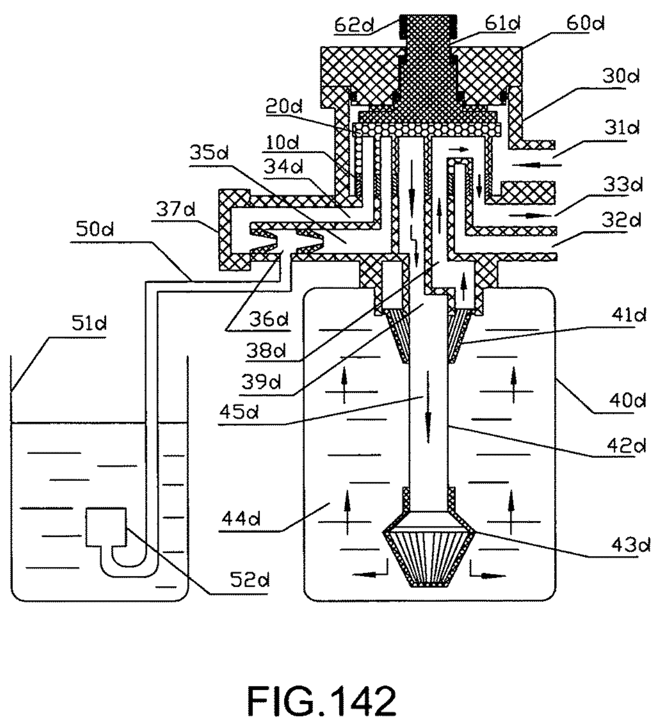

FIG. 142 is a structural diagram of the valve according to the twenty-first embodiment, wherein the valve is under a backwash working state.

Figure 143:
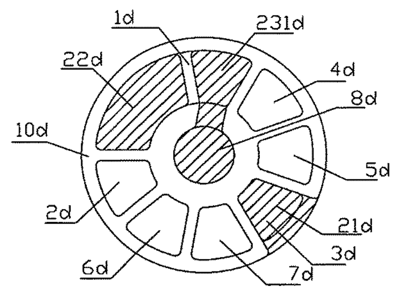

FIG. 143 is a location diagram of the moving valve disc 20*d* relative to the fixed valve disc 10*d* according to the twenty-first embodiment, wherein the moving valve disc 20*d* is under a backwash working state.

Figure 144:
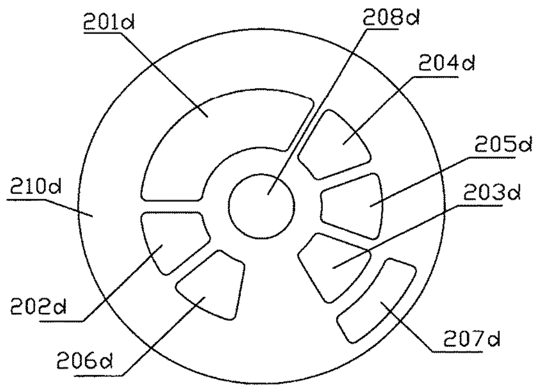

FIG. 144 is a flat structural diagram of the fixed valve disc 210*d* according to the twenty-second embodiment and the twenty-third embodiment.

Figure 145:
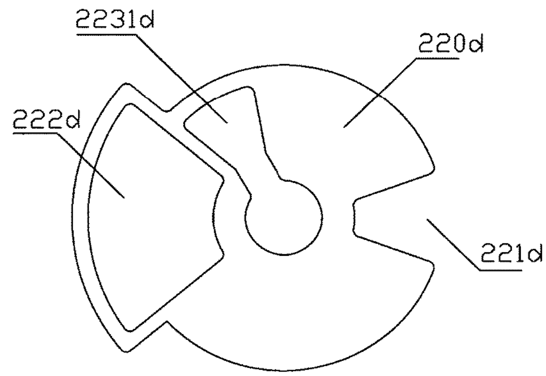

FIG. 145 is a top view of the moving valve disc 220*d* according to the twenty-second embodiment and the twenty-third embodiment.

Figure 146:
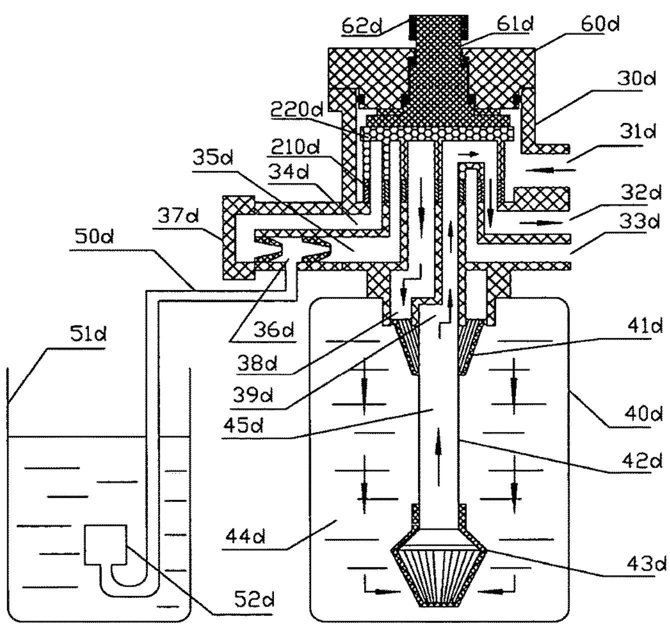

FIG. 146 is a structural diagram of the valve according to the twenty-second embodiment, wherein the valve is under the softening working state.

Figure 147:
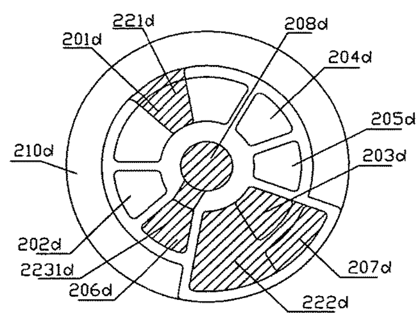

FIG. 147 is a location diagram of the moving valve disc 220*d* relative to the fixed valve disc 210*d* according to the twenty-second embodiment and the twenty-third embodiment, wherein the moving valve disc 220*d* is under a softening working state.

Figure 148:
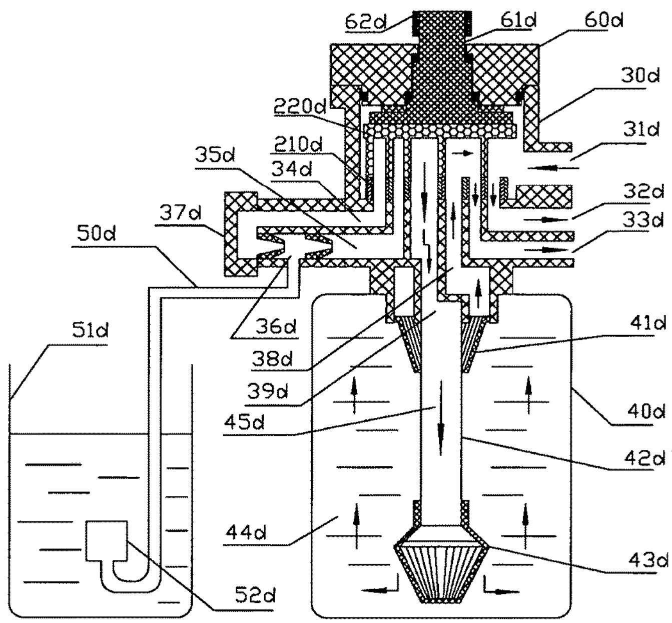

FIG. 148 is a structural diagram of the valve according to the twenty-second embodiment, wherein the valve is under a backwash working state.

Figure 149:
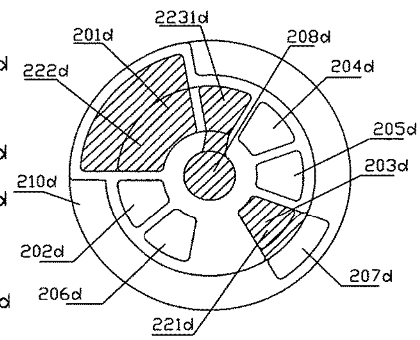

FIG. 149 is a location diagram of the moving valve disc 220*d* relative to the fixed valve disc 210*d* according to the twenty-second embodiment and the twenty-third embodiment, wherein the moving valve disc 220*d* is under a backwash working state.

Figure 150:
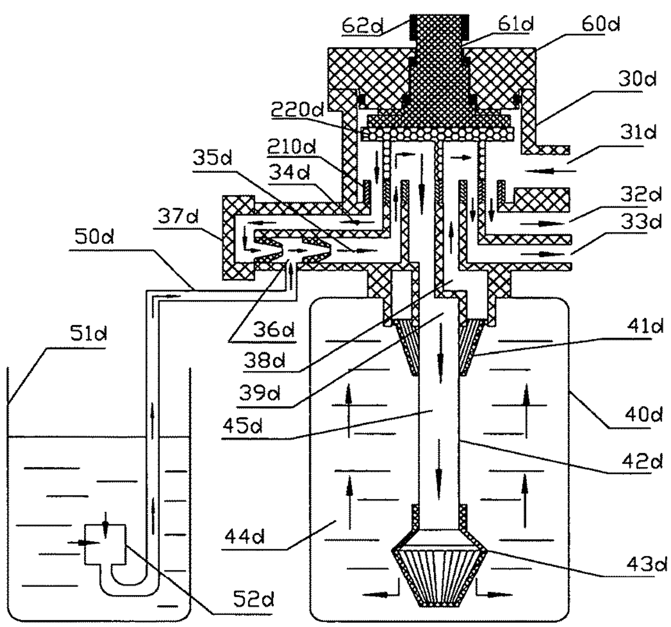

FIG. 150 is a structural diagram of the valve according to the twenty-second embodiment, wherein the valve is under a brine intaking upflow regeneration working state.

Figure 151:
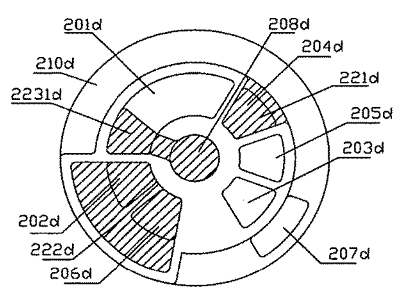

FIG. 151 is a location diagram of the moving valve disc 220*d* relative to the fixed valve disc 210*d* according to the twenty-second embodiment and the twenty-third embodiment, wherein the moving valve disc 220*d* is under a brine intaking upflow regeneration working state.

Figure 152:
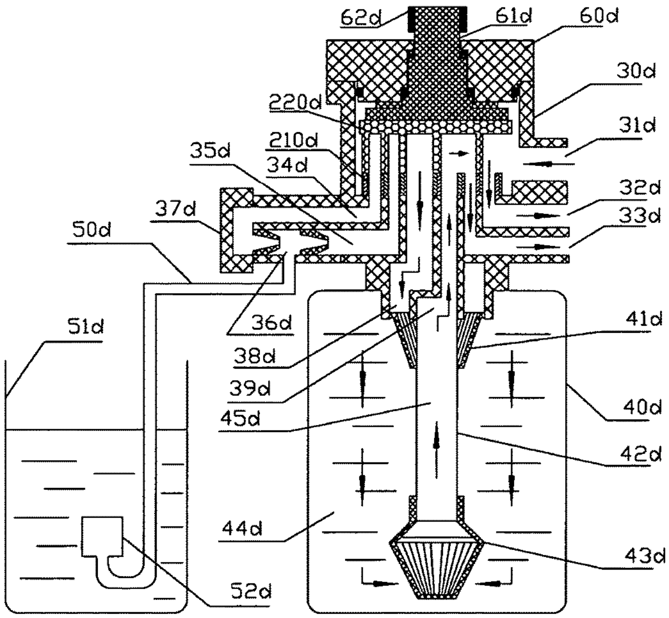

FIG. 152 is a structural diagram of the valve according to the twenty-second embodiment, wherein the valve is under a forwardwash working state.

Figure 153:
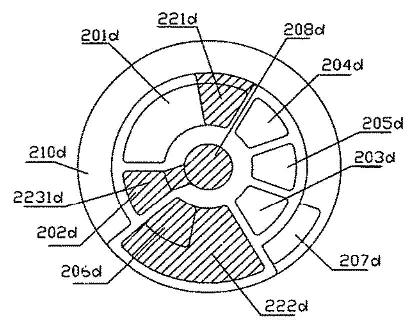

FIG. 153 is a location diagram of the moving valve disc 220*d* relative to the fixed valve disc 210*d* according to the twenty-second embodiment and the twenty-third embodiment, wherein the moving valve disc 220*d* is under a forwardwash working state.

Figure 154:
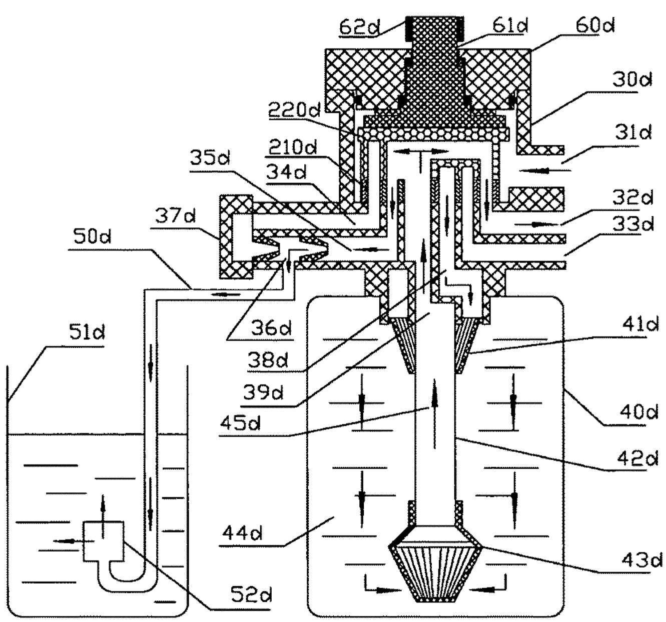

FIG. 154 is a structural diagram of the valve according to the twenty-second embodiment, wherein the valve is under a brine container softened water supplement and providing softened water working state.

Figure 155:
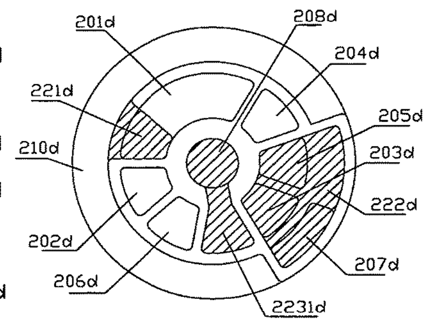

FIG. 155 is a location diagram of the moving valve disc 220*d* relative to the fixed valve disc 210*d* according to the twenty-second embodiment and the twenty-third embodiment, wherein the moving valve disc 220*d* is under a brine container softened water supplement and providing softened water working state.

Figure 156:
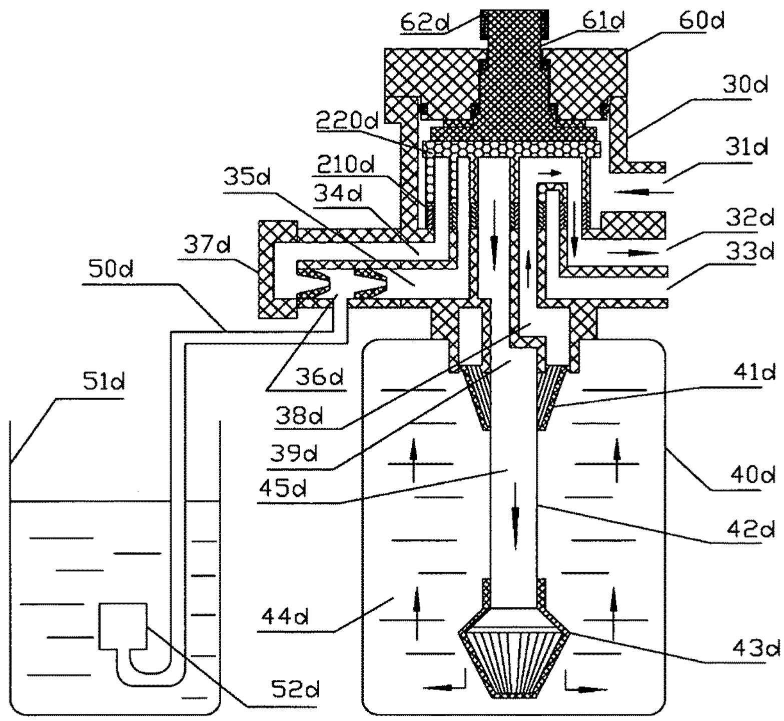

FIG. 156 is a structural diagram of the valve according to the twenty-third embodiment, wherein the valve is under the softening working state.

Figure 157:
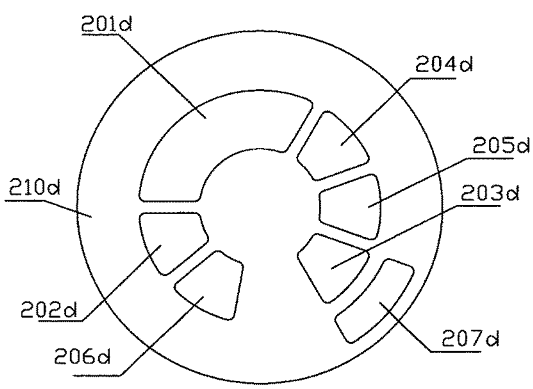

FIG. 157 is a flat structural diagram of the fixed valve disc 210*d* according to the twenty-fourth embodiment.

Figure 158:
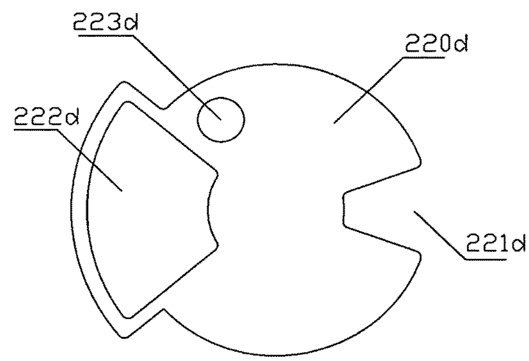

FIG. 158 is a top view of the moving valve disc 220*d* according to the twenty-fourth embodiment.

Figure 159:
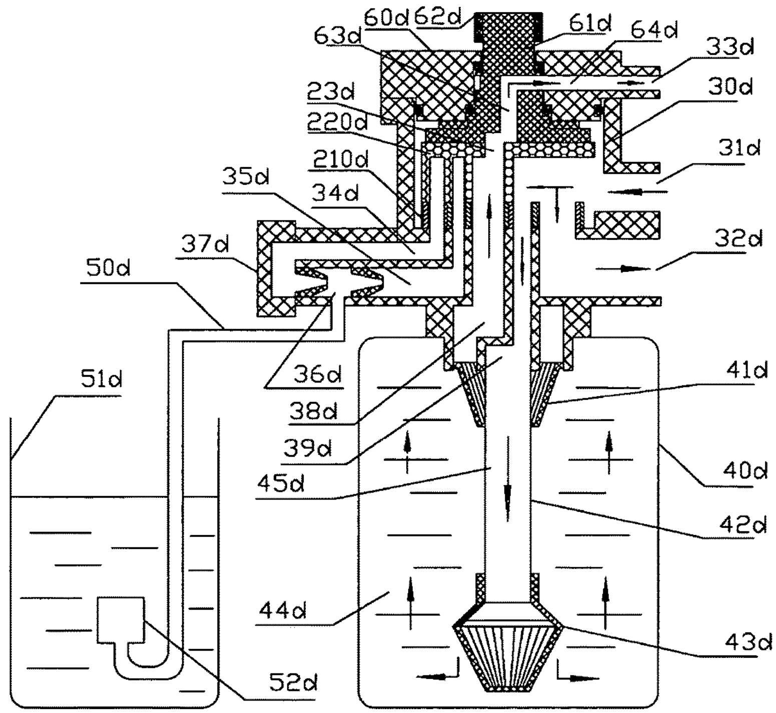

FIG. 159 is a structural diagram of the valve according to the twenty-fourth embodiment, wherein the valve is under a backwash working state.

Figure 160:
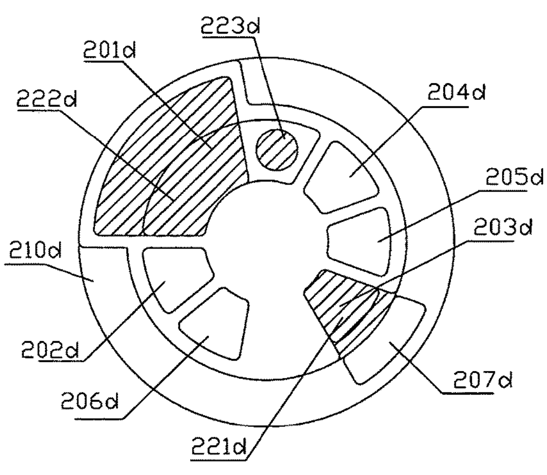

FIG. 160 is a location diagram of the moving valve disc 220*d* relative to the fixed valve disc 210*d* according to the twenty-fourth embodiment, wherein the moving valve disc 220*d* is under a backwash working state.

Figure 161:
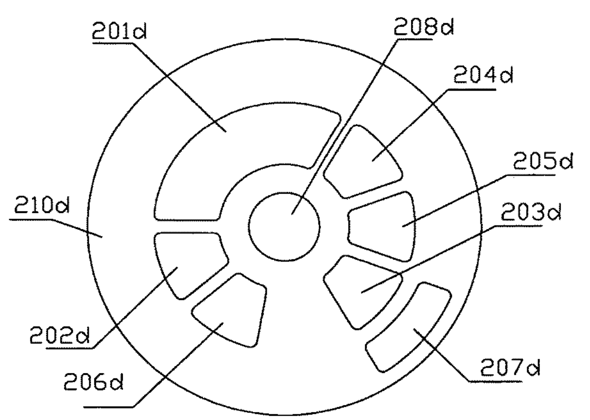

FIG. 161 is a flat structural diagram of the fixed valve disc 210*d* according to the twenty-fifth embodiment, wherein the fixed valve disc 210*d* employs a eighth through hole for draining.

Figure 162:
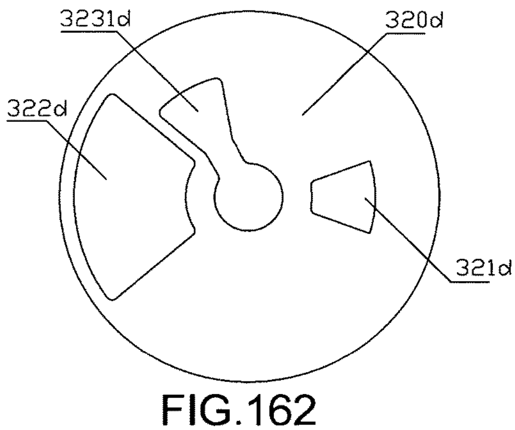

FIG. 162 is a top view of the moving valve disc 220*d* according to the twenty-fifth embodiment, wherein the fixed valve disc 210*d* employs a eighth through hole for draining.

Figure 163:
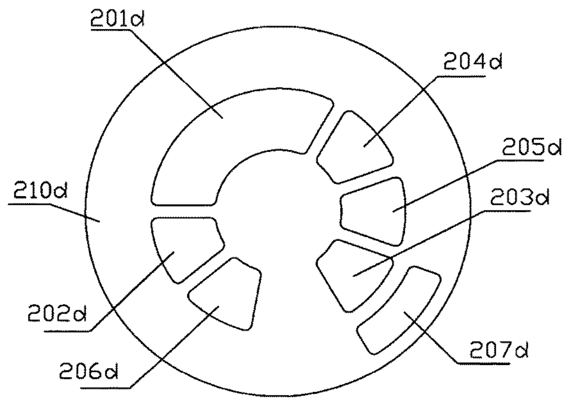

FIG. 163 is a flat structural diagram of the fixed valve disc 210*d* according to the twenty-fifth embodiment, wherein a cover is employed for draining directly.

Figure 164:
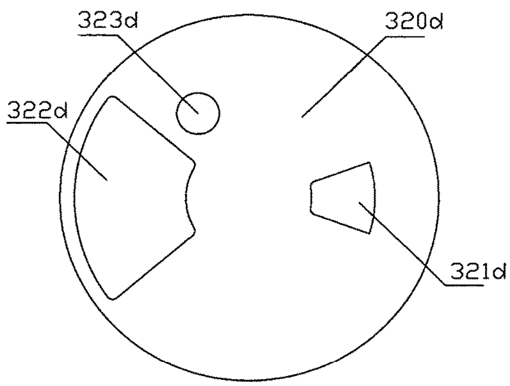

FIG. 164 is a top view of the moving valve disc 220*d* according to the twenty-fifth embodiment, wherein a cover is employed for draining directly.

Figure 165:
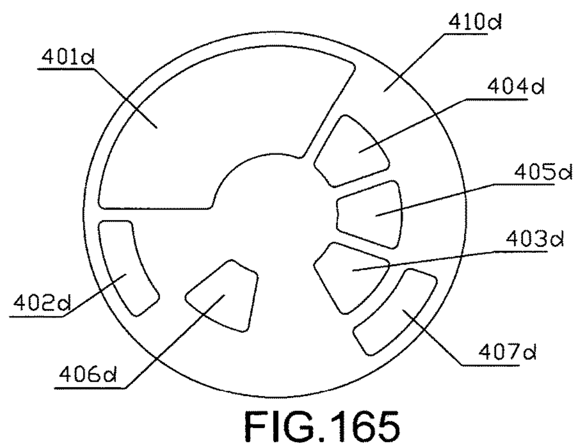

FIG. 165 is a flat structural diagram of the fixed valve disc 410*d* according to the twenty-sixth embodiment.

Figure 166:
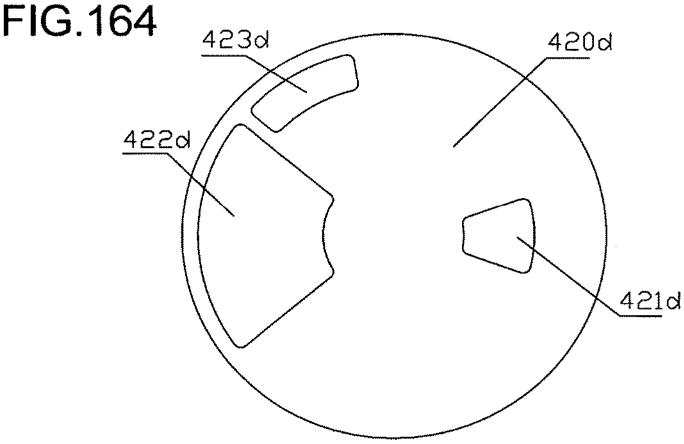

FIG. 166 is a top view of the moving valve disc 420*d* according to the twenty-sixth embodiment.

Figure 167:
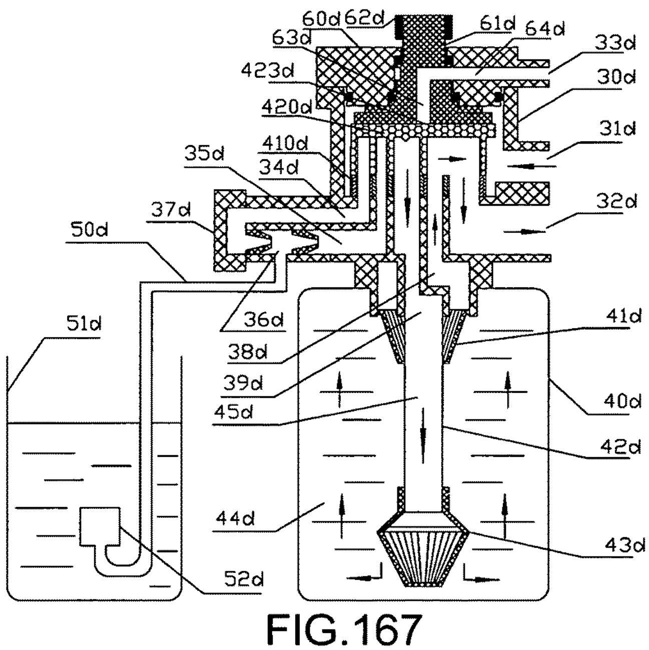

FIG. 167 is a structural diagram of the valve according to the twenty-sixth embodiment, wherein the valve is under the softening working state.

Figure 168:
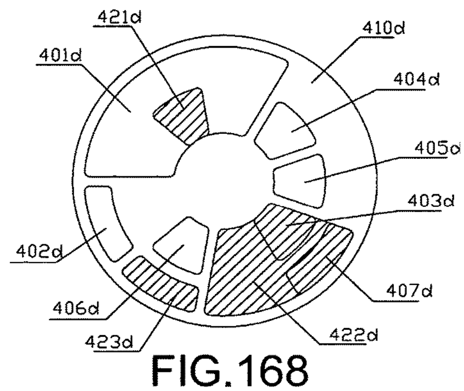

FIG. 168 is a location diagram of the moving valve disc 420*d* relative to the fixed valve disc 410*d* according to the twenty-sixth embodiment, wherein the moving valve disc 420*d* is under a softening working state.

Figure 169:
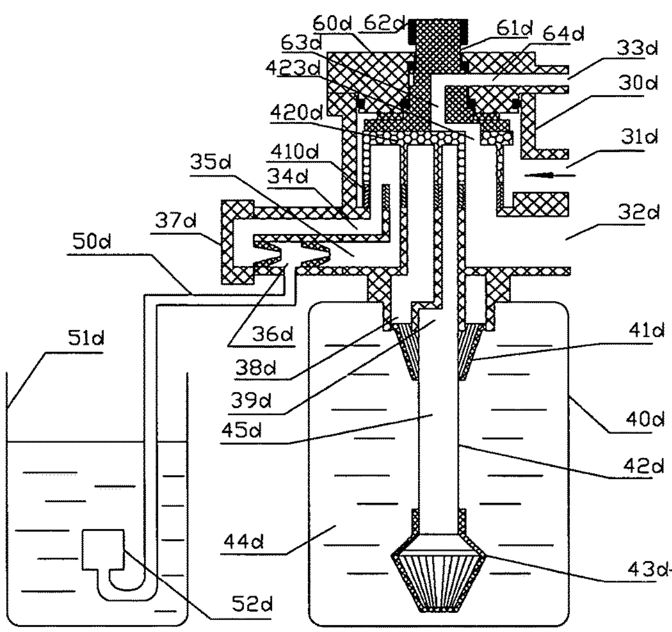

FIG. 169 is a structural diagram of the valve according to the twenty-sixth embodiment, wherein the valve is under the bed-falling working state.

Figure 170:
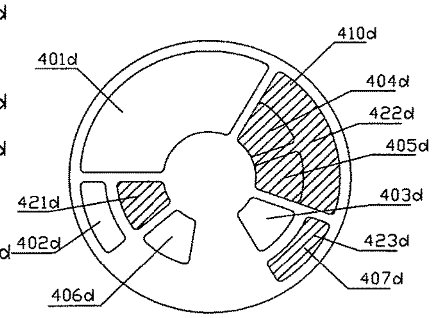

FIG. 170 is a location diagram of the moving valve disc 420*d* relative to the fixed valve disc 410*d* according to the twenty-sixth embodiment, wherein the moving valve disc 420*d* is under a bed-falling working state.

Figure 171:
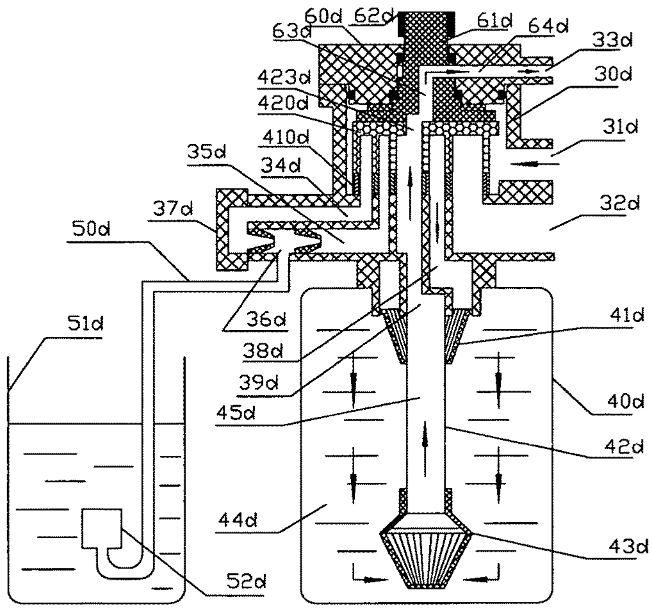

FIG. 171 is a structural diagram of the valve according to the twenty-sixth embodiment, wherein the valve is under a backwash working state.

Figure 172:
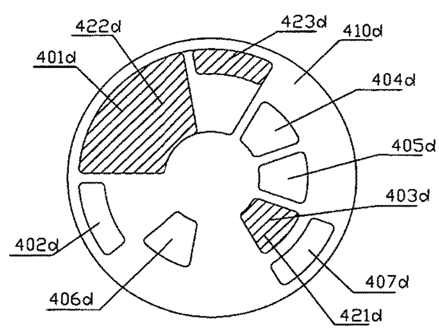

FIG. 172 is a location diagram of the moving valve disc 420*d* relative to the fixed valve disc 410*d* according to the twenty-sixth embodiment, wherein the moving valve disc 420*d* is under a backwash working state.

Figure 173:
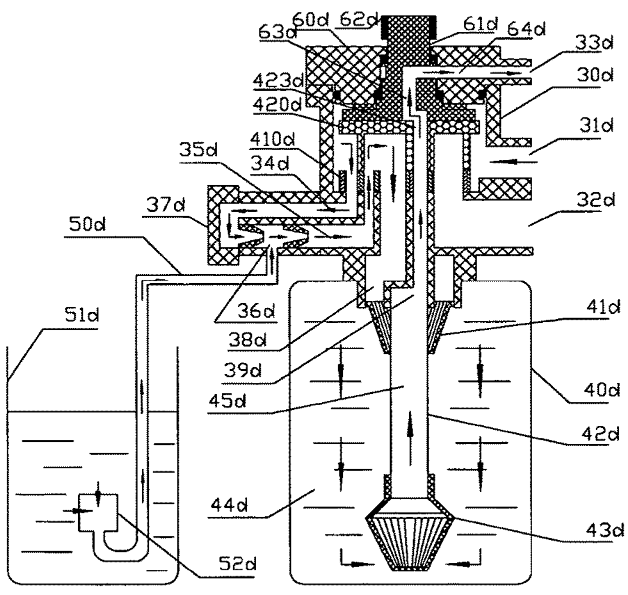

FIG. 173 is a structural diagram of the valve according to the twenty-sixth embodiment, wherein the valve is under a brine intaking upflow regeneration working state.

Figure 174:
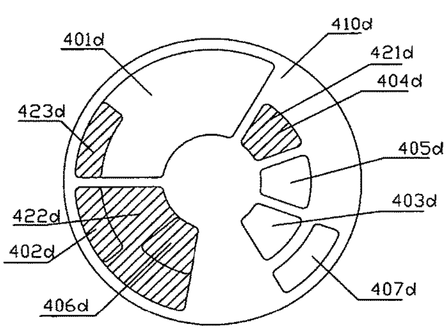

FIG. 174 is a location diagram of the moving valve disc 420*d* relative to the fixed valve disc 410*d* according to the twenty-sixth embodiment, wherein the moving valve disc 420*d* is under a brine intaking upflow regeneration working state.

FIG. 175 is a structural diagram of the valve according to the twenty-sixth embodiment, wherein the valve is under a forwardwash working state.

FIG. 176 is a location diagram of the moving valve disc 420*d* relative to the fixed valve disc 410*d* according to the twenty-sixth embodiment, wherein the moving valve disc 420*d* is under a forwardwash working state.

FIG. 177 is a structural diagram of the valve according to the twenty-sixth embodiment, wherein the valve is under a brine container softened water supplement and providing softened water working state.

Figure 178:
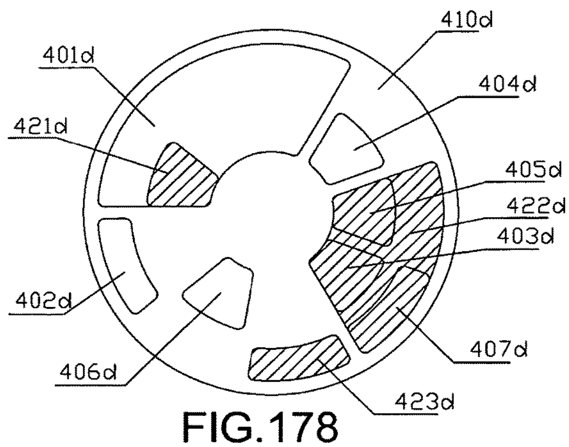

FIG. 178 is a location diagram of the moving valve disc 420*d* relative to the fixed valve disc 410*d* according to the twenty-sixth embodiment, wherein the moving valve disc 420*d* is under a brine container softened water supplement and providing softened water working state.

Figure 179:
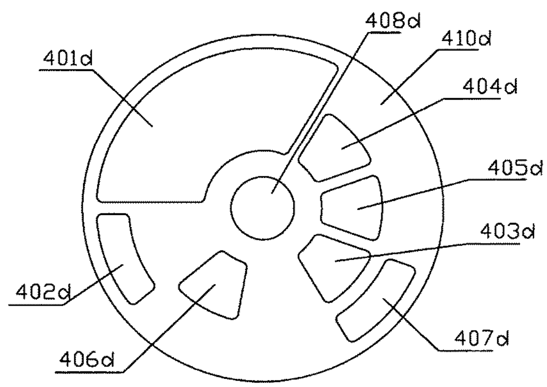

FIG. 179 is a flat structural diagram of the fixed valve disc 410*d* according to the twenty-seventh embodiment.

Figure 180:
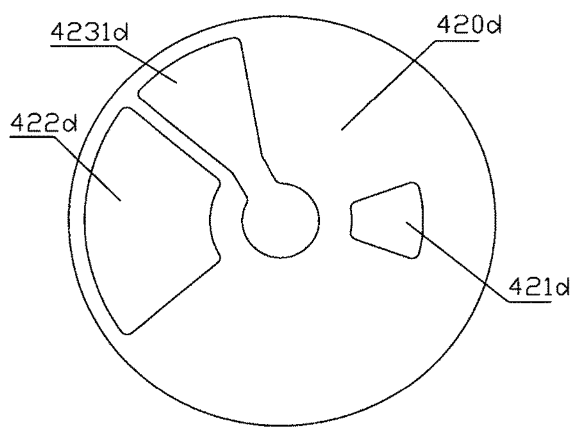

FIG. 180 is a top view of the moving valve disc 420*d* according to the twenty-seventh embodiment.

Figure 181:
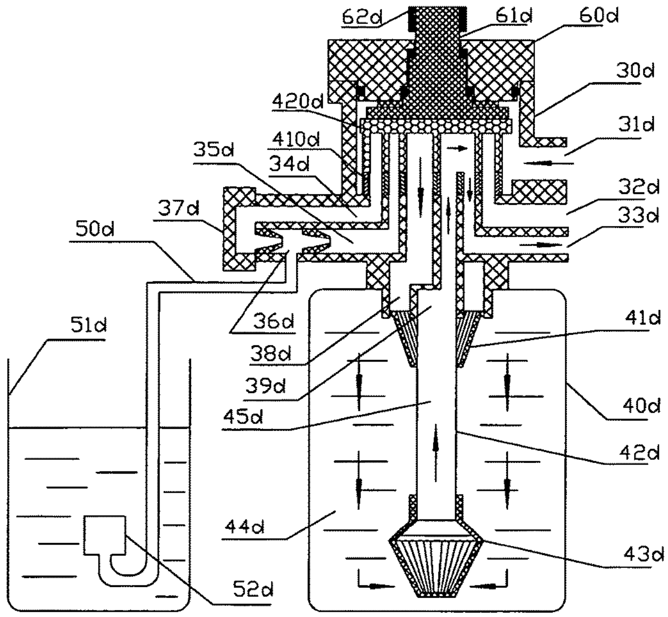

FIG. 181 is a structural diagram of the valve according to the twenty-seventh embodiment, wherein the valve is under a backwash working state.

Figure 182:
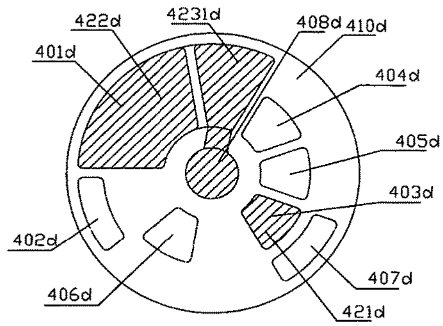

FIG. 182 is a location diagram of the moving valve disc 420*d* relative to the fixed valve disc 410*d* according to the twenty-seventh embodiment, wherein the moving valve disc 420*d* is under a backwash working state.

Figure 183:
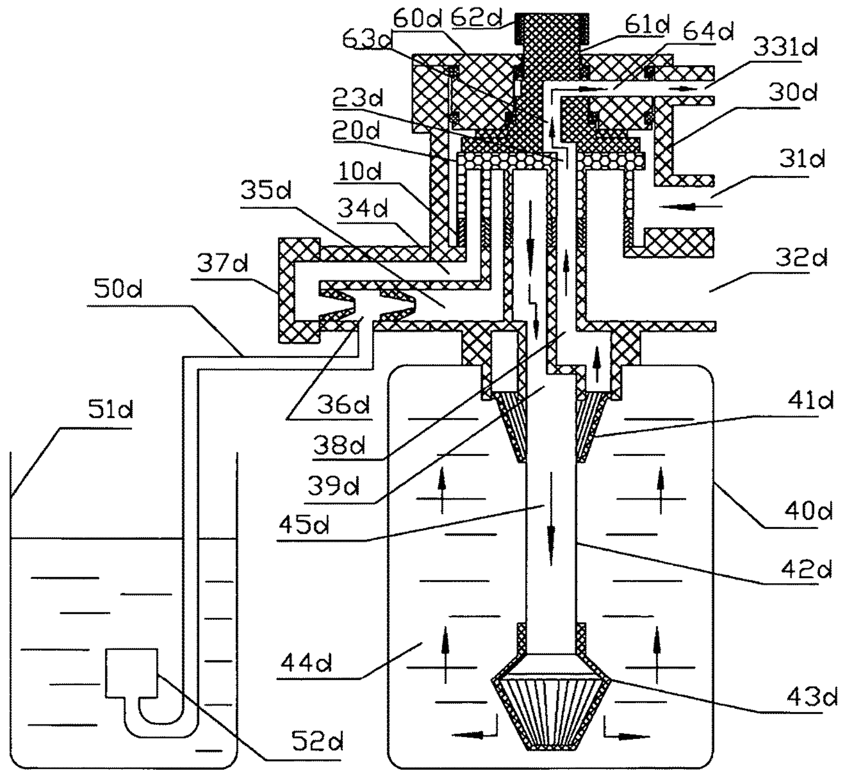

FIG. 183 is a diagram of a draining structure according to the twenty-eighth embodiment.

Figure 184:
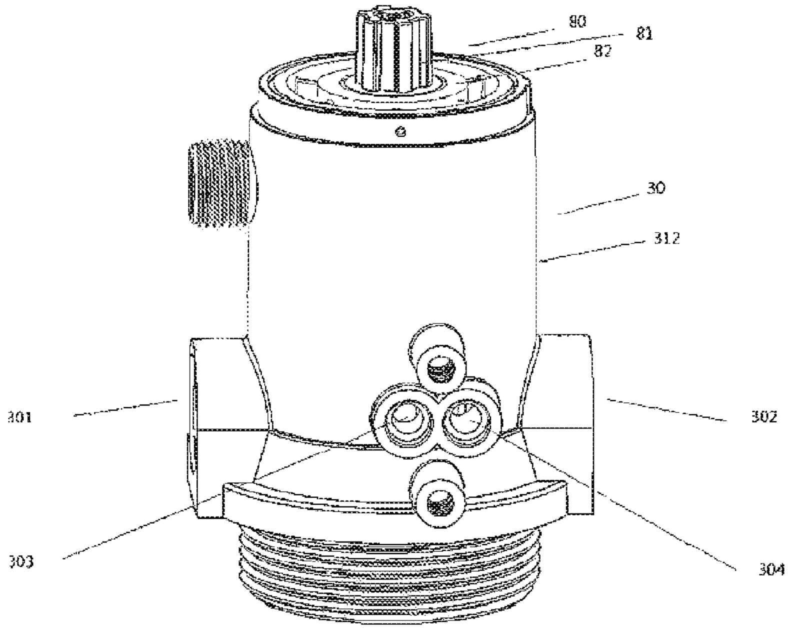

FIG. 184 is a front view of a flow control apparatus according to the twenty-ninth preferred embodiment of the present invention.

Figure 185:
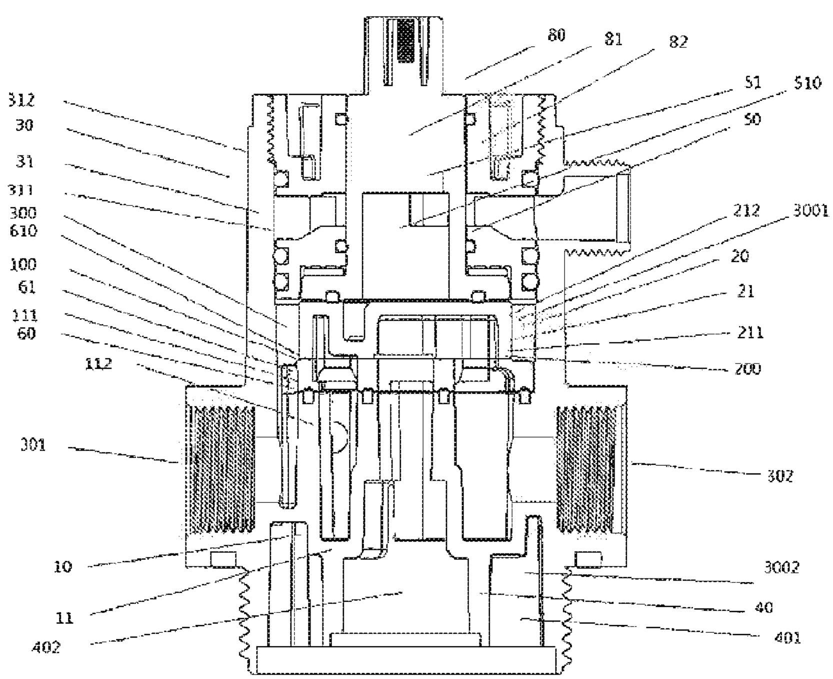

FIG. 185 is a sectional view of the flow control apparatus according to the twenty-ninth preferred embodiment of the present invention.

Figure 186A:
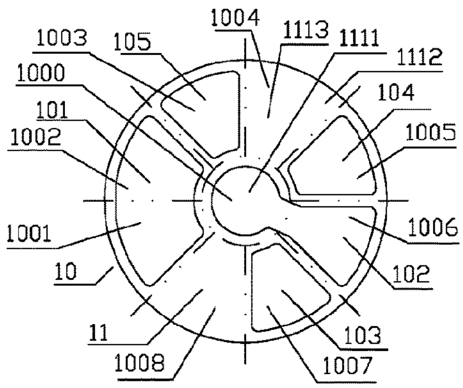

FIG. 186A is a top view of a first flow controlling element of the flow control apparatus according to the twenty-ninth preferred embodiment of the present invention, wherein the dot-dash lines shown in the FIG. 186A are used for showing the different portions of the first flow controlling side of the first flow controlling element.

Figure 186B:
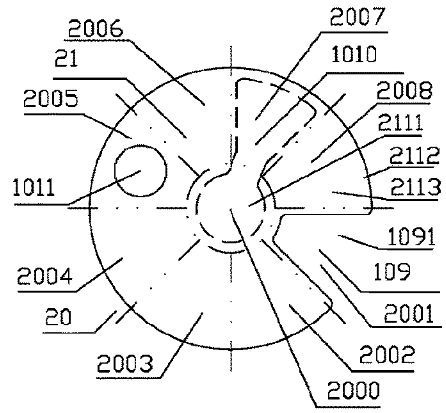

FIG. 186B is a top view of a second flow controlling element of the flow control apparatus according to the twenty-ninth preferred embodiment of the present invention, wherein the dot-dash lines shown in the FIG. 186B are used for showing the different portions of the second flow controlling side of the second flow controlling element.

Figure 186C:
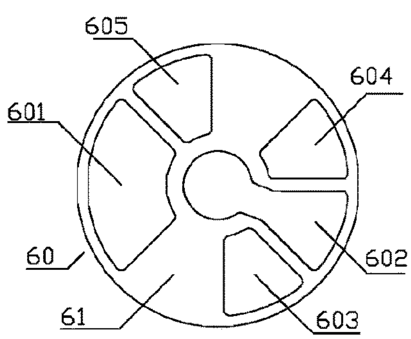

FIG. 186C is a top view of a wear resistant member of the flow control apparatus according to the twenty-ninth preferred embodiment of the present invention.

Figure 187A:
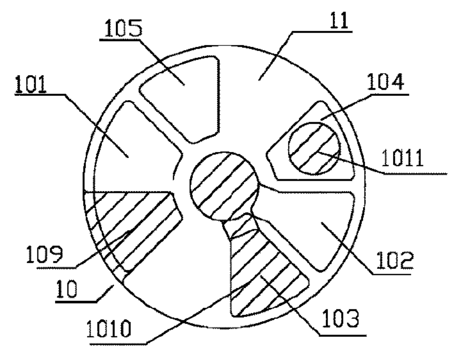

FIG. 187A is a top view of the flow control apparatus according to the twenty-ninth preferred embodiment of the present invention, showing the location of the first flow controlling element relative to the second flow controlling element when the flow control apparatus is under a first working state.

Figure 187B:
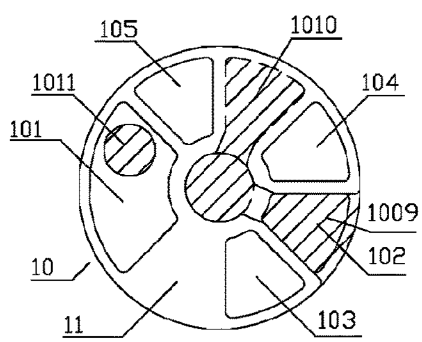

FIG. 187B is a top view of the flow control apparatus according to the twenty-ninth preferred embodiment of the present invention, showing the location of the first flow controlling element relative to the second flow controlling element when the flow control apparatus is under a second working state.

Figure 187C:
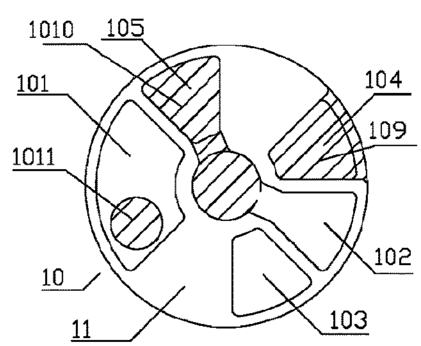

FIG. 187C is a top view of the flow control apparatus according to the twenty-ninth preferred embodiment of the present invention, showing the location of the first flow controlling element relative to the second flow controlling element when the flow control apparatus is under a third working state.

Figure 187D:
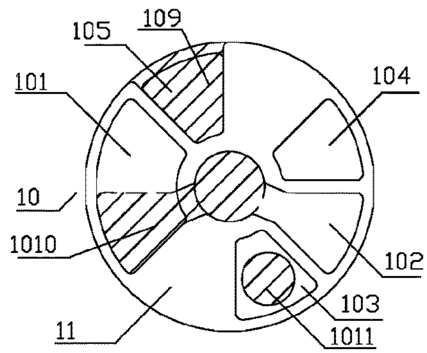

FIG. 187D is a top view of the flow control apparatus according to the twenty-ninth preferred embodiment of the present invention, showing the location of the first flow controlling element relative to the second flow controlling element when the flow control apparatus is under a fourth working state.

Figure 187E:
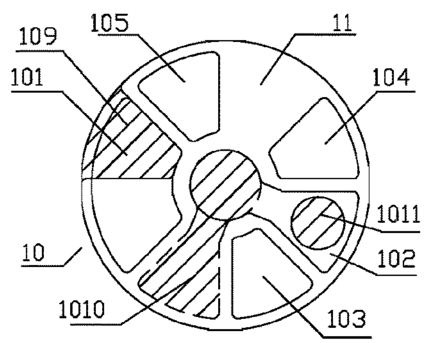

FIG. 187E is a top view of the flow control apparatus according to the twenty-ninth preferred embodiment of the present invention, showing the location of the first flow controlling element relative to the second flow controlling element when the flow control apparatus is under a fifth working state.

Figure 187F:
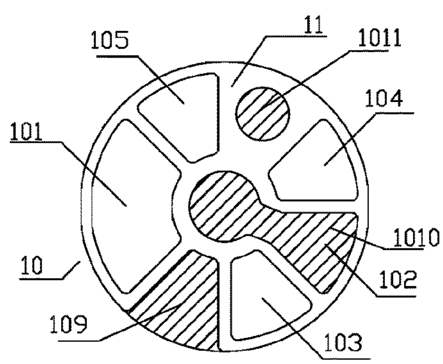

FIG. 187F is a top view of the flow control apparatus according to the twenty-ninth preferred embodiment of the present invention, showing the location of the first flow controlling element relative to the second flow controlling element when the flow control apparatus is under a pause state.

Figure 188:
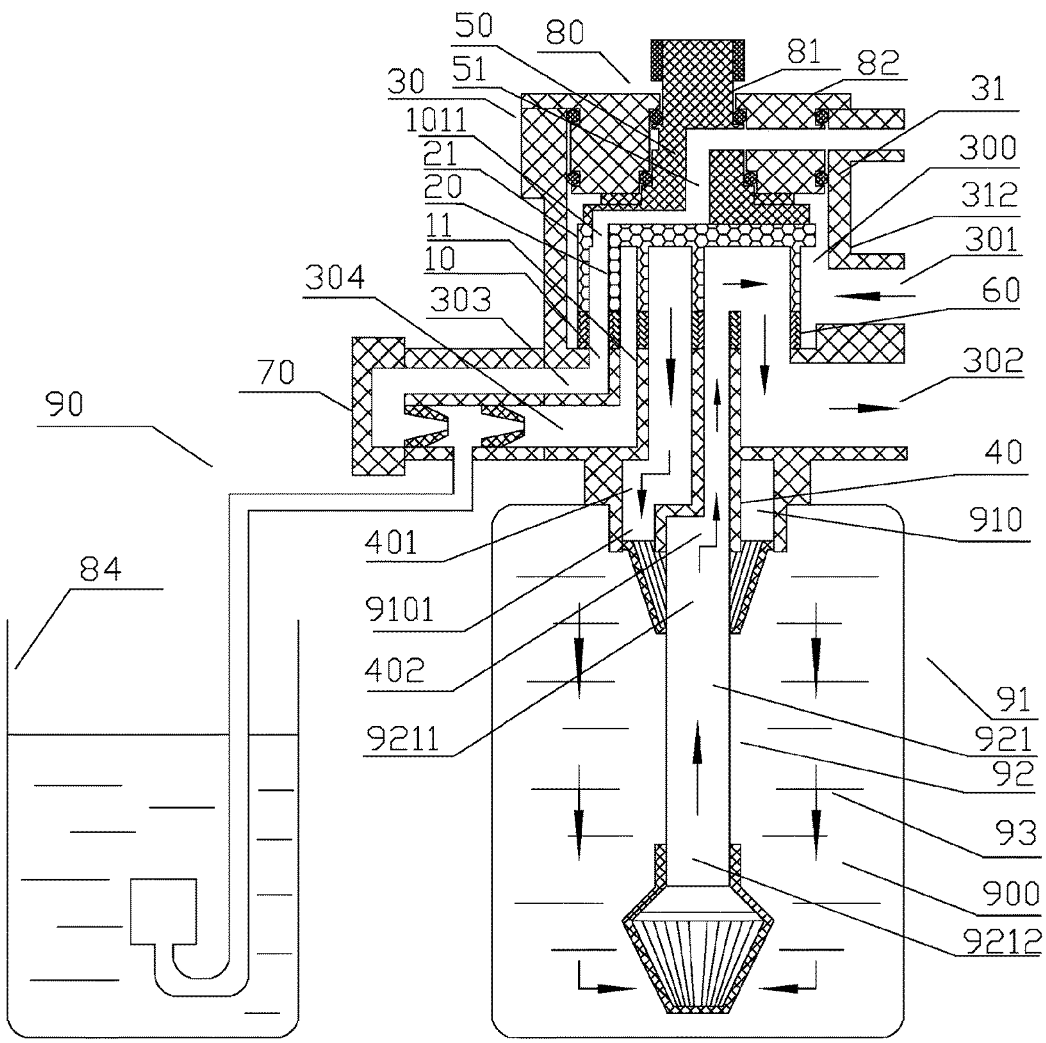

FIG. 188 is a sectional view of a water treatment apparatus employing the flow control apparatus according to the twenty-ninth preferred embodiment of the present invention, illustrating that the water treatment apparatus is able to process water when the flow control apparatus is under a first working state.

Figure 189:
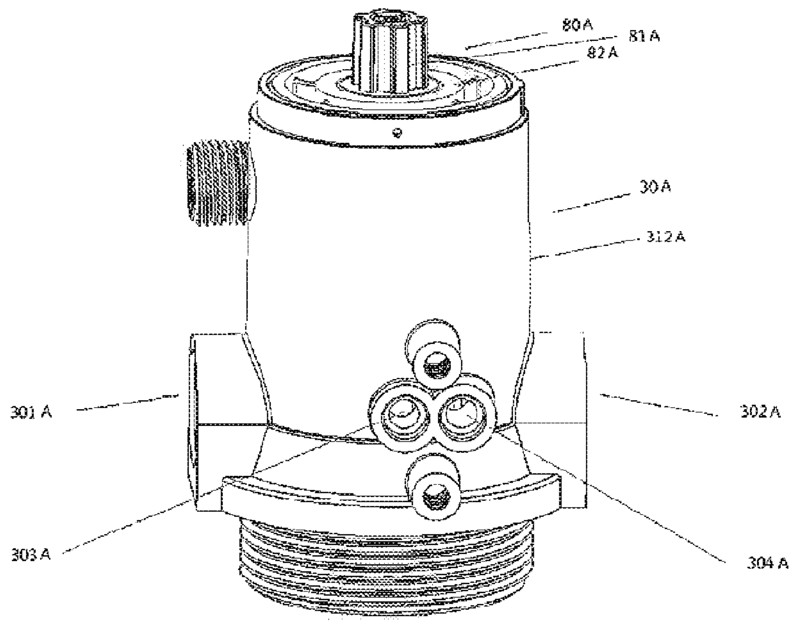

FIG. 189 is a front view of a flow control apparatus according to the thirtieth preferred embodiment of the present invention.

Figure 190:
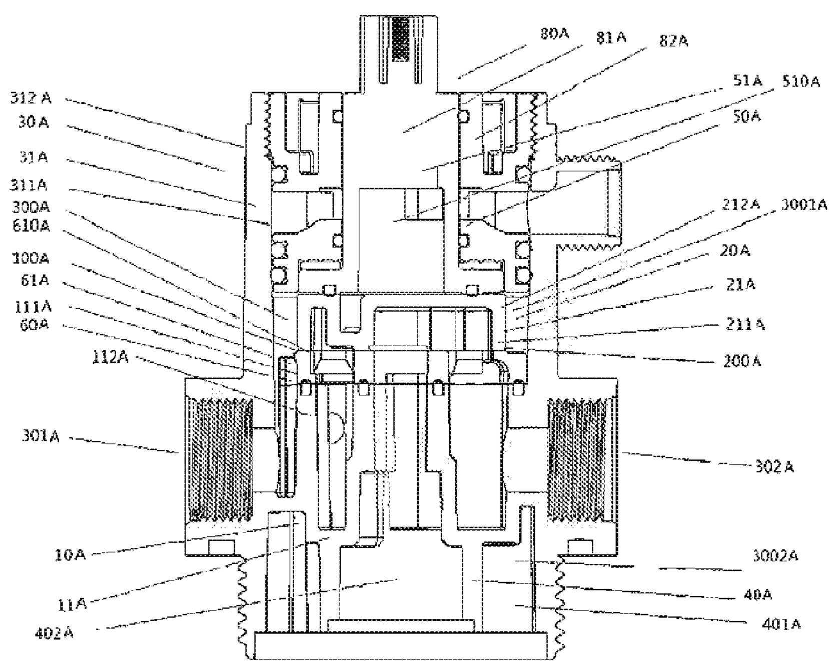

FIG. 190 is a sectional view of a flow control apparatus according to the thirtieth preferred embodiment of the present invention.

Figure 191A:
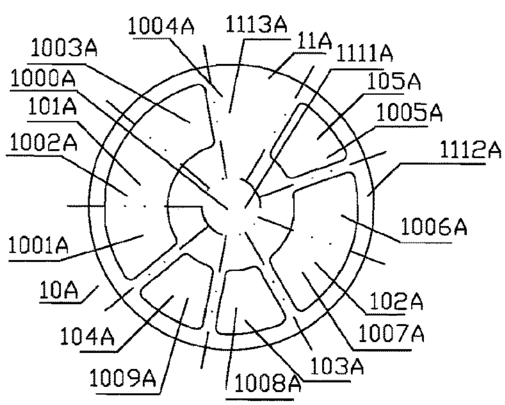

FIG. 191A is a top view of a first flow controlling element of the flow control apparatus according to the thirtieth preferred embodiment of the present invention, wherein the dot-dash lines shown in the FIG. 191A are used for showing the different portions of the first flow controlling side of the first flow controlling element.

Figure 191B:
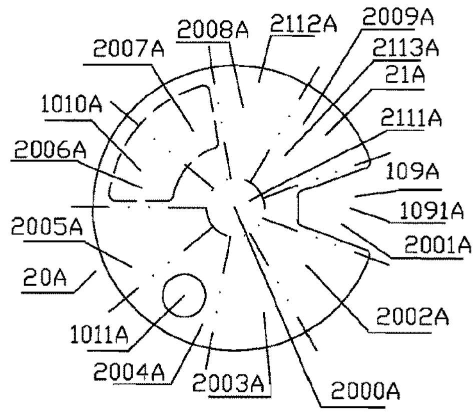

FIG. 191B is a top view of a second flow controlling element of the flow control apparatus according to the thirtieth preferred embodiment of the present invention, wherein the dot-dash lines shown in the FIG. 191B are used for showing the different portions of the second flow controlling side of the second flow controlling element.

Figure 191C:
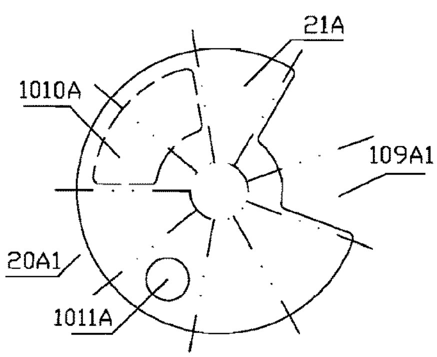

FIG. 191C is a top view of a second flow controlling element of an alternative of the flow control apparatus according to the thirtieth preferred embodiment of the present invention, wherein the dot-dash lines shown in the FIG. 191C are used for showing the different portions of the second flow controlling side of the second flow controlling element.

Figure 191D:
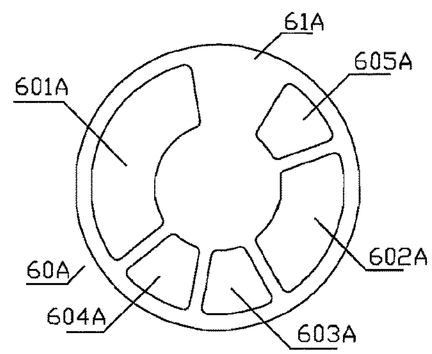

FIG. 191D is a top view of a wear resistant member of the flow control apparatus according to the thirtieth preferred embodiment of the present invention.

Figure 191E:
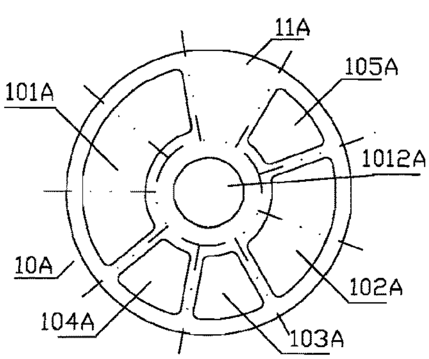

FIG. 191E is a top view of a first flow controlling element of an alternative of the flow control apparatus according to the thirtieth preferred embodiment of the present invention, wherein the dot-dash lines shown in the FIG. 191E are used for showing different portions of the first flow controlling side of the first flow controlling element.

Figure 191F:
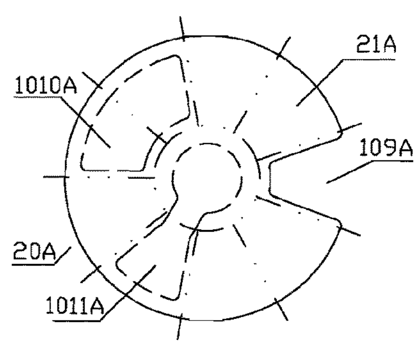

FIG. 191F is a top view of a second flow controlling element of an alternative of the flow control apparatus according to the thirtieth preferred embodiment of the present invention, wherein the dot-dash lines shown in the FIG. 191F are used for showing different portions of the second flow controlling side of the second flow controlling element.

Figure 191G:
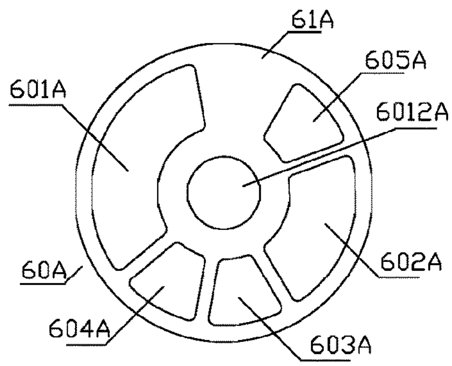

FIG. 191G is a top view of an alternative of a wear resistant member of the flow control apparatus according to the thirtieth preferred embodiment of the present invention.

Figure 192A:
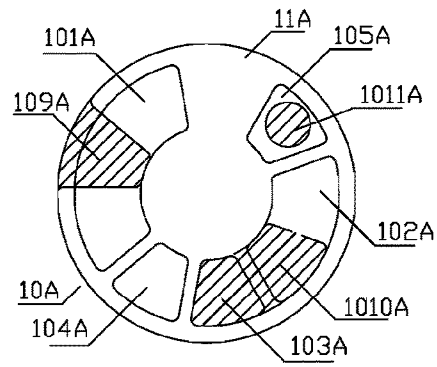

FIG. 192A is a top view of the flow control apparatus according to the thirtieth preferred embodiment of the present invention, showing the location of the first flow controlling element relative to the second flow controlling element when the flow control apparatus is under a first working state.

Figure 192B:
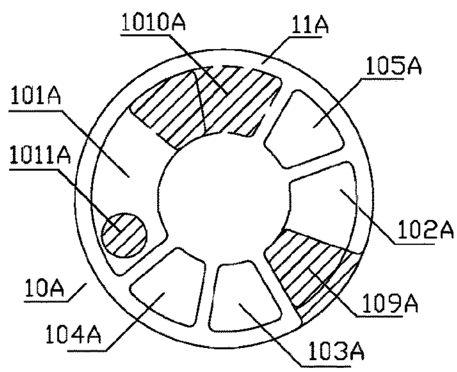

FIG. 192B is a top view of the flow control apparatus according to the thirtieth preferred embodiment of the present invention, showing the location of the first flow controlling element relative to the second flow controlling element when the flow control apparatus is under a second working state.

Figure 192C:
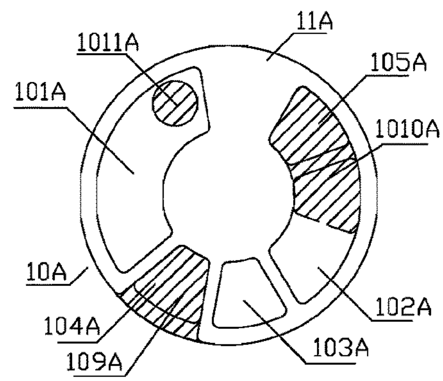

FIG. 192C is a top view of the flow control apparatus according to the thirtieth preferred embodiment of the present invention, showing the location of the first flow controlling element relative to the second flow controlling element when the flow control apparatus is under a third working state.

Figure 192D:
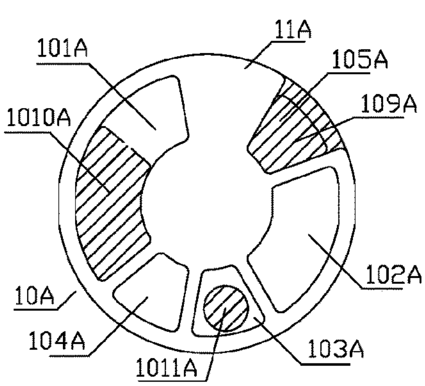

FIG. 192D is a top view of the flow control apparatus according to the thirtieth preferred embodiment of the present invention, showing the location of the first flow controlling element relative to the second flow controlling element when the flow control apparatus is under a fourth working state.

Figure 192E:
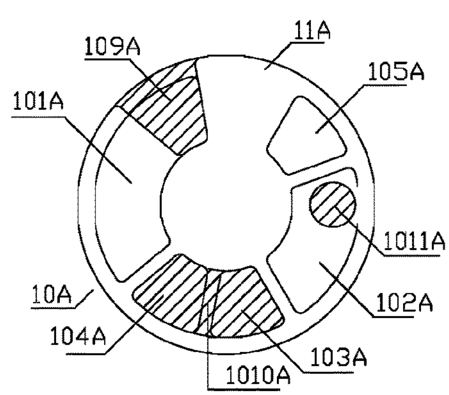

FIG. 192E is a top view of the flow control apparatus according to the thirtieth preferred embodiment of the present invention, showing the location of the first flow controlling element relative to the second flow controlling element when the flow control apparatus is under a fifth working state.

Figure 192F:
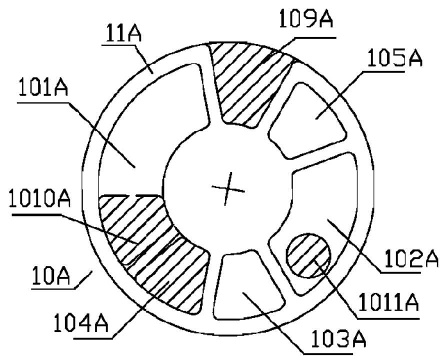

FIG. 192F is a top view of the flow control apparatus according to the thirtieth preferred embodiment of the present invention, showing the location of the first flow controlling element relative to the second flow controlling element when the flow control apparatus is under a pause state.

Figure 192G:
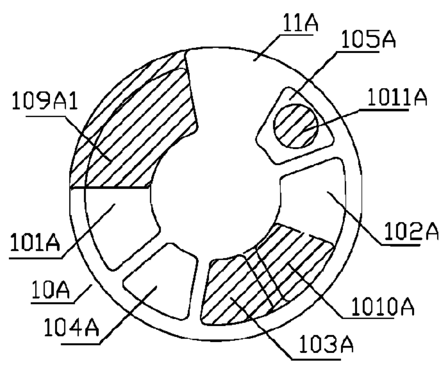

FIG. 192G is a top view of an alternative of the flow control apparatus according to the thirtieth preferred embodiment of the present invention, showing the location of the first flow controlling element relative to the second flow controlling element when the flow control apparatus is under a first working state.

Figure 192H:
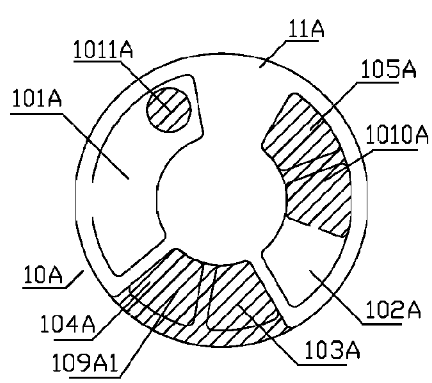

FIG. 192H is a top view of an alternative of the flow control apparatus according to the thirtieth preferred embodiment of the present invention, showing the location of the first flow controlling element relative to the second flow controlling element when the flow control apparatus is under a third working state.

Figure 193:
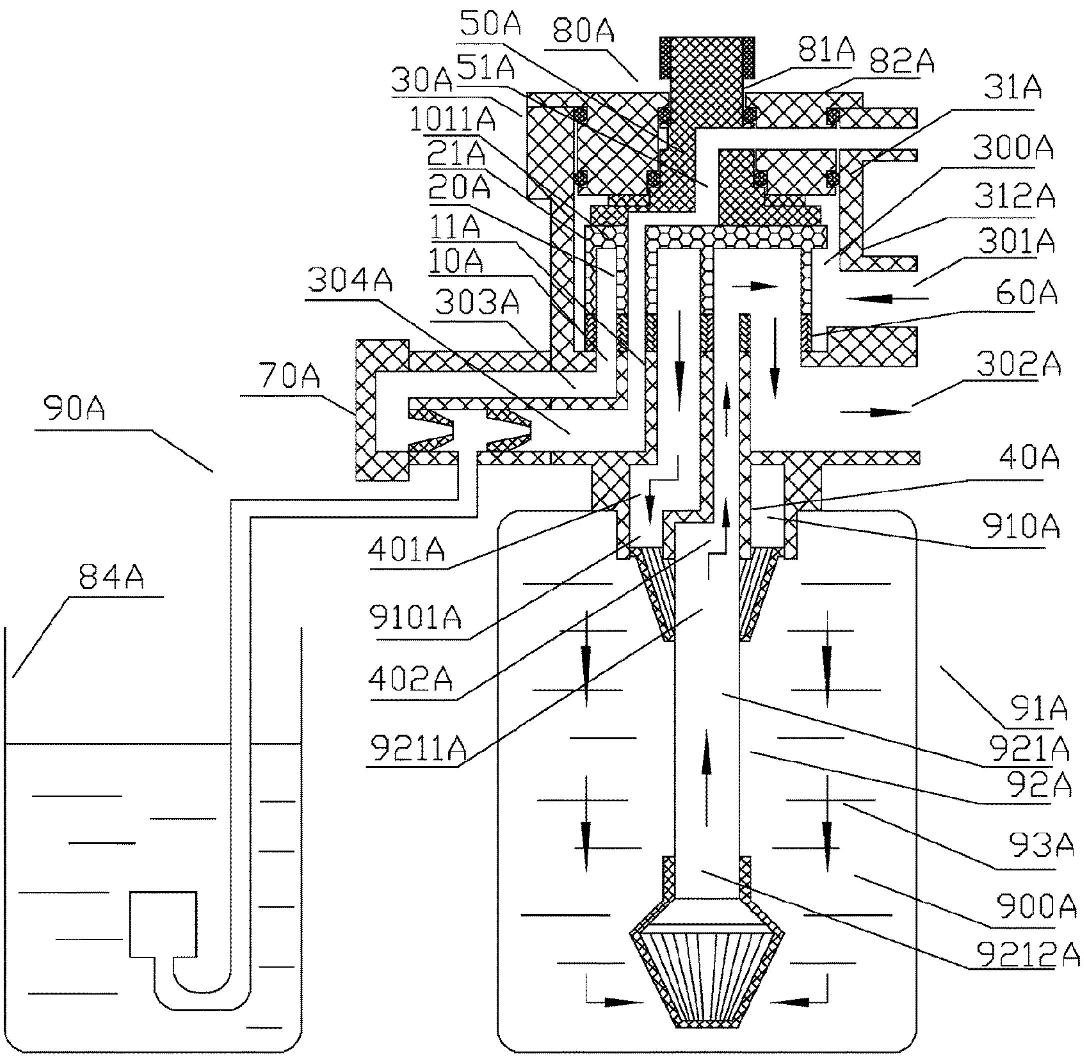

FIG. 193 is a sectional view of a water treatment apparatus employing the flow control apparatus according to the thirtieth preferred embodiment of the present invention, illustrating that the water treatment apparatus is able to process water when the flow control apparatus is under a first working state.

Figure 194:
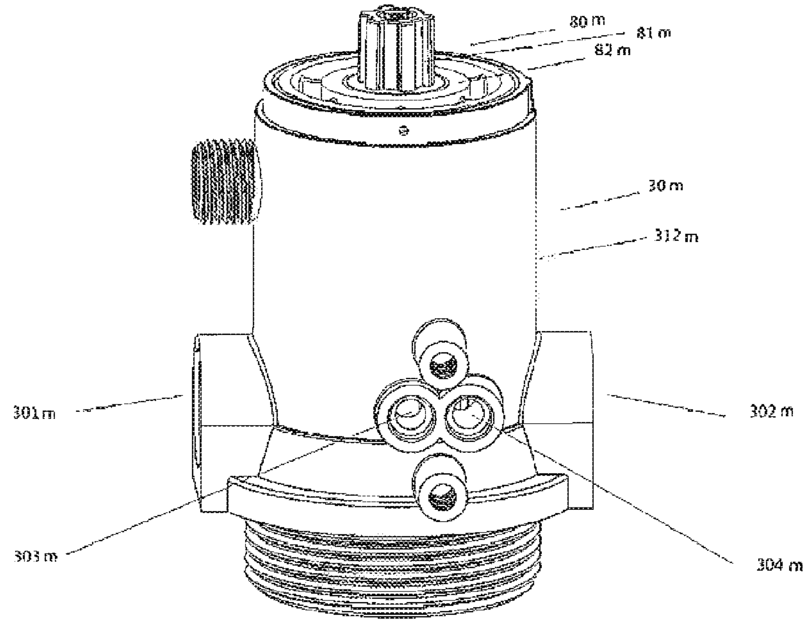

FIG. 194 is a front view of a flow control apparatus according to the thirty-first preferred embodiment of the present invention.

Figure 195:
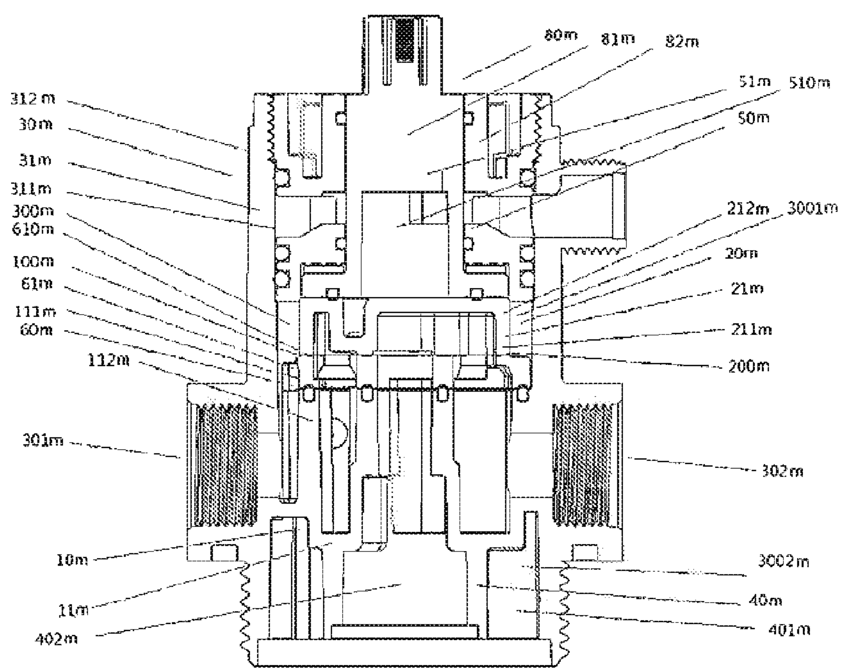

FIG. 195 is a sectional view of a flow control apparatus according to the thirty-first preferred embodiment of the present invention.

Figure 196A:
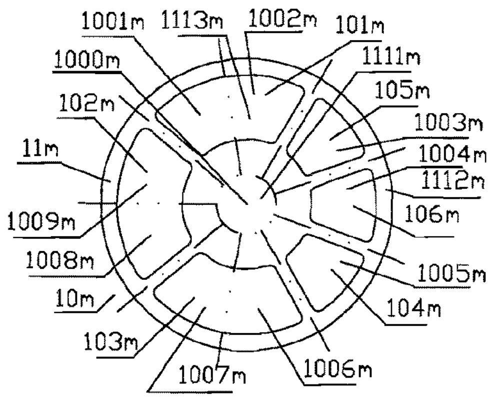

FIG. 196A is a top view of a first flow controlling element of the flow control apparatus according to the thirty-first preferred embodiment of the present invention, wherein the dot-dash lines shown in the FIG. 196A are used for showing the different portions of the first flow controlling side of the first flow controlling element.

Figure 196B:
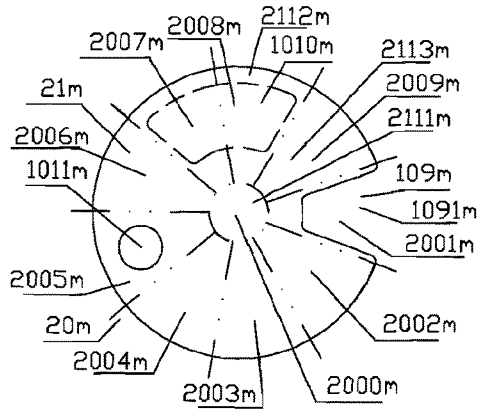

FIG. 196B is a top view of a second flow controlling element of the flow control apparatus according to the thirty-first preferred embodiment of the present invention, wherein the dot-dash lines shown in the FIG. 196B are used for showing the different portions of the second flow controlling side of the second flow controlling element.

Figure 196C:
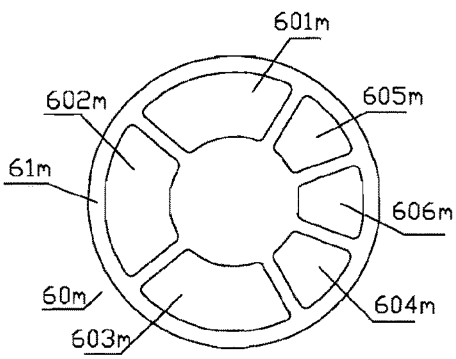

FIG. 196C is a top view of a wear resistant member of the flow control apparatus according to the thirty-first preferred embodiment of the present invention.

Figure 196D:
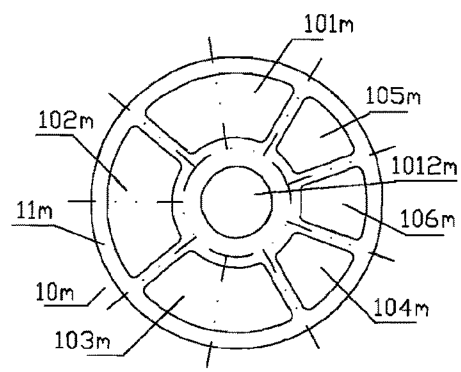

FIG. 196D is a top view of a first flow controlling element of an alternative of the flow control apparatus according to the thirty-first preferred embodiment of the present invention, wherein the dot-dash lines shown in the FIG. 196D are used for showing different portions of the first flow controlling side of the first flow controlling element.

Figure 196E:
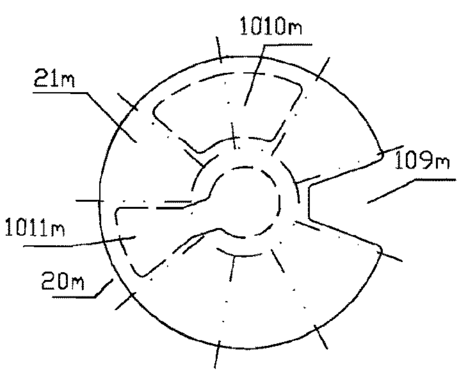

FIG. 196E is a top view of a second flow controlling element of an alternative of the flow control apparatus according to the thirty-first preferred embodiment of the present invention, wherein the dot-dash lines shown in the FIG. 196E are used for showing different portions of the second flow controlling side of the second flow controlling element.

Figure 196F:
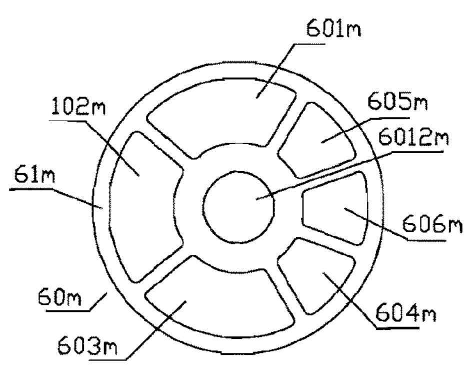

FIG. 196F is a top view of an alternative of a wear resistant member of the flow control apparatus according to the thirty-first preferred embodiment of the present invention.

Figure 197A:
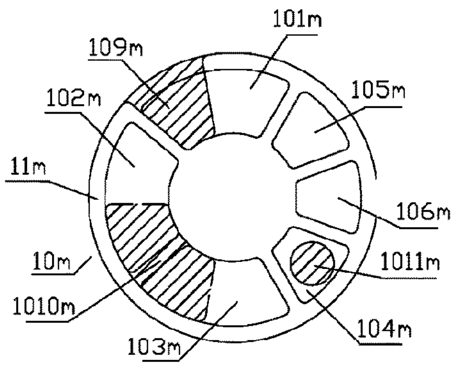

FIG. 197A is a top view of the flow control apparatus according to the thirty-first preferred embodiment of the present invention, showing the location of the first flow controlling element relative to the second flow controlling element when the flow control apparatus is under a first working state.

Figure 197B:
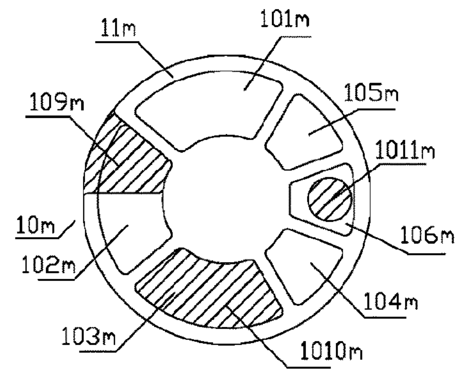

FIG. 197B is a top view of the flow control apparatus according to the thirty-first preferred embodiment of the present invention, showing the location of the first flow controlling element relative to the second flow controlling element when the flow control apparatus is under a second working state.

Figure 197C:
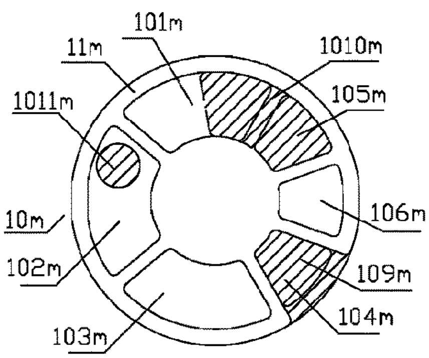

FIG. 197C is a top view of the flow control apparatus according to the thirty-first preferred embodiment of the present invention, showing the location of the first flow controlling element relative to the second flow controlling element when the flow control apparatus is under a third working state.

Figure 197D:
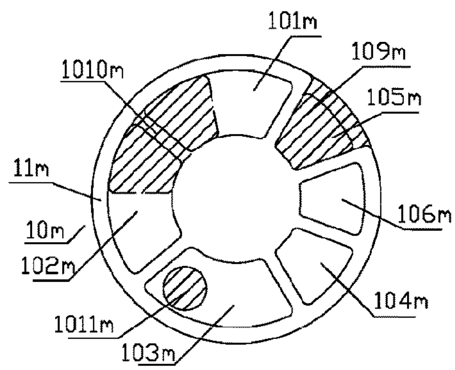

FIG. 197D is a top view of the flow control apparatus according to the thirty-first preferred embodiment of the present invention, showing the location of the first flow controlling element relative to the second flow controlling element when the flow control apparatus is under a fourth working state.

Figure 197E:
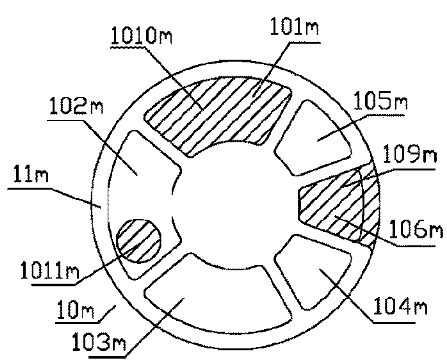

FIG. 197E is a top view of the flow control apparatus according to the thirty-first preferred embodiment of the present invention, showing the location of the first flow controlling element relative to the second flow controlling element when the flow control apparatus is under a fifth working state.

Figure 198:
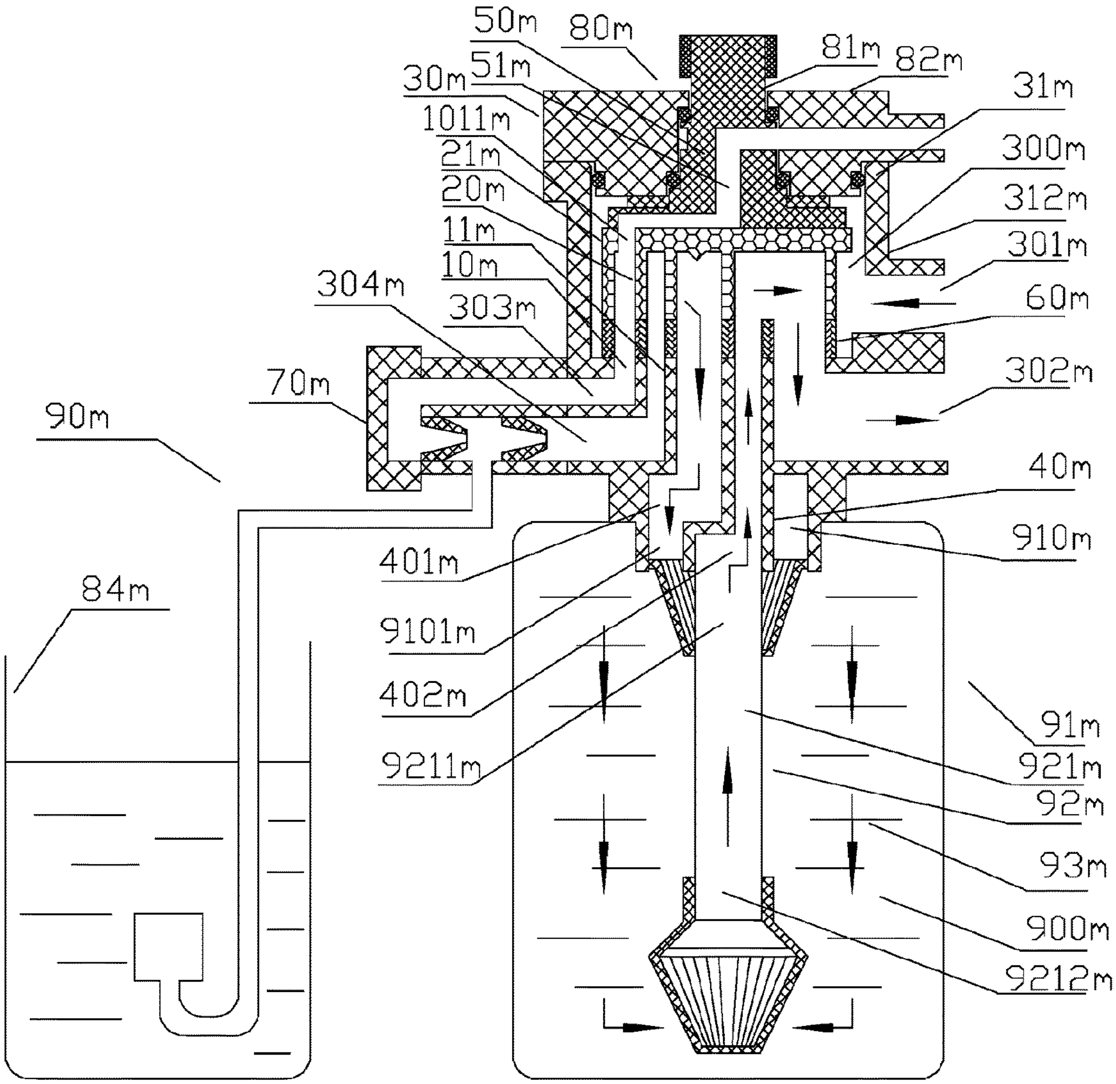

FIG. 198 is a sectional view of a water treatment apparatus employing the flow control apparatus according to the thirty-first preferred embodiment of the present invention, illustrating that the water treatment apparatus is able to process water when the flow control apparatus is under a first working state.

Figure 199:
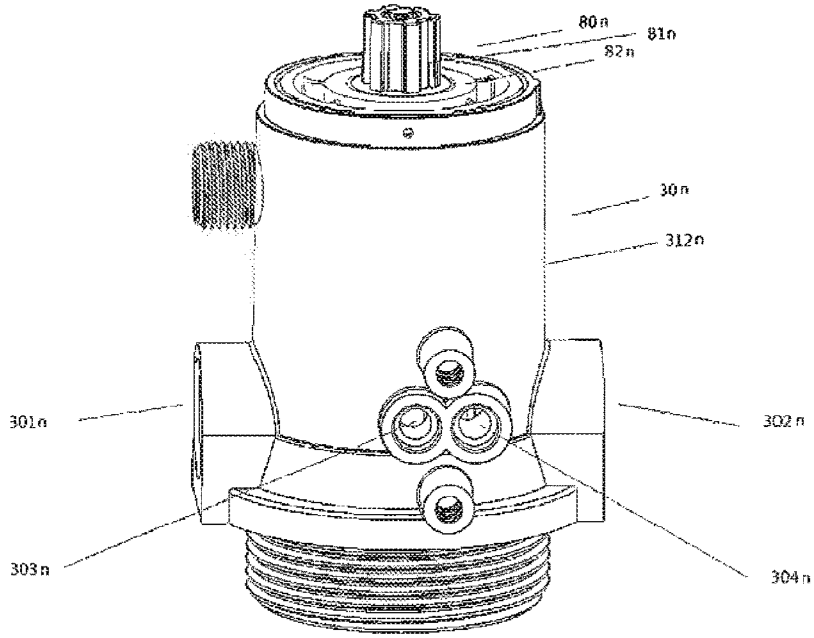

FIG. 199 is a front view of a flow control apparatus according to the thirty-second preferred embodiment of the present invention.

Figure 200:
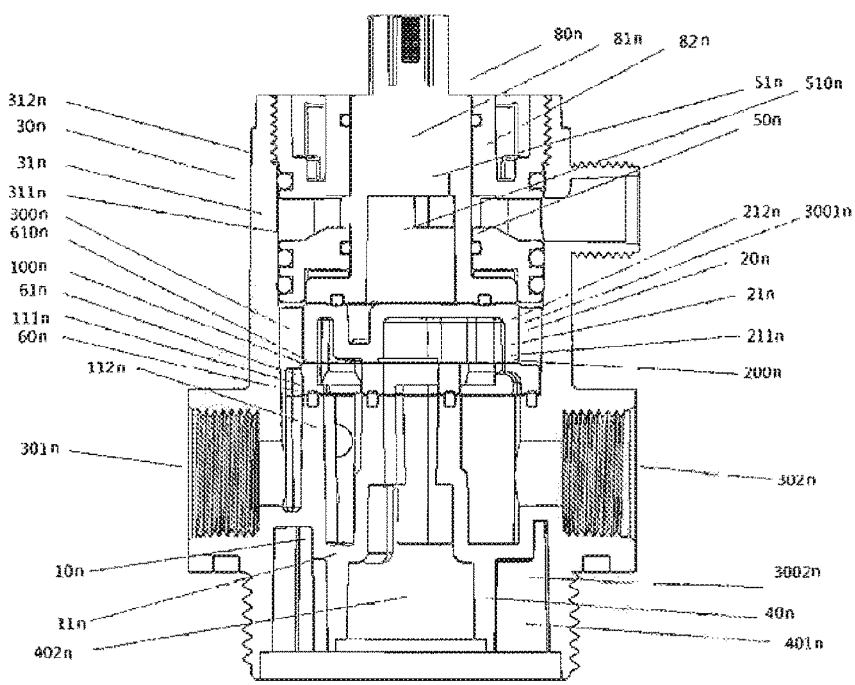

FIG. 200 is a sectional view of a flow control apparatus according to the thirty-second preferred embodiment of the present invention.

Figure 201A:
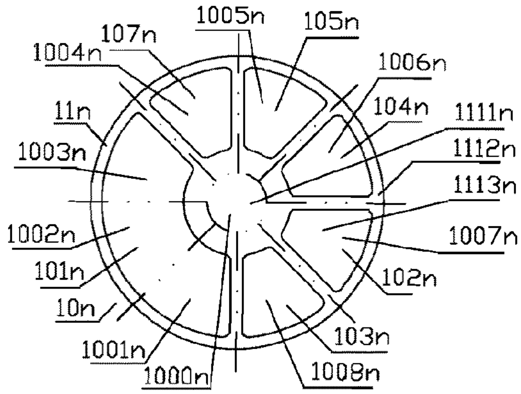

FIG. 201A is a top view of a first flow controlling element of the flow control apparatus according to the thirty-second preferred embodiment of the present invention, wherein the dot-dash lines shown in the FIG. 201A are used for showing the different portions of the first flow controlling side of the first flow controlling element.

Figure 201B:
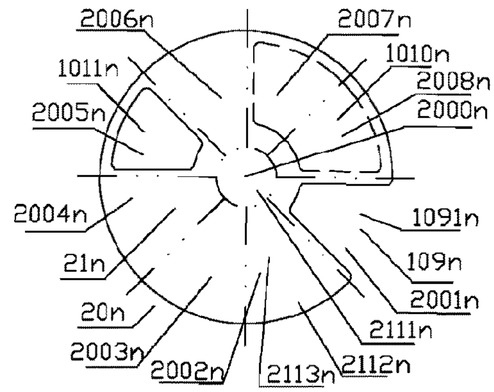

FIG. 201B is a top view of a second flow controlling element of the flow control apparatus according to the thirty-second preferred embodiment of the present invention, wherein the dot-dash lines shown in the FIG. 201B are used for showing the different portions of the second flow controlling side of the second flow controlling element.

Figure 201C:
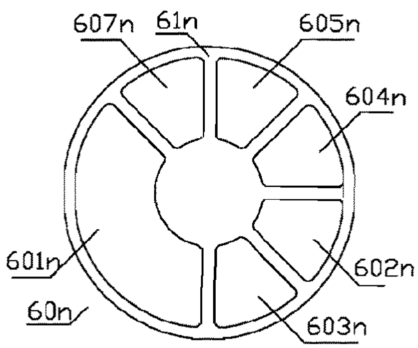

FIG. 201C is a top view of a wear resistant member of the flow control apparatus according to the thirty-second preferred embodiment of the present invention.

Figure 201D:
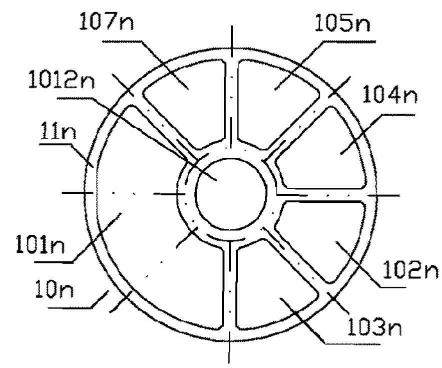

FIG. 201D is a top view of a first flow controlling element of an alternative of the flow control apparatus according to the thirty-second preferred embodiment of the present invention, wherein the dot-dash lines shown in the FIG. 201D are used for showing different portions of the first flow controlling side of the first flow controlling element.

Figure 201E:
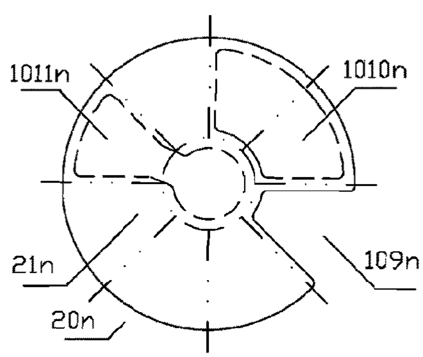

FIG. 201E is a top view of a second flow controlling element of an alternative of the flow control apparatus according to the thirty-second preferred embodiment of the present invention, wherein the dot-dash lines shown in the FIG. 201E are used for showing different portions of the second flow controlling side of the second flow controlling element.

Figure 201F:
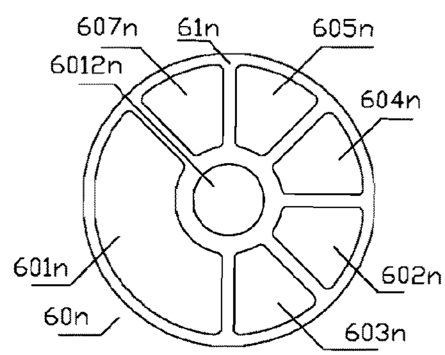

FIG. 201F is a top view of an alternative of a wear resistant member of the flow control apparatus according to the thirty-second preferred embodiment of the present invention.

Figure 202A:
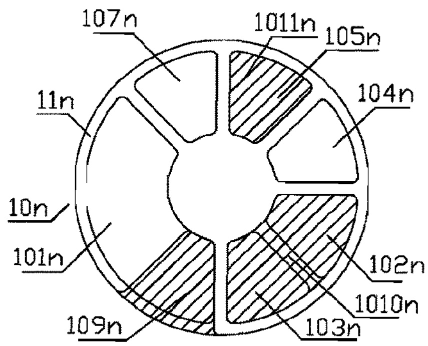

FIG. 202A is a top view of the flow control apparatus according to the thirty-second preferred embodiment of the present invention, showing the location of the first flow controlling element relative to the second flow controlling element when the flow control apparatus is under a first working state.

Figure 202B:
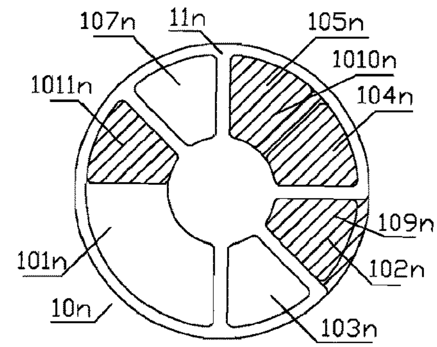

FIG. 202B is a top view of the flow control apparatus according to the thirty-second preferred embodiment of the present invention, showing the location of the first flow controlling element relative to the second flow controlling element when the flow control apparatus is under a second working state.

Figure 202C:
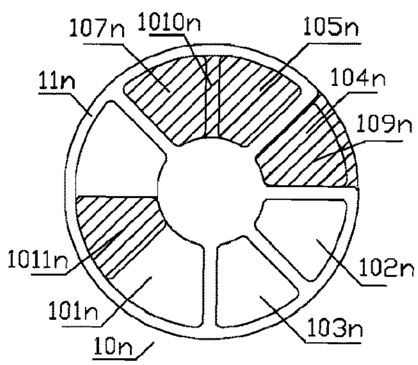

FIG. 202C is a top view of the flow control apparatus according to the thirty-second preferred embodiment of the present invention, showing the location of the first flow controlling element relative to the second flow controlling element when the flow control apparatus is under a third working state.

Figure 202D:
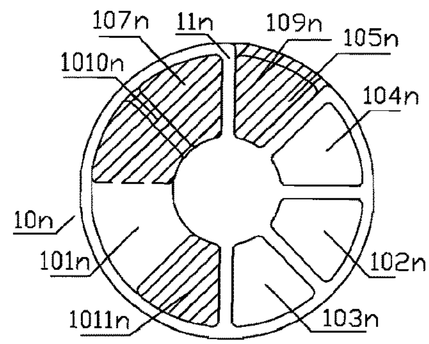

FIG. 202D is a top view of the flow control apparatus according to the thirty-second preferred embodiment of the present invention, showing the location of the first flow controlling element relative to the second flow controlling element when the flow control apparatus is under a fourth working state.

Figure 202E:
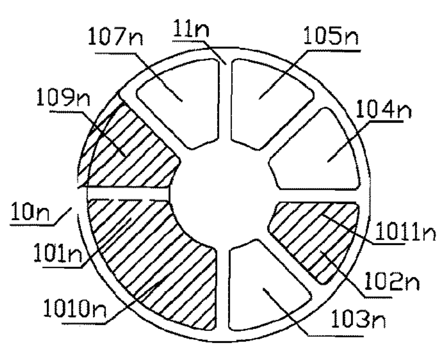

FIG. 202E is a top view of the flow control apparatus according to the thirty-second preferred embodiment of the present invention, showing the location of the first flow controlling element relative to the second flow controlling element when the flow control apparatus is under a fifth working state.

Figure 203:
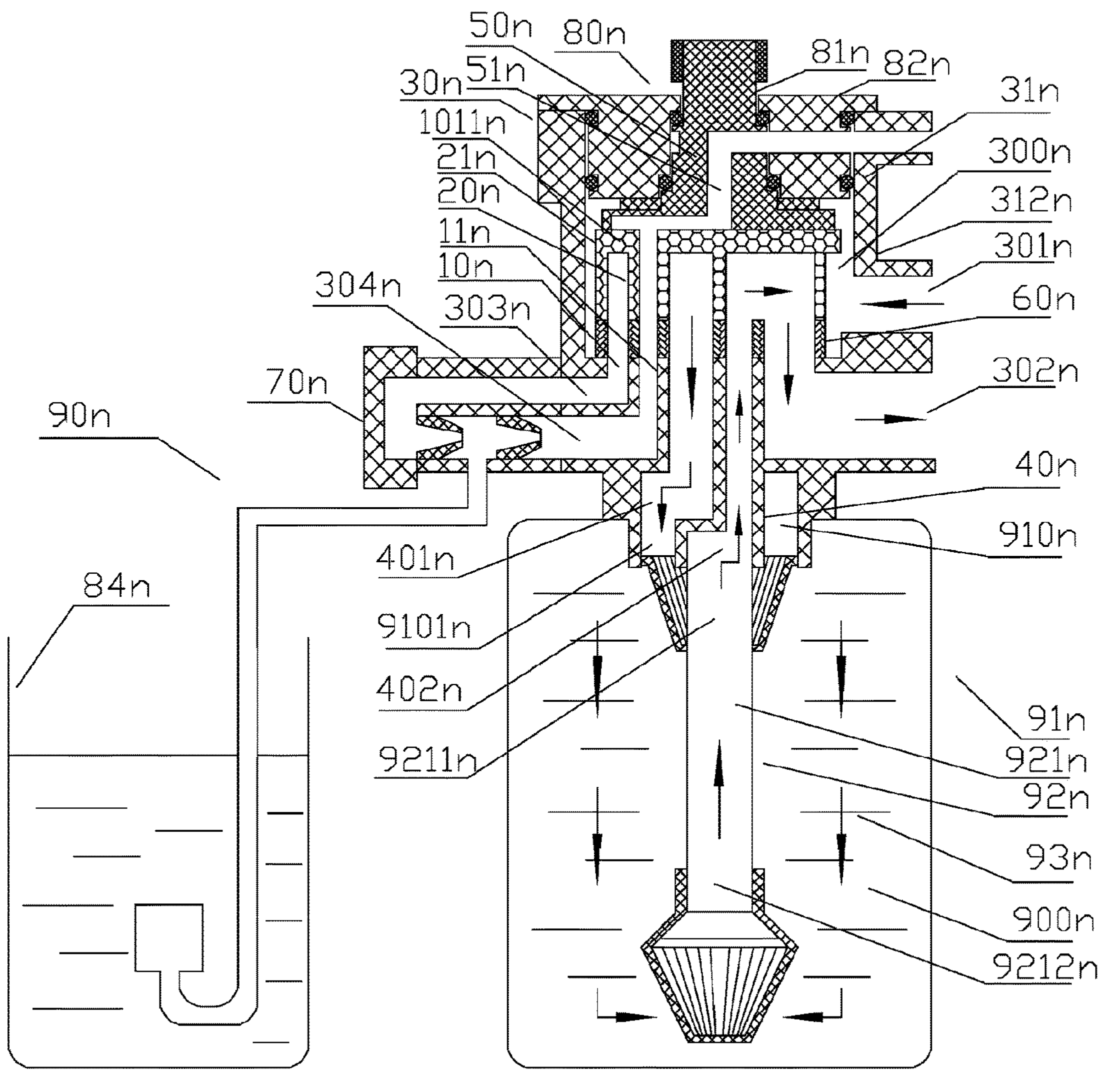

FIG. 203 is a sectional view of a water treatment apparatus employing the flow control apparatus according to the thirty-second preferred embodiment of the present invention, illustrating that the water treatment apparatus is able to process water when the flow control apparatus is under a first working state.

Figure 204:
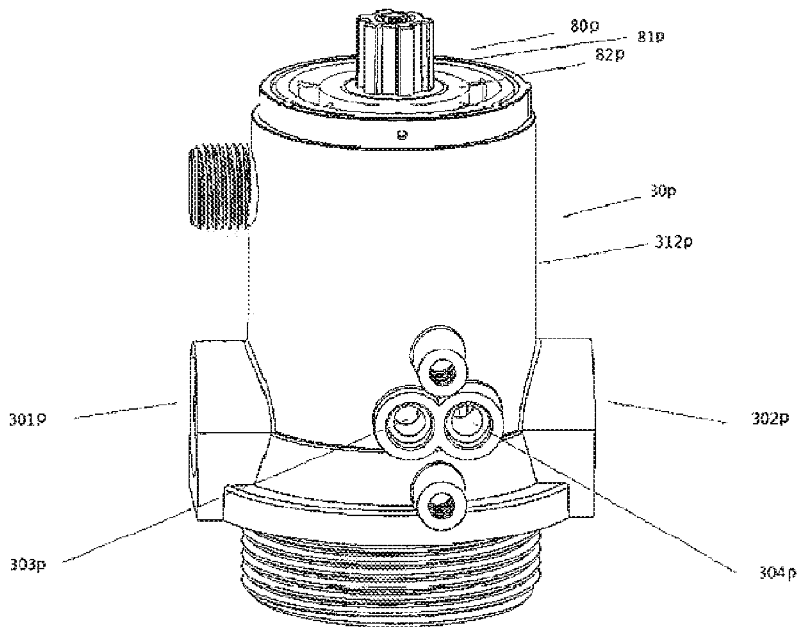

FIG. 204 is a front view of a flow control apparatus according to the thirty-third preferred embodiment of the present invention.

Figure 205:
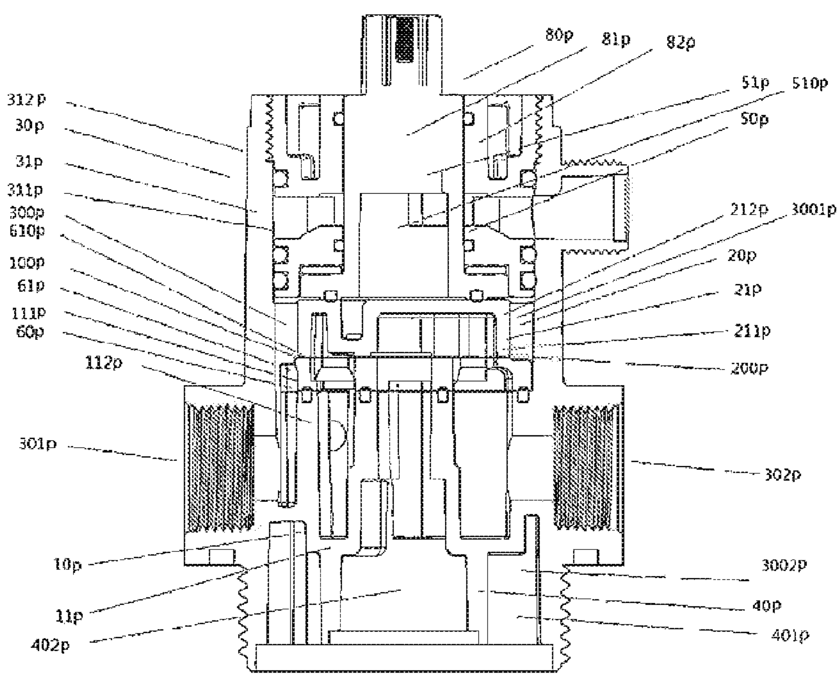

FIG. 205 is a sectional view of a flow control apparatus according to the thirty-third preferred embodiment of the present invention.

Figure 206A:
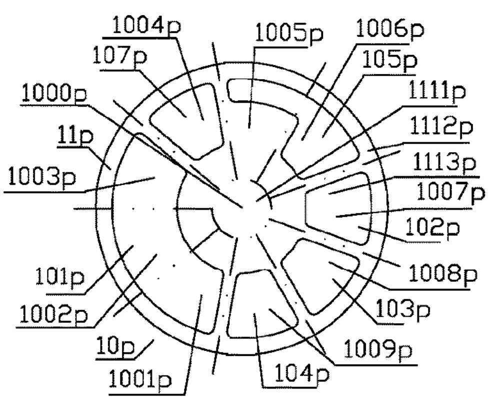

FIG. 206A is a top view of a first flow controlling element of the flow control apparatus according to the thirty-third preferred embodiment of the present invention, wherein the dot-dash lines shown in the FIG. 206A are used for showing different portions of the first flow controlling side of the first flow controlling element.

Figure 206B:
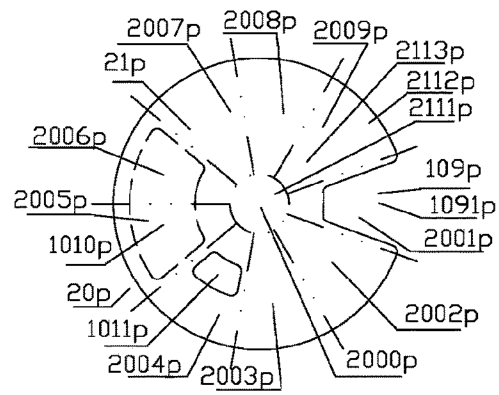

FIG. 206B is a top view of a second flow controlling element of the flow control apparatus according to the thirty-third preferred embodiment of the present invention, wherein the dot-dash lines shown in the FIG. 206B are used for showing the different portions of the second flow controlling side of the second flow controlling element.

Figure 206C:
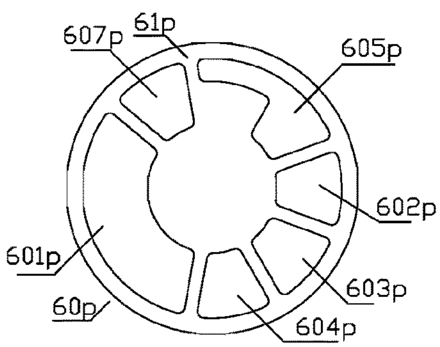

FIG. 206C is a top view of a wear resistant member of the flow control apparatus according to the thirty-third preferred embodiment of the present invention.

Figure 206D:
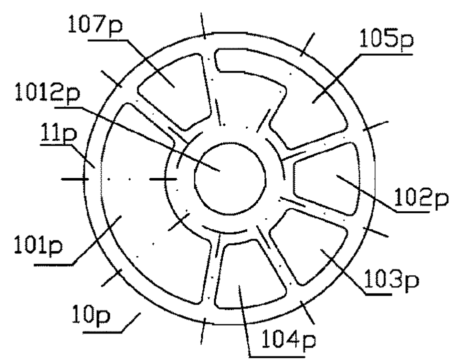

FIG. 206D is a top view of a first flow controlling element of an alternative of the flow control apparatus according to the thirty-third preferred embodiment of the present invention, wherein the dot-dash lines shown in the FIG. 206D are used for showing different portions of the first flow controlling side of the first flow controlling element.

Figure 206E:
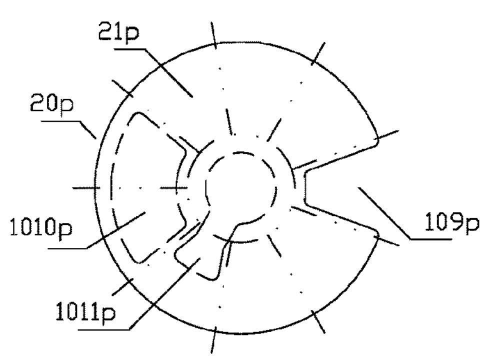

FIG. 206E is a top view of a second flow controlling element of an alternative of the flow control apparatus according to the thirty-third preferred embodiment of the present invention, wherein the dot-dash lines shown in the FIG. 206E are used for showing different portions of the second flow controlling side of the second flow controlling element.

Figure 206F:
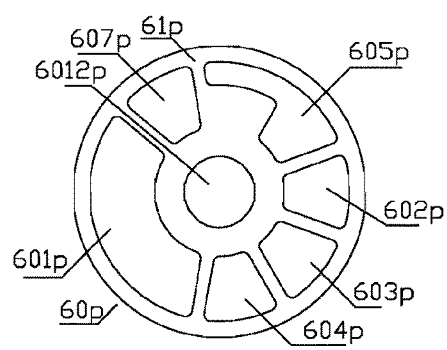

FIG. 206F is a top view of an alternative of a wear resistant member of the flow control apparatus according to the thirty-third preferred embodiment of the present invention.

Figure 207A:
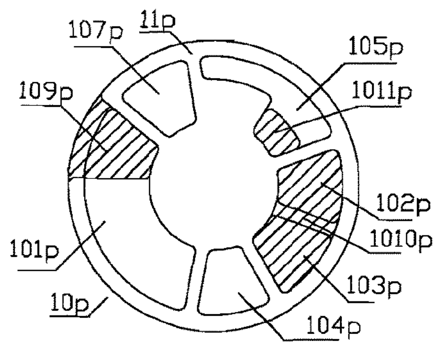

FIG. 207A is a top view of the flow control apparatus according to the thirty-third preferred embodiment of the present invention, showing the location of the first flow controlling element relative to the second flow controlling element when the flow control apparatus is under a first working state.

Figure 207B:
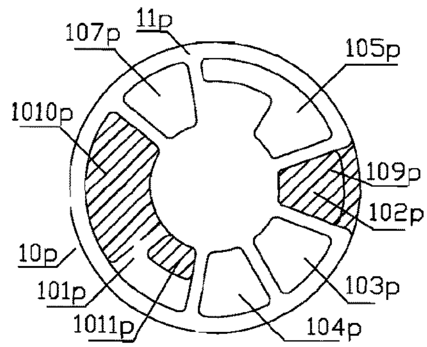

FIG. 207B is a top view of the flow control apparatus according to the thirty-third preferred embodiment of the present invention, showing the location of the first flow controlling element relative to the second flow controlling element when the flow control apparatus is under a second working state.

Figure 207C:
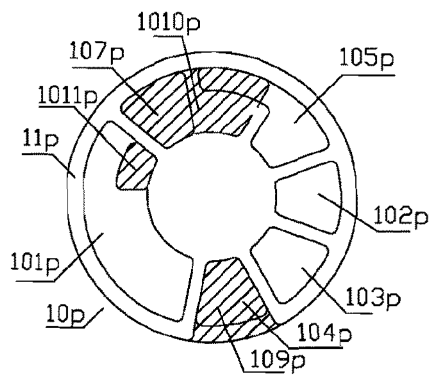

FIG. 207C is a top view of the flow control apparatus according to the thirty-third preferred embodiment of the present invention, showing the location of the first flow controlling element relative to the second flow controlling element when the flow control apparatus is under a third working state.

Figure 207D:
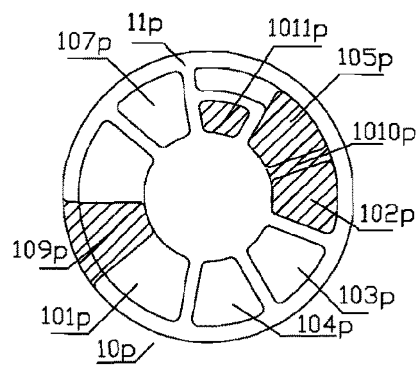

FIG. 207D is a top view of the flow control apparatus according to the thirty-third preferred embodiment of the present invention, showing the location of the first flow controlling element relative to the second flow controlling element when the flow control apparatus is under a fourth working state.

Figure 207E:
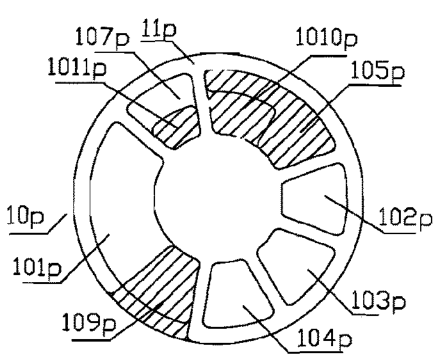

FIG. 207E is a top view of the flow control apparatus according to the thirty-third preferred embodiment of the present invention, showing the location of the first flow controlling element relative to the second flow controlling element when the flow control apparatus is under a fifth working state.

Figure 207F:
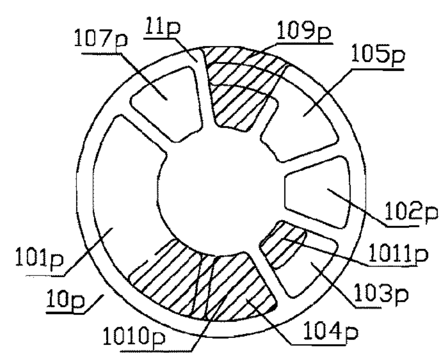

FIG. 207F is a top view of the flow control apparatus according to the thirty-third preferred embodiment of the present invention, showing the location of the first flow controlling element relative to the second flow controlling element when the flow control apparatus is under a sixth working state.

Figure 208:
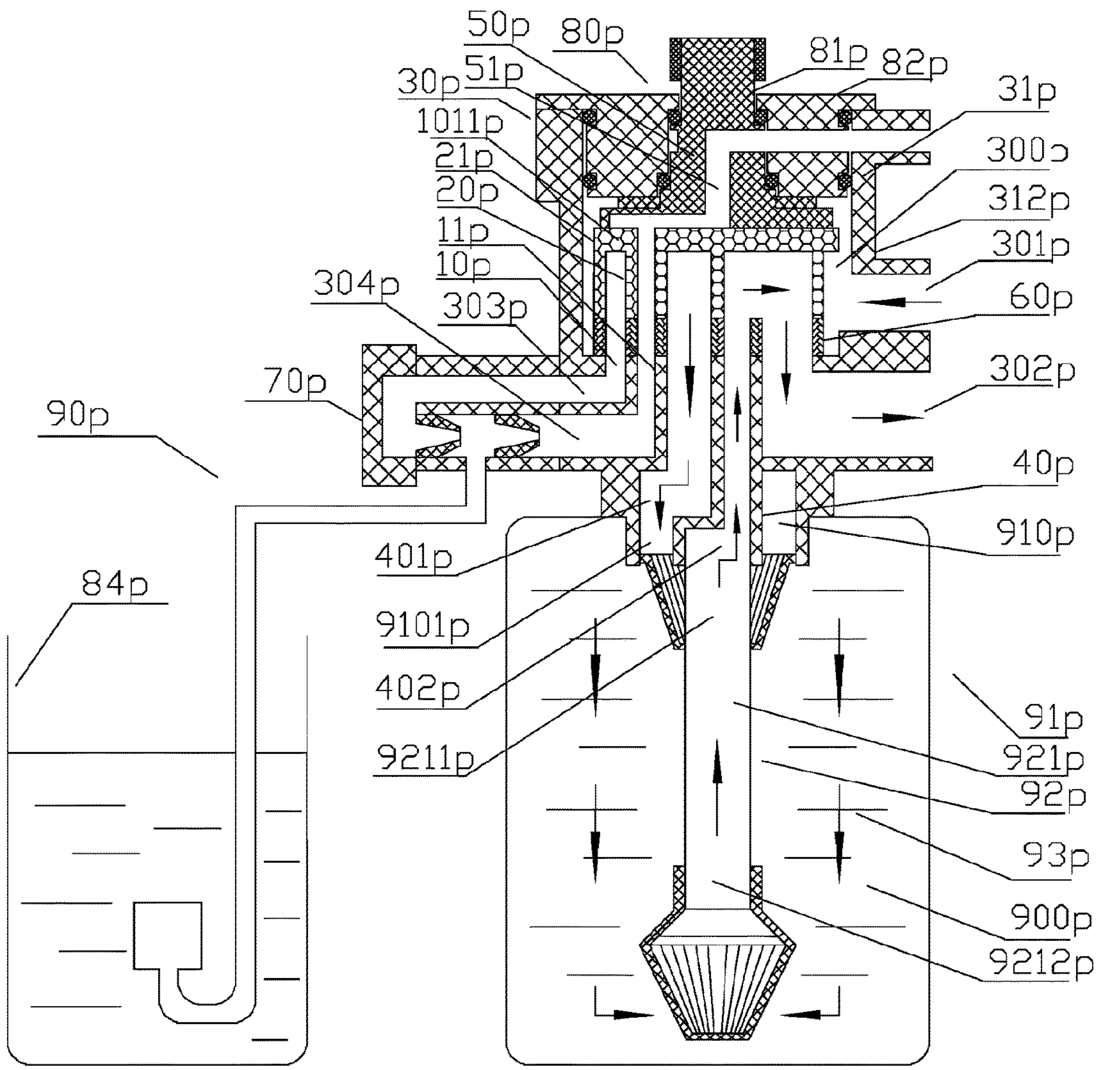

FIG. 208 is a sectional view of a water treatment apparatus employing the flow control apparatus according to the thirty-third preferred embodiment of the present invention, illustrating that the water treatment apparatus is able to process water when the flow control apparatus is under a first working state.

Figure 209:
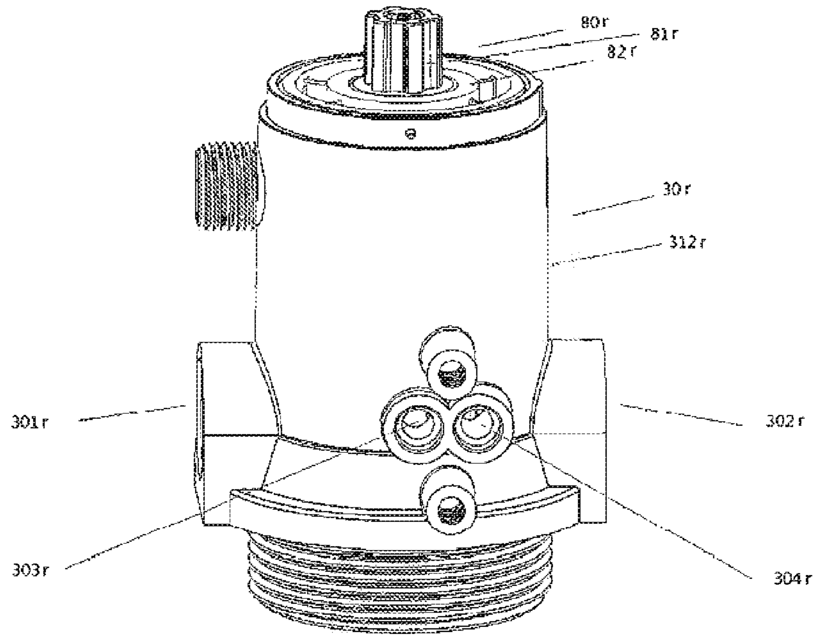

FIG. 209 is a front view of a flow control apparatus according to the thirty-fourth preferred embodiment of the present invention.

Figure 210:
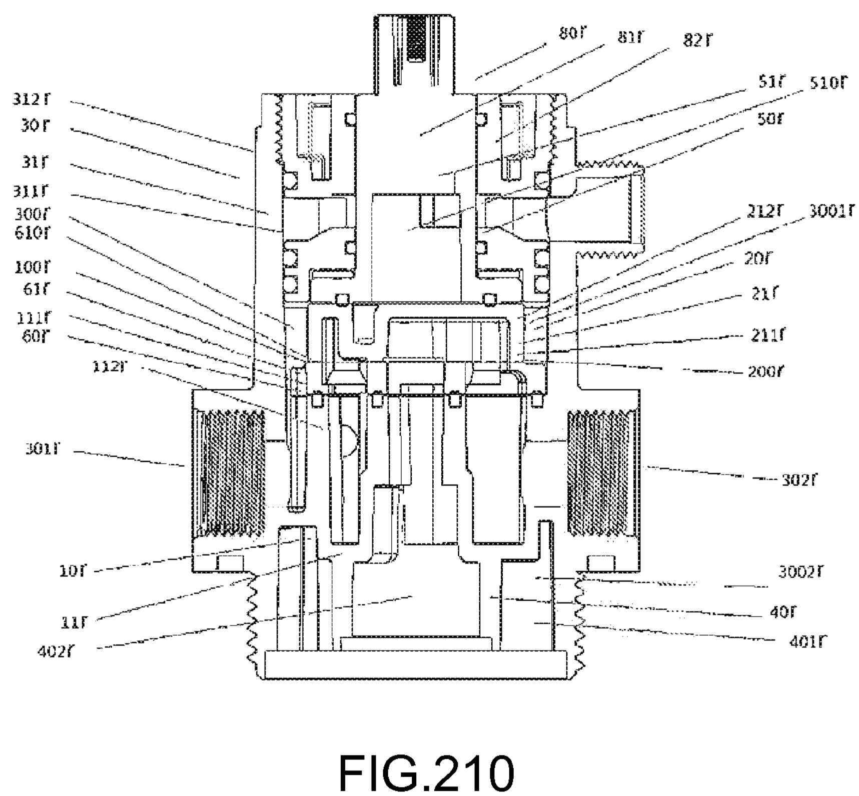

FIG. 210 is a sectional view of a flow control apparatus according to the thirty-fourth preferred embodiment of the present invention.

Figure 211A:
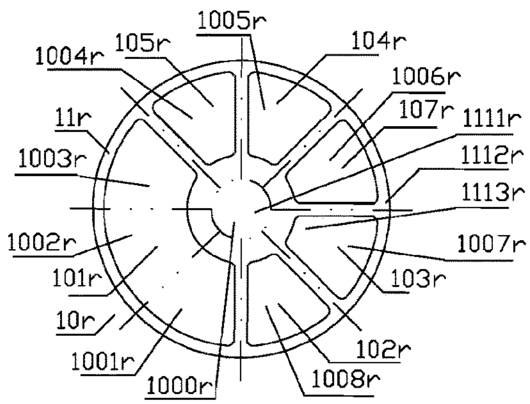

FIG. 211A is a top view of a first flow controlling element of the flow control apparatus according to the thirty-fourth preferred embodiment of the present invention, wherein the dot-dash lines shown in the FIG. 211A are used for showing the different portions of the first flow controlling side of the first flow controlling element.

Figure 211B:
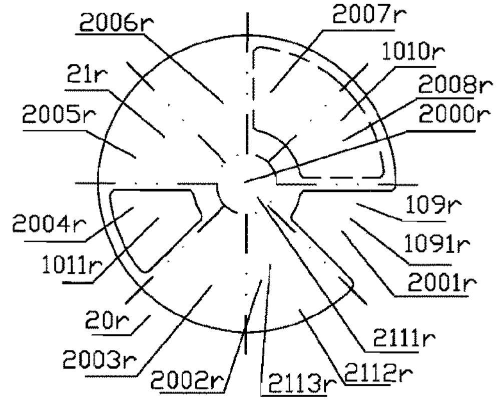

FIG. 211B is a top view of a second flow controlling element of the flow control apparatus according to the thirty-fourth preferred embodiment of the present invention, wherein the dot-dash lines shown in the FIG. 211B are used for showing the different portions of the second flow controlling side of the second flow controlling element.

Figure 211C:
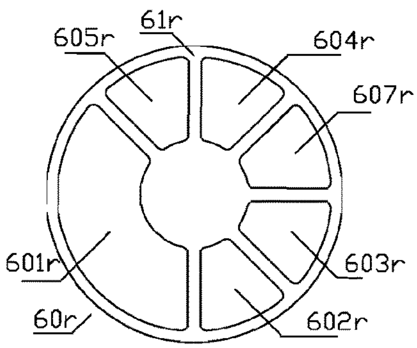

FIG. 211C is a top view of a wear resistant member of the flow control apparatus according to the thirty-fourth preferred embodiment of the present invention.

Figure 211D:
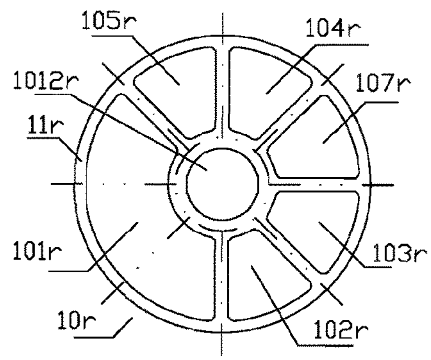

FIG. 211D is a top view of a first flow controlling element of an alternative of the flow control apparatus according to the thirty-fourth preferred embodiment of the present invention, wherein the dot-dash lines shown in the FIG. 211D are used for showing different portions of the first flow controlling side of the first flow controlling element.

Figure 211E:
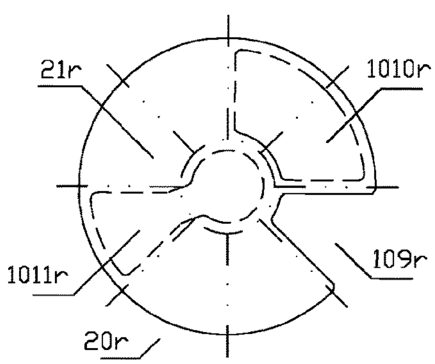

FIG. 211E is a top view of a second flow controlling element of an alternative of the flow control apparatus according to the thirty-fourth preferred embodiment of the present invention, wherein the dot-dash lines shown in the FIG. 211E are used for showing different portions of the second flow controlling side of the second flow controlling element.

Figure 211F:
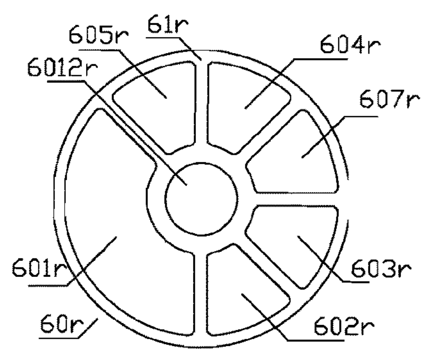

FIG. 211F is a top view of an alternative of a wear resistant member of the flow control apparatus according to the thirty-fourth preferred embodiment of the present invention.

Figure 212A:
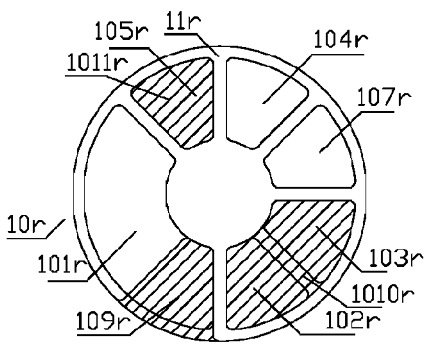

FIG. 212A is a top view of the flow control apparatus according to the thirty-fourth preferred embodiment of the present invention, showing the location of the first flow controlling element relative to the second flow controlling element when the flow control apparatus is under a first working state.

Figure 212B:
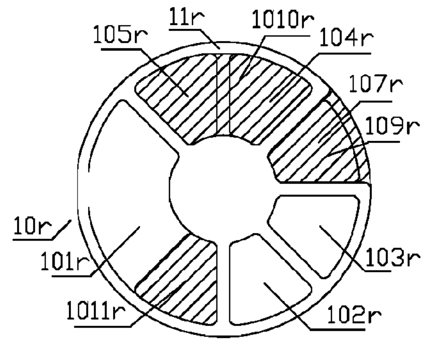

FIG. 212B is a top view of the flow control apparatus according to the thirty-fourth preferred embodiment of the present invention, showing the location of the first flow controlling element relative to the second flow controlling element when the flow control apparatus is under a second working state.

Figure 212C:
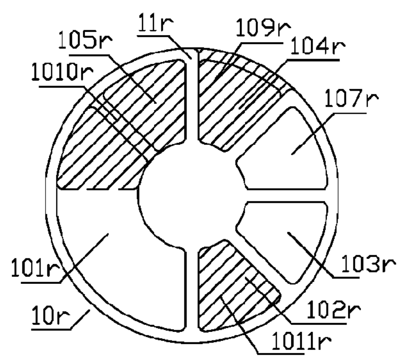

FIG. 212C is a top view of the flow control apparatus according to the thirty-fourth preferred embodiment of the present invention, showing the location of the first flow controlling element relative to the second flow controlling element when the flow control apparatus is under a third working state.

Figure 212D:
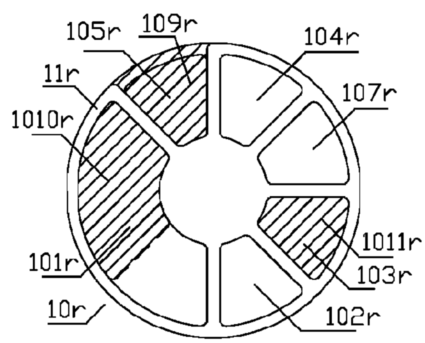

FIG. 212D is a top view of the flow control apparatus according to the thirty-fourth preferred embodiment of the present invention, showing the location of the first flow controlling element relative to the second flow controlling element when the flow control apparatus is under a fourth working state.

Figure 212E:
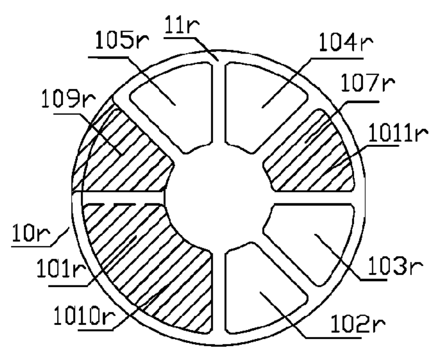

FIG. 212E is a top view of the flow control apparatus according to the thirty-fourth preferred embodiment of the present invention, showing the location of the first flow controlling element relative to the second flow controlling element when the flow control apparatus is under a fifth working state.

Figure 213:
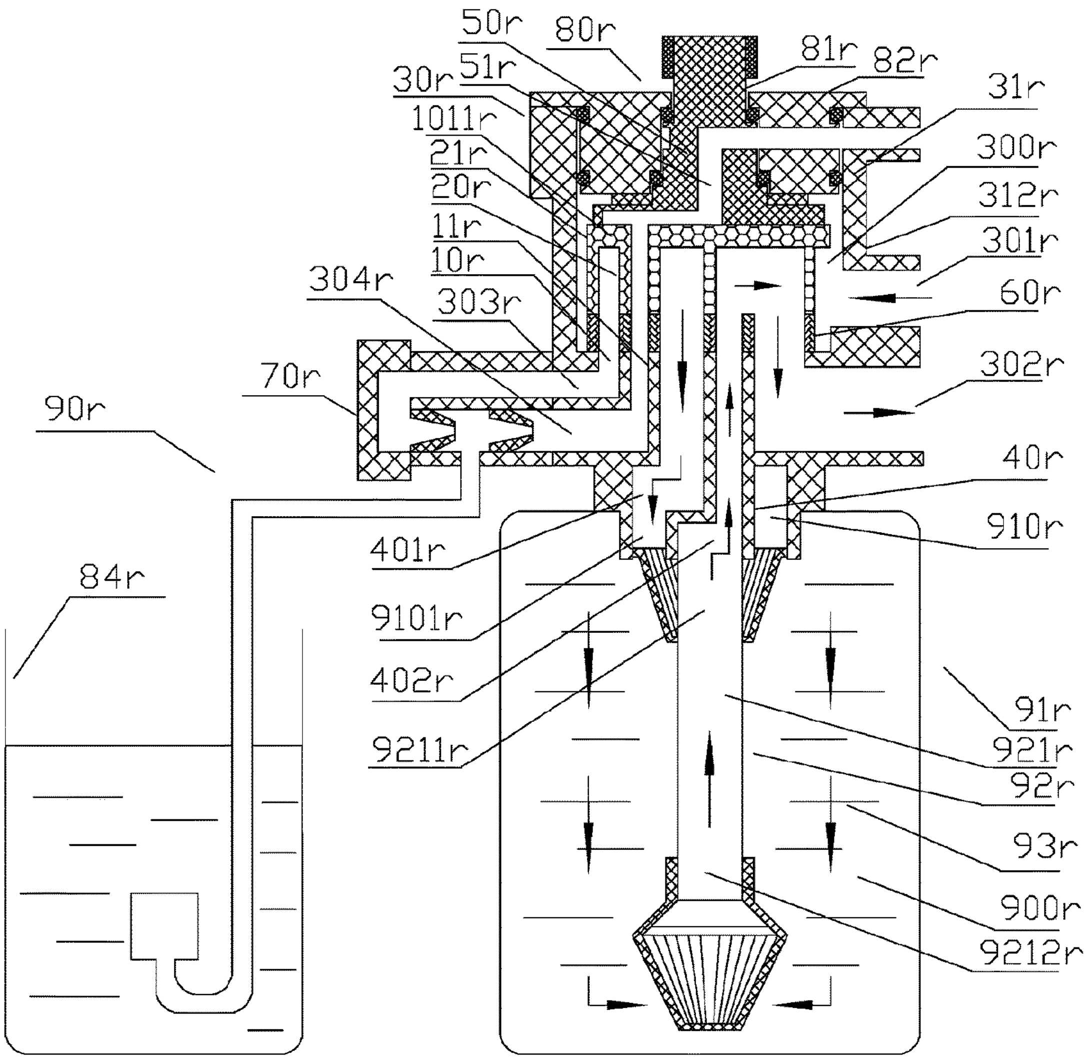

FIG. 213 is a sectional view of a water treatment apparatus employing the flow control apparatus according to the thirty-fourth preferred embodiment of the present invention, illustrating that the water treatment apparatus is able to process water when the flow control apparatus is under a first working state.

Figure 214:
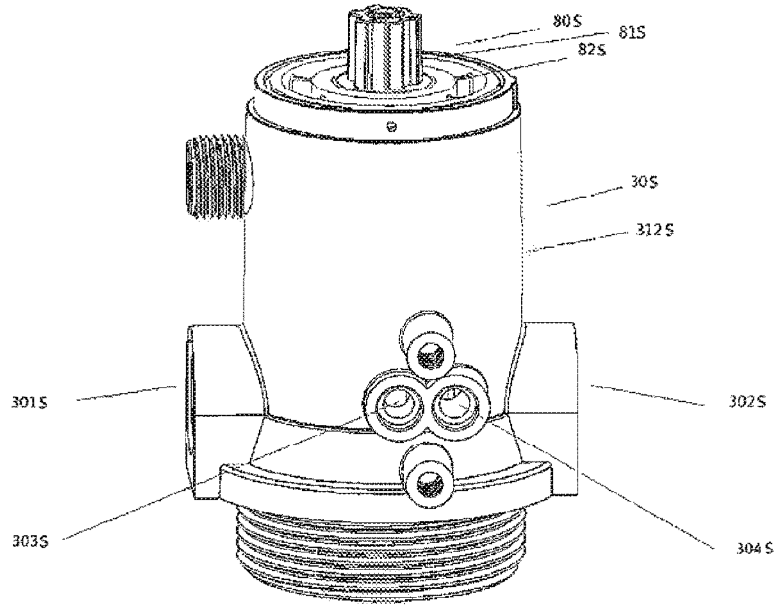

FIG. 214 is a front view of a flow control apparatus according to the thirty-fifth preferred embodiment of the present invention.

Figure 215:
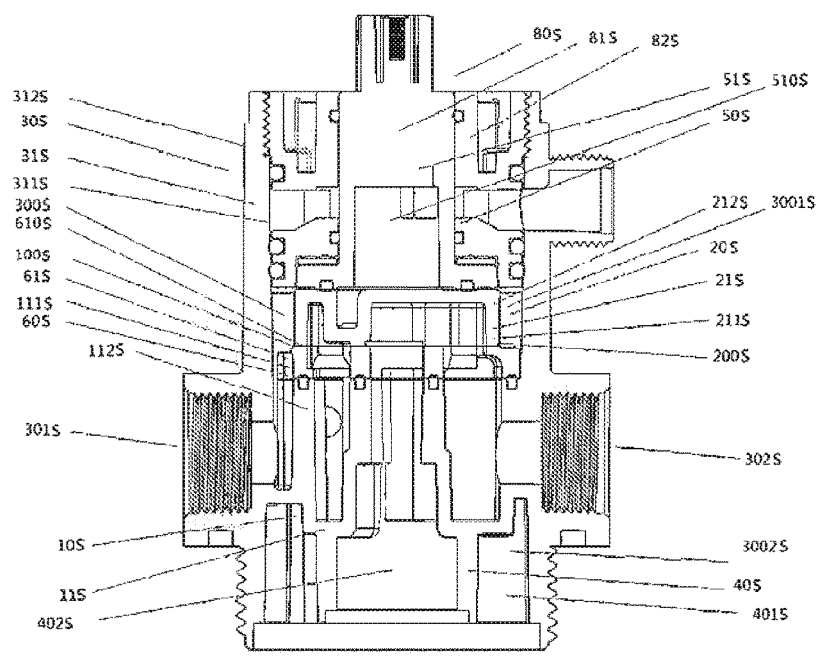

FIG. 215 is a sectional view of a flow control apparatus according to the thirty-fifth preferred embodiment of the present invention.

Figure 216A:
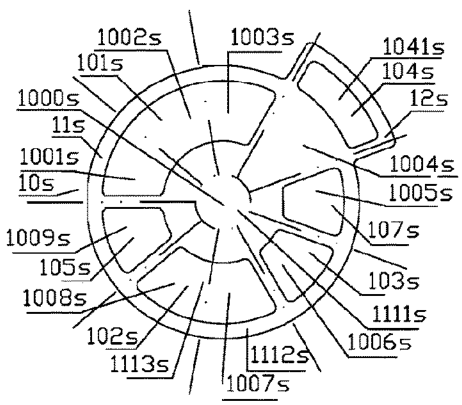

FIG. 216A is a top view of a first flow controlling element of the flow control apparatus according to the thirty-fifth preferred embodiment of the present invention, wherein the dot-dash lines shown in the FIG. 216A are used for showing the different portions of the first flow controlling side of the first flow controlling element.

Figure 216B:
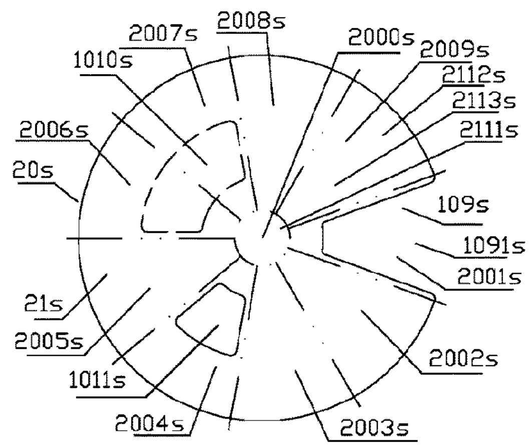

FIG. 216B is a top view of a second flow controlling element of the flow control apparatus according to the thirty-fifth preferred embodiment of the present invention, wherein the dot-dash lines shown in the FIG. 216B are used for showing the different portions of the second flow controlling side of the second flow controlling element.

Figure 216C:
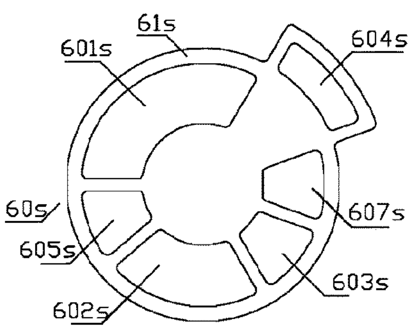

FIG. 216C is a top view of a wear resistant member of the flow control apparatus according to the thirty-fifth preferred embodiment of the present invention.

Figure 216D:
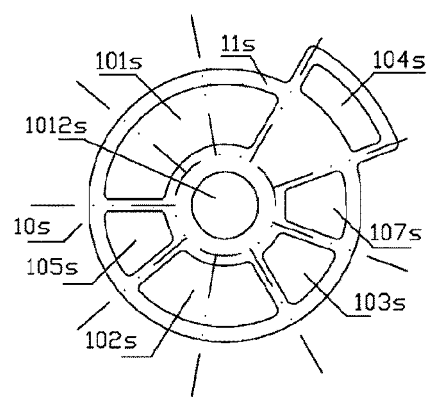

FIG. 216D is a top view of a first flow controlling element of an alternative of the flow control apparatus according to the thirty-fifth preferred embodiment of the present invention, wherein the dot-dash lines shown in the FIG. 216D are used for showing different portions of the first flow controlling side of the first flow controlling element.

Figure 216E:
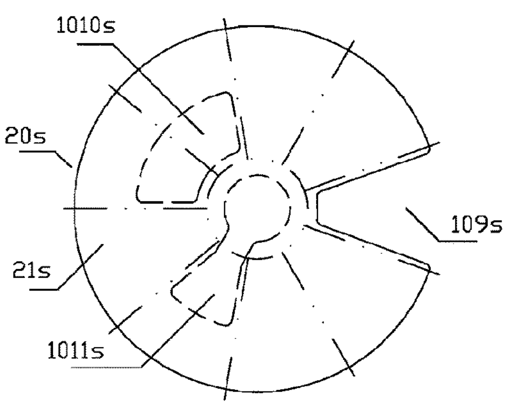

FIG. 216E is a top view of a second flow controlling element of an alternative of the flow control apparatus according to the thirty-fifth preferred embodiment of the present invention, wherein the dot-dash lines shown in the FIG. 216E are used for showing different portions of the second flow controlling side of the second flow controlling element.

Figure 216F:
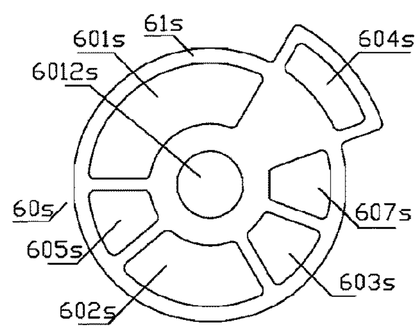

FIG. 216F is a top view of an alternative of a wear resistant member of the flow control apparatus according to the thirty-fifth preferred embodiment of the present invention.

Figure 217A:
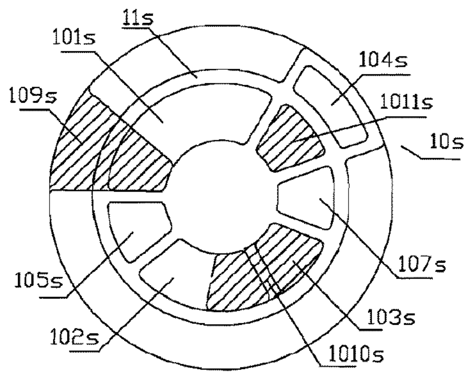

FIG. 217A is a top view of the flow control apparatus according to the thirty-fifth preferred embodiment of the present invention, showing the location of the first flow controlling element relative to the second flow controlling element when the flow control apparatus is under a first working state.

Figure 217B:
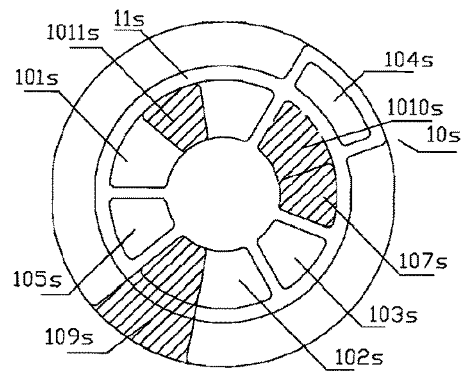

FIG. 217B is a top view of the flow control apparatus according to the thirty-fifth preferred embodiment of the present invention, showing the location of the first flow controlling element relative to the second flow controlling element when the flow control apparatus is under a second working state.

Figure 217C:
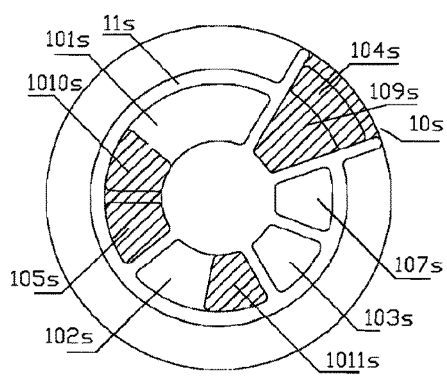

FIG. 217C is a top view of the flow control apparatus according to the thirty-fifth preferred embodiment of the present invention, showing the location of the first flow controlling element relative to the second flow controlling element when the flow control apparatus is under a third working state.

Figure 217D:
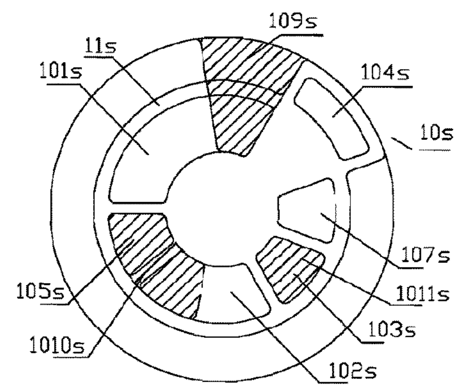

FIG. 217D is a top view of the flow control apparatus according to the thirty-fifth preferred embodiment of the present invention, showing the location of the first flow controlling element relative to the second flow controlling element when the flow control apparatus is under a fourth working state.

Figure 217E:
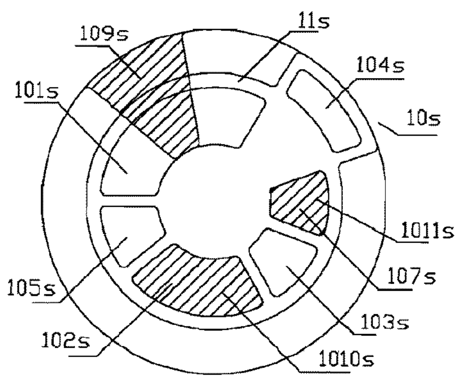

FIG. 217E is a top view of the flow control apparatus according to the thirty-fifth preferred embodiment of the present invention, showing the location of the first flow controlling element relative to the second flow controlling element when the flow control apparatus is under a fifth working state.

Figure 217F:
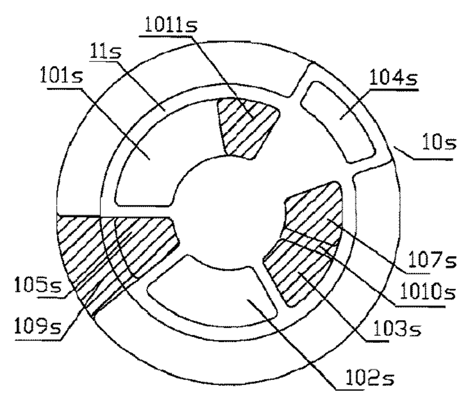

FIG. 217F is a top view of the flow control apparatus according to the thirty-fifth preferred embodiment of the present invention, showing the location of the first flow controlling element relative to the second flow controlling element when the flow control apparatus is under a sixth working state.

Figure 218:
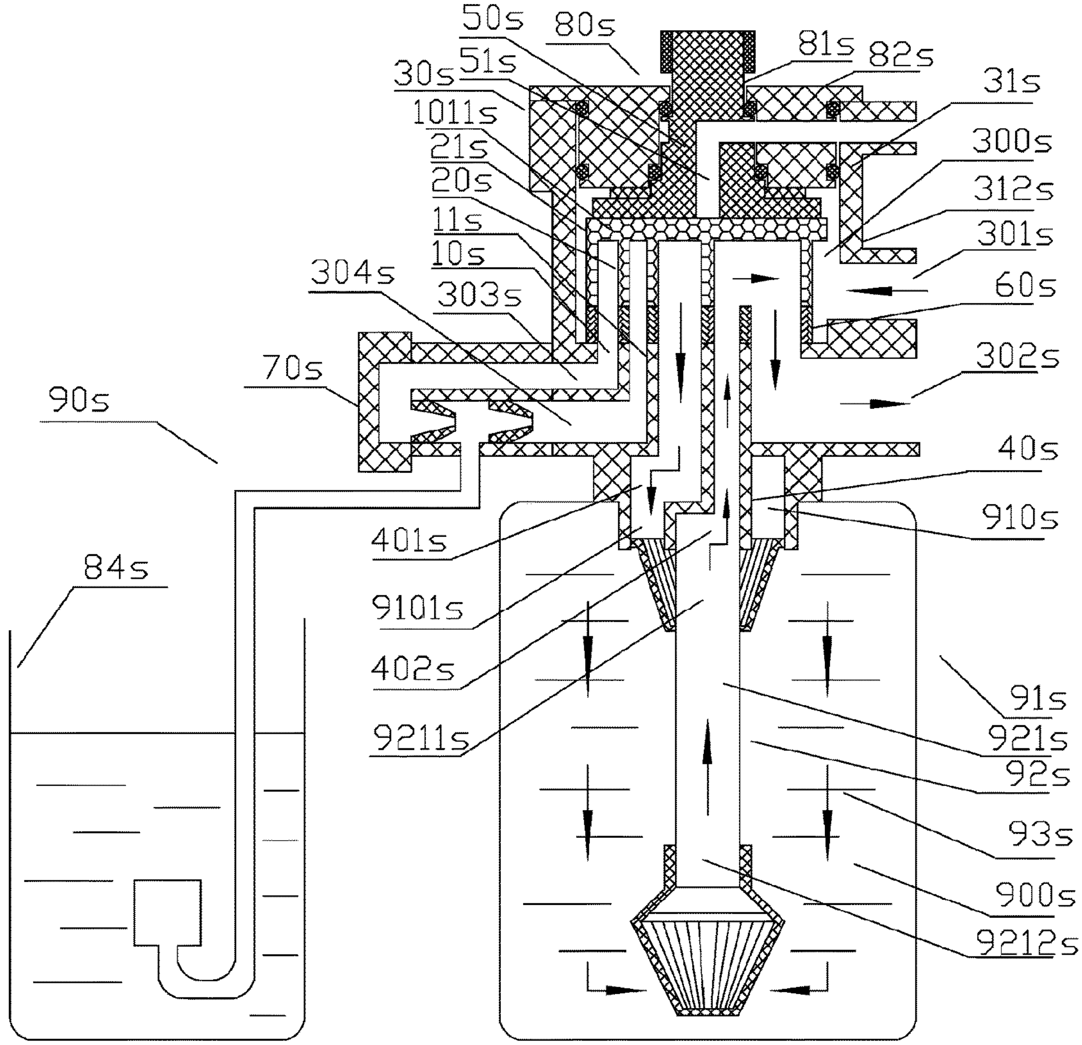

FIG. 218 is a sectional view of a water treatment apparatus employing the flow control apparatus according to the thirty-fifth preferred embodiment of the present invention, illustrating that the water treatment apparatus is able to process water when the flow control apparatus is under a first working state.

Figure 219:
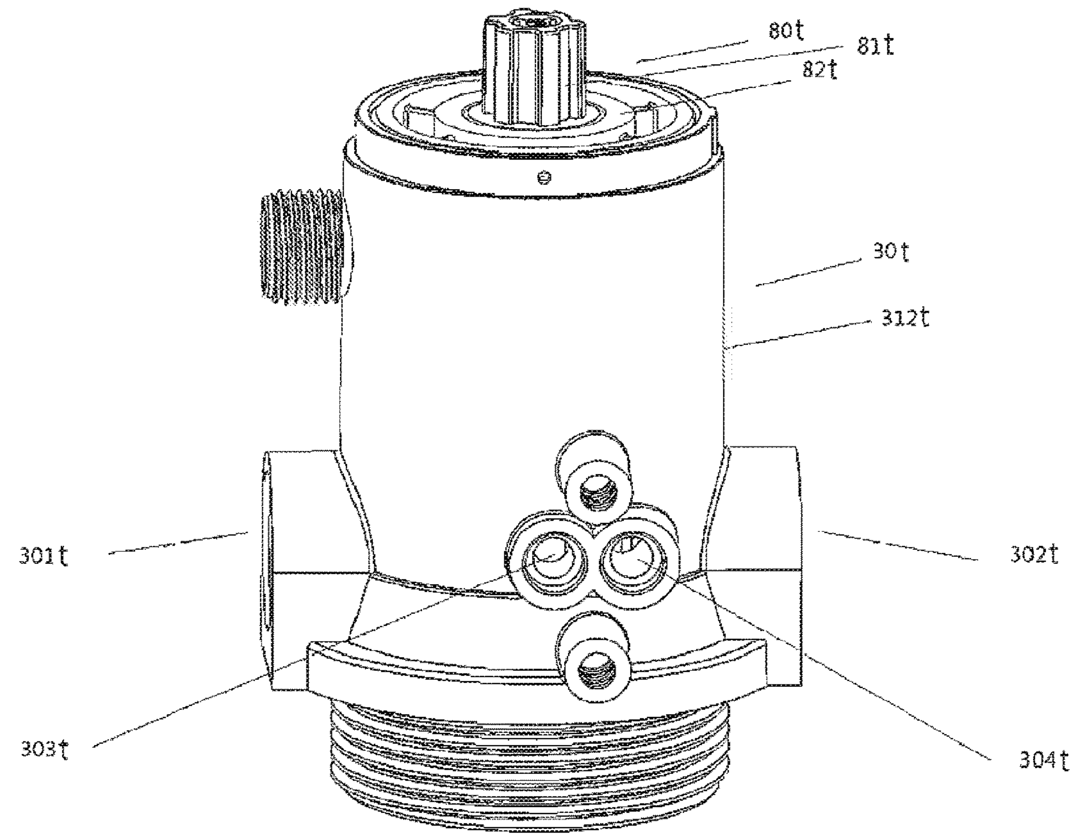

FIG. 219 is a front view of a flow control apparatus according to the thirty-sixth preferred embodiment of the present invention.

Figure 220A:
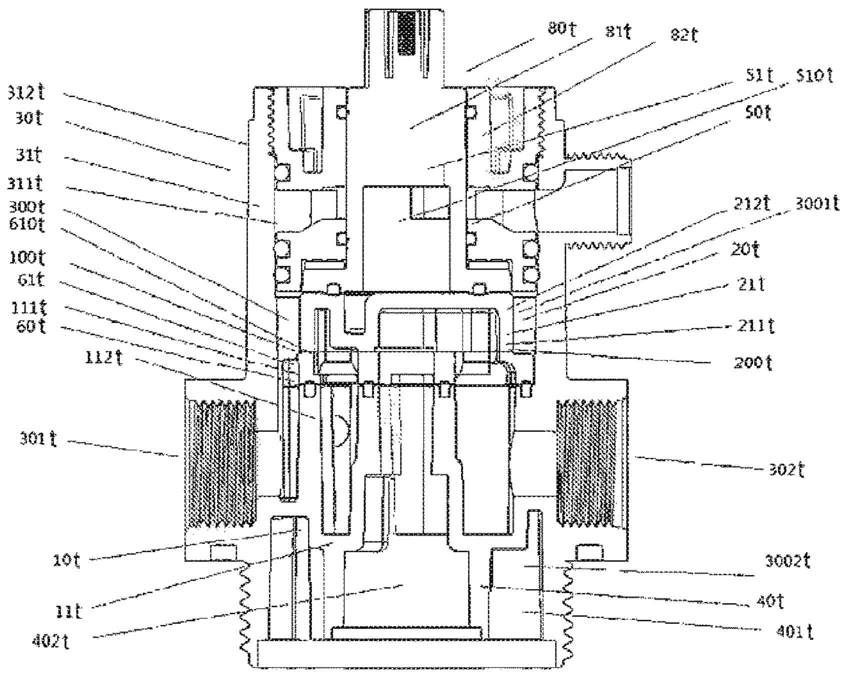

FIG. 220A is a sectional view of a flow control apparatus according to the thirty-sixth preferred embodiment of the present invention.

Figure 220B:
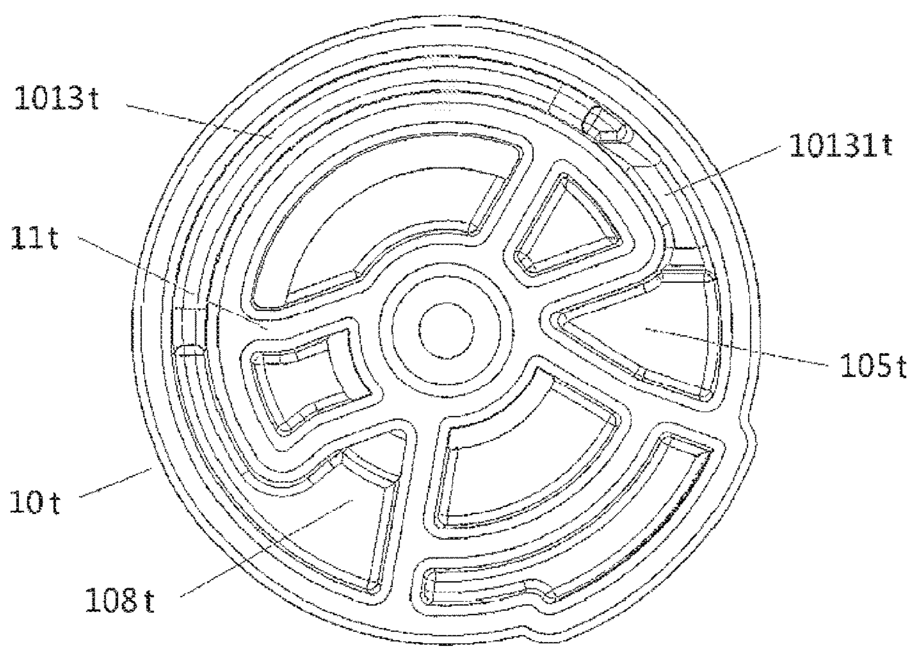

FIG. 220B is a top view of a first flow controlling element of a flow control apparatus according to the thirty-sixth preferred embodiment of the present invention.

Figure 221A:
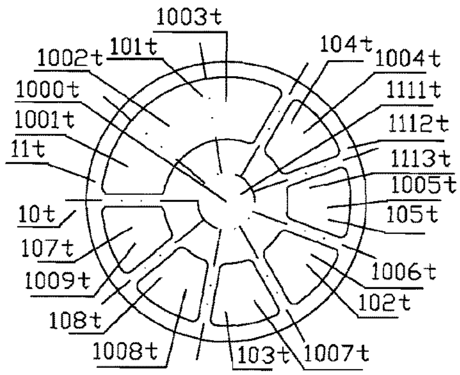

FIG. 221A is a top view of a first flow controlling element of the flow control apparatus according to the thirty-sixth preferred embodiment of the present invention, wherein the dot-dash lines shown in the FIG. 221A are used for showing the different portions of the first flow controlling side of the first flow controlling element.

Figure 221B:
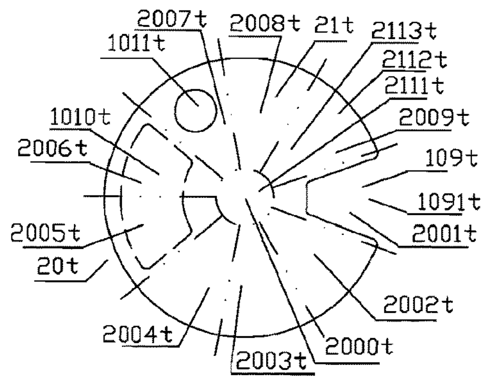

FIG. 221B is a top view of a second flow controlling element of the flow control apparatus according to the thirty-sixth preferred embodiment of the present invention, wherein the dot-dash lines shown in the FIG. 221B are used for showing the different portions of the second flow controlling side of the second flow controlling element.

Figure 221C:
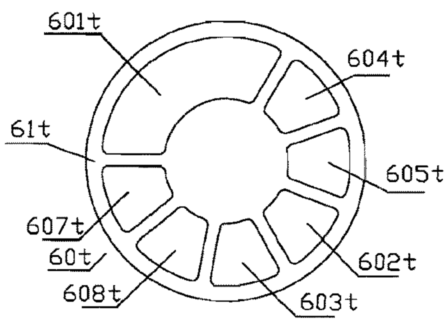

FIG. 221C is a top view of a wear resistant member of the flow control apparatus according to the thirty-sixth preferred embodiment of the present invention.

Figure 221D:
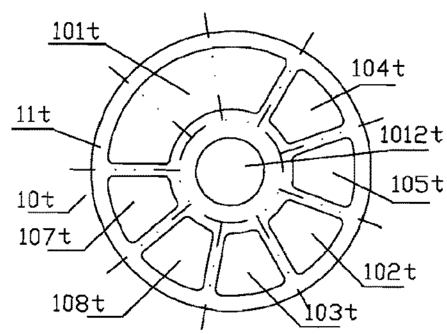

FIG. 221D is a top view of a first flow controlling element of an alternative of the flow control apparatus according to the thirty-sixth preferred embodiment of the present invention, wherein the dot-dash lines shown in the FIG. 221D are used for showing different portions of the first flow controlling side of the first flow controlling element.

Figure 221E:
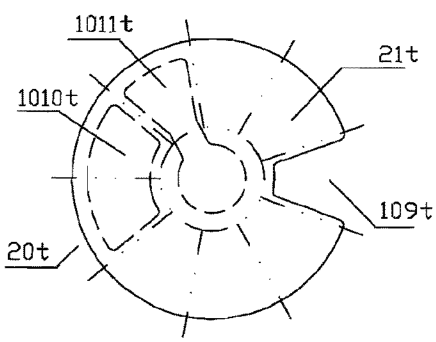

FIG. 221E is a top view of a second flow controlling element of an alternative of the flow control apparatus according to the thirty-sixth preferred embodiment of the present invention, wherein the dot-dash lines shown in the FIG. 221E are used for showing different portions of the second flow controlling side of the second flow controlling element.

Figure 221F:
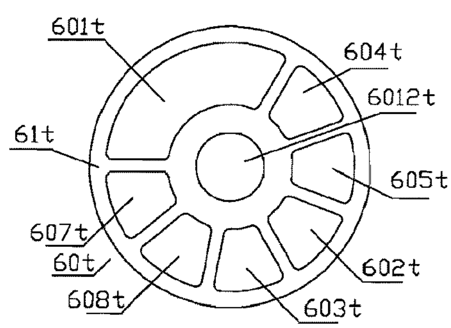

FIG. 221F is a top view of an alternative of a wear resistant member of the flow control apparatus according to the thirty-sixth preferred embodiment of the present invention.

Figure 222A:
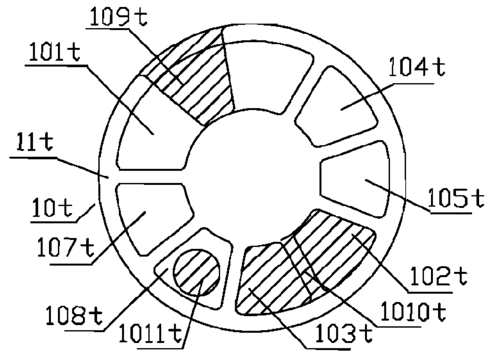

FIG. 222A is a top view of the flow control apparatus according to the thirty-sixth preferred embodiment of the present invention, showing the location of the first flow controlling element relative to the second flow controlling element when the flow control apparatus is under a first working state.

Figure 222B:
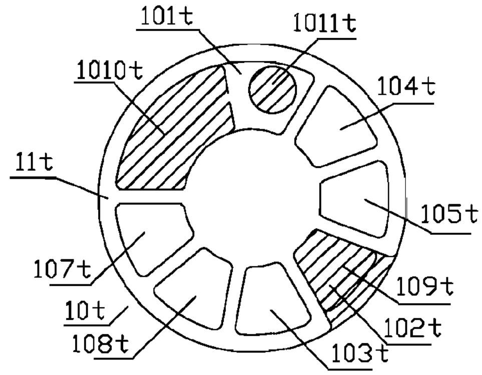

FIG. 222B is a top view of the flow control apparatus according to the thirty-sixth preferred embodiment of the present invention, showing the location of the first flow controlling element relative to the second flow controlling element when the flow control apparatus is under a second working state.

Figure 222C:
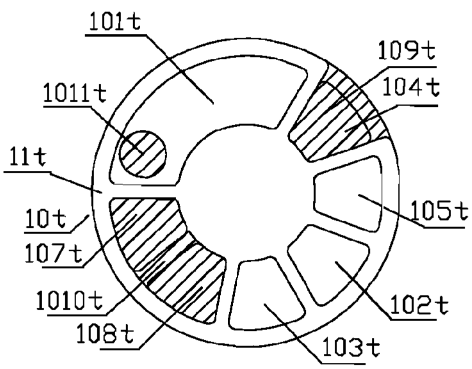

FIG. 222C is a top view of the flow control apparatus according to the thirty-sixth preferred embodiment of the present invention, showing the location of the first flow controlling element relative to the second flow controlling element when the flow control apparatus is under a third working state.

Figure 222D:
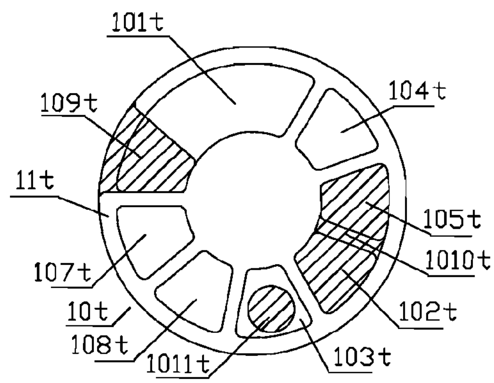

FIG. 222D is a top view of the flow control apparatus according to the thirty-sixth preferred embodiment of the present invention, showing the location of the first flow controlling element relative to the second flow controlling element when the flow control apparatus is under a fourth working state.

Figure 222E:
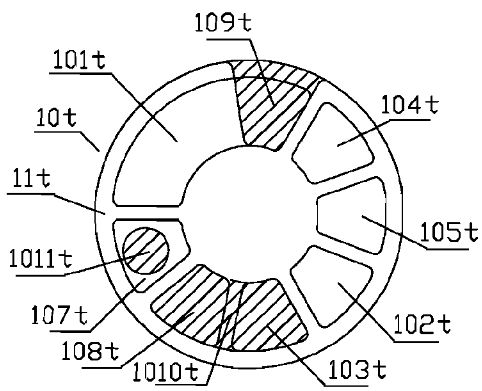

FIG. 222E is a top view of the flow control apparatus according to the thirty-sixth preferred embodiment of the present invention, showing the location of the first flow controlling element relative to the second flow controlling element when the flow control apparatus is under a fifth working state.

Figure 223:
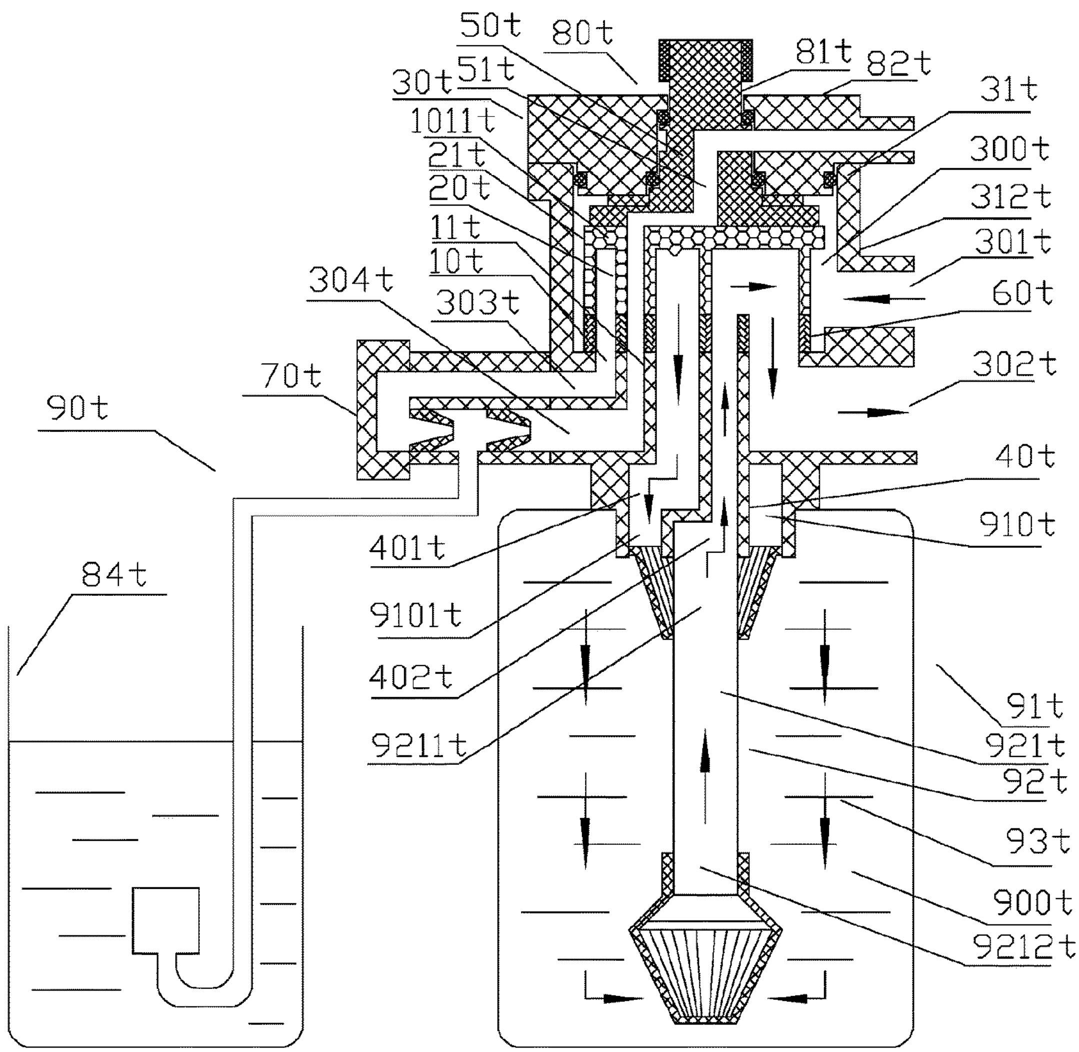

FIG. 223 is a sectional view of a water treatment apparatus employing the flow control apparatus according to the thirty-sixth preferred embodiment of the present invention, illustrating that the water treatment apparatus is able to process water when the flow control apparatus is under a first working state.

Figure 224:
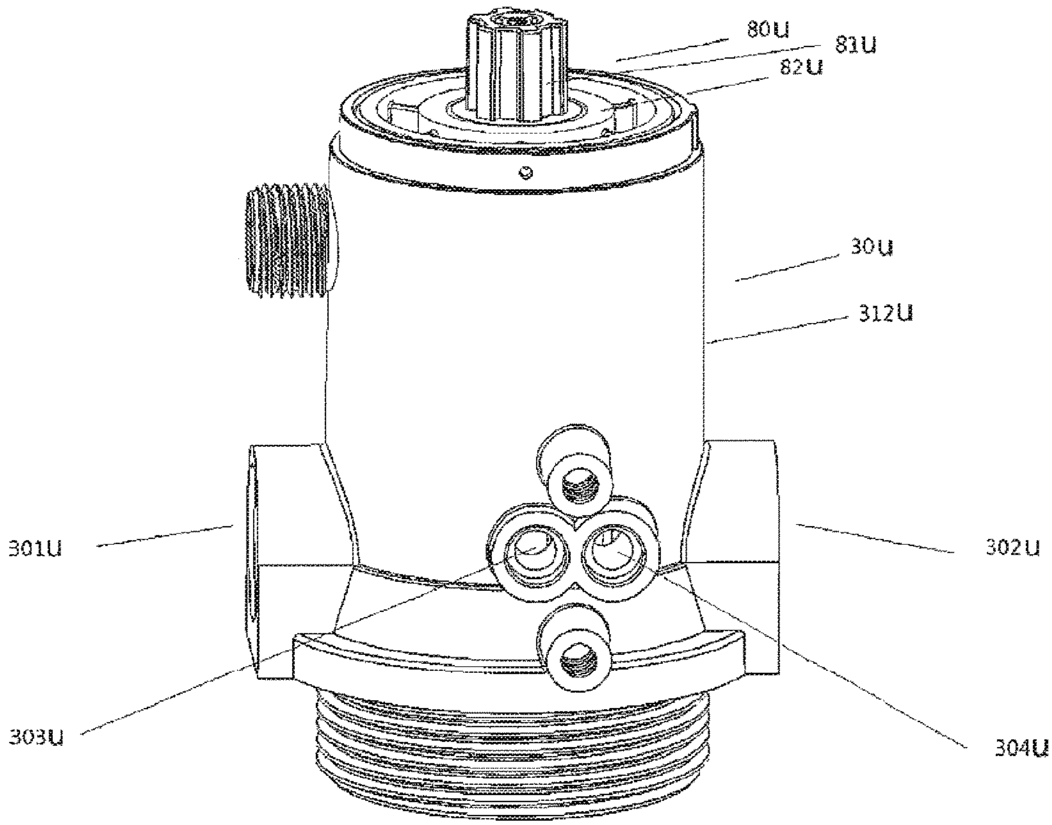

FIG. 224 is a front view of a flow control apparatus according to the thirty-seventh preferred embodiment of the present invention.

Figure 225A:
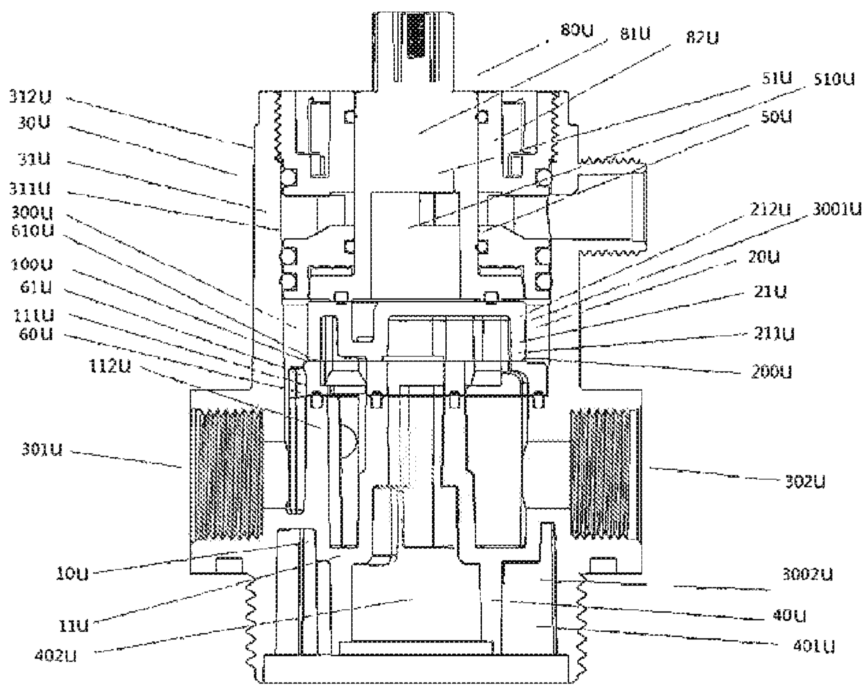

FIG. 225A is a sectional view of a flow control apparatus according to the thirty-seventh preferred embodiment of the present invention.

Figure 225B:
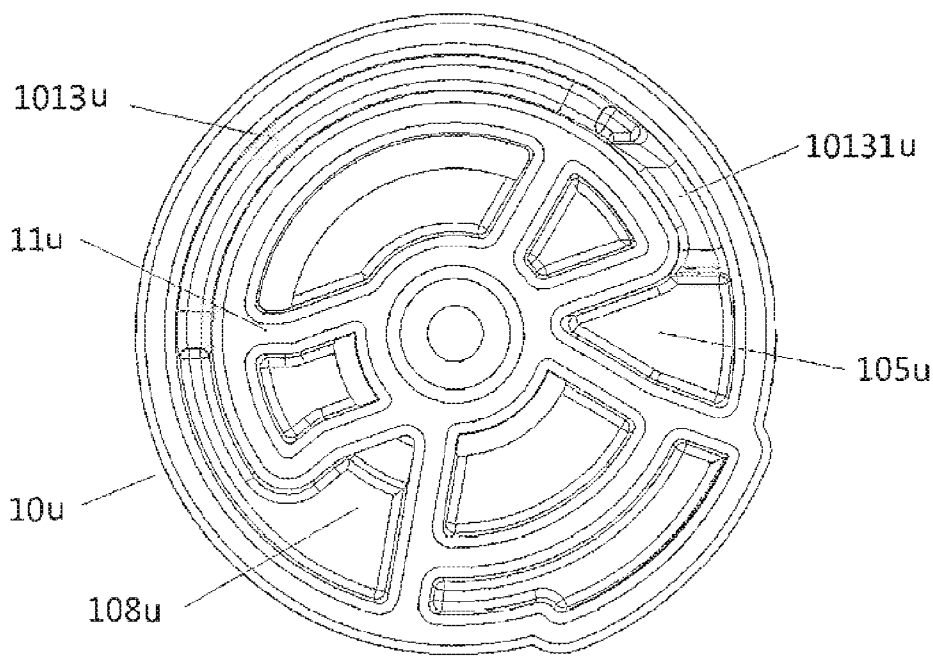

FIG. 225B is a top view of a thirteenth channel of a flow control apparatus according to the thirty-seventh preferred embodiment of the present invention.

Figure 226A:
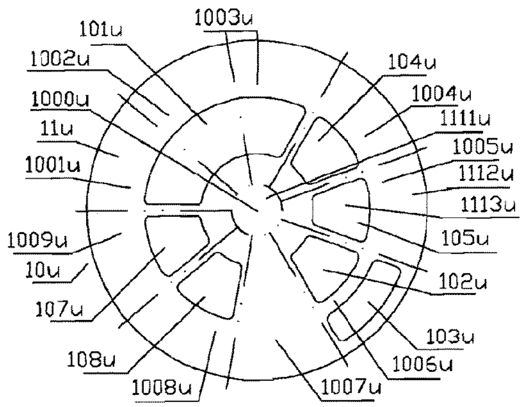

FIG. 226A is a top view of a first flow controlling element of the flow control apparatus according to the thirty-seventh preferred embodiment of the present invention, wherein the dot-dash lines shown in the FIG. 226A are used for showing the different portions of the first flow controlling side of the first flow controlling element.

Figure 226B:
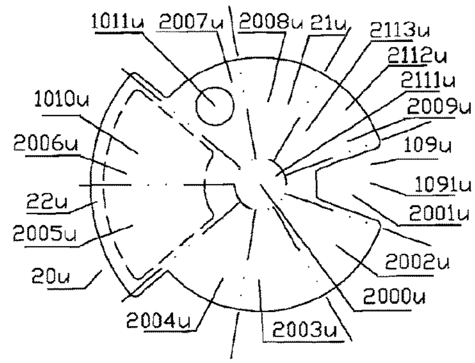

FIG. 226B is a top view of a second flow controlling element of the flow control apparatus according to the thirty-seventh preferred embodiment of the present invention, wherein the dot-dash lines shown in the FIG. 226B are used for showing different portions of the second flow controlling side of the second flow controlling element.

Figure 226C:
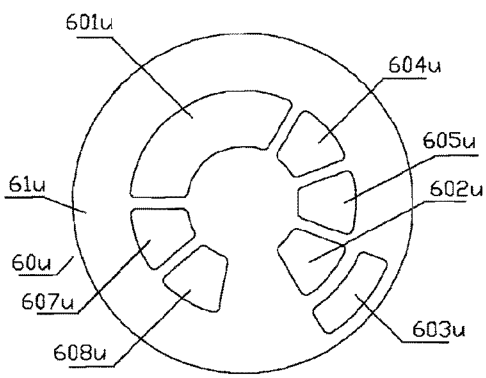

FIG. 226C is a top view of a wear resistant member of the flow control apparatus according to the thirty-seventh preferred embodiment of the present invention.

Figure 226D:
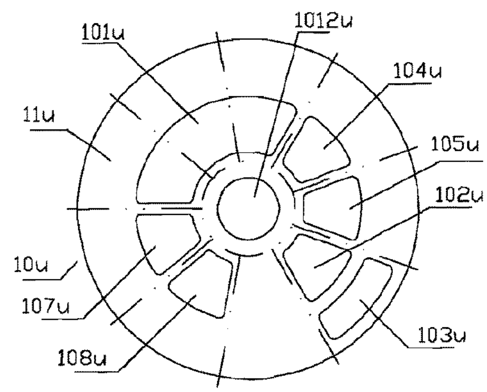

FIG. 226D is a top view of a first flow controlling element of an alternative of the flow control apparatus according to the thirty-seventh preferred embodiment of the present invention, wherein the dot-dash lines shown in the FIG. 226D are used for showing different portions of the first flow controlling side of the first flow controlling element.

Figure 226E:
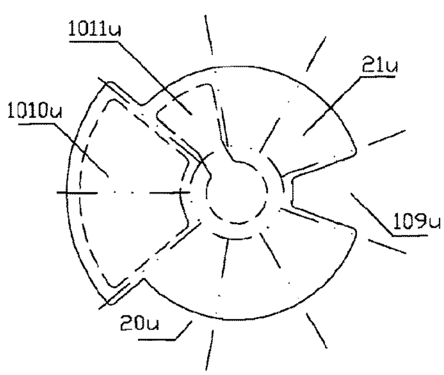

FIG. 226E is a top view of a second flow controlling element of an alternative of the flow control apparatus according to the thirty-seventh preferred embodiment of the present invention, wherein the dot-dash lines shown in the FIG. 226E are used for showing different portions of the second flow controlling side of the second flow controlling element.

Figure 226F:
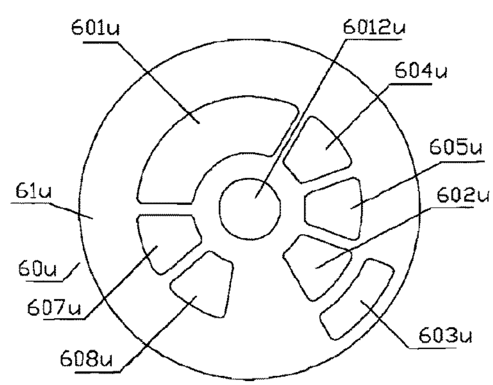

FIG. 226F is a top view of an alternative of a wear resistant member of the flow control apparatus according to the thirty-seventh preferred embodiment of the present invention.

Figure 227A:
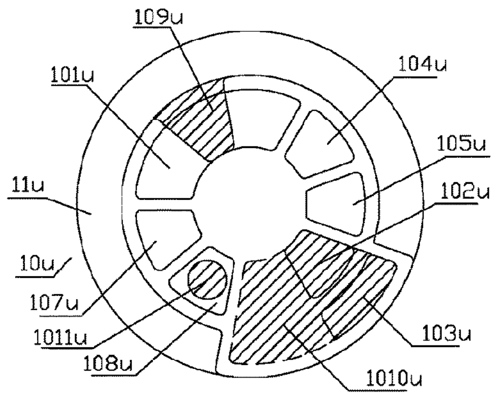

FIG. 227A is a top view of the flow control apparatus according to the thirty-seventh preferred embodiment of the present invention, showing the location of the first flow controlling element relative to the second flow controlling element when the flow control apparatus is under a first working state.

Figure 227B:
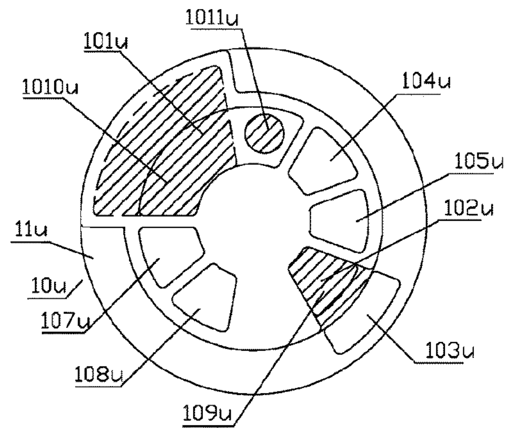

FIG. 227B is a top view of the flow control apparatus according to the thirty-seventh preferred embodiment of the present invention, showing the location of the first flow controlling element relative to the second flow controlling element when the flow control apparatus is under a second working state.

Figure 227C:
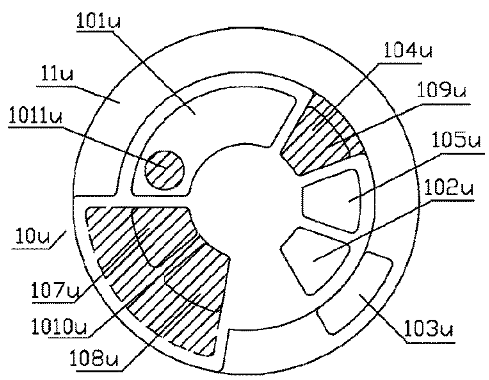

FIG. 227C is a top view of the flow control apparatus according to the thirty-seventh preferred embodiment of the present invention, showing the location of the first flow controlling element relative to the second flow controlling element when the flow control apparatus is under a third working state.

Figure 227D:
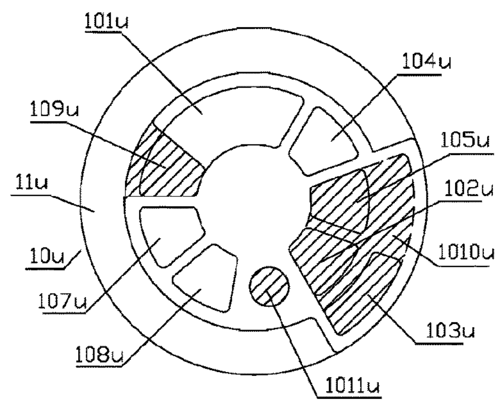

FIG. 227D is a top view of the flow control apparatus according to the thirty-seventh preferred embodiment of the present invention, showing the location of the first flow controlling element relative to the second flow controlling element when the flow control apparatus is under a fourth working state.

Figure 227E:
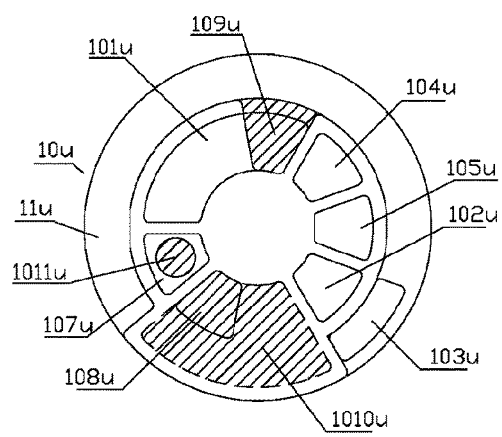

FIG. 227E is a top view of the flow control apparatus according to the thirty-seventh preferred embodiment of the present invention, showing the location of the first flow controlling element relative to the second flow controlling element when the flow control apparatus is under a fifth working state.

Figure 228:
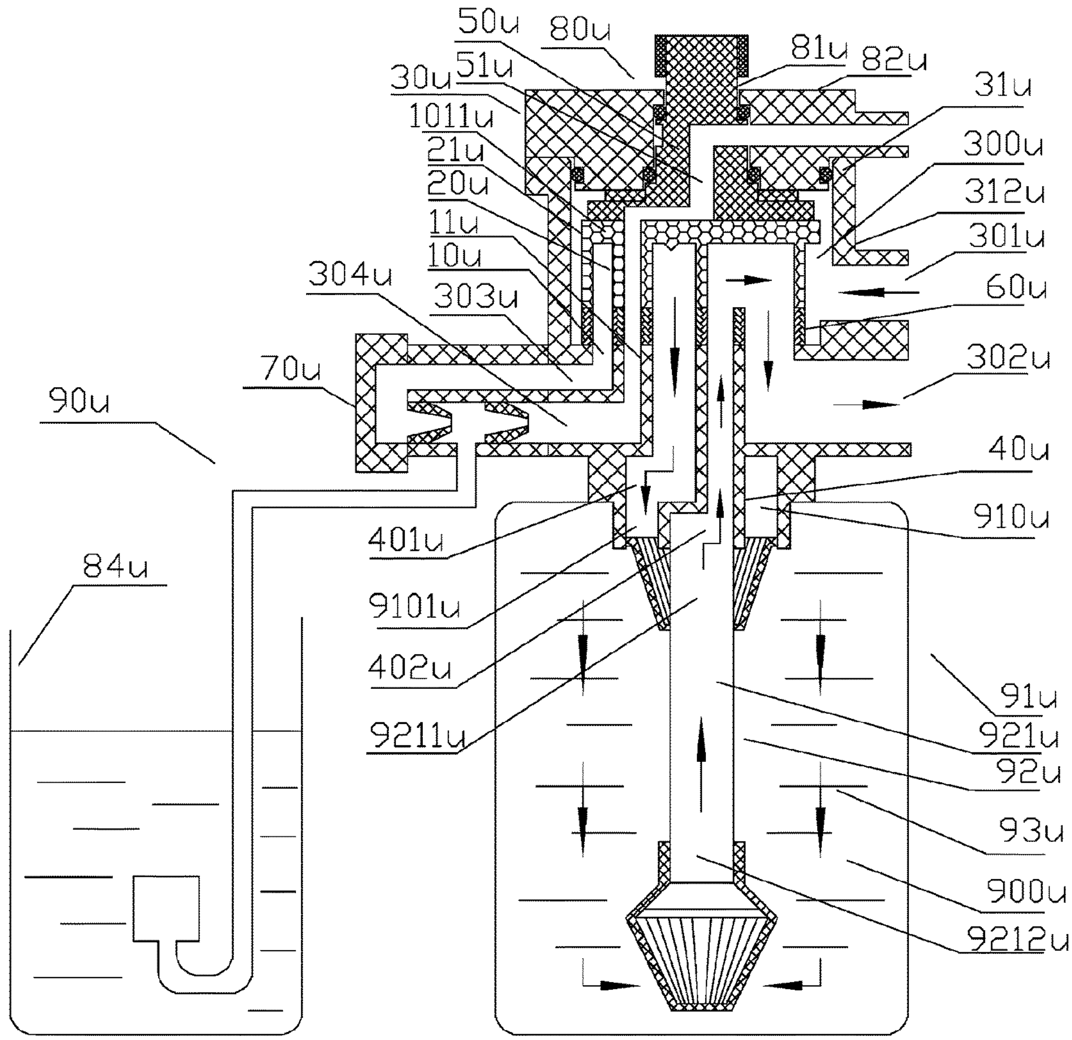

FIG. 228 is a sectional view of a water treatment apparatus employing the flow control apparatus according to the thirty-seventh preferred embodiment of the present invention, illustrating that the water treatment apparatus is able to process water when the flow control apparatus is under a first working state.

Figure 229:
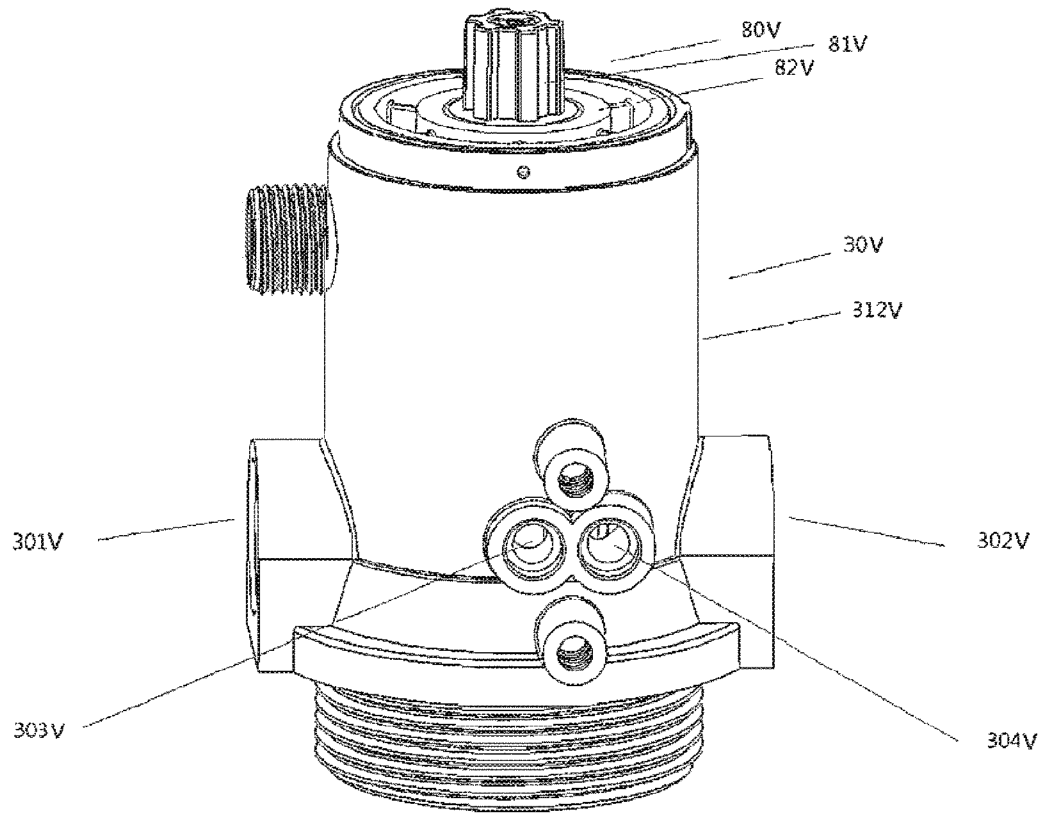

FIG. 229 is a front view of a flow control apparatus according to the thirty-eighth preferred embodiment of the present invention.

Figure 230A:
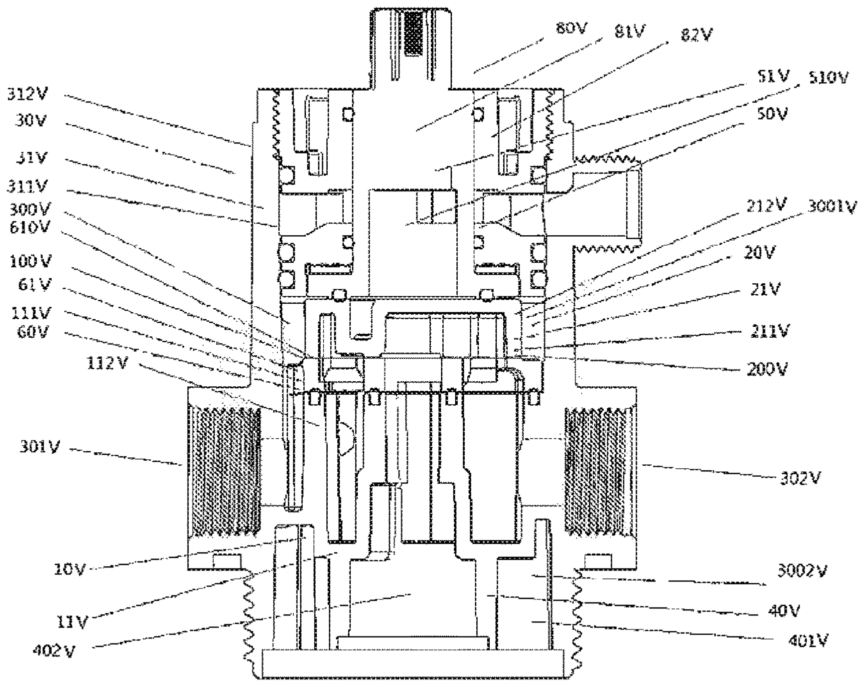

FIG. 230A is a sectional view of a flow control apparatus according to the thirty-eighth preferred embodiment of the present invention.

Figure 230B:
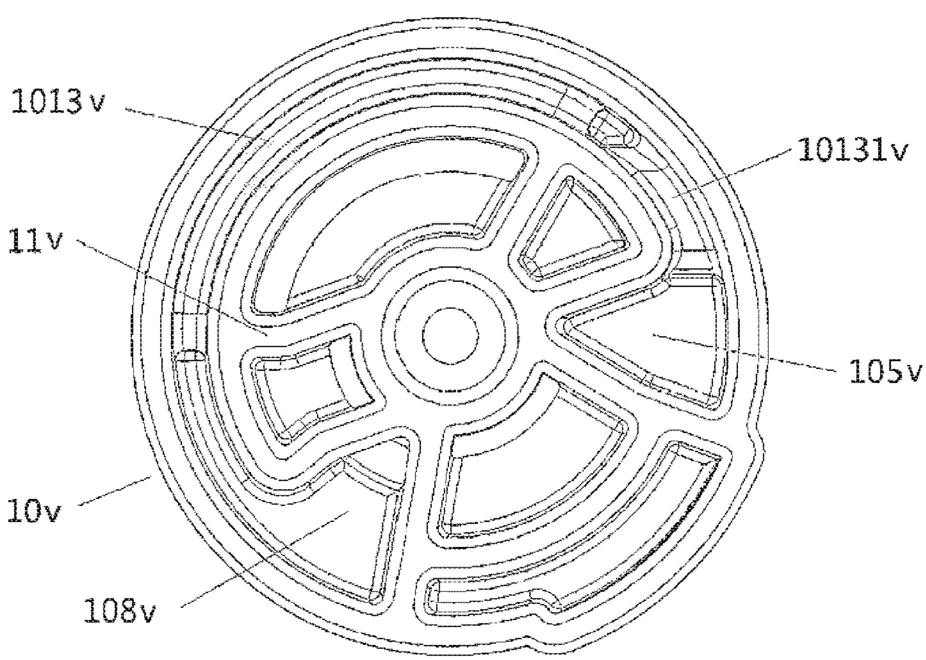

FIG. 230B is a top view of a thirteenth channel of a flow control apparatus according to the thirty-eighth preferred embodiment of the present invention.

Figure 231A:
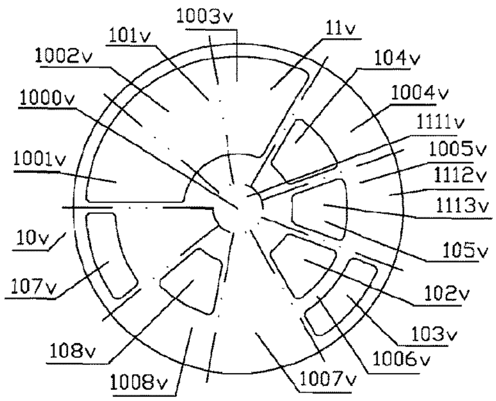

FIG. 231A is a top view of a first flow controlling element of the flow control apparatus according to the thirty-eighth preferred embodiment of the present invention, wherein the dot-dash lines shown in the FIG. 231A are used for showing the different portions of the first flow controlling side of the first flow controlling element.

Figure 231B:
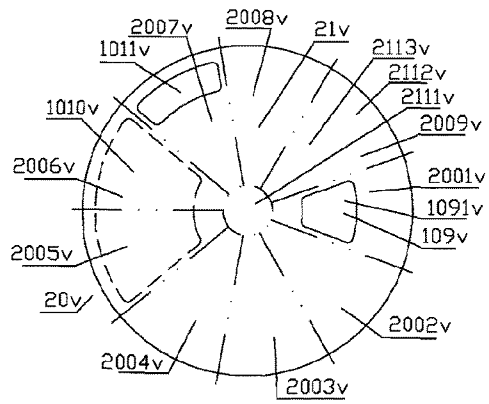

FIG. 231B is a top view of a second flow controlling element of the flow control apparatus according to the thirty-eighth preferred embodiment of the present invention, wherein the dot-dash lines shown in the FIG. 231B are used for showing different portions of the second flow controlling side of the second flow controlling element.

Figure 231C:
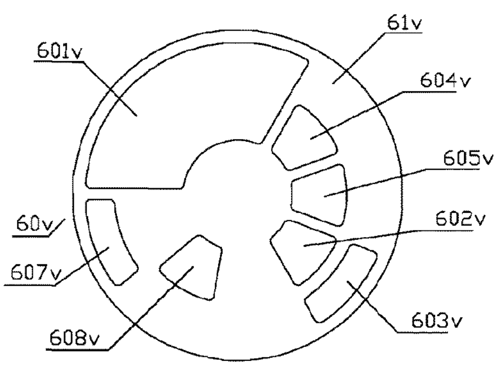

FIG. 231C is a top view of a wear resistant member of the flow control apparatus according to the thirty-eighth preferred embodiment of the present invention.

Figure 231D:
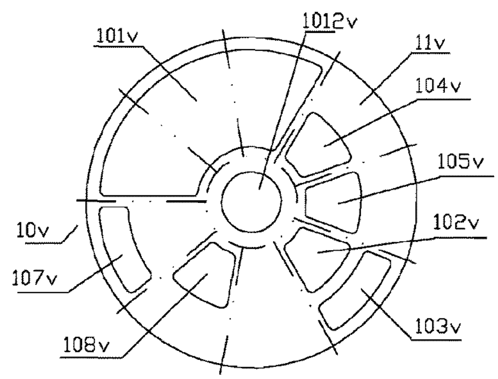

FIG. 231D is a top view of a first flow controlling element of an alternative of the flow control apparatus according to the thirty-eighth preferred embodiment of the present invention, wherein the dot-dash lines shown in the FIG. 231D are used for showing different portions of the first flow controlling side of the first flow controlling element.

Figure 231E:
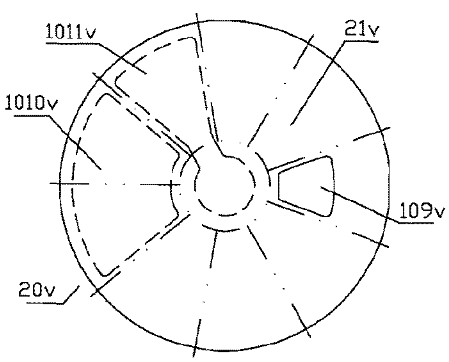

FIG. 231E is a top view of a second flow controlling element of an alternative of the flow control apparatus according to the thirty-eighth preferred embodiment of the present invention, wherein the dot-dash lines shown in the FIG. 231E are used for showing different portions of the second flow controlling side of the second flow controlling element.

Figure 231F:
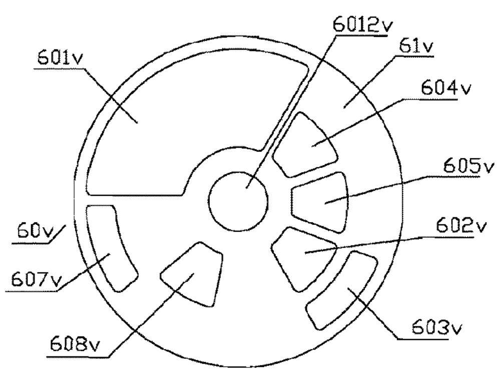

FIG. 231F is a top view of an alternative of a wear resistant member of the flow control apparatus according to the thirty-eighth preferred embodiment of the present invention.

Figure 232A:
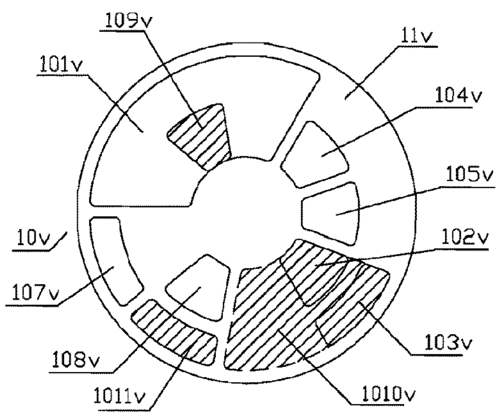

FIG. 232A is a top view of the flow control apparatus according to the thirty-eighth preferred embodiment of the present invention, showing the location of the first flow controlling element relative to the second flow controlling element when the flow control apparatus is under a first working state.

Figure 232B:
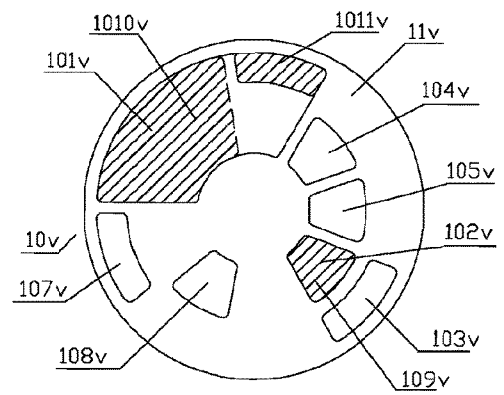

FIG. 232B is a top view of the flow control apparatus according to the thirty-eighth preferred embodiment of the present invention, showing the location of the first flow controlling element relative to the second flow controlling element when the flow control apparatus is under a second working state.

Figure 232C:
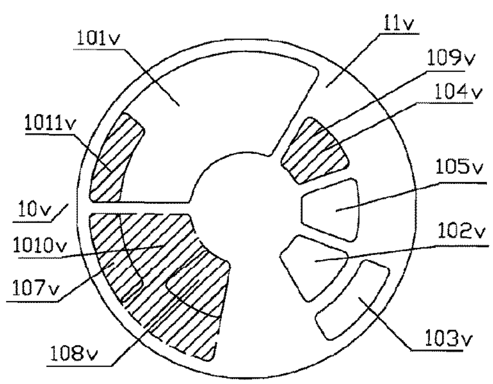

FIG. 232C is a top view of the flow control apparatus according to the thirty-eighth preferred embodiment of the present invention, showing the location of the first flow controlling element relative to the second flow controlling element when the flow control apparatus is under a third working state.

Figure 232D:
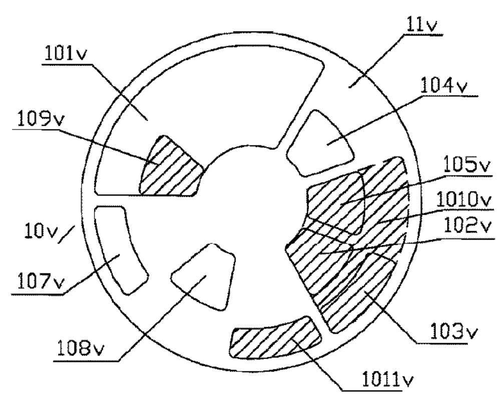

FIG. 232D is a top view of the flow control apparatus according to the thirty-eighth preferred embodiment of the present invention, showing the location of the first flow controlling element relative to the second flow controlling element when the flow control apparatus is under a fourth working state.

Figure 232E:
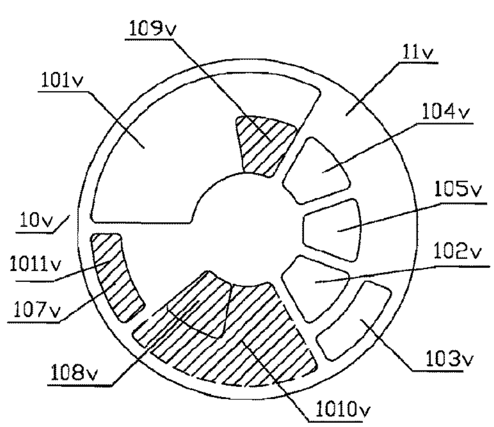

FIG. 232E is a top view of the flow control apparatus according to the thirty-eighth preferred embodiment of the present invention, showing the location of the first flow controlling element relative to the second flow controlling element when the flow control apparatus is under a fifth working state.

Figure 232F:
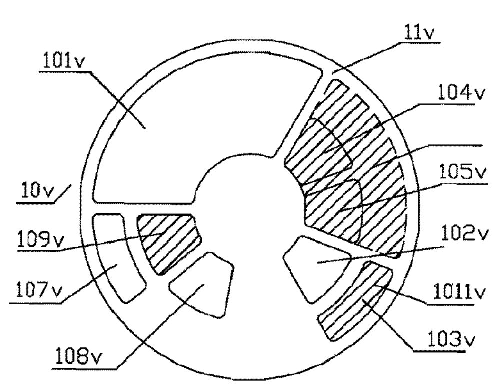

FIG. 232F is a top view of the flow control apparatus according to the thirty-eighth preferred embodiment of the present invention, showing the location of the first flow controlling element relative to the second flow controlling element when the flow control apparatus is under a pause state.

Figure 233:
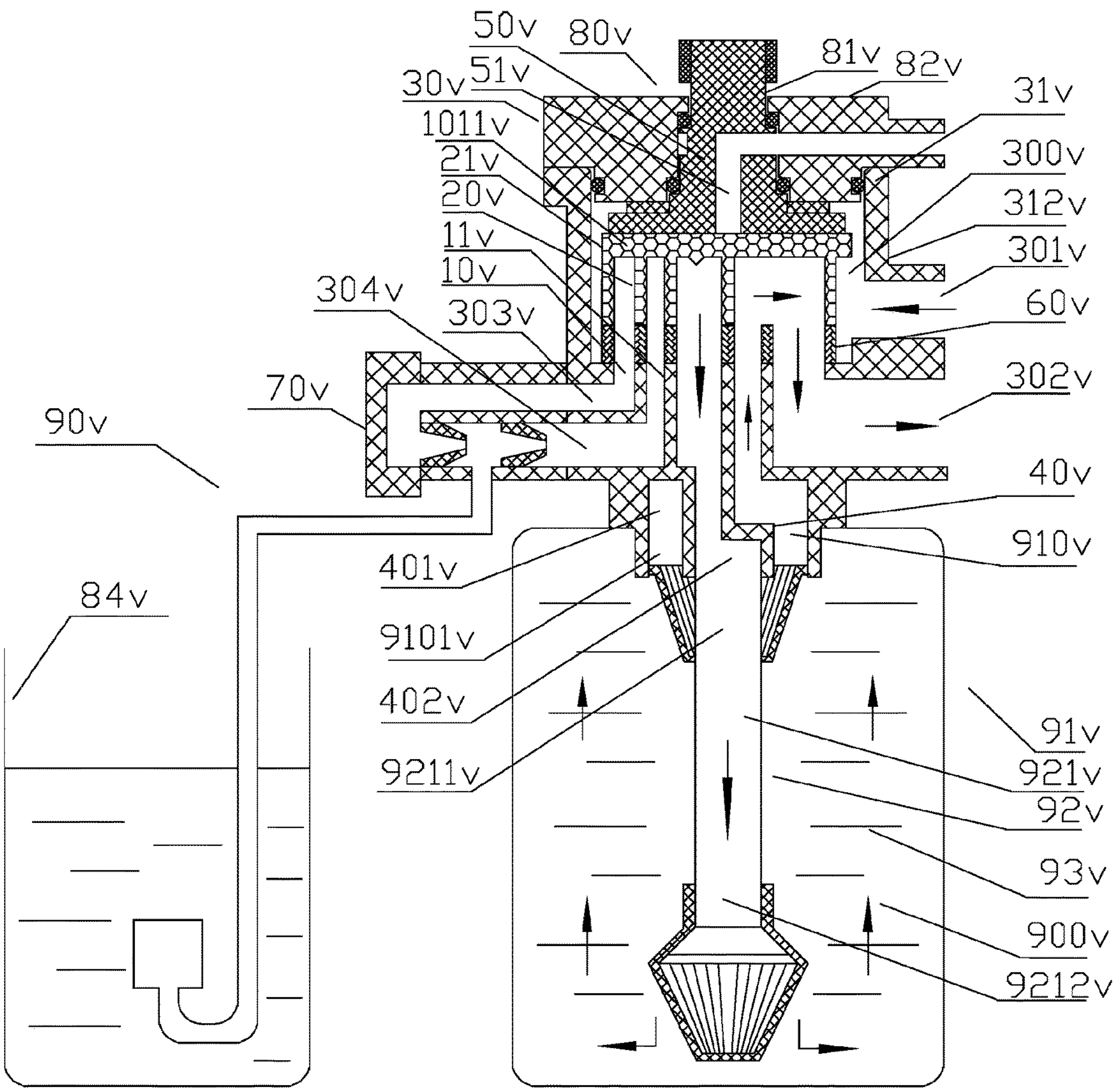

FIG. 233 is a sectional view of a water treatment apparatus employing the flow control apparatus according to the thirty-eighth preferred embodiment of the present invention, illustrating that the water treatment apparatus is able to process water when the flow control apparatus is under a first working state.

Figure 234:
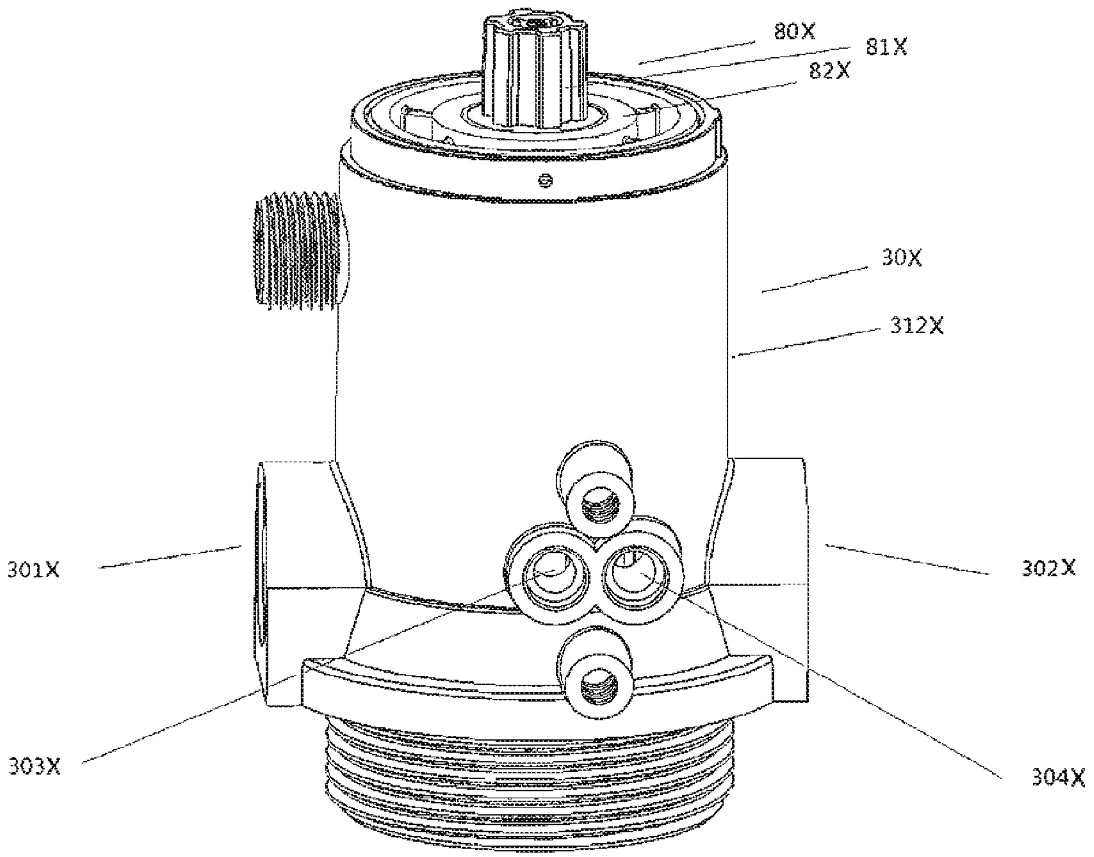

FIG. 234 is a front view of a flow control apparatus according to the thirty-ninth preferred embodiment of the present invention.

Figure 235A:
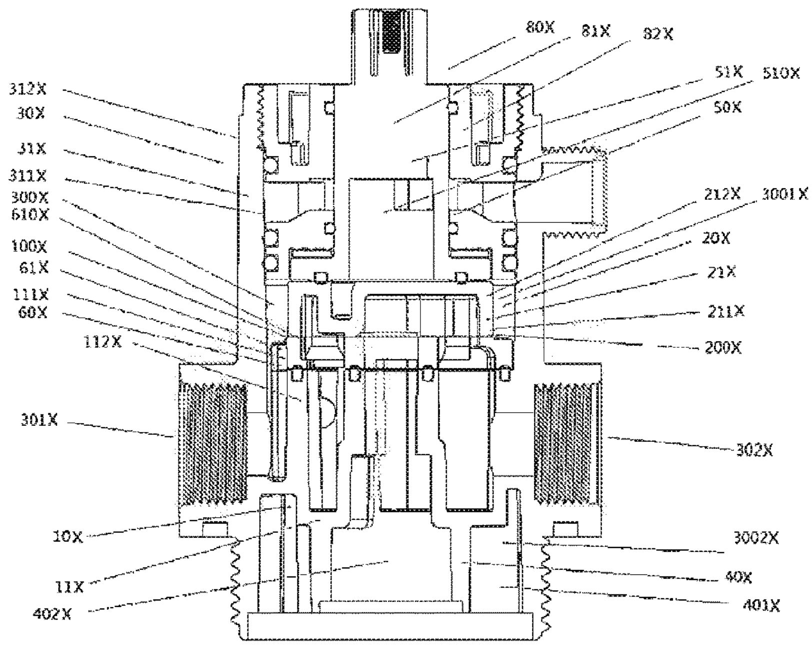

FIG. 235A is a sectional view of a flow control apparatus according to the thirty-ninth preferred embodiment of the present invention.

Figure 235B:
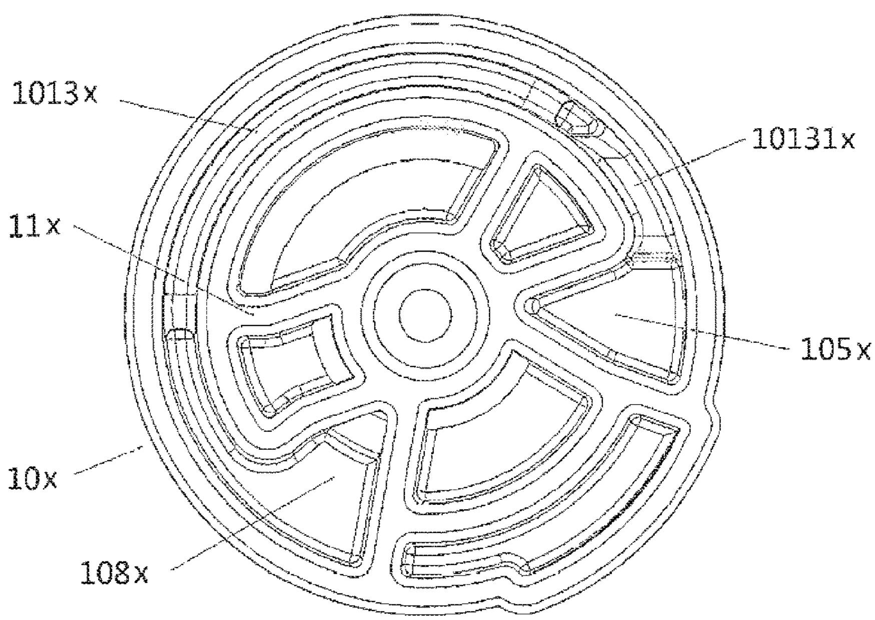

FIG. 235B is a top view of a thirteenth channel of a flow control apparatus according to the thirty-ninth preferred embodiment of the present invention.

Figure 236A:
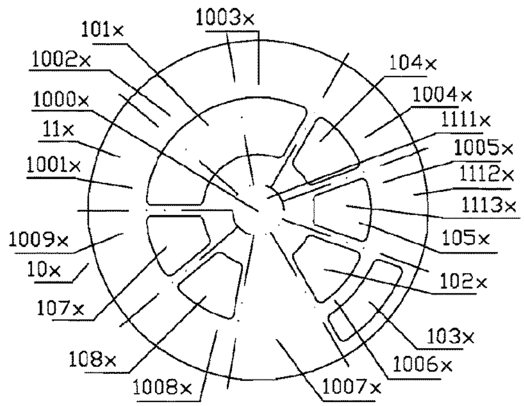

FIG. 236A is a top view of a first flow controlling element of the flow control apparatus according to the thirty-ninth preferred embodiment of the present invention, wherein the dot-dash lines shown in the FIG. 236A are used for showing the different portions of the first flow controlling side of the first flow controlling element.

Figure 236B:
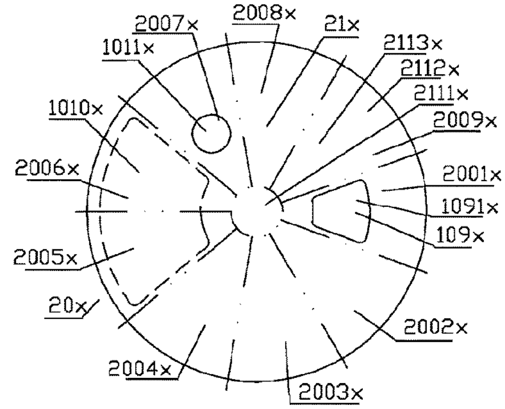

FIG. 236B is a top view of a second flow controlling element of the flow control apparatus according to the thirty-ninth preferred embodiment of the present invention, wherein the dot-dash lines shown in the FIG. 236B are used for showing the different portions of the second flow controlling side of the second flow controlling element.

Figure 236C:
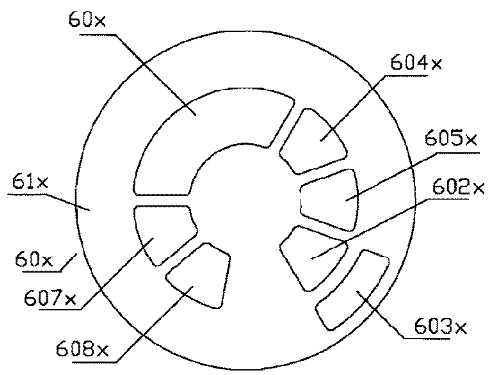

FIG. 236C is a top view of a wear resistant member of the flow control apparatus according to the thirty-ninth preferred embodiment of the present invention.

Figure 236D:
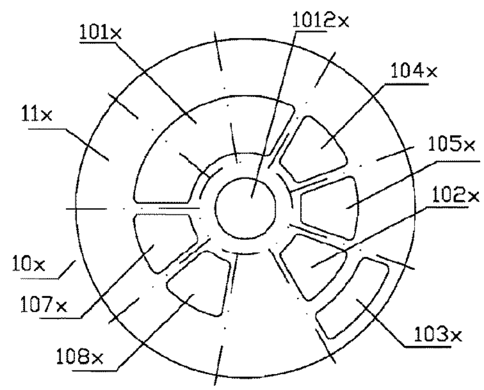

FIG. 236D is a top view of a first flow controlling element of an alternative of the flow control apparatus according to the thirty-ninth preferred embodiment of the present invention, wherein the dot-dash lines shown in the FIG. 236D are used for showing different portions of the first flow controlling side of the first flow controlling element.

Figure 236E:
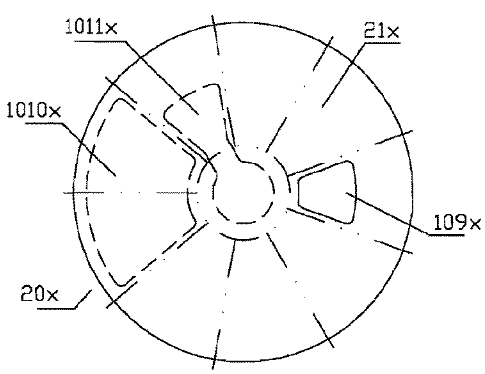

FIG. 236E is a top view of a second flow controlling element of an alternative of the flow control apparatus according to the thirty-ninth preferred embodiment of the present invention, wherein the dot-dash lines shown in the FIG. 236E are used for showing different portions of the second flow controlling side of the second flow controlling element.

Figure 236F:
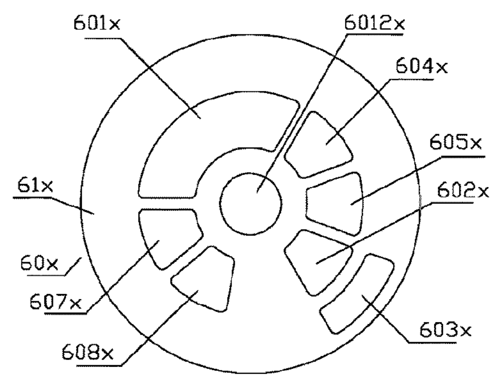

FIG. 236F is a top view of an alternative of a wear resistant member of the flow control apparatus according to the thirty-ninth preferred embodiment of the present invention.

Figure 237A:
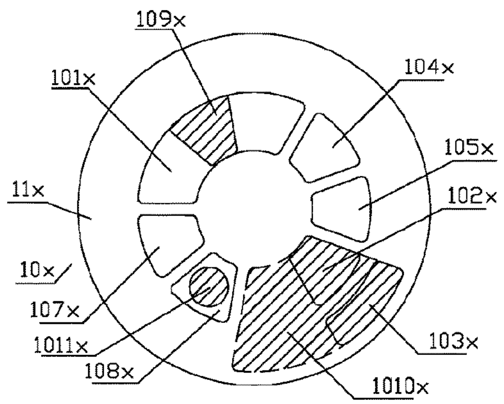

FIG. 237A is a top view of the flow control apparatus according to the thirty-ninth preferred embodiment of the present invention, showing the location of the first flow controlling element relative to the second flow controlling element when the flow control apparatus is under a first working state.

Figure 237B:
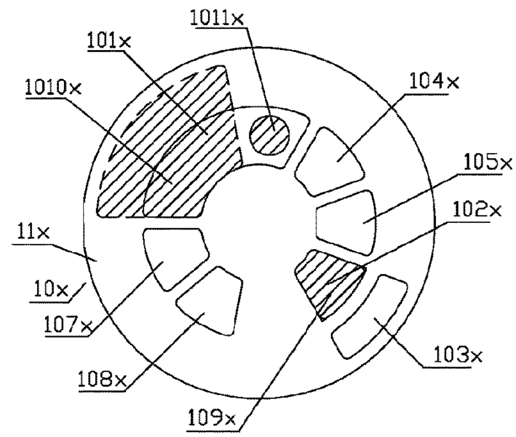

FIG. 237B is a top view of the flow control apparatus according to the thirty-ninth preferred embodiment of the present invention, showing the location of the first flow controlling element relative to the second flow controlling element when the flow control apparatus is under a second working state.

Figure 237C:
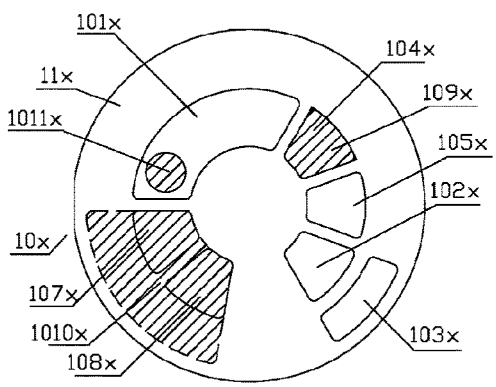

FIG. 237C is a top view of the flow control apparatus according to the thirty-ninth preferred embodiment of the present invention, showing the location of the first flow controlling element relative to the second flow controlling element when the flow control apparatus is under a third working state.

Figure 237D:
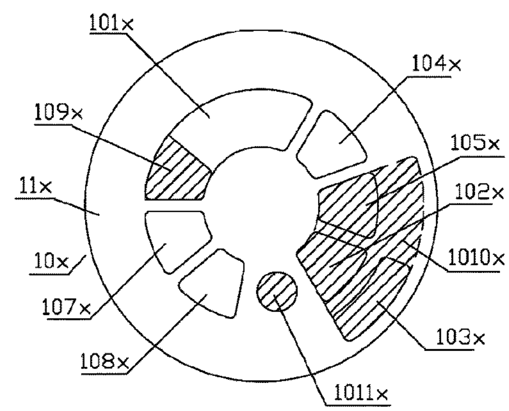

FIG. 237D is a top view of the flow control apparatus according to the thirty-ninth preferred embodiment of the present invention, showing the location of the first flow controlling element relative to the second flow controlling element when the flow control apparatus is under a fourth working state.

Figure 237E:
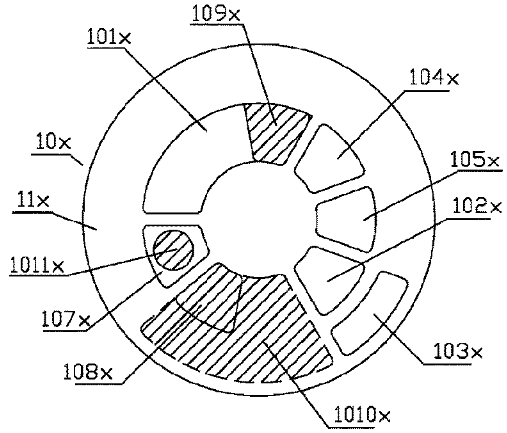

FIG. 237E is a top view of the flow control apparatus according to the thirty-ninth preferred embodiment of the present invention, showing the location of the first flow controlling element relative to the second flow controlling element when the flow control apparatus is under a fifth working state.

Figure 238:
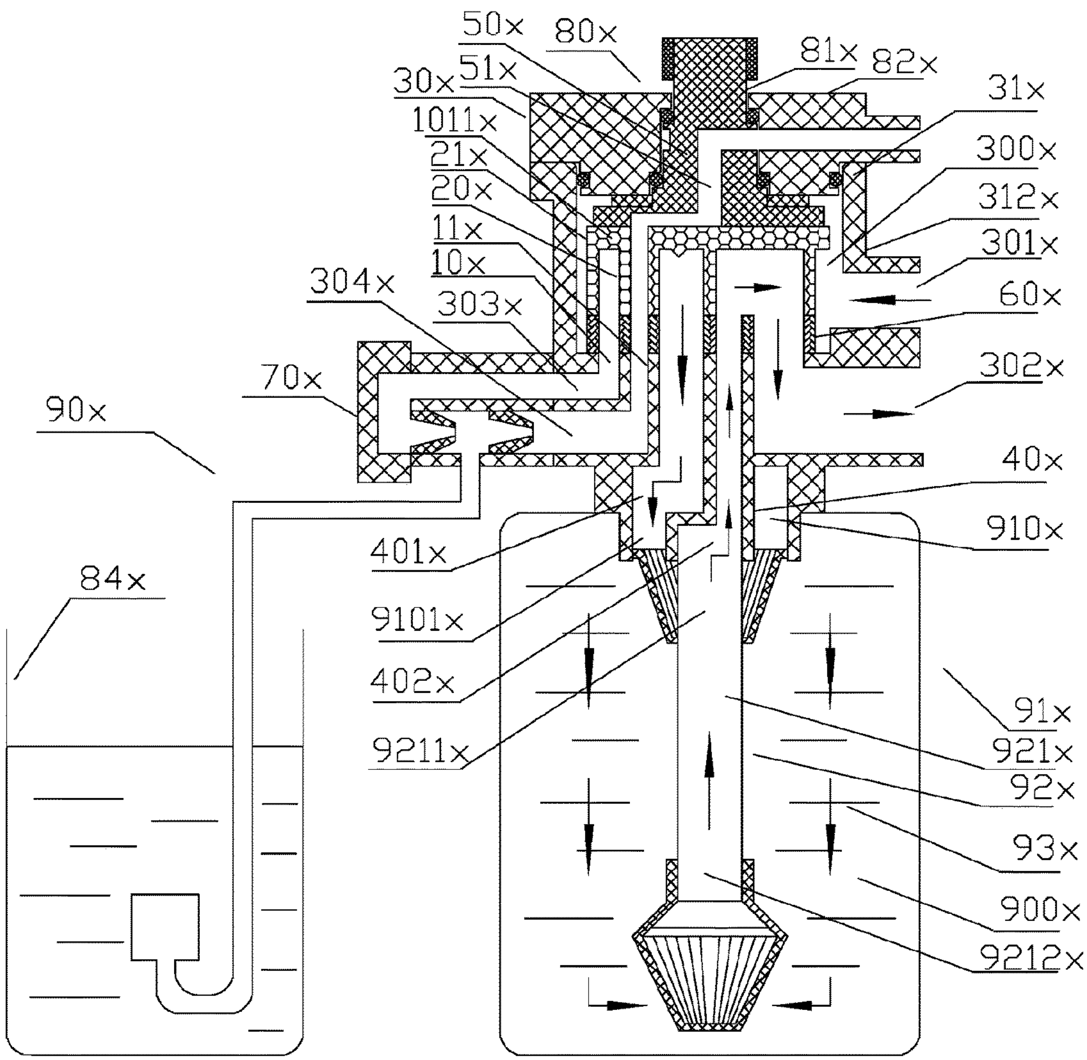

FIG. 238 is a sectional view of a water treatment apparatus employing the flow control apparatus according to the thirty-ninth preferred embodiment of the present invention, illustrating that the water treatment apparatus is able to process water when the flow control apparatus is under a first working state.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art and do not intend to limit the scope of the present invention. The general principles defined in the following description would be applied to other embodiments, alternatives, modifications, equivalents, and applications without departing from the spirit and scope of the present invention.

Combining the accompanying drawings and the following detailed description, the preferred embodiments of the present invention are detailedly described as follows. The following embodiments are exemplary only and not intended to be limiting.

Figure 4:
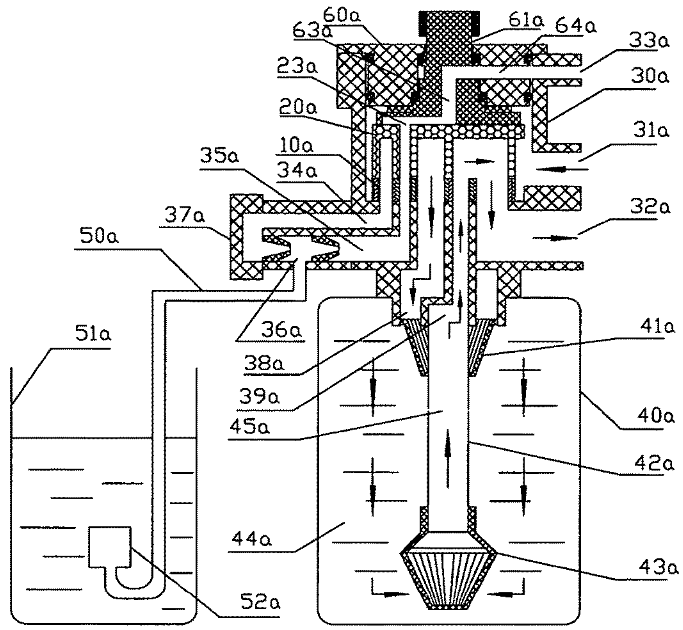
FIG. 4 is a structural diagram of the valve according to the first embodiment, wherein the valve is under the softening working state.

In the following first embodiment to eighth embodiment, when the water flow control apparatus of the present disclosure is used, which is provided with a water treatment container 40*a*, wherein a filter core 44*a* may be provided in the water treatment container 40*a*, or a filter material is provided in the water treatment container 40*a* to define the filter core 44*a*, wherein a first filter port 38*a* of a valve body 30*a* is communicated with an outside of the filter core 44*a* by an upper accumulating umbrella 41*a*, a second filter port 39*a* of the valve body 30*a* is communicated with the filter core 44*a* by a central tube 42*a* and a lower accumulating umbrella 43*a*, as shown in FIG. 4. Further, a water inlet port 31*a* is communicated with a water resource, an effluent outlet 33*a* is communicated with a draining device, a brine drawing port 36*a* is communicated with a brine valve 52*a* of a brine container 51*a* via a soft pipe 50*a*. When the water treatment apparatus is used for filter valve according to the present disclosure, the brine drawing port 36*a* needs to be closed. A valve rod 61*a* can be automatically or manually rotated, that is, a moving valve disc 20*a* may be driven to switch the different overlapping states between the moving valve disc 20*a* and the fixed valve disc 10*a* so as to achieve the different functions of the present disclosure. The following description is provided as an example for illustrating the present disclosure by using a resin filter. A driving device may be a valve rod or a gear, wherein the embodiments of the present disclosure employ the valve rod as an example of the driving device.

The first embodiment: an upflow regeneration softening valve comprising eight equal divisions, which employing a technical solution of draining via a valve rod.

Figure 1:
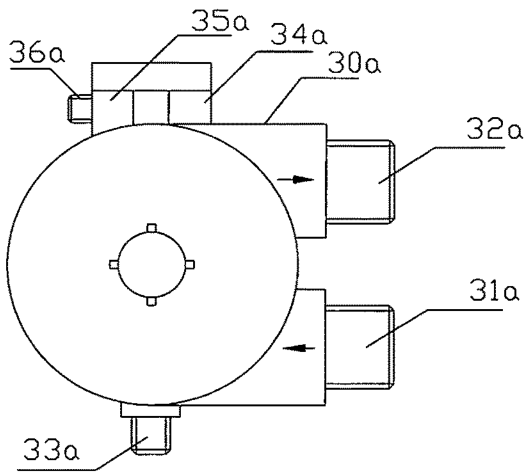
FIG. 1 is a top view of the valve body 30*a* according to the first embodiment to the eighth embodiment.
Figure 2:
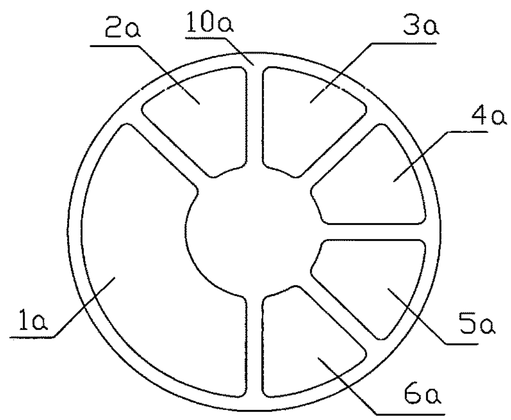
FIG. 2 is a flat structural diagram of the fixed valve disc 10*a* according to the first embodiment.
Figure 3:
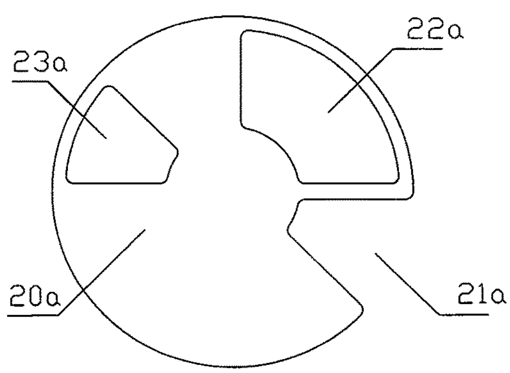
FIG. 3 is a top view of the moving valve disc 20*a* according to the first embodiment.

As shown in FIG. 1 to FIG. 4, the fixed valve disc and the moving valve disc shown in FIG. 2 and FIG. 3 are employed in the first embodiment. a multifunction softening valve, comprises a valve body 30*a*, a cover 60*a*, an injector 37*a*, a fixed valve disc 10*a* and a moving valve disc 20*a*, wherein the fixed valve disc10*a* and the moving valve disc 20*a* are respectively provided in the valve body 30*a*, wherein the head faces of the fixed valve disc10*a* and the moving valve disc 20*a* are hermetically and rotationally aligned with each other, wherein the moving valve disc 20*a* is connected with a valve rod 61*a*, wherein the softening valve has a water inlet port 31*a*, a water outlet port 32*a*, an effluent outlet 33*a*, an injector outlet 34*a*, an injector inlet 35*a*, a first filter port 38*a* and a second filter port 39*a* provided therein, wherein the injector 37*a* is communicated with the valve body 30*a* by the injector outlet 34*a* and the injector inlet 35*a*, wherein the injector 37*a* has a brine drawing port 36*a* provided therein; wherein the fixed valve disc 10*a* has six through holes: a first through hole 1*a*, a second through hole 2*a*, a third through hole 3*a*, a fourth through hole 4*a*, a fifth through hole 5*a* and a sixth through hole 6*a* provided therein, wherein in the softening valve, the first through hole 1*a* is adapted for being communicated with the first filter port 38*a*; the second through hole 2*a* and the fifth through hole 5*a* are communicated with each other and each of the second through hole 2*a* and the fifth through hole 5*a* is adapted for being communicated with the second filter port 39*a*; the third through hole 3*a* is communicated with the injector inlet 35*a*; the fourth through hole 4*a* is communicated with the injector outlet 34*a*; the sixth through hole 6*a* is communicated with the water outlet port 32*a*, wherein the first through hole 1*a* is neighboring to the second through hole 2*a*; the second through hole 2*a* is neighboring to the third through hole 3*a*; the third through hole 3*a* is neighboring to the fourth through hole 4*a*; the fourth through hole 4*a* is neighboring to the fifth through hole 5*a*; the fifth through hole 5*a* is neighboring to the sixth through hole 6*a*; the sixth through hole 6*a* is neighboring to the first through hole 1*a*, wherein the moving valve disc 20*a* has a water inlet channel 21*a* communicated with the water inlet port 31*a*, wherein the moving valve disc 20*a* further has a communicating blind recess 22*a* and a draining through hole 23*a* provided therein, wherein the draining through hole 23*a* is communicated with the effluent outlet 33*a* by the first pollution hole 63*a* provided in the valve rod 61*a* and the second pollution hole 64*a* provided in the cover 60*a* orderly.

The advantages of the valve are as follows: firstly, via the planar valve which may be divided to have eight equal portions, the brine intaking upflow regeneration function can be achieved, and comparing with the brine intaking downflow regeneration function, the brine intaking upflow regeneration function can effectively improve the regeneration efficiency of resin and decrease the brine consumption; secondly, the first through hole 1*a* may be arranged to cover three equal divisions of the eight equal divisions of the fixed valve disc 10*a* such that the inflow of water can be bigger and the rate of water inflow is improved; thirdly, the softening valve can orderly achieve five functions, that is, the five important functions that a softening valve should have may be achieved in a valve of the present disclosure after the moving valve disc 20 is rotated for a cycle; fourthly, in each of the five effective function states, no unnecessary draining when draining is not needed, which are helpful in saving water.

The following description is used for illustrating that the different overlappings between the fixed valve disc and the moving valve disc can be used for achieving five functions orderly.

Figure 5:
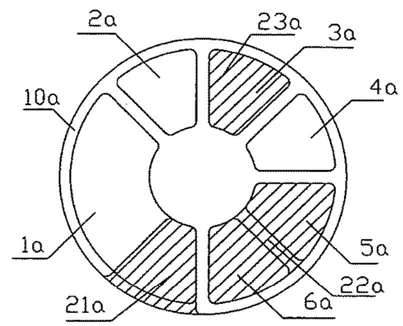
FIG. 5 is a location diagram of the moving valve disc 20*a* relative to the fixed valve disc 10*a*, wherein the moving valve disc 20*a* is shown in FIG. 4.

A softening function: as shown in FIG. 4 and FIG. 5, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the fifth through hole 5*a* and the sixth through hole 6*a* provided in the fixed valve disc 10*a*, and the draining through hole 23*a* may be overlapped and communicated with the third through hole 3*a* provided in the fixed valve disc 10*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a*, the upper accumulating umbrella 41*a* into the outside of the filter core 44*a*, and after being softened by resin, flow into the lower accumulating umbrella 43*a*, then flow into the second filter port 39*a* via the inside 45*a* of the filter core 44*a*, wherein because the second filter port 39*a* is communicated with the fifth through hole 5*a* of the fixed valve disc 10*a*, the water flow can flow into the fifth through hole 5*a*, and then flow into the sixth through hole 6*a* of the fixed valve disc 10*a* by flow guiding of the communicating blind recess 22*a*, wherein because the sixth through hole 6*a* is communicated with the water outlet port 32*a*, the water flow can flow into the water outlet port 32*a*. During the process, the second through hole 2*a* and the fourth through hole 4*a* of the fixed valve disc 10*a* are blocked and water cannot flow therethrough; the draining through hole 23*a* is overlapped and communicated with the third through hole 3*a* of the fixed valve disc 10*a* and no water flows therebetween.

Figure 6:
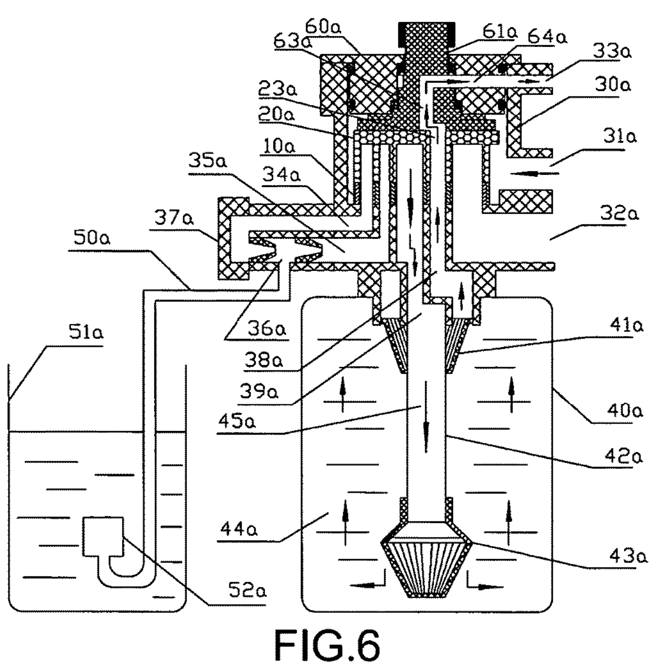
FIG. 6 is a structural diagram of the valve according to the first embodiment, wherein the valve is under a backwash working state.
Figure 7:
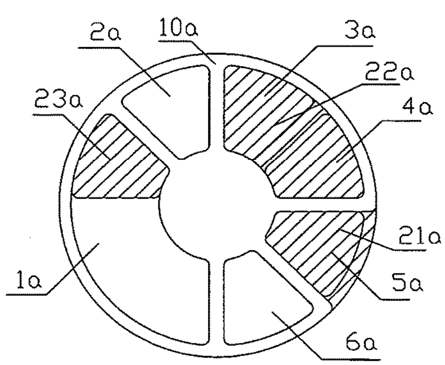
FIG. 7 is a location diagram of the moving valve disc 20*a* relative to the fixed valve disc 10*a*, wherein the moving valve disc 20*a* is shown in FIG. 6.

A backwash function: as shown in FIG. 6 and FIG. 7, by rotating the valve rod 61*a*, the water inlet channel 21*a* provided in the moving valve disc 20*a* may be overlapped and communicated with the fifth through hole 5*a* provided in the fixed valve disc 10*a*, the communicating blind recess 22*a* may be overlapped and communicated with the third through hole 3*a* and the fourth through hole 4*a* provided in the fixed valve disc 10*a*, and the draining through hole 23*a* may be overlapped and communicated with the first through hole 1*a* provided in the fixed valve disc 10*a*. In this overlapping state, water flow may be described as follows: the water flow from the water inlet port 31*a* may flow from the water inlet channel 21*a* of the moving valve disc 20*a* into the fifth through hole 5*a* of the fixed valve disc 10*a*, wherein because the fifth through hole 5*a* is communicated with the second filter port 39*a*, the water flow can flow through the second filter port 39*a*, then flow into the inside 45*a* of the filter core 44*a*, and then flow into the lower accumulating umbrella 43*a*, and after backwash the filter core 44*a*, flow into the upper accumulating umbrella 41*a*, and then flow into the first filter port 38*a*, wherein because the first through hole 1*a* of the fixed valve disc 10*a* is communicated with the first filter port 38*a*, the water flow may flow into the first through hole 1*a*, then flow into the draining through hole 23*a*, and then flow through the effluent outlet 33*a* to drain via the first pollution through hole 63*a* provided in the valve rod 61*a* and the second pollution through hole 64*a* provided in the cover 60*a* orderly. During the process, the second through hole 2*a* and the sixth through hole 6*a* of the fixed valve disc 10*a* are blocked and water cannot flow therethrough, wherein the communicating blind recess 22*a* is able to block and seal the third through hole 3*a* and the fourth through hole 4*a* of the fixed valve disc 10*a*.

Figure 8:
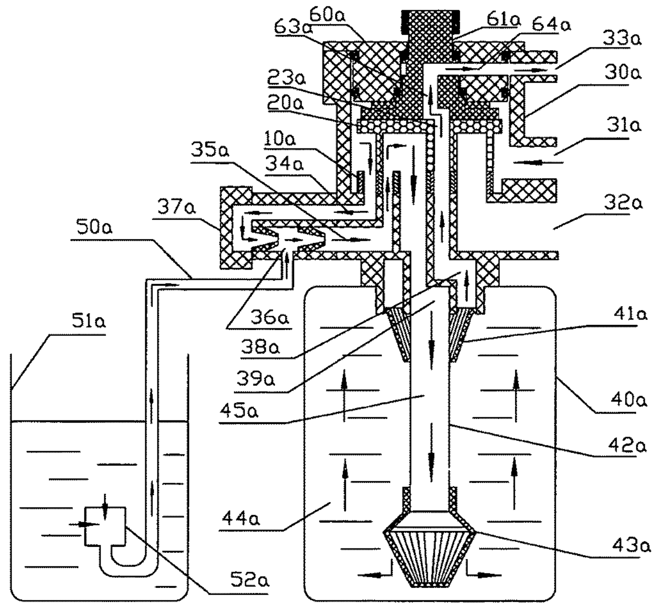
FIG. 8 is a structural diagram of the valve according to the first embodiment, wherein the valve is under a brine intaking upflow regeneration working state.
Figure 9:
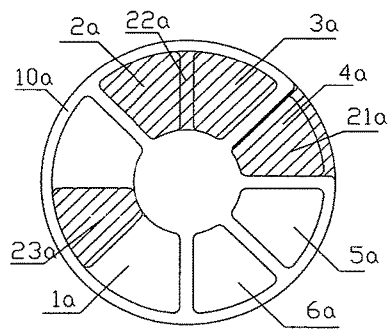
FIG. 9 is a location diagram of the moving valve disc 20*a* relative to the fixed valve disc 10*a*, wherein the moving valve disc 20*a* is shown in FIG. 8.

A brine intaking upflow regeneration function: as shown in FIG. 8 and FIG. 9, by rotating the valve rod 61*a*, the water inlet channel 21*a* provided in the moving valve disc 20*a* may be overlapped and communicated with the fourth through hole 4*a* provided in the fixed valve disc 10*a*, the communicating blind recess 22*a* may be overlapped and communicated with the second through hole 2*a* and the third through hole 3*a* provided in the fixed valve disc 10*a*, and the draining through hole 23*a* may be overlapped and communicated with the first through hole 1*a* provided in the fixed valve disc 10*a*. In this overlapping state, water flow may be described as follows: the water flow from the water inlet port 31*a* may flow from the water inlet channel 21*a* of the moving valve disc 20*a* into the fourth through hole 4*a* of the fixed valve disc 10*a*, wherein because the fourth through hole 4*a* is communicated with the injector outlet 34*a*, the water flow can flow through the injector outlet 34*a*, and inject via the injector 37*a* to define a negative pressure in the brine drawing port 36*a* of the injector 37*a* so as to draw the brine from the brine container 51*a* via a brine valve 52*a* and a soft pipe 50*a*, and the mixed brine water flow defined by the raw water and the brine water may flow into the injector inlet 35*a*, wherein because the third through hole 3*a* is communicated with the injector inlet 35*a*, the mixed brine water may flow into the third through hole 3*a*, and then flow into the second through hole 2*a* via the communicating blind recess 22*a*, wherein because the second through hole 2*a* is communicated with the second filter port 39*a*, the mixed brine water may flow into the second filter port 39*a*, and then flow through the inside 45*a* of the filter core 44*a*, then flow into the filter core 44*a* via the lower accumulating umbrella 43*a* and flow upwardly from the lower portion of resin layer, and after the mixed brine water regenerates the resin upflow, it flows through the upper accumulating umbrella 43*a*, and then flows into the first filter port 38*a*, wherein because the first through hole 1*a* is communicated with the first filter port 38*a*, the water flow may flow into the first through hole 1*a*, and then flow through the draining through hole 23*a*, and after flow through the first pollution through hole 63*a* provided in the valve rod 61*a* and the second pollution through hole 64*a* provided in the cover 60*a* orderly to drain via the effluent outlet 33*a*. During the process, the fifth through hole 5*a* and the sixth through hole 6*a* of the fixed valve disc 10*a* are blocked and water cannot flow therethrough.

Figure 10:
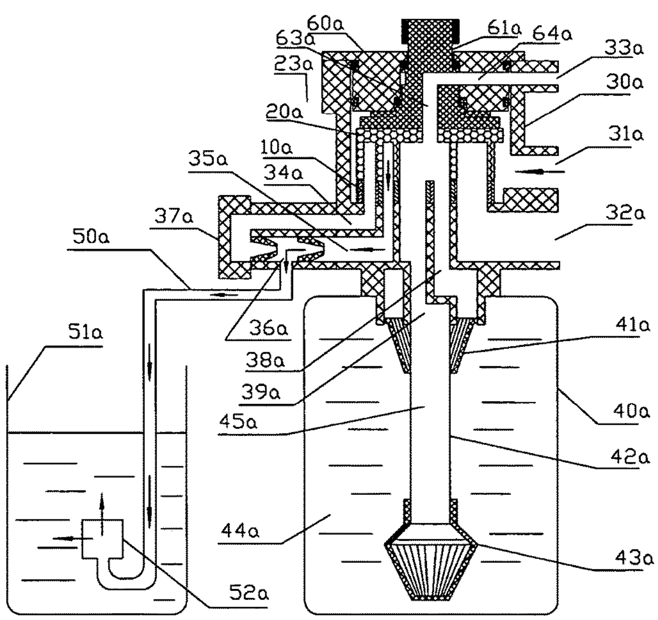
FIG. 10 is a structural diagram of the valve according to the first embodiment, wherein the valve is under a brine container water supplement working state.
Figure 11:
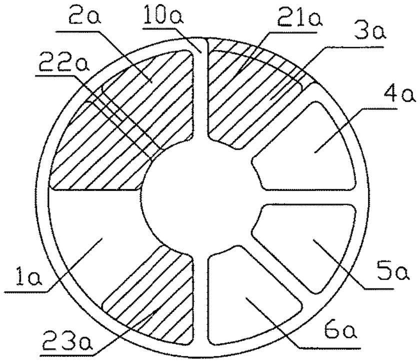
FIG. 11 is a location diagram of the moving valve disc 20*a* relative to the fixed valve disc 10*a*, wherein the moving valve disc 20*a* is shown in FIG. 10.

A brine container water supplement function: as shown in FIG. 10 and FIG. 11, by rotating the valve rod 61*a*, the water inlet channel 21*a* provided in the moving valve disc 20*a* may be overlapped and communicated with the third through hole 3*a* provided in the fixed valve disc 10*a*, the communicating blind recess 22*a* may be overlapped and communicated with the first through hole 1*a* and the second through hole 2*a* provided in the fixed valve disc 10*a*, and the draining through hole 23*a* may be overlapped and communicated with the first through hole 1*a* provided in the fixed valve disc 10*a*. In this overlapping state, water flow may be described as follows: the water flow from the water inlet port 31*a* may flow from the water inlet channel 21*a* of the moving valve disc 20*a* into the third through hole 3*a* of the fixed valve disc 10*a*, wherein because the third through hole 3*a* is communicated with the injector inlet 35*a*, the water flow can flow through the injector inlet 35*a*, so the water flow flows into the injector inlet 35*a*, and then flows through the brine drawing port 36*a*, the soft pipe 50*a*, the brine valve 52*a* orderly and flows into the brine container 51*a*. Because the fourth through hole 4*a* provided in the fixed valve disc 10*a* is blocked and covered by the moving valve disc 20*a* and water cannot flow therethrough, and the fourth through hole 4*a* is communicated with the injector outlet 34*a*, so no water flow runs through the injector outlet 34*a*. During the process, the fifth through hole 5*a* and the sixth through hole 6*a* of the fixed valve disc 10*a* are blocked and covered by the moving valve disc 20*a* and water cannot flow therethrough, and although the communicating blind recess 22*a* is communicated and overlapped with the first through hole 1*a* and the second through hole 2*a* of the fixed valve disc 1*a*, but no water flows therebetween, and although the draining through hole 23*a* is overlapped and communicated with the first through hole 1*a* of the fixed valve disc 10*a*, but no water flows therebetween.

Figure 12:
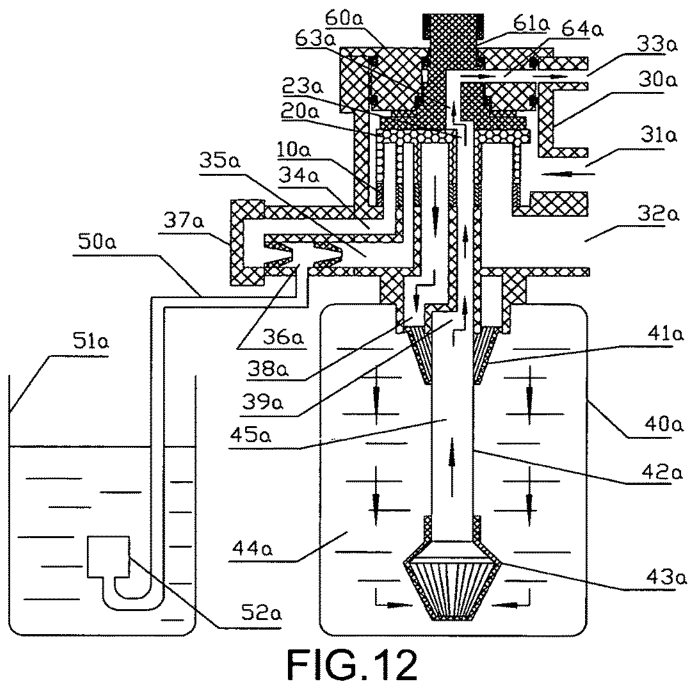
FIG. 12 is a structural diagram of the valve according to the first embodiment, wherein the valve is under a forwardwash working state.
Figure 13:
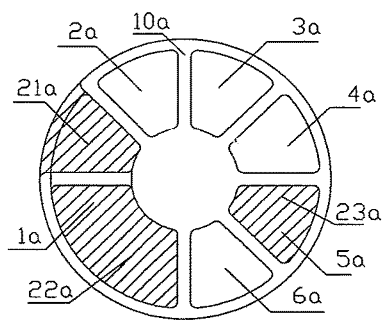
FIG. 13 is a location diagram of the moving valve disc 20*a* relative to the fixed valve disc 10*a*, wherein the moving valve disc 20*a* is shown in FIG. 12.

A forwardwash function: as shown in FIG. 12 and FIG. 13, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the first through hole 1*a* provided in the fixed valve disc 10*a* too, and the draining through hole 23*a* may be overlapped and communicated with the fifth through hole 5*a* provided in the fixed valve disc 10*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a* and flow through the upper accumulating umbrella 41*a* into the outside of the filter core 44*a*, and after flushing the residue of brine fluid, flow into the lower accumulating umbrella 43*a*, then flow into the second filter port 39*a* via the inside 45*a* of the filter core 44*a*, wherein because the second filter port 39*a* is communicated with the fifth through hole 5*a* of the fixed valve disc 10*a*, the water flow may flow into the fifth through hole 5*a*, and then flow through the draining through hole 23*a*, and after flow through the first pollution through hole 63*a* provided in the valve rod 61*a* and the second pollution through hole 64*a* provided in the cover 60*a* orderly to drain via the effluent outlet 33*a*. During the process, the second through hole 2*a*, the third through hole 3*a*, the fourth through hole 4*a* and the sixth through hole 6*a* of the fixed valve disc 10*a* are blocked and covered by the moving valve disc 20*a* and water cannot flow therethrough, wherein the communicating blind recess 22*a* is able to block and seal the first through hole 1*a* of the fixed valve disc 10*a*.

The second embodiment: an upflow regeneration softening valve comprising eight equal divisions, which employing a technical solution of draining via a seventh through hole provided in the fixed valve disc and the valve body orderly.

Figure 14:
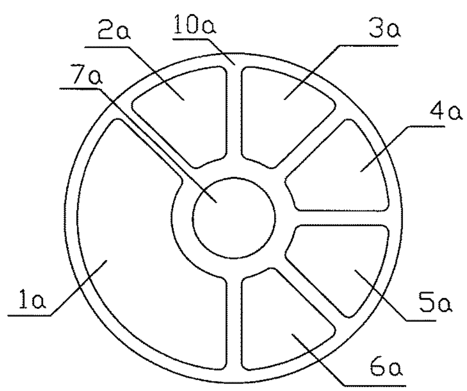
FIG. 14 is a flat structural diagram of the fixed valve disc 10*a* according to the second embodiment.
Figure 15:
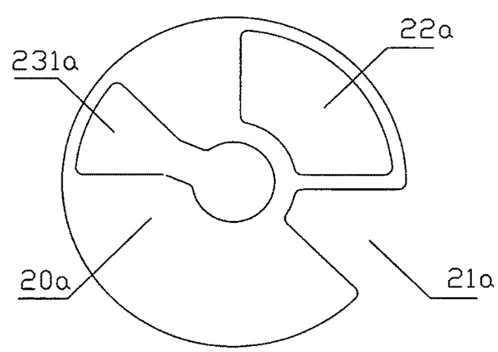
FIG. 15 is a top view of the moving valve disc 20*a* according to the second embodiment.
Figure 16:
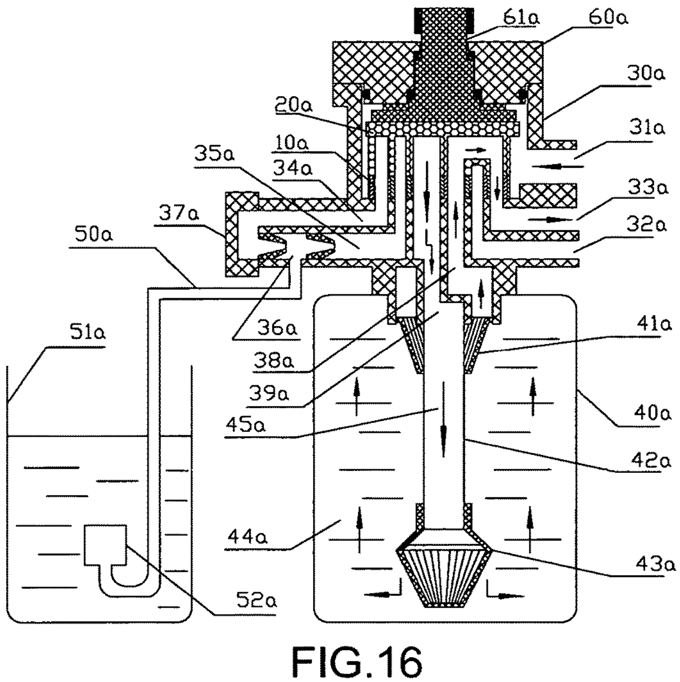
FIG. 16 is a structural diagram of the valve according to the second embodiment, wherein the valve is under a backwash working state.

As shown in FIG. 14 to FIG. 16, the fixed valve disc and the moving valve disc shown in FIG. 14 and FIG. 15 are employed in the second embodiment. a multifunction softening valve, comprises a valve body 30*a*, a cover 60*a*, an injector 37*a*, a fixed valve disc 10*a* and a moving valve disc 20*a*, wherein the fixed valve disc10*a* and the moving valve disc 20*a* are respectively provided in the valve body 30*a*, wherein the head faces of the fixed valve disc10*a* and the moving valve disc 20*a* are hermetically and rotationally aligned with each other, wherein the moving valve disc 20*a* is connected with a valve rod 61*a*, wherein the softening valve has a water inlet port 31*a*, a water outlet port 32*a*, an effluent outlet 33*a*, an injector outlet 34*a*, an injector inlet 35*a*, a first filter port 38*a* and a second filter port 39*a* provided therein, wherein the injector 37*a* is communicated with the valve body 30*a* by the injector outlet 34*a* and the injector inlet 35*a*, wherein the injector 37*a* has a brine drawing port 36*a* provided therein; wherein the fixed valve disc 10*a* has six through holes: a first through hole 1*a*, a second through hole 2*a*, a third through hole 3*a*, a fourth through hole 4*a*, a fifth through hole 5*a* and a sixth through hole 6*a* provided therein, wherein in the softening valve, the first through hole 1*a* is adapted for being communicated with the first filter port 38*a*; the second through hole 2*a* and the fifth through hole 5*a* are communicated with each other and each of the second through hole 2*a* and the fifth through hole 5*a* is adapted for being communicated with the second filter port 39*a*; the third through hole 3*a* is communicated with the injector inlet 35*a*; the fourth through hole 4*a* is communicated with the injector outlet 34*a*; the sixth through hole 6*a* is communicated with the water outlet port 32*a*, wherein the first through hole 1*a* is neighboring to the second through hole 2*a*; the second through hole 2*a* is neighboring to the third through hole 3*a*; the third through hole 3*a* is neighboring to the fourth through hole 4*a*; the fourth through hole 4*a* is neighboring to the fifth through hole 5*a*; the fifth through hole 5*a* is neighboring to the sixth through hole 6*a*; the sixth through hole 6*a* is neighboring to the first through hole 1*a*, wherein the fixed valve disc 10*a* further has a seventh through hole 7*a* provided therein, wherein the seventh through hole 7*a* is provided in a center of the fixed valve disc 10*a*; wherein the moving valve disc 20*a* has a water inlet channel 21*a* communicated with the water inlet port 31*a*, wherein the moving valve disc 20*a* further has a communicating blind recess 22*a* and a draining blind recess 231*a* provided therein, wherein one end of the draining blind recess 231*a* is provided in the center of the moving valve disc 20*a*, and the draining blind recess 231*a* is communicated with the effluent outlet 33*a* by the seventh through hole 7*a* of the fixed valve disc 10*a*.

The differences between the first embodiment and the second embodiment are as follows: in the second embodiment, the center of the fixed valve disc 10*a* has the seventh through hole 7*a* provided therein, and the moving valve disc 20*a* has a draining blind recess 231*a* provided therein; in the first embodiment, the fixed valve disc 10*a* has no a seventh through hole 7*a*, and the moving valve disc 20*a* has a draining through hole provided therein. The structural differences result in the following differences of draining: the drainage way in the second embodiment: water flow is guided to flow into the seventh through hole 7*a* via the draining blind recess 231*a* of the moving valve disc 20*a*, and then flows into the effluent outlet 33*a* provided in the valve body 30*a* to drain; the drainage way in the first embodiment: water flow flows through the draining through hole of the moving valve disc, and after flows through the first pollution through hole provided in the valve rod and the second pollution through hole provided in the cover orderly, drains via the effluent outlet. So only one example is described for explaining detailedly the backwash function, and the illustrations for the other four functions can be omitted.

Figure 17:
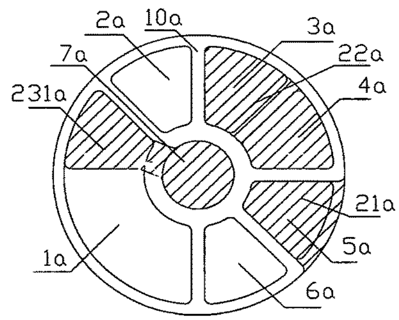
FIG. 17 is a location diagram of the moving valve disc 20*a* relative to the fixed valve disc 10*a*, wherein the moving valve disc 20*a* is shown in FIG. 16.

A backwash function: as shown in FIG. 16 and FIG. 17, by rotating the valve rod 61*a*, the water inlet channel 21*a* provided in the moving valve disc 20*a* may be overlapped and communicated with the fifth through hole 5*a* provided in the fixed valve disc 10*a*, the communicating blind recess 22*a* may be overlapped and communicated with the third through hole 3*a* and the fourth through hole 4*a* provided in the fixed valve disc 10*a*, and the draining blind recess 231*a* may be overlapped and communicated with the first through hole 1*a* and the seventh through hole 7*a* provided in the fixed valve disc 10*a*. In this overlapping state, water flow may be described as follows: the water flow from the water inlet port 31*a* may flow from the water inlet channel 21*a* of the moving valve disc 20*a* into the fifth through hole 5*a* of the fixed valve disc 10*a*, wherein because the fifth through hole 5*a* is communicated with the second filter port 39*a*, the water flow can flow through the second filter port 39*a*, then flow into the inside 45*a* of the filter core 44*a*, and then flow into the lower accumulating umbrella 43*a*, and after backwash the filter core 44*a*, flow into the upper accumulating umbrella 41*a*, and then flow into the first filter port 38*a*, wherein because the first through hole 1*a* of the fixed valve disc 10*a* is communicated with the first filter port 38*a*, so the water flow may flow into the first through hole 1*a*, and then the water flow is guided to flow into the seventh through hole 7*a* by the draining blind recess 231*a*, wherein because the seventh through hole 7*a* is communicated with the effluent outlet 33*a*, so the water flow may flow into the effluent outlet 33*a* to drain. During the process, the second through hole 2*a* and the sixth through hole 6*a* of the fixed valve disc 10*a* are blocked and water cannot flow therethrough, wherein the communicating blind recess 22*a* is able to block and seal the third through hole 3*a* and the fourth through hole 4*a* of the fixed valve disc 10*a*.

The third embodiment: an upflow regeneration and softened water supplement softening valve comprising nine equal divisions, which employing a technical solution of draining via a valve rod.

Figure 18:
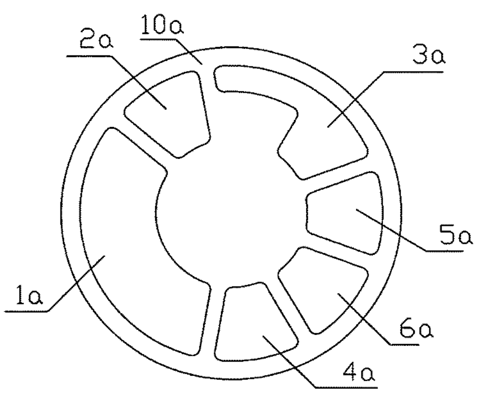
FIG. 18 is a flat structural diagram of the fixed valve disc 10*a* according to the third embodiment.
Figure 19:
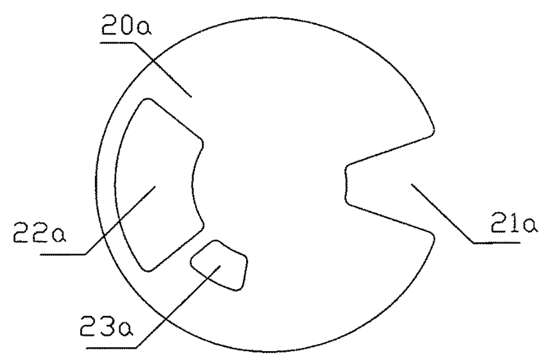
FIG. 19 is a top view of the moving valve disc 20*a* according to the third embodiment.

As shown in FIG. 4, FIG. 18 to FIG. 19, the fixed valve disc and the moving valve disc shown in FIG. 18 and FIG. 19 are employed in the third embodiment. a multifunction softening valve, comprises a valve body 30*a*, a cover 60*a*, an injector 37*a*, a fixed valve disc 10*a* and a moving valve disc 20*a*, wherein the fixed valve disc10*a* and the moving valve disc 20*a* are respectively provided in the valve body 30*a*, wherein the head faces of the fixed valve disc10*a* and the moving valve disc 20*a* are hermetically and rotationally aligned with each other, wherein the moving valve disc 20*a* is connected with a valve rod 61*a*, wherein the softening valve has a water inlet port 31*a*, a water outlet port 32*a*, an effluent outlet 33*a*, an injector outlet 34*a*, an injector inlet 35*a*, a first filter port 38*a* and a second filter port 39*a* provided therein, wherein the injector 37*a* is communicated with the valve body 30*a* by the injector outlet 34*a* and the injector inlet 35*a*, wherein the injector 37*a* has a brine drawing port 36*a* provided therein; wherein the fixed valve disc 10*a* has six through holes: a first through hole 1*a*, a second through hole 2*a*, a third through hole 3*a*, a fourth through hole 4*a*, a fifth through hole 5*a* and a sixth through hole 6*a* provided therein, wherein in the softening valve, the first through hole 1*a* is adapted for being communicated with the first filter port 38*a*; the second through hole 2*a* and the fifth through hole 5*a* are communicated with each other and each of the second through hole 2*a* and the fifth through hole 5*a* is adapted for being communicated with the second filter port 39*a*; the third through hole 3*a* is communicated with the injector inlet 35*a*; the fourth through hole 4*a* is communicated with the injector outlet 34*a*; the sixth through hole 6*a* is communicated with the water outlet port 32*a*, wherein the first through hole 1*a* is neighboring to the second through hole 2*a*; the second through hole 2*a* is neighboring to the third through hole 3*a*; the third through hole 3*a* is neighboring to the fifth through hole 5*a*; the fifth through hole 5*a* is neighboring to the sixth through hole 6*a*; the sixth through hole 6*a* is neighboring to the fourth through hole 4*a*; the fourth through hole 4*a* is neighboring to the first through hole 1*a*; wherein the moving valve disc 20*a* has a water inlet channel 21*a* communicated with the water inlet port 31*a*, wherein the moving valve disc 20*a* further has a communicating blind recess 22*a* and a draining through hole 23*a* provided therein, wherein the draining through hole 23*a* is communicated with the effluent outlet 33*a* by the first pollution hole 63*a* provided in the valve rod 61*a* and the second pollution hole 64*a* provided in the cover 60*a* orderly.

The advantages of the valve are as follows: firstly, the softened water supplement function can be achieved, which makes the fluid flowing into the brine container be the softened water, wherein comparing the raw water which isn't softened and may be added into the brine container, the regenerating liquid made from the softened water not only improves the regeneration efficiency, but may not result in the residue of hardness and stain in the brine container; secondly, the five important function what a softening valve should have may be achieved orderly, that is, after the moving valve disc of the valve is rotated for a cycle, the five functions can be achieved orderly; thirdly, the brine intaking upflow regeneration function may be achieved, and comparing the brine intaking downflow regeneration, the brine intaking upflow regeneration function can save brine consumption and improve the regeneration efficiency of resin; fourthly, the first through hole 1*a* may be arranged to cover three-ninth of the total divisions such that the inflow of water can be bigger and the rate of water inflow is improved; fifthly, in each of the five effective function states, no unnecessary draining when draining is not needed, which are helpful in saving water.

The following description is used for illustrating that the different overlappings between the fixed valve disc and the moving valve disc can be used for achieving five functions orderly.

Figure 20:
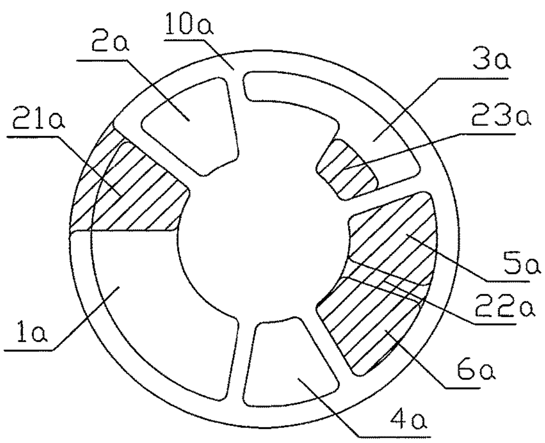
FIG. 20 is a location diagram of the moving valve disc 20*a* relative to the fixed valve disc 10*a* according to the third embodiment, wherein the moving valve disc 20*a* is under a softening working state.

A softening function: as shown in FIG. 4 and FIG. 20, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the fifth through hole 5*a* and the sixth through hole 6*a* provided in the fixed valve disc 10*a*, and the draining through hole 23*a* may be overlapped and communicated with the third through hole 3*a* provided in the fixed valve disc 10*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a*, the upper accumulating umbrella 41*a* into the outside of the filter core 44*a*, and after being softened by resin, flow into the lower accumulating umbrella 43*a*, then flow into the second filter port 39*a* via the inside 45*a* of the filter core 44*a*, wherein because the second filter port 39*a* is communicated with the fifth through hole 5*a* of the fixed valve disc 10*a*, the water flow can flow into the fifth through hole 5*a*, and then flow into the sixth through hole 6*a* of the fixed valve disc 10*a* by flow guiding of the communicating blind recess 22*a*, wherein because the sixth through hole 6*a* is communicated with the water outlet port 32*a*, the water flow can flow into the water outlet port 32*a*. During the process, the second through hole 2*a* and the fourth through hole 4*a* of the fixed valve disc 10*a* are blocked and water cannot flow therethrough; the draining through hole 23*a* is overlapped and communicated with the third through hole 3*a* of the fixed valve disc 10*a* and no water flows therebetween.

Figure 21:
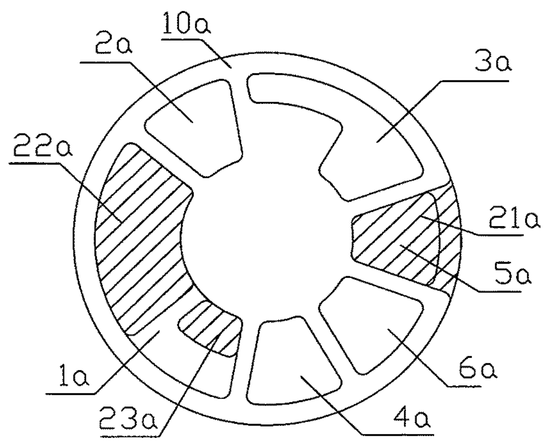
FIG. 21 is a location diagram of the moving valve disc 20*a* relative to the fixed valve disc 10*a* according to the third embodiment, wherein the moving valve disc 20*a* is under a backwash working state.

A backwash function: as shown in FIG. 6 and FIG. 21, by rotating the valve rod 61*a*, the water inlet channel 21*a* provided in the moving valve disc 20*a* may be overlapped and communicated with the fifth through hole 5*a* provided in the fixed valve disc 10*a*, the communicating blind recess 22*a* may be overlapped and communicated with the first through hole 1*a* provided in the fixed valve disc 10*a*, and the draining through hole 23*a* may be also overlapped and communicated with the first through hole 1*a* provided in the fixed valve disc 10*a*. In this overlapping state, water flow may be described as follows: the water flow from the water inlet port 31*a* may flow from the water inlet channel 21*a* of the moving valve disc 20*a* into the fifth through hole 5*a* of the fixed valve disc 10*a*, wherein because the fifth through hole 5*a* is communicated with the second filter port 39*a*, the water flow can flow through the second filter port 39*a*, then flow into the inside 45*a* of the filter core 44*a*, and then flow into the lower accumulating umbrella 43*a*, and after backwash the filter core 44*a*, flow into the upper accumulating umbrella 41*a*, and then flow into the first filter port 38*a*, wherein because the first through hole 1*a* of the fixed valve disc 10*a* is communicated with the first filter port 38*a*, the water flow may flow into the first through hole 1*a*, then flow into the draining through hole 23*a*, and then flow through the effluent outlet 33*a* to drain via the first pollution through hole 63*a* provided in the valve rod 61*a* and the second pollution through hole 64*a* provided in the cover 60*a* orderly. During the process, the second through hole 2*a*, the third through hole 3*a*, the fourth through hole 4*a* and the sixth through hole 6*a* of the fixed valve disc 10*a* are blocked and covered by the moving valve disc 20*a* and water cannot flow therethrough, wherein the communicating blind recess 22*a* is able to block and seal the first through hole 1*a* of the fixed valve disc 10*a*.

Figure 22:
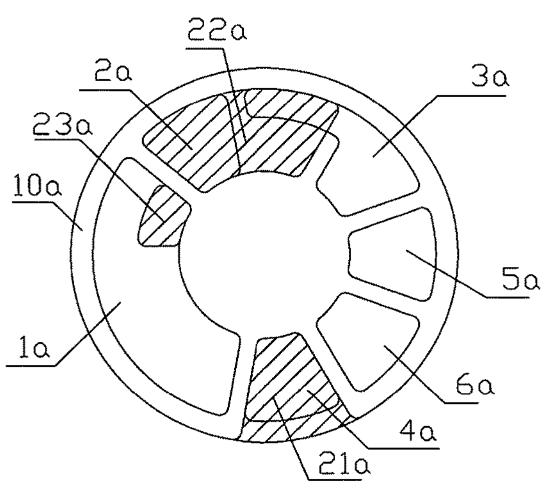
FIG. 22 is a location diagram of the moving valve disc 20*a* relative to the fixed valve disc 10*a* according to the third embodiment, wherein the moving valve disc 20*a* is under a brine intaking upflow regeneration working state.

A brine intaking upflow regeneration function: as shown in FIG. 8 and FIG. 22, by rotating the valve rod 61*a*, the water inlet channel 21*a* provided in the moving valve disc 20*a* may be overlapped and communicated with the fourth through hole 4*a* provided in the fixed valve disc 10*a*, the communicating blind recess 22*a* may be overlapped and communicated with the second through hole 2*a* and the third through hole 3*a* provided in the fixed valve disc 10*a*, and the draining through hole 23*a* may be overlapped and communicated with the first through hole 1*a* provided in the fixed valve disc 10*a*. In this overlapping state, water flow may be described as follows: the water flow from the water inlet port 31*a* may flow from the water inlet channel 21*a* of the moving valve disc 20*a* into the fourth through hole 4*a* of the fixed valve disc 10*a*, wherein because the fourth through hole 4*a* is communicated with the injector outlet 34*a*, the water flow can flow through the injector outlet 34*a*, inject via the injector 37*a* to define a negative pressure in the brine drawing port 36*a* of the injector 37*a* so as to draw the brine from the brine container 51*a* via a brine valve 52*a* and a soft pipe 50*a*, and the mixed brine water flow defined by the raw water and the brine water may flow into the injector inlet 35*a*, wherein because the third through hole 3*a* is communicated with the injector inlet 35*a*, the mixed brine water may flow into the third through hole 3*a*, and then flow into the second through hole 2*a* via the communicating blind recess 22*a*, wherein because the second through hole 2*a* is communicated with the second filter port 39*a*, the mixed brine water may flow into the second filter port 39*a*, and then flow through the inside 45*a* of the filter core 44*a*, then flow into the filter core 44*a* via the lower accumulating umbrella 43*a* and flow upwardly from the lower portion of resin layer, and after the mixed brine water regenerates the resin upflow, it flows through the upper accumulating umbrella 43*a*, and then flows into the first filter port 38*a*, wherein because the first through hole 1*a* is communicated with the first filter port 38*a*, the water flow may flow into the first through hole 1*a*, and then flow through the draining through hole 23*a*, and after flow through the first pollution through hole 63*a* provided in the valve rod 61*a* and the second pollution through hole 64*a* provided in the cover 60*a* orderly to drain via the effluent outlet 33*a*. During the process, the fifth through hole 5*a* and the sixth through hole 6*a* of the fixed valve disc 10*a* are blocked and water cannot flow therethrough.

Figure 23:
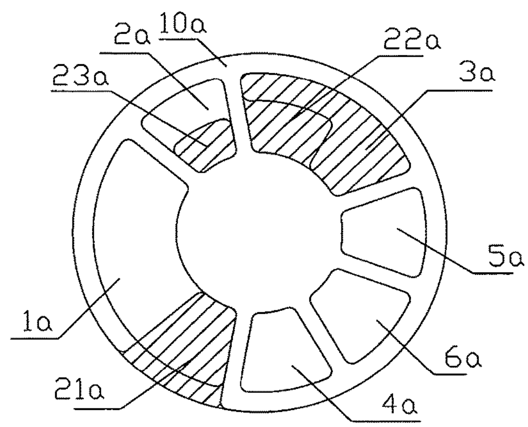
FIG. 23 is a location diagram of the moving valve disc 20*a* relative to the fixed valve disc 10*a* according to the third embodiment, wherein the moving valve disc 20*a* is under a forwardwash working state.

A forwardwash function: as shown in FIG. 12 and FIG. 23, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the third through hole 3*a* provided in the fixed valve disc 10*a*, and the draining through hole 23*a* may be overlapped and communicated with the second through hole 2*a* provided in the fixed valve disc 10*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a* and flow through the upper accumulating umbrella 41*a* into the outside of the filter core 44*a*, and after flushing the residue of brine fluid, flow into the lower accumulating umbrella 43*a*, then flow into the second filter port 39*a* via the inside 45*a* of the filter core 44*a*, wherein because the second filter port 39*a* is communicated with the second through hole 2*a* of the fixed valve disc 10*a*, the water flow may flow into the second through hole 2*a*, and then flow through the draining through hole 23*a*, and after flow through the first pollution through hole 63*a* provided in the valve rod 61*a* and the second pollution through hole 64*a* provided in the cover 60*a* orderly to drain via the effluent outlet 33*a*. During the process, the fourth through hole 4*a*, the fifth through hole 5*a* and the sixth through hole 6*a* of the fixed valve disc 10*a* are blocked and covered by the moving valve disc 20*a* and water cannot flow therethrough, wherein the communicating blind recess 22*a* is able to block and seal the third through hole 3*a* of the fixed valve disc 10*a*.

Figure 24:
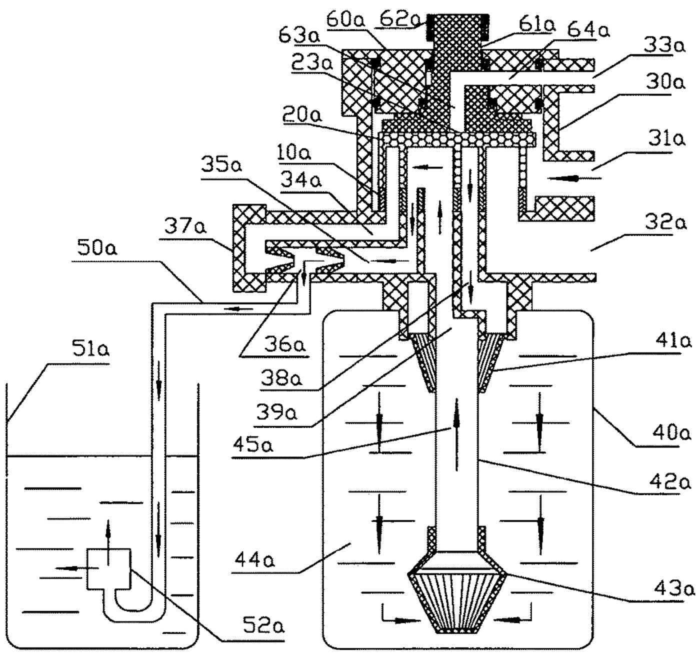
FIG. 24 is a structural diagram of the valve according to the third embodiment, wherein the valve is under a brine container softened water supplement working state.
Figure 25:
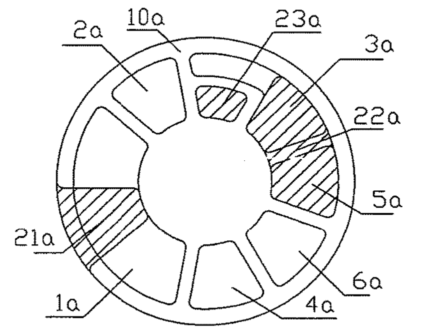
FIG. 25 is a location diagram of the moving valve disc 20*a* relative to the fixed valve disc 10*a*, wherein the moving valve disc 20*a* is shown in FIG. 24.

A softened water supplement function: as shown in FIG. 24 and FIG. 25, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the third through hole 3*a* and the fifth through hole 5*a*, and the draining through hole 23*a* may be blocked and sealed by the fixed valve disc 10*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a*, the upper accumulating umbrella 41*a* into the outside of the filter core 44*a*, and after being softened and filtered by the resin, flow into the lower accumulating umbrella 43*a*, then flow into the second filter port 39*a* via the inside 45*a* of the filter core 44*a*, wherein because the second filter port 39*a* is communicated with the fifth through hole 5*a* of the fixed valve disc 10*a*, the water flow can flow into the fifth through hole 5*a*, and then flow into the third through hole 3*a* by guiding of the communicating blind recess 22*a*, wherein because the third through hole 3*a* is communicated with the injector inlet 35*a*, the water flow can flow into the injector inlet 35*a*, and then flow through the brine drawing port 36*a*, the soft pipe 50*a* and the brine valve 52*a* and flow into the brine container. During the process, the second through hole 2*a*, the fourth through hole 4*a* and the sixth through hole 6*a* of the fixed valve disc 10*a* are blocked and water cannot flow therethrough.

The fourth embodiment: an upflow regeneration and softened water supplement softening valve comprising nine equal divisions, which employing a technical solution of draining via a seventh through hole provided in the fixed valve disc and the valve body orderly.

Figure 26:
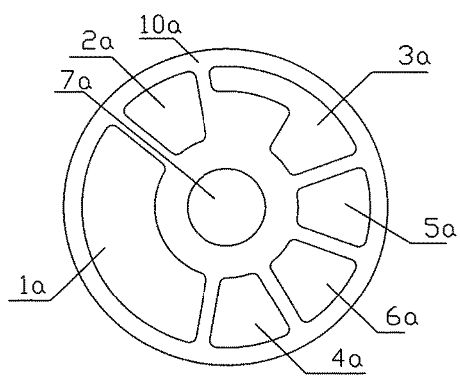
FIG. 26 is a flat structural diagram of the fixed valve disc 10*a* according to the fourth embodiment.
Figure 27:
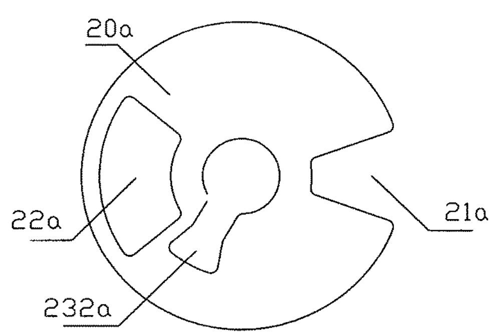
FIG. 27 is a top view of the moving valve disc 20*a* according to the fourth embodiment.

As shown in FIG. 16, FIG. 26 to FIG. 27, the fixed valve disc and the moving valve disc shown in FIG. 26 and FIG. 27 are employed in the fourth embodiment. a multifunction softening valve, comprises a valve body 30*a*, a cover 60*a*, an injector 37*a*, a fixed valve disc 10*a* and a moving valve disc 20*a*, wherein the fixed valve disc10*a* and the moving valve disc 20*a* are respectively provided in the valve body 30*a*, wherein the head faces of the fixed valve disc10*a* and the moving valve disc 20*a* are hermetically and rotationally aligned with each other, wherein the moving valve disc 20*a* is connected with a valve rod 61*a*, wherein the softening valve has a water inlet port 31*a*, a water outlet port 32*a*, an effluent outlet 33*a*, an injector outlet 34*a*, an injector inlet 35*a*, a first filter port 38*a* and a second filter port 39*a* provided therein, wherein the injector 37*a* is communicated with the valve body 30*a* by the injector outlet 34*a* and the injector inlet 35*a*, wherein the injector 37*a* has a brine drawing port 36*a* provided therein; wherein the fixed valve disc 10*a* has six through holes: a first through hole 1*a*, a second through hole 2*a*, a third through hole 3*a*, a fourth through hole 4*a*, a fifth through hole 5*a* and a sixth through hole 6*a* provided therein, wherein in the softening valve, the first through hole 1*a* is adapted for being communicated with the first filter port 38*a*; the second through hole 2*a* and the fifth through hole 5*a* are communicated with each other and each of the second through hole 2*a* and the fifth through hole 5*a* is adapted for being communicated with the second filter port 39*a*; the third through hole 3*a* is communicated with the injector inlet 35*a*; the fourth through hole 4*a* is communicated with the injector outlet 34*a*; the sixth through hole 6*a* is communicated with the water outlet port 32*a*, wherein the first through hole 1*a* is neighboring to the second through hole 2*a*; the second through hole 2*a* is neighboring to the third through hole 3*a*; the third through hole 3*a* is neighboring to the fifth through hole 5*a*; the fifth through hole 5*a* is neighboring to the sixth through hole 6*a*; the sixth through hole 6*a* 5*a* is neighboring to the fourth through hole 4*a*; the fourth through hole 4*a* is neighboring to the first through hole 1*a*, wherein the fixed valve disc 10*a* further has a seventh through hole 7*a* provided therein, wherein the seventh through hole 7*a* is provided in a center of the fixed valve disc 10*a*; wherein the moving valve disc 20*a* has a water inlet channel 21*a* communicated with the water inlet port 31*a*, wherein the moving valve disc 20*a* further has a communicating blind recess 22*a* and a draining blind recess 232*a* provided therein, wherein one end of the draining blind recess 232*a* is provided in the center of the moving valve disc 20*a*, and the draining blind recess 232*a* is communicated with the effluent outlet 33*a* by the seventh through hole 7*a* of the fixed valve disc 10*a*.

The differences between the fourth embodiment and the third embodiment are as follows: in the fourth embodiment, the center of the fixed valve disc 10*a* has the seventh through hole 7*a* provided therein, and the moving valve disc 20*a* has a draining blind recess 232*a* provided therein; in the third embodiment, the fixed valve disc 10*a* has no a seventh through hole 7*a*, and the moving valve disc 20*a* has a draining through hole provided therein. The structural differences result in the following differences of draining: the drainage way in the fourth embodiment: water flow is guided to flow into the seventh through hole 7*a* via the draining blind recess 232*a* of the moving valve disc 20*a*, and then flows into the effluent outlet 33*a* provided in the valve body 30*a* to drain; the drainage way in the third embodiment: water flow flows through the draining through hole of the moving valve disc, and after flows through the first pollution through hole provided in the valve rod and the second pollution through hole provided in the cover orderly, drains via the effluent outlet. So only one example is described for explaining detailedly the backwash function, and the illustrations for the other four functions can be omitted.

Figure 28:
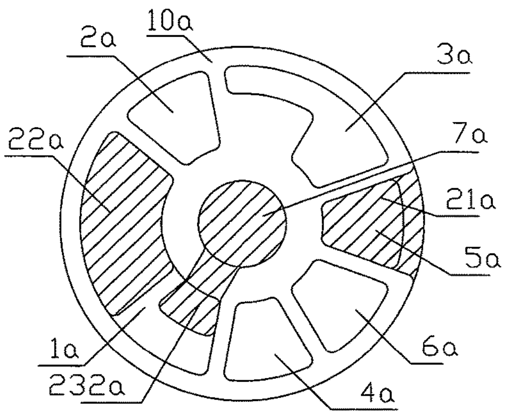
FIG. 28 is a location diagram of the moving valve disc 20*a* relative to the fixed valve disc 10*a* according to the fourth embodiment, wherein the moving valve disc 20*a* is under a backwash working state.

A backwash function: as shown in FIG. 16 and FIG. 28, by rotating the valve rod 61*a*, the water inlet channel 21*a* provided in the moving valve disc 20*a* may be overlapped and communicated with the fifth through hole 5*a* provided in the fixed valve disc 10*a*, the communicating blind recess 22*a* may be overlapped and communicated with the first through hole 1*a* provided in the fixed valve disc 10*a*, and the draining blind recess 232*a* may be also overlapped and communicated with the first through hole 1*a* and the seventh through hole 7*a* provided in the fixed valve disc 10*a*. In this overlapping state, water flow may be described as follows: the water flow from the water inlet port 31*a* may flow from the water inlet channel 21*a* of the moving valve disc 20*a* into the fifth through hole 5*a* of the fixed valve disc 10*a*, wherein because the fifth through hole 5*a* is communicated with the second filter port 39*a*, the water flow can flow through the second filter port 39*a*, then flow into the inside 45*a* of the filter core 44*a*, and then flow into the lower accumulating umbrella 43*a*, and after backwash the filter core 44*a*, flow into the upper accumulating umbrella 41*a*, and then flow into the first filter port 38*a*, wherein because the first through hole 1*a* of the fixed valve disc 10*a* is communicated with the first filter port 38*a*, so the water flow may flow into the first through hole 1*a*, and then the water flow is guided to flow into the seventh through hole 7*a* by the draining through hole 232*a*, wherein because the seventh through hole 7*a* is communicated with the effluent outlet 33*a*, so the water flow may flow into the effluent outlet 33*a* to drain. During the process, the second through hole 2*a*, the third through hole 3*a*, the fourth through hole 4*a* and the sixth through hole 6*a* of the fixed valve disc 10*a* are blocked and covered by the moving valve disc 20*a* and water cannot flow therethrough, wherein the communicating blind recess 22*a* is able to block and seal the first through hole 1*a* of the fixed valve disc 10*a*.

The fifth embodiment: A downflow regeneration softening valve comprising eight equal divisions, which employing a technical solution of draining via a valve rod.

Figure 29:
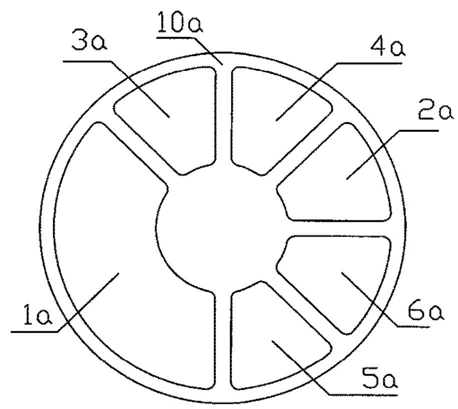
FIG. 29 is a flat structural diagram of the fixed valve disc 10*a* according to the fifth embodiment.
Figure 30:
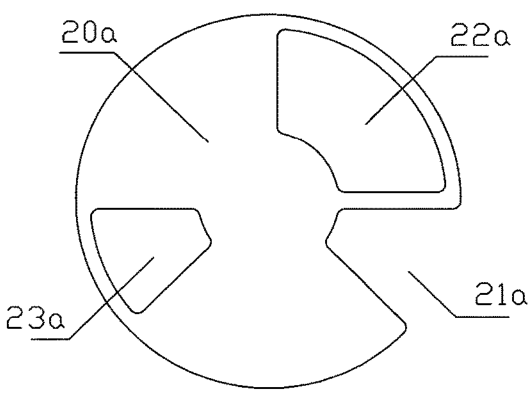
FIG. 30 is a top view of the moving valve disc 20*a* according to the fifth embodiment.

As shown in FIG. 4, FIG. 29 and FIG. 30, the fixed valve disc and the moving valve disc shown in FIG. 29 and FIG. 30 are employed in the fifth embodiment. a multifunction softening valve, comprises a valve body 30*a*, a cover 60*a*, an injector 37*a*, a fixed valve disc 10*a* and a moving valve disc 20*a*, wherein the fixed valve disc10*a* and the moving valve disc 20*a* are respectively provided in the valve body 30*a*, wherein the head faces of the fixed valve disc10*a* and the moving valve disc 20*a* are hermetically and rotationally aligned with each other, wherein the moving valve disc 20*a* is connected with a valve rod 61*a*, wherein the softening valve has a water inlet port 31*a*, a water outlet port 32*a*, an effluent outlet 33*a*, an injector outlet 34*a*, an injector inlet 35*a*, a first filter port 38*a* and a second filter port 39*a* provided therein, wherein the injector 37*a* is communicated with the valve body 30*a* by the injector outlet 34*a* and the injector inlet 35*a*, wherein the injector 37*a* has a brine drawing port 36*a* provided therein; wherein the fixed valve disc 10*a* has six through holes: a first through hole 1*a*, a second through hole 2*a*, a third through hole 3*a*, a fourth through hole 4*a*, a fifth through hole 5*a* and a sixth through hole 6*a* provided therein, wherein in the softening valve, the first through hole 1*a* is adapted for being communicated with the first filter port 38*a*; the second through hole 2*a* and the fifth through hole 5*a* are communicated with each other and each of the second through hole 2*a* and the fifth through hole 5*a* is adapted for being communicated with the second filter port 39*a*; the third through hole 3*a* is communicated with the injector inlet 35*a*; the fourth through hole 4*a* is communicated with the injector outlet 34*a*; the sixth through hole 6*a* is communicated with the water outlet port 32*a*, wherein the first through hole 1*a* is neighboring to the third through hole 3*a*; the third through hole 3*a* is neighboring to the fourth through hole 4*a*; the fourth through hole 4*a* is neighboring to the second through hole 2*a*; the second through hole 2*a* is neighboring to the sixth through hole 6*a*; the sixth through hole 6*a* is neighboring to the fifth through hole 5*a*; the fifth through hole 5*a* is neighboring to the first through hole 1*a*; wherein the moving valve disc 20*a* has a water inlet channel 21*a* communicated with the water inlet port 31*a*, wherein the moving valve disc 20*a* further has a communicating blind recess 22*a* and a draining through hole 23*a* provided therein, wherein the draining through hole 23*a* is communicated with the effluent outlet 33*a* by the first pollution hole 63*a* provided in the valve rod 61*a* and the second pollution hole 64*a* provided in the cover 60*a* orderly.

The advantages of the valve are as follows: firstly, via the planar valve which may be divided to have eight equal portions, the brine intaking downflow regeneration function can be achieved and the downflow regeneration can effectively prevent the resin being scattered during the regenerating of the resin; secondly, the first through hole 1*a* may be arranged to cover three equal divisions of the eight equal divisions of the fixed valve disc 10*a* such that the inflow of water can be bigger and the rate of water inflow is improved; thirdly, the softening valve can orderly achieve five functions, that is, the five important functions that a softening valve should have may be achieved in a valve of the present disclosure after the moving valve disc 20 is rotated for a cycle; fourthly, in each of the five effective function states, no unnecessary draining when draining is not needed, no unnecessary water supplement when water supplement is not needed, which are helpful in saving water.

The following description is used for illustrating that the different overlappings between the fixed valve disc and the moving valve disc can be used for achieving five functions orderly.

Figure 31:
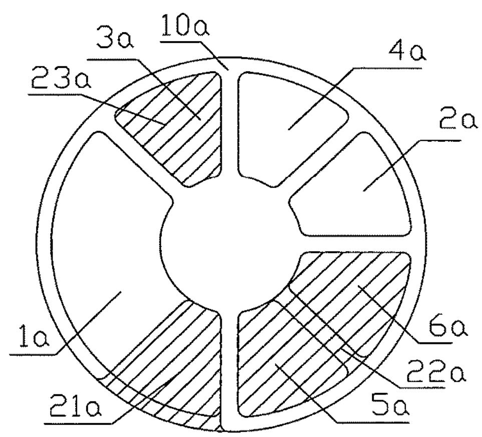
FIG. 31 is a location diagram of the moving valve disc 20*a* relative to the fixed valve disc 10*a* according to the fifth embodiment, wherein the moving valve disc 20*a* is under a softening working state.

A softening function: as shown in FIG. 4 and FIG. 31, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the fifth through hole 5*a* and the sixth through hole 6*a* provided in the fixed valve disc 10*a*, and the draining through hole 23*a* may be overlapped and communicated with the third through hole 3*a* provided in the fixed valve disc 10*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a*, the upper accumulating umbrella 41*a* into the outside of the filter core 44*a*, and after being softened by resin, flow into the lower accumulating umbrella 43*a*, then flow into the second filter port 39*a* via the inside 45*a* of the filter core 44*a*, wherein because the second filter port 39*a* is communicated with the fifth through hole 5*a* of the fixed valve disc 10*a*, the water flow can flow into the fifth through hole 5*a*, and then flow into the sixth through hole 6*a* of the fixed valve disc 10*a* by flow guiding of the communicating blind recess 22*a*, wherein because the sixth through hole 6*a* is communicated with the water outlet port 32*a*, the water flow can flow into the water outlet port 32*a*. During the process, the second through hole 2*a* and the fourth through hole 4*a* of the fixed valve disc 10*a* are blocked and water cannot flow therethrough; the draining through hole 23*a* is overlapped and communicated with the third through hole 3*a* of the fixed valve disc 10*a* and no water flows therebetween.

Figure 32:
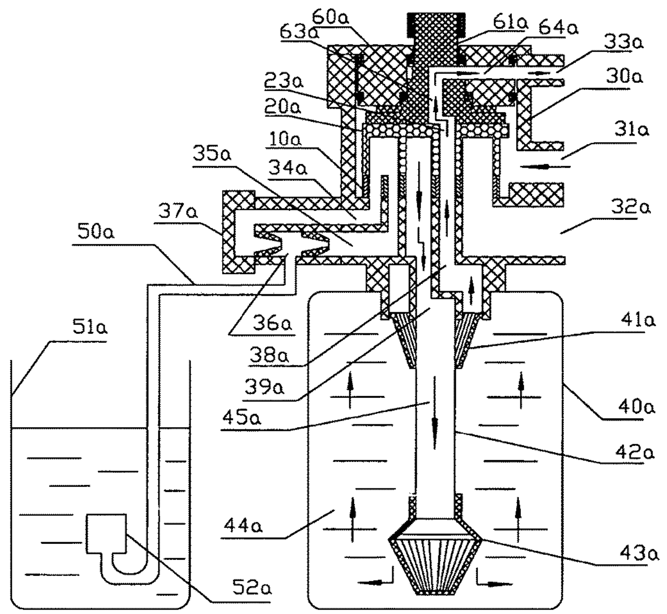
FIG. 32 is a structural diagram of the valve according to the fifth embodiment, wherein the valve is under a backwash working state.
Figure 33:
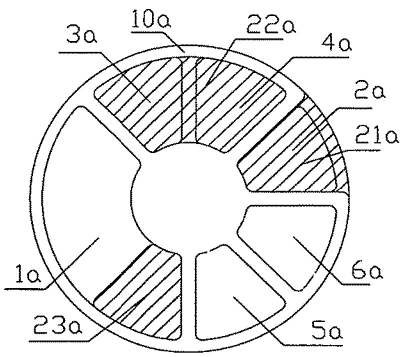
FIG. 33 is a location diagram of the moving valve disc 20*a* relative to the fixed valve disc 10*a*, wherein the moving valve disc 20*a* is shown in FIG. 32.

A backwash function: as shown in FIG. 32 and FIG. 33, by rotating the valve rod 61*a*, the water inlet channel 21*a* provided in the moving valve disc 20*a* may be overlapped and communicated with the second through hole 2*a* provided in the fixed valve disc 10*a*, the communicating blind recess 22*a* may be overlapped and communicated with the third through hole 3*a* and the fourth through hole 4*a* provided in the fixed valve disc 10*a*, and the draining through hole 23*a* may be overlapped and communicated with the first through hole 1*a* provided in the fixed valve disc 10*a*. In this overlapping state, water flow may be described as follows: the water flow from the water inlet port 31*a* may flow from the water inlet channel 21*a* of the moving valve disc 20*a* into the second through hole 2*a* of the fixed valve disc 10*a*, wherein because the second through hole 2*a* is communicated with the second filter port 39*a*, the water flow can flow through the second filter port 39*a*, then flow into the inside 45*a* of the filter core 44*a*, and then flow into the lower accumulating umbrella 43*a*, and after backwash the filter core 44*a*, flow into the upper accumulating umbrella 41*a*, and then flow into the first filter port 38*a*, wherein because the first through hole 1*a* of the fixed valve disc 10*a* is communicated with the first filter port 38*a*, the water flow may flow into the first through hole 1*a*, then flow into the draining through hole 23*a*, and then flow through the effluent outlet 33*a* to drain via the first pollution through hole 63*a* provided in the valve rod 61*a* and the second pollution through hole 64*a* provided in the cover 60*a* orderly. During the process, the fifth through hole 5*a* and the sixth through hole 6*a* of the fixed valve disc 10*a* are blocked and water cannot flow therethrough, wherein the communicating blind recess 22*a* is able to block and seal the third through hole 3*a* and the fourth through hole 4*a* of the fixed valve disc 10*a*.

Figure 34:
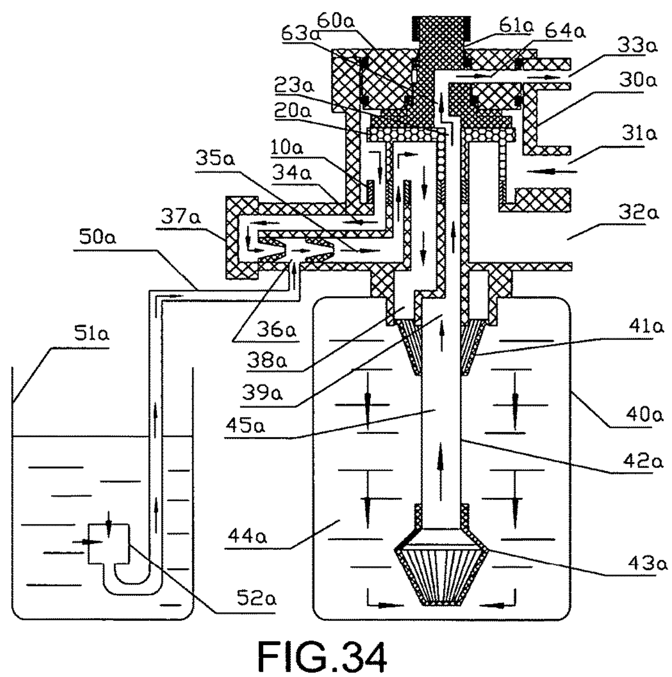
FIG. 34 is a structural diagram of the valve according to the fifth embodiment, wherein the valve is under a brine intaking downflow regeneration working state.
Figure 35:
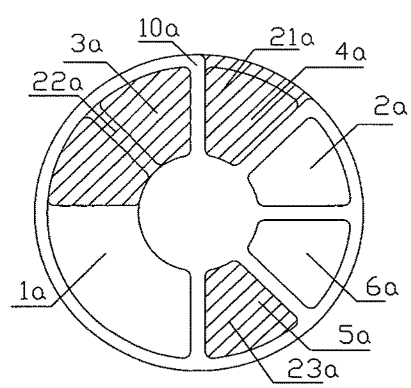
FIG. 35 is a location diagram of the moving valve disc 20*a* relative to the fixed valve disc 10*a*, wherein the moving valve disc 20*a* is shown in FIG. 34.

A brine intaking downflow regeneration function: as shown in FIG. 34 and FIG. 35, by rotating the valve rod 61*a*, the water inlet channel 21*a* provided in the moving valve disc 20*a* may be overlapped and communicated with the fourth through hole 4*a* provided in the fixed valve disc 10*a*, the communicating blind recess 22*a* may be overlapped and communicated with the first through hole 1*a* and the third through hole 3*a* provided in the fixed valve disc 10*a*, and the draining through hole 23*a* may be overlapped and communicated with the fifth through hole 5*a* provided in the fixed valve disc 10*a*. In this overlapping state, water flow may be described as follows: the water flow from the water inlet port 31*a* may flow from the water inlet channel 21*a* of the moving valve disc 20*a* into the fourth through hole 4*a* of the fixed valve disc 10*a*, wherein because the fourth through hole 4*a* is communicated with the injector outlet 34*a*, the water flow can flow through the injector outlet 34*a*, inject via the injector 37*a* to define a negative pressure in the brine drawing port 36*a* of the injector 37*a* so as to draw the brine from the brine container 51*a* via a brine valve 52*a* and a soft pipe 50*a*, and the mixed brine water flow defined by the raw water and the brine water may flow into the injector inlet 35*a*, wherein because the third through hole 3*a* is communicated with the injector inlet 35*a*, the mixed brine water may flow into the third through hole 3*a*, and then flow into the first through hole 1*a* via the communicating blind recess 22*a*, wherein because the first through hole 1*a* is communicated with the first filter port 38*a*, the mixed brine water may flow into the first filter port 38*a*, and then flow through the upper accumulating umbrella 41*a*, then flow into the filter core 44*a*, and after the mixed brine water regenerates the resin in the filter core 44*a* downflow, it flows through the lower accumulating umbrella 43*a*, and then flows into the inside 45*a* of the filter core 44*a* and the second filter port 39*a*, wherein because the fifth through hole 5*a* is communicated with the second filter port 39*a*, the water flow may flow into the fifth through hole 5*a*, and then flow through the draining through hole 23*a*, and after flow through the first pollution through hole 63*a* provided in the valve rod 61*a* and the second pollution through hole 64*a* provided in the cover 60*a* orderly to drain via the effluent outlet 33*a*. During the process, the second through hole 2*a* and the sixth through hole 6*a* of the fixed valve disc 10*a* are blocked and water cannot flow therethrough.

Figure 36:
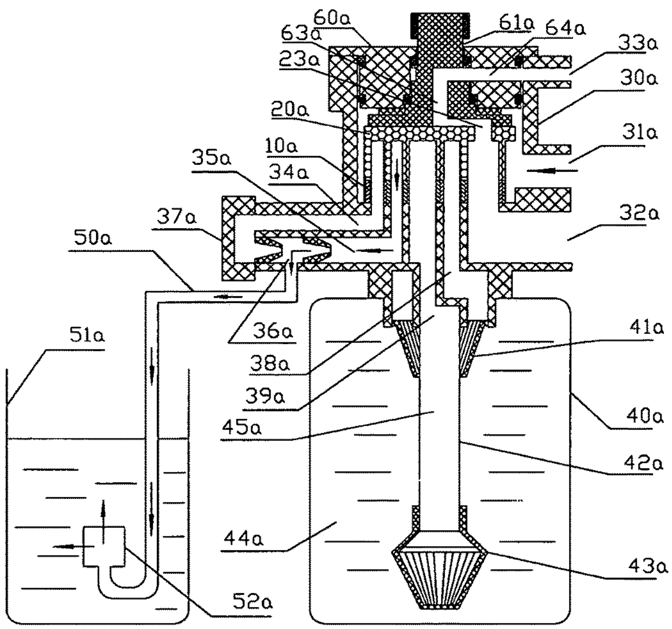
FIG. 36 is a structural diagram of the valve according to the fifth embodiment, wherein the valve is under a brine container water supplement working state.
Figure 37:
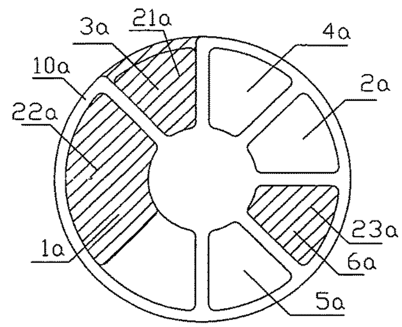
FIG. 37 is a location diagram of the moving valve disc 20*a* relative to the fixed valve disc 10*a*, wherein the moving valve disc 20*a* is as shown in FIG. 36.

A brine container water supplement function: as shown in FIG. 36 and FIG. 37, by rotating the valve rod 61*a*, the water inlet channel 21*a* provided in the moving valve disc 20*a* may be overlapped and communicated with the third through hole 3*a* provided in the fixed valve disc 10*a*, the communicating blind recess 22*a* may be overlapped and communicated with the first through hole 1*a* provided in the fixed valve disc 10*a*, and the draining through hole 23*a* may be overlapped and communicated with the sixth through hole 6*a* provided in the fixed valve disc 10*a*. In this overlapping state, water flow may be described as follows: the water flow from the water inlet port 31*a* may flow from the water inlet channel 21*a* of the moving valve disc 20*a* into the third through hole 3*a* of the fixed valve disc 10*a*, wherein because the third through hole 3*a* is communicated with the injector inlet 35*a*, the water flow can flow through the injector inlet 35*a*, so the water flow flows into the injector inlet 35*a*, and then flows through the brine drawing port 36*a*, the soft pipe 50*a*, the brine valve 52*a* orderly and flows into the brine container 51*a*. Because the fourth through hole 4*a* provided in the fixed valve disc 10*a* is blocked and covered by the moving valve disc 20*a* and water cannot flow therethrough, and the fourth through hole 4*a* is communicated with the injector outlet 34*a*, so no water flow runs through the injector outlet 34*a*. During the process, the second through hole 2*a* and the fifth through hole 5*a* of the fixed valve disc 10*a* are blocked and covered by the moving valve disc 20*a* and water cannot flow therethrough; and although the draining through hole 23*a* is overlapped and communicated with the sixth through hole 6*a* of the fixed valve disc 10*a*, no water flows therebetween; wherein the communicating blind recess 22*a* may substantially block and cover the first through hole 1*a*.

Figure 38:
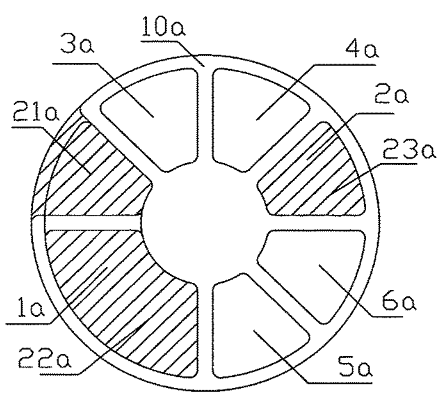
FIG. 38 is a location diagram of the moving valve disc 20*a* relative to the fixed valve disc 10*a* according to the fifth embodiment, wherein the moving valve disc 20*a* is under a forwardwash working state.

A forwardwash function: as shown in FIG. 12 and FIG. 38, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the first through hole 1*a* provided in the fixed valve disc 10*a* too, and the draining through hole 23*a* may be overlapped and communicated with the second through hole 2*a* provided in the fixed valve disc 10*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a* and flow through the upper accumulating umbrella 41*a* into the outside of the filter core 44*a*, and after flushing the residue of brine fluid, flow into the lower accumulating umbrella 43*a*, then flow into the second filter port 39*a* via the inside 45*a* of the filter core 44*a*, wherein because the second filter port 39*a* is communicated with the second through hole 2*a* of the fixed valve disc 10*a*, the water flow may flow into the second through hole 2*a*, and then flow through the draining through hole 23*a*, and after flow through the first pollution through hole 63*a* provided in the valve rod 61*a* and the second pollution through hole 64*a* provided in the cover 60*a* orderly to drain via the effluent outlet 33*a*. During the process, the third through hole 3*a*, the fourth through hole 4*a*, the fifth through hole 5*a* and the sixth through hole 6*a* of the fixed valve disc 10*a* are blocked and covered by the moving valve disc 20*a* and water cannot flow therethrough, wherein the communicating blind recess 22*a* may substantially block and seal the first through hole 1*a* of the fixed valve disc 10*a*.

The sixth embodiment: an downflow regeneration softening valve comprising eight equal divisions, which employing a technical solution of draining via a seventh through hole provided in the fixed valve disc and the valve body orderly.

Figure 39:
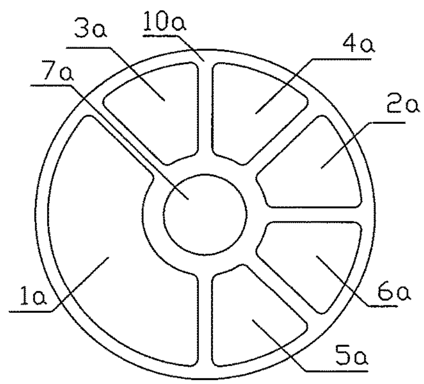
FIG. 39 is a flat structural diagram of the fixed valve disc 10*a* according to the sixth embodiment.
Figure 40:
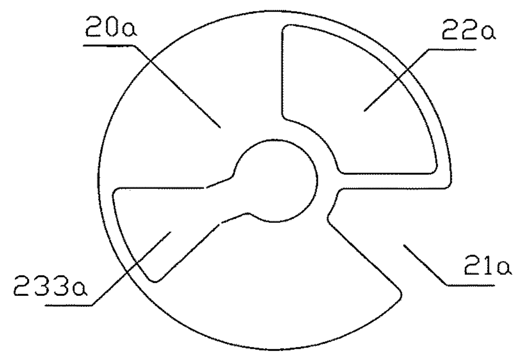
FIG. 40 is a top view of the moving valve disc 20*a* according to the sixth embodiment.
Figure 41:
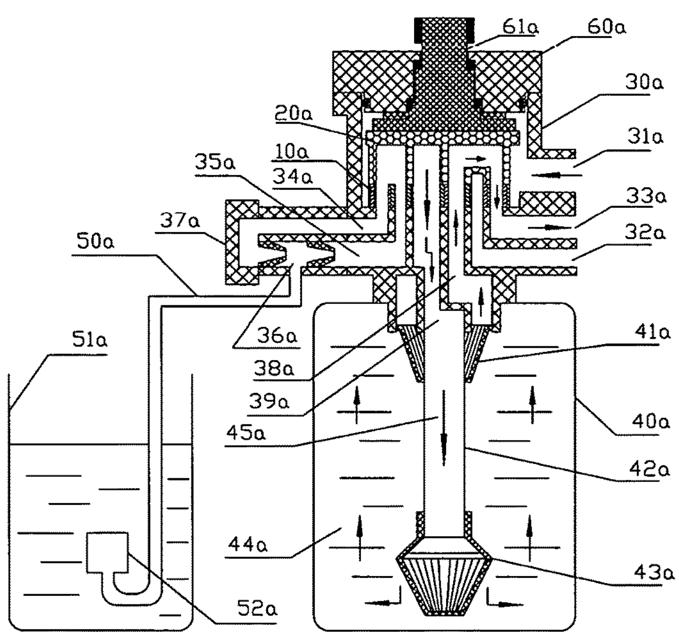
FIG. 41 is a structural diagram of the valve according to the sixth embodiment, wherein the valve is under a backwash working state.

As shown in FIG. 39 to FIG. 41, the fixed valve disc and the moving valve disc shown in FIG. 39 and FIG. 40 are employed in the sixth embodiment. a multifunction softening valve, comprises a valve body 30*a*, a cover 60*a*, an injector 37*a*, a fixed valve disc 10*a* and a moving valve disc 20*a*, wherein the fixed valve disc10*a* and the moving valve disc 20*a* are respectively provided in the valve body 30*a*, wherein the head faces of the fixed valve disc10*a* and the moving valve disc 20*a* are hermetically and rotationally aligned with each other, wherein the moving valve disc 20*a* is connected with a valve rod 61*a*, wherein the softening valve has a water inlet port 31*a*, a water outlet port 32*a*, an effluent outlet 33*a*, an injector outlet 34*a*, an injector inlet 35*a*, a first filter port 38*a* and a second filter port 39*a* provided therein, wherein the injector 37*a* is communicated with the valve body 30*a* by the injector outlet 34*a* and the injector inlet 35*a*, wherein the injector 37*a* has a brine drawing port 36*a* provided therein; wherein the fixed valve disc 10*a* has six through holes: a first through hole 1*a*, a second through hole 2*a*, a third through hole 3*a*, a fourth through hole 4*a*, a fifth through hole 5*a* and a sixth through hole 6*a* provided therein, wherein in the softening valve, the first through hole 1*a* is adapted for being communicated with the first filter port 38*a*; the second through hole 2*a* and the fifth through hole 5*a* are communicated with each other and each of the second through hole 2*a* and the fifth through hole 5*a* is adapted for being communicated with the second filter port 39*a*; the third through hole 3*a* is communicated with the injector inlet 35*a*; the fourth through hole 4*a* is communicated with the injector outlet 34*a*; the sixth through hole 6*a* is communicated with the water outlet port 32*a*, wherein the first through hole 1*a* is neighboring to the third through hole 3*a*; the third through hole 3*a* is neighboring to the fourth through hole 4*a*; the fourth through hole 4*a* is neighboring to the second through hole 2*a*; the second through hole 2*a* is neighboring to the sixth through hole 6*a*; the sixth through hole 6*a* is neighboring to the fifth through hole 5*a*; the fifth through hole 5*a* is neighboring to the first through hole 1*a*, wherein the fixed valve disc 10*a* further has a seventh through hole 7*a* provided therein, wherein the seventh through hole 7*a* is provided in a center of the fixed valve disc 10*a*; wherein the moving valve disc 20*a* has a water inlet channel 21*a* communicated with the water inlet port 31*a*, wherein the moving valve disc 20*a* further has a communicating blind recess 22*a* and a draining blind recess 233*a* provided therein, wherein one end of the draining blind recess 233*a* is provided in the center of the moving valve disc 20*a*, and the draining blind recess 233*a* is communicated with the effluent outlet 33*a* by the seventh through hole 7*a* of the fixed valve disc 10*a*.

The differences between the sixth embodiment and the fifth embodiment are as follows: in the sixth embodiment, the center of the fixed valve disc 10*a* has a seventh through hole 7*a* provided therein, and the moving valve disc 20*a* has a draining blind recess 233*a* provided therein; in the fifth embodiment, the fixed valve disc 10*a* has no a seventh through hole 7*a*, and the moving valve disc 20*a* has a draining through hole provided therein. The structural differences result in the following differences of draining: the drainage way in the sixth embodiment: water flow is guided to flow into the seventh through hole 7*a* via the draining blind recess 233*a* of the moving valve disc 20*a*, and then flows into the effluent outlet 33*a* provided in the valve body 30*a* to drain; the drainage way in the fifth embodiment: water flow flows through the draining through hole of the moving valve disc, and after flows through the first pollution through hole provided in the valve rod and the second pollution through hole provided in the cover orderly, drains via the effluent outlet. So only one example is described for explaining detailedly the backwash function, and the illustrations for the other four functions can be omitted.

Figure 42:
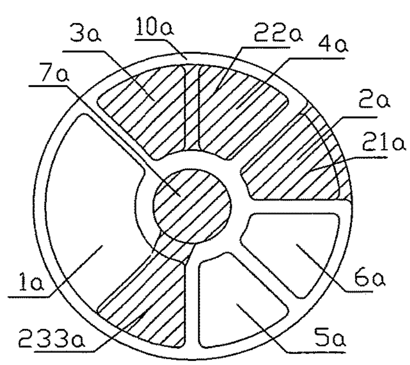
FIG. 42 is a location diagram of the moving valve disc 20*a* relative to the fixed valve disc 10*a*, wherein the moving valve disc 20*a* is shown in FIG. 41.

A backwash function: as shown in FIG. 41 and FIG. 42, by rotating the valve rod 61*a*, the water inlet channel 21*a* provided in the moving valve disc 20*a* may be overlapped and communicated with the second through hole 2*a* provided in the fixed valve disc 10*a*, the communicating blind recess 22*a* may be overlapped and communicated with the third through hole 3*a* and the fourth through hole 4*a* provided in the fixed valve disc 10*a*, and the draining blind recess 233*a* may be overlapped and communicated with the first through hole 1*a* and the seventh through hole 7*a* provided in the fixed valve disc 10*a*. In this overlapping state, water flow may be described as follows: the water flow from the water inlet port 31*a* may flow from the water inlet channel 21*a* of the moving valve disc 20*a* into the second through hole 2*a* of the fixed valve disc 10*a*, wherein because the second through hole 2*a* is communicated with the second filter port 39*a*, the water flow can flow through the second filter port 39*a*, then flow into the inside 45*a* of the filter core 44*a*, and then flow into the lower accumulating umbrella 43*a*, and after backwash the filter core 44*a*, flow into the upper accumulating umbrella 41*a*, and then flow into the first filter port 38*a*, wherein because the first through hole 1*a* of the fixed valve disc 10*a* is communicated with the first filter port 38*a*, so the water flow may flow into the first through hole 1*a*, and then the water flow is guided to flow into the seventh through hole 7*a* by the draining blind recess 233*a*, wherein because the seventh through hole 7*a* is communicated with the effluent outlet 33*a*, so the water flow may flow into the effluent outlet 33*a* to drain. During the process, the fifth through hole 5*a* and the sixth through hole 6*a* of the fixed valve disc 10*a* are blocked and water cannot flow therethrough, wherein the communicating blind recess 22*a* is able to block and seal the third through hole 3*a* and the fourth through hole 4*a* of the fixed valve disc 10*a*.

The seventh embodiment: A downflow regeneration and softened water supplement softening valve comprising nine equal divisions, which employing a technical solution of draining via a valve rod.

Figure 43:
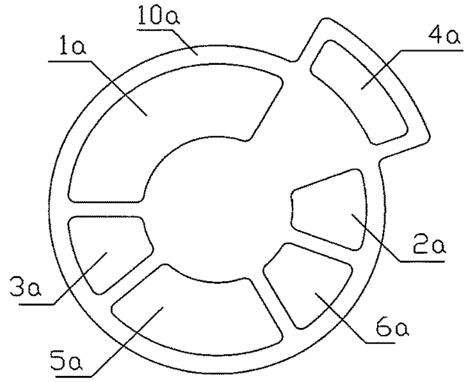
FIG. 43 is a flat structural diagram of the fixed valve disc 10*a* according to the seventh embodiment.
Figure 44:
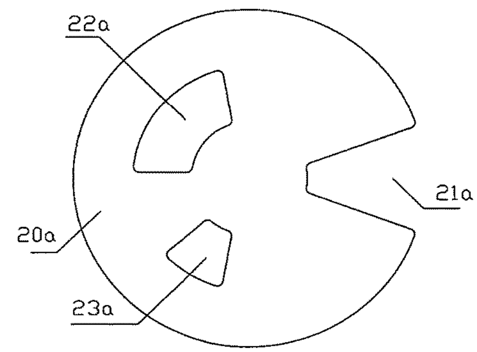
FIG. 44 is a top view of the moving valve disc 20*a* according to the seventh embodiment.
Figure 45:
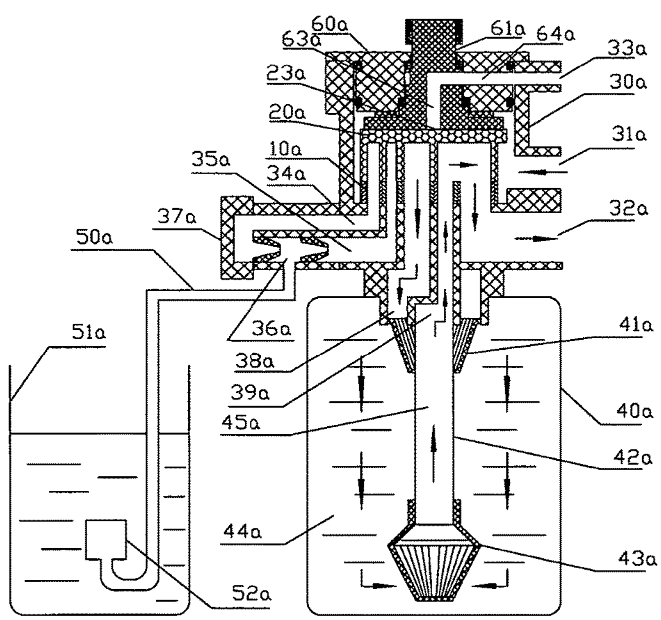
FIG. 45 is a structural diagram of the valve according to the seventh embodiment, wherein the valve is under the softening working state.

As shown in FIG. 43 to FIG. 45, the fixed valve disc and the moving valve disc shown in FIG. 43 and FIG. 44 are employed in the seventh embodiment. a multifunction softening valve, comprises a valve body 30*a*, a cover 60*a*, an injector 37*a*, a fixed valve disc 10*a* and a moving valve disc 20*a*, wherein the fixed valve disc10*a* and the moving valve disc 20*a* are respectively provided in the valve body 30*a*, wherein the head faces of the fixed valve disc10*a* and the moving valve disc 20*a* are hermetically and rotationally aligned with each other, wherein the moving valve disc 20*a* is connected with a valve rod 61*a*, wherein the softening valve has a water inlet port 31*a*, a water outlet port 32*a*, an effluent outlet 33*a*, an injector outlet 34*a*, an injector inlet 35*a*, a first filter port 38*a* and a second filter port 39*a* provided therein, wherein the injector 37*a* is communicated with the valve body 30*a* by the injector outlet 34*a* and the injector inlet 35*a*, wherein the injector 37*a* has a brine drawing port 36*a* provided therein; wherein the fixed valve disc 10*a* has six through holes: a first through hole 1*a*, a second through hole 2*a*, a third through hole 3*a*, a fourth through hole 4*a*, a fifth through hole 5*a* and a sixth through hole 6*a* provided therein, wherein in the softening valve, the first through hole 1*a* is adapted for being communicated with the first filter port 38*a*; the second through hole 2*a* and the fifth through hole 5*a* are communicated with each other and each of the second through hole 2*a* and the fifth through hole 5*a* is adapted for being communicated with the second filter port 39*a*; the third through hole 3*a* is communicated with the injector inlet 35*a*; the fourth through hole 4*a* is communicated with the injector outlet 34*a*; the sixth through hole 6*a* is communicated with the water outlet port 32*a*, wherein the first through hole 1*a* is neighboring to the fourth through hole 4*a*; the fourth through hole 4*a* is neighboring to the second through hole 2*a*; the second through hole 2*a* is neighboring to the sixth through hole 6*a*; the sixth through hole 6*a* is neighboring to the fifth through hole 5*a*; the fifth through hole 5*a* is neighboring to the third through hole 3*a*; the third through hole 3*a* is neighboring to the first through hole 1*a*, wherein the moving valve disc 20*a* has a water inlet channel 21*a* communicated with the water inlet port 31*a*, wherein the moving valve disc 20*a* further has a communicating blind recess 22*a* and a draining through hole 23*a* provided therein, wherein the draining through hole 23*a* is communicated with the effluent outlet 33*a* by the first pollution hole 63*a* provided in the valve rod 61*a* and the second pollution hole 64*a* provided in the cover 60*a* orderly.

The advantages of the valve are as follows: firstly, the softened water supplement function can be achieved, which makes the fluid flowing into the brine container be the softened water, wherein comparing the raw water which isn't softened and may be added into the brine container, the regenerating liquid made from the softened water not only improves the regeneration efficiency, but may not result in the residue of hardness and stain in the brine container; secondly, the five important function what a softening valve should have may be achieved orderly, that is, after the moving valve disc of the valve is rotated for a cycle, the five functions can be achieved orderly; thirdly, the brine intaking downflow regeneration function may be achieved and the downflow regeneration can effectively prevent the resin being scattered during the regenerating of the resin; fourthly, the first through hole 1*a* may be arranged to cover three-ninths of the total divisions such that the inflow of water can be bigger and the rate of water inflow is improved; fifthly, in each of the five effective function states, no unnecessary draining when draining is not needed, no unnecessary water supplement when water supplement is not needed, which are helpful in saving water.

The following description is used for illustrating that the different overlappings between the fixed valve disc and the moving valve disc can be used for achieving five functions orderly.

Figure 46:
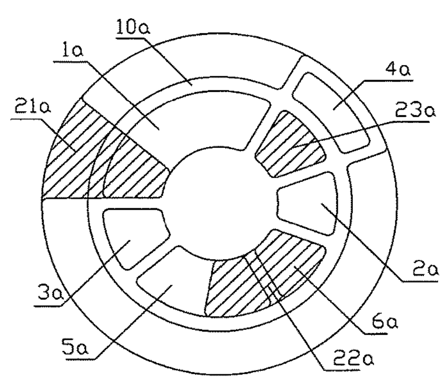
FIG. 46 is a location diagram of the moving valve disc 20*a* relative to the fixed valve disc 10*a*, wherein the moving valve disc 20*a* is shown in FIG. 45.

A softening function: as shown in FIG. 45 and FIG. 46, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the fifth through hole 5*a* and the sixth through hole 6*a* provided in the fixed valve disc 10*a*, and the draining through hole 23*a* may be blocked and covered by the fixed valve disc 10*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a*, the upper accumulating umbrella 41*a* into the outside of the filter core 44*a*, and after being softened by resin, flow into the lower accumulating umbrella 43*a*, then flow into the second filter port 39*a* via the inside 45*a* of the filter core 44*a*, wherein because the second filter port 39*a* is communicated with the fifth through hole 5*a* of the fixed valve disc 10*a*, the water flow can flow into the fifth through hole 5*a*, and then flow into the sixth through hole 6*a* of the fixed valve disc 10*a* by flow guiding of the communicating blind recess 22*a*, wherein because the sixth through hole 6*a* is communicated with the water outlet port 32*a*, the water flow can flow into the water outlet port 32*a*. During the process, the second through hole 2*a*, the third through hole 3*a* and the fourth through hole 4*a* of the fixed valve disc 10*a* are blocked and covered by the moving valve disc 20*a* and water cannot flow therethrough, wherein the draining through hole 23*a* is blocked and covered by the fixed valve disc 10*a* and no water flows therebetween.

Figure 47:
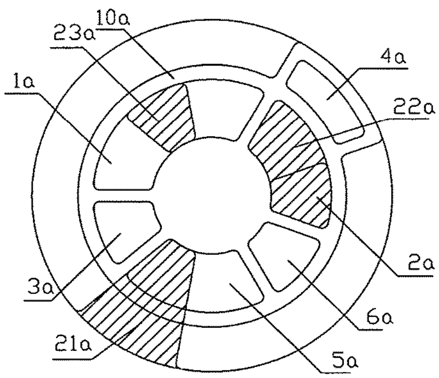
FIG. 47 is a location diagram of the moving valve disc 20*a* relative to the fixed valve disc 10*a* according to the seventh embodiment, wherein the moving valve disc 20*a* is under a backwash working state.

A backwash function: as shown in FIG. 6 and FIG. 47, by rotating the valve rod 61*a*, the water inlet channel 21*a* provided in the moving valve disc 20*a* may be overlapped and communicated with the fifth through hole 5*a* provided in the fixed valve disc 10*a*, the communicating blind recess 22*a* may be overlapped and communicated with the second through hole 2*a* provided in the fixed valve disc 10*a*, and the draining through hole 23*a* may be overlapped and communicated with the first through hole 1*a* provided in the fixed valve disc 10*a*. In this overlapping state, water flow may be described as follows: the water flow from the water inlet port 31*a* may flow from the water inlet channel 21*a* of the moving valve disc 20*a* into the fifth through hole 5*a* of the fixed valve disc 10*a*, wherein because the fifth through hole 5*a* is communicated with the second filter port 39*a*, the water flow can flow through the second filter port 39*a*, then flow into the inside 45*a* of the filter core 44*a*, and then flow into the lower accumulating umbrella 43*a*, and after back-wash the filter core 44*a*, flow into the upper accumulating umbrella 41*a*, and then flow into the first filter port 38*a*, wherein because the first through hole 1*a* of the fixed valve disc 10*a* is communicated with the first filter port 38*a*, the water flow may flow into the first through hole 1*a*, then flow into the draining through hole 23*a*, and then flow through the effluent outlet 33*a* to drain via the first pollution through hole 63*a* provided in the valve rod 61*a* and the second pollution through hole 64*a* provided in the cover 60*a* orderly. During the process, the third through hole 3*a*, the fourth through hole 4*a* and the sixth through hole 6*a* of the fixed valve disc 10*a* are blocked and covered by the moving valve disc 20*a* and water cannot flow therethrough, wherein the communicating blind recess 22*a* is able to block and seal the second through hole 2*a* of the fixed valve disc 10*a*.

Figure 48:
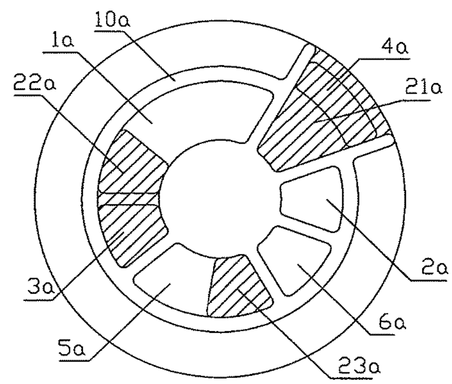
FIG. 48 is a location diagram of the moving valve disc 20*a* relative to the fixed valve disc 10*a* according to the seventh embodiment, wherein the moving valve disc 20*a* is under a brine intaking downflow regeneration working state.

A brine intaking downflow regeneration function: as shown in FIG. 34 and FIG. 48, by rotating the valve rod 61*a*, the water inlet channel 21*a* provided in the moving valve disc 20*a* may be overlapped and communicated with the fourth through hole 4*a* provided in the fixed valve disc 10*a*, the communicating blind recess 22*a* may be overlapped and communicated with the first through hole 1*a* and the third through hole 3*a* provided in the fixed valve disc 10*a*, and the draining through hole 23*a* may be overlapped and communicated with the fifth through hole 5*a* provided in the fixed valve disc 10*a*. In this overlapping state, water flow may be described as follows: the water flow from the water inlet port 31*a* may flow from the water inlet channel 21*a* of the moving valve disc 20*a* into the fourth through hole 4*a* of the fixed valve disc 10*a*, wherein because the fourth through hole 4*a* is communicated with the injector outlet 34*a*, the water flow can flow through the injector outlet 34*a*, inject via the injector 37*a* to define a negative pressure in the brine drawing port 36*a* of the injector 37*a* so as to draw the brine from the brine container 51*a* via a brine valve 52*a* and a soft pipe 50*a*, and the mixed brine water flow defined by the raw water and the brine water may flow into the injector inlet 35*a*, wherein because the third through hole 3*a* is communicated with the injector inlet 35*a*, the mixed brine water may flow into the third through hole 3*a*, and then flow into the first through hole 1*a* via the communicating blind recess 22*a*, wherein because the first through hole 1*a* is communicated with the first filter port 38*a*, the mixed brine water may flow into the first filter port 38*a*, and then flow through the upper accumulating umbrella 41*a*, then flow into the filter core 44*a*, and after the mixed brine water regenerates the resin in the filter core 44*a* downflow, it flows through the lower accumulating umbrella 43*a*, and then flows into the inside 45*a* of the filter core 44*a* and the second filter port 39*a*, wherein because the fifth through hole 5*a* is communicated with the second filter port 39*a*, the water flow may flow into the fifth through hole 5*a*, and then flow through the draining through hole 23*a*, and after flow through the first pollution through hole 63*a* provided in the valve rod 61*a* and the second pollution through hole 64*a* provided in the cover 60*a* orderly to drain via the effluent outlet 33*a*. During the process, the second through hole 2*a* and the sixth through hole 6*a* of the fixed valve disc 10*a* are blocked and covered by the moving valve disc 20*a* and water cannot flow therethrough.

Figure 49:
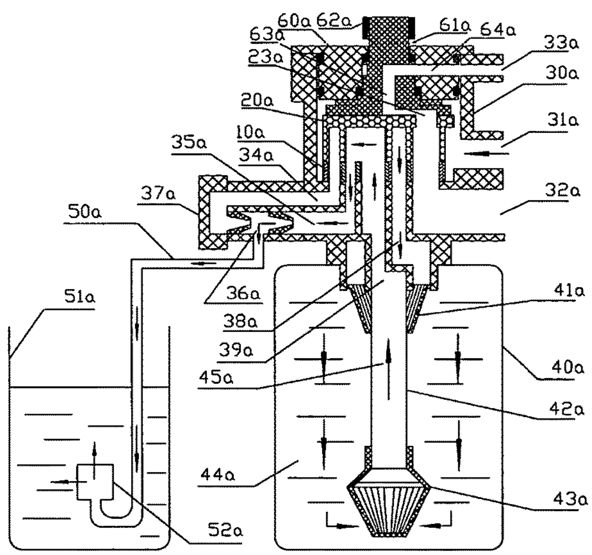
FIG. 49 is a structural diagram of the valve according to the seventh embodiment, wherein the valve is under a brine container softened water supplement working state.
Figure 50:
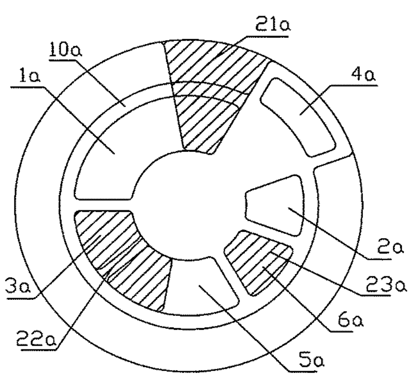
FIG. 50 is a location diagram of the moving valve disc 20*a* relative to the fixed valve disc 10*a*, wherein the moving valve disc 20*a* is shown in FIG. 49.

A softened water supplement function: as shown in FIG. 49 and FIG. 50, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the third through hole 3*a* and the fifth through hole 5*a*, and the draining through hole 23*a* may be overlapped and communicated with the sixth through hole 6*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a*, the upper accumulating umbrella 41*a* into the outside of the filter core 44*a*, and after being softened and filtered by the resin, flow into the lower accumulating umbrella 43*a*, then flow into the second filter port 39*a* via the inside 45*a* of the filter core 44*a*, wherein because the second filter port 39*a* is communicated with the fifth through hole 5*a* of the fixed valve disc 10*a*, the water flow can flow into the fifth through hole 5*a*, and then flow into the third through hole 3*a* by guiding of the communicating blind recess 22*a*, wherein because the third through hole 3*a* is communicated with the injector inlet 35*a*, the water flow can flow into the injector inlet 35*a*, and then flow through the brine drawing port 36*a*, the soft pipe 50*a* and the brine valve 52*a* and flow into the brine container. During the process, the second through hole 2*a* and the fourth through hole 4*a* of the fixed valve disc 10*a* are blocked and covered by the moving valve disc 20*a* and water cannot flow therethrough; wherein the draining through hole 23*a* is overlapped and communicated with the sixth through hole 6*a* and no water flows therebetween.

Figure 51:
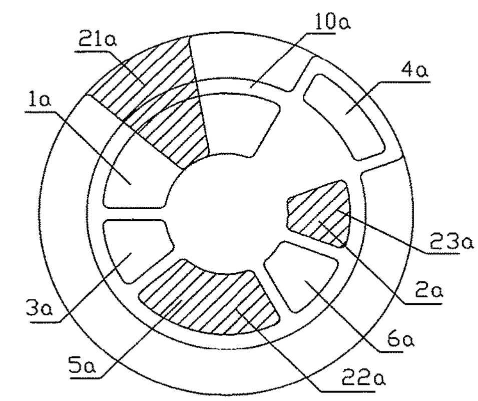
FIG. 51 is a location diagram of the moving valve disc 20*a* relative to the fixed valve disc 10*a* according to the seventh embodiment, wherein the moving valve disc 20*a* is under a forwardwash working state.

A forwardwash function: as shown in FIG. 12 and FIG. 51, by rotating the valve rod 61*a*, the water inlet channel 21*a* provided in the moving valve disc 20*a* may be overlapped and communicated with the first through hole 1*a* provided in the fixed valve disc 10*a*, the communicating blind recess 22*a* may be overlapped and communicated with the fifth through hole 5*a* provided in the fixed valve disc 10*a*, and the draining through hole 23*a* may be overlapped and communicated with the second through hole 2*a* provided in the fixed valve disc 10*a*. In this overlapping state, water flow may be described as follows: the water flow from the water inlet port 31*a* may flow from the water inlet channel 21*a* of the moving valve disc 20*a* into the first through hole 1*a* of the fixed valve disc 10*a*, wherein because the first through hole 1*a* is communicated with the first filter port 38*a*, the water flow can flow from the first filter port 38*a* and flow through the upper accumulating umbrella 41*a* into the outside of the filter core 44*a*, and after flushing the residue of brine fluid, flow into the lower accumulating umbrella 43*a*, then flow into the second filter port 39*a* via the inside 45*a* of the filter core 44*a*, wherein because the second filter port 39*a* is communicated with the second through hole 2*a* of the fixed valve disc 10*a*, the water flow may flow into the second through hole 2*a*, and then flow through the draining through hole 23*a*, and after flow through the first pollution through hole 63*a* provided in the valve rod 61*a* and the second pollution through hole 64*a* provided in the cover 60*a* orderly to drain via the effluent outlet 33*a*. During the process, the third through hole 3*a*, the fourth through hole 4*a* and the sixth through hole 6*a* of the fixed valve disc 10*a* are blocked and covered by the moving valve disc 20*a* and water cannot flow therethrough, wherein the communicating blind recess 22*a* is able to block and seal the fifth through hole 5*a* of the fixed valve disc 10*a*.

The eighth embodiment: a downflow regeneration and softened water supplement softening valve comprising nine equal divisions, which employing a technical solution of draining via a seventh through hole provided in the fixed valve disc and the valve body orderly.

Figure 52:
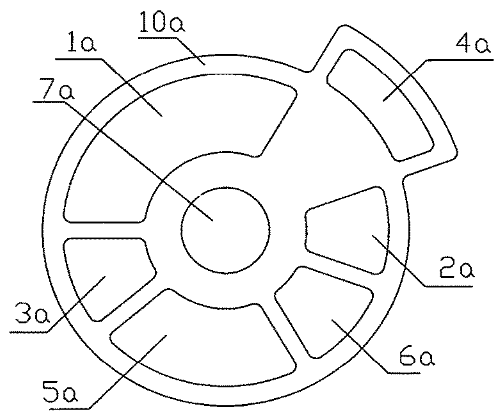
FIG. 52 is a flat structural diagram of the fixed valve disc 10*a* according to the eighth embodiment.
Figure 53:
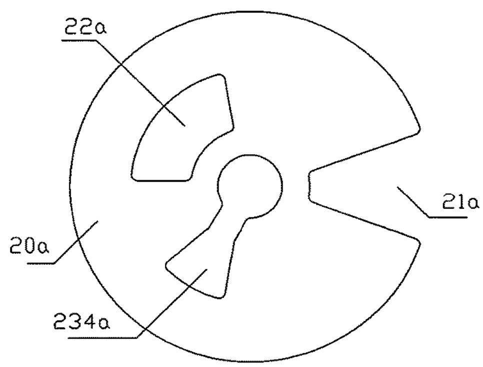
FIG. 53 is a top view of the moving valve disc 20*a* according to the eighth embodiment.

As shown in FIG. 16, FIG. 52 and FIG. 53, the fixed valve disc and the moving valve disc shown in FIG. 52 and FIG. 53 are employed in the eighth embodiment. a multifunction softening valve, comprises a valve body 30*a*, a cover 60*a*, an injector 37*a*, a fixed valve disc 10*a* and a moving valve disc 20*a*, wherein the fixed valve disc10*a* and the moving valve disc 20*a* are respectively provided in the valve body 30*a*, wherein the head faces of the fixed valve disc10*a* and the moving valve disc 20*a* are hermetically and rotationally aligned with each other, wherein the moving valve disc 20*a* is connected with a valve rod 61*a*, wherein the softening valve has a water inlet port 31*a*, a water outlet port 32*a*, an effluent outlet 33*a*, an injector outlet 34*a*, an injector inlet 35*a*, a first filter port 38*a* and a second filter port 39*a* provided therein, wherein the injector 37*a* is communicated with the valve body 30*a* by the injector outlet 34*a* and the injector inlet 35*a*, wherein the injector 37*a* has a brine drawing port 36*a* provided therein; wherein the fixed valve disc 10*a* has six through holes: a first through hole 1*a*, a second through hole 2*a*, a third through hole 3*a*, a fourth through hole 4*a*, a fifth through hole 5*a* and a sixth through hole 6*a* provided therein, wherein in the softening valve, the first through hole 1*a* is adapted for being communicated with the first filter port 38*a*; the second through hole 2*a* and the fifth through hole 5*a* are communicated with each other and each of the second through hole 2*a* and the fifth through hole 5*a* is adapted for being communicated with the second filter port 39*a*; the third through hole 3*a* is communicated with the injector inlet 35*a*; the fourth through hole 4*a* is communicated with the injector outlet 34*a*; the sixth through hole 6*a* is communicated with the water outlet port 32*a*, wherein the first through hole 1*a* is neighboring to the fourth through hole 4*a*; the fourth through hole 4*a* is neighboring to the second through hole 2*a*; the second through hole 2*a* is neighboring to the sixth through hole 6*a*; the sixth through hole 6*a* is neighboring to the fifth through hole 5*a*; the fifth through hole 5*a* is neighboring to the third through hole 3*a*; the third through hole 3*a* is neighboring to the first through hole 1*a*, wherein the fixed valve disc 10*a* further has a seventh through hole 7*a* provided therein, wherein the seventh through hole 7*a* is provided in a center of the fixed valve disc 10*a*; wherein the moving valve disc 20*a* has a water inlet channel 21*a* communicated with the water inlet port 31*a*, wherein the moving valve disc 20*a* further has a communicating blind recess 22*a* and a draining blind recess 234*a* provided therein, wherein one end of the draining blind recess 234*a* is provided in the center of the moving valve disc 20*a*, and the draining blind recess 234*a* is communicated with the effluent outlet 33*a* by the seventh through hole 7*a* of the fixed valve disc 10*a*.

The differences between the eighth embodiment and the seventh embodiment are as follows: in the eighth embodiment, the center of the fixed valve disc 10*a* has a seventh through hole 7*a* provided therein, and the moving valve disc 20*a* has a draining blind recess 234*a* provided therein; in the seventh embodiment, the fixed valve disc 10*a* has no a seventh through hole 7*a*, and the moving valve disc 20*a* has a draining through hole provided therein. The structural differences result in the following differences of draining: the drainage way in the eighth embodiment: water flow is guided to flow into the seventh through hole 7*a* via the draining blind recess 234*a* of the moving valve disc 20*a*, and then flows into the effluent outlet 33*a* provided in the valve body 30*a* to drain; the drainage way in the seventh embodiment: water flow flows through the draining through hole of the moving valve disc, and after flows through the first pollution through hole provided in the valve rod and the second pollution through hole provided in the cover orderly, drains via the effluent outlet. So only one example is described for explaining detailedly the backwash function, and the illustrations for the other four functions can be omitted.

Figure 54:
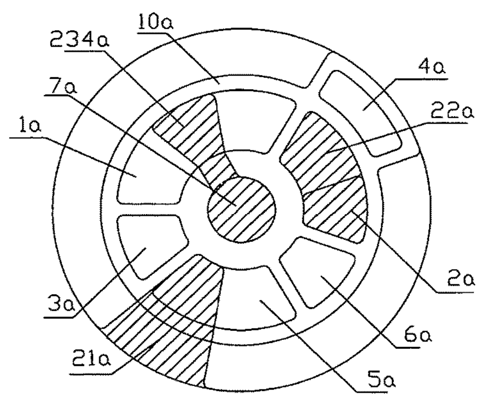
FIG. 54 is a location diagram of the moving valve disc 20*a* relative to the fixed valve disc 10*a* according to the eighth embodiment, wherein the moving valve disc 20*a* is under a backwash working state.
Figure 55:
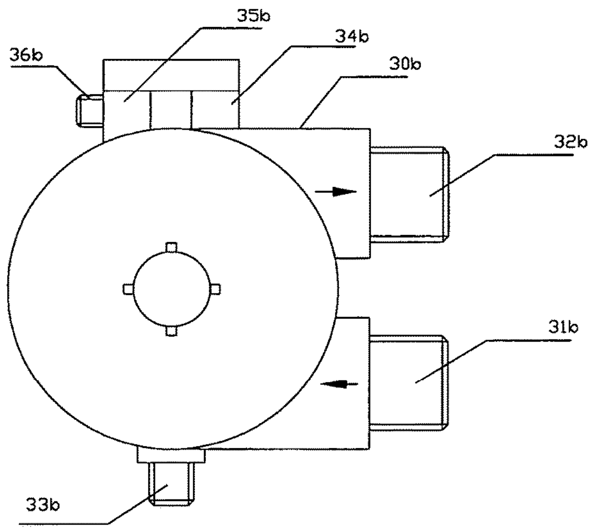
FIG. 55 is a top view of the valve body 30*b* according to the ninth embodiment to the twelfth embodiment.

A backwash function: as shown in FIG. 16 and FIG. 54, by rotating the valve rod 61*a*, the water inlet channel 21*a* provided in the moving valve disc 20*a* may be overlapped and communicated with the fifth through hole 5*a* provided in the fixed valve disc 10*a*, the communicating blind recess 22*a* may be overlapped and communicated with the second through hole 2*a* provided in the fixed valve disc 10*a*, and the draining blind recess 234*a* may be overlapped and communicated with the first through hole 1*a* and the seventh through hole 7*a* provided in the fixed valve disc 10*a*. In this overlapping state, water flow may be described as follows: the water flow from the water inlet port 31*a* may flow from the water inlet channel 21*a* of the moving valve disc 20*a* into the fifth through hole 5*a* of the fixed valve disc 10*a*, wherein because the fifth through hole 5*a* is communicated with the second filter port 39*a*, the water flow can flow through the second filter port 39*a*, then flow into the inside 45*a* of the filter core 44*a*, and then flow into the lower accumulating umbrella 43*a*, and after backwash the filter core 44*a*, flow into the upper accumulating umbrella 41*a*, and then flow into the first filter port 38*a*, wherein because the first through hole 1*a* of the fixed valve disc 10*a* is communicated with the first filter port 38*a*, so the water flow may flow into the first through hole 1*a*, and then the water flow is guided to flow into the seventh through hole 7*a* by the draining blind recess 234*a*, wherein because the seventh through hole 7*a* is communicated with the effluent outlet 33*a*, so the water flow may flow into the effluent outlet 33*a* to drain. During the process, the third through hole 3*a*, the fourth through hole 4*a* and the sixth through hole 6*a* of the fixed valve disc 10*a* are blocked and covered by the moving valve disc 20*a* and water cannot flow therethrough, wherein the communicating blind recess 22*a* is able to block and seal the second through hole 2*a* of the fixed valve disc 10*a*.

Figure 58:
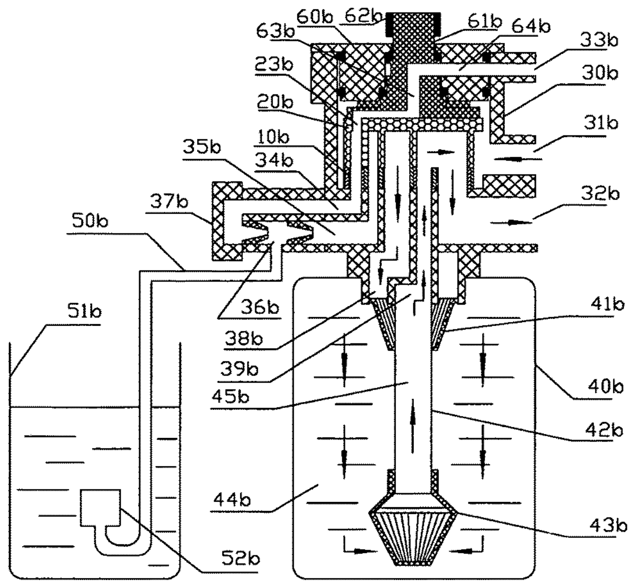
FIG. 58 is a structural diagram of the valve according to the ninth embodiment, wherein the valve is under the softening working state.

In the following ninth embodiment to fifteenth embodiment, when the flow control apparatus of the present disclosure is used, which is provided with a water treatment container 40*b*, wherein a filter core 44*b* may be provided in the water treatment container 40*b*, or a filter material is provided in the water treatment container 40*b* to define the filter core 44*b*, wherein a filter outer port 38*b* of a valve body 30*b* is communicated with an outside of the filter core 44*b* by an upper accumulating umbrella 41*b*, a filter inner port 39*b* of the valve body 30*b* is communicated with the filter core 44*b* by a central tube 42*b* and a lower accumulating umbrella 43*b*, as shown in FIG. 58. Further, a water inlet port 31*b* is communicated with a water resource, an effluent outlet 33*b* is communicated with a draining device, a brine drawing port 36*b* is communicated with a brine valve 52*b* of a brine container 51*b* via a soft pipe 50*b*. When the water treatment apparatus is used as a filter valve according to the present disclosure, the brine drawing port 36*b* need to be closed. A driving gear 62*b* provided in the end of a valve rod 61*b* can be automatically or manually rotated to rotate the moving valve disc 20*b* so as to switch the different overlapping states between the moving valve disc 20*b* and the fixed valve disc 10*b* and achieve the different functions of the present disclosure. The following description is provided as an example for illustrating the present disclosure by using a resin filter.

The ninth embodiment: a fixed bed system for upflow regeneration.

Figure 56:
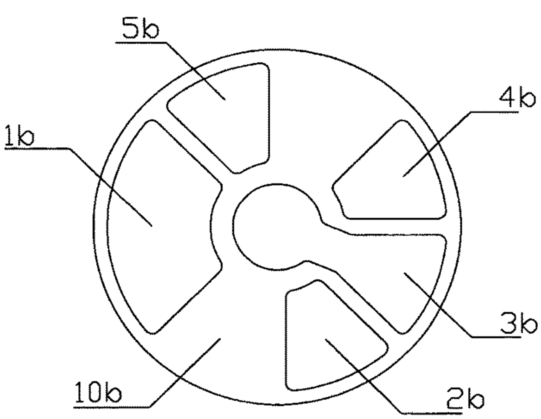
FIG. 56 is a flat structural diagram of the fixed valve disc 10*b* according to the ninth embodiment and the tenth embodiment.
Figure 57:
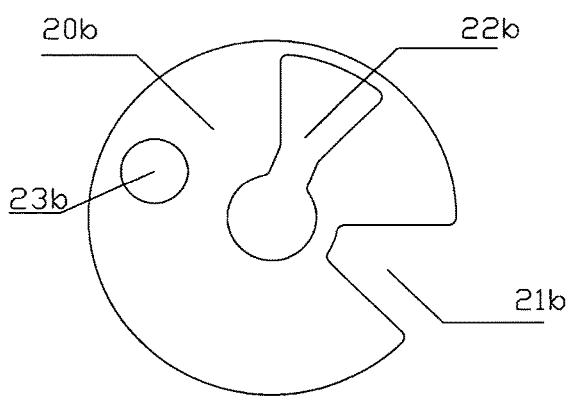
FIG. 57 is a top view of the moving valve disc 20*b* according to the ninth embodiment and the tenth embodiment.

As shown in FIG. 55 to FIG. 59, the fixed valve disc and the moving valve disc shown in FIG. 56 and FIG. 57 are employed in the ninth embodiment. a multifunction softening valve, comprises a valve body 30*b*, a cover 60*b*, an injector 37*b*, a fixed valve disc 10*b* and a moving valve disc 20*b*, wherein the fixed valve disc10*b* and the moving valve disc 20*b* are respectively provided in the valve body 30*b*, wherein the head faces of the fixed valve disc10*b* and the moving valve disc 20*b* are hermetically and rotationally aligned with each other, wherein the moving valve disc 20*b* is connected with a valve rod 61*b*, wherein the softening valve has a water inlet port 31*b*, a water outlet port 32*b*, an injector outlet 34*b*, an injector inlet 35*b*, an outer filter port 38*b* and an inner filter port 39*b* provided in the valve body 30*b*, wherein the injector 37*b* is communicated with the valve body 30*b* by the injector outlet 34*b* and the injector inlet 35*b*, wherein the injector 37*b* has a brine drawing port 36*b* provided therein; the multifunction valve further has an effluent outlet 33*b* provided in the valve body 30*b*; wherein the fixed valve disc 10*b* has five through holes: a first through hole 1*b*, a second through hole 2*b*, a third through hole 3*b*, a fourth through hole 4*b* and a fifth through hole 5*b* provided therein, wherein the third through hole 3*b* is radially aligned, and one end of the third through hole 3*b* is provided in a center of the fixed valve disc 10*b*, wherein the first through hole 1*b* may be communicated with the outer filter port 38*b*; the second through hole 2*b* may be communicated with the water outlet port 32*b*; the third through hole 3*b* may be communicated with the inner filter port 39*b*; the fourth through hole 4*b* is communicated with the injector outlet 34*b*; the fifth through hole 5*b* is communicated with the injector inlet 35*b*, wherein the first through hole 1*b* is neighboring to the fifth through hole 5*b*; the second through hole 2*b* is neighboring to the third through hole 3*b*; the third through hole 3*b* is neighboring to the fourth through hole 4*b*, wherein the moving valve disc 20*b* has a water inlet channel 21*b* communicated with the water inlet port 31*b*, wherein the moving valve disc 20*b* further has a communicating blind recess 22*b*, wherein one end of the communicating blind recess 22*b* is provided in the center of the moving valve disc 20*b*, wherein the moving valve disc 20*b* further has a draining through hole 23*b* provided therein, wherein the draining through hole 23*b* is communicated with the effluent outlet 33*b* by the first pollution hole 63*b* provided in the valve rod 61*b* and the second pollution hole 64*b* provided in the cover 60*b* orderly. By rotating the moving valve disc 20*b*, the different overlappings between the fixed valve disc 10*b* and the moving valve disc 20*b* are generated to define different water flow passages.

Figure 59:
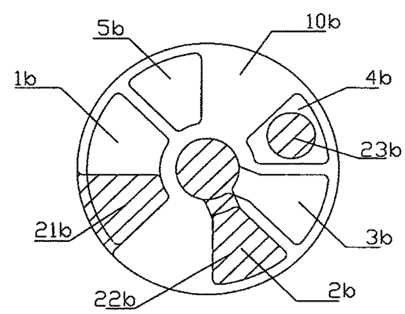
FIG. 59 is a location diagram of the moving valve disc 20*b* relative to the fixed valve disc 10*b* according to the ninth embodiment and the tenth embodiment, wherein the moving valve disc 20*b* is under a softening working state.

A softening function: as shown in FIG. 58 and FIG. 59, by rotating the valve rod 61*b*, the water inlet channel 21*b* provided in the moving valve disc 20*b* may be overlapped and communicated with the first through hole 1*b* provided in the fixed valve disc 10*b*, the communicating blind recess 22*b* may be overlapped and communicated with the second through hole 2*b* and the third through hole 3*b* provided in the fixed valve disc 10*b*, and the draining through hole 23*b* may be overlapped and communicated with the fourth through hole 4*b* provided in the fixed valve disc 10*b*. In this overlapping state, water flow may be described as follows: the water flow from the water inlet port 31*b* may flow from the water inlet channel 21*b* of the moving valve disc 20*b* into the first through hole 1*b* of the fixed valve disc 10*b*, wherein because the first through hole 1*b* is communicated with the outer filter port 38*b*, so the water flow can flow from the outer filter port 38*b*, through the upper accumulating umbrella 41*b* into the outside of the filter core 44*b*, and after being softened by resin, flow into the lower accumulating umbrella 43*b*, then flow into the inner filter port 39*b* via the inside 45*b* of the filter core 44*b*, wherein because the inner filter port 39*b* is communicated with the third through hole 3*b* of the fixed valve disc 10*b*, so the water flow can flow into the third through hole 3*b*, and then flow into the second through hole 2*b* of the fixed valve disc 10*b* by flow guiding of the communicating blind recess 22*b*, wherein because the second through hole 2*b* is communicated with the water outlet port 32*b*, so the water flow can flow into the water outlet port 32*b*. During the process, the fifth through hole 5*b* of the fixed valve disc 10*b* is blocked and covered by the moving valve disc 20*b* and water cannot flow therethrough.

And although the draining through hole 23*b* is overlapped and communicated with the fourth through hole 4*b* provided in the fixed valve disc 10*b*, but no water flows therebetween.

Figure 60:
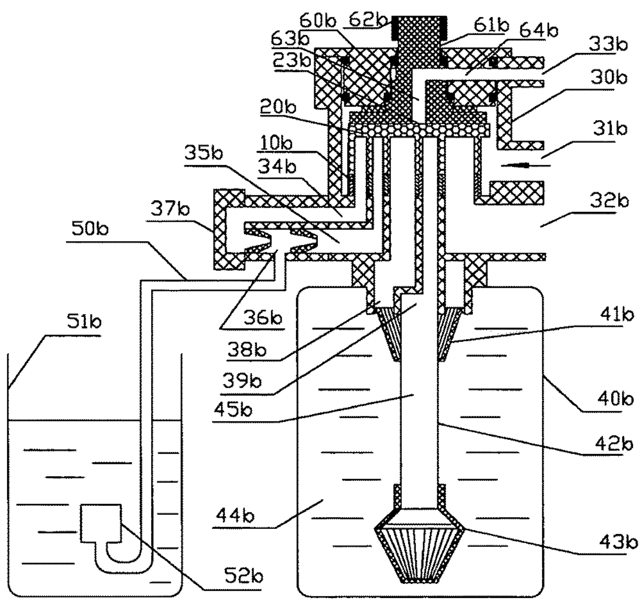
FIG. 60 is a structural diagram of the valve according to the ninth embodiment, wherein the valve is under a bed stopping state.
Figure 61:
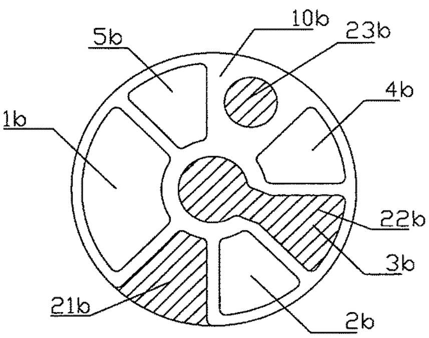
FIG. 61 is a location diagram of the moving valve disc 20*b* relative to the fixed valve disc 10*b* according to the ninth embodiment and the tenth embodiment, wherein the moving valve disc 20*b* is under a bed stopping state or a bed falling state.

A bed stopping function: as shown in FIG. 60 and FIG. 61, by rotating the valve rod 61*b*, the water inlet channel 21*b* provided in the moving valve disc 20*b* may be overlapped with a planar region of the fixed valve disc 10*b*, the communicating blind recess 22*b* may be overlapped and communicated with the third through hole 3*b* provided in the fixed valve disc 10*b*, and the draining through hole 23*b* is overlapped with the planar region of the fixed valve disc 10*b*, and the first through hole 1*b*, the second through hole 2*b*, the fourth through hole 4*b* and the fifth through hole 5*b* of the fixed valve disc 10*b* are blocked and covered by the moving valve disc 20*b* and water cannot flow therethrough. In this overlapping state, the water inlet channel 21*b* provided in the moving valve disc 20*b* is blocked and covered by the planar region of the fixed valve disc 10*b*, so the water flow from the water inlet port 31*b* cannot flow into the filter core 44*b* and no water flows through the water outlet port 32*b* and the effluent outlet 33*b*.

Figure 62:
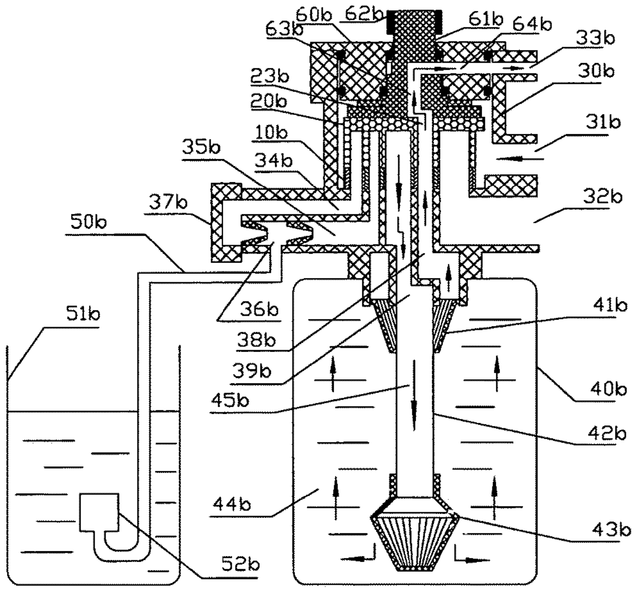
FIG. 62 is a structural diagram of the valve according to the ninth embodiment, wherein the valve is under a backwash working state.
Figure 63:
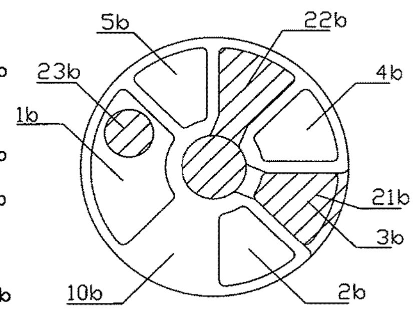
FIG. 63 is a location diagram of the moving valve disc 20*b* relative to the fixed valve disc 10*b* according to the ninth embodiment and the tenth embodiment, wherein the moving valve disc 20*b* is under a backwash working state.

A backwash function: as shown in FIG. 62 and FIG. 63, by rotating the valve rod 61*b*, the water inlet channel 21*b* provided in the moving valve disc 20*b* may be overlapped and communicated with the third through hole 3*b* provided in the fixed valve disc 10*b*, the communicating blind recess 22*b* may be overlapped and communicated with one end of the third through hole 3*b* provided in the fixed valve disc 10*b*, and the draining through hole 23*b* may be overlapped and communicated with the first through hole 1*b* provided in the fixed valve disc 10*b*. In this overlapping state, water flow may be described as follows: the water flow from the water inlet port 31*b* may flow from the water inlet channel 21*b* of the moving valve disc 20*b* into the third through hole 3*b* of the fixed valve disc 10*b*, wherein because the third through hole 3*b* is communicated with the inner filter port 39*b*, so the water flow can flow from the inner filter port 39*b*, and then flow through the inside 45*b* of the filter core 44*b* and the lower accumulating umbrella 43*b*, and after backwash the filter core 44*b*, flow through the upper accumulating umbrella 41*b*, and then flow into the outer filter port 38*b*, wherein because the first through hole 1*b* provided in the fixed valve disc 10*b* is communicated with the outer filter port 38*b*, so the water flow can flow into the first through hole 1*b* and flow through the draining through hole 23*b*, and then flow through the first pollution hole 63*b* provided in the valve rod 61*b* and the second pollution hole 64*b* provided in the cover 60*b* orderly to drain via the effluent outlet 33*b*. During the process, the second through hole 2*b*, the fourth through hole 4*b* and the fifth through hole 5*b* of the fixed valve disc 10*b* are blocked and covered by the moving valve disc 20*b* and water cannot flow therethrough. And because the communicating blind recess 22*b* is only overlapped and communicated with one end of the third through hole 3*b* provided in the fixed valve disc 10*b*, so the communicating blind recess 22*b* can substantially provide a blocking and covering function.

Figure 64:
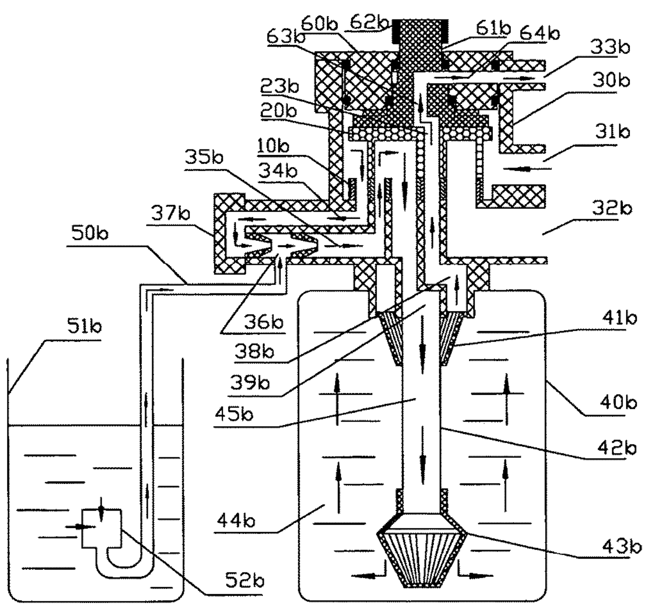
FIG. 64 is a structural diagram of the valve according to the ninth embodiment, wherein the valve is under a brine intaking upflow regeneration working state.
Figure 65:
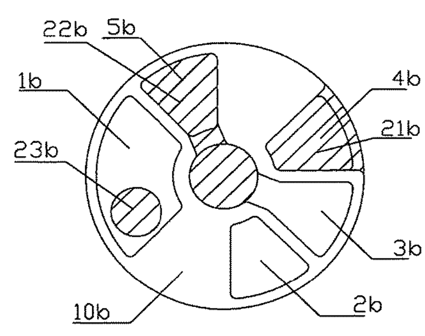
FIG. 65 is a location diagram of the moving valve disc 20*b* relative to the fixed valve disc 10*b* according to the ninth embodiment and the tenth embodiment, wherein the moving valve disc 20*b* is under a brine intaking upflow regeneration working state.

A brine intaking upflow regeneration function: as shown in FIG. 64 and FIG. 65, by rotating the valve rod 61*b*, the water inlet channel 21*b* provided in the moving valve disc 20*b* may be overlapped and communicated with the fourth through hole 4*b* provided in the fixed valve disc 10*b*, the communicating blind recess 22*b* may be overlapped and communicated with the fifth through hole 5*b* and the third through hole 3*b* provided in the fixed valve disc 10*b*, and the draining through hole 23*b* may be overlapped and communicated with the first through hole 1*b* provided in the fixed valve disc 10*b*. In this overlapping state, water flow may be described as follows: the water flow from the water inlet port 31*b* may flow from the water inlet channel 21*b* of the moving valve disc 20*b* into the fourth through hole 4*b* of the fixed valve disc 10*b*, wherein because the fourth through hole 4*b* is communicated with the injector outlet 34*b*, so the water flow can flow through the injector outlet 34*b*, inject via the injector 37*b* to define a negative pressure in the brine drawing port 36*b* of the injector 37*b* so as to draw the brine fluid from the brine container 51*b* via a brine valve 52*b* and a soft pipe 50*b*, and the mixed brine water flow defined by the raw water and the brine water may flow into the injector inlet 35*b*, wherein because the fifth through hole 5*b* is communicated with the injector inlet 35*b*, the mixed brine water may flow into the fifth through hole 5*b*, and then flow into the third through hole 3*b* via the communicating blind recess 22*b*, wherein because the third through hole 3*b* is communicated with the inner filter port 39*b*, so the mixed brine water may flow into the inner filter port 39*b*, and then flow through the inside 45*b* of the filter core 44*b* and flow into the filter core 44*b* via the lower accumulating umbrella 43*b*, and after the mixed brine water flows through the resin bed from bottom to top and regenerates the resin bed, it flows through the upper accumulating umbrella 41*b* and flows into the outer filter port 38*b*, wherein because the first through hole 1*b* is communicated with the outer filter port 38*b*, so the water flow may flow into the first through hole 1*b*, and then flow through the draining through hole 23*b*, and after flow through the first pollution through hole 63*b* provided in the valve rod 61*b* and the second pollution through hole 64*b* provided in the cover 60*b* orderly to drain via the effluent outlet 33*b*. During the process, the second through hole 2*b* of the fixed valve disc 10*b* is blocked and covered by the moving valve disc 20*b* and water cannot flow therethrough.

Figure 66:
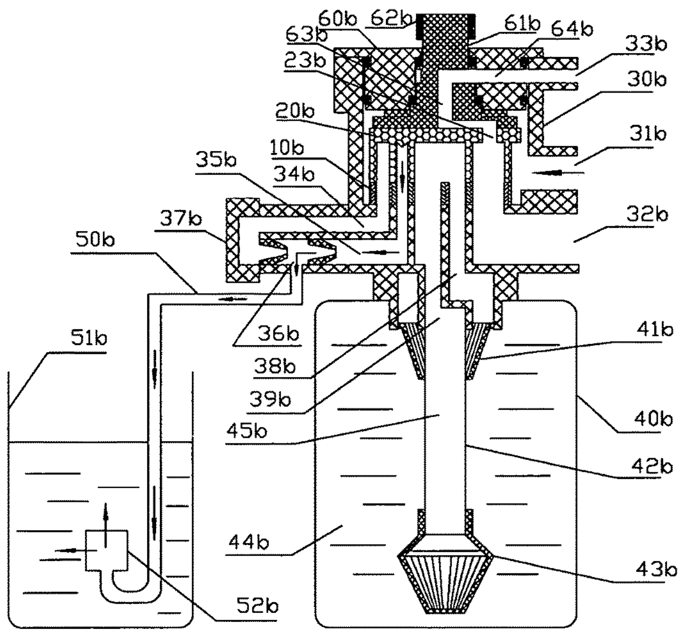
FIG. 66 is a structural diagram of the valve according to the ninth embodiment, wherein the valve is under a forwardwash working state.
Figure 67:
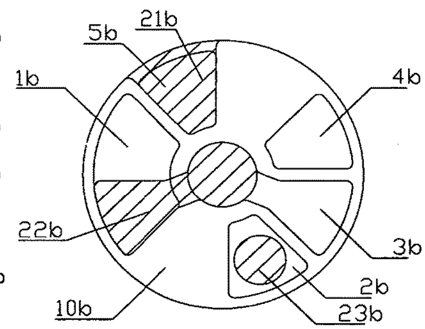
FIG. 67 is a location diagram of the moving valve disc 20*b* relative to the fixed valve disc 10*b* according to the ninth embodiment and the tenth embodiment, wherein the moving valve disc 20*b* is under a forwardwash working state.

A forwardwash function: as shown in FIG. 66 and FIG. 67, by rotating the valve rod 61*b*, the water inlet channel 21*b* provided in the moving valve disc 20*b* may be overlapped and communicated with the first through hole 1*b* provided in the fixed valve disc 10*b*, the communicating blind recess 22*b* may be overlapped and communicated with one end of the third through hole 3*b* provided in the fixed valve disc 10*b*, and the draining through hole 23*b* may be overlapped and communicated with the third through hole 3*b* provided in the fixed valve disc 10*b*. In this overlapping state, water flow may be described as follows: the water flow from the water inlet port 31*b* may flow from the water inlet channel 21*b* of the moving valve disc 20*b* into the first through hole 1*b* of the fixed valve disc 10*b*, wherein because the first through hole 1*b* is communicated with the outer filter port 38*b*, so the water flow can flow from the outer filter port 38*b* and flow through the upper accumulating umbrella 41*b* into the outside of the filter core 44*b*, and after flushing the residue of brine fluid, flow into the lower accumulating umbrella 43*b*, then flow into the inner filter port 39*b* via the inside 45*b* of the filter core 44*b*, wherein because the inner filter port 39*b* is communicated with the third through hole 3*b* of the fixed valve disc 10*b*, so the water flow may flow into the third through hole 3*b*, and then flow through the draining through hole 23*b*, and after flow through the first pollution through hole 63*b* provided in the valve rod 61*b* and the second pollution through hole 64*b* provided in the cover 60*b* orderly to drain via the effluent outlet 33*b*. During the process, the second through hole 2*b*, the fourth through hole 4*b* and the fifth through hole 5*b* of the fixed valve disc 10*b* are blocked and covered by the moving valve disc 20*b* and water cannot flow therethrough. And because the communicating blind recess 22*b* is only overlapped and communicated with one end of the third through hole 3*b* provided in the fixed valve disc 10*b*, so the communicating blind recess 22*b* can substantially provide a blocking and covering function.

Figure 68:
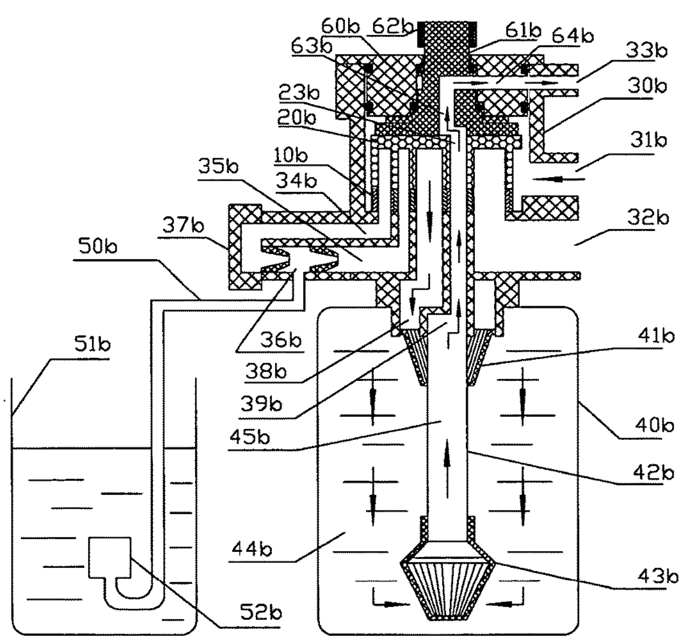
FIG. 68 is a structural diagram of the valve according to the ninth embodiment, wherein the valve is under a brine container water supplement working state.
Figure 69:
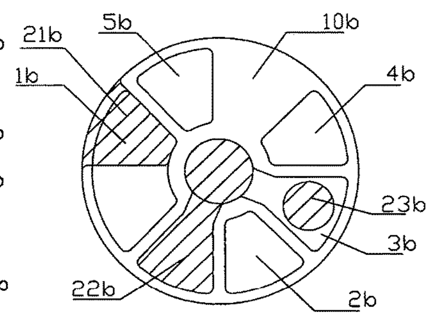
FIG. 69 is a location diagram of the moving valve disc 20*b* relative to the fixed valve disc 10*b* according to the ninth embodiment and the tenth embodiment, wherein the moving valve disc 20*b* is under a brine container water supplement working state.

A brine container water supplement function: as shown in FIG. 68 and FIG. 69, by rotating the valve rod 61*b*, the water inlet channel 21*b* provided in the moving valve disc 20*b* may be overlapped and communicated with the fifth through hole 5*b* provided in the fixed valve disc 10*b*, the communicating blind recess 22*b* may be overlapped and communicated with the first through hole 1*b* and the third through hole 3*b* provided in the fixed valve disc 10*b*, and the draining through hole 23*b* may be overlapped and communicated with the second through hole 2*b* provided in the fixed valve disc 10*b*. In this overlapping state, water flow may be described as follows: the water flow from the water inlet port 31*b* may flow from the water inlet channel 21*b* of the moving valve disc 20*b* into the fifth through hole 5*b* of the fixed valve disc 10*b*, wherein because the fifth through hole 5*b* is communicated with the injector inlet 35*b*, so the water flow can flow into the injector inlet 35*b*, and then flow through the brine drawing port 36*b*, the soft pipe 50*b* and the brine valve 52*b* and flow into the brine container 51*b*. Because the fourth through hole 4*b* provided in the fixed valve disc 10*b* is blocked and covered by the moving valve disc 20*b* and water cannot flow therethrough, and the fourth through hole 4*b* is communicated with the injector outlet 34*b*, so no water flow runs through the injector outlet 34*b*. During the process, although the draining through hole 23*b* is overlapped and communicated with the second through hole 2*b* provided in the fixed valve disc 10*b*, but no water flows therebetween, so no water flow flows through the effluent outlet 33*b*, and although the communicating blind recess 22*b* is communicated with the first through hole 1*b* and the third through hole 3*b* provided in the fixed valve disc 10*b*, but no water flows therebetween.

The tenth embodiment: a floating bed system for upflow regeneration.

As shown in FIG. 55 to FIG. 57, FIG. 70, the fixed valve disc and the moving valve disc shown in FIG. 56 and FIG. 57 are employed in the tenth embodiment. a multifunction softening valve, comprises a valve body 30*b*, a cover 60*b*, an injector 37*b*, a fixed valve disc 10*b* and a moving valve disc 20*b*, wherein the fixed valve disc10*b* and the moving valve disc 20*b* are respectively provided in the valve body 30*b*, wherein the head faces of the fixed valve disc10*b* and the moving valve disc 20*b* are hermetically and rotationally aligned with each other, wherein the moving valve disc 20*b* is connected with a valve rod 61*b*, wherein the softening valve has a water inlet port 31*b*, a water outlet port 32*b*, an injector outlet 34*b*, an injector inlet 35*b*, an outer filter port 38*b* and an inner filter port 39*b* provided in the valve body 30*b*, wherein the injector 37*b* is communicated with the valve body 30*b* by the injector outlet 34*b* and the injector inlet 35*b*, wherein the injector 37*b* has a brine drawing port 36*b* provided therein; the multifunction valve further has an effluent outlet 33*b* provided in the valve body 30*b*; wherein the fixed valve disc 10*b* has five through holes: a first through hole 1*b*, a second through hole 2*b*, a third through hole 3*b*, a fourth through hole 4*b* and a fifth through hole 5*b* provided therein, wherein the third through hole 3*b* is radially aligned, and one end of the third through hole 3*b* is provided in a center of the fixed valve disc 10*b*, wherein the first through hole 1*b* may be communicated with the inner filter port 39*b*; the second through hole 2*b* may be communicated with the water outlet port 32*b*; the third through hole 3*b* may be communicated with the outer filter port 38*b*; the fourth through hole 4*b* is communicated with the injector outlet 34*b*; the fifth through hole 5*b* is communicated with the injector inlet 35*b*, wherein the first through hole 1*b* is neighboring to the fifth through hole 5*b*; the second through hole 2*b* is neighboring to the third through hole 3*b*; the third through hole 3*b* is neighboring to the fourth through hole 4*b*, wherein the moving valve disc 20*b* has a water inlet channel 21*b* communicated with the water inlet port 31*b*, wherein the moving valve disc 20*b* further has a communicating blind recess 22*b*, wherein one end of the communicating blind recess 22*b* is provided in the center of the moving valve disc 20*b*, wherein the moving valve disc 20*b* further has a draining through hole 23*b* provided therein, wherein the draining through hole 23*b* is communicated with the effluent outlet 33*b* by the first pollution hole 63*b* provided in the valve rod 61*b* and the second pollution hole 64*b* provided in the cover 60*b* orderly. By rotating the moving valve disc 20*b*, the different overlappings between the fixed valve disc 10*b* and the moving valve disc 20*b* are generated to define different water flow passages.

The only difference between the tenth embodiment and the ninth embodiment is as follows: in the tenth embodiment, the first through hole 1*b* may be communicated with the inner filter port 39*b*; the third through hole 3*b* may be communicated with the outer filter port 38*b*; but in the ninth embodiment, the first through hole 1*b* may be communicated with the outer filter port 38*b*; the third through hole 3*b* may be communicated with the inner filter port 39*b*; so when the fixed valve disc and the moving valve disc are at a position, the difference may make water flows in the water treatment container flow in two opposite directions. So only one example is described for explaining detailedly the softening function, and the illustrations for the other five functions can be omitted.

Figure 70:
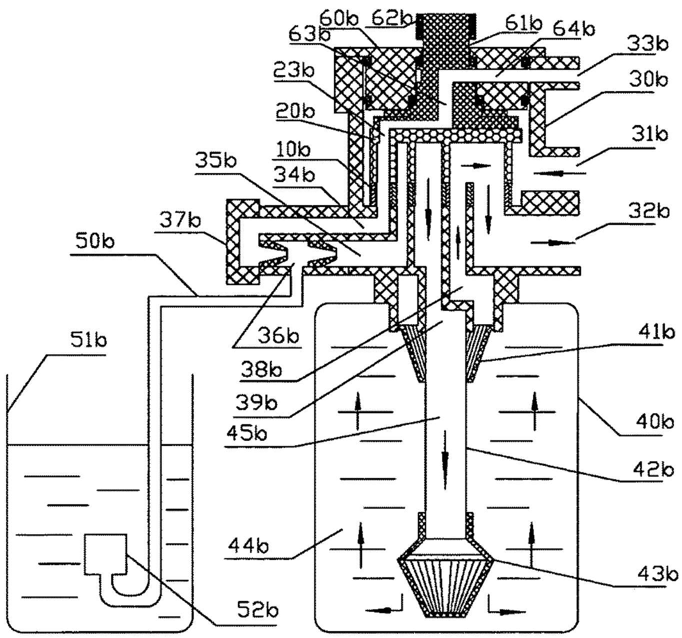
FIG. 70 is a structural diagram of the valve according to the tenth embodiment, wherein the valve is under the softening working state.

A softening function: as shown in FIG. 59 and FIG. 70, by rotating the valve rod 61*b*, the water inlet channel 21*b* provided in the moving valve disc 20*b* may be overlapped and communicated with the first through hole 1*b* provided in the fixed valve disc 10*b*, the communicating blind recess 22*b* may be overlapped and communicated with the second through hole 2*b* and the third through hole 3*b* provided in the fixed valve disc 10*b*, and the draining through hole 23*b* may be overlapped and communicated with the fourth through hole 4*b* provided in the fixed valve disc 10*b*. In this overlapping state, water flow may be described as follows: the water flow from the water inlet port 31*b* may flow from the water inlet channel 21*b* of the moving valve disc 20*b* into the first through hole 1*b* of the fixed valve disc 10*b*, wherein because the first through hole 1*b* is communicated with the inner filter port 39*b*, so the water flow can flow from the inner filter port 39*b* and flow through the lower accumulating umbrella 43*b*, and after being softened by resin, flow into the upper accumulating umbrella 41*b*, then flow into the outer filter port 38*b*, wherein because the outer filter port 38*b* is communicated with the third through hole 3*b* of the fixed valve disc 10*b*, so the water flow can flow into the third through hole 3*b*, and then flow into the second through hole 2*b* of the fixed valve disc 10*b* by flow guiding of the communicating blind recess 22*b*, wherein because the second through hole 2*b* is communicated with the water outlet port 32*b*, so the water flow can flow into the water outlet port 32*b*. During the process, the fifth through hole 5*b* of the fixed valve disc 10*b* are blocked and covered by the moving valve disc 20*b* and water cannot flow therethrough. And although the draining through hole 23*b* is overlapped and communicated with the fourth through hole 4*b* provided in the fixed valve disc 10*b*, but no water flows therebetween.

The eleventh embodiment: a fixed bed system for upflow regeneration.

Figure 71:
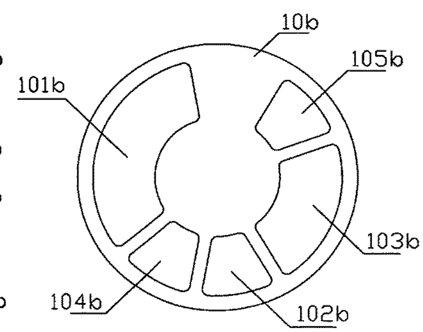
FIG. 71 is a flat structural diagram of the fixed valve disc 10*b* according to the eleventh embodiment and the twelfth embodiment.
Figure 72:
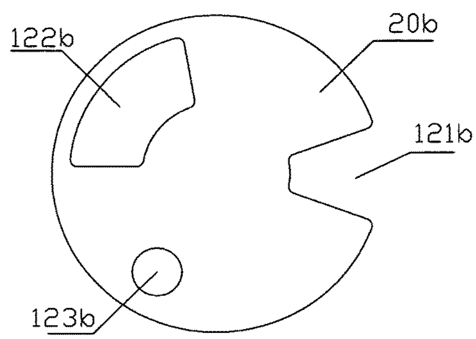
FIG. 72 is a top view of the moving valve disc 20*b* according to the eleventh embodiment and the twelfth embodiment.

As shown in FIG. 55, FIG. 71 to FIG. 74, the fixed valve disc and the moving valve disc shown in FIG. 71 and FIG. 72 are employed in the eleventh embodiment. a multifunction softening valve, comprises a valve body 30*b*, a cover 60*b*, an injector 37*b*, a fixed valve disc 10*b* and a moving valve disc 20*b*, wherein the fixed valve disc10*b* and the moving valve disc 20*b* are respectively provided in the valve body 30*b*, wherein the head faces of the fixed valve disc10*b* and the moving valve disc 20*b* are hermetically and rotationally aligned with each other, wherein the moving valve disc 20*b* is connected with a valve rod 61*b*, wherein the softening valve has a water inlet port 31*b*, a water outlet port 32*b*, an injector outlet 34*b*, an injector inlet 35*b*, an outer filter port 38*b* and an inner filter port 39*b* provided in the valve body 30*b*, wherein the injector 37*b* is communicated with the valve body 30*b* by the injector outlet 34*b* and the injector inlet 35*b*, wherein the injector 37*b* has a brine drawing port 36*b* provided therein; wherein the multifunction valve further has an effluent outlet 33*b* provided in the valve body 30*b*; wherein the fixed valve disc 10*b* has five through holes: a first through hole 101*b*, a second through hole 102*b*, a third through hole 103*b*, a fourth through hole 104*b* and a fifth through hole 105*b* provided therein, wherein the first through hole 101*b* may be communicated with the outer filter port 38*b*; the second through hole 102*b* may be communicated with the water outlet port 32*b*; the third through hole 103*b* may be communicated with the inner filter port 39*b*; the fourth through hole 104*b* is communicated with the injector outlet 34*b*; the fifth through hole 105*b* is communicated with the injector inlet 35*b*, wherein the first through hole 101*b* is neighboring to the fourth through hole 104*b*; the fourth through hole 104*b* is neighboring to the second through hole 102*b*; the second through hole 102*b* is neighboring to the third through hole 103*b*; the third through hole 103*b* is neighboring to the fifth through hole 105*b*; wherein the moving valve disc 20*b* has a water inlet channel 121*b* communicated with the water inlet port 31*b*, wherein the moving valve disc 20*b* further has a communicating blind recess 122*b*, wherein the moving valve disc 20*b* further has a draining through hole 123*b* provided therein, wherein the draining through hole 123*b* is communicated with the effluent outlet 33*b* by the first pollution hole 63*b* provided in the valve rod 61*b* and the second pollution hole 64*b* provided in the cover 60*b* orderly. By rotating the moving valve disc 20*b*, the different overlappings between the fixed valve disc 10*b* and the moving valve disc 20*b* are generated to define different water flow passages.

Figure 73:
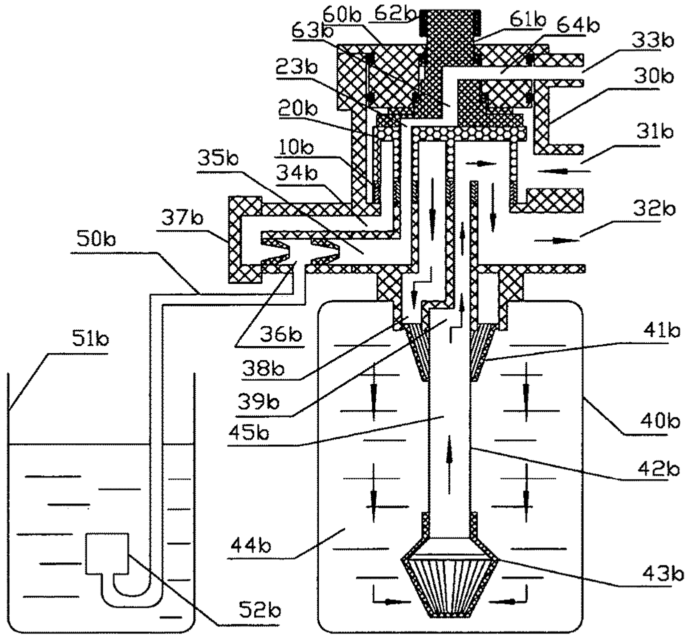
FIG. 73 is a structural diagram of the valve according to the eleventh embodiment, wherein the valve is under the softening working state.
Figure 74:
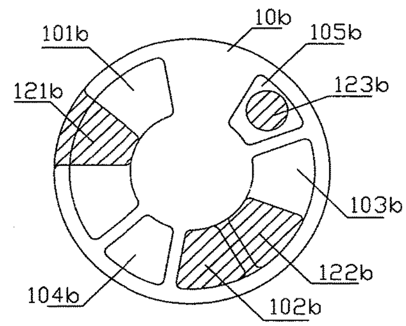
FIG. 74 is a location diagram of the moving valve disc 20*b* relative to the fixed valve disc 10*b* according to the eleventh embodiment and the twelfth embodiment, wherein the moving valve disc 20*b* is under a softening working state.

A softening function: as shown in FIG. 73 and FIG. 74, by rotating the valve rod 61*b*, the water inlet channel 121*b* provided in the moving valve disc 20*b* may be overlapped and communicated with the first through hole 101*b* provided in the fixed valve disc 10*b*, the communicating blind recess 122*b* may be overlapped and communicated with the second through hole 102*b* and the third through hole 103*b* provided in the fixed valve disc 10*b*, and the draining through hole 123*b* may be overlapped and communicated with the fifth through hole 105*b* provided in the fixed valve disc 10*b*. In this overlapping state, water flow may be described as follows: the water flow from the water inlet port 31*b* may flow from the water inlet channel 121*b* of the moving valve disc 20*b* into the first through hole 101*b* of the fixed valve disc 10*b*, wherein because the first through hole 101*b* is communicated with the outer filter port 38*b*, so the water flow can flow from the outer filter port 38*b*, through the upper accumulating umbrella 41*b* into the outside of the filter core 44*b*, and after being softened by resin, flow into the lower accumulating umbrella 43*b*, then flow into the inner filter port 39*b* via the inside 45*b* of the filter core 44*b*, wherein because the inner filter port 39*b* is communicated with the third through hole 103*b* of the fixed valve disc 10*b*, so the water flow can flow into the third through hole 103*b*, and then flow into the second through hole 102*b* of the fixed valve disc 10*b* by flow guiding of the communicating blind recess 122*b*, wherein because the second through hole 102*b* is communicated with the water outlet port 32*b*, so the water flow can flow into the water outlet port 32*b*. During the process, the fourth through hole 104*b* of the fixed valve disc 10*b* is blocked and covered by the moving valve disc 20*b* and water cannot flow therethrough. And although the draining through hole 123*b* is overlapped and communicated with the fifth through hole 105*b* provided in the fixed valve disc 10*b*, but no water flows therebetween.

Figure 75:
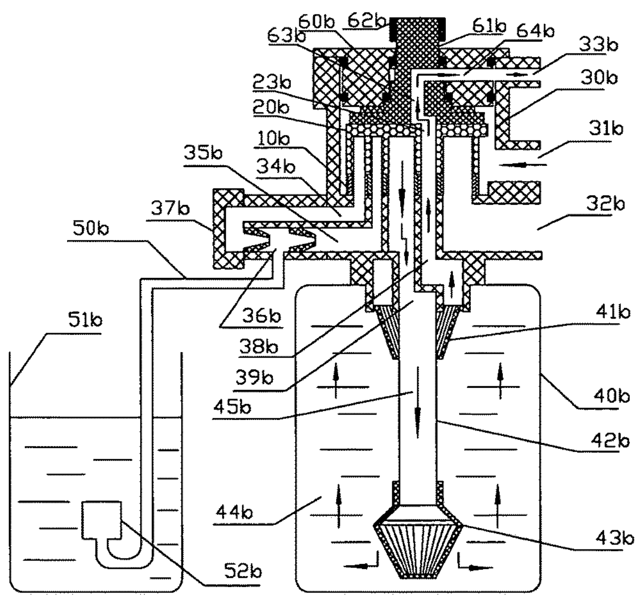
FIG. 75 is a structural diagram of the valve according to the eleventh embodiment, wherein the valve is under a backwash working state.
Figure 76:
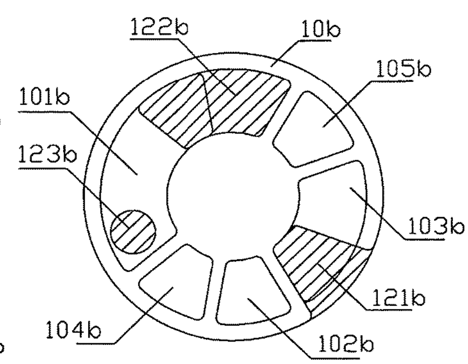
FIG. 76 is a location diagram of the moving valve disc 20*b* relative to the fixed valve disc 10*b* according to the eleventh embodiment and the twelfth embodiment, wherein the moving valve disc 20*b* is under a backwash working state.

A backwash function: as shown in FIG. 75 and FIG. 76, by rotating the valve rod 61*b*, the water inlet channel 121*b* provided in the moving valve disc 20*b* may be overlapped and communicated with the third through hole 103*b* provided in the fixed valve disc 10*b*, the communicating blind recess 122*b* may be overlapped and communicated with the first through hole 101*b* provided in the fixed valve disc 10*b*, and the draining through hole 123*b* may be overlapped and communicated with the first through hole 101*b* provided in the fixed valve disc 10*b*. In this overlapping state, water flow may be described as follows: the water flow from the water inlet port 31*b* may flow from the water inlet channel 121*b* of the moving valve disc 20*b* into the third through hole 103*b* of the fixed valve disc 10*b*, wherein because the third through hole 103*b* is communicated with the inner filter port 39*b*, so the water flow can flow from the inner filter port 39*b*, and then flow through the inside 45*b* of the filter core 44*b* and the lower accumulating umbrella 43*b*, and after backwash the filter core 44*b*, flow through the upper accumulating umbrella 41*b*, and then flow into the outer filter port 38*b*, wherein because the first through hole 101*b* provided in the fixed valve disc 10*b* is communicated with the outer filter port 38*b*, so the water flow can flow into the first through hole 101*b* and flow through the draining through hole 123*b*, and then flow through the first pollution hole 63*b* provided in the valve rod 61*b* and the second pollution hole 64*b* provided in the cover 60*b* orderly to drain via the effluent outlet 33*b*. During the process, the second through hole 102*b*, the fourth through hole 104*b* and the fifth through hole 105*b* of the fixed valve disc 10*b* are blocked and covered by the moving valve disc 20*b* and water cannot flow therethrough. And because the communicating blind recess 122*b* is only overlapped and communicated with one end of the first through hole 101*b* provided in the fixed valve disc 10*b*, so the communicating blind recess 122*b* can substantially provide a blocking and covering function.

Figure 77:
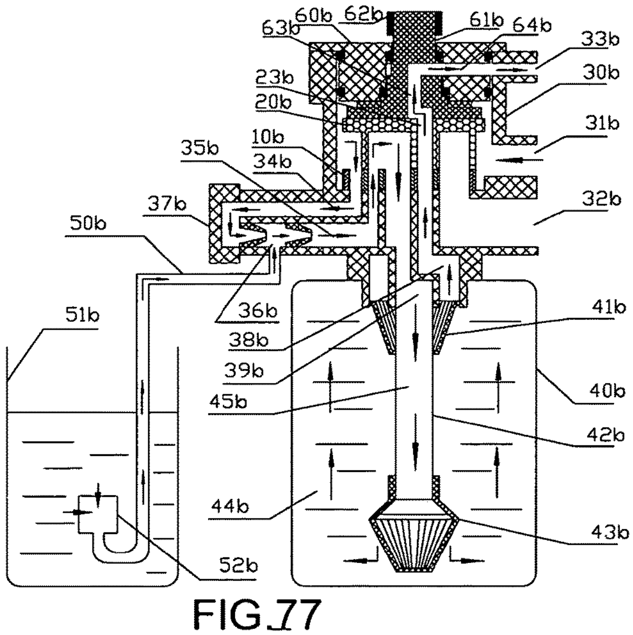
FIG. 77 is a structural diagram of the valve according to the eleventh embodiment, wherein the valve is under a brine intaking upflow regeneration working state.
Figure 78:
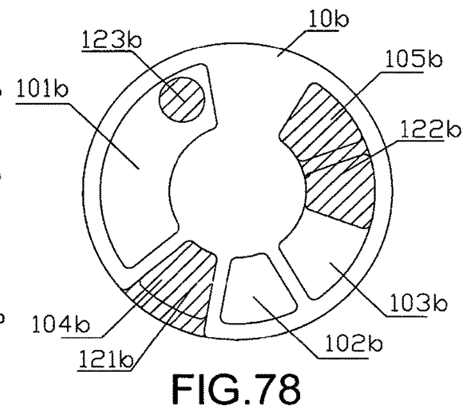
FIG. 78 is a location diagram of the moving valve disc 20*b* relative to the fixed valve disc 10*b* according to the eleventh embodiment and the twelfth embodiment, wherein the moving valve disc 20*b* is under a brine intaking upflow regeneration working state.

A brine intaking upflow regeneration function: as shown in FIG. 77 and FIG. 78, by rotating the valve rod 61*b*, the water inlet channel 121*b* provided in the moving valve disc 20*b* may be overlapped and communicated with the fourth through hole 104*b* provided in the fixed valve disc 10*b*, the communicating blind recess 122*b* may be overlapped and communicated with the fifth through hole 105*b* and the third through hole 103*b* provided in the fixed valve disc 10*b*, and the draining through hole 123*b* may be overlapped and communicated with the first through hole 101*b* provided in the fixed valve disc 10*b*. In this overlapping state, water flow may be described as follows: the water flow from the water inlet port 31*b* may flow from the water inlet channel 121*b* of the moving valve disc 20*b* into the fourth through hole 104*b* of the fixed valve disc 10*b*, wherein because the fourth through hole 104*b* is communicated with the injector outlet 34*b*, so the water flow can flow through the injector outlet 34*b*, inject via the injector 37*b* to define a negative pressure in the brine drawing port 36*b* of the injector 37*b* so as to draw the brine fluid from the brine container 51*b* via a brine valve 52*b* and a soft pipe 50*b*, and the mixed brine water flow defined by the raw water and the brine water may flow into the injector inlet 35*b*, wherein because the fifth through hole 105*b* is communicated with the injector inlet 35*b*, the mixed brine water may flow into the fifth through hole 105*b*, and then flow into the third through hole 103*b* via the communicating blind recess 122*b*, wherein because the third through hole 103*b* is communicated with the inner filter port 39*b*, so the mixed brine water may flow into the inner filter port 39*b*, and then flow through the inside 45*b* of the filter core 44*b* and flow into the filter core 44*b* via the lower accumulating umbrella 43*b*, and after the mixed brine water flows through the resin bed from bottom to top and regenerates the resin bed upflow, it flows through the upper accumulating umbrella 41*b* and flows into the outer filter port 38*b*, wherein because the first through hole 101*b* is communicated with the outer filter port 38*b*, so the water flow may flow into the first through hole 101*b*, and then flow through the draining through hole 123*b*, and after flow through the first pollution through hole 63*b* provided in the valve rod 61*b* and the second pollution through hole 64*b* provided in the cover 60*b* orderly to drain via the effluent outlet 33*b*. During the process, the second through hole 102*b* of the fixed valve disc 10*b* is blocked and covered by the moving valve disc 20*b* and water cannot flow therethrough.

Figure 79:
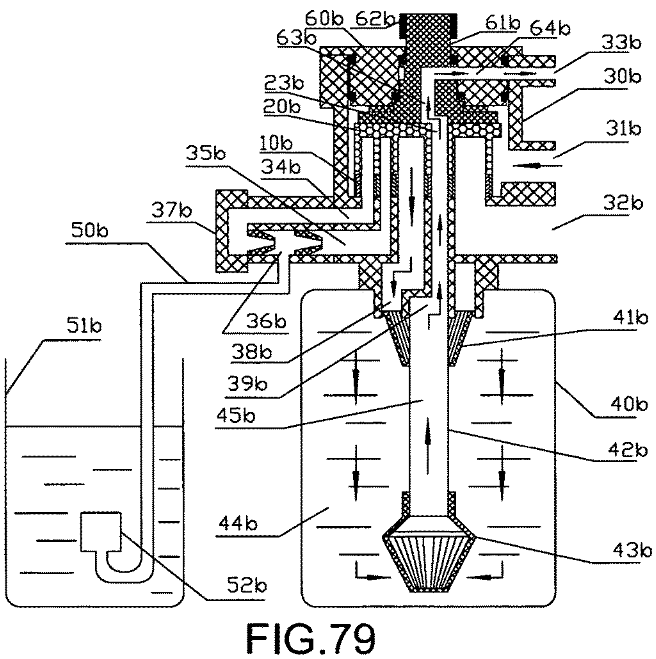
FIG. 79 is a structural diagram of the valve according to the eleventh embodiment, wherein the valve is under a forwardwash working state.
Figure 80:
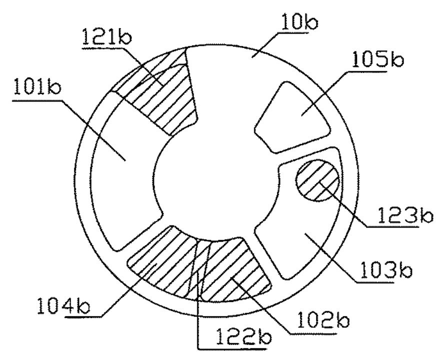
FIG. 80 is a location diagram of the moving valve disc 20*b* relative to the fixed valve disc 10*b* according to the eleventh embodiment and the twelfth embodiment, wherein the moving valve disc 20*b* is under a forwardwash working state.

A forwardwash function: as shown in FIG. 79 and FIG. 80, by rotating the valve rod 61*b*, the water inlet channel 121*b* provided in the moving valve disc 20*b* may be overlapped and communicated with the first through hole 101*b* provided in the fixed valve disc 10*b*, the communicating blind recess 122*b* may be overlapped and communicated with the second through hole 102*b* and the fourth through hole 104*b* provided in the fixed valve disc 10*b*, and the draining through hole 123*b* may be overlapped and communicated with the third through hole 103*b* provided in the fixed valve disc 10*b*. In this overlapping state, water flow may be described as follows: the water flow from the water inlet port 31*b* may flow from the water inlet channel 121*b* of the moving valve disc 20*b* into the first through hole 101*b* of the fixed valve disc 10*b*, wherein because the first through hole 101*b* is communicated with the outer filter port 38*b*, so the water flow can flow from the outer filter port 38*b* and flow through the upper accumulating umbrella 41*b* into the outside of the filter core 44*b*, and after flushing the residue of brine fluid, flow into the lower accumulating umbrella 43*b*, then flow into the inner filter port 39*b* via the inside 45*b* of the filter core 44*b*, wherein because the inner filter port 39*b* is communicated with the third through hole 103*b* of the fixed valve disc 10*b*, so the water flow may flow into the third through hole 103*b*, and then flow through the draining through hole 123*b*, and after flow through the first pollution through hole 63*b* provided in the valve rod 61*b* and the second pollution through hole 64*b* provided in the cover 60*b* orderly to drain via the effluent outlet 33*b*. During the process, the fifth through hole 105*b* of the fixed valve disc 10*b* are blocked and covered by the moving valve disc 20*b* and water cannot flow therethrough. And because the communicating blind recess 122*b* is overlapped and communicated with the second through hole 102*b* and the fourth through hole 104*b* provided in the fixed valve disc 10*b*, so the communicating blind recess 122*b* can substantially provide a blocking and covering function.

Figure 81:
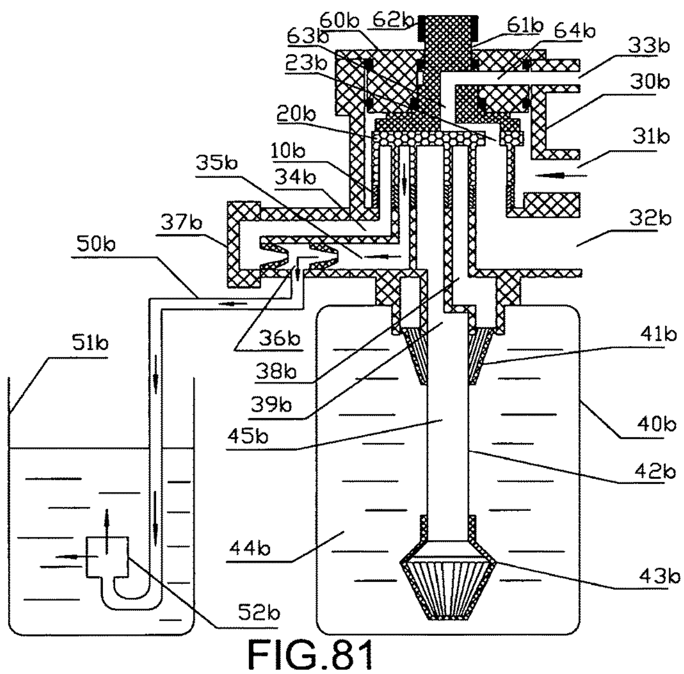
FIG. 81 is a structural diagram of the valve according to the eleventh embodiment, wherein the valve is under a brine container water supplement working state.
Figure 82:
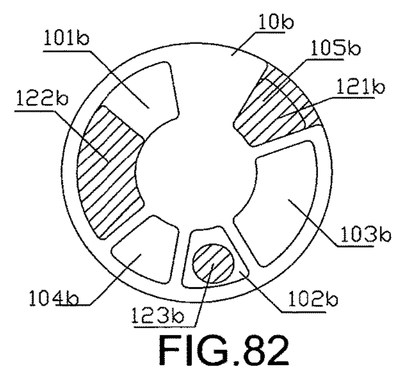
FIG. 82 is a location diagram of the moving valve disc 20*b* relative to the fixed valve disc 10*b* according to the eleventh embodiment and the twelfth embodiment, wherein the moving valve disc 20*b* is under a brine container water supplement working state.

A brine container water supplement function: as shown in FIG. 81 and FIG. 82, by rotating the valve rod 61*b*, the water inlet channel 121*b* provided in the moving valve disc 20*b* may be overlapped and communicated with the fifth through hole 105*b* provided in the fixed valve disc 10*b*, the communicating blind recess 122*b* may be overlapped and communicated with the first through hole 101*b* provided in the fixed valve disc 10*b*, and the draining through hole 123*b* may be overlapped and communicated with the second through hole 102*b* provided in the fixed valve disc 10*b*. In this overlapping state, water flow may be described as follows: the water flow from the water inlet port 31*b* may flow from the water inlet channel 121*b* of the moving valve disc 20*b* into the fifth through hole 105*b* of the fixed valve disc 10*b*, wherein because the fifth through hole 105*b* is communicated with the injector inlet 35*b*, so the water flow can flow into the injector inlet 35*b*, and then flow through the brine drawing port 36*b*, the soft pipe 50*b* and the brine valve 52*b* and flow into the brine container 51*b*. Because the third through hole 103*b* and the fourth through hole 104*b* provided in the fixed valve disc 10*b* is blocked and covered by the moving valve disc 20*b* and water cannot flow therethrough, and the fourth through hole 104*b* is communicated with the injector outlet 34*b*, so no water flow runs through the injector outlet 34*b*. During the process, although the draining through hole 123*b* is overlapped and communicated with the second through hole 102*b* provided in the fixed valve disc 10*b*, but no water flows therebetween, so no water flow flows through the effluent outlet 33*b*, and although the communicating blind recess 122*b* is communicated with the first through hole 101*b* provided in the fixed valve disc 10*b* and substantially provides a blocking and covering function.

The twelfth embodiment: a floating bed system for upflow regeneration.

As shown in FIG. 55, FIG. 71 to FIG. 72, FIG. 74 and FIG. 83, the fixed valve disc and the moving valve disc shown in FIG. 71 and FIG. 72 are employed in the twelfth embodiment. a multifunction softening valve, comprises a valve body 30*b*, a cover 60*b*, an injector 37*b*, a fixed valve disc 10*b* and a moving valve disc 20*b*, wherein the fixed valve disc10*b* and the moving valve disc 20*b* are respectively provided in the valve body 30*b*, wherein the head faces of the fixed valve disc10*b* and the moving valve disc 20*b* are hermetically and rotationally aligned with each other, wherein the moving valve disc 20*b* is connected with a valve rod 61*b*, wherein the softening valve has a water inlet port 31*b*, a water outlet port 32*b*, an injector outlet 34*b*, an injector inlet 35*b*, an outer filter port 38*b* and an inner filter port 39*b* provided in the valve body 30*b*, wherein the injector 37*b* is communicated with the valve body 30*b* by the injector outlet 34*b* and the injector inlet 35*b*, wherein the injector 37*b* has a brine drawing port 36*b* provided therein; wherein the multifunction valve further has an effluent outlet 33*b* provided in the valve body 30*b*; wherein the fixed valve disc 10*b* has five through holes: a first through hole 101*b*, a second through hole 102*b*, a third through hole 103*b*, a fourth through hole 104*b* and a fifth through hole 105*b* provided therein, wherein the first through hole 101*b* may be communicated with the inner filter port 39*b*; the second through hole 102*b* may be communicated with the water outlet port 32*b*; the third through hole 103*b* may be communicated with the outer filter port 38*b*; the fourth through hole 104*b* is communicated with the injector outlet 34*b*; the fifth through hole 105*b* is communicated with the injector inlet 35*b*, wherein the first through hole 101*b* is neighboring to the fourth through hole 104*b*; the fourth through hole 104*b* is neighboring to the second through hole 102*b*; the second through hole 102*b* is neighboring to the third through hole 103*b*; the third through hole 103*b* is neighboring to the fifth through hole 105*b*; wherein the moving valve disc 20*b* has a water inlet channel 121*b* communicated with the water inlet port 31*b*, wherein the moving valve disc 20*b* further has a communicating blind recess 122*b*, wherein the moving valve disc 20*b* further has a draining through hole 123*b* provided therein, wherein the draining through hole 123*b* is communicated with the effluent outlet 33*b* by the first pollution hole 63*b* provided in the valve rod 61*b* and the second pollution hole 64*b* provided in the cover 60*b* orderly. By rotating the moving valve disc 20*b*, the different overlappings between the fixed valve disc 10*b* and the moving valve disc 20*b* are generated to define different water flow passages.

The only difference between the twelfth embodiment and the eleventh embodiment is as follows: in the twelfth embodiment, the first through hole 101*b* may be communicated with the inner filter port 39*b*; the third through hole 103*b* may be communicated with the outer filter port 38*b*; but in the eleventh embodiment, the first through hole 101*b* may be communicated with the outer filter port 38*b*; the third through hole 103*b* may be communicated with the inner filter port 39*b*; so when the fixed valve disc and the moving valve disc are at a position, the difference may make water flows in the water treatment container flow in two opposite directions. So only one example is described for explaining detailedly the softening function, and the illustrations for the other four functions can be omitted.

Figure 83:
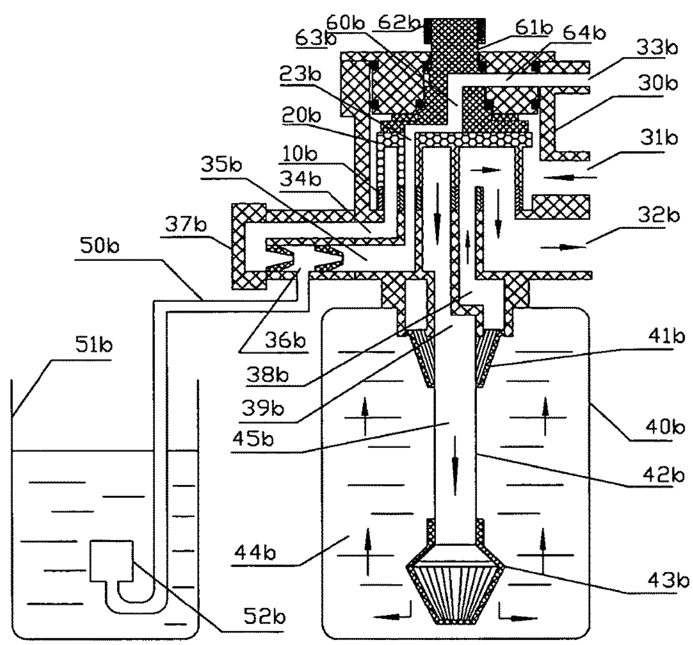
FIG. 83 is a structural diagram of the valve according to the twelfth embodiment, wherein the valve is under the softening working state.

A softening function: as shown in FIG. 74 and FIG. 83, by rotating the valve rod 61*b*, the water inlet channel 121*b* provided in the moving valve disc 20*b* may be overlapped and communicated with the first through hole 101*b* provided in the fixed valve disc 10*b*, the communicating blind recess 122*b* may be overlapped and communicated with the second through hole 102*b* and the third through hole 103*b* provided in the fixed valve disc 10*b*, and the draining through hole 123*b* may be overlapped and communicated with the fifth through hole 105*b* provided in the fixed valve disc 10*b*. In this overlapping state, water flow may be described as follows: the water flow from the water inlet port 31*b* may flow from the water inlet channel 121*b* of the moving valve disc 20*b* into the first through hole 101*b* of the fixed valve disc 10*b*, wherein because the first through hole 101*b* is communicated with the inner filter port 39*b*, so the water flow can flow from the inner filter port 39*b* and flow through the lower accumulating umbrella 43*b*, and after being softened by resin, flow into the upper accumulating umbrella 41*b*, then flow into the outer filter port 38*b*, wherein because the outer filter port 38*b* is communicated with the third through hole 103*b* of the fixed valve disc 10*b*, so the water flow can flow into the third through hole 103*b*, and then flow into the second through hole 2*b* of the fixed valve disc 10*b* by flow guiding of the communicating blind recess 122*b*, wherein because the second through hole 102*b* is communicated with the water outlet port 32*b*, so the water flow can flow into the water outlet port 32*b*. During the process, the fourth through hole 104*b* of the fixed valve disc 10*b* is blocked and covered by the moving valve disc 20*b* and water cannot flow therethrough. And although the draining through hole 123*b* is overlapped and communicated with the fifth through hole 105*b* provided in the fixed valve disc 10*b*, but no water flows therebetween.

The thirteenth embodiment: employing a technical solution of draining directly from a cover.

Figure 84:
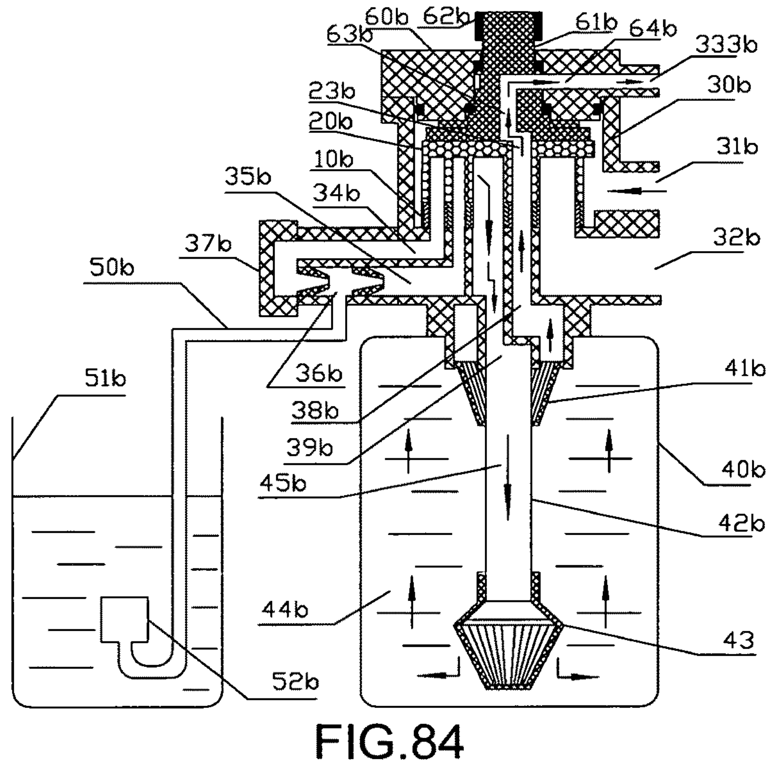
FIG. 84 is a diagram of a draining structure according to the thirteenth embodiment, which employs the drainage technology of draining directly from the cover.
Figure 85:
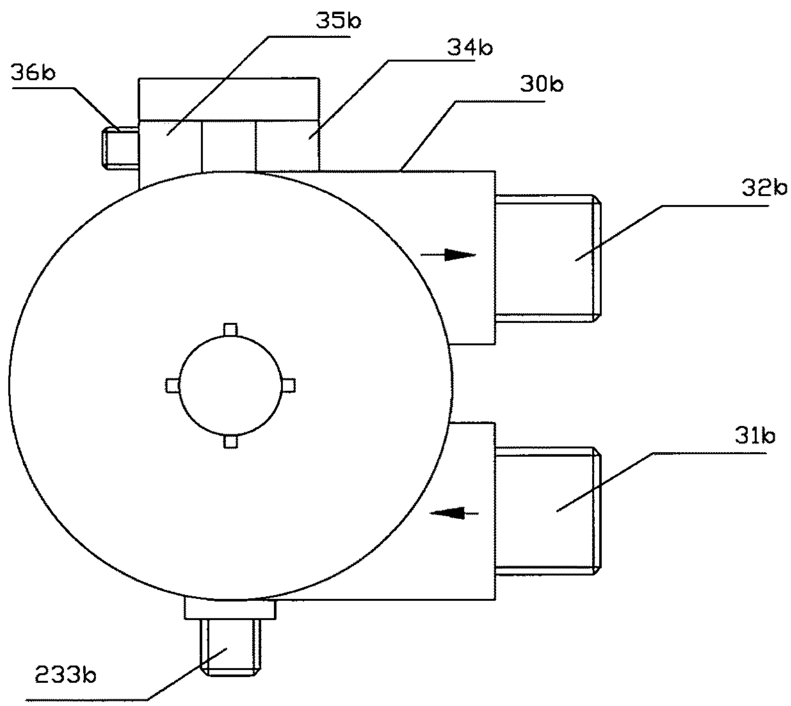
FIG. 85 is a top view of the valve body 30*b* according to the fourteenth embodiment and the fifteenth embodiment.

As shown in FIG. 84, a cover 60*b* has a drainage outlet 333*b* provided therein, and the draining through hole 23*b* is communicated with the effluent outlet 33*b* by the first pollution hole 63*b* provided in the valve rod 61*b* and the second pollution hole 64*b* provided in the cover 60*b* orderly.

The thirteenth embodiment is different from the ninth embodiment, the tenth embodiment, the eleventh embodiment, the twelfth embodiment: in the ninth embodiment, the tenth embodiment, the eleventh embodiment, the twelfth embodiment, the effluent outlet is provided in the valve body, and the drainage passage is provided as follows: communicating with the effluent outlet via by the first pollution hole 63*b* provided in the valve rod 61*b* and the second pollution hole 64*b* provided in the cover 60*b* orderly. Other descriptions are similar, which are omitted herein.

The fourteenth embodiment: a fixed bed system for upflow regeneration. It employs a technical solution of draining via a sixth through hole.

Figure 86:
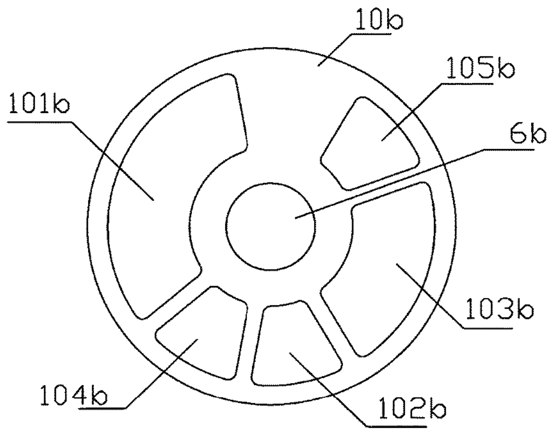
FIG. 86 is a flat structural diagram of the fixed valve disc 10*b* according to the fourteenth embodiment and the fifteenth embodiment.
Figure 87:
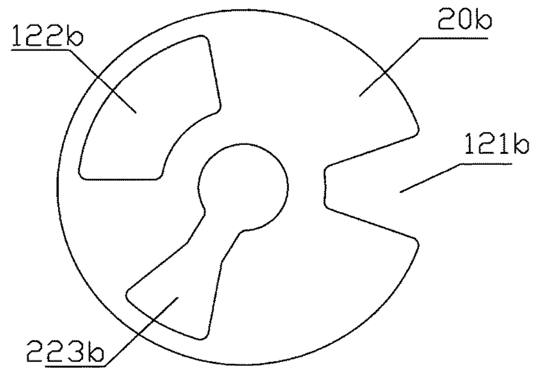
FIG. 87 is a top view of the moving valve disc 20*b* according to the fourteenth embodiment and the fifteenth embodiment.

As shown in FIG. 85 to FIG. 89, the fixed valve disc and the moving valve disc shown in FIG. 86 and FIG. 87 are employed. a multifunction softening valve, comprises a valve body 30*b*, a cover 60*b*, an injector 37*b*, a fixed valve disc 10*b* and a moving valve disc 20*b*, wherein the fixed valve disc10*b* and the moving valve disc 20*b* are respectively provided in the valve body 30*b*, wherein the head faces of the fixed valve disc10*b* and the moving valve disc 20*b* are hermetically and rotationally aligned with each other, wherein the moving valve disc 20*b* is connected with a valve rod 61*b*, wherein the softening valve has a water inlet port 31*b*, a water outlet port 32*b*, an effluent outlet 233*b*, an injector outlet 34*b*, an injector inlet 35*b*, an outer filter port 38*b* and an inner filter port 39*b* provided in the valve body 30*b*, wherein the injector 37*b* is communicated with the valve body 30*b* by the injector outlet 34*b* and the injector inlet 35*b*, wherein the injector 37*b* has a brine drawing port 36*b* provided therein; wherein the fixed valve disc 10*b* has five through holes: a first through hole 101*b*, a second through hole 102*b*, a third through hole 103*b*, a fourth through hole 104*b* and a fifth through hole 105*b* provided therein, wherein the first through hole 101*b* may be communicated with the outer filter port 38*b*; the second through hole 102*b* may be communicated with the water outlet port 32*b*; the third through hole 103*b* may be communicated with the inner filter port 39*b*; the fourth through hole 104*b* is communicated with the injector outlet 34*b*; the fifth through hole 105*b* is communicated with the injector inlet 35*b*, wherein the fixed valve disc 10*b* further has a sixth through hole 6*b* provided in a center of the fixed valve disc 10*b*, wherein the first through hole 101*b* is neighboring to the fourth through hole 104*b*; the fourth through hole 104*b* is neighboring to the second through hole 102*b*; the second through hole 102*b* is neighboring to the third through hole 103*b*; the third through hole 103*b* is neighboring to the fifth through hole 105*b*; wherein the moving valve disc 20*b* has a water inlet channel 121*b* communicated with the water inlet port 31*b*, wherein the moving valve disc 20*b* further has a communicating blind recess 122*b*, wherein the moving valve disc 20*b* further has a draining blind recess 223*b* provided therein, wherein one end of the draining blind recess 223*b* is provided in the center of the moving valve disc 20*b*, wherein the draining blind recess 223*b* is communicated with the effluent outlet 233*b* by the sixth through hole 6*b* provided in the fixed valve disc 10*b*. By rotating the moving valve disc 20*b*, the different overlappings between the fixed valve disc 10*b* and the moving valve disc 20*b* are generated to define different water flow passages.

Figure 88:
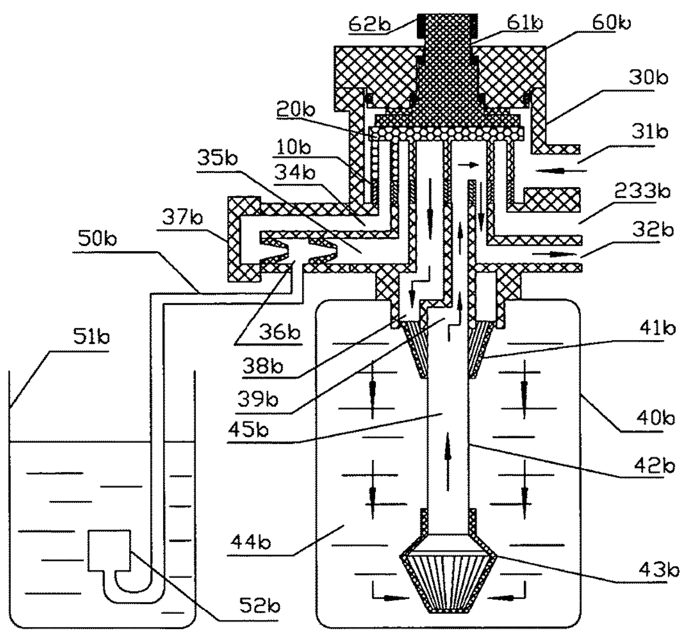
FIG. 88 is a structural diagram of the valve according to the fourteenth embodiment, wherein the valve is under the softening working state.
Figure 89:
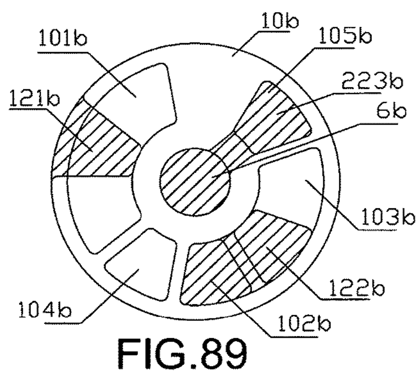
FIG. 89 is a location diagram of the moving valve disc 20*b* relative to the fixed valve disc 10*b* according to the fourteenth embodiment and the fifteenth embodiment, wherein the moving valve disc 20*b* is under a softening working state.

A softening function: as shown in FIG. 88 and FIG. 89, by rotating the valve rod 61*b*, the water inlet channel 121*b* provided in the moving valve disc 20*b* may be overlapped and communicated with the first through hole 101*b* provided in the fixed valve disc 10*b*, the communicating blind recess 122*b* may be overlapped and communicated with the second through hole 102*b* and the third through hole 103*b* provided in the fixed valve disc 10*b*, and the draining blind recess 223*b* may be overlapped and communicated with the fifth through hole 105*b* and the sixth through hole 6*b* provided in the fixed valve disc 10*b*. In this overlapping state, water flow may be described as follows: the water flow from the water inlet port 31*b* may flow from the water inlet channel 121*b* of the moving valve disc 20*b* into the first through hole 101*b* of the fixed valve disc 10*b*, wherein because the first through hole 101*b* is communicated with the outer filter port 38*b*, so the water flow can flow from the outer filter port 38*b*, through the upper accumulating umbrella 41*b* into the outside of the filter core 44*b*, and after being softened by resin, flow into the lower accumulating umbrella 43*b*, then flow into the inner filter port 39*b* via the inside 45*b* of the filter core 44*b*, wherein because the inner filter port 39*b* is communicated with the third through hole 103*b* of the fixed valve disc 10*b*, so the water flow can flow into the third through hole 103*b*, and then flow into the second through hole 102*b* of the fixed valve disc 10*b* by flow guiding of the communicating blind recess 122*b*, wherein because the second through hole 102*b* is communicated with the water outlet port 32*b*, so the water flow can flow into the water outlet port 32*b*. During the process, the fourth through hole 104*b* of the fixed valve disc 10*b* is blocked and covered by the moving valve disc 20*b* and water cannot flow therethrough. The draining blind recess 223*b* is overlapped and communicated with the fifth through hole 105*b* and the sixth through hole 6*b* provided in the fixed valve disc 10*b*, but no water flows therebetween.

Figure 90:
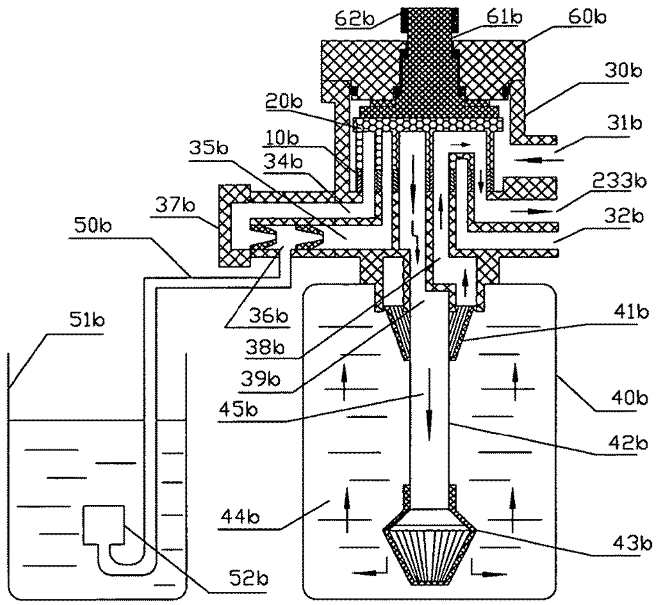
FIG. 90 is a structural diagram of the valve according to the fourteenth embodiment, wherein the valve is under a backwash working state.
Figure 91:
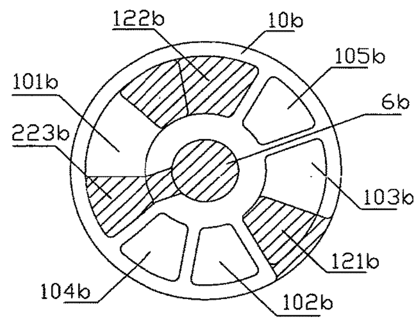
FIG. 91 is a location diagram of the moving valve disc 20*b* relative to the fixed valve disc 10*b* according to the fourteenth embodiment and the fifteenth embodiment, wherein the moving valve disc 20*b* is under a backwash working state.

A backwash function: as shown in FIG. 90 and FIG. 91, by rotating the valve rod 61*b*, the water inlet channel 121*b* provided in the moving valve disc 20*b* may be overlapped and communicated with the third through hole 103*b* provided in the fixed valve disc 10*b*, the communicating blind recess 122*b* may be overlapped and communicated with the first through hole 101*b* provided in the fixed valve disc 10*b*, and the draining blind recess 223*b* may be overlapped and communicated with the first through hole 101*b* and the sixth through hole 6*b* provided in the fixed valve disc 10*b*. In this overlapping state, water flow may be described as follows: the water flow from the water inlet port 31*b* may flow from the water inlet channel 121*b* of the moving valve disc 20*b* into the third through hole 103*b* of the fixed valve disc 10*b*, wherein because the third through hole 103*b* is communicated with the inner filter port 39*b*, so the water flow can flow from the inner filter port 39*b*, and then flow through the inside 45*b* of the filter core 44*b* and the lower accumulating umbrella 43*b*, and after backwash the filter core 44*b*, flow through the upper accumulating umbrella 41*b*, and then flow into the outer filter port 38*b*, wherein because the first through hole 101*b* provided in the fixed valve disc 10*b* is communicated with the outer filter port 38*b*, so the water flow can flow into the first through hole 101*b*, and then flow into the sixth through hole 6*b* by flow guiding of the draining blind recess 223*b*, wherein because the sixth through hole 6*b* is communicated with the effluent outlet 233*b*, so the water flow is able to flow into the effluent outlet 233*b* to drain. During the process, the second through hole 102*b*, the fourth through hole 104*b* and the fifth through hole 105*b* of the fixed valve disc 10*b* are blocked and covered by the moving valve disc 20*b* and water cannot flow therethrough. And because the communicating blind recess 122*b* is only overlapped and communicated with one end of the first through hole 101*b* provided in the fixed valve disc 10*b*, so the communicating blind recess 122*b* can substantially provide a blocking and covering function.

Figure 92:
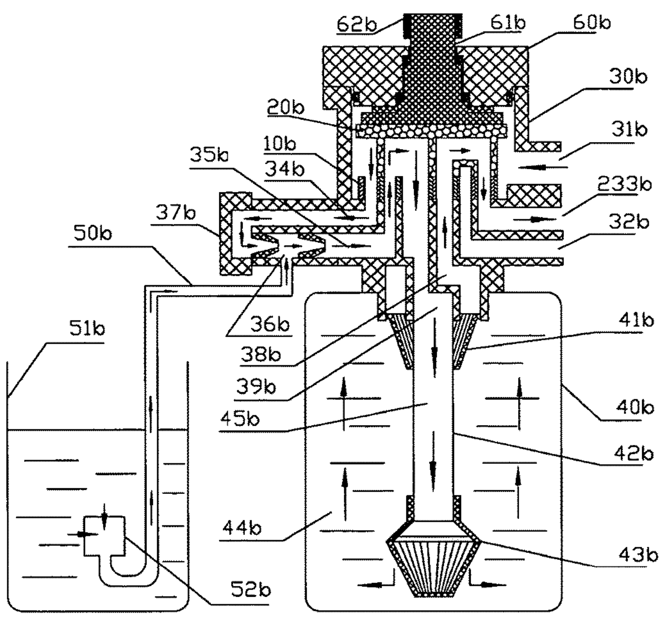
FIG. 92 is a structural diagram of the valve according to the fourteenth embodiment, wherein the valve is under a brine intaking upflow regeneration working state.
Figure 93:
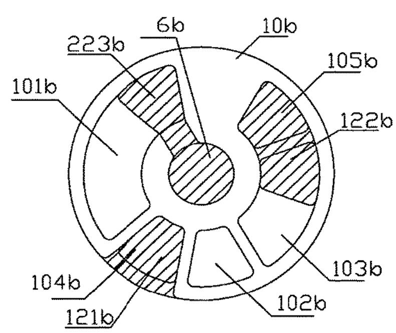
FIG. 93 is a location diagram of the moving valve disc 20*b* relative to the fixed valve disc 10*b* according to the fourteenth embodiment and the fifteenth embodiment, wherein the moving valve disc 20*b* is under a brine intaking upflow regeneration working state.

A brine intaking upflow regeneration function: as shown in FIG. 92 and FIG. 93, by rotating the valve rod 61*b*, the water inlet channel 121*b* provided in the moving valve disc 20*b* may be overlapped and communicated with the fourth through hole 104*b* provided in the fixed valve disc 10*b*, the communicating blind recess 122*b* may be overlapped and communicated with the fifth through hole 105*b* and the third through hole 103*b* provided in the fixed valve disc 10*b*, and the draining blind recess 223*b* may be overlapped and communicated with the first through hole 101*b* and the sixth through hole 6*b* provided in the fixed valve disc 10*b*. In this overlapping state, water flow may be described as follows: the water flow from the water inlet port 31*b* may flow from the water inlet channel 121*b* of the moving valve disc 20*b* into the fourth through hole 104*b* of the fixed valve disc 10*b*, wherein because the fourth through hole 104*b* is communicated with the injector outlet 34*b*, so the water flow can flow through the injector outlet 34*b*, inject via the injector 37*b* to define a negative pressure in the brine drawing port 36*b* of the injector 37*b* so as to draw the brine fluid from the brine container 51*b* via a brine valve 52*b* and a soft pipe 50*b*, and the mixed brine water flow defined by the raw water and the brine water may flow into the injector inlet 35*b*, wherein because the fifth through hole 105*b* is communicated with the injector inlet 35*b*, the mixed brine water may flow into the fifth through hole 105*b*, and then flow into the third through hole 103*b* via the communicating blind recess 122*b*, wherein because the third through hole 103*b* is communicated with the inner filter port 39*b*, so the mixed brine water may flow into the inner filter port 39*b*, and then flow through the inside 45*b* of the filter core 44*b* and flow into the filter core 44*b* via the lower accumulating umbrella 43*b*, and after the mixed brine water flows through the resin bed from bottom to top and regenerates the resin bed, it flows through the upper accumulating umbrella 41*b* and flows into the outer filter port 38*b*, wherein because the first through hole 101*b* is communicated with the outer filter port 38*b*, so the water flow may flow into the first through hole 101*b*, and then flow into the sixth through hole 6*b* by flow guiding of the draining blind recess 223*b*, wherein because the sixth through hole 6*b* is communicated with the effluent outlet 233*b*, so the water flow is able to flow into the effluent outlet 233*b* to drain. During the process, the second through hole 102*b* of the fixed valve disc 10*b* is blocked and covered by the moving valve disc 20*b* and water cannot flow therethrough.

Figure 94:
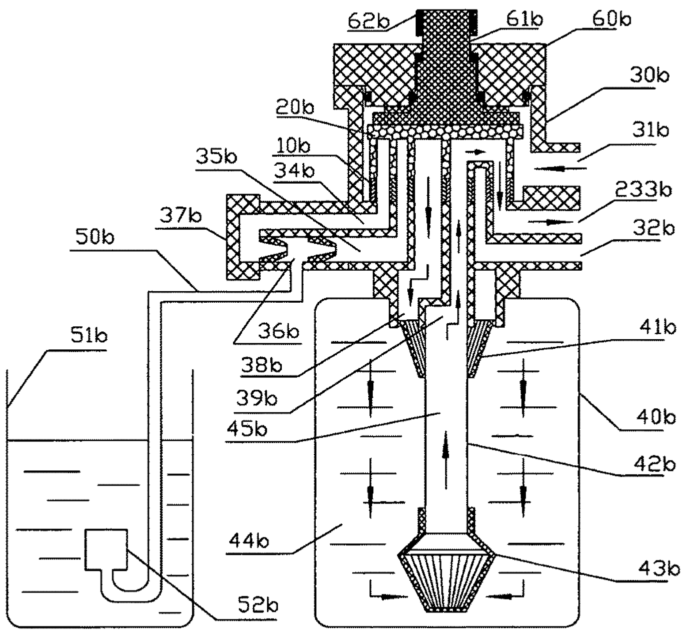
FIG. 94 is a structural diagram of the valve according to the fourteenth embodiment, wherein the valve is under a forwardwash working state.
Figure 95:
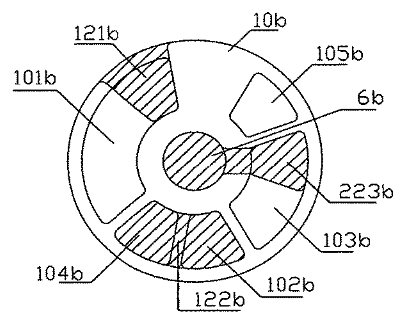
FIG. 95 is a location diagram of the moving valve disc 20*b* relative to the fixed valve disc 10*b* according to the fourteenth embodiment and the fifteenth embodiment, wherein the moving valve disc 20*b* is under a forwardwash working state.

A forwardwash function: as shown in FIG. 94 and FIG. 95, by rotating the valve rod 61*b*, the water inlet channel 121*b* provided in the moving valve disc 20*b* may be overlapped and communicated with the first through hole 101*b* provided in the fixed valve disc 10*b*, the communicating blind recess 122*b* may be overlapped and communicated with the second through hole 102*b* and the fourth through hole 104*b* provided in the fixed valve disc 10*b*, and the draining blind recess 223*b* may be overlapped and communicated with the third through hole 103*b* and the sixth through hole 6*b* provided in the fixed valve disc 10*b*. In this overlapping state, water flow may be described as follows: the water flow from the water inlet port 31*b* may flow from the water inlet channel 121*b* of the moving valve disc 20*b* into the first through hole 101*b* of the fixed valve disc 10*b*, wherein because the first through hole 101*b* is communicated with the outer filter port 38*b*, so the water flow can flow from the outer filter port 38*b* and flow through the upper accumulating umbrella 41*b* into the outside of the filter core 44*b*, and after flushing the residue of brine fluid, flow into the lower accumulating umbrella 43*b*, then flow into the inner filter port 39*b* via the inside 45*b* of the filter core 44*b*, wherein because the inner filter port 39*b* is communicated with the third through hole 103*b* of the fixed valve disc 10*b*, so the water flow may flow into the third through hole 103*b*, and then flow into the sixth through hole 6*b* by flow guiding of the draining blind recess 223*b*, wherein because the sixth through hole 6*b* is communicated with the effluent outlet 233*b*, so the water flow is able to flow into the effluent outlet 233*b* to drain. During the process, the fifth through hole 105*b* of the fixed valve disc 10*b* are blocked and covered by the moving valve disc 20*b* and water cannot flow therethrough. And because the communicating blind recess 122*b* is overlapped and communicated with the second through hole 102*b* and the fourth through hole 104*b* provided in the fixed valve disc 10*b*, so the communicating blind recess 122*b* can substantially provide a blocking and covering function.

Figure 96:
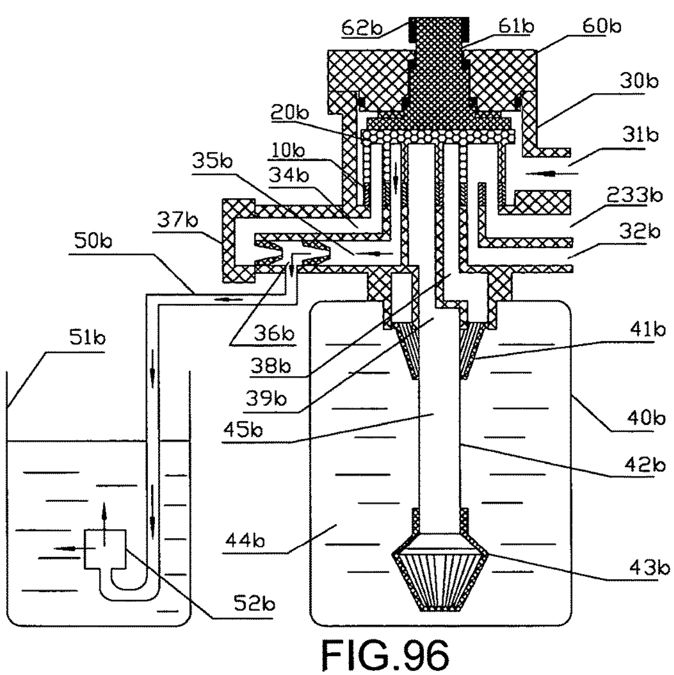
FIG. 96 is a structural diagram of the valve according to the fourteenth embodiment, wherein the valve is under a brine container water supplement working state.
Figure 97:
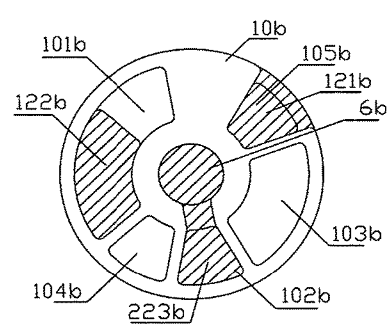
FIG. 97 is a location diagram of the moving valve disc 20*b* relative to the fixed valve disc 10*b* according to the fourteenth embodiment and the fifteenth embodiment, wherein the moving valve disc 20*b* is under a brine container water supplement working state.

A brine container water supplement function: as shown in FIG. 96 and FIG. 97, by rotating the valve rod 61*b*, the water inlet channel 121*b* provided in the moving valve disc 20*b* may be overlapped and communicated with the fifth through hole 105*b* provided in the fixed valve disc 10*b*, the communicating blind recess 122*b* may be overlapped and communicated with the first through hole 101*b* provided in the fixed valve disc 10*b*, and the draining blind recess 223*b* may be overlapped and communicated with the second through hole 102*b* and the sixth through hole 6*b* provided in the fixed valve disc 10*b*. In this overlapping state, water flow may be described as follows: the water flow from the water inlet port 31*b* may flow from the water inlet channel 121*b* of the moving valve disc 20*b* into the fifth through hole 105*b* of the fixed valve disc 10*b*, wherein because the fifth through hole 105*b* is communicated with the injector inlet 35*b*, so the water flow can flow into the injector inlet 35*b*, and then flow through the brine drawing port 36*b*, the soft pipe 50*b* and the brine valve 52*b* and flow into the brine container 51*b*. Because the third through hole 103*b* and the fourth through hole 104*b* provided in the fixed valve disc 10*b* is blocked and covered by the moving valve disc 20*b* and water cannot flow therethrough, and the fourth through hole 104*b* is communicated with the injector outlet 34*b*, so no water flow runs through the injector outlet 34*b*. During the process, although the draining blind recess 223*b* is overlapped and communicated with the second through hole 102*b* and the sixth through hole 6*b* provided in the fixed valve disc 10*b*, but no water flows therebetween, so no water flow flows through the effluent outlet 233*b* to drain, and the communicating blind recess 122*b* is communicated with the first through hole 101*b* provided in the fixed valve disc 10*b* and substantially provides a blocking and covering function.

The fifteenth embodiment: a floating bed system for upflow regeneration.

As shown in FIG. 85 to FIG. 88, FIG. 89 and FIG. 90, the fixed valve disc and the moving valve disc shown in FIG. 86 and FIG. 87 are employed. a multifunction softening valve, comprises a valve body 30*b*, a cover 60*b*, an injector 37*b*, a fixed valve disc 10*b* and a moving valve disc 20*b*, wherein the fixed valve disc10*b* and the moving valve disc 20*b* are respectively provided in the valve body 30*b*, wherein the head faces of the fixed valve disc10*b* and the moving valve disc 20*b* are hermetically and rotationally aligned with each other, wherein the moving valve disc 20*b* is connected with a valve rod 61*b*, wherein the softening valve has a water inlet port 31*b*, a water outlet port 32*b*, an effluent outlet 233*b*, an injector outlet 34*b*, an injector inlet 35*b*, an outer filter port 38*b* and an inner filter port 39*b* provided in the valve body 30*b*, wherein the injector 37*b* is communicated with the valve body 30*b* by the injector outlet 34*b* and the injector inlet 35*b*, wherein the injector 37*b* has a brine drawing port 36*b* provided therein; wherein the fixed valve disc 10*b* has five through holes: a first through hole 101*b*, a second through hole 102*b*, a third through hole 103*b*, a fourth through hole 104*b* and a fifth through hole 105*b* provided therein, wherein the first through hole 101*b* may be communicated with the inner filter port 39*b*; the second through hole 102*b* may be communicated with the water outlet port 32*b*; the third through hole 103*b* may be communicated with the outer filter port 38*b*; the fourth through hole 104*b* is communicated with the injector outlet 34*b*; the fifth through hole 105*b* is communicated with the injector inlet 35*b*, wherein the fixed valve disc 10*b* further has a sixth through hole 106*b* provided in a center of the fixed valve disc 10*b*, wherein the first through hole 101*b* is neighboring to the fourth through hole 104*b*; the fourth through hole 104*b* is neighboring to the second through hole 102*b*; the second through hole 102*b* is neighboring to the third through hole 103*b*; the third through hole 103*b* is neighboring to the fifth through hole 105*b*; wherein the moving valve disc 20*b* has a water inlet channel 121*b* communicated with the water inlet port 31*b*, wherein the moving valve disc 20*b* further has a communicating blind recess 122*b*, wherein the moving valve disc 20*b* further has a draining blind recess 223*b* provided therein, wherein one end of the draining blind recess 223*b* is provided in the center of the moving valve disc 20*b*, wherein the draining blind recess 223*b* is communicated with the effluent outlet 233*b* by the sixth through hole 6*b* provided in the fixed valve disc 10*b*. By rotating the moving valve disc 20*b*, the different overlappings between the fixed valve disc 10*b* and the moving valve disc 20*b* are generated to define different water flow passages.

The only difference between the fifteenth embodiment and the fourteenth embodiment is as follows: in the fifteenth embodiment, the first through hole 101*b* may be communicated with the inner filter port 39*b*; the third through hole 103*b* may be communicated with the outer filter port 38*b*; but in the fourteenth embodiment, the first through hole 101*b* may be communicated with the outer filter port 38*b*; the third through hole 103*b* may be communicated with the inner filter port 39*b*; so when the fixed valve disc and the moving valve disc are at a position, the difference may make water flows in the water treatment container flow in two opposite directions. So only one example is described for explaining detailedly the softening function herein, and the illustrations for the other four functions can be omitted.

Figure 98:
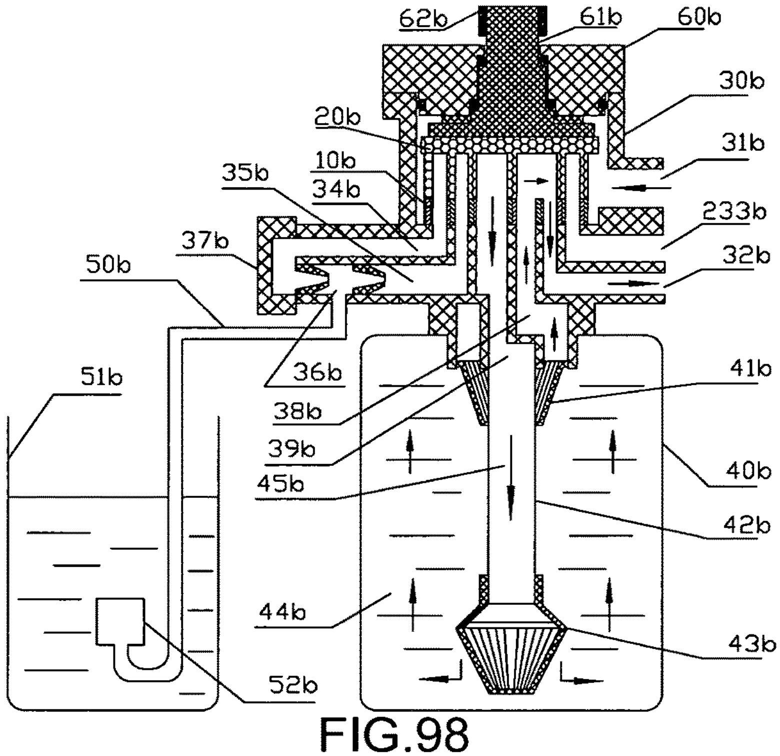
FIG. 98 is a structural diagram of the valve according to the fourteenth embodiment, wherein the valve is under the softening working state.
Figure 99:
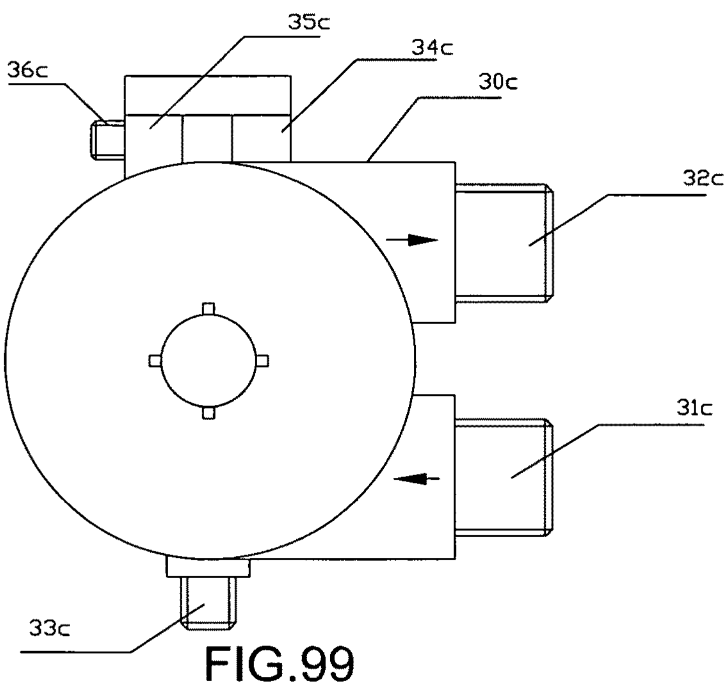
FIG. 99 is a top view of the valve body 30*c* according to the sixteenth embodiment.

A softening function: as shown in FIG. 89 and FIG. 98, by rotating the valve rod 61*b*, the water inlet channel 121*b* provided in the moving valve disc 20*b* may be overlapped and communicated with the first through hole 101*b* provided in the fixed valve disc 10*b*, the communicating blind recess 122*b* may be overlapped and communicated with the second through hole 102*b* and the third through hole 103*b* provided in the fixed valve disc 10*b*, and the draining through hole 123*b* may be overlapped and communicated with the fifth through hole 105*b* and the sixth through hole 6*b* provided in the fixed valve disc 10*b*. In this overlapping state, water flow may be described as follows: the water flow from the water inlet port 31*b* may flow from the water inlet channel 121*b* of the moving valve disc 20*b* into the first through hole 101*b* of the fixed valve disc 10*b*, wherein because the first through hole 101*b* is communicated with the inner filter port 39*b*, so the water flow can flow from the inner filter port 39*b* and flow through the lower accumulating umbrella 43*b*, and after being softened by resin, flow into the upper accumulating umbrella 41*b*, then flow into the outer filter port 38*b*, wherein because the outer filter port 38*b* is communicated with the third through hole 103*b* of the fixed valve disc 10*b*, so the water flow can flow into the third through hole 103*b*, and then flow into the second through hole 2*b* of the fixed valve disc 10*b* by flow guiding of the communicating blind recess 122*b*, wherein because the second through hole 102*b* is communicated with the water outlet port 32*b*, so the water flow can flow into the water outlet port 32*b*. During the process, the fourth through hole 104*b* of the fixed valve disc 10*b* is blocked and covered by the moving valve disc 20*b* and water cannot flow therethrough. Although the draining blind recess 223*b* is overlapped and communicated with the fifth through hole 105*b* and the sixth through hole 6*b* provided in the fixed valve disc 10*b*, but no water flows therebetween.

In the following sixteenth embodiment to eighteenth embodiment, when the flow control apparatus of the present disclosure is used, which is provided with a water treatment container 40*c*, wherein a filter core 44*c* may be provided in the water treatment container 40*c*, or a filter material is provided in the water treatment container 40*c* to define the filter core 44*c*, wherein a filter outer port 38*c* of a valve body 30*c* is communicated with an outside of the filter core 44*c* by an upper accumulating umbrella 41*c*, a filter inner port 39*c* of the valve body 30*c* is communicated with the filter core 44*c* by a central tube 42*c* and a lower accumulating umbrella 43*c*, as shown in FIG. 122. Further, a water inlet port 31*c* is communicated with a water resource, an effluent outlet 33*c* is communicated with a draining device, a brine drawing port 36*c* is communicated with a brine valve 52*c* of a brine container 51*c* via a soft pipe 50*c*. When the water treatment apparatus is used as a filter valve according to the present disclosure, the brine drawing port 36*c* need to be closed. A driving gear 62*c* provided in one end of a valve rod 61*c* can be automatically or manually rotated to rotate the moving valve disc 20*c* so as to switch the different overlapping states between the moving valve disc 20*c* and the fixed valve disc 10*c* and achieve the different functions of the present disclosure. The following description is provided as an example for illustrating the present disclosure by using a resin filter.

The sixteenth embodiment: employing a technical solution of draining directly from a cover through a valve rod.

Figure 100:
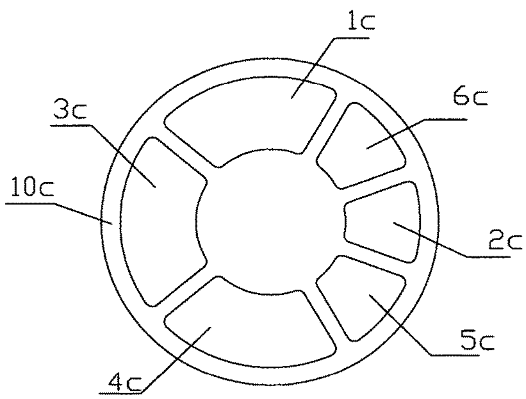
FIG. 100 is a flat structural diagram of the fixed valve disc 10*c* according to the sixteenth embodiment.
Figure 101:
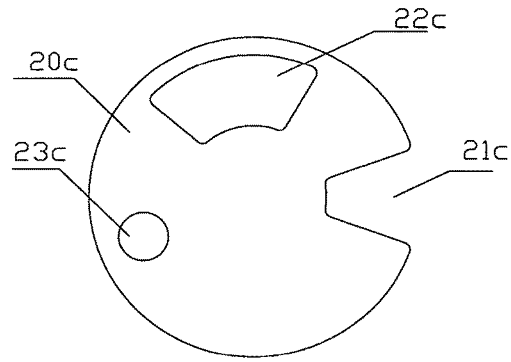
FIG. 101 is a top view of the moving valve disc 20*c* according to the sixteenth embodiment.

As shown in FIG. 99 to FIG. 123, the fixed valve disc and the moving valve disc shown in FIG. 100 and FIG. 101 are employed. a multifunction softening valve, comprises a valve body 30*c*, a cover 60*c*, an injector 37*c*, a fixed valve disc 10*c* and a moving valve disc 20*c*, wherein the fixed valve disc10*c* and the moving valve disc 20*c* are respectively provided in the valve body 30*c*, wherein the head faces of the fixed valve disc10*c* and the moving valve disc 20*c* are hermetically and rotationally aligned with each other, wherein the moving valve disc 20*c* is connected with a valve rod 61*c*, wherein the softening valve has a water inlet port 31*c*, a water outlet port 32*c*, an injector outlet 34*c*, an injector inlet 35*c*, an outer filter port 38*c* and an inner filter port 39*c* provided in the valve body 30*c*, wherein the injector 37*c* is communicated with the valve body 30*c* by the injector outlet 34*c* and the injector inlet 35*c*, wherein the injector 37*c* has a brine drawing port 36*c* provided therein; the multifunction valve further has an effluent outlet 33*c* provided in a cover 60*c*; wherein the fixed valve disc 10*c* has six through holes: a first through hole 1*c*, a second through hole 2*c*, a third through hole 3*c*, a fourth through hole 4*c*, a fifth through hole 5*c* and a sixth through hole 6*c* provided therein, wherein in the softening valve, the first through hole 1*c* and the second through hole 2*c* are communicated with each other and each of the first through hole 1*c* and the second through hole 2*c* is adapted for being communicated with the outer filter port 38*c*; the third through hole 3*c* is communicated with the inner filter port 39*c*; the fourth through hole 4*a* is communicated with the water outlet port 32*c*; the fifth through hole 5*c* is communicated with the injector outlet 34*c*; the sixth through hole 6*c* is communicated with the injector inlet 35*c*, wherein the first through hole 1*c* is neighboring to the third through hole 3*c*; the third through hole 3*c* is neighboring to the fourth through hole 4*c*; the fourth through hole 4*c* is neighboring to the fifth through hole 5*c*, the fifth through hole 5*c* is neighboring to the second through hole 2*c*, the second through hole 2*c* is neighboring to the sixth through hole 6*c*, the sixth through hole 6*c* is neighboring to the first through hole 1*c*, wherein the moving valve disc 20*c* has a water inlet channel 21*c* communicated with the water inlet port 31*c*, wherein the moving valve disc 20*c* further has a communicating blind recess 22*c* and a draining through hole 23*c* provided therein, wherein the draining through hole 23*c* is communicated with the effluent outlet 33*c* by the first pollution hole 63*c* provided in the valve rod 61*c* and the second pollution hole 64*c* provided in the cover 60*c* orderly. The valve structure is able to make the first through hole 1*c*, the third through hole 3*c* and the fourth through hole 4*c* have a bigger and similar diameter, wherein the first through hole 1*c*, the third through hole 3*c* and the fourth through hole 4*c* is water passages for providing softened water.

The following description is used for illustrating that the different overlappings between the fixed valve disc and the moving valve disc can be used for achieving different functions.

Figure 102:
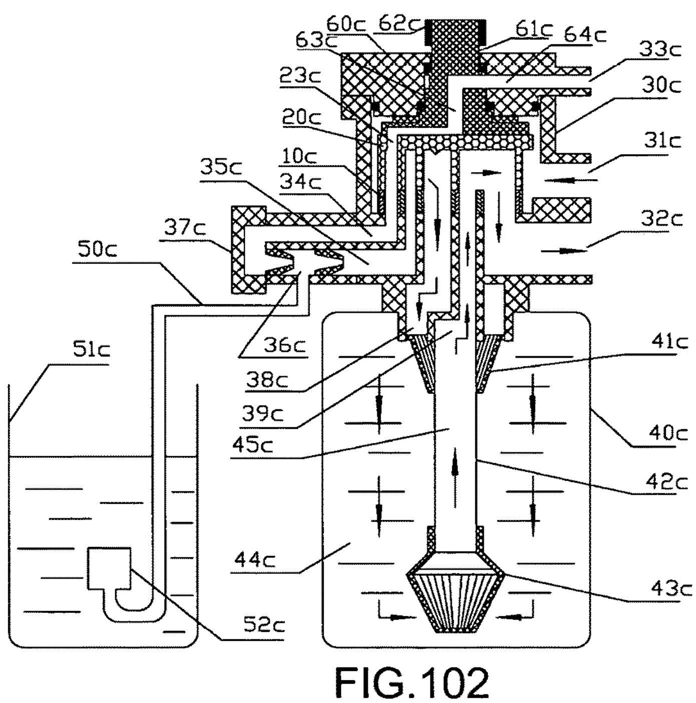
FIG. 102 is a structural diagram of the valve according to the sixteenth embodiment, wherein the valve is under the softening working state.
Figure 103:
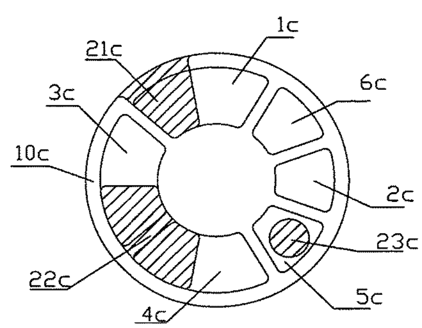
FIG. 103 is a location diagram of the moving valve disc 20*c* relative to the fixed valve disc 10*c*, wherein the moving valve disc 20*c* shown in FIG. 102.

A softening function: as shown in FIG. 102 and FIG. 103, by rotating the valve rod 61*c*, the water inlet channel 21*c* provided in the moving valve disc 20*c* may be overlapped and communicated with the first through hole 1*c* provided in the fixed valve disc 10*c*, the communicating blind recess 22*c* may be overlapped and communicated with the third through hole 3*c* and the fourth through hole 4*c* provided in the fixed valve disc 10*c*, and the draining through hole 23*c* may be overlapped and communicated with the fifth through hole 5*c* provided in the fixed valve disc 10*c*. In this overlapping state, water flow may be described as follows: the water flow from the water inlet port 31*c* may flow from the water inlet channel 21*c* of the moving valve disc 20*c* into the first through hole 1*c* of the fixed valve disc 10*c*, wherein because the first through hole 1*c* is communicated with the first outer filter port 38*c*, so the water flow can flow from the outer filter port 38*c*, the upper accumulating umbrella 41*c* into the outside of the filter core 44*c*, and after being softened by resin, flow into the lower accumulating umbrella 43*c*, then flow into the inner filter port 39*c* via the inside 45*c* of the filter core 44*c*, wherein because the inner filter port 39*c* is communicated with the third through hole 3*c* of the fixed valve disc 10*c*, so the water flow can flow into the third through hole 3*c*, and then flow into the fourth through hole 4*c* of the fixed valve disc 10*c* by flow guiding of the communicating blind recess 22*c*, wherein because the fourth through hole 4*c* is communicated with the water outlet port 32*c*, so the water flow can flow into the water outlet port 32*c*. During the process, the second through hole 2*c* and the sixth through hole 6*c* of the fixed valve disc 10*c* are blocked and covered by the moving valve disc 20*c* and water cannot flow therethrough; and although the draining through hole 23*c* is overlapped and communicated with the fifth through hole 5*c* of the fixed valve disc 10*c* and no water flows therebetween.

Figure 104:
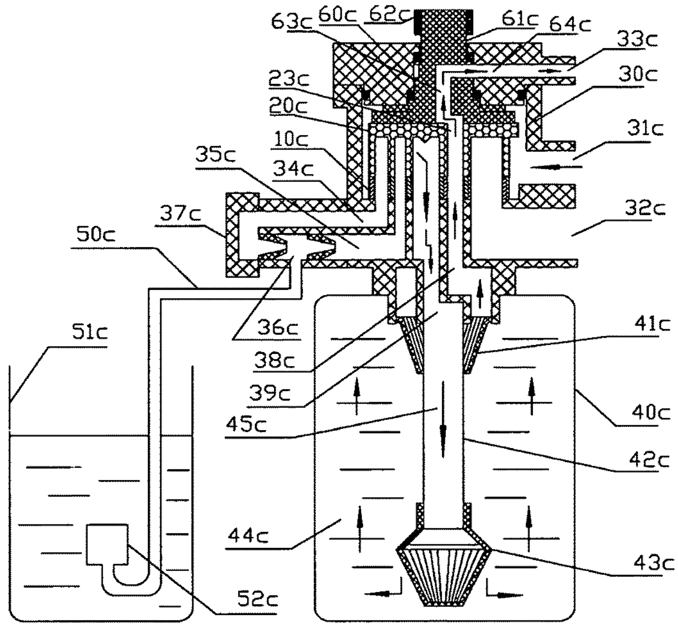
FIG. 104 is a structural diagram of the valve according to the sixteenth embodiment, wherein the valve is under a backwash working state.
Figure 105:
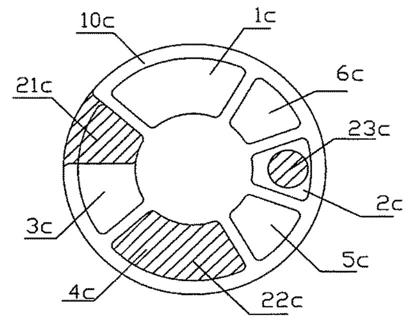
FIG. 105 is a location diagram of the moving valve disc 20*c* relative to the fixed valve disc 10*c*, wherein the moving valve disc 20*c* shown in FIG. 104.

A backwash function: as shown in FIG. 104 and FIG. 105, by rotating the valve rod 61*c*, the water inlet channel 21*c* provided in the moving valve disc 20*c* may be overlapped and communicated with the third through hole 3*c* provided in the fixed valve disc 10*c*, the communicating blind recess 22*c* may be overlapped and communicated with the fourth through hole 4*c* provided in the fixed valve disc 10*c*, and the draining through hole 23*c* may be overlapped and communicated with the second through hole 2*c* provided in the fixed valve disc 10*c*. In this overlapping state, water flow may be described as follows: the water flow from the water inlet port 31*c* may flow from the water inlet channel 21*c* of the moving valve disc 20*c* into the third through hole 3*c* of the fixed valve disc 10*c*, wherein because the third through hole 3*c* is communicated with the inner filter port 39*c*, so the water flow can flow from the inner filter port 39*c*, and then flow through the inside 45*c* of the filter core 44*c* and the lower accumulating umbrella 43*c*, and after backwash the filter core 44*c*, flow through the upper accumulating umbrella 41*c*, and then flow into the outer filter port 38*c*, wherein because the second through hole 2*c* provided in the fixed valve disc 10*c* is communicated with the outer filter port 38*c*, so the water flow can flow into the second through hole 2*c* and flow through the draining through hole 23*c*, and then flow through the first pollution hole 63*c* provided in the valve rod 61*c* and the second pollution hole 64*c* provided in the cover 60*c* orderly to drain via the effluent outlet 33*c*. During the process, the first through hole 1*c*, the fifth through hole 5*c* and the sixth through hole 6*c* of the fixed valve disc 10*c* are blocked and covered by the moving valve disc 20*c* and water cannot flow therethrough, wherein the communicating blind recess 22*c* is able to block and seal the fourth through hole 4*c* of the fixed valve disc 10*c*.

Figure 106:
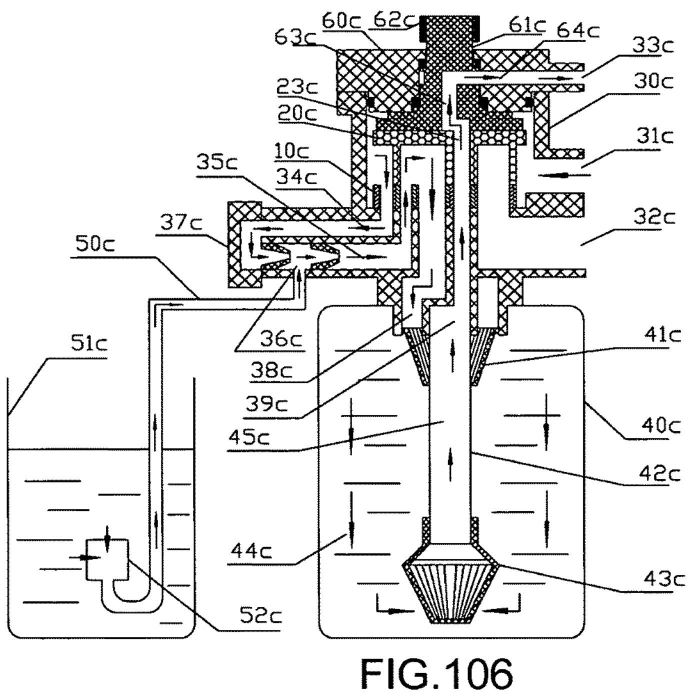
FIG. 106 is a structural diagram of the valve according to the sixteenth embodiment, wherein the valve is under a brine intaking upflow regeneration working state.
Figure 107:
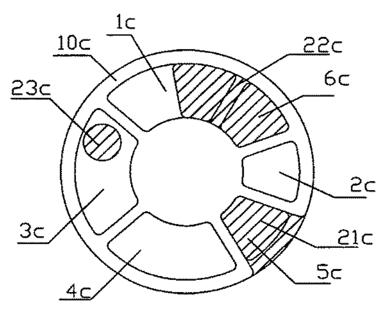
FIG. 107 is a location diagram of the moving valve disc 20*c* relative to the fixed valve disc 10*c*, wherein the moving valve disc 20*c* shown in FIG. 106.

A brine intaking regeneration function: as shown in FIG. 106 and FIG. 107, by rotating the valve rod 61*c*, the water inlet channel 21*c* provided in the moving valve disc 20*c* may be overlapped and communicated with the fifth through hole 5*c* provided in the fixed valve disc 10*c*, the communicating blind recess 22*c* may be overlapped and communicated with the first through hole 1*c* and the sixth through hole 6*c* provided in the fixed valve disc 10*c*, and the draining through hole 23*c* may be overlapped and communicated with the third through hole 3*c* provided in the fixed valve disc 10*c*. In this overlapping state, water flow may be described as follows: the water flow from the water inlet port 31*c* may flow from the water inlet channel 21*c* of the moving valve disc 20*c* into the fifth through hole 5*c* of the fixed valve disc 10*c*, wherein because the fifth through hole 5*c* is communicated with the injector outlet 34*c*, so the water flow can flow through the injector outlet 34*c*, inject via the injector 37*c* to define a negative pressure in the brine drawing port 36*c* of the injector 37*c* so as to draw the brine from the brine container 51*c* via a brine valve 52*c* and a soft pipe 50*c*, and the mixed brine water flow defined by the raw water and the brine water may flow into the injector inlet 35*c*, wherein because the sixth through hole 6*c* is communicated with the injector inlet 35*c*, so the mixed brine water may flow into the sixth through hole 6*c*, and then flow into the first through hole 1*c* via the communicating blind recess 22*c*, wherein because the first through hole 1*c* is communicated with the outer filter port 38*c*, so the mixed brine water may flow into the outer filter port 38*c*, and then flow through the upper accumulating umbrella 41*c*, then flow into the filter core 44*c*, and after the mixed brine water regenerates the resin in the filter core 44*c* downflow, it flows through the lower accumulating umbrella 43*c*, and then flows into the inside 45*c* of the filter core 44*c* and the inner filter port 39*c*, wherein because the third through hole 3*c* is communicated with the inner filter port 39*c*, so the water flow may flow into the third through hole 3*c*, and then flow through the draining through hole 23*c*, and after flow through the first pollution through hole 63*c* provided in the valve rod 61*c* and the second pollution through hole 64*c* provided in the cover 60*c* orderly to drain via the effluent outlet 33*c*. During the process, the second through hole 2*c* and the fourth through hole 4*c* of the fixed valve disc 10*c* is blocked and covered by the moving valve disc 20*c* and water cannot flow therethrough.

Figure 108:
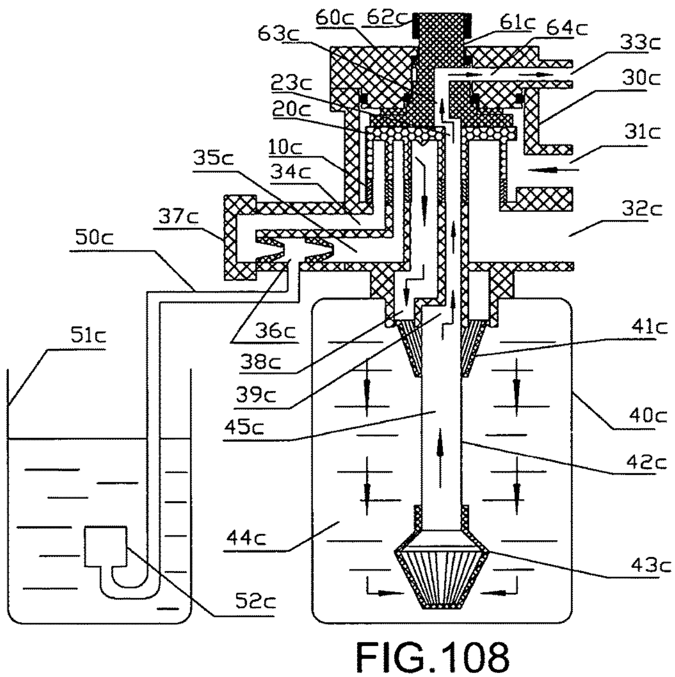
FIG. 108 is a structural diagram of the valve according to the sixteenth embodiment, wherein the valve is under a forwardwash working state.
Figure 109:
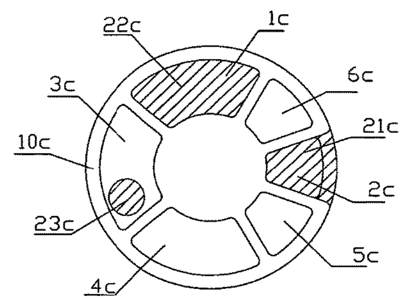
FIG. 109 is a location diagram of the moving valve disc 20*c* relative to the fixed valve disc 10*c*, wherein the moving valve disc 20*c* shown in FIG. 108.

A forwardwash function: as shown in FIG. 108 and FIG. 109, by rotating the valve rod 61*c*, the water inlet channel 21*c* provided in the moving valve disc 20*c* may be overlapped and communicated with the second through hole 2*c* provided in the fixed valve disc 10*c*, the communicating blind recess 22*c* may be overlapped and communicated with the first through hole 1*c* provided in the fixed valve disc 10*c*, and the draining through hole 23*c* may be overlapped and communicated with the third through hole 3*c* provided in the fixed valve disc 10*c*. In this overlapping state, water flow may be described as follows: the water flow from the water inlet port 31*c* may flow from the water inlet channel 21*c* of the moving valve disc 20*c* into the second through hole 2*c* of the fixed valve disc 10*c*, wherein because the second through hole 2*c* is communicated with the outer filter port 38*c*, so the water flow can flow from the outer filter port 38*c* and flow through the upper accumulating umbrella 41*c* into the outside of the filter core 44*c*, and after flushing the residue of brine fluid, flow into the lower accumulating umbrella 43*c*, then flow into the inner filter port 39*c* via the inside 45*c* of the filter core 44*c*, wherein because the inner filter port 39*c* is communicated with the third through hole 3*c* of the fixed valve disc 10*c*, so the water flow may flow into the third through hole 3*c*, and then flow through the draining through hole 23*c*, and after flow through the first pollution through hole 63*c* provided in the valve rod 61*c* and the second pollution through hole 64*c* provided in the cover 60*c* orderly to drain via the effluent outlet 33*c*. During the process, the fourth through hole 4c, the fifth through hole 5c and the sixth through hole 6c of the fixed valve disc 10c are blocked and covered by the moving valve disc 20c and water cannot flow therethrough. The communicating blind recess 22c is able to block and seal the first through hole 1c of the fixed valve disc 10c.

Figure 110:
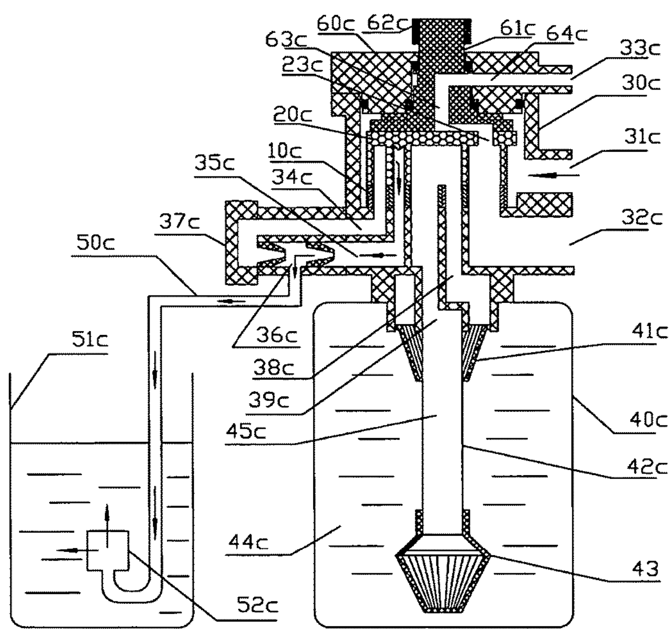
FIG. 110 is a structural diagram of the valve according to the sixteenth embodiment, wherein the valve is under a brine container water supplement working state.
Figure 111:
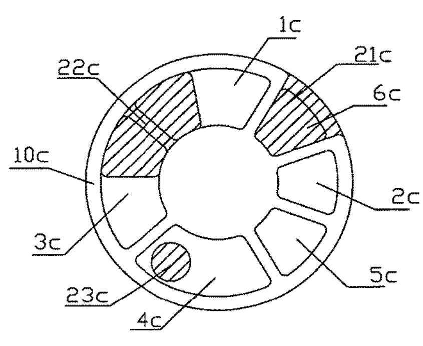
FIG. 111 is a location diagram of the moving valve disc 20*c* relative to the fixed valve disc 10*c*, wherein the moving valve disc 20*c* shown in FIG. 110.
Figure 112:
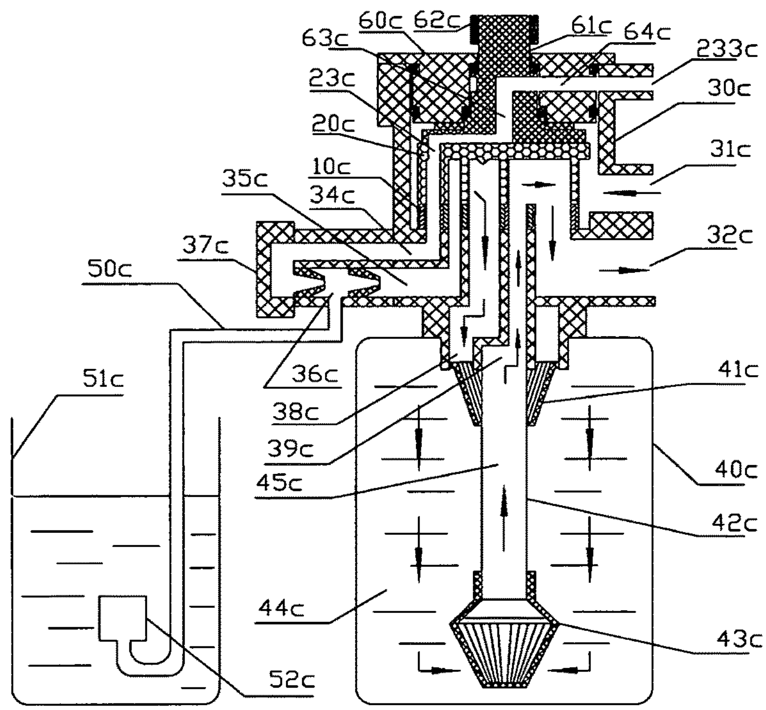
FIG. 112 is a diagram of a draining structure according to the seventeenth embodiment, which employs the drainage technology of draining from valve rod 61*c* to the cover 60*c* and then to the valve body 30*c*.
Figure 113:
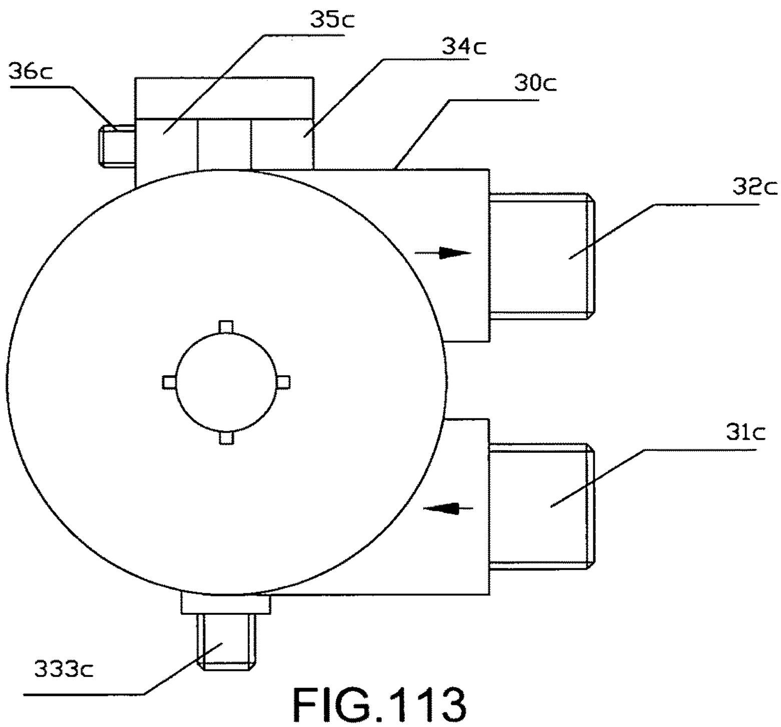
FIG. 113 is a top view of the valve body 30*c* according to the eighteenth embodiment.

A brine container water supplement function: as shown in FIG. 110 and FIG. 111, by rotating the valve rod 61c, the water inlet channel 21c provided in the moving valve disc 20c may be overlapped and communicated with the sixth through hole 6c provided in the fixed valve disc 10c, the communicating blind recess 22c may be overlapped and communicated with the first through hole 1c and the third through hole 3c provided in the fixed valve disc 10c, and the draining through hole 23c may be overlapped and communicated with the fourth through hole 4c provided in the fixed valve disc 10c. In this overlapping state, water flow may be described as follows: the water flow from the water inlet port 31c may flow from the water inlet channel 21c of the moving valve disc 20c into the sixth through hole 6c of the fixed valve disc 10c, wherein because the sixth through hole 6c is communicated with the injector inlet 35c, so the water flow can flow into the injector inlet 35c, and then flow through the brine drawing port 36c, the soft pipe 50c and the brine valve 52c and flow into the brine container 51c. Because the fifth through hole 5c provided in the fixed valve disc 10c is blocked and covered by the moving valve disc 20c and water cannot flow therethrough, and the fifth through hole 5c is communicated with the injector outlet 34c, so no water flow runs through the injector outlet 34c. During the process, the second through hole 2c of the fixed valve disc 10c is blocked and covered by the moving valve disc 20c and water cannot flow therethrough. Although the draining through hole 23c is overlapped and communicated with the fourth through hole 4c, but no water flows through the effluent outlet 33c. Although the draining blind recess 22c is overlapped and communicated with the first through hole 1c and the third through hole 3c provided in the fixed valve disc 10c, but no water flows therebetween.

The seventeenth embodiment: employing a technical solution of draining via a valve rod, a cover and a valve rod.

The moving valve disc 20c further has a draining through hole 23c provided therein, wherein an effluent outlet 233c is provided in a valve body 30c, wherein the draining through hole 23c is communicated with the effluent outlet 233c provided in the valve body 30c by the first pollution hole 63c provided in the valve rod 61c and the second pollution hole 64c provided in the cover 60c orderly The seventeenth embodiment is different from the sixteenth embodiment: in the sixteenth embodiment, the effluent outlet is provided in a cover, and the drainage passage is provided as follows: communicating with the effluent outlet via the first pollution hole provided in the valve rod and the second pollution hole provided in the cover orderly. Other descriptions are similar, which are omitted herein.

The eighteenth embodiment: employing a technical solution of draining from a seventh through hole to a valve rod.

Figure 114:
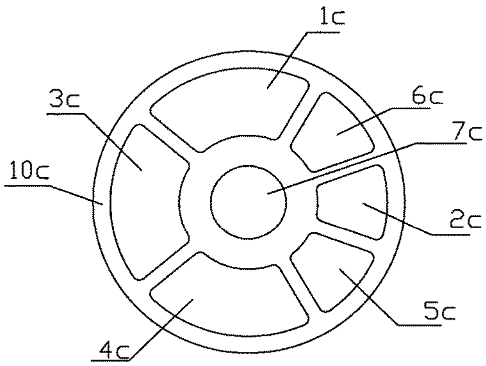
FIG. 114 is a flat structural diagram of the fixed valve disc 10*b* according to the eighteenth embodiment.
Figure 115:
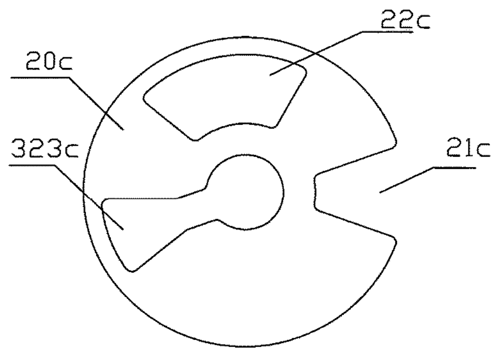
FIG. 115 is a top view of the moving valve disc 20*c* according to the eighteenth embodiment.

As shown in FIG. 113 to FIG. 116, the fixed valve disc and the moving valve disc shown in FIG. 114 and FIG. 115 are employed in the eighteenth embodiment. a multifunction softening valve, comprises a valve body 30c, a cover 60c, an injector 37c, a fixed valve disc 10c and a moving valve disc 20c, wherein the fixed valve disc10c and the moving valve disc 20c are respectively provided in the valve body 30c, wherein the head faces of the fixed valve disc10c and the moving valve disc 20c are hermetically and rotationally aligned with each other, wherein the moving valve disc 20c is connected with a valve rod 61c, wherein the softening valve has a water inlet port 31c, a water outlet port 32c, an injector outlet 34c, an injector inlet 35c, an outer filter port 38c and an inner filter port 39c provided in the valve body 30c, wherein the injector 37c is communicated with the valve body 30c by the injector outlet 34c and the injector inlet 35c, wherein the injector 37c has a brine drawing port 36c provided therein; the multifunction valve further has an effluent outlet 33c provided in the valve body 30c; wherein the fixed valve disc 10c has six through holes: a first through hole 1c, a second through hole 2c, a third through hole 3c, a fourth through hole 4c, a fifth through hole 5c and a sixth through hole 6c provided therein, wherein in the softening valve, the first through hole 1c and the second through hole 2c are communicated with each other and each of the first through hole 1c and the second through hole 2c is adapted for being communicated with the outer filter port 38c; the third through hole 3c is communicated with the inner filter port 39c; the fourth through hole 4a is communicated with the water outlet port 32c; the fifth through hole 5c is communicated with the injector outlet 34c; the sixth through hole 6c is communicated with the injector inlet 35c, wherein the first through hole 1c is neighboring to the third through hole 3c; the third through hole 3c is neighboring to the fourth through hole 4c; the fourth through hole 4c is neighboring to the fifth through hole 5c, the fifth through hole 5c is neighboring to the second through hole 2c, the second through hole 2c is neighboring to the sixth through hole 6c, the sixth through hole 6c is neighboring to the first through hole 1c, wherein the fixed valve disc 10c further has a seventh through hole 7c provided in a center thereof, wherein the moving valve disc 20c has a water inlet channel 21c communicated with the water inlet port 31c, wherein the moving valve disc 20c further has a communicating blind recess 22c and a draining blind recess 323c provided therein, wherein one end of the draining blind recess 323c is provided in a center of the moving valve disc 20c, wherein the draining blind recess 323c is communicated with the effluent outlet 33c via the seventh through hole 7c provided in the fixed valve disc 10c. The valve structure is able to make the first through hole 1c, the third through hole 3c and the fourth through hole 4c have a bigger and similar diameter, wherein the first through hole 1c, the third through hole 3c and the fourth through hole 4c is water passages for providing softened water.

The following description is used for illustrating that the different overlappings between the fixed valve disc and the moving valve disc can be used for achieving different functions.

Figure 116:
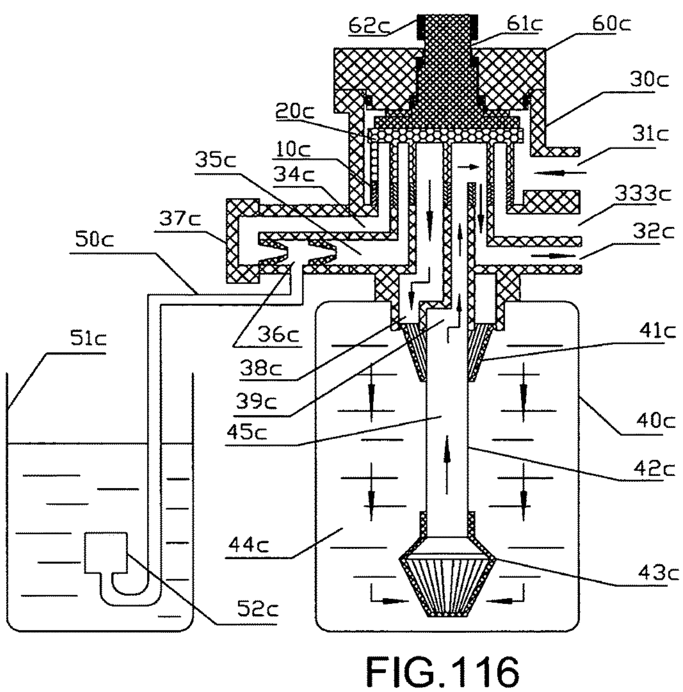
FIG. 116 is a structural diagram of the valve according to the eighteenth embodiment, wherein the valve is under the softening working state.
Figure 117:
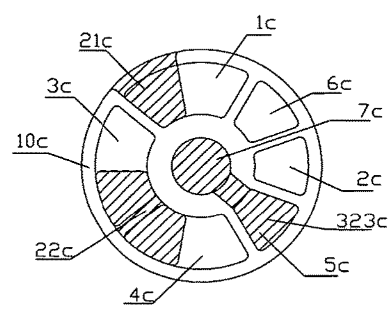
FIG. 117 is a location diagram of the moving valve disc 20*c* relative to the fixed valve disc 10*c*, wherein the moving valve disc 20*c* shown in FIG. 116.

A softening function: as shown in FIG. 116 and FIG. 117, by rotating the valve rod 61c, the water inlet channel 21c provided in the moving valve disc 20c may be overlapped and communicated with the first through hole 1c provided in the fixed valve disc 10c, the communicating blind recess 22c may be overlapped and communicated with the third through hole 3c and the fourth through hole 4c provided in the fixed valve disc 10c, and the draining blind recess 323c may be overlapped and communicated with the fifth through hole 5c and the seventh through hole 7c provided in the fixed valve disc 10c. In this overlapping state, water flow may be described as follows: the water flow from the water inlet port 31c may flow from the water inlet channel 21c of the moving valve disc 20c into the first through hole 1c of the fixed valve disc 10c, wherein because the first through hole 1c is communicated with the outer filter port 38c, so the water flow can flow from the outer filter port 38c, the upper accumulating umbrella 41c into the outside of the filter core

44*c*, and after being softened by resin, flow into the lower accumulating umbrella 43*c*, then flow into the inner filter port 39*c* via the inside 45*c* of the filter core 44*c*, wherein because the inner filter port 39*c* is communicated with the third through hole 3*c* of the fixed valve disc 10*c*, so the water flow can flow into the third through hole 3*c*, and then flow into the fourth through hole 4*c* of the fixed valve disc 10*c* by flow guiding of the communicating blind recess 22*c*, wherein because the fourth through hole 4*c* is communicated with the water outlet port 32*c*, so the water flow can flow into the water outlet port 32*c*. During the process, the second through hole 2*c* and the sixth through hole 6*c* of the fixed valve disc 10*c* are blocked and covered by the moving valve disc 20*c* and water cannot flow therethrough; and although the draining blind recess 323*c* is overlapped and communicated with the fifth through hole 5*c* and the seventh through hole 7*c* of the fixed valve disc 10*c*, but no water flows therebetween.

Figure 118:
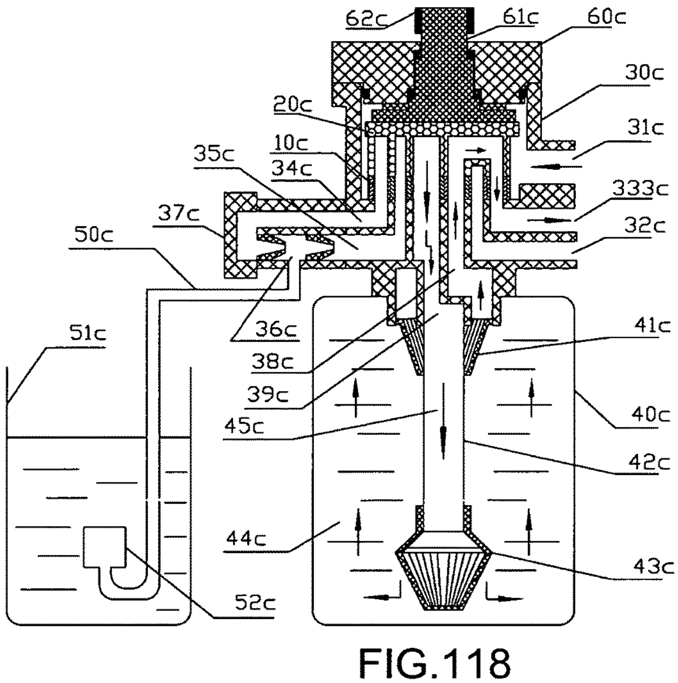
FIG. 118 is a structural diagram of the valve according to the eighteenth embodiment, wherein the valve is under a backwash working state.
Figure 119:
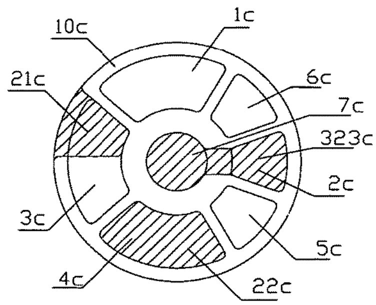
FIG. 119 is a location diagram of the moving valve disc 20*c* relative to the fixed valve disc 10*c*, wherein the moving valve disc 20*c* shown in FIG. 118.

A backwash function: as shown in FIG. 118 and FIG. 119, by rotating the valve rod 61*c*, the water inlet channel 21*c* provided in the moving valve disc 20*c* may be overlapped and communicated with the third through hole 3*c* provided in the fixed valve disc 10*c*, the communicating blind recess 22*c* may be overlapped and communicated with the fourth through hole 4*c* provided in the fixed valve disc 10*c*, and the draining blind recess 323*c* may be overlapped and communicated with the second through hole 2*c* and the seventh through hole 7*c* provided in the fixed valve disc 10*c*. In this overlapping state, water flow may be described as follows: the water flow from the water inlet port 31*c* may flow from the water inlet channel 21*c* of the moving valve disc 20*c* into the third through hole 3*c* of the fixed valve disc 10*c*, wherein because the third through hole 3*c* is communicated with the inner filter port 39*c*, so the water flow can flow from the inner filter port 39*c*, and then flow through the inside 45*c* of the filter core 44*c* and the lower accumulating umbrella 43*c*, and after backwash the filter core 44*c*, flow through the upper accumulating umbrella 41*c*, and then flow into the outer filter port 38*c*, wherein because the second through hole 2*c* provided in the fixed valve disc 10*c* is communicated with the outer filter port 38*c*, so the water flow can flow into the second through hole 2*c* and flow through the seventh through hole 7*c* provided in the fixed valve disc 10*c* by the flow guiding of the blind recess 323*c*, and then flow through the effluent outlet 333*c* to drain. During the process, the first through hole 1*c*, the fifth through hole 5*c* and the sixth through hole 6*c* of the fixed valve disc 10*c* are blocked and covered by the moving valve disc 20*c* and water cannot flow therethrough, wherein the communicating blind recess hole 22*c* is able to block and seal the fourth through hole 4*c* of the fixed valve disc 10*c*.

A brine intaking regeneration function: as shown in FIG. 120 and FIG. 121, by rotating the valve rod 61*c*, the water inlet channel 21*c* provided in the moving valve disc 20*c* may be overlapped and communicated with the fifth through hole 5*c* provided in the fixed valve disc 10*c*, the communicating blind recess 22*c* may be overlapped and communicated with the first through hole 1*c* and the sixth through hole 6*c* provided in the fixed valve disc 10*c*, and the draining blind recess 323*c* may be overlapped and communicated with the third through hole 3*c* and the seventh through hole 7*c* provided in the fixed valve disc 10*c*. In this overlapping state, water flow may be described as follows: the water flow from the water inlet port 31*c* may flow from the water inlet channel 21*c* of the moving valve disc 20*c* into the fifth through hole 5*c* of the fixed valve disc 10*c*, wherein because the fifth through hole 5*c* is communicated with the injector outlet 34*c*, so the water flow can flow through the injector outlet 34*c*, inject via the injector 37*c* to define a negative pressure in the brine drawing port 36*c* of the injector 37*c* so as to draw the brine from the brine container 51*c* via a brine valve 52*c* and a soft pipe 50*c*, and the mixed brine water flow defined by the raw water and the brine water may flow into the injector inlet 35*c*, wherein because the sixth through hole 6*c* is communicated with the injector inlet 35*c*, so the mixed brine water may flow into the sixth through hole 6*c*, and then flow into the first through hole 1*c* via the communicating blind recess 22*c*, wherein because the first through hole 1*c* is communicated with the outer filter port 38*c*, so the mixed brine water may flow into the outer filter port 38*c*, and then flow through the upper accumulating umbrella 41*c*, then flow into the filter core 44*c*, and after the mixed brine water regenerates the resin in the filter core 44*c* downflow, it flows through the lower accumulating umbrella 43*c*, and then flows into the inside 45*c* of the filter core 44*c* and the inner filter port 39*c*, wherein because the third through hole 3*c* is communicated with the inner filter port 39*c*, so the water flow may flow into the third through hole 3*c*, and flow through the seventh through hole 7*c* provided in the fixed valve disc 10*c* by the flow guiding of the draining blind recess 323*c* and flow through the effluent outlet 333*c* to drain. During the process, the second through hole 2*c* and the fourth through hole 4*c* of the fixed valve disc 10*c* is blocked and covered by the moving valve disc 20*c* and water cannot flow therethrough.

A forwardwash function: as shown in FIG. 122 and FIG. 123, by rotating the valve rod 61*c*, the water inlet channel 21*c* provided in the moving valve disc 20*c* may be overlapped and communicated with the second through hole 2*c* provided in the fixed valve disc 10*c*, the communicating blind recess 22*c* may be overlapped and communicated with the first through hole 1*c* provided in the fixed valve disc 10*c*, and the draining blind recess 323*c* may be overlapped and communicated with the third through hole 3*c* and the seventh through hole 7*c* provided in the fixed valve disc 10*c*. In this overlapping state, water flow may be described as follows: the water flow from the water inlet port 31*c* may flow from the water inlet channel 21*c* of the moving valve disc 20*c* into the second through hole 2*c* of the fixed valve disc 10*c*, wherein because the second through hole 2*c* is communicated with the outer filter port 38*c*, so the water flow can flow from the outer filter port 38*c* and flow through the upper accumulating umbrella 41*c* into the outside of the filter core 44*c*, and after flushing the residue of brine fluid, flow into the lower accumulating umbrella 43*c*, then flow into the inner filter port 39*c* via the inside 45*c* of the filter core 44*c*, wherein because the inner filter port 39*c* is communicated with the third through hole 3*c* of the fixed valve disc 10*c*, so the water flow may flow into the third through hole 3*c*, and flow through the seventh through hole 7*c* provided in the fixed valve disc 10*c* by the flow guiding of the draining blind recess 323*c* and flow through the effluent outlet 333*c* to drain. During the process, the fourth through hole 4*c*, the fifth through hole 5*c* and the sixth through hole 6*c* of the fixed valve disc 10*c* are blocked and covered by the moving valve disc 20*c* and water cannot flow therethrough. The communicating blind recess hole 22*c* is able to block and seal the first through hole 1*c* of the fixed valve disc 10*c*.

A brine container water supplement function: as shown in FIG. 124 and FIG. 125, by rotating the valve rod 61*c*, the water inlet channel 21*c* provided in the moving valve disc 20*c* may be overlapped and communicated with the sixth through hole 6*c* provided in the fixed valve disc 10*c*, the communicating blind recess 22*c* may be overlapped and communicated with the first through hole 1*c* and the third through hole 3*c* provided in the fixed valve disc 10*c*, and the draining blind recess 323*c* may be overlapped and communicated with the fourth through hole 4*c* and the seventh through hole 7*c* provided in the fixed valve disc 10*c*. In this overlapping state, water flow may be described as follows: the water flow from the water inlet port 31*c* may flow from the water inlet channel 21*c* of the moving valve disc 20*c* into the sixth through hole 6*c* of the fixed valve disc 10*c*, wherein because the sixth through hole 6*c* is communicated with the injector inlet 35*c*, so the water flow can flow into the injector inlet 35*c*, and then flow through the brine drawing port 36*c*, the soft pipe 50*c* and the brine valve 52*c* and flow into the brine container 51*c*. Because the fifth through hole 5*c* provided in the fixed valve disc 10*c* is blocked and covered by the moving valve disc 20*c* and water cannot flow therethrough, and the fifth through hole 5*c* is communicated with the injector outlet 34*c*, so no water flow runs through the injector outlet 34*c*. During the process, the second through hole 2*c* of the fixed valve disc 10*c* is blocked and covered by the moving valve disc 20*c* and water cannot flow therethrough. Although the draining blind recess 323*c* is overlapped and communicated with the fourth through hole 4*c* and the seventh through hole 7*c*, but no water flows through the effluent outlet 33*c*. Although the draining blind recess 22*c* is overlapped and communicated with the first through hole 1*c* and the third through hole 3*c* provided in the fixed valve disc 10*c*, but no water flows therebetween.

In the following nineteenth embodiment to twenty-eighth embodiment, when the flow control apparatus of the present disclosure is used, which is provided with a water treatment container 40*d*, wherein a filter core 44*d* may be provided in the water treatment container 40*d*, or a filter material is provided in the water treatment container 40*d* to define the filter core 44*d*, wherein an outer filter port 38*d* of a valve body 30*d* is communicated with an outside of the filter core 44*d* by an upper accumulating umbrella 41*d*, an inner filter port 39*d* of the valve body 30*d* is communicated with the filter core 44*d* by a central tube 42*d* and a lower accumulating umbrella 43*d*, as shown in FIG. 129. Further, a water inlet port 31*d* is communicated with a water resource, an effluent outlet 33*d* is communicated with a draining device, a brine drawing port 36*d* is communicated with a brine valve 52*d* of a brine container 51*d* via a soft pipe 50*d*. When the water treatment apparatus is used as a filter valve according to the present disclosure, the brine drawing port 36*d* need to be closed. A driving gear 62*d* provided in one end of a valve rod 61*d* can be automatically or manually rotated to rotate the moving valve disc 20*d* so as to switch the different overlapping states between the moving valve disc 20*d* and the fixed valve disc 10*d* and achieve the different functions of the present disclosure. The following description is provided as an example for illustrating the present disclosure by using a resin filter.

The nineteenth embodiment: being applied for a fixed bed system. A technical solution of draining directly from a cover.

As shown in FIG. 126 to FIG. 129, the fixed valve disc and the moving valve disc shown in FIG. 127 and FIG. 128 are employed. a multifunction softening valve, comprises a valve body 30*d*, a cover 60*d*, an injector 37*d*, a fixed valve disc 10*d* and a moving valve disc 20*d*, wherein the fixed valve disc10*d* and the moving valve disc 20*d* are respectively provided in the valve body 30*d*, wherein the head faces of the fixed valve disc10*d* and the moving valve disc 20*d* are hermetically and rotationally aligned with each other, wherein the moving valve disc 20*d* is connected with a valve rod 61*d*, wherein the softening valve has a water inlet port 31*d*, a water outlet port 32*d*, an injector outlet 34*d*, an injector inlet 35*d*, an outer filter port 38*d* and an inner filter port 39*d* provided in the valve body 30*d*, wherein the cover 60*d* has an effluent outlet 33*d*, wherein the injector 37*d* is communicated with the valve body 30*d* by the injector outlet 34*d* and the injector inlet 35*d*, wherein the injector 37*d* has a brine drawing port 36*d* provided therein; wherein the fixed valve disc 10*d* has seven through holes provided annularly therein as follows: a first through hole 1*d*, a second through hole 2*d*, a third through hole 3*d*, a fourth through hole 4*d*, a fifth through hole 5*d*, a sixth through hole 6*d* and a seventh through hole 7*d* provided therein, wherein in the valve body 30*d*, wherein the first through hole 1*d* may be communicated with the outer filter port 38*d*; the second through hole 2*d* and the third through hole 3*d* are communicated with each other and each of the second through hole 2*d* and the third through hole 3*d* is adapted for being communicated with the inner filter port 39*d*; the fourth through hole 4*d* may be communicated with the injector outlet 34*d*; the fifth through hole 5*d* and the sixth through hole 6*d* are communicated with each other and each of the fifth through hole 5*d* and the sixth through hole 6*d* is adapted for being communicated with the injector inlet 35*d*, the seventh through hole 7*d* is communicated with the water outlet port 32*d*; wherein the sixth through hole 6*d* is neighboring to the second through hole 2*d*; the second through hole 2*d* is neighboring to the first through hole 1*d*; the first through hole 1*d* is neighboring to the fourth through hole 4*d*; the fourth through hole 4*d* is neighboring to the fifth through hole 5*d*; the fifth through hole 5*d* is neighboring to the third through hole 3*d*; the third through hole 3*d* is neighboring to the seventh through hole 7*d*, wherein the moving valve disc 20*d* has a water inlet channel 21*d* communicated with the water inlet port 31*d*, wherein the moving valve disc 20*d* further has a communicating blind recess 22*d* and a draining through hole 23*d* provided therein, wherein the draining through hole 23*d* is communicated with the effluent outlet 33*d* by the first pollution hole 63*d* provided in the valve rod 61*d* and the second pollution hole 64*d* provided in the cover 60*d* orderly.

A softening function: as shown in FIG. 129 and FIG. 130, by rotating the valve rod 61*d*, the water inlet channel 21*d* provided in the moving valve disc 20*d* may be overlapped and communicated with the first through hole 1*d* provided in the fixed valve disc 10*d*, the communicating blind recess 22*d* may be overlapped and communicated with the third through hole 3*d* and the seventh through hole 7*d*, and the draining through hole 23*d* may be overlapped and communicated with the sixth through hole 6*d*. In this overlapping state, water flow may be described as follows: the water flow from the water inlet port 31*d* may flow from the water inlet channel 21*d* of the moving valve disc 20*d* into the first through hole 1*d* of the fixed valve disc 10*d*, wherein because the first through hole 1*d* is communicated with the outer filter port 38*d*, so the water flow can flow from the outer filter port 38*d*, the upper accumulating umbrella 41*d* into the outside of the filter core 44*d*, and after being softened by resin, flow into the lower accumulating umbrella 43*d*, then flow into the inner filter port 39*d* via the inside 45*d* of the filter core 44*d*, wherein because the inner filter port 39*d* is communicated with the third through hole 3*d*, so the water flow can flow into the third through hole 3*d*, and then flow into the seventh through hole 7*d* by flow guiding of the communicating blind recess 22*d*, wherein because the seventh through hole 7*d* is communicated with the water outlet port 32*d*, so the water flow can flow into the water outlet port 32*d*. During the process, the second through hole 2*d*, the fourth through hole 4*d* and the fifth through hole 5*d* of the fixed valve disc 10*d* are blocked and covered by the moving valve disc 20*d* and water cannot flow therethrough, and although the draining through hole 23*d* is communicated with the sixth through hole 6*d*, but no water flows therebetween.

A backwash function: as shown in FIG. 131 and FIG. 132, by rotating the valve rod 61*d*, the water inlet channel 21*d* provided in the moving valve disc 20*d* may be overlapped and communicated with the third through hole 3*d* provided in the fixed valve disc 10*d*, the communicating blind recess 22*d* may be overlapped and communicated with the first through hole 1*d*, and the draining through hole 23*d* may be overlapped and communicated with the first through hole 1*d*. In this overlapping state, water flow may be described as follows: the water flow from the water inlet port 31*d* may flow from the water inlet channel 21*d* of the moving valve disc 20*d* into the third through hole 3*d* of the fixed valve disc 10*d*, wherein because the third through hole 3*d* is communicated with the inner filter port 39*d*, so the water flow can flow from the inner filter port 39*d*, and then flow through the inside 45*d* of the filter core 44*d* and the lower accumulating umbrella 43*d*, and after backwash the filter core 44*d*, flow through the upper accumulating umbrella 41*d*, and then flow into the outer filter port 38*d*, wherein because the first through hole 1*d* provided in the fixed valve disc 10*d* is communicated with the outer filter port 38*d*, so the water flow can flow into the first through hole 1*d* and flow through the draining through hole 23*d*, and then flow through the first pollution hole 63*d* provided in the valve rod 61*d* and the second pollution hole 64*d* provided in the cover 60*d* orderly to drain via the effluent outlet 33*d*. During the process, the second through hole 2*d*, the fourth through hole 4*d*, the fifth through hole 5*d*, the sixth through hole 6*d* and the seventh through hole 7*d* of the fixed valve disc 10*d* are blocked and covered by the moving valve disc 20*d* and water cannot flow therethrough, wherein the communicating blind recess 22*d* is able to block and seal the first through hole 1*d*.

A brine intaking upflow regeneration function: as shown in FIG. 133 and FIG. 134, by rotating the valve rod 61*d*, the water inlet channel 21*d* provided in the moving valve disc 20*d* may be overlapped and communicated with the fourth through hole 4*d* provided in the fixed valve disc 10*d*, the communicating blind recess 22*d* may be overlapped and communicated with the second through hole 2*d* and the sixth through hole 6*d*, and the draining through hole 23*d* may be overlapped and communicated with the first through hole 1*d*. In this overlapping state, water flow may be described as follows: the water flow from the water inlet port 31*d* may flow from the water inlet channel 21*d* of the moving valve disc 20*d* into the fourth through hole 4*d* of the fixed valve disc 10*d*, wherein because the fourth through hole 4*d* is communicated with the injector outlet 34*d*, so the water flow can flow through the injector outlet 34*d*, inject via the injector 37*d* to define a negative pressure in the brine drawing port 36*d* of the injector 37*d* so as to draw the brine fluid from the brine container 51*d* via a brine valve 52*d* and a soft pipe 50*d*, and the mixed brine water flow defined by the raw water and the brine water may flow into the injector inlet 35*d*, wherein because the sixth through hole 6*d* is communicated with the injector inlet 35*d*, the mixed brine water may flow into the sixth through hole 6*d*, and then flow into the second through hole 2*d* via the communicating blind recess 22*d*, wherein because the second through hole 2*d* is communicated with the inner filter port 39*d*, so the mixed brine water may flow into the inner filter port 39*d*, and then flow through the inside 45*d* of the filter core 44*d* and flow into the filter core 44*d* via the lower accumulating umbrella 43*d*, and after the mixed brine water flows through the resin bed from bottom to top and regenerates the resin bed, it flows through the upper accumulating umbrella 41*d* and flows into the outer filter port 38*d*, wherein because the first through hole 1*d* is communicated with the outer filter port 38*d*, so the water flow may flow into the first through hole 1*d*, and then flow through the draining through hole 23*d*, and after flow through the first pollution through hole 63*d* provided in the valve rod 61*d* and the second pollution through hole 64*d* provided in the cover 60*d* orderly to drain via the effluent outlet 33*d*. During the process, the third through hole 3*d*, the fifth through hole 5*d* and the seventh through hole 7*d* of the fixed valve disc 10*d* are blocked and covered by the moving valve disc 20*d* and water cannot flow therethrough.

A forwardwash function: as shown in FIG. 135 and FIG. 136, by rotating the valve rod 61*d*, the water inlet channel 21*d* provided in the moving valve disc 20*d* may be overlapped and communicated with the first through hole 1*d* provided in the fixed valve disc 10*d*, the communicating blind recess 22*d* may be overlapped and communicated with the sixth through hole 6*d* and the seventh through hole 7*d*, and the draining through hole 23*d* may be overlapped and communicated with the second through hole 2*d*. In this overlapping state, water flow may be described as follows: the water flow from the water inlet port 31*d* may flow from the water inlet channel 21*d* of the moving valve disc 20*d* into the first through hole 1*b* of the fixed valve disc 10*d*, wherein because the first through hole 1*d* is communicated with the outer filter port 38*d*, so the water flow can flow from the outer filter port 38*d* and flow through the upper accumulating umbrella 41*d* into the outside of the filter core 44*d*, and after flushing the residue of brine fluid, flow into the lower accumulating umbrella 43*d*, then flow into the inner filter port 39*d* via the inside 45*d* of the filter core 44*d*, wherein because the inner filter port 39*d* is communicated with the second through hole 2*d* of the fixed valve disc 10*d*, so the water flow may flow into the second through hole 2*d*, and then flow through the draining through hole 23*d*, and flow through the first pollution through hole 63*d* provided in the valve rod 61*d* and the second pollution through hole 64*d* provided in the cover 60*d* orderly to drain via the effluent outlet 33*d*. During the process, the third through hole 3*d*, the fourth through hole 4*d* and the fifth through hole 5*d* of the fixed valve disc 10*d* are blocked and covered by the moving valve disc 20*d* and water cannot flow therethrough. Although the communicating blind recess 22*d* is overlapped and communicated with the sixth through hole 6*d* and the seventh through hole 7*d*, but no water flows therebetween.

A brine container softened water supplement function: as shown in FIG. 137 and FIG. 138, by rotating the valve rod 61*d*, the water inlet channel 21*d* provided in the moving valve disc 20*d* may be overlapped and communicated with the first through hole 1*d* provided in the fixed valve disc 10*d*, the communicating blind recess 22*d* may be overlapped and communicated with the third through hole 3*d* and the fifth through hole 5*d*, and the draining through hole 23*d* may be overlapped and communicated with the seventh through hole 7*d*. In this overlapping state, water flow may be described as follows: the water flow from the water inlet port 31*d* may flow from the water inlet channel 21*d* of the moving valve disc 20*d* into the first through hole 1*d* of the fixed valve disc 10*d*, wherein because the first through hole 1*d* is communicated with the outer filter port 38*d*, so the water flow can flow from the outer filter port 38*d*, the upper accumulating umbrella 41*d* into the outside of the filter core 44*d*, and after being softened and filtered by resin, flow into the lower accumulating umbrella 43*d*, then flow into the inner filter port 39*d* via the inside 45*d* of the filter core 44*d*, wherein because the inner filter port 39*d* is communicated with the third through hole 3*d* of the fixed valve disc 10*d*, so the water flow can flow into the third through hole 3*d*, and then flow into the fifth through hole 5*d* by flow guiding of the communicating blind recess 22*d*, wherein because the fifth through hole 5*d* is communicated with the injector inlet 35*d*, so the water flow can flow into the injector inlet 35*d*, and then flow through the brine drawing port 36*d*, the soft pipe 50*d* and the brine valve 52*d* and flow into the brine container 51*d*. During the process, the second through hole 2*d*, the fourth through hole 4*d* and the sixth through hole 6*d* of the fixed valve disc 10*d* are blocked and covered by the moving valve disc 20*d* and water cannot flow therethrough, and although the draining through hole 23*d* is communicated with the seventh through hole 7*d*, but no water flows therebetween.

A twentieth embodiment: being applied for a floating bed system. A technical solution of draining directly from a cover.

The only difference between the twentieth embodiment and the nineteenth embodiment is as follows: in the twentieth embodiment, the first through hole 1*d* may be communicated with the inner filter port 39*d*; the second through hole 2*d* and the third through hole 3*d* may be communicated with each other and each of the second through hole 2*d* and the third through hole 3*d* is adapted for being communicated with the outer filter port 38*d*; but in the nineteenth embodiment, the first through hole 1*d* may be communicated with the outer filter port 38*d*; the second through hole 2*d* and the third through hole 3*d* may be communicated with each other and each of the second through hole 2*d* and the third through hole 3*d* is adapted for being communicated with the inner filter port 39*d*, the difference results in that the water flows in the water processing container 40*d* flow in reverse directions when the fixed valve disc 10*d* and the moving valve disc 20*d* are provided in a same position. So only one example is described for explaining detailedly the softening function herein, and the illustrations for the other four functions can be omitted.

A softening function: as shown in FIG. 130 and FIG. 139, by rotating the valve rod 61*d*, the water inlet channel 21*d* provided in the moving valve disc 20*d* may be overlapped and communicated with the first through hole 1*d* provided in the fixed valve disc 10*d*, the communicating blind recess 22*d* may be overlapped and communicated with the third through hole 3*d* and the seventh through hole 7*d*, and the draining through hole 23*d* may be overlapped and communicated with the sixth through hole 6*d*. In this overlapping state, water flow may be described as follows: the water flow from the water inlet port 31*d* may flow from the water inlet channel 21*d* of the moving valve disc 20*d* into the first through hole 1*d* of the fixed valve disc 10*d*, wherein because the first through hole 1*d* is communicated with the inner filter port 39*d*, so the water flow can flow from the inner filter port 39*d* and flow through the inside 45*d* of the filter core 44*d*, the lower accumulating umbrella 43*d*, and after being softened and filtered by resin, flow into the upper accumulating umbrella 41*d*, and then flow into the outer filter port 38*d*, wherein because the outer filter port 38*d* is communicated with the third through hole 3*d* provided in the fixed valve disc 10*d*, so the water flow can flow into the third through hole 3*d*, and then flow into the seventh through hole 7*d* by flow guiding of the communicating blind recess 22*d*, wherein because the seventh through hole 7*d* is communicated with the water outlet port 32*d*, so the water flow can flow into the water outlet port 32*d*. During the process, the second through hole 2*d*, the fourth through hole 4*d* and the fifth through hole 5*d* of the fixed valve disc 10*d* are blocked and covered by the moving valve disc 20*d* and water cannot flow therethrough, and although the draining through hole 23*d* is communicated with the sixth through hole 6*d*, but no water flows therebetween.

A twenty-first embodiment: a technical solution of draining via an eighth through hole provided in the fixed valve disc.

As shown in FIG. 126, FIG. 140 to FIG. 143, the fixed valve disc and the moving valve disc shown in FIG. 140 and FIG. 141 are employed. The differences between the twenty-first embodiment and the nineteenth embodiment or the twentieth embodiment are as follows: in the twenty-first embodiment, the center of the fixed valve disc 10*d* has an eighth through hole 8*d* provided therein, and the moving valve disc 20*d* has a draining blind recess 231*d* provided therein; in the nineteenth embodiment and the twentieth embodiment, the fixed valve disc has no an eighth through hole, and the moving valve disc has a draining through hole provided therein. The structural differences result in the following differences of draining: the drainage way in the twenty-first embodiment: water flow is guided to flow into the eighth through hole provided in the fixed valve hole by the draining blind recess of the moving valve disc, and then flows into the effluent outlet provided in the valve body to drain; the drainage way in the nineteenth embodiment and the twentieth embodiment: water flow flows through the draining through hole of the fixed valve disc, and flows through the first pollution through hole provided in the valve rod and the second pollution through hole provided in the cover orderly to drain via the effluent outlet. So only one example is described for explaining detailedly the backwash function, and the illustrations for the other four functions can be omitted.

A backwash function: as shown in FIG. 142 and FIG. 143, by rotating the valve rod 61*d*, the water inlet channel 21*d* provided in the moving valve disc 20*d* may be overlapped and communicated with the third through hole 3*d* provided in the fixed valve disc 10*d*, the communicating blind recess 22*d* may be overlapped and communicated with the first through hole 1*d*, and the draining blind recess 231*d* may be overlapped and communicated with the first through hole 1*d* and the eighth through hole 8*d*. In this overlapping state, water flow may be described as follows: the water flow from the water inlet port 31*d* may flow from the water inlet channel 21*d* of the moving valve disc 20*d* into the third through hole 3*d* of the fixed valve disc 10*d*, wherein because the third through hole 3*d* is communicated with the inner filter port 39*d*, so the water flow can flow from the inner filter port 39*d*, and then flow through the inside 45*d* of the filter core 44*d* and the lower accumulating umbrella 43*d*, and after backflushing the filter core 44*d*, flow through the upper accumulating umbrella 41*d*, and then flow into the outer filter port 38*d*, wherein because the first through hole 1*d* provided in the fixed valve disc 10*d* is communicated with the outer filter port 38*d*, so the water flow can flow into the first through hole 1*d*, and then flow into the eighth through hole 8*d* by flow guiding of the draining blind recess 231*d*, wherein because the eighth through hole 8*d* is communicated with the effluent outlet 33*d*, so the water flow is able to flow into the effluent outlet 33*d* to drain. During the process, the second through hole 2*d*, the fourth through hole 4*d*, the fifth through hole 5*d*, the sixth through hole 6*d* and the seventh through hole 7*d* of the fixed valve disc 10*d* are blocked and covered by the moving valve disc 20*d* and water cannot flow therethrough, wherein the communicating blind recess 22*d* is able to block and seal the first through hole 1*d*.

The twenty-second embodiment: a fixed bed system for continuously supplying water. It employs a technical solution of draining via an eighth through hole.

As shown in FIG. 126, FIG. 144 to FIG. 146, the fixed valve disc and the moving valve disc shown in FIG. 144 and FIG. 145 are employed. a multifunction softening valve, comprises a valve body 30*d*, a cover 60*d*, an injector 37*d*, a fixed valve disc 210*d* and a moving valve disc 220*d*, wherein the fixed valve disc 210*d* and the moving valve disc 220*d* are respectively provided in the valve body 30*d*, wherein the head faces of the fixed valve disc 210*d* and the moving valve disc 220*d* are hermetically and rotationally aligned with each other, wherein the moving valve disc 220*d* is connected with a valve rod 61*d*, wherein the softening valve has a water inlet port 31*d*, a water outlet port 32*d*, an injector outlet 34*d*, an injector inlet 35*d*, an outer filter port 38*d* and an inner filter port 39*d* provided in the valve body 30*d*, wherein the injector 37*d* is communicated with the valve body 30*d* by the injector outlet 34*d* and the injector inlet 35*d*, wherein the injector 37*d* has a brine drawing port 36*d* provided therein, wherein the fixed valve disc 210*d* has seven through holes: a first through hole 201*d*, a second through hole 202*d*, a third through hole 203*d*, a fourth through hole 204*d*, a fifth through hole 205*d* and a sixth through hole 206*d* provided in an inner ring, and a seventh through hole 207*d* provided in an outer ring, wherein in the valve body 30*d*, the first through hole 201*d* may be communicated with the outer filter port 38*d*; the second through hole 202*d* and the third through hole 203*d* are communicated with each other and each of the second through hole 202*d* and the third through hole 203*d* is adapted for being communicated with the inner filter port 39*d*; the fourth through hole 204*d* is communicated with the injector outlet 34*d*; the fifth through hole 205*d* and the sixth through hole 206*d* are communicated with each other and each of the fifth through hole 205*d* and the sixth through hole 206*d* is adapted for being communicated with the injector inlet 35*d*; the seventh through hole 207*d* may be communicated with the water outlet port 32*d*, wherein the fixed valve disc 210*d* further has an eighth through hole 208*d* provided in a center of the fixed valve disc 210*d*, wherein the sixth through hole 206*d* is neighboring to the second through hole 202*d*; the second through hole 202*d* is neighboring to the first through hole 201*d*; the first through hole 201*d* is neighboring to the fourth through hole 204*d*; the fourth through hole 204*d* is neighboring to the fifth through hole 205*d*; the fifth through hole 205*d* is neighboring to the third through hole 203*d*; the third through hole 203*d* is neighboring to the seventh through hole 207*d*, wherein the moving valve disc 220*d* has a water inlet channel 221*d* communicated with the water inlet port 31*d*, and the water inlet channel 221*d* is provided in the inner ring, wherein the moving valve disc 220*d* further has a communicating blind recess 222*d*, and the communicating blind recess 222*d* is provided in the inner ring and the outer ring, wherein the moving valve disc 220*d* further has a draining blind recess 2231*d* provided therein, wherein the draining blind recess 2231*d* is radially aligned, wherein one end of the draining blind recess 2231*d* is provided in a center of the moving valve disc 220*d*, and another end of the draining blind recess 2231*d* is provided in an inner ring of the moving valve disc 220*d*, wherein the draining blind recess 2231*d* is communicated with the effluent outlet 33*d* by the eighth through hole 208*d* provided in the fixed valve disc 210*d*, wherein during the rotating process of the moving valve disc 220*d*, the seventh through hole 207*d* is only covered by the communicating blind recess 222*d*, and other portion in the moving valve disc 220*d* cannot completely cover the seventh through hole 207*d*.

A softening function: as shown in FIG. 146 and FIG. 147, by rotating the valve rod 61*d*, the water inlet channel 221*d* provided in the moving valve disc 220*d* may be overlapped and communicated with the first through hole 201*d* provided in the fixed valve disc 210*d*, the communicating blind recess 222*d* may be overlapped and communicated with the third through hole 203*d* and the seventh through hole 207*d*, and the draining blind recess 2231*d* may be overlapped and communicated with the sixth through hole 206*d* and the eighth through hole 208*d*. In this overlapping state, water flow may be described as follows: the water flow from the water inlet port 31*d* may flow from the water inlet channel 221*d* of the moving valve disc 220*d* into the first through hole 201*d* of the fixed valve disc 210*d*, wherein because the first through hole 201*d* is communicated with the outer filter port 38*d*, so the water flow can flow from the outer filter port 38*d*, the upper accumulating umbrella 41*d* into the outside of the filter core 44*d*, and after being softened by resin, flow into the lower accumulating umbrella 43*d*, then flow into the inner filter port 39*d* via the inside 45*d* of the filter core 44*d*, wherein because the inner filter port 39*d* is communicated with the third through hole 203*d*, so the water flow can flow into the third through hole 203*d*, and then flow into the seventh through hole 207*d* by flow guiding of the communicating blind recess 222*d* provided in the moving valve disc 220*d*, wherein because the seventh through hole 207*d* is communicated with the water outlet port 32*d*, so the water flow can flow into the water outlet port 32*d*. During the process, the second through hole 202*d*, the fourth through hole 204*d* and the fifth through hole 205*d* of the fixed valve 210*d* are blocked and covered by the moving valve disc 20*d* and water cannot flow therethrough, and although the draining blind recess 2231*d* is communicated with the sixth through hole 206*d* and the eighth through hole 208*d*, but no water flows therebetween.

A backwash function: as shown in FIG. 148 and FIG. 149, by rotating the valve rod 61*d*, the water inlet channel 221*d* provided in the moving valve disc 220*d* may be overlapped and communicated with the third through hole 203*d* provided in the fixed valve disc 210*d*, the communicating blind recess 222*d* may be overlapped and communicated with the first through hole 201*d*, and the draining blind recess 2231*d* may be overlapped and communicated with the first through hole 201*d* and the eighth through hole 208*d*. In this overlapping state, water flow may be described as follows: the water flow from the water inlet port 31*d* may flow from the water inlet channel 221*d* of the moving valve disc 220*d* into the third through hole 203*d* of the fixed valve disc 210*d*, wherein because the third through hole 203*d* is communicated with the inner filter port 39*d*, so the water flow can flow from the inner filter port 39*d*, and then flow through the inside 45*d* of the filter core 44*d* and the lower accumulating umbrella 43*d*, and after backflushing the filter core 44*d*, flow through the upper accumulating umbrella 41*d*, and then flow into the outer filter port 38*d*, wherein because the first through hole 201*d* provided in the fixed valve disc 210*d* is communicated with the outer filter port 38*d*, so the water flow can flow into the first through hole 201*d*, and then flow into the eighth through hole 208*d* by flow guiding of the draining blind recess 2231*d*, wherein because the eighth through hole 208*d* is communicated with the effluent outlet 33*d*, so the water flow is able to flow into the effluent outlet

33*d* to drain. During the process, the second through hole 202*d*, the fourth through hole 204*d*, the fifth through hole 205*d* and the sixth through hole 206*d* of the fixed valve 210*d* are blocked and covered by the moving valve disc 220*d* and water cannot flow therethrough, wherein the communicating blind recess 222*d* is communicated with the first through hole 201*d*, which provides a blocking and sealing function. Because the seventh through hole 207*d* is not covered and sealed, so the raw water from the water inlet port 31*d* can directly flow into the water outlet port 32*d* via the seventh through hole 207*d* to supply water.

A brine intaking upflow regeneration function: as shown in FIG. 150 and FIG. 151, by rotating the valve rod 61*d*, the water inlet channel 221*d* provided in the moving valve disc 220*d* may be overlapped and communicated with the fourth through hole 204*d* provided in the fixed valve disc 210*d*, the communicating blind recess 222*d* may be overlapped and communicated with the second through hole 202*d* and the sixth through hole 206*d*, and the draining blind recess 2231*d* may be overlapped and communicated with the first through hole 201*d* and the eighth through hole 208*d*. In this overlapping state, water flow may be described as follows: the water flow from the water inlet port 31*d* may flow from the water inlet channel 221*d* of the moving valve disc 220*d* into the fourth through hole 204*d* of the fixed valve disc 210*d*, wherein because the fourth through hole 204*d* is communicated with the injector outlet 34*d*, so the water flow can flow through the injector outlet 34*d*, inject via the injector 37*d* to define a negative pressure in the brine drawing port 36*d* of the injector 37*d* so as to draw the brine fluid from the brine container 51*d* via a brine valve 52*d* and a soft pipe 50*d*, and the mixed brine water flow defined by the raw water and the brine water may flow into the injector inlet 35*d*, wherein because the sixth through hole 206*d* is communicated with the injector inlet 35*d*, the mixed brine water may flow into the sixth through hole 206*d*, and then flow into the second through hole 202*d* via the communicating blind recess 222*d*, wherein because the second through hole 202*d* is communicated with the inner filter port 39*d*, so the mixed brine water may flow into the inner filter port 39*d*, and then flow through the inside 45*d* of the filter core 44*d* and flow into the filter core 44*d* via the lower accumulating umbrella 43*d*, and after the mixed brine water flows through the resin bed from bottom to top and regenerates the resin bed, it flows through the upper accumulating umbrella 41*d* and flows into the outer filter port 38*d*, wherein because the first through hole 201*d* is communicated with the outer filter port 38*d*, so the water flow may flow into the first through hole 201*d*, and then flow into the eighth through hole 208*d* by flow guiding of the draining blind recess 2231*d*, wherein because the eighth through hole 208*d* is communicated with the effluent outlet 33*d*, so the water flow may flow through the effluent outlet 33*d* to drain. During the process, the third through hole 203*d* and the fifth through hole 205*d* of the fixed valve 210*d* is blocked and covered by the moving valve disc 220*d* and water cannot flow therethrough. Because the seventh through hole 207*d* is not covered and sealed, so the raw water from the water inlet port 31*d* can directly flow into the water outlet port 32*d* via the seventh through hole 207*d* to supply water.

A forwardwash function: as shown in FIG. 152 and FIG. 153, by rotating the valve rod 61*d*, the water inlet channel 221*d* provided in the moving valve disc 220*d* may be overlapped and communicated with the first through hole 201*d* provided in the fixed valve disc 210*d*, the communicating blind recess 222*d* may be overlapped and communicated with the sixth through hole 206*d*, and the draining blind recess 2231*d* may be overlapped and communicated with the second through hole 202*d* and the eighth through hole 208*d*. In this overlapping state, water flow may be described as follows: the water flow from the water inlet port 31*d* may flow from the water inlet channel 221*d* of the moving valve disc 220*d* into the first through hole 201*b* of the fixed valve disc 210*d*, wherein because the first through hole 201*d* is communicated with the outer filter port 38*d*, so the water flow can flow from the outer filter port 38*d* and flow through the upper accumulating umbrella 41*d* into the outside of the filter core 44*d*, and after flushing the residue of brine fluid, flow into the lower accumulating umbrella 43*d*, then flow into the inner filter port 39*d* via the inside 45*d* of the filter core 44*d*, wherein because the inner filter port 39*d* is communicated with the second through hole 202*d* of the fixed valve disc 210*d*, so the water flow may flow into the second through hole 202*d*, and then flow into the eighth through hole 208*d* by flow guiding of the draining blind recess 2231*d*, wherein because the eighth through hole 208*d* is communicated with the effluent outlet 33*d*, so the water flow may flow through the effluent outlet 33*d* to drain. During the process, the third through hole 203*d*, the fourth through hole 204*d* and the fifth through hole 205*d* of the fixed valve 210*d* are blocked and covered by the moving valve disc 220*d* and water cannot flow therethrough. The communicating blind recess 222*d* is communicated with the sixth through hole 206*d*, which provides a blocking and sealing function. Because the seventh through hole 207*d* is not covered and sealed, so the raw water from the water inlet port 31*d* can directly flow into the water outlet port 32*d* via the seventh through hole 207*d* to supply water.

A brine container softened water supplement and softened water supply function: as shown in FIG. 154 and FIG. 155, by rotating the valve rod 61*d*, the water inlet channel 221*d* provided in the moving valve disc 220*d* may be overlapped and communicated with the first through hole 201*d* provided in the fixed valve disc 210*d*, the communicating blind recess 222*d* may be overlapped and communicated with the third through hole 203*d*, the fifth through hole 205*d* and the seventh through hole 207*d*, and the draining blind recess 2231 may be overlapped and communicated with the eighth through hole 208*d*. In this overlapping state, water flow may be described as follows: the water flow from the water inlet port 31*d* may flow from the water inlet channel 221*d* of the moving valve disc 220*d* into the first through hole 201*d* of the fixed valve disc 210*d*, wherein because the first through hole 201*d* is communicated with the outer filter port 38*d*, so the water flow can flow from the outer filter port 38*d*, the upper accumulating umbrella 41*d* into the outside of the filter core 44*d*, and after being softened and filtered by resin, flow into the lower accumulating umbrella 43*d*, then flow into the inner filter port 39*d* via the inside 45*d* of the filter core 44*d*, wherein because the inner filter port 39*d* is communicated with the third through hole 203*d* of the fixed valve disc 210*d*, so the water flow can flow into the third through hole 203*d*, and then flow into the fifth through hole 205*d* and the seventh through hole 207*d* by flow guiding of the communicating blind recess 222*d*, wherein because the fifth through hole 205*d* is communicated with the injector inlet 35*d*, so the water flow can flow into the injector inlet 35*d*, and then flow through the brine drawing port 36*d*, the soft pipe 50*d* and the brine valve 52*d* and flow into the brine container 51*d*, at the same time, because the seventh through hole 207*d* is communicated with the water outlet port 32*d*, so the softened water can flow into the seventh through hole 207*d* and the water outlet port 32*d* to supply water. During the process, the second through hole 202*d*, the fourth through hole 204*d* and the sixth through hole 206*d* of the fixed valve 210*d* are blocked and covered by the moving valve disc 220*d* and water cannot flow therethrough, and although the draining blind recess 2231 is communicated with the eighth through hole 208*d*, but no water flows therebetween.

The twenty-third embodiment: a floating bed system for continuously supplying water.

The only difference between the twenty-third embodiment and the twenty-second is as follows: in the twenty-third embodiment, the first through hole 201*d* may be communicated with the inner filter port 39*d*; the second through hole 202*d* and the third through hole 203*d* may be communicated with each other and each of the second through hole 202*d* and the third through hole 203*d* is adapted for being communicated with the outer filter port 38*d*; but in the twenty-second embodiment, the first through hole 201*d* may be communicated with the outer filter port 38*d*; the second through hole 202*d* and the third through hole 203*d* may be communicated with each other and each of the second through hole 202*d* and the third through hole 203*d* is adapted for being communicated with the inner filter port 39*d*, the difference results in that the water flows in the water processing container 40*d* flow in reverse directions when the fixed valve disc 10*d* and the moving valve disc 20*d* are provided in a same position. So only one example is described for explaining detailedly the softening function herein, and the illustrations for the other four functions can be omitted.

A softening function: as shown in FIG. 147 and FIG. 156, by rotating the valve rod 61*d*, the water inlet channel 221*d* provided in the moving valve disc 220*d* may be overlapped and communicated with the first through hole 201*d* provided in the fixed valve disc 10*d*, the communicating blind recess 222*d* may be overlapped and communicated with the third through hole 203*d* and the seventh through hole 207*d*, and the draining blind recess 2231 may be overlapped and communicated with the sixth through hole 206*d* and the eighth through hole 208*d*. In this overlapping state, water flow may be described as follows: the water flow from the water inlet port 31*d* may flow from the water inlet channel 221*d* of the moving valve disc 220*d* into the first through hole 201*d* of the fixed valve disc 210*d*, wherein because the first through hole 201*d* is communicated with the inner filter port 39*d*, so the water flow can flow from the inner filter port 39*d* and flow through the inside 45*d* of the filter core 44*d*, the lower accumulating umbrella 43*d*, and after being softened and filtered by resin, flow into the upper accumulating umbrella 41*d*, and then flow into the outer filter port 38*d*, wherein because the outer filter port 38*d* is communicated with the third through hole 203*d* provided in the fixed valve disc 210*d*, so the water flow can flow into the third through hole 203*d*, and then flow into the seventh through hole 207*d* by flow guiding of the communicating blind recess 222*d*, wherein because the seventh through hole 207*d* is communicated with the water outlet port 32*d*, so the water flow can flow into the water outlet port 32*d*. During the process, the second through hole 202*d*, the fourth through hole 204*d* and the fifth through hole 205*d* of the fixed valve 210*d* are blocked and covered by the moving valve disc 20*d* and water cannot flow therethrough, and although the draining blind recess 2231*d* is communicated with the sixth through hole 206*d* and the eighth through hole 208*d*, but no water flows therebetween.

The twenty-fourth embodiment: employing a technical solution of draining directly from a cover.

As shown in FIG. 1, FIG. 157 to FIG. 160, the fixed valve disc and the moving valve disc shown in FIG. 157 and FIG. 158 are employed in the tenth embodiment. The differences between the twenty-fourth embodiment and the twenty-second embodiment or the twenty-third embodiment are as follows: in the twenty-second embodiment or the twenty-third embodiment, the center of the fixed valve disc 210*d* has an eighth through hole 208*d* provided therein, and the moving valve disc 220*d* has a draining blind recess 2231*d* provided therein; in the twenty-fourth embodiment, the fixed valve disc 210*d* has no an eighth through hole 208*d*, and the moving valve disc 220 has a draining through hole 223*d* provided therein. The structural differences result in the following differences of draining: the drainage way in the twenty-second embodiment or the twenty-third embodiment: water flow is guided to flow into the eighth through hole provided in the fixed valve hole by the draining blind recess of the moving valve disc, and then flows into the effluent outlet provided in the valve body to drain; the drainage way in the twenty-fourth embodiment: water flow flows through the draining through hole of the moving valve disc, and flows through the first pollution through hole provided in the valve rod and the second pollution through hole provided in the cover orderly to drain via the effluent outlet. So only one example is described for explaining detailedly the backwash function, and the illustrations for the other four functions can be omitted.

A backwash function: as shown in FIG. 159 and FIG. 160, by rotating the valve rod 61*d*, the water inlet channel 221*d* provided in the moving valve disc 220*d* may be overlapped and communicated with the third through hole 203*d* provided in the fixed valve disc 210*d*, the communicating blind recess 222*d* may be overlapped and communicated with the first through hole 201*d*, and the draining through hole 223*d* may be overlapped and communicated with the first through hole 201*d*. In this overlapping state, water flow may be described as follows: the water flow from the water inlet port 31*d* may flow from the water inlet channel 221*d* of the moving valve disc 220*d* into the third through hole 203*d* of the fixed valve disc 210*d*, wherein because the third through hole 203*d* is communicated with the inner filter port 39*d*, so the water flow can flow from the inner filter port 39*d*, and then flow through the inside 45*d* of the filter core 44*d* and the lower accumulating umbrella 43*d*, and after backwash the filter core 44*d*, flow through the upper accumulating umbrella 41*d*, and then flow into the outer filter port 38*d*, wherein because the first through hole 201*d* provided in the fixed valve disc 210*d* is communicated with the outer filter port 38*d*, so the water flow can flow into the first through hole 201*d* and flow through the draining through hole 223*d*, and then flow through the first pollution hole 63*d* provided in the valve rod 61*d* and the second pollution hole 64*d* provided in the cover 60*d* orderly to drain via the effluent outlet 33*d*. During the process, the second through hole 202*d*, the fourth through hole 204*d*, the fifth through hole 205*d* and the sixth through hole 206*d* of the fixed valve 210*d* are blocked and covered by the moving valve disc 220*d* and water cannot flow therethrough, wherein the communicating blind recess 222*d* is communicated with the first through hole 201*d*, which provides a blocking and sealing function. Because the seventh through hole 207*d* is not covered and sealed, so the raw water from the water inlet port 31*d* can directly flow into the water outlet port 32*d* via the seventh through hole 207*d* to supply water.

The twenty-fifth embodiment: a valve for a discontinuous water supply system.

As shown in FIG. 161 to FIG. 164, the valve shown in FIG. 161 and FIG. 162 employs the fixed valve disc and the moving valve disc providing a technical solution of draining via an eighth through hole 208*d*, the valve shown in FIG. 163 and FIG. 164 employs the fixed valve disc and the moving valve disc providing a technical solution of draining directly via a cover. The differences between the twenty-fifth embodiment and the twenty-second embodiment, the twenty-third embodiment or the twenty-fourth embodiment are as follows: in the twenty-fifth embodiment, the moving valve disc 320 cannot cover the seventh through hole 207*d* provided in the fixed valve disc 210*d* during the rotating process; in the twenty-second embodiment, the twenty-third embodiment or the twenty-fourth embodiment, only the communicating blind recess is able to cover the seventh through hole provided in the fixed valve disc, the other portion in the moving valve disc cannot completely cover the seventh through hole, that is, except for in the softening working state and the water supplement working state, the seventh through hole cannot be completely covered in other working states. So the water treatment system does not supply water in a backwash working state, a brine intaking working state and a forwardwash working state in the twenty-fifth embodiment, while in the twenty-second embodiment and the twenty-third embodiment and the twenty-fourth embodiment, the water treatment system is able to supply raw water in the backwash working state, the brine intaking working state and the forwardwash working state. The remaining descriptions are similar to the twenty-second embodiment, the twenty-third embodiment and the twenty-fourth embodiment, which can be omitted herein.

The twenty-sixth embodiment: a floating bed system having a bed falling function, which employing a technical solution of draining directly from a cover.

As shown in FIG. 126, FIG. 165 to FIG. 168, the fixed valve disc and the moving valve disc shown in FIG. 165 and FIG. 166 are employed. a multifunction softening valve, comprises a valve body 30*d*, a cover 60*d*, an injector 37*d*, a fixed valve disc 410*d* and a moving valve disc 420*d*, wherein the fixed valve disc 410*d* and the moving valve disc 420*d* are respectively provided in the valve body 30*d*, wherein the head faces of the fixed valve disc 410*d* and the moving valve disc 420*d* are hermetically and rotationally aligned with each other, wherein the moving valve disc 420*d* is connected with a valve rod 61*d*, wherein the softening valve has a water inlet port 31*d*, a water outlet port 32*d*, an injector outlet 34*d*, an injector inlet 35*d*, an outer filter port 38*d* and an inner filter port 39*d* provided in the valve body 30*d*, wherein the cover 60*d* has an effluent outlet 33*d*, wherein the injector 37*d* is communicated with the valve body 30*d* by the injector outlet 34*d* and the injector inlet 35*d*, wherein the injector 37*d* has a brine drawing port 36*d* provided therein, wherein the fixed valve disc 410*d* has seven through holes: a first through hole 401*d* provided in an inner ring and an outer ring of the fixed valve disc 410*d*, a second through hole 402*d* provided in the outer ring of the fixed valve disc 410*d*, a third through hole 403*d*, a fourth through hole 404*d*, a fifth through hole 405*d* and a sixth through hole 406*d* provided in an inner ring, and a seventh through hole 407*d* provided in an outer ring, wherein in the valve body 30*d*, the first through hole 401*d* may be communicated with the inner filter port 39*d*; the second through hole 402*d* and the third through hole 403*d* are communicated with each other and each of the second through hole 402*d* and the third through hole 403*d* is adapted for being communicated with the outer filter port 38*d*; the fourth through hole 404*d* is communicated with the injector outlet 34*d*; the fifth through hole 405*d* and the sixth through hole 406*d* are communicated with each other and each of the fifth through hole 405*d* and the sixth through hole 406*d* is adapted for being communicated with the injector inlet 35*d*; the seventh through hole 407*d* may be communicated with the water outlet port 32*d*, wherein the sixth through hole 406*d* is neighboring to the second through hole 402*d*; the second through hole 402*d* is neighboring to the first through hole 401*d*; the first through hole 401*d* is neighboring to the fourth through hole 404*d*; the fourth through hole 404*d* is neighboring to the fifth through hole 405*d*; the fifth through hole 405*d* is neighboring to the third through hole 403*d*; the third through hole 403*d* is neighboring to the seventh through hole 407*d*, wherein the moving valve disc 420*d* has a water inlet channel 421*d* communicated with the water inlet port 31*d*, and the water inlet channel 421*d* is provided in the inner ring, wherein the moving valve disc 420*d* further has a communicating blind recess 422*d* and a draining through hole 423*d*, and the communicating blind recess 422*d* is provided in the inner ring and the outer ring, wherein the draining through hole 423*d* is provided in the outer inner ring of the moving valve disc 420*d*, wherein the draining through hole 423*d* is communicated with the effluent outlet 33*d* provided in the cover 60*d* through the first pollution through hole 63*d* provided in the valve rod 61*d* and the second pollution through hole 64*d* provided in the cover 60*d* orderly.

A softening function: as shown in FIG. 167 and FIG. 168, by rotating the valve rod 61*d*, the water inlet channel 421*d* provided in the moving valve disc 420*d* may be overlapped and communicated with the first through hole 401*d* provided in the fixed valve disc 410*d*, the communicating blind recess 422*d* may be overlapped and communicated with the third through hole 403*d* and the seventh through hole 407*d*, and the draining through hole 423*d* may be blocked and covered by the fixed valve disc 410*d*. In this overlapping state, water flow may be described as follows: the water flow from the water inlet port 31*d* may flow from the water inlet channel 421*d* of the moving valve disc 420*d* into the first through hole 401*d* of the fixed valve disc 410*d*, wherein because the first through hole 401*d* is communicated with the inner filter port 39*d*, so the water flow can flow from the inner filter port 39*d* and flow through the inside 45*d* of the filter core 44*d*, the lower accumulating umbrella 43*d*, and after being softened and filtered by resin, flow into the upper accumulating umbrella 41*d*, and then flow into the outer filter port 38*d*, wherein because the outer filter port 38*d* is communicated with the third through hole 403*d* provided in the fixed valve disc 410*d*, so the water flow can flow into the third through hole 403*d*, and then flow into the seventh through hole 407*d* by flow guiding of the communicating blind recess 422*d* of the moving valve disc 420*d*, wherein because the seventh through hole 407*d* is communicated with the water outlet port 32*d*, so the water flow can flow into the water outlet port 32*d*. During the process, the second through hole 402*d*, the fourth through hole 404*d* and the fifth through hole 405*d* of the fixed valve 410*d* are blocked and covered by the moving valve disc 420*d* and water cannot flow therethrough, wherein the draining through hole 423*d* is blocked and covered by the fixed valve disc 410*d* and water cannot flow therethrough.

A bed falling function: as shown in FIG. 169 and FIG. 170, by rotating the valve rod 61*d*, the water inlet channel 421*d* provided in the moving valve disc 420*d* may be blocked and covered by a planar region of the fixed valve disc 410*d*, the communicating blind recess 422*d* may be overlapped and communicated with the fourth through hole 404*d* and the fifth through hole 405*d* provided in the fixed valve disc 410*d*, and the draining through hole 423*d* is overlapped communicated with the seventh through hole 407*d* provided in the fixed valve disc 410*d*, and the first through hole 401*d*, the second through hole 402*d*, the third through hole 403*d* and the sixth through hole 406*d* of the fixed valve 410*d* are blocked and covered by the moving valve disc 420*d* and water cannot flow therethrough. In this overlapping state, the water inlet channel 421*d* provided in the moving valve disc 420*d* is blocked and covered by the planar region of the fixed valve disc 410*d*, so the water flow from the water inlet port 31*d* cannot flow into the filter core 44*d* and no water flows through the water outlet port 32*d* and the effluent outlet 33*d*. The resin layers falls to a bottom of the resin container layer-by-layer by gravity.

A backwash function: as shown in FIG. 171 and FIG. 172, by rotating the valve rod 61*d*, the water inlet channel 421*d* provided in the moving valve disc 420*d* may be overlapped and communicated with the third through hole 403*d* provided in the fixed valve disc 410*d*, the communicating blind recess 422*d* and the draining through hole 423*d* may be overlapped and communicated with the first through hole 401*d* provided in the fixed valve disc 410*d*. In this overlapping state, water flow may be described as follows: the water flow from the water inlet port 31*d* may flow from the water inlet channel 421*d* of the moving valve disc 420*d* into the third through hole 403*d* of the fixed valve disc 410*d*, wherein because the third through hole 403*d* is communicated with the outer filter port 38*d*, so the water flow can flow from the outer filter port 38*d*, and then flow through the upper accumulating umbrella 41*d*, and after backwash the resin, flow through the lower accumulating umbrella 43*d*, and then flow into the inner filter port 39*d*, wherein because the first through hole 401*d* provided in the fixed valve disc 410*d* is communicated with the inner filter port 39*d*, so the water flow can flow into the first through hole 401*d* and flow through the draining through hole 423*d*, and then flow through the first pollution hole 63*d* provided in the valve rod 61*d* and the second pollution hole 64*d* provided in the cover 60*d* orderly to drain via the effluent outlet 33*d*. During the process, the second through hole 402*d*, the fourth through hole 404*d*, the fifth through hole 405*d*, the sixth through hole 406*d* and the seventh through hole 407*d* of the fixed valve 410*d* are blocked and covered by the moving valve disc 420*d* and water cannot flow therethrough.

A brine intaking upflow regeneration function: as shown in FIG. 173 and FIG. 174, by rotating the valve rod 61*d*, the water inlet channel 421*d* provided in the moving valve disc 420*d* may be overlapped and communicated with the fourth through hole 404*d* provided in the fixed valve disc 410*d*, the communicating blind recess 422*d* may be overlapped and communicated with the second through hole 402*d* and the sixth through hole 406*d* provided in the fixed valve disc 410*d*, and the draining through hole 423*d* may be overlapped and communicated with the first through hole 401*d* provided in the fixed valve disc 410*d*. In this overlapping state, water flow may be described as follows: the water flow from the water inlet port 31*d* may flow from the water inlet channel 421*d* of the moving valve disc 420*d* into the fourth through hole 404*d* of the fixed valve disc 410*d*, wherein because the fourth through hole 404*d* is communicated with the injector outlet 34*d*, so the water flow can flow through the injector outlet 34*d*, inject via the injector 37*d* to define a negative pressure in the brine drawing port 36*d* of the injector 37*d* so as to draw the brine fluid from the brine container 51*d* via a brine valve 52*d* and a soft pipe 50*d*, and the mixed brine water flow defined by the raw water and the brine water may flow into the injector inlet 35*d*, wherein because the sixth through hole 406*d* is communicated with the injector inlet 35*d*, the mixed brine water may flow into the sixth through hole 406*d*, and then flow into the second through hole 402*d* via the communicating blind recess 422*d*, wherein because the second through hole 402*d* is communicated with the outer filter port 38*d*, so the mixed brine water may flow into the outer filter port 38*d*, and then flow into the filter core 44*d* via the upper accumulating umbrella 41*d*, and after the mixed brine water flows through the resin bed from top to bottom and regenerates the resin bed, it flows through the lower accumulating umbrella 43*d*, and then flows through the inside 45*d* of the filter core 44*d* and flows into the inner filter port 39*d*, wherein because the first through hole 401*d* is communicated with the inner filter port 39*d*, so the water flow may flow into the first through hole 401*d*, and then flow through the draining through hole 423*d*, and after flow through the first pollution through hole 63*d* provided in the valve rod 61*d* and the second pollution through hole 64*d* provided in the cover 60*d* orderly to drain via the effluent outlet 33*d*. During the process, the third through hole 403*d*, the fifth through hole 405*d* and the seventh through hole 407*d* of the fixed valve 410*d* are blocked and covered by the moving valve disc 420*d* and water cannot flow therethrough.

A forwardwash function: as shown in FIG. 175 and FIG. 176, by rotating the valve rod 61*d*, the water inlet channel 421*d* provided in the moving valve disc 420*d* may be overlapped and communicated with the first through hole 401*d* provided in the fixed valve disc 410*d*, the communicating blind recess 422*d* may be overlapped and communicated with the sixth through hole 406*d* provided in the fixed valve disc 410*d*, and the draining through hole 423*d* may be overlapped and communicated with the second through hole 402*d* provided in the fixed valve disc 410*d*. In this overlapping state, water flow may be described as follows: the water flow from the water inlet port 31*d* may flow from the water inlet channel 421*d* of the moving valve disc 420*d* into the first through hole 401*d* of the fixed valve disc 410*d*, wherein because the first through hole 401*d* is communicated with the inner filter port 39*d*, so the water flow can flow from the inner filter port 39*d*, and then flow through the inside 45*d* of the filter core 44*d* and the lower accumulating umbrella 43*d*, and after flushing the residue of brine fluid, flow through the upper accumulating umbrella 41*d*, and then flow into the outer filter port 38*d*, wherein because the outer filter port 38*d* is communicated with the second through hole 402*d* provided in the fixed valve disc 410*d*, so the water flow can flow into the second through hole 402*d* and flow through the draining through hole 423*d*, and then flow through the first pollution hole 63*d* provided in the valve rod 61*d* and the second pollution hole 64*d* provided in the cover 60*d* orderly to drain via the effluent outlet 33*d*. During the process, the third through hole 403*d*, the fourth through hole 404*d*, the fifth through hole 405*d* and the seventh through hole 407*d* of the fixed valve 410*d* are blocked and covered by the moving valve disc 420*d* and water cannot flow therethrough. The communicating blind recess 422*d* may be overlapped and communicated with the sixth through hole 406*d* provided in the fixed valve disc 410*d*, which provides a blocking and covering function.

A brine container softened water supplement and softened water supply function: as shown in FIG. 177 and FIG. 178, by rotating the valve rod 61*d*, the water inlet channel 421*d* provided in the moving valve disc 420*d* may be overlapped and communicated with the first through hole 401*d* provided in the fixed valve disc 410*d*, the communicating blind recess 422*d* may be overlapped and communicated with the third through hole 403*d*, the fifth through hole 405*d* and the seventh through hole 407*d* provided in the fixed valve disc 410*d*, and the draining through hole 423*d* may be blocked and covered by the fixed valve disc 410*d*. In this overlapping state, water flow may be described as follows: the water flow from the water inlet port 31*d* may flow from the water inlet channel 421*d* of the moving valve disc 420*d* into the first through hole 401*d* of the fixed valve disc 410*d*, wherein because the first through hole 401*d* is communicated with the inner filter port 39*d*, so the water flow can flow from the inner filter port 39*d*, the inside 45*d* of the filter core 44*d* into the lower accumulating umbrella 43*d*, and flow through the resin from bottom to top, and after being softened by resin, flow into the upper accumulating umbrella 41*d*, then flow into the outer filter port 38*d*, wherein because the outer filter port 38*d* is communicated with the third through hole 403*d* of the fixed valve disc 410*d*, so the water flow can flow into the third through hole 403*d*, and then flow into the fifth through hole 405*d* and the seventh through hole 407*d* by flow guiding of the communicating blind recess 422*d*, wherein because the fifth through hole 405*d* is communicated with the injector inlet 35*d*, so the water flow can flow into the injector inlet 35*d*, and then flow through the brine drawing port 36*d*, the soft pipe 50*d* and the brine valve 52*d* and flow into the brine container 51*d* to supplement water, at the same time, because the seventh through hole 407*d* is communicated with the water outlet port 32*d*, so the softened water can flow into the seventh through hole 407*d* and the water outlet port 32*d* to supply water. During the process, the second through hole 402*d*, the fourth through hole 404*d* and the sixth through hole 406*d* of the fixed valve 410*d* are blocked and covered by the moving valve disc 420*d* and water cannot flow therethrough. The draining through hole 423*d* may be blocked and covered by the fixed valve disc 410*d* and water cannot flow therebetween.

The twenty-seventh embodiment: a floating bed system having a bed falling function. It employs a technical solution of draining via an eighth through hole.

As shown in FIG. 126, FIG. 179 to FIG. 180, the fixed valve disc and the moving valve disc shown in FIG. 179 and FIG. 180 are employed. The differences between the twenty-seventh embodiment and the twenty-sixth embodiment are as follows: in the twenty-seventh embodiment, the fixed valve disc 410*d* has an eighth through hole 408*d* provided in a center of the fixed valve disc 410*d*, and the moving valve disc 420*d* has a draining blind recess 4231*d* provided therein; in the twenty-sixth embodiment, the fixed valve disc 410*d* has no an eighth through hole 408*d*, and the moving valve disc 420 has a draining through hole 423*d* provided therein. The structural differences result in the following differences of draining: the drainage way in the twenty-seventh embodiment: water flow is guided to flow into the eighth through hole 408*d* provided in the fixed valve hole 410*d* by the draining blind recess 4231*d* of the moving valve disc 420*d*, and then flows into the effluent outlet 33*d* provided in the valve body to drain; the drainage way in the twenty-sixth embodiment: water flow flows through the draining through hole 423*d* of the moving valve disc 410*d*, and flows through the first pollution through hole 63*d* provided in the valve rod and the second pollution through hole 64*d* provided in the cover orderly to drain via the effluent outlet 33*d*. So only one example is described for explaining detailedly the backwash function, and the illustrations for the other functions can be omitted.

A backwash function: as shown in FIG. 181 and FIG. 182, by rotating the valve rod 61*d*, the water inlet channel 421*d* provided in the moving valve disc 420*d* may be overlapped and communicated with the third through hole 403*d* provided in the fixed valve disc 410*d*, the communicating blind recess 422*d* and the draining blind recess 4231*d* may be overlapped and communicated with the first through hole 401*d* provided in the fixed valve disc 410*d*. In this overlapping state, water flow may be described as follows: the water flow from the water inlet port 31*d* may flow from the water inlet channel 421*d* of the moving valve disc 420*d* into the third through hole 403*d* of the fixed valve disc 410*d*, wherein because the third through hole 403*d* is communicated with the outer filter port 38*d*, so the water flow can flow from the outer filter port 38*d*, and then flow through the upper accumulating umbrella 41*d*, and after backwash the resin, flow through the lower accumulating umbrella 43*d*, and then flow into the inner filter port 39*d*, wherein because the first through hole 401*d* provided in the fixed valve disc 410*d* is communicated with the inner filter port 39*d*, so the water flow can flow into the first through hole 401*d*, and then flow into the eighth through hole 8*d* by flow guiding of the draining blind recess 4231*d*, wherein because the eighth through hole 408*d* is communicated with the effluent outlet 33*d*, so the water flow may flow into the effluent outlet 33*d* to drain. During the process, the second through hole 402*d*, the fourth through hole 404*d*, the fifth through hole 405*d*, the sixth through hole 406*d* and the seventh through hole 407*d* of the fixed valve 410*d* are blocked and covered by the moving valve disc 420*d* and water cannot flow therethrough.

The twenty-eighth embodiment: employing a technical solution of draining from the draining through hole into the valve body via a valve rod and a cover.

As shown in FIG. 183, the valve body 30*d* has an effluent outlet 33*d* provided therein, and the draining through hole 23*d* provided in the moving valve disc 20*d* is communicated with the effluent outlet 331*d* provided in the valve body 30*d* by the first pollution hole 63*d* provided in the valve rod 61*d* and the second pollution hole 64*d* provided in the cover 60*d* orderly.

The twenty-eighth embodiment is different from the nineteenth embodiment, the twentieth embodiment, twenty-fourth embodiment or the twenty-sixth embodiment: in the nineteenth embodiment, the twentieth embodiment, twenty-fourth embodiment or the twenty-sixth embodiment, the effluent outlet is provided in a cover, and the drainage passage is provided as follows: communicating with the effluent outlet via the first pollution hole provided in the valve rod and the second pollution hole provided in the cover orderly. Other descriptions are similar, which are omitted herein.

Referring to FIG. 184 to FIG. 188 of the drawings of the present disclosure, a flow control apparatus according to a twenty-ninth preferred embodiment of the present disclosure is illustrated, which is adapted for being used for controlling fluid to flow in multiple directions, wherein the flow control apparatus comprises a first flow controlling element 10 and a second flow controlling element 20 provided rotatably on the first flow controlling element, wherein the first flow controlling element 10 comprises a first flow controlling body 11, wherein the first flow controlling body 11 comprises a top end 111, wherein the top end 111 defines a first flow controlling side 100; wherein the second flow controlling element 20 comprises a second controlling body 21, wherein the second controlling body 21 comprises a bottom end 211 and an upper end 212 upwardly extended from the bottom end 211, wherein the bottom end 211 defines a second flow controlling side 200, wherein the first flow controlling side 100 of the first flow controlling element 10 is adapted for contacting physically with the second flow controlling side 200 of the second flow controlling side 200 of the second flow controlling element 20.

As shown in FIG. 185 to FIG. 186B, the top end 111A of the first flow controlling element 10A of the flow control apparatus further comprises a first center portion 1111, a first edge portion 1112 and a first middle portion 1113 extended between the first center portion 1111 and the first edge portion 1112, wherein the bottom end 211 of the second flow controlling body 21 of the second flow controlling element 20 further comprises a second center portion 2111, a second edge portion 2112 and a second middle portion 2113 extended between the second center portion 2111 and the second edge portion 2112, wherein the flow control apparatus has a first channel 101, a second channel 102, a third channel 103, a fourth channel 104, a fifth channel 105, a ninth channel 109, a tenth channel 1010 and an eleventh channel 1011, wherein the first channel 101, the second channel 102, the third channel 103, the fourth channel 104 and the fifth channel 105 are respectively provided in the first flow controlling body 11 of the first flow controlling element 10; wherein the ninth channel 109, the tenth channel 1010 and the eleventh channel 1011 are respectively provided in the second flow controlling body 21 of the second flow controlling element 20, wherein the first channel 101 is downwardly extended from the first flow controlling side 100 of the first flow controlling element 10; wherein the second channel 102 is downwardly extended from the first flow controlling side 100 of the first flow controlling element 10; wherein the third channel 103 is downwardly extended from the first flow controlling side 100 of the first flow controlling element 10; wherein the fourth channel 104 is downwardly extended from the first flow controlling side 100 of the first flow controlling element 10; wherein the fifth channel 105 is downwardly extended from the first flow controlling side 100 of the first flow controlling element 10; wherein the ninth channel 109 is extended upwardly from the second flow controlling side 200 of the bottom end 211 of the second flow controlling body 21 and extended from the second middle portion 2113 of the second flow controlling body 21 to the second edge portion 2112 and defines a ninth opening 1091 communicated with outer space thereof; wherein the tenth channel 1010 is extended upwardly from the second flow controlling side 200 of the bottom end 211 of the second flow controlling body 21 to the upper end 212 and extended from second center portion 2111 of the bottom end 211 of the second flow controlling body 21 to the second edge portion 2112; wherein the eleventh channel 1011 is extended upwardly from the second flow controlling side 200 of the bottom end 211 of the second flow controlling body 21 and penetrates through the second flow controlling body 21 of the second flow controlling element 20.

In other words, the ninth opening 1091 of the ninth channel 109 is provided to keep being communicated with an outer space, especially the outer space of the second flow controlling element 20. Preferably, the first channel 101, the third channel 103, the fourth channel 104, the fifth channel 105 are respectively extended from the first middle portion 1113 of the top end 111 of the first flow controlling body 11 to the first edge portion 1112 of the top end 111; the second channel 102 is extended from the first center portion 1111 of the top end 111 of the first flow controlling body 11 to the first edge portion 1112 of the top end 111.

As shown in FIG. 187A to FIG. 187F, the second flow controlling element 20 is able to rotate relative to the first flow controlling element 10 so that the flow control apparatus has a first working state, a second working state, a third working state, a fourth working state, and a fifth working state, wherein when the flow control apparatus is in the first working state, the ninth channel 109 is communicated with the first channel 101, wherein the tenth channel 1010 is communicated with the third channel 103 and the second channel 102; wherein when the control apparatus is in the second working state, the ninth channel 109 is communicated with the second channel 102, and the eleventh channel 1011 is communicated with the first channel 101; wherein when the flow control apparatus is in the third working state, the ninth channel 109 is communicated with the fourth channel 104, the tenth channel 1010 is communicated with the second channel 102 and the fifth channel 105, the eleventh channel 1011 is communicated with the first channel 101; wherein when the flow control apparatus is in the fourth working state, the ninth channel 109 is communicated with the fifth channel 105; wherein when the flow control apparatus is in the fifth working state, the ninth channel 109 of the flow control apparatus is communicated with the first channel 101, and the eleventh channel 1011 is communicated with the second channel 102. Preferably, when the flow control apparatus is in the first working state, the eleventh channel 1011 is communicated with the fourth channel 104; when the flow control apparatus is in the second working state, the tenth channel 1010 is communicated with the second channel 102; when the flow control apparatus is in the fourth working state, the tenth channel 1010 is communicated with the first channel 101 and the second channel 102, and the eleventh channel 1011 is communicated with the third channel 103; when the flow control apparatus is in the fifth working state, the tenth channel 1010 is communicated with the second channel 102.

Preferably, when the flow control apparatus is in the first working state, the fifth channel 105 is blocked by the second flow controlling element 20; when the flow control apparatus is in the second working state, the third channel 103, the fourth channel 104 and the fifth channel 105 are blocked by the second flow controlling element 20; when the flow control apparatus is in the third working state, the third channel 103 is blocked by the second flow controlling element 20; when the flow control apparatus is in fourth working state, the fourth channel 104 is blocked by the second flow controlling element 20; when the flow control apparatus is in the fifth working state, the third channel 103, the fourth channel 104 and the fifth channel 105 are blocked by the second flow controlling element 20.

It is worth mentioning that the first channel 101, the second channel 102, the third channel 103, the fourth channel 104 and the fifth channel 105 of the flow control apparatus are respectively and spacedly provided in the first flow controlling body 11 of the first flow controlling element 10; the ninth channel 109, the tenth channel 1010 and the eleventh channel 1011 are respectively and spacedly provided in the second flow controlling body 21 of the second flow controlling element 20.

The flow control apparatus further has a standby working state, wherein when the flow control apparatus is in the standby working state, the ninth channel 109 of the flow control apparatus is not communicated with the first channel 101, the second channel 102, the third channel 103, the fourth channel 104 and the fifth channel 105 of the flow control apparatus.

Preferably, the tenth channel 1010 of the flow control apparatus is communicated with the second channel 102; the eleventh channel 1011 is blocked by the first flow controlling element 10.

As shown in FIG. 186A and FIG. 186B, the first channel 101, the fifth channel 105, the fourth channel 104, the second channel 102 and the third channel 103 of the flow control apparatus are arranged clockwise in the first flow controlling body 11 of the first flow controlling element 10 in the order thereof; the ninth channel 109, the eleventh channel 1011 and the tenth channel 1010 of the flow control apparatus are arranged clockwise in the second flow controlling body 21 of the second flow controlling element 20 in the order thereof. Alternatively, the first channel 101, the fifth channel 105, the fourth channel 104, the second channel 102 and the third channel 103 of the flow control apparatus are arranged counter-clockwise in the first flow controlling body 11 of the first flow controlling element 10 in the order thereof; the ninth channel 109, the eleventh channel 1011 and the tenth channel 1010 of the flow control apparatus are arranged counter-clockwise in the second flow controlling body 21 of the second flow controlling element 20 in the order thereof.

As shown in FIG. 186A and FIG. 186B, wherein the first flow controlling side 100 of the first flow controlling element 10 of the flow control apparatus has a center section 1000 shown by a chain line, wherein the center section 1000 is provided in the first center portion 1111 of the top end 111 of the first flow controlling body 11 of the first flow controlling element 10, wherein the remaining portion of the first flow controlling side 100 is clockwise and evenly divided into a first section 1001, a second section 1002, a third section 1003, a fourth section 1004, a fifth section 1005, a sixth section 1006, a seventh section 1007 and an eighth section 1008, as shown by chain lines; wherein the second flow controlling side 200 of the second flow controlling element 20 of the flow control apparatus has a center division 2000, wherein the center division 2000 is provided in the second center portion 2111 of the bottom end 211 of the second flow controlling body 21 of the second flow controlling element 20, wherein the remaining portion of the second flow controlling side 200 is clockwise and evenly divided into a first division 2001, a second division 2002, a third division 2003, a fourth division 2004, a fifth division 2005, a sixth division 2006, a seventh division 2007 and an eighth division 2008; wherein the first channel 101 is downwardly extended from the first section 1001 and the second section 1002 of the first flow controlling side 100; the fifth channel 105 is downwardly extended from the third section 1003 of the first flow controlling side 100; the fourth channel 104 is downwardly extended from the fifth section 1005 of the first flow controlling side 100; the second channel 102 is downwardly extended from the center section 1000 and the sixth section 1006 of the first flow controlling side 100; the third channel 103 is downwardly extended from the seventh section 1007 of the first flow controlling side 100; the ninth channel 109 is upwardly extended from the first division 2001 of the second flow controlling side 200; the eleventh channel 1011 is upwardly extended from the fifth division 2005 of the second flow controlling side 200; the tenth channel 1010 is upwardly extended from the seventh division 2007 and the center division 2000 of the second flow controlling side 200 to the upper end 212.

Alternatively, each of the first flow controlling side 100 of the first flow controlling body 11 of the first flow controlling element 10 and the second flow controlling side 200 of the second flow controlling body 21 of the second flow controlling element 20 is circular-shaped, wherein the first channel 101, the second channel 102, the third channel 103, the fourth channel 104 and the fifth channel 105 are radially provided in the first flow controlling side 100 of the first flow controlling element 10, and the ninth channel 109 and the tenth channel 1010 are radially provided in the second flow controlling side 200 of the second flow controlling element 20.

Preferably, wherein the first channel 101 is downwardly and outwardly extended from the first flow controlling side 100 of the first flow controlling element 10; wherein the second channel 102 is downwardly and outwardly extended from the first flow controlling side 100 of the first flow controlling element 10; wherein the third channel 103 is downwardly and outwardly extended from the first flow controlling side 100 of the first flow controlling element 10; wherein the fifth channel 105 is downwardly and outwardly extended from the first flow controlling side 100 of the first flow controlling element 10; wherein the seventh channel 107 is extended and upwardly from the first flow controlling side 100 of the first flow controlling element 10.

As shown in FIG. 185, the flow control apparatus further comprises a casing 30 according to the twenty-ninth embodiment of the present disclosure, wherein the casing comprises a casing body 31, wherein the casing body 31 has an outer side wall 312 and an inner side wall 311 and defines an inner chamber 300, wherein the first flow controlling element 10 is adapted for being provided in the inner chamber 300 and the first flow controlling side 100 of the first flow controlling element 10 is provided to face up, and the second flow controlling element 20 is adapted for being provided in the inner chamber 300 and the second flow controlling side 200 of the second flow controlling element 20 is provided to face down, wherein the first flow controlling body 11 of the first flow controlling element 10 further comprises a lower end 112 downwardly extended from the top end 111, wherein the lower end 112 of the first flow controlling body 11 of the first flow controlling element 10 is connected with the inner side wall 311 of the casing body 31 of the casing 30 and divides spacedly the inner chamber 300 into a first receiving chamber 3001 and a second receiving chamber 3002, wherein the casing 30 has a first opening 301, a second opening 302, a third opening 303 and a fourth opening 304, wherein the first receiving chamber 3001 is respectively communicated with the first opening 301 and the ninth opening 1091 of the ninth channel 109; the second opening 302 is communicated with the third channel 103 of the flow control apparatus; the third opening 303 is communicated with the fourth channel 104 of the flow control apparatus; the fourth opening 304 is communicated with the fifth channel 105 of the flow control apparatus. Preferably, the lower end 112 of the first flow controlling body 11 of the first flow controlling element 10 is integrated with the inner side wall 311 of the casing body 31 of the casing 30.

As shown in FIG. 185, the flow control apparatus further comprises a flow separating element 40 extended downwardly form the first flow controlling body 11, wherein the flow separating element 40 and the inner side wall 311 of the casing 30 define a first guiding chamber 401 therebetween, wherein the first flow guiding chamber 401 is communicated with the first channel 101, wherein the flow separating element 40 has a second guiding chamber 402 communicated with the second channel 102 of the flow control apparatus.

As shown in FIG. 185, the flow control apparatus further comprises a flow guiding element 50, wherein the flow guiding element 50 comprises a flow guiding body 51, wherein the flow guiding body 51 defines a first flow guiding channel 510, wherein the flow guiding body 51 of the flow guiding element 50 is upwardly extended from the second flow controlling body 21 of the second flow controlling element 20 and the first flow guiding channel 510 of the first flow guiding element 50 is communicated with the eleventh channel 1011 of the flow control apparatus.

As shown in FIG. 185 to FIG. 186C, the flow control apparatus further comprises a wear-resistant member 60 detachably provided between the first flow controlling element 10 and the second flow controlling element 20, wherein the wear-resistant member 60 comprises a wear-resistant body 61, wherein the wear-resistant body 61 has a wear-resistant side 610 adapted for contacting physically with the second flow controlling side 200 of the second flow controlling body 21, wherein the wear-resistant side 610 is treated by a wear-resistant process to minimize the force of friction, which is resulted from the rotating of the first flow controlling body 11 of the first flow controlling element 10 relative to the second flow controlling body 21 of the second flow controlling element 20 so as to prolong the life-span of the flow control apparatus. The wear-resistant member 60 is further sized and shaped to match the first flow controlling side 100 of the first flow controlling element 10 and the wear-resistant body 61 of the wear-resistant member 60 defines spacedly a first port 601, a second port 602, a third port 603, a fourth port 604 and a fifth port 605, wherein the first port 601, the second port 602, the third port 603, the fourth port 604 and the fifth port 605 are respectively sized and shaped to match the first channel 101, the second channel 102, the third channel 103, the fourth channel 104 and the fifth channel 105 of the flow control apparatus. Preferably, when the wear-resistant member 60 is provided between the first flow controlling element 10 and the second flow controlling element 20, the wear-resistant member 60 does not rotate relative to the first flow controlling body 11 of the first flow controlling element 10. More preferably, the wear-resistant side 610 of the wear-resistant member 60 is treated by a smoothing process to minimize the roughness thereof.

As shown in FIG. 188, the flow control apparatus further comprises an injector 70, wherein the injector 70 is provided in the outer side wall 312 of the casing body 31 of the casing 30 of the flow control apparatus, wherein the injector is respectively communicated with the third opening 303 and the fourth opening 304 of the casing 30.

As shown in 185, the flow control apparatus further comprises an auxiliary unit 80, wherein the auxiliary unit 80 comprises a driving element 81 upwardly extended from the second flow controlling body 21 of the second flow controlling element 20, wherein the driving element 81 is adapted for driving the second flow controlling body 21 of the second flow controlling element 20 of the flow control apparatus to rotate relative to the first controlling body 11 of the first flow controlling element 10. The auxiliary unit 80 further comprises a fixing element 82 extended upwardly from the driving element 81, wherein the fixing element 82 is adapted for holding the driving element 81 at a position to hold the second flow controlling body 21 of the second flow controlling element 20 at a position. Preferably, the driving element 81 of the auxiliary unit 80 of the flow control apparatus is integrated with the flow guiding body 51 of the flow guiding element 50.

Referring to FIG. 188, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90, wherein the water treatment device 90 comprises a water treatment container 91, a liquid collecting unit 92 and a water treatment unit 93, wherein the water treatment container 91 has a water treatment chamber 900 and an upper opening 910, the liquid collecting unit 92 comprises a central pipe 921, the water treatment unit 93 is adapted for being received in the water treatment chamber 900, the central pipe 921 is adapted for being extended downwardly through the upper opening 910 to enter into the water treatment chamber 900, and the central pipe 921 and the upper opening 910 defines an outer opening 9101, wherein the central pipe 921 has an upper opening 9211 and a lower opening 9212, wherein the liquid in the water treatment container 91, such as water, is adapted for being treated by the water treatment unit 93 and flows from the lower opening 9212 of the central pipe 921 of the liquid collecting unit 92 into the central pipe 921 and flows out of the central pipe 921; preferably, the water treatment unit 93 provided in the water treatment container 91 comprises water treatment material, such as softening resin, activated carbon or the like, or the combination thereof.

It is worth mentioning that the outer opening 9101 of the water treatment device 90 of the water treatment system may be communicated with the first channel 101 or the second channel 102 of the flow control apparatus, the upper opening 9211 of the central pipe 921 of the liquid collecting unit 92 of the water treatment device 90 may be communicated with the first channel 101 or the second channel 102 of the flow control apparatus; wherein when the outer opening 9101 of the water treatment device 90 is communicated with the first channel 101 of the flow control apparatus, the upper opening 9211 of the central pipe 921 of the liquid collecting unit 92 of the water treatment device 90 is communicated with the second channel 102 of the flow control apparatus; when the outer opening 9101 of the water treatment device 90 of the water treatment system is communicated with the second channel 102 of the flow control apparatus, the upper opening 9211 of the central pipe 921 of the liquid collecting unit 92 of the water treatment device 90 is communicated with the first channel 101 of the flow control apparatus.

As shown in FIG. 188, the flow control apparatus further comprises a brine supply container 84, wherein the injector 70 may be communicated with the brine supply container 84, wherein when the flow control apparatus is under the third working state, the fluid from the third opening 303 may flow into the injector 70 and make the liquid in the brine supply container 84 flow into the fourth opening 304 of the casing 30.

Preferably, the outer opening 9101 of the water treatment device 90 of the water treatment system and the upper opening 9211 of the central pipe 921 of the water treatment device 90 are respectively adapted to be communicated with the first flow guiding chamber 401 or the second flow guiding chamber 402 of the flow control apparatus, wherein when the outer opening 9101 of the water treatment device 90 is communicated with the first flow guiding chamber 401 of the flow control apparatus, the upper opening 9211 of the central pipe 921 of the water treatment device 90 is communicated with the second flow guiding chamber 402 of the flow control apparatus, and when the flow control apparatus is under the third working state, the fluid from the brine supply container 84 can flow through the injector 70 and flow into the second channel 102, and then flow into the water treatment container 91 via the second flow guiding chamber 402 and the central pipe 921 of the liquid collecting unit 92 of the water treatment device 90, wherein when the outer opening 9101 of the water treatment device 90 of the water treatment system is communicated with the second flow guiding chamber 402 of the flow control apparatus, the upper opening 9211 of the central pipe 921 of the water treatment device 90 is communicated with the first flow guiding chamber 401 of the flow control apparatus, and when the flow control apparatus is under the third working state, the fluid from the brine supply container 84 can flow through the injector 70 and flow into the second channel 102, and then flow into the water treatment container 91 via the second flow guiding chamber 402 and the outer opening 9101 of the water treatment device 90. In other words, when the outer opening 9101 of the water treatment device 90 is communicated with the first flow guiding chamber 401 of the flow control apparatus and the upper opening 9211 of the central pipe 921 of the water treatment device 90 is communicated with the second flow guiding chamber 402 of the flow control apparatus, the fluid from the brine supply container 84 can flow through the water treatment unit 93 from bottom to top; and when the outer opening 9101 of the water treatment device 90 is communicated with the second flow guiding chamber 402 of the flow control apparatus and the upper opening 9211 of the central pipe 921 of the water treatment device 90 is communicated with the first flow guiding chamber 401 of the flow control apparatus, the fluid from the brine supply container 84 can flow through the water treatment unit 93 from top to bottom. Preferably, the liquid in the brine supply container 84 is regeneration solution for the water treatment unit 93 of the water treatment device 90, so by controlling the communicating type that the outer opening 9101 and the upper opening 9211 of the central pipe 921 of the water treatment device 90 are communicated with the flow control apparatus to control the regeneration solution from the brine supply container 84 of the water treatment unit 93 to regenerate and elute the water treatment unit 93.

Alternatively, when the outer opening 9101 of the water treatment device 90 is communicated with the second flow guiding chamber 402 of the flow control apparatus and the upper opening 9211 of the central pipe 921 of the water treatment device 90 is communicated with the first flow guiding chamber 401 of the flow control apparatus, and when the flow control apparatus is under the first working state and the liquid flows from the flow control apparatus into the water treatment container 91, the liquid flows through the water treatment unit 93 from bottom to top so as to make the water treatment unit 93 be lifted up by the liquid, and at this moment, if want to change the working state, in order to prevent the resin layer of the water treatment unit 93 being scattered, the resin layer of the water treatment unit 93 need to naturally fall, so the standby working state of the flow control apparatus has to be next to the first working state to prevent the water flow interference resulted from crossing over other working states, which is produced when the first working state and the standby working state do not neighbor to each other and the flow control apparatus is switched from the first working state into the standby working state.

It is worth mentioning that when the flow control apparatus is under the second working state, the ninth channel 109 is communicated with the second channel 102 and the eleventh channel 1011 is communicated with the first channel 101 such that the waste water from the water treatment container 91 of the water treatment device 90 is able to be drained via the eleventh channel 1011; when the flow control apparatus is under the third working state, the ninth channel 109 is communicated with the fourth channel 104, the tenth channel 1010 is communicated with the second channel 102 and the fifth channel 105, the eleventh channel 1011 is communicated with the first channel 101 such that the waste water from the water treatment container 91 of the water treatment device 90 is able to be drained via the eleventh channel 1011; when the flow control apparatus is under the fifth working state, the ninth channel 109 of the flow control apparatus is communicated with the first channel 101, and the eleventh channel 1011 is communicated with the second channel 102 such that the waste water from the water treatment container 91 of the water treatment device 90 is able to be drained via the eleventh channel 1011. So the waste water from the water treatment system may be upwardly drained via the eleventh channel 1011 such that the eleventh channel 1011 for drainage does not reduce the sizes of the first channel 101, the second channel 102, the third channel 103, the fourth channel 104 and the fifth channel 105 of the flow control apparatus and decreases the interference resulted from the first channel 101, the second channel 102, the third channel 103, the fourth channel 104 and the fifth channel 105 provided in the first flow controlling body 11 of the first flow controlling element 10. In other words, because the eleventh channel 1011 upwardly penetrates through the second flow controlling body 21 of the second flow controlling element 20, so the waste water from the water treatment system may flow through the eleventh channel 1011 and flow upwardly into the flow guiding element 50 to be drained via the first flow guiding channel 510 of the flow guiding element 50.

It is appreciated that for a water treatment system installed with the flow control apparatus of the present disclosure, when the flow control apparatus is under the first working state, the water treatment system can achieve softening water; when the flow control apparatus is under the second working state, the water treatment system can achieve washing the water treatment unit 93 from bottom to top; when the flow control apparatus is under the third working state, the water treatment system can make the solution in the brine supply container 84 flow into the water treatment container 91 via the central pipe 921; when the flow control apparatus is under the fourth working state, the water treatment system can supplement water into the brine supply container 84; when the flow control apparatus is under the fifth working state, the water treatment system stops working and is in a standby working state. Further, the first working state of the flow control apparatus is neighboring to the standby working state, so when a user wants to adjust the water treatment system from a softening working state to a standby working state or a shutdown working state, the user just need to drive the second flow controlling element 20 of the flow control apparatus to rotate for a shortest distance to achieve the working state switch of the water treatment system. In other words, the first working state and the standby working state of the flow control apparatus are successive in achieving such that the working state switch of the water treatment system installed with the flow control apparatus of the present disclosure meets a consumer's usage habits and decreases the rotating distance of the second flow controlling body 21 of the second flow controlling element 20 relative to the first flow controlling body 11 of the first flow controlling element 10 when the water treatment system is switched between two different working state so as to minimize the wear and tear between the second flow controlling element 20 and the first flow controlling element 10 and prolong the life-span thereof.

As shown in FIG. 188 is an operation schematic diagram of the water treatment system installed with the flow control apparatus of the present disclosure, as shown in FIG. 187A, when the flow control apparatus is under the first working state, the water treatment system is in a water treating state, raw water (water to be processed) may flow from the first opening 301 of the casing 30 of the flow control apparatus into the ninth channel 109 and the first channel 101, and then flow through the outer opening 9101 of the water treatment system and flow into the water treatment chamber 900 of the water treatment system, and then flow upwardly into the second channel 102 and the third channel 103 of the flow control apparatus via the central pipe 921 of the liquid collecting unit 92 of the water treatment system, and then flow out through the second opening 302 of the casing 30 of the flow control apparatus; as shown in FIG. 187B, when the flow control apparatus is under the second working state, the water treatment system is in a backwash state, raw water (water to be processed) may flow from the first opening 301 of the casing 30 of the flow control apparatus into the ninth channel 109 and the second channel 102, and then flow through the upper opening 9211 of the central pipe 921 of the water treatment system and flow through the water treatment chamber 900 of the water treatment system from bottom to top, and then flow into the first channel 101 of the flow control apparatus via the outer opening 9101 of the water treatment system, and then flow out through the eleventh channel 1011 and the first flow guiding channel 510; as shown in FIG. 187C, when the flow control apparatus is under the third working state, the water treatment system is in an upflow brine intaking state, raw water (water to be processed) may flow from the first opening 301 of the casing 30 of the flow control apparatus into the ninth channel 109 and the fourth channel 104, and then flow through the third opening 303 into the injector to be injected, and after being mixed with the liquid from the brine supply container 84, the mixture may flow into the fourth opening 304, and then flow through the second channel 102 via the fifth channel 105, and then flow through the water treatment chamber 900 from bottom to top via the upper opening 9211 of the central pipe of the water treatment system, and then flow into the first channel 101 via the outer opening 9101 of the water treatment system, at last flow out through the eleventh channel 1011 and the first flow guiding channel 510; as shown in FIG. 187D, when the flow control apparatus is under the fourth working state, the water treatment system is in a water supplement state, raw water (water to be processed) may flow from the first opening 301 of the casing 30 of the flow control apparatus into the ninth channel 109 and the fifth channel 105, and then flow into the injector via the fourth opening 304 to supplement water into the brine supply container 84. As shown in FIG. 187E, when the flow control apparatus is under the fifth working state, the water treatment system is in a forwardwash state, raw water (water to be processed) may flow from the first opening 301 of the casing 30 of the flow control apparatus into the ninth channel 109 and the first channel 101, and then flow into the water treatment chamber 900 via the outer opening 9101 of the water treatment system and flow upwardly into the second channel 102 via the central pipe 921 of the liquid collecting unit 92 of the water treatment system, and then flow out through the eleventh channel 1011 and the first flow guiding channel 510; as shown in FIG. 187. F, when the flow control apparatus is under a standby working state, raw water (water to be processed) may flow from the first opening 301 of the casing 30 of the flow control apparatus, but the water flow cannot flow into the first flow control element 10.

The flow control apparatus of the present embodiment may comprise eight equal divisions and have a less number of divisions, which is beneficial in increase the diameters of the water channels of the flow control apparatus and the rate of flow and employs a technical solution of upflow brine intaking and regeneration achieving a higher regeneration efficiency than downflow brine intaking and regeneration among domestic small-capacity water softeners using softening resin as treating material and brine as regenerating agent, and it can save brine; and it has an anticipated aligning order of working states as flows: water treating working state->>standby working state->>backwash working state->>upflow brine intaking working state->>water supplement working state->>forwardwash working state, so the flow control apparatus is able to help to finish all of working states when the moving valve disc 20 rotates for a single circle, which decreases the rotating distance of the moving valve disc 20 and prolongs the life-span of the flow control apparatus; wherein the standby working state is next to the water treatment working state (the first working state) and the first working state and the standby working state are successive each other on the action such that the operations switch type of the water treatment system of the present disclosure better meets a consumer's usage habits and decreases the rotating distance of the second flow controlling body 21 of the second flow controlling element 20 relative to the first flow controlling body 11 of the first flow controlling element 10 when the water treatment system is switched between two different working state so as to minimize the wear and tear between the second flow controlling element 20 and the first flow controlling element 10 and prolong the life-span thereof. Especially, in industry application, under the first working state, the water treatment unit may be provided in the water treatment chamber in a floating manner to receiving more filtering material therein, in the regeneration working state, the water treatment unit has to be naturally fallen and the standby working state of the present flow control apparatus can exactly help the resin layer to fall naturally. More especially, in order to prevent the resin layer being scattered when the water treatment unit falls, the standby working state is preferably neighboring to the first working state to prevent the water flow interference resulted from the working state switch crossing over the other working states. The flow control apparatus of the present embodiment can achieve the above function. A main liquid channel in the center of the first flow controlling element is to decrease the direction changes of the liquid in the flow control apparatus so as to enable liquid to flow smoothly in the flow control apparatus and increase the rate of flow.

Referring to FIG. 189 to FIG. 191B of the drawings of the present disclosure, a flow control apparatus according to a thirtieth preferred embodiment of the present disclosure is illustrated, which is adapted for being used for controlling fluid to flow in multiple directions, wherein the flow control apparatus comprises a first flow controlling element 10A and a second flow controlling element 20A provided rotatably on the first flow controlling element 10A, wherein the first flow controlling element 10A comprises a first flow controlling body 11A, wherein the first flow controlling body 11A comprises a top end 111A, wherein the top end 111A defines a first flow controlling side 100A; wherein the second flow controlling element 20A comprises a second flow controlling body 21A, wherein the second flow controlling body 21A comprises a bottom end 211A and an upper end 212A upwardly extended from the bottom, wherein the bottom end 211A defines a second flow controlling side 200A, wherein the first flow controlling side 100A of the first flow controlling element 10A is adapted for contacting physically with the second flow controlling side 200A of the second flow controlling element 20A.

As shown in FIG. 190 to FIG. 191B, the first flow controlling body 11A of the flow control apparatus further comprises a first center portion 1111A, a first edge portion 1112A and a first middle portion 1113A extended between the first center portion 1111A and the first edge portion 1112A, wherein the bottom end 211A of the second flow controlling body 21A of the second flow controlling element 20A further comprises a second center portion 2111A, a second edge portion 2112A and a second middle portion 2113A extended between the second center portion 2111A and the second edge portion 2112A, wherein the flow control apparatus has a first channel 101A, a second channel 102A, a third channel 103A, a fourth channel 104A, a fifth channel 105A provided respectively in the first flow controlling body 11A of the first flow controlling element 10A, and a ninth channel 109A, a tenth channel 1010A and an eleventh channel 1011A provided respectively in the bottom end 211A of the second flow controlling body 21A of the second flow controlling element 20A, wherein the first channel 101A is downwardly extended from the first flow controlling side 100A of the first flow controlling element 10A; wherein the second channel 102A is downwardly extended from the first flow controlling side 100A of the first flow controlling element 10A; wherein the third channel 103A is downwardly extended from the first flow controlling side 100A of the first flow controlling element 10A; wherein the fourth channel 104A is downwardly extended from the first flow controlling side 100A of the first flow controlling element 10A; wherein the fifth channel 105A is downwardly extended from the first flow controlling side 100A of the first flow controlling element 10A; wherein the ninth channel 109A is extended upwardly from the second flow controlling side 200A of the bottom end 211A of the second flow controlling body 21A and extended from the second middle portion 2113A of the second flow controlling body 21A to the second edge portion 2112A and defines a ninth opening 1091A communicated with outer space thereof; wherein the tenth channel 1010A is extended upwardly from the second flow controlling side 200A of the bottom end 211A of the second flow controlling body 21A to the upper end 212A and extended from second middle portion 2113A of the bottom end 211A of the second flow controlling body 21A to the second edge portion 2112A; wherein the eleventh channel 1011A is extended upwardly from the second flow controlling side 200A of the bottom end 211A of the second flow controlling body 21A and penetrates through the second flow controlling body 21A of the second flow controlling element 20A. In other words, the ninth opening 1091A of the ninth channel 109A is provided to keep being communicated with an outer space, especially the outer space of the second flow controlling element 20A. Preferably, the first channel 101A, the second channel 102A, the third channel 103A, the fourth channel 104A and the fifth channel 105A are respectively extended from the first middle portion 1113A of the top end 111A of the first flow controlling body 11A to the first edge portion 1112A of the top end 111A; the eleventh channel 1011A is extended upwardly from the second edge portion 2112A of the bottom end 211A of the second flow controlling body 21A.

As shown in FIG. 192A to FIG. 192E, the second flow controlling element 20A is able to rotate relative to the first flow controlling element 10A so that the flow control apparatus has a first working state, a second working state, a third working state, a fourth working state, and a fifth working state, wherein when the flow control apparatus is in the first working state, the ninth channel 109A is communicated with the first channel 101A, wherein the tenth channel 1010A is communicated with the third channel 103A and the second channel 102A; wherein when the flow control apparatus is in the second working state, the ninth channel 109A is communicated with the second channel 102A, and the eleventh channel 1011A is communicated with the first channel 101A; wherein when the flow control apparatus is in the third working state, the ninth channel 109A is communicated with the fourth channel 104A, the tenth channel 1010A is communicated with the second channel 102A and the fifth channel 105A, the eleventh channel 1011A is communicated with the first channel 101A; wherein when the flow control apparatus is in the fourth working state, the ninth channel 109A is communicated with the fifth channel 105A; wherein when the flow control apparatus is in the fifth working state, the ninth channel 109A of the flow control apparatus is communicated with the first channel 101A, and the eleventh channel 1011A is communicated with the second channel 102A.

Preferably, when the flow control apparatus is in the first working state, the eleventh channel 1011A is communicated with the fifth channel 105A; when the flow control apparatus is in the second working state, the tenth channel 1010A is communicated with the first channel 101A; when the flow control apparatus is in the fourth working state, the tenth channel 1010A is communicated with the first channel 101A, and the eleventh channel 1011A is communicated with the third channel 103A; when the flow control apparatus is in the fifth working state, the tenth channel 1010A is communicated with the third channel 103A and the fourth channel 104A.

Preferably, when the flow control apparatus is in the first working state, the fourth channel 104A is blocked by the second flow controlling element 20A; when the flow control apparatus is in second working state, the third channel 103A, the fourth channel 104A and the fifth channel 105A are blocked by the second flow controlling element 20A; when the flow control apparatus is in the third working state, the third channel 103A is blocked by the second flow controlling element 20A; when the flow control apparatus is in fourth working state, the second channel 102A and the fourth channel 104A are blocked by the second flow controlling element 20A; when the flow control apparatus is in the fifth working state, the fifth channel 105A is blocked by the second flow controlling element 20A.

It is worth mentioning that the first channel 101A, the second channel 102A, the third channel 103A, the fourth channel 104A and the fifth channel 105A of the flow control apparatus are respectively and spacedly provided in the first flow controlling body 11A of the first flow controlling element 10A; the ninth channel 109A, the tenth channel 1010A and the eleventh channel 1011A are respectively and spacedly provided in the second flow controlling body 21A of the second flow controlling element 20A.

As shown in FIG. 192F, the flow control apparatus further has a standby working state, wherein when the flow control apparatus is in the standby working state, the ninth channel 109A of the flow control apparatus is not communicated with the first channel 101A, the second channel 102A, the third channel 103A, the fourth channel 104A and the fifth channel 105A of the flow control apparatus.

Alternatively, each of the first flow controlling side 100A of the first flow controlling body 11A of the first flow controlling element 10A and the second flow controlling side 200A of the second flow controlling body 21A of the second flow controlling element 20A is circular-shaped, wherein the first channel 101A, the second channel 102A, the third channel 103A, the fourth channel 104A and the fifth channel 105A are radially provided in the first flow controlling side 100A of the first flow controlling element 10A, and the ninth channel 109A, the tenth channel 1010A and the eleventh channel 1011A are respectively and radially provided in the second flow controlling side 200A of the second flow controlling element 20A.

As shown in FIG. 191A and FIG. 191B, the first channel 101A, the fifth channel 105A, the second channel 102A, the third channel 103A and the fourth channel 104A of the flow control apparatus are arranged clockwise in the first flow controlling body 11A of the first flow controlling element 10A in the order thereof; the ninth channel 109A, the eleventh channel 1011A and the tenth channel 1010A of the flow control apparatus are arranged clockwise in the second flow controlling body 21A of the second flow controlling element 20A in the order thereof.

Alternatively, the first channel 101A, the fifth channel 105A, the second channel 102A, the third channel 103A and the fourth channel 104A of the flow control apparatus are arranged counter-clockwise in the first flow controlling body 11A of the first flow controlling element 10A in the order thereof; the ninth channel 109A, the eleventh channel 1011A and the tenth channel 1010A of the flow control apparatus are arranged counter-clockwise in the second flow controlling body 21A of the second flow controlling element 20A in the order thereof.

As shown in FIG. 191A and FIG. 191B, wherein the first flow controlling side 100A of the first flow controlling element 10A of the flow control apparatus has a center section 1000A shown by a chain line, wherein the center section 1000A is provided in the first center portion 1111A of the top end 111A of the first flow controlling body 11A of the first flow controlling element 10A, wherein the remaining portion of the first flow controlling side 100A is clockwise and evenly divided into a first section 1001A, a second section 1002A, a third section 1003A, a fourth section 1004A, a fifth section 1005A, a sixth section 1006A, a seventh section 1007A, an eighth section 1008A and a ninth section 1009A, as shown by chain lines; wherein the second flow controlling side 200A of the second flow controlling element 20A of the flow control apparatus has a center division 2000A, wherein the center division 2000A is provided in the second center portion 2111A of the bottom end 211A of the second flow controlling body 21A of the second flow controlling element 20A, wherein the remaining portion of the second flow controlling side 200A is clockwise and evenly divided into a first division 2001A, a second division 2002A, a third division 2003A, a fourth division 2004A, a fifth division 2005A, a sixth division 2006A, a seventh division 2007A, an eighth division 2008A and a ninth division 2009A; wherein the first channel 101A is downwardly extended from the first section 1001A, the second section 1002A and the third section 1003A of the first flow controlling side 100A; the fifth channel 105A is downwardly extended from the fifth section 1005A of the first flow controlling side 100A; the second channel 102A is downwardly extended from the sixth section 1006A and the seventh section 1007A of the first flow controlling side 100A; the third channel 103A is downwardly extended from the eighth section 1008A of the first flow controlling side 100A; the fourth channel 104A is downwardly extended from the ninth section 1009A of the first flow controlling side 100A; the ninth channel 109A is upwardly extended from the first division 2001A of the second flow controlling side 200A; the eleventh channel 1011A is upwardly extended from the fourth division 2004A of the second flow controlling side 200A; the tenth channel 1010A is upwardly extended from the sixth division 2006A and the seventh division 2007A of the second flow controlling side 200A.

As shown in FIG. 190, the flow control apparatus further comprises a casing 30A according to the thirtieth embodiment of the present disclosure, wherein the casing 30 A comprises a casing body 31A, wherein the casing body 31A defines an inner chamber 300A and has an outer side wall 312A and an inner side wall 311A, wherein the first flow controlling element 10A is adapted for being provided in the inner chamber 300A and the first flow controlling side 100A of the first flow controlling element 10A is provided to face up, wherein the first flow controlling body 11A of the first flow controlling element 10A further comprises a lower end 112A downwardly extended from the top end 111A, wherein the lower end 112A of the first flow controlling body 11A of the first flow controlling element 10A is connected with the inner side wall 311A of the casing body 31A of the casing 30A and divides spacedly the inner chamber 300A into a first receiving chamber 3001A and a second receiving chamber 3002A, wherein the second flow controlling element 20A is adapted for being provided in the first inner chamber 300A and the second flow controlling element 20A is adapted for being provided in the receiving chamber 3001A and the second flow controlling side 200A of the second flow controlling element 20A is provided to face down, wherein the casing 30A has a first opening 301A, a second opening 302A, a third opening 303A and a fourth opening 304A, wherein the first receiving chamber 3001A is respectively communicated with the first opening 301A and the ninth opening 1091A of the ninth channel 109A; the second opening 302A is communicated with the third channel 103A of the flow control apparatus; the third opening 303A is communicated with the fourth channel 104A of the flow control apparatus; the fourth opening 304A is communicated with the fifth channel 105A of the flow control apparatus. Preferably, the first receiving chamber 3001A is respectively communicated with the first opening 301A and the ninth opening 1091A of the ninth channel 109A.

As shown in FIG. 190, the flow control apparatus further comprises a flow separating element 40A provided in second receiving chamber 3002A and extended downwardly form the first flow controlling body 11A, wherein the flow separating element 40A has a second flow guiding chamber 402A communicated with the second channel 102A of the flow control apparatus and the flow separating element 40A and the inner side wall 311A of the casing 30A define a first flow guiding chamber 401A therebetween, wherein the first flow guiding chamber 401A is communicated with the first channel 101A.

As shown in FIG. 190, the flow control apparatus further comprises a flow guiding element 50A, wherein the flow guiding element 50A comprises a flow guiding body 51A, wherein the flow guiding body 51A defines a first flow guiding channel 510A, wherein the flow guiding body 51A of the flow guiding element 50A is upwardly extended from the second flow controlling body 21A of the second flow controlling element 20A and the first flow guiding channel 510A of the first flow guiding element 50A is communicated with the eleventh channel 1011A of the flow control apparatus.

As shown in FIG. 190, FIG. 191A to FIG. 191G, the flow control apparatus further comprises a wear-resistant member 60A detachably provided between the first flow controlling element 10A and the second flow controlling element 20A, wherein the wear-resistant member 60A comprises a wear-resistant body 61A, wherein the wear-resistant body 61A has a wear-resistant side 610A adapted for contacting physically with the second flow controlling side 200A of the second flow controlling body 21A, wherein the wear-resistant side 610A is treated by a wear-resistant process to minimize the force of friction, which is resulted from the rotating of the first flow controlling body 11A of the first flow controlling element 10A relative to the second flow controlling body 21A of the second flow controlling element 20A so as to prolong the life-span of the flow control apparatus. The wear-resistant member 60A is further sized and shaped to match the first flow controlling side 100A of the first flow controlling element 10A and the wear-resistant body 61A of the wear-resistant member 60A defines spacedly a first port 601A, a second port 602A, a third port 603A, a fourth port 604A and a fifth port 605A, wherein the first port 601A, the second port 602A, the third port 603A, the fourth port 604A and the fifth port 605A are respectively sized and shaped to match the first channel 101A, the second channel 102A, the third channel 103A, the fourth channel 104A and the fifth channel 105A of the flow control apparatus. More preferably, the wear-resistant side 610A of the wear-resistant member 60A is treated by a smoothing process to minimize the roughness thereof.

It is worth mentioning that when the flow control apparatus further comprises a twelfth channel 1012A provided in the first center portion 1111A of the top end 111A of the first flow controlling body 11A of the first flow controlling element 10A, the wear-resistant member 60A further has a twelfth port 6012 corresponding to the twelfth channel 1012A, as shown in FIG. 191G.

As shown in FIG. 193, the flow control apparatus further comprises an injector 70A, wherein the injector 70A is provided in the outer side wall 312A of the casing body 31A of the casing 30A of the flow control apparatus, wherein the injector is respectively communicated with the third opening 303A and the fourth opening 304A of the casing 30A.

As shown in FIG. 190, the flow control apparatus further comprises an auxiliary unit 80A, wherein the auxiliary unit 80A comprises a driving element 81A upwardly extended from the second flow controlling body 21A of the second flow controlling element 20A, wherein the driving element 81A is adapted for driving the second flow controlling body 21A of the second flow controlling element 20A of the flow control apparatus to rotate relative to the first flow controlling body 11A of the first flow controlling element 10A. The auxiliary unit 80A further comprises a fixing element 82A extended upwardly from the driving element 81A, wherein the fixing element 82A is adapted for holding the driving element 81A at a position to hold the second flow controlling body 21A of the second flow controlling element 20A at a position. Preferably, the driving element 81A of the auxiliary unit 80A of the flow control apparatus is integrated with the flow guiding body 51A of the flow guiding element 50A.

An alternative of the flow control apparatus according to the thirtieth embodiment of the present disclosure is shown in FIG. 191E and FIG. 191F, the first flow controlling body 11A of the flow control apparatus further comprises a first center portion 1111A, a first edge portion 1112A and a first middle portion 1113A extended between the first center portion 1111A and the first edge portion 1112A, wherein the flow control apparatus further comprises a twelfth channel 1012A provided in the first center portion 1111A of the top end 111A of the first flow controlling body 11A of the first flow controlling element 10A, and the eleventh channel 1011A is extended upwardly from the second flow controlling side 200A of the bottom end 211A of the second flow controlling body 21A to the upper end 212A and extended from the second center portion 2111A of the second flow controlling element 20A to the second edge portion 2112A thereof. Preferably, the center section 1000A of the first flow controlling side 100A is provided in the first center portion 1111A of the top end 111A of the first flow controlling body 11A of the first flow controlling element 10A, and the tenth channel 1010A is upwardly extended from the sixth division 2006A and the seventh division 2007A of the second flow controlling side 200A; the eleventh channel 1011A is upwardly extended from the fourth division 2004A and the center division 2000A of the second flow controlling side 200A. Preferably, the third channel 103A is downwardly and outwardly extended from the first flow controlling side 100A of the first flow controlling element 10A; the fourth channel 104A is downwardly and outwardly extended from the first flow controlling side 100A of the first flow controlling element 10A and the fifth channel 105A is downwardly and outwardly extended from the first flow controlling side 100A of the first flow controlling element 10A.

Referring to FIG. 193, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90A, wherein the water treatment device 90A comprises a water treatment container 91A, a liquid collecting unit 92A and a water treatment unit 93A, wherein the water treatment container 91A has a water treatment chamber 900A and an upper opening 910A, the liquid collecting unit 92A comprises a central pipe 921A, the water treatment unit 93A is adapted for being received in the water treatment chamber 900A, the central pipe 921A is adapted for being extended downwardly through the upper opening 910A to enter into the water treatment chamber 900A, and the central pipe 921A and the upper opening 910A defines an outer opening 9101A, wherein the central pipe 921A has an upper opening 9211A and a lower opening 9212A, wherein the liquid in the water treatment container 91A, such as water, is adapted for being treated by the water treatment unit 93A and flows from the lower opening 9212A of the central pipe 921A of the liquid collecting unit 92A into the central pipe 921A and flows out of the central pipe 921A; preferably, the water treatment unit 93A provided in the water treatment container 91A comprises water treatment material, such as softening resin, activated carbon or the like, or the combination thereof.

It is worth mentioning that the outer opening 9101A of the water treatment device 90A of the water treatment system may be communicated with the first channel 101A or the second channel 102A of the flow control apparatus, the upper opening 9211A of the central pipe 921A of the liquid collecting unit 92A of the water treatment device 90A may be communicated with the first channel 101A or the second channel 102A of the flow control apparatus; wherein when the outer opening 9101A of the water treatment device 90A is communicated with the first channel 101A of the flow control apparatus, the upper opening 9211A of the central pipe 921A of the liquid collecting unit 92A of the water treatment device 90A is communicated with the second channel 102A of the flow control apparatus; when the outer opening 9101A of the water treatment device 90A of the water treatment system is communicated with the second channel 102A of the flow control apparatus, the upper opening 9211A of the central pipe 921A of the liquid collecting unit 92A of the water treatment device 90A is communicated with the first channel 101A of the flow control apparatus.

As shown in FIG. 193, the flow control apparatus further comprises a brine supply container 84A, wherein the injector 70A may be communicated with the brine supply container 84A, wherein when the flow control apparatus is under the third working state, the fluid from the third opening 303A may flow into the injector 70A and make the liquid in the brine supply container 84A flow into the fourth opening 304A of the casing 30A. Preferably, the outer opening 9101A of the water treatment device 90A of the water treatment system and the upper opening 9211A of the central pipe 921A of the water treatment device 90A are respectively adapted to be communicated with the first flow guiding chamber 401A and the second flow guiding chamber 402A of the flow control apparatus, wherein when the outer opening 9101A of the water treatment device 90A is communicated with the first flow guiding chamber 401A of the flow control apparatus, the upper opening 9211A of the central pipe 921A of the water treatment device 90A is communicated with the second flow guiding chamber 402A of the flow control apparatus, and when the flow control apparatus is under the third working state, the fluid from the brine supply container 84A can flow through the injector 70A and flow into the second channel 102A, and then flow into the water treatment container 91A via the second flow guiding chamber 402A and the central pipe 921A of the liquid collecting unit 92A of the water treatment device 90A.

And when the outer opening 9101A of the water treatment device 90A of the water treatment system is communicated with the second flow guiding chamber 402A of the flow control apparatus, the upper opening 9211A of the central pipe 921A of the water treatment device 90A is communicated with the first flow guiding chamber 401A of the flow control apparatus, and when the flow control apparatus is under the third working state, the fluid from the brine supply container 84A can flow through the injector 70A and flow into the second channel 102A, and then flow into the water treatment container 91A via the second flow guiding chamber 402A and the outer opening 9101A of the water treatment device 90A. In other words, when the outer opening 9101A of the water treatment device 90A is communicated with the first flow guiding chamber 401A and the upper opening 9211A of the central pipe 921A of the water treatment device 90A is communicated with the second flow guiding chamber 402A, the fluid from the brine supply container 84A can flow through the water treatment unit 93A from bottom to top; and when the outer opening 9101A of the water treatment device 90A is communicated with the second flow guiding chamber 402A of the flow control apparatus and the upper opening 9211A of the central pipe 921A of the water treatment device 90A is communicated with the first flow guiding chamber 401A of the flow control apparatus, the fluid from the brine supply container 84A can flow through the water treatment unit 93A from top to bottom. Preferably, the liquid in the brine supply container 84A is regeneration solution for the water treatment unit 93A of the water treatment device 90A, so by controlling the communicating type that the outer opening 9101A and the upper opening 9211A of the central pipe 921A of the water treatment device 90A are communicated with the flow control apparatus to control the regeneration solution from the brine supply container 84A of the water treatment unit 93A to regenerate and elute the water treatment unit 93A.

It is worth mentioning that when the flow control apparatus is under the second working state, the ninth channel 109A is communicated with the second channel 102A and the eleventh channel 1011A is communicated with the first channel 101A such that the waste water from the water treatment container 91A of the water treatment device 90A is able to be drained via the eleventh channel 1011A; when the flow control apparatus is under the third working state, the ninth channel 109A is communicated with the fourth channel 104A, the tenth channel 1010A is communicated with the second channel 102A and the fifth channel 105A, the eleventh channel 1011A is communicated with the first channel 101A such that the waste water from the water treatment container 91A of the water treatment device 90A is able to be drained via the eleventh channel 1011A; when the flow control apparatus is under the fifth working state, the ninth channel 109A of the flow control apparatus is communicated with the first channel 101A, and the eleventh channel 1011A is communicated with the second channel 102A such that the waste water from the water treatment container 91A of the water treatment device 90A is able to be drained via the eleventh channel 1011A. So the waste water from the water treatment system may be upwardly drained via the eleventh channel 1011A such that the eleventh channel 1011A for drainage does not reduce the sizes of the first channel 101A, the second channel 102A, the third channel 103A, the fourth channel 104A and the fifth channel 105A of the flow control apparatus and decreases the interference resulted from the first channel 101A, the second channel 102A, the third channel 103A, the fourth channel 104A and the fifth channel 105A provided in the first flow controlling body 11A of the first flow controlling element 10A. In other words, because the eleventh channel 1011A upwardly penetrates through the second flow controlling body 21A of the second flow controlling element 20A, so the waste water from the water treatment system may flow through the eleventh channel 1011A and flow upwardly into the flow guiding element 50A to be drained via the first flow guiding channel 510A of the flow guiding element 50A.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93A from bottom to top; when the flow control apparatus is under the third working state, the water treatment system can make the solution in the brine supply container 84A flow into the water treatment container 91A via the central pipe 921A; when the flow control apparatus is under the fourth working state, the water treatment system can supplement water into the brine supply container 84A; when the flow control apparatus is under the fifth working state, the water treatment system stops working and is in a standby working state.

Alternatively, an alternative of the second flow controlling element 20A according to the thirtieth embodiment of the present disclosure, a second flow controlling element 20A1 is shown in FIG. 191C, FIG. 192G and FIG. 192H, wherein the ninth channel 109A1 of the second flow controlling element 20A1 is upwardly extended from the first division 2001A and the ninth division 2009A of the second flow controlling side 200A, and when the flow control apparatus is under the third working state, the ninth channel 109A1 of the flow control apparatus is communicated with the third channel 103A and the fourth channel 104A such that when the water treatment system of the present disclosure supplements water into the brine supply container 84, the water treatment system can provides water from the first opening 301 of the flow control apparatus; when the flow control apparatus is under the first working state, the ninth channel 109A1 of the flow control apparatus is communicated with the first channel 101A and the ninth channel 109A1 of the second flow controlling element 20A1 is provided in the first division 2001A and the ninth division 2009A of the second flow controlling side 200A such that when the flow control apparatus of the water treatment system of the present disclosure is under the first working state, the overlapping between the ninth channel 109A1 and the first channel 101A is increased and provides a higher rate of treated water flow.

As shown in FIG. 193 is an operation schematic diagram of the water treatment system installed with the flow control apparatus of the present disclosure, as shown in FIG. 192A, when the flow control apparatus is under the first working state, the water treatment system is in a water treating state, raw water (water to be processed) may flow from the first opening 301A of the casing 30A of the flow control apparatus into the ninth channel 109A and the first channel 101A, and then flow through the outer opening 9101A of the water treatment system and flow into the water treatment chamber 900A of the water treatment system, and then flow upwardly into the second channel 102A and the third channel 103A of the flow control apparatus via the central pipe 921A of the liquid collecting unit 92A of the water treatment system, and then flow out through the second opening 302A of the casing 30A of the flow control apparatus; as shown in FIG. 192B, when the flow control apparatus is under the second working state, the water treatment system is in a backwash state, raw water (water to be processed) may flow from the first opening 301A of the casing 30A of the flow control apparatus into the ninth channel 109A and the second channel 102A, and then flow through the upper opening 9211A of the central pipe 921A of the water treatment system and flow through the water treatment chamber 900A of the water treatment system from bottom to top, and then flow into the first channel 101A of the flow control apparatus via the outer opening 9101A of the water treatment system, and then flow out through the eleventh channel 1011A and the first flow guiding channel 510A; as shown in FIG. 192C, when the flow control apparatus is under the third working state, the water treatment system is in an upflow brine intaking state, raw water (water to be processed) may flow from the first opening 301A of the casing 30A of the flow control apparatus into the ninth channel 109A and the fourth channel 104A, and then flow through the third opening 303A into the injector to be injected, and after being mixed with the liquid from the brine supply container 84A, the mixture may flow into the fourth opening 304A, and then flow through the second channel 102A via the fifth channel 105A, and then flow through the water treatment chamber 900A from bottom to top via the upper opening 9211A of the central pipe of the water treatment system, and then flow into the first channel 101A via the outer opening 9101A of the water treatment system, at last flow out through the eleventh channel 1011A and the first flow guiding channel 510A; as shown in FIG. 192D, when the flow control apparatus is under the fourth working state, the water treatment system is in a water supplement state, raw water (water to be processed) may flow from the first opening 301A of the casing 30A of the flow control apparatus into the ninth channel 109A and the fifth channel 105A, and then flow into the injector via the fourth opening 304A to supplement water into the brine supply container 84A. As shown in FIG. 192E, when the flow control apparatus is under the fifth working state, the water treatment system is in a forwardwash state, raw water (water to be processed) may flow from the first opening 301A of the casing 30A of the flow control apparatus into the ninth channel 109A and the first channel 101A, and then flow into the water treatment chamber 900A via the outer opening 9101A of the water treatment system and flow upwardly into the second channel 102A via the central pipe 921A of the liquid collecting unit 92A of the water treatment system, and then flow out through the eleventh channel 1011A and the first flow guiding channel 510A; as shown in FIG. 192F, when the flow control apparatus is under a standby working state, raw water (water to be processed) may flow from the first opening 301A of the casing 30A of the flow control apparatus, but the water flow cannot flow into the first flow control element 10A.

The flow control apparatus of the present embodiment may comprise nine equal divisions and the first channel may cover three equal divisions and increase the rate of inflow in different working states; and employs a technical solution of upflow brine intaking and regeneration achieving a higher regeneration efficiency than downflow brine intaking and regeneration among domestic small-capacity water softeners using softening resin as treating material and brine as regenerating agent, and it can save brine; and the ninth channel of the second flow controlling element 20 can be provided to cover two equal divisions, which is very special and greatly increases the rate of inflow, and the flow control apparatus is so designed so that when the water treatment system is under a water supplement working state, the water treatment system can provide raw water.

Referring to FIG. 194 to FIG. 196B of the drawings of the present disclosure, a flow control apparatus according to a thirty-first preferred embodiment of the present disclosure is illustrated, which is adapted for being used for controlling fluid to flow in multiple directions, wherein the flow control apparatus comprises a first flow controlling element 10*m* and a second flow controlling element 20*m* provided rotatably on the first flow controlling element 10*m*, wherein the first flow controlling element 10*m* comprises a first flow controlling body 11*m*, wherein the first flow controlling body 11*m* comprises a top end 111*m*, wherein the top end 111*m* defines a first flow controlling side 100*m*; wherein the second flow controlling element 20*m* comprises a second flow controlling body 21*m*, wherein the second flow controlling body 21*m* comprises a bottom end 211*m* and an upper end 212*m* upwardly extended from the bottom, wherein the bottom end 211*m* defines a second flow controlling side 200*m*, wherein the first flow controlling side 100*m* of the first flow controlling element 10*m* is adapted for contacting physically with the second flow controlling side 200*m* of the second flow controlling element 20*m*.

As shown in FIG. 195 to FIG. 196B, the top end 111*m* of the first flow controlling element 10*m* of the flow control apparatus further comprises a first center portion 1111*m*, a first edge portion 1112*m* and a first middle portion 1113*m* extended between the first center portion 1111*m* and the first edge portion 1112*m*, wherein the bottom end 211*m* of the second flow controlling body 21*m* of the second flow controlling element 20*m* further comprises a second center portion 2111*m*, a second edge portion 2112*m* and a second middle portion 2113*m* extended between the second center portion 2111*m* and the second edge portion 2112*m*, wherein the flow control apparatus has a first channel 101*m*, a second channel 102*m*, a third channel 103*m*, a fourth channel 104*m*, a fifth channel 105*m* and a sixth channel 106*m* provided in the first flow controlling body 11*m* of the first flow controlling element 10*m*, and wherein the flow control apparatus further has a ninth channel 109*m*, a tenth channel 1010*m* and an eleventh channel 1011*m* provided in the bottom end 211*m* of the second flow controlling body 21*m* of the second flow controlling element 20*m*, wherein the first channel 101*m* is downwardly extended from the first flow controlling side 100*m* of the first flow controlling element 10*m*; wherein the second channel 102*m* is downwardly extended from the first flow controlling side 100*m* of the first flow controlling element 10*m*; wherein the third channel 103*m* is downwardly extended from the first flow controlling side 100*m* of the first flow controlling element 10*m*; wherein the fourth channel 104*m* is downwardly extended from the first flow controlling side 100*m* of the first flow controlling element 10*m*; wherein the fifth channel 105*m* is downwardly extended from the first flow controlling side 100*m* of the first flow controlling element 10*m*; wherein the sixth channel 106*m* is downwardly extended from the first flow controlling side 100*m* of the first flow controlling element 10*m*; wherein the ninth channel 109*m* is extended upwardly from the second flow controlling side 200*m* of the bottom end 211*m* of the second flow controlling body 21*m* and extended from the second middle portion 2113*m* of the second flow controlling body 21*m* to the second edge portion 2112*m* and defines a ninth opening 1091*m* communicated with outer space thereof; wherein the tenth channel 1010*m* is extended upwardly from the second flow controlling side 200*m* of the bottom end 211*m* of the second flow controlling body 21*m* and extended from second middle portion 2113*m* of the bottom end 211*m* of the second flow controlling body 21*m* to the second edge portion 2112*m*; wherein the eleventh channel 1011*m* is extended upwardly from the second flow controlling side 200*m* of the bottom end 211*m* of the second flow controlling body 21*m* and penetrates through the second flow controlling body 21*m* of the second flow controlling element 20*m*. In other words, the ninth opening 1091*m* of the ninth channel 109*m* is provided to keep being communicated with an outer space, especially the outer space of the second flow controlling element 20*m*. Preferably, the first channel 101*m*, the second channel 102*m*, the third channel 103*m*, the fourth channel 104*m*, the fifth channel 105*m* and the sixth channel 106*m* are respectively provided in the first middle portion 1113*m* of the top end 111*m* of the first flow controlling body 11*m*; the tenth channel 1010*m* is extended from the second middle portion 2113*m* of the bottom end 211*m* of the second flow controlling body 21*m* to the second edge portion 2112*m* of the bottom end 211*m*; the eleventh channel 1011*m* is extended upwardly from the second edge portion 2112*m* of the bottom end 211*m*.

As shown in FIG. 197A to FIG. 197E, the second flow controlling element 20*m* is able to rotate relative to the first flow controlling element 10*m* so that the flow control apparatus has a first working state, a second working state, a third working state, a fourth working state, and a fifth working state, wherein when the flow control apparatus is in the first working state, the ninth channel 109*m* is communicated with the first channel 101*m*, wherein the tenth channel 1010*m* is communicated with the third channel 103*m* and the second channel 102*m*; wherein when the flow control apparatus is in the second working state, the ninth channel 109*m* is communicated with the second channel 102*m*, and the eleventh channel 1011*m* is communicated with the sixth channel 106*m*; wherein when the flow control apparatus is in the third working state, the ninth channel 109*m* is communicated with the fourth channel 104*m*, the tenth channel 1010*m* is communicated with the fifth channel 105*m* and the first channel 101*m*, the eleventh channel 1011*m* is communicated with the second channel 102*m*; wherein when the flow control apparatus is in the fourth working state, the ninth channel 109*m* is communicated with the fifth channel 105*m*; wherein when the flow control apparatus is in the fifth working state, the ninth channel 109*m* of the flow control apparatus is communicated with the sixth channel 106*m*, and the eleventh channel 1011*m* is communicated with the second channel 102*m*. Preferably, wherein when the flow control apparatus is in the first working state, the eleventh channel 1011*m* is communicated with the fourth channel 104*m*; wherein when the flow control apparatus is in the second working state, the tenth channel 1010*m* is communicated with the third channel 103*m*; wherein when the flow control apparatus is in the fourth working state, the tenth channel 1010*m* is communicated with the first channel 101*m* and the second channel 102*m*, and the eleventh channel 1011*m* is communicated with the third channel 103*m*; wherein when the flow control apparatus is in the fifth working state, the tenth channel 1010*m* is communicated with the first channel 101*m*.

Preferably, when the flow control apparatus is in the first working state, the fifth channel 105*m* and the sixth channel 106*m* is blocked by the second flow controlling element 20*m*; when the flow control apparatus is in second working state, the first channel 101*m*, the fourth channel 104*m* and the fifth channel 105*m* are blocked by the second flow controlling element 20*m*; when the flow control apparatus is in the third working state, the third channel 103*m* and the sixth channel 106*m* is blocked by the second flow controlling element 20*m*; when the flow control apparatus is in fourth working state, the fourth channel 104*m* and the sixth channel 106*m* is blocked by the second flow controlling element 20*m*; when the flow control apparatus is in the fifth working state, the third channel 103*m*, the fourth channel 104*m* and the fifth channel 105*m* are blocked by the second flow controlling element 20*m*.

It is worth mentioning that the first channel 101*m*, the second channel 102*m*, the third channel 103*m*, the fourth channel 104*m*, the fifth channel 105*m* and the sixth channel 106*m* of the flow control apparatus are respectively and spacedly provided in the first flow controlling body 11*m* of the first flow controlling element 10*m*; the ninth channel 109*m*, the tenth channel 1010*m* and the eleventh channel 1011*m* are respectively and spacedly provided in the second flow controlling body 21*m* of the second flow controlling element 20*m*.

Alternatively, each of the first flow controlling side 100*m* of the first flow controlling body 11*m* of the first flow controlling element 10*m* and the second flow controlling side 200*m* of the second flow controlling body 21*m* of the second flow controlling element 20*m* is circular-shaped, wherein the first channel 101*m*, the second channel 102*m*, the third channel 103*m*, the fourth channel 104*m*, the fifth channel 105*m* and the sixth channel 106*m* are respectively and radially provided in the first flow controlling side 100*m* of the first flow controlling element 10*m*, and the ninth channel 109*m*, the tenth channel 1010*m* and the eleventh channel 1011*m* are respectively and radially provided in the second flow controlling side 200*m* of the second flow controlling element 20*m*.

As shown in FIG. 196A and FIG. 196B, the first channel 101*m*, the fifth channel 105*m*, the sixth channel 106*m*, the fourth channel 104*m*, the third channel 103*m* and the second channel 102*m* of the flow control apparatus are arranged clockwise in the first flow controlling body 11*m* of the first flow controlling element 10*m* in the order thereof; the ninth channel 109*m*, the eleventh channel 1011*m* and the tenth channel 1010*m* of the flow control apparatus are arranged clockwise in the second flow controlling body 21*m* of the second flow controlling element 20*m* in the order thereof.

Alternatively, the first channel 101*m*, the fifth channel 105*m*, the sixth channel 106*m*, the fourth channel 104*m*, the third channel 103*m* and the second channel 102*m* of the flow control apparatus are arranged counter-clockwise in the first flow controlling body 11*m* of the first flow controlling element 10*m* in the order thereof; the ninth channel 109*m*, the eleventh channel 1011*m* and the tenth channel 1010*m* of the flow control apparatus are arranged counter-clockwise in the second flow controlling body 21*m* of the second flow controlling element 20*m* in the order thereof.

As shown in FIG. 196A to FIG. 196C, wherein the first flow controlling side 100*m* of the first flow controlling element 10*m* of the flow control apparatus has a center section 1000*m* shown by a chain line, wherein the center section 1000*m* is provided in the first center portion 1111*m* of the top end 111*m* of the first flow controlling body 11*m* of the first flow controlling element 10*m*, wherein the remaining portion of the first flow controlling side 100*m* is clockwise and evenly divided into a first section 1001*m*, a second section 1002*m*, a third section 1003*m*, a fourth section 1004*m*, a fifth section 1005*m*, a sixth section 1006*m*, a seventh section 1007*m*, an eighth section 1008*m* and a ninth section 1009*m*, as shown by chain lines; wherein the second flow controlling side 200*m* of the second flow controlling element 20*m* of the flow control apparatus has a center division 2000*m*, wherein the center division 2000*m* is provided in the second center portion 2111*m* of the bottom end 211*m* of the second flow controlling body 21*m* of the second flow controlling element 20*m*, wherein the remaining portion of the second flow controlling side 200*m* is clockwise and evenly divided into a first division 2001*m*, a second division 2002*m*, a third division 2003*m*, a fourth division 2004*m*, a fifth division 2005*m*, a sixth division 2006*m*, a seventh division 2007*m*, an eighth division 2008*m* and a ninth division 1009*m*; wherein the first channel 101*m* is downwardly extended from the first section 1001*m* and the second section 1002*m* of the first flow controlling side 100*m*; the fifth channel 105*m* is downwardly extended from the third section 1003*m* of the first flow controlling side 100*m*; the sixth channel 106*m* is downwardly extended from the fourth section 1004*m* of the first flow controlling side 100*m*; the fourth channel 104*m* is downwardly extended from the fifth section 1005*m* of the first flow controlling side 100*m*; the third channel 103*m* is downwardly extended from the sixth section 1006*m* and the seventh section 1007*m* of the first flow controlling side 100*m*; the second channel 102*m* is downwardly extended from the eighth section 1008*m* and the ninth section 1009*m* of the first flow controlling side 100*m*; the ninth channel 109*m* is upwardly extended from the first division 2001*m* of the second flow controlling side 200*m*; the eleventh channel 1011*m* is upwardly extended from the fifth division 2005*m* of the second flow controlling side 200*m*; the tenth channel 1010*m* is upwardly extended from the seventh division 2007*m* and the eighth division 2008*m* of the second flow controlling side 200*m* to the upper end 212*m*.

As shown in FIG. 195, the flow control apparatus further comprises a casing 30*m* according to the thirty-first embodiment of the present disclosure, wherein the casing 30 *m* comprises a casing body 31*m*, wherein the casing body 31*m* has an outer side wall 312*m* and an inner side wall 311*m* and defines an inner chamber 300*m*, wherein the first flow controlling element 10*m* is adapted for being provided in the inner chamber 300*m* and the first flow controlling side 100*m* of the first flow controlling element 10*m* is provided to face up, and the second flow controlling element 20*m* is adapted for being provided in the inner chamber 300*m* and the second flow controlling side 200*m* of the second flow controlling element 20*m* is provided to face down, wherein the first flow controlling body 11*m* of the first flow controlling element 10*m* further comprises a lower end 112*m* downwardly extended from the top end 111*m*, wherein the lower end 112*m* of the first flow controlling body 11*m* of the first flow controlling element 10*m* is connected with the inner side wall 311*m* of the casing body 31*m* of the casing 30*m* and divides spacedly the inner chamber 300*m* into a first receiving chamber 3001*m* and a second receiving chamber 3002*m*, wherein the casing 30*m* has a first opening 301*m*, a second opening 302*m*, a third opening 303*m* and a fourth opening 304*m*, wherein the first receiving chamber 3001*m* is respectively communicated with the first opening 301*m* and the ninth channel 109*m*; the second opening 302*m* is communicated with the third channel 103*m* of the flow control apparatus; the third opening 303*m* is communicated with the fourth channel 104*m* of the flow control apparatus; the fourth opening 304*m* is communicated with the fifth channel 105*m* of the flow control apparatus. Preferably, the first receiving chamber 3,001*m* is respectively communicated with the first opening 301*m* and the ninth opening 1091*m* of the ninth channel 109*m*.

As shown in FIG. 195, the flow control apparatus further comprises a flow separating element 40*m* provided in the second receiving chamber 3002*m* and extended downwardly form the first flow controlling body 11*m*, wherein the flow separating element 40*m* has a second flow guiding chamber 402*m* communicated with the second channel 102*m* of the flow control apparatus and the flow separating element 40*m* and the inner side wall 311*m* of the casing 30*m* define a first flow guiding chamber 401*m* therebetween, wherein the first flow guiding chamber 401*m* is communicated with the first channel 101*m* and the sixth channel 106*m*.

As shown in FIG. 195, the flow control apparatus further comprises a flow guiding element 50*m*, wherein the flow guiding element 50*m* comprises a flow guiding body 51*m*, wherein the flow guiding body 51*m* defines a first flow guiding channel 510*m*, wherein the flow guiding body 51*m* of the flow guiding element 50*m* is upwardly extended from the second flow controlling body 21*m* of the second flow controlling element 20*m* and the first flow guiding channel 510*m* of the first flow guiding element 50*m* is communicated with the eleventh channel 1011*m* of the flow control apparatus.

As shown in FIG. 195 and FIG. 196C, the flow control apparatus further comprises a wear-resistant member 60*m* detachably provided between the first flow controlling element 10*m* and the second flow controlling element 20*m*, wherein the wear-resistant member 60*m* comprises a wear-resistant body 61*m*, wherein the wear-resistant body 61*m* has a wear-resistant side 610*m* adapted for contacting physically with the second flow controlling side 200*m* of the second flow controlling body 21*m*, wherein the wear-resistant side 610*m* is treated by a wear-resistant process to minimize the force of friction, which is resulted from the rotating of the first flow controlling body 11*m* of the first flow controlling element 10*m* relative to the second flow controlling body 21*m* of the second flow controlling element 20*m* so as to prolong the life-span of the flow control apparatus. The wear-resistant member 60*m* is further sized and shaped to match the first flow controlling side 100*m* of the first flow controlling element 10*m* and the wear-resistant body 61*m* of the wear-resistant member 60*m* defines spacedly a first port 601*m*, a second port 602*m*, a third port 603*m*, a fourth port 604*m*, a fifth port 605*m* and a sixth port 606*m*, wherein the first port 601*m*, the second port 602*m*, the third port 603*m*, the fourth port 604*m*, the fifth port 605*m* and the sixth port 606*m* are respectively sized and shaped to match the first channel 101*m*, the second channel 102*m*, the third channel 103*m*, the fourth channel 104*m*, the fifth channel 105*m* and the sixth channel 106*m* of the flow control apparatus.

It is worth mentioning that when the flow control apparatus further comprises a twelfth channel 1012*m* provided in the first center portion 1111*m* of the top end 111*m* of the first flow controlling body 11*m* of the first flow controlling element 10*m*, the wear-resistant member 60*m* further has a twelfth port 6012*m* corresponding to the twelfth channel 1012*m*, as shown in FIG. 196F.

As shown in FIG. 198, the flow control apparatus further comprises an injector 70*m*, wherein the injector 70A is provided in the outer side wall 312*m* of the casing body 31*m* of the casing 30*m* of the flow control apparatus, wherein the injector is respectively communicated with the third opening 303*m* and the fourth opening 304*m* of the casing 30*m*.

As shown in FIG. 195, the flow control apparatus further comprises an auxiliary unit 80*m*, wherein the auxiliary unit 80*m* comprises a driving element 81*m* upwardly extended from the second flow controlling body 21*m* of the second flow controlling element 20*m*, wherein the driving element 81*m* is adapted for driving the second flow controlling body 21*m* of the second flow controlling element 20*m* of the flow control apparatus to rotate relative to the first flow controlling body 11*m* of the first flow controlling element 10*m*. The auxiliary unit 80*m* further comprises a fixing element 82*m* extended upwardly from the driving element 81*m*, wherein the fixing element 82*m* is adapted for holding the driving element 81*m* at a position to hold the second flow controlling body 21*m* of the second flow controlling element 20*m* at a position. Preferably, the driving element 81*m* of the auxiliary unit 80*m* of the flow control apparatus is integrated with the flow guiding body 51*m* of the flow guiding element 50*m*.

An alternative of the flow control apparatus according to the thirty-first embodiment of the present disclosure is shown in FIG. 196D and FIG. 196E, wherein the first flow controlling body 11*m* of the flow control apparatus further comprises a first center portion 1111*m*, a first edge portion 1112*m* and a first middle portion 1113*m* extended between the first center portion 1111*m* and the first edge portion 1112*m*, wherein the flow control apparatus further comprises a twelfth channel 1012*m* provided in the first center portion 1111*m* of the top end 111*m* of the first flow controlling body 11*m* of the first flow controlling element 10*m*, and the eleventh channel 1011*m* is extended upwardly from the second flow controlling side 200*m* of the bottom end 212*m* of the second flow controlling body 21*m* to the upper end 212*m* and extended from the second center portion 2111*m* of the second flow controlling element 20*m* to the second edge portion 2112*m* thereof. Preferably, the center section 1000*m* of the first flow controlling side 100*m* is provided in the first center portion 1111*m* of the top end 111*m* of the first flow controlling body 11*m* of the first flow controlling element 10*m*, and the eleventh channel 1011*m* is upwardly extended from the fifth division 2005*m* and the center division 2000*m* of the second flow controlling side 200*m*.

Referring to FIG. 198, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90*m*, wherein the water treatment device 90*m* comprises a water treatment container 91*m*, a liquid collecting unit 92*m* and a water treatment unit 93*m*, wherein the water treatment container 91*m* has a water treatment chamber 900*m* and an upper opening 910*m*, the liquid collecting unit 92*m* comprises a central pipe 921*m*, the water treatment unit 93*m* is adapted for being received in the water treatment chamber 900*m*, the central pipe 921*m* is adapted for being extended downwardly through the upper opening 910*m* to enter into the water treatment chamber 900*m*, and the central pipe 921*m* and the upper opening 910*m* defines an outer opening 9101*m*, wherein the central pipe 921*m* has an upper opening 9211*m* and a lower opening 9212*m*, wherein the liquid in the water treatment container 91*m*, such as water, is adapted for being treated by the water treatment unit 93*m* and flows from the lower opening 9212*m* of the central pipe 921*m* of the liquid collecting unit 92*m* into the central pipe 921*m* and flows out of the central pipe 921*m*; preferably, the water treatment unit 93*m* provided in the water treatment container 91*m* comprises water treatment material, such as softening resin, activated carbon or the like, or the combination thereof.

It is worth mentioning that the outer opening 9101*m* of the water treatment device 90*m* of the water treatment system may be communicated with the first channel 101*m* and the sixth channel 106*m* of the flow control apparatus, or the second channel 102*m* of the flow control apparatus, the upper opening 9211*m* of the central pipe 921*m* of the liquid collecting unit 92*m* of the water treatment device 90*m* may be communicated with the first channel 101*m* and the sixth channel 106*m* of the flow control apparatus, or the second channel 102*m* of the flow control apparatus; wherein when the outer opening 9101*m* of the water treatment device 90*m* is communicated with the first channel 101*m* and the sixth channel 106*m* of the flow control apparatus, the upper opening 9211*m* of the central pipe 921*m* of the liquid collecting unit 92*m* of the water treatment device 90*m* is communicated with the second channel 102*m* of the flow control apparatus; when the outer opening 9101*m* of the water treatment device 90*m* of the water treatment system is communicated with the second channel 102*m* of the flow control apparatus, the upper opening 9211*m* of the central pipe 921*m* of the liquid collecting unit 92*m* of the water treatment device 90*m* is communicated with the first channel 101*m* and the sixth channel 106*m* of the flow control apparatus.

As shown in FIG. 198, the flow control apparatus further comprises a brine supply container 84*m*, wherein the injector 70*m* may be communicated with the brine supply container 84*m*, wherein when the flow control apparatus is under the third working state, the fluid from the third opening 303*m* may flow into the injector 70*m* and make the liquid in the brine supply container 84*m* flow into the fourth opening 304*m* of the casing 30*m*. Preferably, the outer opening 9101*m* of the water treatment device 90*m* of the water treatment system and the upper opening 9211*m* of the central pipe 921*m* of the water treatment device 90*m* are respectively adapted to be communicated with the first flow guiding chamber 401*m* and the second flow guiding chamber 402*m* of the flow control apparatus, wherein when the outer opening 9101*m* of the water treatment device 90*m* is communicated with the first flow guiding chamber 401*m* of the flow control apparatus, the upper opening 9211*m* of the central pipe 921*m* of the water treatment device 90*m* is communicated with the second flow guiding chamber 402*m* of the flow control apparatus, and when the flow control apparatus is under the third working state, the fluid from the brine supply container 84*m* can flow through the injector 70*m* and flow into the first channel 101*m*, and then flow into the water treatment container 91*m* via the first flow guiding chamber 401*m* and the outer opening 9101*m* of the water treatment container 91*m* of the water treatment device 90*m*. And when the outer opening 9101*m* of the water treatment device 90*m* of the water treatment system is communicated with the second flow guiding chamber 402*m* of the flow control apparatus, the upper opening 9211*m* of the central pipe 921*m* of the water treatment device 90*m* is communicated with the first flow guiding chamber 401*m* of the flow control apparatus, and when the flow control apparatus is under the third working state, the fluid from the brine supply container 84*m* can flow through the injector 70*m* and flow into the first channel 101*m*, and then flow into the water treatment container 91*m* via the first flow guiding chamber 401*m* and the central pipe 921*m* of the water treatment device 90*m* of the water treatment system. In other words, when the outer opening 9, 101*m* of the water treatment device 90*m* is communicated with the first flow guiding chamber 401*m* of the flow control apparatus and the upper opening 9211*m* of the central pipe 921*m* of the water treatment device 90*m* is communicated with the second flow guiding chamber 402*m* of the flow control apparatus, the fluid from the brine supply container 84*m* can flow through the water treatment unit 93*m* from top to bottom; and when the outer opening 9101*m* of the water treatment device 90*m* is communicated with the second flow guiding chamber 402*m* of the flow control apparatus and the upper opening 9211*m* of the central pipe 921*m* of the water treatment device 90*m* is communicated with the first flow guiding chamber 401*m* of the flow control apparatus, the fluid from the brine supply container 84*m* can flow through the water treatment unit 93*m* from bottom to top. Preferably, the liquid in the brine supply container 84*m* is regeneration solution for the water treatment unit 93*m* of the water treatment device 90*m*, so by controlling the communicating type that the outer opening 9101*m* and the upper opening 9211*m* of the central pipe 921*m* of the water treatment device 90*m* are communicated with the flow control apparatus to control the regeneration solution from the brine supply container 84*m* of the water treatment unit 93*m* to regenerate and elute the water treatment unit 93*m*.

Similarly, when the outer opening 9101*m* of the water treatment device 90*m* is communicated with the second flow guiding chamber 402*m* and the upper opening 9211*m* of the central pipe 921*m* of the water treatment device 90*m* is communicated with the first flow guiding chamber 401*m*, and when the flow control apparatus is under the first working state and the liquid flows from the flow control apparatus into the water treatment container 91*m*, the liquid flows through the water treatment unit 93*m* from bottom to top.

It is worth mentioning that when the flow control apparatus is under the second working state, the ninth channel 109*m* is communicated with the second channel 102*m* and the eleventh channel 1011*m* is communicated with the sixth channel 106*m* such that the waste water from the water treatment container 91*m* of the water treatment device 90*m* is able to be drained upwardly via the eleventh channel 1011*m*; when the flow control apparatus is under the third working state, the ninth channel 109*m* is communicated with the fourth channel 104*m*, the tenth channel 1010*m* is communicated with the fifth channel 105*m* and the first channel 101*m*, the eleventh channel 1011*m* is communicated with the second channel 102*m* such that the waste water from the water treatment container 91*m* of the water treatment device 90*m* is able to be drained upwardly via the eleventh channel 1011*m*; when the flow control apparatus is under the fifth working state, the ninth channel 109*m* of the flow control apparatus is communicated with the sixth channel 106*m*, and the eleventh channel 1011*m* is communicated with the second channel 102*m* such that the waste water from the water treatment container 91*m* of the water treatment device 90*m* is able to be drained upwardly via the eleventh channel 1011*m*. So the waste water from the water treatment system may be upwardly drained via the eleventh channel 1011*m* such that the eleventh channel 1011*m* for drainage does not reduce the sizes of the first channel 101*m*, the second channel 102*m*, the third channel 103*m*, the fourth channel 104*m*, the fifth channel 105*m* and the sixth channel 106*m* of the flow control apparatus and decreases the interference resulted from the first channel 101*m*, the second channel 102*m*, the third channel 103*m*, the fourth channel 104*m*, the fifth channel 105*m* and the sixth channel 106*m* provided in the first flow controlling body 11*m* of the first flow controlling element 10*m*. In other words, because the eleventh channel 1011*m* upwardly penetrates through the second flow controlling body 21*m* of the second flow controlling element 20*m*, so the waste water from the water treatment system may flow through the eleventh channel 1011*m* and flow upwardly into the flow guiding element 50*m* to be drained via the first flow guiding channel 510*m* of the flow guiding element 50*m*.

As shown in FIG. 198 is an operation schematic diagram of the water treatment system installed with the flow control apparatus of the present disclosure, as shown in FIG. 197A, when the flow control apparatus is under the first working state, the water treatment system is in a water treating state, raw water (water to be processed) may flow from the first opening 301*m* of the casing 30*m* of the flow control apparatus into the ninth channel 109*m* and the first channel 101*m*, and then flow through the outer opening 9101*m* of the water treatment system and flow into the water treatment chamber 900*m* of the water treatment system, and then flow upwardly into the second channel 102*m* and the third channel 103*m* of the flow control apparatus via the central pipe 921*m* of the liquid collecting unit 92*m* of the water treatment system, and then flow out through the second opening 302*m* of the casing 30*m* of the flow control apparatus; as shown in FIG. 197B, when the flow control apparatus is under the second working state, the water treatment system is in a backwash state, raw water (water to be processed) may flow from the first opening 301*m* of the casing 30A of the flow control apparatus into the ninth channel 109*m* and the second channel 102*m*, and then flow through the upper opening 9211*m* of the central pipe 921A of the water treatment system and flow through the water treatment chamber 900*m* of the water treatment system from bottom to top, and then flow into the sixth channel 106*m* of the flow control apparatus via the outer opening 9101*m* of the water treatment system, and then flow out through the eleventh channel 1011*m* and the first flow guiding channel 510*m*; as shown in FIG. 197C, when the flow control apparatus is under the third working state, the water treatment system is in a downflow brine intaking state, raw water (water to be processed) may flow from the first opening 301*m* of the casing 30*m* of the flow control apparatus into the ninth channel 109*m* and the fourth channel 104*m*, and then flow through the third opening 303*m* into the injector 70*m* to be injected, and after being mixed with the liquid from the brine supply container 84*m*, the mixture may flow into the fourth opening 304*m*, and then flow through the first channel 101*m* via the fifth channel 105*m*, and then flow through the water treatment chamber

900_m_ from top to bottom via the outer opening 9101_m_ of the water treatment system, and then flow upwardly into the second channel 102_m_ via the central pipe of the liquid collecting unit of the water treatment system, at last flow out through the eleventh channel 1011_m_ and the first flow guiding channel 510_m_; as shown in FIG. 197D, when the flow control apparatus is under the fourth working state, the water treatment system is in a water supplement state, raw water (water to be processed) may flow from the first opening 301_m_ of the casing 30_m_ of the flow control apparatus into the ninth channel 109_m_ and the fifth channel 105_m_ of the flow control apparatus, and then flow into the injector 70_m_ via the fourth opening 304_m_ to supplement water into the brine supply container 84_m_; as shown in FIG. 197E, when the flow control apparatus is under the fifth working state, the water treatment system is in a forwardwash state, raw water (water to be processed) may flow from the first opening 301_m_ of the casing 30_m_ of the flow control apparatus into the ninth channel 109_m_ and the sixth channel 106_m_ of the flow control apparatus, and flow into the water treatment chamber 900_m_ of the water treatment system via the outer opening 9101_m_ of the water treatment system, and then flow upwardly into the second channel 102_m_ of the flow control apparatus via the central pipe of the liquid collecting unit of the water treatment system and flow out through the eleventh channel 1011_m_ and the first flow guiding channel 510_m_.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93_m_ from bottom to top; when the flow control apparatus is under the third working state, the water treatment system can make the solution in the brine supply container 84_m_ flow into the water treatment container 91_m_ via the outer opening 9101_m_ of the water treatment system; when the flow control apparatus is under the fourth working state, the water treatment system can supplement water into the brine supply container 84_m_; when the flow control apparatus is under the fifth working state, the water treatment system can achieve washing the water treatment unit 93_m_ from top to bottom.

The flow control apparatus of the present embodiment may comprise nine equal divisions, wherein the first channel, the second channel and the third channel of the flow control apparatus respectively cover two equal divisions, which is very special comparing with the current flow control apparatus and can make the main flow channels have an equal diameter under the first working state, and it is worth mentioning that under a proper water pressure, the highest rate of flow is determined by the smallest diameter thereof, so the uniformity of the diameters of the main flow channels is significant. The flow control apparatus of the present embodiment employ a technical solution of downflow brine intaking. Because an industrial water softening machine is mostly provided to employ a great amount of the resin and the resin layer is easily scattered, so it employs a downflow regeneration, which can hold the resin layer in a stable state during the process of regenerating and not to scattered so as to ensure a stable water quality in the water treating working state; and the flow control apparatus of the present embodiment has an anticipated aligning order of working states as flows: water treating working state->>backwash working state->>downflow brine intaking working state->>forwardwash working state->>water supplement working state, so the flow control apparatus is able to help to finish all of working states when the moving valve disc 20 rotates for a single circle, which decreases the rotating distance of the moving valve disc 20 and prolongs the life-span of the flow control apparatus.

Referring to FIG. 199 to FIG. 201B of the drawings of the present disclosure, a flow control apparatus according to a thirty-second preferred embodiment of the present disclosure is illustrated, which is adapted for being used for controlling fluid to flow in multiple directions, wherein the flow control apparatus comprises a first flow controlling element 10_n_ and a second flow controlling element 20_n_ provided rotatably on the first flow controlling element 10_n_, wherein the first flow controlling element 10_n_ comprises a first flow controlling body 11_n_, wherein the first flow controlling body 11_n_ comprises a top end 111_n_, wherein the top end 111_n_ defines a first flow controlling side 100_n_; wherein the second flow controlling element 20_n_ comprises a second flow controlling body 21_n_, wherein the second flow controlling body 21_n_ comprises a bottom end 211_n_ and an upper end 212_n_ upwardly extended from the bottom, wherein the bottom end 211_n_ defines a second flow controlling side 200_n_, wherein the first flow controlling side 100_n_ of the first flow controlling element 10_n_ is adapted for contacting physically with the second flow controlling side 200_n_ of the second flow controlling element 20_n_.

As shown in FIG. 200 to FIG. 201B, the first flow controlling body 11_n_ of the flow control apparatus further comprises a first center portion 1111_n_, a first edge portion 1112_n_ and a first middle portion 1113_n_ extended between the first center portion 1111_n_ and the first edge portion 1112_n_, wherein the bottom end 211_n_ of the second flow controlling body 21_n_ of the second flow controlling element 20_n_ further comprises a second center portion 2111_n_, a second edge portion 2112_n_ and a second middle portion 2113_n_ extended between the second center portion 2111_n_ and the second edge portion 2112_n_, wherein the flow control apparatus has a first channel 101_n_, a second channel 102_n_, a third channel 103_n_, a fourth channel 104_n_, a fifth channel 105_n_, and a seventh channel 107 provided respectively in the first flow controlling body 11_n_ of the first flow controlling element 10_n_, and a ninth channel 109_n_, a tenth channel 1010_n_ and a eleventh channel 1011_n_ provided respectively in the second flow controlling body 21_n_ of the second flow controlling element 20_n_, wherein the first channel 101_n_ is downwardly extended from the first flow controlling side 100_n_ of the first flow controlling element 10_n_; wherein the second channel 102_n_ is downwardly extended from the first flow controlling side 100_n_ of the first flow controlling element 10_n_; wherein the third channel 103_n_ is downwardly extended from the first flow controlling side 100_n_ of the first flow controlling element 10_n_; wherein the fourth channel 104_n_ is downwardly extended from the first flow controlling side 100_n_ of the first flow controlling element 10_n_; wherein the fifth channel 105_n_ is downwardly extended from the first flow controlling side 100_n_ of the first flow controlling element 10_n_; wherein the seventh channel 107_n_ is downwardly extended from the first flow controlling side 100_n_ of the first flow controlling element 10_n_, wherein the ninth channel 109_n_ is extended upwardly from the second flow controlling side 200_n_ of the bottom end 211_n_ of the second flow controlling body 21_n_ and extended from the second middle portion 2113_n_ of the second flow controlling body 21_n_ to the second edge portion 2112_n_ and defines a ninth opening 1091_n_ communicated with the outer space thereof; wherein the tenth channel 1010_n_ is extended upwardly from the second flow controlling side 200_n_ of the bottom end 211_n_ of the second flow controlling body 21$n$ and extended from second middle portion 2113$n$ of the bottom end 211$n$ of the second flow controlling body 21$n$ to the second edge portion 2112$n$; wherein the eleventh channel 1011$n$ is extended upwardly from the second flow controlling side 200$n$ of the bottom end 211$n$ of the second flow controlling body 21$n$ and penetrates through the second flow controlling body 21$n$ of the second flow controlling element 20$n$. In other words, the ninth opening 1091$n$ of the ninth channel 109$n$ is provided to keep being communicated with an outer space, especially the outer space of the second flow controlling element 20$n$.

As shown in FIG. 202A to FIG. 202E, the second flow controlling element 20$n$ is able to rotate relative to the first flow controlling element 10$n$ so that the flow control apparatus has a first working state, a second working state, a third working state, a fourth working state and a fifth working state, wherein when the flow control apparatus is in the first working state, the ninth channel 109$n$ is communicated with the first channel 101$n$, wherein the tenth channel 1010$n$ is communicated with the second channel 102$n$ and the third channel 103$n$; wherein when the control apparatus is in the second working state, the ninth channel 109$n$ is communicated with the second channel 102$n$, and the eleventh channel 1011$n$ is communicated with the first channel 101$n$; wherein when the flow control apparatus is in the third working state, the ninth channel 109$n$ is communicated with the fourth channel 104$n$, the tenth channel 1010$n$ is communicated with the fifth channel 105$n$ and the seventh channel 107$n$, the eleventh channel 1011$n$ is communicated with the first channel 101$n$; wherein when the flow control apparatus is in the fourth working state, the ninth channel 109$n$ is communicated with the fifth channel 105$n$; wherein when the flow control apparatus is in the fifth working state, the ninth channel 109$n$ of the flow control apparatus is communicated with the first channel 101$n$, and the eleventh channel 1011$n$ is communicated with the second channel 102$n$. Preferably, when the flow control apparatus is in the first working state, the eleventh channel 1011$n$ is communicated with the fifth channel 105$n$; when the flow control apparatus is in the second working state, the tenth channel 1010$n$ is communicated with the fourth channel 104$n$ and the fifth channel 105$n$; wherein when the flow control apparatus is in the fourth working state, the tenth channel 1010$n$ is communicated with the first channel 101$n$ and the seventh channel 107$n$, and the eleventh channel 1011$n$ is communicated with the first channel 101$n$; when the flow control apparatus is in the fifth working state, the tenth channel 1010$n$ is communicated with the first channel 101$n$.

Preferably, when the flow control apparatus is in the first working state, the fourth channel 104$n$ and the seventh channel 107$n$ is blocked by the second flow controlling element 20$n$; when the flow control apparatus is in the second working state, the third channel 103$n$ and the seventh channel 107$n$ are blocked by the second flow controlling element 20$n$; when the flow control apparatus is in the third working state, the second channel 102$n$ and the third channel 103$n$ is blocked by the second flow controlling element 20$n$; when the flow control apparatus is in fourth working state, the second channel 102$n$, the third channel 103$n$ and the fourth channel 104$n$ is blocked by the second flow controlling element 20$n$; when the flow control apparatus is in the fifth working state, the third channel 103$n$, the fourth channel 104$n$, the fifth channel 105$n$ and the seventh channel 107$n$ are blocked by the second flow controlling element 20.

It is worth mentioning that the first channel 101$n$, the second channel 102$n$, the third channel 103$n$, the fourth channel 104$n$, the fifth channel 105$n$ and the seventh channel 107$n$ of the flow control apparatus are respectively and spacedly provided in the first flow controlling body 11$n$ of the first flow controlling element 10$n$; the ninth channel 109$n$, the tenth channel 1010$n$ and the eleventh channel 1011$n$ are respectively and spacedly provided in the second flow controlling body 21$n$ of the second flow controlling element 20$n$.

Alternatively, each of the first flow controlling side 100$n$ of the first flow controlling body 11$n$ of the first flow controlling element 10$n$ and the second flow controlling side 200$n$ of the second flow controlling body 21$n$ of the second flow controlling element 20$n$ is circular-shaped, wherein the first channel 101$n$, the second channel 102$n$ and the third channel 103$n$, the fourth channel 104$n$, the fifth channel 105$n$ and the seventh channel 107$n$ are radially provided in the first flow controlling side 100$n$ of the first flow controlling element 10$n$, and the ninth channel 109$n$, the tenth channel 1010$n$ and the eleventh channel 1011$n$ are radially provided in the second flow controlling side 200$n$ of the second flow controlling element 20$n$.

As shown in FIG. 201A and FIG. 201B, the first channel 101$n$, the seventh channel 107$n$, the fifth channel 105$n$, the fourth channel 104$n$, the second channel 102$n$ and the third channel 103$n$ of the flow control apparatus are arranged clockwise in the first flow controlling body 11$n$ of the first flow controlling element 10$n$ in the order thereof; the ninth channel 109$n$, the eleventh channel 1011$n$ and the tenth channel 1010$n$ of the flow control apparatus are arranged clockwise in the second flow controlling body 21$n$ of the second flow controlling element 20$n$ in the order thereof.

Alternatively, the first channel 101$n$, the seventh channel 107$n$, the fifth channel 105$n$, the fourth channel 104$n$, the second channel 102$n$ and the third channel 103$n$ of the flow control apparatus are arranged counter-clockwise in the first flow controlling body 11$n$ of the first flow controlling element 10$n$ in the order thereof; the ninth channel 109$n$, the eleventh channel 1011$n$ and the tenth channel 1010$n$ of the flow control apparatus are arranged counter-clockwise in the second flow controlling body 21$n$ of the second flow controlling element 20$n$ in the order thereof.

As shown in FIG. 201A and FIG. 201B, wherein the first flow controlling side 100$n$ of the first flow controlling element 10$n$ of the flow control apparatus has a center section 1000$n$ shown by a chain line, wherein the center section 1000$n$ is provided in the first center portion 1111$n$ of the top end 111$n$ of the first flow controlling body 11$n$ of the first flow controlling element 10$n$, wherein the remaining portion of the first flow controlling side 100$n$ is clockwise and evenly divided into a first section 1001$n$, a second section 1002$n$, a third section 1003$n$, a fourth section 1004$n$, a fifth section 1005$n$, a sixth section 1006$n$, a seventh section 1007$n$ and an eighth section 1008$n$, as shown by chain lines; wherein the second flow controlling side 200$n$ of the second flow controlling element 20$n$ of the flow control apparatus has a center division 2000$n$, wherein the center division 2000$n$ is provided in the second center portion 2111$n$ of the bottom end 211$n$ of the second flow controlling body 21$n$ of the second flow controlling element 20$n$, wherein the remaining portion of the second flow controlling side 200$n$ is clockwise and evenly divided into a first division 2001$n$, a second division 2002$n$, a third division 2003$n$, a fourth division 2004$n$, a fifth division 2005$n$, a sixth division 2006$n$, a seventh division 2007$n$ and an eighth division 2008$n$; wherein the first channel 101$n$ is downwardly extended from the first section 1001$n$, the second section 1002$n$ and the third section 1003$n$ of the first flow controlling side 100*n*; the seventh channel 107*n* is downwardly extended from the fourth section 1004*n* of the first flow controlling side 100*n*; the fifth channel 105*n* is downwardly extended from the fifth section 1005*n* of the first flow controlling side 100*n*; the fourth channel 104*n* is downwardly extended from the sixth section 1006*n* of the first flow controlling side 100*n*; the second channel 102*n* is downwardly extended from the seventh section 1007*n* of the first flow controlling side 100*n*; the third channel 103*n* is downwardly extended from the eighth section 1008*n* of the first flow controlling side 100*n*; the ninth channel 109*n* is upwardly extended from the first division 2001*n* of the second flow controlling side 200*n*; the eleventh channel 1011*n* is upwardly extended from the fifth division 2005*n* of the second flow controlling side 200*n*; the tenth channel 1010*n* is upwardly extended from the seventh division 2007*n* and the eighth channel 2008*n* of the second flow controlling side 200*n* to the upper end 212*n*.

Preferably, the third channel 103*n* is downwardly and outwardly extended from the first flow controlling side 100*n* of the first flow controlling element 10*n*; the fourth channel 104*n* is downwardly and outwardly extended from the first flow controlling side 100*n* of the first flow controlling element 10*n* and the fifth channel 105*n* is downwardly and outwardly extended from the first flow controlling side 100*n* of the first flow controlling element 10*n*.

As shown in FIG. 200, the flow control apparatus further comprises a casing 30*n* according to the thirty-second embodiment of the present disclosure, wherein the casing 30*n* comprises a casing body 31*n*, wherein the casing body 31*n* has an outer side wall 312*n* and an inner side wall 311*n* and defines an inner chamber 300*n*, wherein the first flow controlling element 10*n* is adapted for being provided in the inner chamber 300*n* and the first flow controlling side 100*n* of the first flow controlling element 10*n* is provided to face up, and the second flow controlling element 20*n* is adapted for being provided in the inner chamber 300*n* and the second flow controlling side 200*n* of the second flow controlling element 20*n* is provided to face down, wherein the first flow controlling body 11*n* of the first flow controlling element 10*n* further comprises a lower end 112*n* downwardly extended from the top end 111*n*, wherein the lower end 112*n* of the first flow controlling body 11*n* of the first flow controlling element 10*n* is connected with the inner side wall 311*n* of the casing body 31*n* of the casing 30*n* and divides spacedly the inner chamber 300*n* into a first receiving chamber 3001*n* and a second receiving chamber 3002*n*, wherein the casing 30*n* has a first opening 301*n*, a second opening 302*n*, a third opening 303*n* and a fourth opening 304*n*, wherein the first receiving chamber 3001*n* is respectively communicated with the first opening 301*n* and the ninth channel 109*n*; the second opening 302*n* is communicated with the third channel 103*n* of the flow control apparatus; the third opening 303*n* is communicated with the fourth channel 104*n* of the flow control apparatus; the fourth opening 304*n* is communicated with the fifth channel 105*n* of the flow control apparatus. Preferably, the first receiving chamber 3001*n* is respectively communicated with the first opening 301*n* and the ninth opening 1091*n* of the ninth channel 109*n*.

As shown in FIG. 200, the flow control apparatus further comprises a flow separating element 40*n* provided in second receiving chamber 3002*n* and extended downwardly form the first flow controlling body 11*n*, wherein the flow separating element 40*n* has a second flow guiding chamber 402*n* communicated with the second channel 102*n* and the seventh channel 107*n* of the flow control apparatus and the flow separating element 40*n* and the inner side wall 311*n* of the casing 30*n* define a first flow guiding chamber 401*n* therebetween, wherein the first flow guiding chamber 401*n* is communicated with the first channel 101*n*.

As shown in FIG. 200, the flow control apparatus further comprises a flow guiding element 50*n*, wherein the flow guiding element 50*n* comprises a flow guiding body 51*n*, wherein the flow guiding body 51*n* defines a first flow guiding channel 510*n*, wherein the flow guiding body 51*n* of the flow guiding element 50*n* is upwardly extended from the second flow controlling body 21*n* of the second flow controlling element 20*n* and the first flow guiding channel 510*n* of the first flow guiding element 50*n* is communicated with the eleventh channel 1011*n* of the flow control apparatus.

As shown in FIG. 201A to FIG. 201C, the flow control apparatus further comprises a wear-resistant member 60*n* detachably provided between the first flow controlling element 10*n* and the second flow controlling element 20*n*, wherein the wear-resistant member 60*n* comprises a wear-resistant body 61*n*, wherein the wear-resistant body 61*n* has a wear-resistant side 610*n* adapted for contacting physically with the second flow controlling side 200*n* of the second flow controlling body 21*n*, wherein the wear-resistant side 610*n* is treated by a wear-resistant process to minimize the force of friction, which is resulted from the rotating of the first flow controlling body 11*n* of the first flow controlling element 10*n* relative to the second flow controlling body 21*n* of the second flow controlling element 20*n* so as to prolong the life-span of the flow control apparatus. The wear-resistant member 60*n* is further sized and shaped to match the first flow controlling side 100*n* of the first flow controlling element 10*n* and the wear-resistant body 61*n* of the wear-resistant member 60*n* defines spacedly a first port 601*n*, a second port 602*n*, a third port 603*n*, a fourth port 604*n*, a fifth port 605*n* and a seventh port 607*n*, wherein the first port 601*n*, the second port 602*n*, the third port 603*n*, the fourth port 604*n*, the fifth port 605*n* and the seventh port 607*n* are respectively sized and shaped to match the first channel 101*n*, the second channel 102*n*, the third channel 103*n*, the fourth channel 104*n*, the fifth channel 105*n* and the seventh channel 107*n* of the flow control apparatus.

It is worth mentioning that when the flow control apparatus further comprises a twelfth channel 1012*n* provided in the first center portion 1111*n* of the top end 111*n* of the first flow controlling body 11*n* of the first flow controlling element 10*n*, the wear-resistant member 60*n* further has a twelfth port 6012*n* corresponding to the twelfth channel 1012*n*, as shown in FIG. 201F.

As shown in FIG. 203, the flow control apparatus further comprises an injector 70*n*, wherein the injector 70*n* is provided in the outer side wall 312*n* of the casing body 31*n* of the casing 30*n* of the flow control apparatus, wherein the injector 70*n* is respectively communicated with the third opening 303*n* and the fourth opening 304*n* of the casing 30*n*.

As shown in 200, the flow control apparatus further comprises an auxiliary unit 80*n*, wherein the auxiliary unit 80*n* comprises a driving element 81*n* upwardly extended from the second flow controlling body 21*n* of the second flow controlling element 20*n*, wherein the driving element 81*n* is adapted for driving the second flow controlling body 21*n* of the second flow controlling element 20*n* of the flow control apparatus to rotate relative to the first controlling body 11*n* of the first flow controlling element 10*n*. The auxiliary unit 80*n* further comprises a fixing element 82*n* extended upwardly from the driving element 81*n*, wherein the fixing element 82*n* is adapted for holding the driving element 81*n* at a position to hold the second flow controlling body 21*n* of the second flow controlling element 20*n* at a position. Preferably, the driving element 81*n* of the auxiliary unit 80*n* of the flow control apparatus is integrated with the flow guiding body 51*n* of the flow guiding element 50*n*.

An alternative of the flow control apparatus according to the thirty-second embodiment of the present disclosure is shown in FIG. 201D and FIG. 201E, wherein the first flow controlling body 11*n* of the flow control apparatus further comprises a first center portion 1111*n*, a first edge portion 1112*n* and a first middle portion 1113*n* extended between the first center portion 1111*n* and the first edge portion 1112*n*, wherein the flow control apparatus further comprises a twelfth channel 1012*n* provided in the first center portion 1111*n* of the top end 111*n* of the first flow controlling body 11*n* of the first flow controlling element 10*n*, and the eleventh channel 1011*n* is extended upwardly from the second flow controlling side 200*n* of the bottom end 211*n* of the second flow controlling body 21*n* to the upper end 212*n* and extended from the second center portion 2111*n* of the second flow controlling element 20*n* to the second edge portion 2112*n* thereof. Preferably, the center section 1000*n* of the first flow controlling side 100*n* is provided in the first center portion 1111*n* of the top end 111*n* of the first flow controlling body 11*n* of the first flow controlling element 10*n*, and the eleventh channel 1011*n* is upwardly extended from the fifth division 2005*n* and the center division 2000*n* of the second flow controlling side 200*n*.

Referring to FIG. 203, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90*n*, wherein the water treatment device 90*n* comprises a water treatment container 91*n*, a liquid collecting unit 92*n* and a water treatment unit 93*n*, wherein the water treatment container 91*n* has a water treatment chamber 900*n* and an upper opening 910*n*, the liquid collecting unit 92*n* comprises a center pipe 921*n*, the water treatment unit 93*n* is adapted for being received in the water treatment chamber 900*n*, the center pipe 921*n* is adapted for being extended downwardly through the upper opening 910*n* to enter into the water treatment chamber 900*n*, and the center pipe 921*n* and the upper opening 910 defines an outer opening 9101, wherein the center pipe 921*n* has an upper opening 9211 and a lower opening 9212*n*, wherein the liquid in the water treatment container 91*n*, such as water, is adapted for being treated by the water treatment unit 93*n* and flows from the lower opening 9212 of the center pipe 921*n* of the liquid collecting unit 92*n* into the center pipe 921*n* and flows out of the center pipe 921*n*; preferably, the water treatment unit 93*n* provided in the water treatment container 91*n* comprises water treatment material, such as softening resin, activated carbon or the like, or the combination thereof.

It is worth mentioning that the outer opening 9101*n* of the water treatment device 90*n* of the water treatment system may be communicated with the first channel 101*n* of the flow control apparatus, or the second channel 102*n* and the seventh channel 107*n* of the flow control apparatus, the upper opening 9211*n* of the central pipe 921*n* of the liquid collecting unit 92*n* of the water treatment device 90*n* may be communicated with the first channel 101*n* of the flow control apparatus, or the second channel 102*n* and the seventh channel 107*n* of the flow control apparatus; wherein when the outer opening 9101*n* of the water treatment device 90*n* is communicated with the first channel 101*n* of the flow control apparatus, the upper opening 9211*n* of the central pipe 921*n* of the liquid collecting unit 92*n* of the water treatment device 90*n* is communicated with the second channel 102*n* and the seventh channel 107*n* of the flow control apparatus; when the outer opening 9101*n* of the water treatment device 90*n* of the water treatment system is communicated with the second channel 102*n* and the seventh channel 107*n* of the flow control apparatus, the upper opening 9211*n* of the central pipe 921*n* of the liquid collecting unit 92*n* of the water treatment device 90*n* is communicated with the first channel 101*n* of the flow control apparatus.

As shown in FIG. 203, the flow control apparatus further comprises a brine supply container 84*n*, wherein the injector 70*n* may be communicated with the brine supply container 84*n*, wherein when the flow control apparatus is under the third working state, the fluid from the third opening 303*n* may flow into the injector 70*n* and make the liquid in the brine supply container 84*n* flow into the fourth opening 304*n* of the casing 30*n*. Preferably, the outer opening 9101*n* of the water treatment device 90*n* of the water treatment system and the upper opening 9211*n* of the central pipe 921*n* of the water treatment device 90*n* are respectively adapted to be communicated with the first flow guiding chamber 401*n* and the second flow guiding chamber 402*n* of the flow control apparatus, wherein when the outer opening 9101*n* of the water treatment device 90*n* is communicated with the first flow guiding chamber 401*n* of the flow control apparatus, the upper opening 9211*n* of the central pipe 921*n* of the water treatment device 90*n* is communicated with the second flow guiding chamber 402*n* of the flow control apparatus, and when the flow control apparatus is under the third working state, the fluid from the brine supply container 84*n* can flow through the injector 70*n* and flow into the seventh channel 107*n*, and then flow into the water treatment container 91*n* via the second flow guiding chamber 402*n* and the central pipe 921*n* of the liquid collecting unit 92*n* of the water treatment device 90*n*. And when the outer opening 9101*n* of the water treatment device 90*n* of the water treatment system is communicated with the second flow guiding chamber 402*n*, the upper opening 9211*n* of the central pipe 921*n* of the water treatment device 90*n* is communicated with the first flow guiding chamber 401*n* of the flow control apparatus, and when the flow control apparatus is under the third working state, the fluid from the brine supply container 84*n* can flow through the injector 70*n* and flow into the seventh channel 107*n*, and then flow into the water treatment container 91*n* via the second flow guiding chamber 402*n* and the outer opening 9101*n* of the liquid collecting unit 92*n* of the water treatment device 90*n*. In other words, when the outer opening 9101*n* of the water treatment device 90*n* is communicated with the first flow guiding chamber 401*n* of the flow control apparatus and the upper opening 9211*n* of the central pipe 921*n* of the water treatment device 90*n* is communicated with the second flow guiding chamber 402*n* of the flow control apparatus, the fluid from the brine supply container 84*n* can flow through the water treatment unit 93*n* from bottom to top; and when the outer opening 9101*n* of the water treatment device 90*n* is communicated with the second flow guiding chamber 402*n* of the flow control apparatus and the upper opening 9211*n* of the central pipe 921*n* of the water treatment device 90*n* is communicated with the first flow guiding chamber 401*n* of the flow control apparatus, the fluid from the brine supply container 84*n* can flow through the water treatment unit 93*n* from top to bottom. Preferably, the liquid in the brine supply container 84*n* is regeneration solution for the water treatment unit 93*n* of the water treatment device 90*n*, so by controlling the communicating type that the outer opening 9101*n* and the upper opening 9211*n* of the central pipe 921*n* of the water treatment device 90*n* are communicated with the flow control apparatus to control the regeneration solution from the brine supply container 84*n* of the water treatment unit 93*n* to regenerate and elute the water treatment unit 93*n*.

Similarly, when the outer opening 9101*n* of the water treatment device 90*n* is communicated with the second flow guiding chamber 402*n* and the upper opening 9211*n* of the central pipe 921*n* of the water treatment device 90*n* is communicated with the first flow guiding chamber 401*n*, and when the flow control apparatus is under the first working state and the liquid flows from the flow control apparatus into the water treatment container 91*n*, the liquid flows through the water treatment unit 93*n* from bottom to top.

It is worth mentioning that when the flow control apparatus is under the second working state, the ninth channel 109*n* is communicated with the second channel 102*n* and the eleventh channel 1011*n* is communicated with the first channel 101*n* such that the waste water from the water treatment container 91*n* of the water treatment device 90*n* is able to be drained via the eleventh channel 1011*n*; when the flow control apparatus is under the third working state, the ninth channel 109*n* is communicated with the fourth channel 104*n*, the tenth channel 1010*n* is communicated with the seventh channel 107*n* and the fifth channel 105*n*, the eleventh channel 1011*n* is communicated with the first channel 101*n* such that the waste water from the water treatment container 91*n* of the water treatment device 90*n* is able to be drained via the eleventh channel 1011*n*; when the flow control apparatus is under the fifth working state, the ninth channel 109*n* of the flow control apparatus is communicated with the first channel 101*n*, and the eleventh channel 1011*n* is communicated with the second channel 102*n* such that the waste water from the water treatment container 91*n* of the water treatment device 90*n* is able to be drained upwardly via the eleventh channel 1011*n*. So the waste water from the water treatment system may be upwardly drained via the eleventh channel 1011*n* such that the eleventh channel 1011*n* for drainage does not reduce the sizes of the first channel 101*n*, the second channel 102*n*, the third channel 103*n*, the fourth channel 104*n*, the fifth channel 105*n* and the seventh channel 107*n* of the flow control apparatus and decreases the interference resulted from the first channel 101*n*, the second channel 102*n*, the third channel 103*n*, the fourth channel 104*n*, the fifth channel 105*n* and the seventh channel 107*n* provided in the first flow controlling body 11*n* of the first flow controlling element 10*n*. In other words, because the eleventh channel 1011*n* upwardly penetrates through the second flow controlling body 21*n* of the second flow controlling element 20*n*, so the waste water from the water treatment system may flow through the eleventh channel 1011*n* and flow upwardly into the flow guiding element 50*n* to be drained via the first flow guiding channel 510*n* of the flow guiding element 50*n*.

As shown in FIG. 203 is an operation schematic diagram of the water treatment system installed with the flow control apparatus of the present disclosure, as shown in FIG. 202A, when the flow control apparatus is under the first working state, the water treatment system is in a water treating state, raw water (water to be processed) may flow from the first opening 301*n* of the casing 30*n* of the flow control apparatus into the ninth channel 109*n* and the first channel 101*n*, and then flow through the outer opening 9101*n* of the water treatment system and flow into the water treatment chamber 900*n* of the water treatment system, and then flow upwardly into the second channel 102*n* and the third channel 103*n* of the flow control apparatus via the central pipe 921*n* of the liquid collecting unit 92*n* of the water treatment system, and then flow out through the second opening 302*n* of the casing 30*n* of the flow control apparatus; as shown in FIG. 202B, when the flow control apparatus is under the second working state, the water treatment system is in a backwash state, raw water (water to be processed) may flow from the first opening 301*n* of the casing 30*n* of the flow control apparatus into the ninth channel 109*n* and the second channel 102*n*, and then flow through the upper opening 9211*n* of the central pipe 921*n* of the water treatment system and flow through the water treatment chamber 900*n* of the water treatment system from bottom to top, and then flow into the first channel 101*n* of the flow control apparatus via the outer opening 9101*n* of the water treatment system, and then flow out through the eleventh channel 1011*n* and the first flow guiding channel 510*n*; as shown in FIG. 202C, when the flow control apparatus is under the third working state, the water treatment system is in an upflow brine intaking state, raw water (water to be processed) may flow from the first opening 301*n* of the casing 30*n* of the flow control apparatus into the ninth channel 109*n* and the fourth channel 104*n*, and then flow through the third opening 303*n* into the injector 70*n* to be injected, and after being mixed with the liquid from the brine supply container 84*n*, the mixture may flow into the fourth opening 304*n*, and then flow through the seventh channel 107*n* via the fifth channel 105*n*, and then flow through the water treatment chamber 900*n* from bottom to top via the upper opening 9211*n* of the water treatment system, and then flow through the first channel 101*n* via the outer opening 9101 of the water treatment system, at last flow out through the eleventh channel 1011*n* and the first flow guiding channel 510*n*; as shown in FIG. 202D, when the flow control apparatus is under the fourth working state, the water treatment system is in a water supplement state, raw water (water to be processed) may flow from the first opening 301*n* of the casing 30*n* of the flow control apparatus into the ninth channel 109*n* and the fifth channel 105*n*, and then flow into the injector via the fourth opening 304*n* to supplement water into the brine supply container 84*n*. As shown in FIG. 202E, when the flow control apparatus is under the fifth working state, the water treatment system is in a forwardwash state, raw water (water to be processed) may flow from the first opening 301*n* of the casing 30*n* of the flow control apparatus into the ninth channel 109*n* and the first channel 101*n*, and then flow into the water treatment chamber 900*n* via the outer opening 9101*n* of the water treatment system and flow upwardly into the second channel 102*n* via the central pipe 921*n* of the liquid collecting unit 92*n* of the water treatment system, and then flow out through the eleventh channel 1011*n* and the first flow guiding channel 510*n*.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93*n* from bottom to top; when the flow control apparatus is under the third working state, the water treatment system can make the solution in the brine supply container 84*n* flow into the water treatment container 91*n* via the outer opening 9101*n* of the central pipe 921*n* of the water treatment device 90*n* of the water treatment system; when the flow control apparatus is under the fourth working state, the water treatment system can supplement water into the brine supply container 84*n*; when the flow control apparatus is under the fifth working state, the water treatment system can achieve washing the water treatment unit 93*n* from top to bottom.

The flow control apparatus of the present embodiment may comprise eight equal divisions and have a less number of divisions and the first channel of the first flow controlling element covers three equal divisions, which is beneficial in increasing the diameters of the water channels of the flow control apparatus and the rate of flow; wherein the flow control apparatus employs a technical solution of upflow brine intaking and regeneration achieving a higher regeneration efficiency than downflow brine intaking and regeneration among domestic small-capacity water softeners using softening resin as treating material and brine as regenerating agent, and it can save brine; and it has an anticipated aligning order of working states as flows: water treating working state->>backwash working state->>upflow brine intaking working state->>water supplement working state->>forwardwash working state, so the flow control apparatus is able to help to finish all of working states when the moving valve disc rotates for a single circle, which decreases the rotating distance of the moving valve disc and prolongs the life-span of the flow control apparatus.

Referring to FIG. 204 to FIG. 206B of the drawings of the present disclosure, a flow control apparatus according to a thirty-third preferred embodiment of the present disclosure is illustrated, which is adapted for being used for controlling fluid to flow in multiple directions, wherein the flow control apparatus comprises a first flow controlling element 10*p* and a second flow controlling element 20*p* provided rotatably on the first flow controlling element 10*p*, wherein the first flow controlling element 10*p* comprises a first flow controlling body 11*p*, wherein the first flow controlling body 11*p* comprises a top end 111*p*, wherein the top end 111*p* defines a first flow controlling side 100*p*; wherein the second flow controlling element 20*p* comprises a second flow controlling body 21*p*, wherein the second flow controlling body 21*p* comprises a bottom end 211*p* and an upper end 212*p* upwardly extended from the bottom, wherein the bottom end 211*p* defines a second flow controlling side 200*p*, wherein the first flow controlling side 100*p* of the first flow controlling element 10*p* is adapted for contacting physically with the second flow controlling side 200*p* of the second flow controlling element 20*p*. As shown in FIG. 205 to FIG. 206B, the first flow controlling body 11*p* of the flow control apparatus further comprises a first center portion 1111*p*, a first edge portion 1112*p* and a first middle portion 1113*p* extended between the first center portion 1111*p* and the first edge portion 1112*p*, wherein the bottom end 211*p* of the second flow controlling body 21*p* of the second flow controlling element 20*p* further comprises a second center portion 2111*p*, a second edge portion 2112*p* and a second middle portion 2113*p* extended between the second center portion 2111*p* and the second edge portion 2112*p*, wherein the flow control apparatus has a first channel 101*p*, a second channel 102*p*, a third channel 103*p*, a fourth channel 104*p*, a fifth channel 105*p* and a seventh channel 107*p* provided respectively in the first flow controlling body 11*p* of the first flow controlling element 10*p*, and a ninth channel 109*p*, tenth channel 1010*p* and an eleventh channel 1011*p* provided respectively in the second flow controlling body 21*p* of the second flow controlling element 20*p*, wherein the first channel 101*p* is downwardly extended from the first flow controlling side 100*p* of the first flow controlling element 10*p*; wherein the second channel 102*p* is downwardly extended from the first flow controlling side 100*p* of the first flow controlling element 10*p*; wherein the third channel 103*p* is downwardly extended from the first flow controlling side 100*p* of the first flow controlling element 10*p*; wherein the fourth channel 104*p* is downwardly extended from the first flow controlling side 100*p* of the first flow controlling element 10*p*; wherein the fifth channel 105*p* is downwardly extended from the first flow controlling side 100*p* of the first flow controlling element 10*p*; the seventh channel 107*p* is downwardly extended from the first flow controlling side 100*p* of the first flow controlling element 10*p*, wherein the ninth channel 109*p* is extended upwardly from the second flow controlling side 200*p* of the bottom end 211*p* of the second flow controlling body 21*p* and extended from the second middle portion 2113*p* of the second flow controlling body 21*p* to the second edge portion 2112*p* and defines a ninth opening 1091*p* communicated with an outer space thereof; wherein the tenth channel 1010*p* is extended from the second flow controlling side 200*p* of the bottom end 211*p* of the second flow controlling body 21*p* to the upper end 212*p* and extended from second middle portion 2113*p* of the bottom end 211*p* of the second flow controlling body 21*p* to the second edge portion 2112*p*; wherein the eleventh channel 1011*p* is extended upwardly from the second flow controlling side 200*p* of the bottom end 211*p* of the second flow controlling body 21*p* and penetrates through the second flow controlling body 21*p* of the second flow controlling element 20*p*. In other words, the ninth opening 1091*p* of the ninth channel 109*p* is provided to keep being communicated with an outer space, especially the outer space of the second flow controlling element 20*p*.

As shown in FIG. 207A to FIG. 207F, the second flow controlling element 20*p* is able to rotate relative to the first flow controlling element 10*p* so that the flow control apparatus has a first working state, a second working state, a third working state, a fourth working state, a fifth working state and a sixth working state, wherein when the flow control apparatus is in the first working state, the ninth channel 109*p* is communicated with the first channel 101*p*, wherein the tenth channel 1010*p* is communicated with the second channel 102*p* and the third channel 103*p*; wherein when the control apparatus is in the second working state, the ninth channel 109*p* is communicated with the second channel 102*p*, and the eleventh channel 1011*p* is communicated with the first channel 101*p*; wherein when the flow control apparatus is in the third working state, the ninth channel 109*p* is communicated with the fourth channel 104*p*, the tenth channel 1010*p* is communicated with the fifth channel 105*p* and the seventh channel 107*p*, the eleventh channel 1011*p* is communicated with the first channel 101*p*; wherein when the flow control apparatus is in the fourth working state, the ninth channel 109*p* is communicated with the first channel 101*p*, the tenth channel 1010*p* is communicated with the second channel 102*p* and the fifth channel 105*p*; wherein when the flow control apparatus is in the fifth working state, the ninth channel 109*p* of the flow control apparatus is communicated with the first channel 101*p*, and the eleventh channel 1011*p* is communicated with the seventh channel 107*p*; wherein when the flow control apparatus is in the sixth working state, the ninth channel 109*p* of the flow control apparatus is communicated with the fifth channel 105*p*. Preferably, when the flow control apparatus is in the first working state, the eleventh channel 1011*p* is communicated with the fifth channel 105*p*; when the flow control apparatus is in the second working state, the tenth channel 1010*p* is communicated with the first channel 101*p*; when the flow control apparatus is in the fourth working state, the eleventh channel 1011*p* is blocked by the first flow controlling element 10*p*; when the flow control apparatus is in the fifth working state, the tenth channel 1010*p* is communicated with the fifth channel 105*p*; when the flow control apparatus is in the sixth working state, the tenth channel 1010*p* is communicated with the first channel 101*p* and the fourth channel 104*p*, the eleventh channel 1011*p* is communicated with the third channel 103*p*.

Preferably, when the flow control apparatus is in the first working state, the fourth channel 104*p* and the seventh channel 107*p* are blocked by the second flow controlling element 20*p*; when the flow control apparatus is in second working state, the third channel 103*p*, the fourth channel 104*p*, the fifth channel 105*p* and the seventh channel 107*p* are blocked by the second flow controlling element 20*p*; when the flow control apparatus is in the third working state, the second channel 102*p* and the third channel 103*p* are blocked by the second flow controlling element 20*p*; when the flow control apparatus is in the fourth working state, the third channel 103*p*, the fourth channel 104*p* and the seventh channel 107*p* are blocked by the second flow controlling element 20*p*; when the flow control apparatus is in the fifth working state, the second channel 102*p*, the third channel 103*p* and the fourth channel 104*p* is blocked by the second flow controlling element 20*p*; when the flow control apparatus is in the sixth working state, the second channel 102*p* and the seventh channel 107*p* are blocked by the second flow controlling element 20*p*.

It is worth mentioning that the first channel 101*p*, the second channel 102*p* the third channel 103*p*, the fourth channel 104*p*, the fifth channel 105*p* and the seventh channel 107*p* of the flow control apparatus are respectively and spacedly provided in the first flow controlling body 11*p* of the first flow controlling element 10*p*; the ninth channel 109*p*, the tenth channel 1010*p* and the eleventh channel 1011*p* are respectively and spacedly provided in the second flow controlling body 21*p* of the second flow controlling element 20*p*.

Alternatively, each of the first flow controlling side 100*p* of the first flow controlling body 11*p* of the first flow controlling element 10*p* and the second flow controlling side 200*p* of the second flow controlling body 21*p* of the second flow controlling element 20*p* is circular-shaped, wherein the first channel 101*p*, the second channel 102*p*, the third channel 103*p*, the fourth channel 104*p* and the seventh channel 107*p* are radially provided in the first flow controlling side 100*p* of the first flow controlling element 10*p*, and the ninth channel 109*p*, the tenth channel 1010*p*, and the eleventh channel 1011*p* are radially provided in the second flow controlling side 200*p* of the second flow controlling element 20*p*.

As shown in FIG. 206A and FIG. 206B, the first channel 101*p*, the seventh channel 107*p*, the fifth channel 105*p*, the second channel 102*p*, the third channel 103*n* and the fourth channel 104*p* of the flow control apparatus are arranged clockwise in the first flow controlling body 11*p* of the first flow controlling element 10*p* in the order thereof; the ninth channel 109*p*, the eleventh channel 1011*p* and the tenth channel 1010*p* of the flow control apparatus are arranged clockwise in the second flow controlling body 21*p* of the second flow controlling element 20*p* in the order thereof.

Alternatively, the first channel 101*p*, the seventh channel 107*p*, the fifth channel 105*p*, the second channel 102*p*, the third channel 103*p* and the fourth channel 104*p* of the flow control apparatus are arranged counter-clockwise in the first flow controlling body 11*p* of the first flow controlling element 10*p* in the order thereof; the ninth channel 109*p*, the eleventh channel 1011*p* and the tenth channel 1010*p* of the flow control apparatus are arranged counter-clockwise in the second flow controlling body 21*p* of the second flow controlling element 20*p* in the order thereof.

As shown in FIG. 206A and FIG. 206B, wherein the first flow controlling side 100*p* of the first flow controlling element 10*p* of the flow control apparatus has a center section 1000*p* shown by a chain line, wherein the center section 1000*p* is provided in the first center portion 1111*p* of the top end 111*p* of the first flow controlling body 11*p* of the first flow controlling element 10*p*, wherein the remaining portion of the first flow controlling side 100*p* is clockwise and evenly divided into a first section 1001*p*, a second section 1002*p*, a third section 1003*p*, a fourth section 1004*p*, a fifth section 1005*p*, a sixth section 1006*p*, a seventh section 1007*p*, an eighth section 1008*p* and a ninth section 1009*p*, as shown by chain lines; wherein the second flow controlling side 200*p* of the second flow controlling element 20*p* of the flow control apparatus has a center division 2000*p*, wherein the center division 2000*p* is provided in the second center portion 2111*p* of the bottom end 211*p* of the second flow controlling body 21*p* of the second flow controlling element 20*p*, wherein the remaining portion of the second flow controlling side 200*p* is clockwise and evenly divided into a first division 2001*p*, a second division 2002*p*, a third division 2003*p*, a fourth division 2004*p*, a fifth division 2005*p*, a sixth division 2006*p*, a seventh division 2007*p*, an eighth division 2008*p* and a ninth division 1009*p*; wherein the first channel 101*p* is downwardly extended from the first section 1001*p*, the second section 1002*p* and the third section 1003*p* of the first flow controlling side 100*p*; the seventh channel 107*p* is downwardly extended from the fourth section 1004*p* of the first flow controlling side 100*p*; the fifth channel 105*p* is downwardly extended from the fifth section 1005*p* and the sixth section 1006*p* of the first flow controlling side 100*p*; the second channel 102*p* is downwardly extended from the seventh section 1007*p* of the first flow controlling side 100*p*; the third channel 103*p* is downwardly extended from the eighth section 1008*p* of the first flow controlling side 100*p*; the fourth channel 104*p* is downwardly extended from the ninth section 1009*p* of the first flow controlling side 100*p*; the ninth channel 109*p* is upwardly extended from the first division 2001*p* of the second flow controlling side 200*p*; the eleventh channel 1011*p* is upwardly extended from the fourth division 2004*p* of the second flow controlling side 200*p*; the tenth channel 1010*p* is upwardly extended from the fifth division 2005*p* and the sixth division 2006*p* of the second flow controlling side 200*p* to the upper end 212*p*.

Preferably, the third channel 103*p* is downwardly and outwardly extended from the first flow controlling side 100*p* of the first flow controlling element 10*p*; the fourth channel 104*p* is downwardly and outwardly extended from the first flow controlling side 100*p* of the first flow controlling element 10*p* and the fifth channel 105*p* is downwardly and outwardly extended from the first flow controlling side 100*p* of the first flow controlling element 10*p*.

As shown in FIG. 205, the flow control apparatus further comprises a casing 30*p* according to the thirty-third embodiment of the present disclosure, wherein the casing 30*p* comprises a casing body 31*p*, wherein the casing body 31*p* has an outer side wall 312*p* and an inner side wall 311*p* and defines an inner chamber 300*p*, wherein the first flow controlling element 10*p* is adapted for being provided in the inner chamber 300*p* and the first flow controlling side 100*p* of the first flow controlling element 10*p* is provided to face up, and the second flow controlling element 20*p* is adapted for being provided in the inner chamber 300*p* and the second flow controlling side 200*p* of the second flow controlling element 20*p* is provided to face down, wherein the first flow controlling body 11*p* of the first flow controlling element 10*p* further comprises a lower end 112*p* downwardly extended from the top end 111*p*, wherein the lower end 112*p* of the first flow controlling body 11*p* of the first flow controlling element 10*p* is connected with the inner side wall 311*p* of the casing body 31*p* of the casing 30*p* and divides spacedly the inner chamber 300*p* into a first receiving chamber 3001*p* and a second receiving chamber 3002*p*, wherein the casing 30*p* has a first opening 301*p*, a second opening 302*p*, a third opening 303*p* and a fourth opening 304*p*, wherein the first receiving chamber 3001*p* is respectively communicated with the first opening 301*p* and the ninth channel 109*p*; the second opening 302*p* is communicated with the third channel 103*p* of the flow control apparatus; the third opening 303*p* is communicated with the fourth channel 104*p* of the flow control apparatus; the fourth opening 304*p* is communicated with the fifth channel 105*p* of the flow control apparatus. Preferably, the first receiving chamber 3001*p* is respectively communicated with the first opening 301*p* and the ninth opening 1091*p* of the ninth channel 109*p*.

As shown in FIG. 205, the flow control apparatus further comprises a flow separating element 40*p* provided in second receiving chamber 3002*p* and extended downwardly form the first flow controlling body 11*p*, wherein the flow separating element 40*p* has a second flow guiding chamber 402*p* communicated with the second channel 102*p* and the seventh channel 107*p* of the flow control apparatus and the flow separating element 40*p* and the inner side wall 311*p* of the casing 30*n* define a first flow guiding chamber 401*p* therebetween, wherein the first flow guiding chamber 401*p* is communicated with the first channel 101*p*.

As shown in FIG. 205, the flow control apparatus further comprises a flow guiding element 50*p*, wherein the flow guiding element 50*p* comprises a flow guiding body 51*p*, wherein the flow guiding body 51*p* defines a first flow guiding channel 510*p*, wherein the flow guiding body 51*p* of the flow guiding element 50*p* is upwardly extended from the second flow controlling body 21*p* of the second flow controlling element 20*p* and the first flow guiding channel 510*p* of the first flow guiding element 50*p* is communicated with the eleventh channel 1011*p* of the flow control apparatus.

As shown in FIG. 206A to FIG. 206C, the flow control apparatus further comprises a wear-resistant member 60*p* detachably provided between the first flow controlling element 10*p* and the second flow controlling element 20*p*, wherein the wear-resistant member 60*p* comprises a wear-resistant body 61*p*, wherein the wear-resistant body 61*p* has a wear-resistant side 610*p* adapted for contacting physically with the second flow controlling side 200*p* of the second flow controlling body 21*p*, wherein the wear-resistant side 610*p* is treated by a wear-resistant process to minimize the force of friction, which is resulted from the rotating of the first flow controlling body 11*p* of the first flow controlling element 10*p* relative to the second flow controlling body 21*p* of the second flow controlling element 20*p* so as to prolong the life-span of the flow control apparatus. The wear-resistant member 60*p* is further sized and shaped to match the first flow controlling side 100*p* of the first flow controlling element 10*p* and the wear-resistant body 61*p* of the wear-resistant member 60*p* defines spacedly a first port 601*p*, a second port 602*p*, a third port 603*p*, a fourth port 604*p*, a fifth port 605*p* and a seventh port 607*p*, wherein the first port 601*p*, the second port 602*p*, the third port 603*p*, the fourth port 604*p*, the fifth port 605*p* and the seventh port 607*p* are respectively sized and shaped to match the first channel 101*p*, the second channel 102*p*, the third channel 103*p*, the fourth channel 104*p*, the fifth channel 105*p* and the seventh channel 107*p* of the flow control apparatus.

It is worth mentioning that when the flow control apparatus further comprises a twelfth channel 1012*p* provided in the first center portion 1111*p* of the top end 111*p* of the first flow controlling body 11*p* of the first flow controlling element 10*p*, the wear-resistant member 60*p* further has a twelfth port 6012*p* corresponding to the twelfth channel 1012*p*, as shown in FIG. 206F.

As shown in FIG. 208, the flow control apparatus further comprises an injector 70*p*, wherein the injector 70*p* is provided in the outer side wall 312*p* of the casing body 31*p* of the casing 30*p* of the flow control apparatus, wherein the injector 70*p* is respectively communicated with the third opening 303*p* and the fourth opening 304*p* of the casing 30*p*.

As shown in 205, the flow control apparatus further comprises an auxiliary unit 80*p*, wherein the auxiliary unit 80*p* comprises a driving element 81*p* upwardly extended from the second flow controlling body 21*p* of the second flow controlling element 20*p*, wherein the driving element 81*p* is adapted for driving the second flow controlling body 21*p* of the second flow controlling element 20*p* of the flow control apparatus to rotate relative to the first controlling body 11*p* of the first flow controlling element 10*p*. The auxiliary unit 80*p* further comprises a fixing element 82*p* extended upwardly from the driving element 81*p*, wherein the fixing element 82*p* is adapted for holding the driving element 81*p* at a position to hold the second flow controlling body 21*p* of the second flow controlling element 20*p* at a position. Preferably, the driving element 81*p* of the auxiliary unit 80*p* of the flow control apparatus is integrated with the flow guiding body 51*p* of the flow guiding element 50*p*.

An alternative of the flow control apparatus according to the thirty-third embodiment of the present disclosure is shown in FIG. 206D and FIG. 206E, wherein the first flow controlling body 11*p* of the flow control apparatus further comprises a first center portion 1111*p*, a first edge portion 1112*p* and a first middle portion 1113*p* extended between the first center portion 1111*p* and the first edge portion 1112*p*, wherein the flow control apparatus further comprises a twelfth channel 1012*p* provided in the first center portion 1111*p* of the top end 111*p* of the first flow controlling body 11*p* of the first flow controlling element 10*p*, and the eleventh channel 1011*p* is extended upwardly from the second flow controlling side 200*p* of the bottom end 211*p* of the second flow controlling body 21*p* to the upper end 212*p* and extended from the second center portion 2111*p* of the second flow controlling element 20*p* to the second middle portion 2113*p* thereof. Preferably, the center section 1000*p* of the first flow controlling side 100*p* is provided in the first center portion 1111*p* of the top end 111*p* of the first flow controlling body 11*p* of the first flow controlling element 10*p*, and the eleventh channel 1011*p* is upwardly extended from the fourth division 2004*p* and the center division 2000*p* of the second flow controlling side 200*p*.

Referring to FIG. 208, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90*p*, wherein the water treatment device 90_p_ comprises a water treatment container 91_p_, a liquid collecting unit 92_p_ and a water treatment unit 93_p_, wherein the water treatment container 91_p_ has a water treatment chamber 900_p_ and an upper opening 910_p_, the liquid collecting unit 92_p_ comprises a center pipe 921_p_, the water treatment unit 93_p_ is adapted for being received in the water treatment chamber 900_p_, the center pipe 921_p_ is adapted for being extended downwardly through the upper opening 910_p_ to enter into the water treatment chamber 900_p_, and the center pipe 921_p_ and the upper opening 910_p_ defines an outer opening 9101_p_, wherein the center pipe 921_p_ has an upper opening 9211_p_ and a lower opening 9212_p_, wherein the liquid in the water treatment container 91_p_, such as water, is adapted for being treated by the water treatment unit 93_p_ and flows from the lower opening 9212_p_ of the center pipe 921_p_ of the liquid collecting unit 92_p_ into the center pipe 921_p_ and flows out of the center pipe 921_p_; preferably, the water treatment unit 93_p_ provided in the water treatment container 91_p_ comprises water treatment material, such as softening resin, activated carbon or the like, or the combination thereof.

It is worth mentioning that the outer opening 9101_p_ of the water treatment device 90_p_ of the water treatment system may be communicated with the first channel 101_p_ of the flow control apparatus, or the second channel 102_p_ and the seventh channel 107_p_ of the flow control apparatus, the upper opening 9211_p_ of the central pipe 921_p_ of the liquid collecting unit 92_p_ of the water treatment device 90_p_ may be communicated with the first channel 101_p_ of the flow control apparatus, or the second channel 102_p_ and the seventh channel 107_p_ of the flow control apparatus; wherein when the outer opening 9101_p_ of the water treatment device 90_p_ is communicated with the first channel 101_p_ of the flow control apparatus, the upper opening 9211_p_ of the central pipe 921_p_ of the liquid collecting unit 92_p_ of the water treatment device 90_p_ is communicated with the second channel 102_p_ and the seventh channel 107_p_ of the flow control apparatus; when the outer opening 9101_p_ of the water treatment device 90_p_ of the water treatment system is communicated with the second channel 102_p_ and the seventh channel 107_p_ of the flow control apparatus, the upper opening 9211_p_ of the central pipe 921_p_ of the liquid collecting unit 92_p_ of the water treatment device 90_p_ is communicated with the first channel 101_p_ of the flow control apparatus.

As shown in FIG. 208, the flow control apparatus further comprises a brine supply container 84_p_, wherein the injector 70_p_ may be communicated with the brine supply container 84_p_, wherein when the flow control apparatus is under the third working state, the fluid from the third opening 303_p_ may flow into the injector 70_p_ and make the liquid in the brine supply container 84_p_ flow into the fourth opening 304_p_ of the casing 30_p_. Preferably, the outer opening 9101_p_ of the water treatment device 90_p_ of the water treatment system and the upper opening 9211_p_ of the central pipe 921_p_ of the water treatment device 90_p_ are respectively adapted to be communicated with the first flow guiding chamber 401_p_ and the second flow guiding chamber 402_p_ of the flow control apparatus, wherein when the outer opening 9101_p_ of the water treatment device 90_p_ is communicated with the first flow guiding chamber 401_p_ of the flow control apparatus, the upper opening 9211_p_ of the central pipe 921_p_ of the water treatment device 90_p_ is communicated with the second flow guiding chamber 402_p_ of the flow control apparatus, and when the flow control apparatus is under the third working state, the fluid from the brine supply container 84_p_ can flow through the injector 70_p_ and flow into the seventh channel 107_p_, and then flow into the water treatment container 91_p_ via the second flow guiding chamber 402_n_ and the central pipe 921_p_ of the liquid collecting unit 92_p_ of the water treatment device 90_p_. And when the outer opening 9101_p_ of the water treatment device 90_p_ of the water treatment system is communicated with the second flow guiding chamber 402_p_, the upper opening 9211_p_ of the central pipe 921_p_ of the water treatment device 90_p_ is communicated with the first flow guiding chamber 401_p_ of the flow control apparatus, and when the flow control apparatus is under the third working state, the fluid from the brine supply container 84_p_ can flow through the injector 70_p_ and flow into the seventh channel 107_p_, and then flow into the water treatment container 91_p_ via the second flow guiding chamber 402_p_ and the outer opening 9101_p_ of the water treatment device 90_p_. In other words, when the outer opening 9101_p_ of the water treatment device 90_p_ is communicated with the first flow guiding chamber 401_p_ of the flow control apparatus and the upper opening 9211_p_ of the central pipe 921_p_ of the water treatment device 90_p_ is communicated with the second flow guiding chamber 402_p_ of the flow control apparatus, the fluid from the brine supply container 84_p_ can flow through the water treatment unit 93_p_ from bottom to top; and when the outer opening 9101_p_ of the water treatment device 90_p_ is communicated with the second flow guiding chamber 402_p_ of the flow control apparatus and the upper opening 9211_p_ of the central pipe 921_p_ of the water treatment device 90_p_ is communicated with the first flow guiding chamber 401_p_ of the flow control apparatus, the fluid from the brine supply container 84_p_ can flow through the water treatment unit 93_p_ from top to bottom. Preferably, the liquid in the brine supply container 84_p_ is regeneration solution for the water treatment unit 93_p_ of the water treatment device 90_p_, so by controlling the communicating type that the outer opening 9101_p_ and the upper opening 9211_p_ of the central pipe 921_p_ of the water treatment device 90_p_ are communicated with the flow control apparatus to control the regeneration solution from the brine supply container 84_p_ of the water treatment unit 93_p_ to regenerate and elute the water treatment unit 93_p_.

Similarly, when the outer opening 9101_p_ of the water treatment device 90_p_ is communicated with the second flow guiding chamber 402_p_ and the upper opening 9211_p_ of the central pipe 921_p_ of the water treatment device 90_p_ is communicated with the first flow guiding chamber 401_p_, and when the flow control apparatus is under the first working state and the liquid flows from the flow control apparatus into the water treatment container 91_p_, the liquid flows through the water treatment unit 93_p_ from bottom to top.

It is worth mentioning that when the flow control apparatus is under the second working state, the ninth channel 109_p_ is communicated with the second channel 102_p_ and the eleventh channel 1011_p_ is communicated with the first channel 101_p_ such that the waste water from the water treatment container 91_p_ of the water treatment device 90_p_ is able to be drained via the eleventh channel 1011_p_; when the flow control apparatus is under the third working state, the ninth channel 109_p_ is communicated with the fourth channel 104_p_, the tenth channel 1010_p_ is communicated with the seventh channel 107_p_ and the fifth channel 105_p_, the eleventh channel 1011_p_ is communicated with the first channel 101_p_ such that the waste water from the water treatment container 91_p_ of the water treatment device 90_p_ is able to be drained via the eleventh channel 1011_p_; when the flow control apparatus is under the fifth working state, the ninth channel 109_p_ of the flow control apparatus is communicated with the first channel 101_p_, and the eleventh channel 1011_p_ is communicated with the seventh channel 107_p_ such that the waste water from the water treatment container 91_p_ of the water treatment device 90_p_ is able to be drained upwardly via the eleventh channel 1011_p_. So the waste water from the water treatment system may be upwardly drained via the eleventh channel 1011_p_ such that the eleventh channel 1011_p_ for drainage does not reduce the sizes of the first channel 101_p_, the second channel 102_p_, the third channel 103_p_, the fourth channel 104_p_, the fifth channel 105_p_ and the seventh channel 107_p_ of the flow control apparatus and decreases the interference resulted from the first channel 101_p_, the second channel 102_p_, the third channel 103_p_, the fourth channel 104_p_, the fifth channel 105_p_ and the seventh channel 107_p_ provided in the first flow controlling body 11_p_ of the first flow controlling element 10_p_. In other words, because the eleventh channel 1011_p_ upwardly penetrates through the second flow controlling body 21_p_ of the second flow controlling element 20_p_, so the waste water from the water treatment system may flow through the eleventh channel 1011_p_ and flow upwardly into the flow guiding element 50_p_ to be drained via the first flow guiding channel 510_p_ of the flow guiding element 50_p_.

As shown in FIG. 208 is an operation schematic diagram of the water treatment system installed with the flow control apparatus of the present disclosure, as shown in FIG. 207A, when the flow control apparatus is under the first working state, the water treatment system is in a water treating state, raw water (water to be processed) may flow from the first opening 301_p_ of the casing 30_n_ of the flow control apparatus into the ninth channel 109_p_ and the first channel 101_p_, and then flow through the outer opening 9101_p_ of the water treatment system and flow into the water treatment chamber 900_p_ of the water treatment system, and then flow upwardly into the second channel 102_p_ and the third channel 103_p_ of the flow control apparatus via the central pipe 921_p_ of the liquid collecting unit 92_p_ of the water treatment system, and then flow out through the second opening 302_p_ of the casing 30_p_ of the flow control apparatus; as shown in FIG. 207B, when the flow control apparatus is under the second working state, the water treatment system is in a backwash state, raw water (water to be processed) may flow from the first opening 301_p_ of the casing 30_p_ of the flow control apparatus into the ninth channel 109_p_ and the second channel 102_p_, and then flow through the upper opening 9211_p_ of the central pipe 921_p_ of the water treatment system and flow through the water treatment chamber 900_p_ of the water treatment system from bottom to top, and then flow into the first channel 101_p_ of the flow control apparatus via the outer opening 9101_p_ of the water treatment system, and then flow out through the eleventh channel 1011_p_ and the first flow guiding channel 510_p_; as shown in FIG. 207C, when the flow control apparatus is under the third working state, the water treatment system is in an upflow brine intaking state, raw water (water to be processed) may flow from the first opening 301_p_ of the casing 30_p_ of the flow control apparatus into the ninth channel 109_p_ and the fourth channel 104_p_, and then flow through the third opening 303_p_ into the injector 70_p_ to be injected, and after being mixed with the liquid from the brine supply container 84_p_, the mixture may flow into the fourth opening 304_p_, and then flow through the seventh channel 107_p_ via the fifth channel 105_p_, and then flow through the water treatment chamber 900_p_ from bottom to top via the upper opening 9211_p_ of the water treatment system, and then flow through the first channel 101_p_ via the outer opening 9101_p_ of the water treatment system, at last flow out through the eleventh channel 1011_p_ and the first flow guiding channel 510_p_; as shown in FIG. 207D, when the flow control apparatus is under the fourth working state, the water treatment system is in a softened water supplement state and the softened water is made from the water treatment chamber 900_p_, raw water (water to be processed) may flow from the ninth channel 109_p_ and the first channel 101_p_ of the flow control apparatus into the water treatment chamber 900_p_ of the water treatment system, and then flow into the second channel 102_p_ and the fifth channel 105_p_ via the central pipe of the water treatment device of the water treatment system, and then flow into the injector 70_p_ via the fourth opening 304_p_ to supplement water into the brine supply container 84_p_. As shown in FIG. 207E, when the flow control apparatus is under the fifth working state, the water treatment system is in a forwardwash state, raw water (water to be processed) may flow from the first opening 301_p_ of the casing 30_p_ of the flow control apparatus into the ninth channel 109_p_ and the first channel 101_p_, and then flow into the water treatment chamber 900_p_ via the outer opening 9101_p_ of the water treatment system and flow upwardly into the seventh channel 107_p_ via the central pipe 921_p_ of the liquid collecting unit 92_p_ of the water treatment system, and then flow out through the eleventh channel 1011_p_ and the flow guiding channel 510_p_; as shown in FIG. 207. F, when the flow control apparatus is under a sixth working state, the water treatment system is in a water supplement state and the water for supplementing comes from the first opening 301_p_, wherein raw water (water to be processed) may flow from the first opening 301_p_ of the casing 30_p_ of the flow control apparatus into the ninth channel 109_p_ and the fifth channel 105_p_, and then flow into the injector 70_p_ via the fourth opening 304_p_ to supplement water into the brine supply container 84_p_.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93_p_ from bottom to top; when the flow control apparatus is under the third working state, the water treatment system can make the solution in the brine supply container 84_p_ flow into the water treatment container 91_p_ via the upper opening 9211_p_ of the central pipe 921_p_ of the water treatment device 90_p_ of the water treatment system; when the flow control apparatus is under the fourth working state, the water treatment system can supplement treated water into the brine supply container 84_p_; when the flow control apparatus is under the fifth working state, the water treatment system can achieve washing the water treatment unit 93_p_ from top to bottom; when the flow control apparatus is under the sixth working state, the water treatment system can achieve supplementing raw water into the brine supply container 84_p_.

The flow control apparatus of the present embodiment may comprise nine equal divisions and the first channel of the first flow controlling element covers three equal divisions, which is beneficial in increasing the diameters of the water channels of the flow control apparatus and the rate of flow; wherein the flow control apparatus employs a technical solution of upflow brine intaking and regeneration achieving a higher regeneration efficiency than downflow brine intaking and regeneration among domestic small-capacity water softeners using softening resin as treating material and brine as regenerating agent, and it can save brine; the flow control apparatus can use softened water or raw water for supplementing water, which is an important character of the flow control apparatus of the present embodiment, that is, the flow control apparatus of the present embodiment can meet the demands of different customers; at the same time, the softened water supplement is beneficial in decreasing the hardness of the brine solution of the brine supply container and increasing the regeneration efficiency thereof, and decreasing salt bridges in the brine supply container and helping the brine to be dissolved; and the flow control apparatus of the present embodiment has an anticipated aligning order of working states as flows: water treating working state->>backwash working state->>upflow brine intaking working state->>forwardwash working state->>softened water supplement working state, so the flow control apparatus is able to help to finish all of working states when the moving valve disc rotates for a single circle, which decreases the rotating distance of the moving valve disc and prolongs the life-span of the flow control apparatus.

Referring to FIG. 209 to FIG. 211B of the drawings of the present disclosure, a flow control apparatus according to a thirty-fourth preferred embodiment of the present disclosure is illustrated, which is adapted for being used for controlling fluid to flow in multiple directions, wherein the flow control apparatus comprises a first flow controlling element 10*r* and a second flow controlling element 20*r* provided rotatably on the first flow controlling element 10*r*, wherein the first flow controlling element 10*r* comprises a first flow controlling body 11*r*, wherein the first flow controlling body 11*r* comprises a top end 111*r*, wherein the top end 111*r* defines a first flow controlling side 100*r*; wherein the second flow controlling element 20*r* comprises a second flow controlling body 21*r*, wherein the second flow controlling body 21*r* comprises a bottom end 211*r* and an upper end 212*r* upwardly extended from the bottom, wherein the bottom end 211*r* defines a second flow controlling side 200*r*, wherein the first flow controlling side 100*r* of the first flow controlling element 10*r* is adapted for contacting physically with the second flow controlling side 200*r* of the second flow controlling element 20*r*.

As shown in FIG. 210 to FIG. 211B, the first flow controlling body 11*r* of the flow control apparatus further comprises a first center portion 1111*r*, a first edge portion 1112*r* and a first middle portion 1113*r* extended between the first center portion 1111*r* and the first edge portion 1112*r*, wherein the bottom end 211*r* of the second flow controlling body 21*r* of the second flow controlling element 20*r* further comprises a second center portion 2111*r*, a second edge portion 2112*r* and a second middle portion 2113*r* extended between the second center portion 2111*r* and the second edge portion 2112*r*, wherein the flow control apparatus has a first channel 101*r*, a second channel 102*r*, a third channel 103*r*, a fourth channel 104*r*, a fifth channel 105*r* and a seventh channel 107*r* provided respectively in the first flow controlling body 11*r* of the first flow controlling element 10*r*, and a ninth channel 109*r*, tenth channel 1010*r* and an eleventh channel 1011*r* provided respectively in the second flow controlling body 21*r* of the second flow controlling element 20*r*, wherein the first channel 101*r* is downwardly extended from the first flow controlling side 100*r* of the first flow controlling element 10*r*; wherein the second channel 102*r* is downwardly extended from the first flow controlling side 100*r* of the first flow controlling element 10*r*; wherein the third channel 103*r* is downwardly extended from the first flow controlling side 100*r* of the first flow controlling element 10*r*; wherein the fourth channel 104*r* is downwardly extended from the first flow controlling side 100*r* of the first flow controlling element 10*r*; wherein the fifth channel 105*r* is downwardly extended from the first flow controlling side 100*r* of the first flow controlling element 10*r*; the seventh channel 107*r* is downwardly extended from the first flow controlling side 100*r* of the first flow controlling element 10*r*, wherein the ninth channel 109*r* is extended upwardly from the second flow controlling side 200*r* of the bottom end 211*r* of the second flow controlling body 21*r* and extended from the second middle portion 2113*r* of the second flow controlling body 21*r* to the second edge portion 2112*r* and defines a ninth opening 1091*r* communicated with an outer space thereof; wherein the tenth channel 1010*r* is extended from the second flow controlling side 200*r* of the bottom end 211*r* of the second flow controlling body 21*r* to the upper end 212*r* and extended from second middle portion 2113*r* of the bottom end 211*r* of the second flow controlling body 21*r* to the second edge portion 2112*r*; wherein the eleventh channel 1011*r* is extended upwardly from the second flow controlling side 200*r* of the bottom end 211*r* of the second flow controlling body 21*r* and penetrates through the second flow controlling body 21*r* of the second flow controlling element 20*r*. In other words, the ninth opening 1091*r* of the ninth channel 109*r* is provided to keep being communicated with an outer space, especially the outer space of the second flow controlling element 20*r*.

As shown in FIG. 212A to FIG. 212E, the second flow controlling element 20*r* is able to rotate relative to the first flow controlling element 10*r* so that the flow control apparatus has a first working state, a second working state, a third working state, a fourth working state and a fifth working state, wherein when the flow control apparatus is in the first working state, the ninth channel 109*r* is communicated with the first channel 101*r*, wherein the tenth channel 1010*r* is communicated with the second channel 102*r* and the third channel 103*r*; wherein when the control apparatus is in the second working state, the ninth channel 109*r* is communicated with the seventh channel 107*r*, and the eleventh channel 1011*r* is communicated with the first channel 101*r*; wherein when the flow control apparatus is in the third working state, the ninth channel 109*r* is communicated with the fourth channel 104*r*, the tenth channel 1010*r* is communicated with the fifth channel 105*r* and the first channel 101*r*, the eleventh channel 1011*r* is communicated with the second channel 102*r*; wherein when the flow control apparatus is in the fourth working state, the ninth channel 109*r* is communicated with the fifth channel 105*r*; wherein when the flow control apparatus is in the fifth working state, the ninth channel 109*r* of the flow control apparatus is communicated with the first channel 101*r*, and the eleventh channel 1011*r* is communicated with the seventh channel 107*r*. Preferably, when the flow control apparatus is in the first working state, the eleventh channel 1011*r* is communicated with the fifth channel 105*r*; when the flow control apparatus is in the second working state, the tenth channel 1010*r* is communicated with the fourth channel 104*r* and the fifth channel 105*r*; wherein when the flow control apparatus is in the fourth working state, the tenth channel 1010*r* is communicated with the first channel 101*r*, and the eleventh channel 1011*r* is communicated with the third channel 103*r*; when the flow control apparatus is in the fifth working state, the tenth channel 1010*r* is communicated with the first channel 101*r*.

Preferably, when the flow control apparatus is in the first working state, the fourth channel 104*r* and the seventh channel 107*r* is blocked by the second flow controlling element 20*r*; when the flow control apparatus is in the second working state, the third channel 103*r* and the second channel 102*r* are blocked by the second flow controlling element 20*r*; when the flow control apparatus is in the third working state, the third channel 103$r$ and the seventh channel 107$r$ is blocked by the second flow controlling element 20$r$; when the flow control apparatus is in fourth working state, the second channel 102$r$, the fourth channel 104$r$ and the seventh channel 107$r$ is blocked by the second flow controlling element 20$r$; when the flow control apparatus is in the fifth working state, the second channel 102$r$, the third channel 103$r$, the fourth channel 104$r$ and the fifth channel 105$r$ are blocked by the second flow controlling element 20$r$.

It is worth mentioning that the first channel 101$r$, the fifth channel 105$r$, the fourth channel 104$r$, the seventh channel 107$r$, the third channel 103$r$ and the second channel 102$r$ of the flow control apparatus are respectively and spacedly provided in the first flow controlling body 11$r$ of the first flow controlling element 10$r$; the ninth channel 109$r$, the tenth channel 1010$r$ and the eleventh channel 1011$r$ are respectively and spacedly provided in the second flow controlling body 21$r$ of the second flow controlling element 20$r$.

Alternatively, each of the first flow controlling side 100$r$ of the first flow controlling body 11$r$ of the first flow controlling element 10$r$ and the second flow controlling side 200$r$ of the second flow controlling body 21$r$ of the second flow controlling element 20$r$ is circular-shaped, wherein the first channel 101$r$, the second channel 102$r$, the third channel 103$r$, the fourth channel 104$r$, the fifth channel 105$r$ and the seventh channel 107$r$ are radially provided in the first flow controlling side 100$r$ of the first flow controlling element 10$r$, and the ninth channel 109$r$, the tenth channel 1010$r$, and the eleventh channel 1011$r$ are radially provided in the second flow controlling side 200$r$ of the second flow controlling element 20$r$.

As shown in FIG. 211A and FIG. 211B, the first channel 101$r$, the fifth channel 105$r$, the fourth channel 104$r$, the seventh channel 107$r$, the third channel 103$r$ and the second channel 102$r$ of the flow control apparatus are arranged clockwise in the first flow controlling body 11$r$ of the first flow controlling element 10$r$ in the order thereof; the ninth channel 109$r$, the eleventh channel 1011$r$ and the tenth channel 1010$r$ of the flow control apparatus are arranged clockwise in the second flow controlling body 21$r$ of the second flow controlling element 20$r$ in the order thereof.

Alternatively, the first channel 101$r$, the fifth channel 105$r$, the fourth channel 104$r$, the seventh channel 107$r$, the third channel 103$r$ and the second channel 102$r$ of the flow control apparatus are arranged counter-clockwise in the first flow controlling body 11$r$ of the first flow controlling element 10$r$ in the order thereof; the ninth channel 109$r$, the eleventh channel 1011$r$ and the tenth channel 1010$r$ of the flow control apparatus are arranged counter-clockwise in the second flow controlling body 21$r$ of the second flow controlling element 20$r$ in the order thereof.

As shown in FIG. 211A and FIG. 211B, wherein the first flow controlling side 100$r$ of the first flow controlling element 10$r$ of the flow control apparatus has a center section 1000$r$ shown by a chain line, wherein the center section 1000$r$ is provided in the first center portion 1111$r$ of the top end 111$r$ of the first flow controlling body 11$r$ of the first flow controlling element 10$r$, wherein the remaining portion of the first flow controlling side 100$r$ is clockwise and evenly divided into a first section 1001$r$, a second section 1002$r$, a third section 1003$r$, a fourth section 1004$r$, a fifth section 1005$r$, a sixth section 1006$r$, a seventh section 1007$r$ and an eighth section 1008$r$, as shown by chain lines; wherein the second flow controlling side 200$r$ of the second flow controlling element 20$r$ of the flow control apparatus has a center division 2000$r$, wherein the center division 2000$r$ is provided in the second center portion 2111$r$ of the bottom end 211$r$ of the second flow controlling body 21$r$ of the second flow controlling element 20$r$, wherein the remaining portion of the second flow controlling side 200$r$ is clockwise and evenly divided into a first division 2001$r$, a second division 2002$r$, a third division 2003$r$, a fourth division 2004$r$, a fifth division 2005$r$, a sixth division 2006$r$, a seventh division 2007$r$ and an eighth division 2008$r$; wherein the first channel 101$r$ is downwardly extended from the first section 1001$r$, the second section 1002$r$ and the third section 1003$r$ of the first flow controlling side 100$r$; the fifth channel 105$r$ is downwardly extended from the fourth section 1004$r$ of the first flow controlling side 100$r$; the fourth channel 104$r$ is downwardly extended from the fifth section 1005$r$ of the first flow controlling side 100$r$; the seventh channel 107$r$ is downwardly extended from the sixth section 1006$r$ of the first flow controlling side 100$r$; the third channel 103$r$ is downwardly extended from the seventh section 1007$r$ of the first flow controlling side 100$r$; the second channel 102$r$ is downwardly extended from the eighth section 1008$r$ of the first flow controlling side 100$r$; the ninth channel 109$r$ is upwardly extended from the first division 2001$r$ of the second flow controlling side 200$r$; the eleventh channel 1011$r$ is upwardly extended from the fourth division 2004$r$ of the second flow controlling side 200$r$; the tenth channel 1010$r$ is upwardly extended from the seventh division 2007$r$ and the eighth channel 2008$r$ of the second flow controlling side 200$r$.

Preferably, the third channel 103$r$ is downwardly and outwardly extended from the first flow controlling side 100$r$ of the first flow controlling element 10$r$; the fourth channel 104$r$ is downwardly and outwardly extended from the first flow controlling side 100$r$ of the first flow controlling element 10$r$ and the fifth channel 105$r$ is downwardly and outwardly extended from the first flow controlling side 100$r$ of the first flow controlling element 10$r$.

As shown in FIG. 210, the flow control apparatus further comprises a casing 30$r$ according to the thirty-fourth embodiment of the present disclosure, wherein the casing 30$n$ comprises a casing body 31$r$, wherein the casing body 31$r$ has an outer side wall 312$r$ and an inner side wall 311$r$ and defines an inner chamber 300$r$, wherein the first flow controlling element 10$r$ is adapted for being provided in the inner chamber 300$r$ and the first flow controlling side 100$r$ of the first flow controlling element 10$r$ is provided to face up, and the second flow controlling element 20$r$ is adapted for being provided in the inner chamber 300$r$ and the second flow controlling side 200$r$ of the second flow controlling element 20$r$ is provided to face down, wherein the first flow controlling body 11$r$ of the first flow controlling element 10$r$ further comprises a lower end 112$r$ downwardly extended from the top end 111$r$, wherein the lower end 112$r$ of the first flow controlling body 11$r$ of the first flow controlling element 10$r$ is connected with the inner side wall 311$r$ of the casing body 31$r$ of the casing 30$r$ and divides spacedly the inner chamber 300$r$ into a first receiving chamber 3001$r$ and a second receiving chamber 3002$r$, wherein the casing 30$r$ has a first opening 301$r$, a second opening 302$r$, a third opening 303$r$ and a fourth opening 304$r$, wherein the first receiving chamber 3001$r$ is respectively communicated with the first opening 301$r$ and the ninth channel 109$r$; the second opening 302$r$ is communicated with the third channel 103$r$ of the flow control apparatus; the third opening 303$r$ is communicated with the fourth channel 104$r$ of the flow control apparatus; the fourth opening 304$r$ is communicated with the fifth channel 105$r$ of the flow control apparatus.

Preferably, the first receiving chamber 3001*r* is respectively communicated with the first opening 301*r* and the ninth opening 1091*r* of the ninth channel 109*r*.

As shown in FIG. 210, the flow control apparatus further comprises a flow separating element 40*r* provided in second receiving chamber 3002*r* and extended downwardly form the first flow controlling body 11*r*, wherein the flow separating element 40*r* has a second flow guiding chamber 402*r* communicated with the second channel 102*r* and the seventh channel 107*r* of the flow control apparatus and the flow separating element 40*r* and the inner side wall 311*r* of the casing 30*r* define a first flow guiding chamber 401*r* therebetween, wherein the first flow guiding chamber 401*r* is communicated with the first channel 101*r*.

As shown in FIG. 210, the flow control apparatus further comprises a flow guiding element 50*r*, wherein the flow guiding element 50*r* comprises a flow guiding body 51*r*, wherein the flow guiding body 51*r* defines a first flow guiding channel 510*r*, wherein the flow guiding body 51*r* of the flow guiding element 50*r* is upwardly extended from the second flow controlling body 21*r* of the second flow controlling element 20*r* and the first flow guiding channel 510*r* of the first flow guiding element 50*r* is communicated with the eleventh channel 1011*r* of the flow control apparatus.

As shown in FIG. 211A to FIG. 211C, the flow control apparatus further comprises a wear-resistant member 60*r* detachably provided between the first flow controlling element 10*r* and the second flow controlling element 20*r*, wherein the wear-resistant member 60*r* comprises a wear-resistant body 61*r*, wherein the wear-resistant body 61*r* has a wear-resistant side 610*r* adapted for contacting physically with the second flow controlling side 200*r* of the second flow controlling body 21*r*, wherein the wear-resistant side 610*r* is treated by a wear-resistant process to minimize the force of friction, which is resulted from the rotating of the first flow controlling body 11*r* of the first flow controlling element 10*r* relative to the second flow controlling body 21*r* of the second flow controlling element 20*r* so as to prolong the life-span of the flow control apparatus. The wear-resistant member 60*r* is further sized and shaped to match the first flow controlling side 100*r* of the first flow controlling element 10*r* and the wear-resistant body 61*r* of the wear-resistant member 60*r* defines spacedly a first port 601*r*, a second port 602*r*, a third port 603*r*, a fourth port 604*r*, a fifth port 605*r* and a seventh port 607*r*, wherein the first port 601*r*, the second port 602*r*, the third port 603*r*, the fourth port 604*r*, the fifth port 605*r* and the seventh port 607*r* are respectively sized and shaped to match the first channel 101*r*, the second channel 102*r*, the third channel 103*r*, the fourth channel 104*r*, the fifth channel 105*r* and the seventh channel 107*r* of the flow control apparatus.

It is worth mentioning that when the flow control apparatus further comprises a twelfth channel 1012*r* provided in the first center portion 1111*r* of the top end 111*r* of the first flow controlling body 11*r* of the first flow controlling element 10*r*, the wear-resistant member 60*r* further has a twelfth port 6012*r* corresponding to the twelfth channel 1012*r*, as shown in FIG. 211F.

As shown in FIG. 213, the flow control apparatus further comprises an injector 70*r*, wherein the injector 70*r* is provided in the outer side wall 312*r* of the casing body 31*r* of the casing 30*r* of the flow control apparatus, wherein the injector 70*r* is respectively communicated with the third opening 303*r* and the fourth opening 304*r* of the casing 30*r*.

As shown in 210, the flow control apparatus further comprises an auxiliary unit 80*r*, wherein the auxiliary unit 80*r* comprises a driving element 81*r* upwardly extended from the second flow controlling body 21*r* of the second flow controlling element 20*r*, wherein the driving element 81*r* is adapted for driving the second flow controlling body 21*r* of the second flow controlling element 20*r* of the flow control apparatus to rotate relative to the first controlling body 11*r* of the first flow controlling element 10*r*. The auxiliary unit 80*r* further comprises a fixing element 82*r* extended upwardly from the driving element 81*r*, wherein the fixing element 82*r* is adapted for holding the driving element 81*r* at a position to hold the second flow controlling body 21*r* of the second flow controlling element 20*r* at a position. Preferably, the driving element 81*r* of the auxiliary unit 80*r* of the flow control apparatus is integrated with the flow guiding body 51*r* of the flow guiding element 50*r*.

An alternative of the flow control apparatus according to the thirty-fourth embodiment of the present disclosure is shown in FIG. 211D and FIG. 211E, wherein the first flow controlling body 11*r* of the flow control apparatus further comprises a first center portion 1111*r*, a first edge portion 1112*r* and a first middle portion 1113*r* extended between the first center portion 1111*r* and the first edge portion 1112*r*, wherein the flow control apparatus further comprises a twelfth channel 1012*r* provided in the first center portion 1111*r* of the top end 111*r* of the first flow controlling body 11*r* of the first flow controlling element 10*r*, and the eleventh channel 1011*r* is extended upwardly from the second flow controlling side 200*r* of the bottom end 211*r* of the second flow controlling body 21*r* to the upper end 212*r* and extended from the second center portion 2111*r* of the second flow controlling element 20*r* to the second edge portion 2112*r* thereof. Preferably, the center section 1000*r* of the first flow controlling side 100*r* is provided in the first center portion 1111*r* of the top end 111*r* of the first flow controlling body 11*r* of the first flow controlling element 10*r*, and the eleventh channel 1011*r* is upwardly extended from the fourth division 2004*r* and the center division 2000*r* of the second flow controlling side 200*r*.

Referring to FIG. 213, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90*r*, wherein the water treatment device 90*r* comprises a water treatment container 91*r*, a liquid collecting unit 92*r* and a water treatment unit 93*r*, wherein the water treatment container 91*r* has a water treatment chamber 900*r* and an upper opening 910*r*, the liquid collecting unit 92*r* comprises a center pipe 921*r*, the water treatment unit 93*r* is adapted for being received in the water treatment chamber 900*r*, the center pipe 921*r* is adapted for being extended downwardly through the upper opening 910*r* to enter into the water treatment chamber 900*r*, and the center pipe 921*r* and the upper opening 910*r* defines an outer opening 9101*r*, wherein the center pipe 921*r* has an upper opening 9211*r* and a lower opening 9212*r*, wherein the liquid in the water treatment container 91*r*, such as water, is adapted for being treated by the water treatment unit 93*r* and flows from the lower opening 9212*r* of the center pipe 921*r* of the liquid collecting unit 92*r* into the center pipe 921*r* and flows out of the center pipe 921*r*; preferably, the water treatment unit 93*r* provided in the water treatment container 91*r* comprises water treatment material, such as softening resin, activated carbon or the like, or the combination thereof.

It is worth mentioning that the outer opening 9101*r* of the water treatment device 90*r* of the water treatment system may be communicated with the first channel 101*r* of the flow control apparatus, or the second channel 102*r* and the seventh channel 107*r* of the flow control apparatus, the upper opening 9211*r* of the central pipe 921*r* of the liquid collecting unit 92*r* of the water treatment device 90*r* may be communicated with the first channel 101*r* of the flow control apparatus, or the second channel 102*r* and the seventh channel 107*r* of the flow control apparatus; wherein when the outer opening 9101*r* of the water treatment device 90*r* is communicated with the first channel 101*r* of the flow control apparatus, the upper opening 9211*r* of the central pipe 921*r* of the liquid collecting unit 92*r* of the water treatment device 90*r* is communicated with the second channel 102*r* and the seventh channel 107*r* of the flow control apparatus; when the outer opening 9101*r* of the water treatment device 90*r* of the water treatment system is communicated with the second channel 102*r* and the seventh channel 107*r* of the flow control apparatus, the upper opening 9211*r* of the central pipe 921*r* of the liquid collecting unit 92*r* of the water treatment device 90*r* is communicated with the first channel 101*r* of the flow control apparatus.

As shown in FIG. 213, the flow control apparatus further comprises a brine supply container 84*r*, wherein the injector 70*r* may be communicated with the brine supply container 84*r*, wherein when the flow control apparatus is under the third working state, the fluid from the third opening 303*r* may flow into the injector 70*r* and make the liquid in the brine supply container 84*r* flow into the fourth opening 304*r* of the casing 30*r*. Preferably, the outer opening 9101*r* of the water treatment device 90*r* of the water treatment system and the upper opening 9211*r* of the central pipe 921*r* of the water treatment device 90*r* are respectively adapted to be communicated with the first flow guiding chamber 401*r* and the second flow guiding chamber 402*r* of the flow control apparatus, wherein when the outer opening 9101*r* of the water treatment device 90*r* is communicated with the first flow guiding chamber 401*r* of the flow control apparatus, the upper opening 9211*r* of the central pipe 921*r* of the water treatment device 90*r* is communicated with the second flow guiding chamber 402*r* of the flow control apparatus, and when the flow control apparatus is under the third working state, the fluid from the brine supply container 84*r* can flow through the injector 70*r* and flow into the first channel 101*r*, and then flow into the water treatment container 91*r* of the water treatment device 90*r* of the water treatment system via the first flow guiding chamber 401*r* and the outer opening 9101*r* of the water treatment device 90*r*. And when the outer opening 9101*r* of the water treatment device 90*r* of the water treatment system is communicated with the second flow guiding chamber 402*r* of the flow control apparatus, the upper opening 9211*r* of the central pipe 921*r* of the water treatment device 90*r* is communicated with the first flow guiding chamber 401*r* of the flow control apparatus, and when the flow control apparatus is under the third working state, the fluid from the brine supply container 84*r* can flow through the injector 70*r* and flow into the first channel 101*r*, and then flow into the water treatment container 91*r* via the first flow guiding chamber 401*m* and the central pipe 921*r* of the water treatment device 90*r* of the water treatment system. In other words, when the outer opening 9101*r* of the water treatment device 90*r* is communicated with the first flow guiding chamber 401*r* of the flow control apparatus and the upper opening 9211*r* of the central pipe 921*r* of the water treatment device 90*r* is communicated with the second flow guiding chamber 402*r* of the flow control apparatus, the fluid from the brine supply container 84*r* can flow through the water treatment unit 93*r* from top to bottom; and when the outer opening 9101*r* of the water treatment device 90*r* is communicated with the second flow guiding chamber 402*r* of the flow control apparatus and the upper opening 9211*r* of the central pipe 921*r* of the water treatment device 90*r* is communicated with the first flow guiding chamber 401*r* of the flow control apparatus, the fluid from the brine supply container 84*r* can flow through the water treatment unit 93*r* from bottom to top. Preferably, the liquid in the brine supply container 84*r* is regeneration solution for the water treatment unit 93*r* of the water treatment device 90*r*, so by controlling the communicating type that the outer opening 9101*r* and the upper opening 9211*r* of the central pipe 921*r* of the water treatment device 90*r* are communicated with the flow control apparatus to control the regeneration solution from the brine supply container 84*r* of the water treatment unit 93*r* to regenerate and elute the water treatment unit 93*r*.

Similarly, when the outer opening 9101*r* of the water treatment device 90*r* is communicated with the second flow guiding chamber 402*r* and the upper opening 9211*r* of the central pipe 921*r* of the water treatment device 90*r* is communicated with the first flow guiding chamber 401*r*, and when the flow control apparatus is under the first working state and the liquid flows from the flow control apparatus into the water treatment container 91*r*, the liquid flows through the water treatment unit 93*r* from bottom to top.

It is worth mentioning that when the flow control apparatus is under the second working state, the ninth channel 109*r* is communicated with the seventh channel 107*r* and the eleventh channel 1011*r* is communicated with the first channel 101*r* such that the waste water from the water treatment container 91*r* of the water treatment device 90*r* is able to be drained via the eleventh channel 1011*r*; when the flow control apparatus is under the third working state, the ninth channel 109*r* is communicated with the fourth channel 104*r*, the tenth channel 1010*r* is communicated with the fifth channel 105*r* and the first channel 101*r*, the eleventh channel 1011*r* is communicated with the second channel 102*r* such that the waste water from the water treatment container 91*r* of the water treatment device 90*r* is able to be drained via the eleventh channel 1011*r*; when the flow control apparatus is under the fifth working state, the ninth channel 109*r* of the flow control apparatus is communicated with the first channel 101*r*, and the eleventh channel 1011*r* is communicated with the seventh channel 107*r* such that the waste water from the water treatment container 91*r* of the water treatment device 90*r* is able to be drained upwardly via the eleventh channel 1011*r*. So the waste water from the water treatment system may be upwardly drained via the eleventh channel 1011*r* such that the eleventh channel 1011*r* for drainage does not reduce the sizes of the first channel 101*r*, the second channel 102*r*, the third channel 103*r*, the fourth channel 104*r*, the fifth channel 105*r* and the seventh channel 107*r* of the flow control apparatus and decreases the interference resulted from the first channel 101*r*, the second channel 102*r*, the third channel 103*r*, the fourth channel 104*r*, the fifth channel 105*r* and the seventh channel 107*r* provided in the first flow controlling body 11*r* of the first flow controlling element 10*r*. In other words, because the eleventh channel 1011*r* upwardly penetrates through the second flow controlling body 21*r* of the second flow controlling element 20*r*, so the waste water from the water treatment system may flow through the eleventh channel 1011*r* and flow upwardly into the flow guiding element 50*r* to be drained via the first flow guiding channel 510*r* of the flow guiding element 50*r*.

As shown in FIG. 213 is an operation schematic diagram of the water treatment system installed with the flow control apparatus of the present disclosure, as shown in FIG. 212A, when the flow control apparatus is under the first working state, the water treatment system is in a water treating state, raw water (water to be processed) may flow from the first opening 301*r* of the casing 30*r* of the flow control apparatus into the ninth channel 109*r* and the first channel 101*r*, and then flow through the outer opening 9101*r* of the water treatment system and flow into the water treatment chamber 900*r* of the water treatment system, and then flow upwardly into the second channel 102*r* and the third channel 103*r* of the flow control apparatus via the central pipe 921*r* of the liquid collecting unit 92*r* of the water treatment system, and then flow out through the second opening 302*r* of the casing 30*r* of the flow control apparatus; as shown in FIG. 212B, when the flow control apparatus is under the second working state, the water treatment system is in a backwash state, raw water (water to be processed) may flow from the first opening 301*r* of the casing 30*r* of the flow control apparatus into the ninth channel 109*r* and the seventh channel 107*r*, and then flow through the upper opening 9211*r* of the central pipe 921*r* of the water treatment system and flow through the water treatment chamber 900*r* of the water treatment system from bottom to top, and then flow into the first channel 101*r* of the flow control apparatus via the outer opening 9101*r* of the water treatment system, and then flow out through the eleventh channel 1011*r* and the first flow guiding channel 510*r*; as shown in FIG. 212C, when the flow control apparatus is under the third working state, the water treatment system is in a downflow brine intaking state, raw water (water to be processed) may flow from the first opening 301*r* of the casing 30*r* of the flow control apparatus into the ninth channel 109*r* and the fourth channel 104*r*, and then flow through the third opening 303*r* into the injector 70*r* to be injected, and after being mixed with the liquid from the brine supply container 84*r*, the mixture may flow into the fourth opening 304*r*, and then flow through the first channel 101*r* via the fifth channel 105*r*, and then flow through the water treatment chamber 900*r* via the outer opening 9101*r* of the water treatment system, and then flow upwardly into the second channel 102*r* via the central pipe of the liquid collecting unit of the water treatment system, at last flow out through the eleventh channel 1011*r* and the first flow guiding channel 510*r*; as shown in FIG. 212D, when the flow control apparatus is under the fourth working state, the water treatment system is in a water supplement state, raw water (water to be processed) may flow from the first opening 301*r* of the casing 30*r* of the flow control apparatus into the ninth channel 109*r* and the fifth channel 105*r* of the flow control apparatus, and then flow into the injector 70*r* via the fourth opening 304*r* to supplement water into the brine supply container 84*r*; as shown in FIG. 212E, when the flow control apparatus is under the fifth working state, the water treatment system is in a forwardwash state, raw water (water to be processed) may flow from the first opening 301*r* of the casing 30*r* of the flow control apparatus into the ninth channel 109*r* and the first channel 101*r* of the flow control apparatus, and flow into the water treatment chamber 900*r* of the water treatment system via the outer opening 9101*r* of the water treatment system, and then flow upwardly into the seventh channel 107*r* of the flow control apparatus via the central pipe of the liquid collecting unit of the water treatment system and flow out through the eleventh channel 1011*r* and the first flow guiding channel 510*r*.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93*r* from bottom to top; when the flow control apparatus is under the third working state, the water treatment system can make the solution in the brine supply container 84*r* flow into the water treatment container 91*r* via the outer opening 9101*r* of the water treatment system; when the flow control apparatus is under the fourth working state, the water treatment system can supplement water into the brine supply container 84*r*; when the flow control apparatus is under the fifth working state, the water treatment system can achieve washing the water treatment unit 93*r* from top to bottom.

The flow control apparatus of the present embodiment may comprise eight equal divisions and have a less number of divisions and the first channel of the first flow controlling element covers three equal divisions, which is beneficial in increasing the diameters of the water channels of the flow control apparatus and the rate of flow; wherein the flow control apparatus employs a technical solution of downflow regeneration. Because an industrial water softening machine is mostly provided to employ a great amount of the resin and the resin layer is easily scattered, so it employs a downflow regeneration, which can hold the resin layer in a stable state during the process of regenerating and not to be scattered so as to ensure a stable water quality in the water treating working state; and the flow control apparatus of the present embodiment has an anticipated aligning order of working states as flows: water treating working state->>backwash working state->>downflow brine intaking working state->>water supplement working state->>forwardwash working state, so the flow control apparatus is able to help to finish all of working states when the moving valve disc 20 rotates for a single circle, which decreases the rotating distance of the moving valve disc and prolongs the life-span of the flow control apparatus.

Referring to FIG. 214 to FIG. 216B of the drawings of the present disclosure, a flow control apparatus according to a thirty-fifth preferred embodiment of the present disclosure is illustrated, which is adapted for being used for controlling fluid to flow in multiple directions, wherein the flow control apparatus comprises a first flow controlling element 10*s* and a second flow controlling element 20*s* provided rotatably on the first flow controlling element 10*s*, wherein the first flow controlling element 10*s* comprises a first flow controlling body 11*s* and an extension portion 12*s* extended outwardly from the first flow controlling body 11*s*, wherein the first flow controlling body 11*s* comprises a top end 111*s*, wherein the top end 111*s* defines a first flow controlling side 100*s*; wherein the extension portion 12*s* is extended outwardly from the first flow controlling side 100*s* of the first flow controlling body 11*s*, wherein the second flow controlling element 20*s* comprises a second flow controlling body 21*s*, wherein the second flow controlling body 21*s* comprises a bottom end 211*s* and an upper end 212*s* upwardly extended from the bottom, wherein the bottom end 211*s* defines a second flow controlling side 200*s*, wherein the first flow controlling side 100*s* of the first flow controlling element 10*s* is adapted for contacting physically with the second flow controlling side 200*s* of the second flow controlling element 20*s*.

As shown in FIG. 215 to FIG. 216B, the top end 111*s* of the first flow controlling element 10*s* of the flow control apparatus further comprises a first center portion 1111*s*, a first edge portion 1112*s* and a first middle portion 1113*s* extended between the first center portion 1111*s* and the first edge portion 1112*s*, wherein the bottom end 211*s* of the second flow controlling body 21*s* of the second flow controlling element 20*s* further comprises a second center portion 2111*s*, a second edge portion 2112*s* and a second middle portion 2113*s* extended between the second center portion 2111*s* and the second edge portion 2112*s*, wherein the flow control apparatus has a first channel 101*s*, a second channel 102*s*, a third channel 103*s*, a fourth channel 104*s*, a fifth channel 105*s* and a seventh channel 107*s*, and a ninth channel 109*s*, a tenth channel 1010*s* and an eleventh channel 1011*s*, wherein the first channel 101*s*, the second channel 102*s*, the third channel 103*s*, the fifth channel 105*s* and the seventh channel 107*s* is respectively provided in the top end 111*s* of the first flow controlling element 10*s*, wherein the fourth channel 104*s* is provided in the extension portion 12*s* of the first flow controlling element 10*s* and the ninth channel 109*s*, the tenth channel 1010*s* and the eleventh channel 1011*s* is respectively provided in the bottom end 211*s* of the second flow controlling body 21*s* of the second flow controlling element 20*s*, wherein the first channel 101*s* is downwardly extended from the first flow controlling side 100*s* of the first flow controlling element 10*s*; wherein the second channel 102*s* is downwardly extended from the first flow controlling side 100*s* of the first flow controlling element 10*s*; wherein the third channel 103*s* is downwardly extended from the first flow controlling side 100*s* of the first flow controlling element 10*s*; wherein the fourth channel 104*s* is provided in the extension portion 12*s* of the first flow controlling element 10*s* and has a fourth channel opening 1041*s* facing up; wherein the fifth channel 105*s* is downwardly extended from the first flow controlling side 100*s* of the first flow controlling element 10*s*; wherein the seventh channel 107*s* is downwardly extended from the first flow controlling side 100*s* of the first flow controlling element 10*s*; wherein the ninth channel 109*s* is extended upwardly from the second flow controlling side 200*s* of the bottom end 211*s* of the second flow controlling body 21*s* and extended from the second middle portion 2113*s* of the second flow controlling body 21*s* to the second edge portion 2112*s* and defines a ninth opening 1091*s* communicated with an outer space thereof; wherein the tenth channel 1010*s* is extended upwardly from the second flow controlling side 200*s* of the bottom end 211*s* of the second flow controlling body 21*s* to the upper end 212*s* and extended from second middle portion 2113*s* of the bottom end 211*s* of the second flow controlling body 21*s* to the second edge portion 2112*s*; wherein the eleventh channel 1011*s* is extended upwardly from the second flow controlling side 200*s* of the bottom end 211*s* of the second flow controlling body 21*s* and penetrates through the second flow controlling body 21*s* of the second flow controlling element 20*s*. In other words, the ninth opening 1091*s* of the ninth channel 109*s* is provided to keep being communicated with an outer space, especially the outer space of the second flow controlling element 20*s*.

As shown in FIG. 217A to FIG. 217F, the second flow controlling element 20*s* is able to rotate relative to the first flow controlling element 10*s* so that the flow control apparatus has a first working state, a second working state, a third working state, a fourth working state, a fifth working state and a sixth working state, wherein when the flow control apparatus is in the first working state, the ninth channel 109*s* is communicated with the first channel 101*s*, wherein the tenth channel 1010*s* is communicated with the second channel 102*s* and the third channel 103*s*; wherein when the control apparatus is in the second working state, the ninth channel 109*s* is communicated with the second channel 102*s*, and the eleventh channel 1011*s* is communicated with the first channel 101*s*; wherein when the flow control apparatus is in the third working state, the ninth channel 109*s* is communicated with the fourth channel 104*s*, the tenth channel 1010*s* is communicated with the fifth channel 105*s* and the first channel 101*s*, the eleventh channel 1011*s* is communicated with the second channel 102*s*; wherein when the flow control apparatus is in the fourth working state, the ninth channel 109*s* is communicated with the first channel 101*s*; the tenth channel 1010*s* is communicated with the second channel 102*s* and the fifth channel 105*s*; wherein when the flow control apparatus is in the fifth working state, the ninth channel 109*s* of the flow control apparatus is communicated with the first channel 101*s*, and the eleventh channel 1011*s* is communicated with the seventh channel 107*s*; wherein when the flow control apparatus is in the sixth working state, the ninth channel 109*s* of the flow control apparatus is communicated with the fifth channel 105*s*. Preferably, when the flow control apparatus is in the first working state, the eleventh channel 1011*s* is blocked by the first flow controlling element 10*s*; when the flow control apparatus is in the second working state, the tenth channel 1010*s* is communicated with the seventh channel 107*s*; when the flow control apparatus is in the fourth working state, the eleventh channel 1011*s* is communicated with the third channel 103*s*; when the flow control apparatus is in the fifth working state, the tenth channel 1010*s* is communicated with the second channel 102*s*; when the flow control apparatus is in the sixth working state, the tenth channel 1010*s* is communicated with the third channel 103*s* and the seventh channel 107*s*, the eleventh channel 1011*s* is communicated with the first channel 101*s*.

Preferably, when the flow control apparatus is in the first working state, the fourth channel 104*s*, the fifth channel 105*s* and the seventh channel 107*s* are blocked by the second flow controlling element 20*s*; when the flow control apparatus is in second working state, the third channel 103*s*, the fourth channel 104*s* and the fifth channel 105*s* are blocked by the second flow controlling element 20*s*; when the flow control apparatus is in the third working state, the third channel 103*s* and the seventh channel 107*s* are blocked by the second flow controlling element 20*s*; when the flow control apparatus is in the fourth working state, the fourth channel 104*s* and the seventh channel 107*s* are blocked by the second flow controlling element 20*s*; when the flow control apparatus is in the fifth working state, the third channel 103*s*, the fourth channel 104*s* and the fifth channel 105*s* are blocked by the second flow controlling element 20*s*; when the flow control apparatus is in the sixth working state, the second channel 102*s* and the fourth channel 104*s* are blocked by the second flow controlling element 20*s*.

It is worth mentioning that the first channel 101*s*, the second channel 102*s*, the third channel 103*s*, the fourth channel 104*s*, the fifth channel 105*s* and the seventh channel 107*s* of the flow control apparatus are respectively and spacedly provided in the first flow controlling body 11*s* and the extension portion 12*s* of the first flow controlling element 10*s*; the ninth channel 109*s*, the tenth channel 1010*s* and the eleventh channel 1011*s* are respectively and spacedly provided in the second flow controlling body 21*s* of the second flow controlling element 20*s*.

Alternatively, the first channel 101*s*, the second channel 102*s*, the third channel 103*s*, the fifth channel 105*s* and the seventh channel 107*s* are radially provided in the first flow controlling side 100*s* of the first flow controlling element 10*s*, and the ninth channel 109*s*, the tenth channel 1010*s*, and the eleventh channel 1011*s* are radially provided in the second flow controlling side 200*s* of the second flow controlling element 20*s*.

As shown in FIG. 216A and FIG. 216B, the first channel 101*s*, the seventh channel 107*s*, the third channel 103*s*, the second channel 102*s* and the fifth channel 105*s* of the flow control apparatus are arranged clockwise in the first flow controlling body 11*s* of the first flow controlling element 10*s* in the order thereof; the ninth channel 109*s*, the eleventh channel 1011*s* and the tenth channel 1010*s* of the flow control apparatus are arranged clockwise in the second flow controlling body 21*s* of the second flow controlling element 20*s* in the order thereof.

As shown in FIG. 216A and FIG. 216B, the first channel 101*s*, the seventh channel 107*s*, the third channel 103*s*, the second channel 102*s* and the fifth channel 105*s* of the flow control apparatus are arranged counter-clockwise in the first flow controlling body 11*s* of the first flow controlling element 10*s* in the order thereof; the ninth channel 109*s*, the eleventh channel 1011*s* and the tenth channel 1010*s* of the flow control apparatus are arranged counter-clockwise in the second flow controlling body 21*s* of the second flow controlling element 20*s* in the order thereof.

As shown in FIG. 216A and FIG. 216B, wherein the first flow controlling side 100*s* of the first flow controlling element 10*s* of the flow control apparatus has a center section 1000*s* shown by a chain line, wherein the center section 1000*s* is provided in the first center portion 1111*s* of the top end 111*s* of the first flow controlling body 11*s* of the first flow controlling element 10*s*, wherein the remaining portion of the first flow controlling side 100*s* is clockwise and evenly divided into a first section 1001*s*, a second section 1002*s*, a third section 1003*s*, a fourth section 1004*s*, a fifth section 1005*s*, a sixth section 1006*s*, a seventh section 1007*s*, an eighth section 1008*s* and a ninth section 1009*s*, as shown by chain lines; wherein the second flow controlling side 200*s* of the second flow controlling element 20*s* of the flow control apparatus has a center division 2000*s*, wherein the center division 2000*s* is provided in the second center portion 2111*s* of the bottom end 211*s* of the second flow controlling body 21*s* of the second flow controlling element 20*s*, wherein the remaining portion of the second flow controlling side 200*s* is clockwise and evenly divided into a first division 2001*s*, a second division 2002*s*, a third division 2003*s*, a fourth division 2004*s*, a fifth division 2005*s*, a sixth division 2006*s*, a seventh division 2007*s*, an eighth division 2008*s* and a ninth division 1009*s*; wherein the first channel 101*s* is downwardly extended from the first section 1001*s*, the second section 1002*s* and the third section 1003*s* of the first flow controlling side 100*s*; the extension portion 12*s* of the first flow control element 10*s* is outwardly and downwardly extended from the fourth section 1004*s* of the first flow controlling side 100*s*; the seventh channel 107*s* is downwardly extended from the fifth section 1005*s* of the first flow controlling side 100*s*; the third channel 103*s* is downwardly extended from the sixth section 1006*s* of the first flow controlling side 100*s*; the second channel 102*s* is downwardly extended from the seventh section 1007*s* and the eighth section 1008*s* of the first flow controlling side 100*s*; the fifth channel 105*s* is downwardly extended from the ninth section 1009*s* of the first flow controlling side 100*s*; the ninth channel 109*s* is upwardly extended from the first division 2001*s* of the second flow controlling side 200*s*; the eleventh channel 1011*s* is upwardly extended from the fourth division 2004*s* of the second flow controlling side 200*s*; the tenth channel 1010*s* is upwardly extended from the sixth division 2006*s* the seventh division 2007*s* of the second flow controlling side 200*s*.

Preferably, wherein the first channel 101*s* is downwardly and outwardly extended from the first flow controlling side 100*s* of the first flow controlling element 10*s*; wherein the second channel 102*s* is downwardly and outwardly extended from the first flow controlling side 100*s* of the first flow controlling element 10*s*; wherein the third channel 103*s* is downwardly and outwardly extended from the first flow controlling side 100*s* of the first flow controlling element 10*s*; wherein the fifth channel 105*s* is downwardly and outwardly extended from the first flow controlling side 100*s* of the first flow controlling element 10*s*; wherein the fourth channel 104*s* is extended and upwardly from the first flow controlling side 100*s* of the first flow controlling element 10*s*.

As shown in FIG. 215, the flow control apparatus further comprises a casing 30*s* according to the thirty-fifth embodiment of the present disclosure, wherein the casing 30*s* comprises a casing body 31*s*, wherein the casing body 31*s* has an outer side wall 312*s* and an inner side wall 311*s* and defines an inner chamber 300*s*, wherein the first flow controlling element 10*s* is adapted for being provided in the inner chamber 300*s* and the first flow controlling side 100*s* of the first flow controlling element 10*s* is provided to face up, and the second flow controlling element 20*s* is adapted for being provided in the inner chamber 300*s* and the second flow controlling side 200*s* of the second flow controlling element 20*s* is provided to face down, wherein the first flow controlling body 11*s* of the first flow controlling element 10*s* further comprises a lower end 112*s* downwardly extended from the top end 111*s*, wherein the lower end 112*s* of the first flow controlling body 11*s* of the first flow controlling element 10*s* is connected with the inner side wall 311*s* of the casing body 31*s* of the casing 30*s* and divides spacedly the inner chamber 300*s* into a first receiving chamber 3001*s* and a second receiving chamber 3002*s*, wherein the casing 30*s* has a first opening 301*s*, a second opening 302*s*, a third opening 303*s* and a fourth opening 304*s*, wherein the first receiving chamber 3001*s* is respectively communicated with the first opening 301*s* and the ninth channel 109*s*; the second opening 302*s* is communicated with the third channel 103*s* of the flow control apparatus; the third opening 303*s* is communicated with the fourth channel 104*s* of the flow control apparatus; the fourth opening 304*s* is communicated with the fifth channel 105*s* of the flow control apparatus. Preferably, the first receiving chamber 3001*s* is respectively communicated with the first opening 301*s* and the ninth opening 1091*s* of the ninth channel 109*s*.

As shown in FIG. 215, the flow control apparatus further comprises a flow separating element 40*s* provided in second receiving chamber 3002*s* and extended downwardly form the first flow controlling body 11*s*, wherein the flow separating element 40*s* has a second flow guiding chamber 402*s* communicated with the second channel 102*s* and the seventh channel 107*s* of the flow control apparatus and the flow separating element 40*s* and the inner side wall 311*s* of the casing 30*s* define a first flow guiding chamber 401*s* therebetween, wherein the first flow guiding chamber 401*s* is communicated with the first channel 101*s*.

As shown in FIG. 215, the flow control apparatus further comprises a flow guiding element 50*s*, wherein the flow guiding element 50*s* comprises a flow guiding body 51*s*, wherein the flow guiding body 51*s* defines a first flow guiding channel 510*s*, wherein the flow guiding body 51*s* of the flow guiding element 50*s* is upwardly extended from the second flow controlling body 21*s* of the second flow controlling element 20*s* and the first flow guiding channel 510*s* of the first flow guiding element 50*s* is communicated with the eleventh channel 1011*s* of the flow control apparatus.

As shown in FIG. 216A to FIG. 216C, the flow control apparatus further comprises a wear-resistant member 60*s* detachably provided between the first flow controlling element 10*s* and the second flow controlling element 20*s*, wherein the wear-resistant member 60*s* comprises a wear-resistant body 61*s*, wherein the wear-resistant body 61*s* has a wear-resistant side 610*s* adapted for contacting physically with the second flow controlling side 200*s* of the second flow controlling body 21*s*, wherein the wear-resistant side 610*s* is treated by a wear-resistant process to minimize the force of friction, which is resulted from the rotating of the first flow controlling body 11*s* of the first flow controlling element 10*s* relative to the second flow controlling body 21*s* of the second flow controlling element 20*s* so as to prolong the life-span of the flow control apparatus. The wear-resistant member 60*s* is further sized and shaped to match the first flow controlling side 100*s* of the first flow controlling element 10*s* and the wear-resistant body 61*s* of the wear-resistant member 60*s* spacedly defines a first port 601*s*, a second port 602*s*, a third port 603*s*, a fourth port 604*s*, a fifth port 605*s* and a seventh port 607*s*, wherein the first port 601*s*, the second port 602*s*, the third port 603*s*, the fourth port 604*s*, the fifth port 605*s* and the seventh port 607*s* are respectively sized and shaped to match the first channel 101*s*, the second channel 102*s*, the third channel 103*s*, the fourth channel 104*s*, the fifth channel 105*s* and the seventh channel 107*s* of the flow control apparatus.

It is worth mentioning that when the flow control apparatus further comprises a twelfth channel 1012*s* provided in the first center portion 1111*s* of the top end 111*s* of the first flow controlling body 11*s* of the first flow controlling element 10*s*, the wear-resistant member 60*s* further has a twelfth port 6012*s* corresponding to the twelfth channel 1012*s*, as shown in FIG. 216F.

As shown in FIG. 218, the flow control apparatus further comprises an injector 70*s*, wherein the injector 70*s* is provided in the outer side wall 312*s* of the casing body 31*s* of the casing 30*s* of the flow control apparatus, wherein the injector 70*s* is respectively communicated with the third opening 303*s* and the fourth opening 304*s* of the casing 30*s*.

As shown in 215, the flow control apparatus further comprises an auxiliary unit 80*s*, wherein the auxiliary unit 80*s* comprises a driving element 81*s* upwardly extended from the second flow controlling body 21*s* of the second flow controlling element 20*s*, wherein the driving element 81*s* is adapted for driving the second flow controlling body 21*s* of the second flow controlling element 20*s* of the flow control apparatus to rotate relative to the first controlling body 11*s* of the first flow controlling element 10*s*. The auxiliary unit 80*s* further comprises a fixing element 82*s* extended upwardly from the driving element 81*s*, wherein the fixing element 82*s* is adapted for holding the driving element 81*s* at a position to hold the second flow controlling body 21*s* of the second flow controlling element 20*s* at a position. Preferably, the driving element 81*s* of the auxiliary unit 80*s* of the flow control apparatus is integrated with the flow guiding body 51*s* of the flow guiding element 50*s*.

As shown in FIG. 216D and FIG. 216E, alternatively, the top end 111*s* of the first flow controlling body 11*s* of the flow control apparatus comprises a first center portion 1111*s*, a first edge portion 1112*s* and a first middle portion 1113*s* extended between the first center portion 1111*s* and the first edge portion 1112*s*, and the flow control apparatus further comprises a twelfth channel 1012*s*, wherein the twelfth channel 1012*s* is provided in the first center portion 1111*s* and extended downwardly from the first flow controlling side 100*s*, and the eleventh channel 1011*s* is extended upwardly from the second flow controlling side 200*s* of the bottom end 211*s* of the second flow controlling body 21*s* to the upper end 212*s* and extended from the second center portion 2111*s* of the second flow controlling body 21*s* to the second edge portion 2112*s*. Preferably, the center section 1000*s* of the first flow controlling side 100*s* is provided in the first center portion 1111*s* of the top end 111*s* of the first flow controlling body 11*s* of the first flow controlling element 10*s*, and the eleventh channel 1011*s* is upwardly extended from the fourth division 2004*s* and the center division 2000*s* of the second flow controlling side 200*s*.

Referring to FIG. 218, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90*s*, wherein the water treatment device 90*s* comprises a water treatment container 91*s*, a liquid collecting unit 92*s* and a water treatment unit 93*s*, wherein the water treatment container 91*s* has a water treatment chamber 900*s* and an upper opening 910*s*, the liquid collecting unit 92*s* comprises a center pipe 921*s*, the water treatment unit 93*s* is adapted for being received in the water treatment chamber 900*s*, the center pipe 921*s* is adapted for being extended downwardly through the upper opening 910*s* to enter into the water treatment chamber 900*s*, and the center pipe 921*s* and the upper opening 910*s* defines an outer opening 9101*s*, wherein the center pipe 921*s* has an upper opening 9211*s* and a lower opening 9212*s*, wherein the liquid in the water treatment container 91*s*, such as water, is adapted for being treated by the water treatment unit 93*n* and flows from the lower opening 9212*s* of the center pipe 921*s* of the liquid collecting unit 92*s* into the center pipe 921*s* and flows out of the center pipe 921*s*; preferably, the water treatment unit 93*s* provided in the water treatment container 91*s* comprises water treatment material, such as softening resin, activated carbon or the like, or the combination thereof.

It is worth mentioning that the outer opening 9101*s* of the water treatment device 90*s* of the water treatment system may be communicated with the first channel 101*s* of the flow control apparatus, or the second channel 102*s* and the seventh channel 107*s* of the flow control apparatus, the upper opening 9211*s* of the central pipe 921*s* of the liquid collecting unit 92*s* of the water treatment device 90*s* may be communicated with the first channel 101*s* of the flow control apparatus, or the second channel 102*s* and the seventh channel 107*s* of the flow control apparatus; wherein when the outer opening 9101*s* of the water treatment device 90*s* is communicated with the first channel 101*s* of the flow control apparatus, the upper opening 9211*s* of the central pipe 921*s* of the liquid collecting unit 92*s* of the water treatment device 90*s* is communicated with the second channel 102*s* and the seventh channel 107*s* of the flow control apparatus; when the outer opening 9101*s* of the water treatment device 90*s* of the water treatment system is communicated with the second channel 102*s* and the seventh channel 107*s* of the flow control apparatus, the upper opening 9211*s* of the central pipe 921*s* of the liquid collecting unit 92*s* of the water treatment device 90*s* is communicated with the first channel 101*s* of the flow control apparatus.

As shown in FIG. 218, the flow control apparatus further comprises a brine supply container 84*s*, wherein the injector 70*s* may be communicated with the brine supply container 84*s*, wherein when the flow control apparatus is under the third working state, the fluid from the third opening 303*s* may flow into the injector 70*s* and make the liquid in the brine supply container 84*s* flow into the fourth opening 304*s* of the casing 30*s*. Preferably, the outer opening 9101*s* of the water treatment device 90*s* of the water treatment system and the upper opening 9211*s* of the central pipe 921*s* of the water treatment device 90*s* are respectively adapted to be communicated with the first flow guiding chamber 401*s* and the second flow guiding chamber 402*s* of the flow control apparatus, wherein when the outer opening 9101*s* of the water treatment device 90*s* is communicated with the first flow guiding chamber 401*s* of the flow control apparatus, the upper opening 9211*s* of the central pipe 921*s* of the water treatment device 90*s* is communicated with the second flow guiding chamber 402*s* of the flow control apparatus, and when the flow control apparatus is under the third working state, the fluid from the brine supply container 84*s* can flow through the injector 70*s* and flow into the first channel 101*s*, and then flow into the water treatment container 91*s* of the water treatment device 90*s* of the water treatment system via the first flow guiding chamber 401*s* and the outer opening 9101*s* of the water treatment device 90*s*. And when the outer opening 9101*s* of the water treatment device 90*s* of the water treatment system is communicated with the second flow guiding chamber 402*s* of the flow control apparatus, the upper opening 9211*s* of the central pipe 921*s* of the water treatment device 90*s* is communicated with the first flow guiding chamber 401*s* of the flow control apparatus, and when the flow control apparatus is under the third working state, the fluid from the brine supply container 84*s* can flow through the injector 70*s* and flow into the first channel 101*s*, and then flow into the water treatment container 91*s* via the first flow guiding chamber 401*s* and the central pipe 921*s* of the water treatment device 90*s* of the water treatment system. In other words, when the outer opening 9101*s* of the water treatment device 90*s* is communicated with the first flow guiding chamber 401*s* of the flow control apparatus and the upper opening 9211*s* of the central pipe 921*s* of the water treatment device 90*s* is communicated with the second flow guiding chamber 402*s* of the flow control apparatus, the fluid from the brine supply container 84*s* can flow through the water treatment unit 93*s* from top to bottom; and when the outer opening 9101*s* of the water treatment device 90*s* is communicated with the second flow guiding chamber 402*s* of the flow control apparatus and the upper opening 9211*s* of the central pipe 921*s* of the water treatment device 90*s* is communicated with the first flow guiding chamber 401*s* of the flow control apparatus, the fluid from the brine supply container 84*s* can flow through the water treatment unit 93*s* from bottom to top. Preferably, the liquid in the brine supply container 84*s* is regeneration solution for the water treatment unit 93*s* of the water treatment device 90*s*, so by controlling the communicating type that the outer opening 9101*s* and the upper opening 9211*s* of the central pipe 921*s* of the water treatment device 90*s* are communicated with the flow control apparatus to control the regeneration solution from the brine supply container 84*s* of the water treatment unit 93*s* to regenerate and elute the water treatment unit 93*s*.

Similarly, when the outer opening 9101*s* of the water treatment device 90*s* is communicated with the second flow guiding chamber 402*s* and the upper opening 9211*s* of the central pipe 921*s* of the water treatment device 90*s* is communicated with the first flow guiding chamber 401*s*, and when the flow control apparatus is under the first working state and the liquid flows from the flow control apparatus into the water treatment container 91*s*, the liquid flows through the water treatment unit 93*s* from bottom to top.

It is worth mentioning that when the flow control apparatus is under the second working state, the ninth channel 109*s* is communicated with the second channel 102*s* and the eleventh channel 1011*s* is communicated with the first channel 101*s* such that the waste water from the water treatment container 91*s* of the water treatment device 90*s* is able to be drained via the eleventh channel 1011*s*; when the flow control apparatus is under the third working state, the ninth channel 109*s* is communicated with the fourth channel 104*s*, the tenth channel 1010*s* is communicated with the fifth channel 105*s* and the first channel 101*s*, the eleventh channel 1011*s* is communicated with the second channel 102*s* such that the waste water from the water treatment container 91*s* of the water treatment device 90*s* is able to be drained via the eleventh channel 1011*s*; when the flow control apparatus is under the fifth working state, the ninth channel 109*s* of the flow control apparatus is communicated with the first channel 101*s*, and the eleventh channel 1011*s* is communicated with the seventh channel 107*s* such that the waste water from the water treatment container 91*s* of the water treatment device 90*s* is able to be drained upwardly via the eleventh channel 1011*s*. So the waste water from the water treatment system may be upwardly drained via the eleventh channel 1011*s* such that the eleventh channel 1011*s* for drainage does not reduce the sizes of the first channel 101*s*, the second channel 102*s*, the third channel 103*s*, the fourth channel 104*s*, the fifth channel 105*s* and the seventh channel 107*s* of the flow control apparatus and decreases the interference resulted from the first channel 101*s*, the second channel 102*s*, the third channel 103*s*, the fourth channel 104*s*, the fifth channel 105*s* and the seventh channel 107*s* provided in the first flow controlling body 11*s* of the first flow controlling element 10*s*. In other words, because the eleventh channel 1011*s* upwardly penetrates through the second flow controlling body 21*s* of the second flow controlling element 20*s*, so the waste water from the water treatment system may flow through the eleventh channel 1011*s* and flow upwardly into the flow guiding element 50*s* to be drained via the first flow guiding channel 510*s* of the flow guiding element 50*s*.

As shown in FIG. 218 is an operation schematic diagram of the water treatment system installed with the flow control apparatus of the present disclosure, as shown in FIG. 217A, when the flow control apparatus is under the first working state, the water treatment system is in a water treating state, raw water (water to be processed) may flow from the first opening 301*s* of the casing 30*n* of the flow control apparatus into the ninth channel 109*s* and the first channel 101*s*, and then flow through the outer opening 9101*s* of the water treatment system and flow into the water treatment chamber 900*s* of the water treatment system, and then flow upwardly into the second channel 102*s* and the third channel 103*s* of the flow control apparatus via the central pipe 921*s* of the liquid collecting unit 92*s* of the water treatment system, and then flow out through the second opening 302*s* of the casing 30*s* of the flow control apparatus; as shown in FIG. 217B, when the flow control apparatus is under the second working state, the water treatment system is in a backwash state, raw water (water to be processed) may flow from the first opening 301*s* of the casing 30*s* of the flow control apparatus into the ninth channel 109*s* and the second channel 102*s*, and then flow through the upper opening 9211*s* of the central pipe 921*s* of the water treatment system and flow through the water treatment chamber 900*s* of the water treatment system from bottom to top, and then flow into the first channel 101*s* of the flow control apparatus via the outer opening 9101*s* of the water treatment system, and then flow out through the eleventh channel 1011*s* and the first flow guiding channel 510*s*; as shown in FIG. 217C, when the flow control apparatus is under the third working state, the water treatment system is in an upflow brine intaking state, raw water (water to be processed) may flow from the first opening 301*s* of the casing 30*s* of the flow control apparatus into the ninth channel 109*s* and the fourth channel 104*s*, and then flow through the third opening 303*s* into the injector 70*s* to be injected, and after being mixed with the liquid from the brine supply container 84*s*, the mixture may flow into the fourth opening 304*s*, and then flow through the first channel 101*s* via the fifth channel 105*s*, and then flow through the water treatment chamber 900*s* via the outer opening 9101*s* of the water treatment system, and then flow upwardly into the second channel 102*s* via the central pipe of the water treatment device of the water treatment system, at last flow out through the eleventh channel 1011*s* and the first flow guiding channel 510*s*; as shown in FIG. 217D, when the flow control apparatus is under the fourth working state, the water treatment system is in a softened water supplement state and the softened water is made from the water treatment chamber 900*s*, raw water (water to be processed) may flow from the first opening 301 of the casing 30 of the flow control apparatus into the ninth channel 109*s* and the first channel 101*s* of the flow control apparatus and flow into the water treatment chamber 900*s* of the water treatment system via the outer opening 9101*s* of the water treatment system, and then flow upwardly into the second channel 102*s* and the fifth channel 105*s* via the central pipe of the liquid collecting unit of the water treatment system of the water treatment system, and flow into the injector 70*s* via the fourth opening 304*s* to supplement water into the brine supply container 84*s*. As shown in FIG. 217E, when the flow control apparatus is under the fifth working state, the water treatment system is in a forwardwash state, raw water (water to be processed) may flow from the first opening 301*s* of the casing 30*s* of the flow control apparatus into the ninth channel 109*s* and the first channel 101*s*, and then flow into the water treatment chamber 900*s* via the outer opening 9101*s* of the water treatment system and flow upwardly into the seventh channel 107*s* via the central pipe 921*s* of the liquid collecting unit 92*s* of the water treatment system, and then flow out through the eleventh channel 1011*s* and the flow guiding channel 510*s*; as shown in FIG. 217. F, when the flow control apparatus is under a sixth working state, the water treatment system is in a water supplement state and the water for supplementing comes from the first opening 301*s*, wherein raw water (water to be processed) may flow from the first opening 301*s* of the casing 30*s* of the flow control apparatus into the ninth channel 109*s* and the fifth channel 105*s*, and then flow into the injector 70*s* via the fourth opening 304*s* to supplement water into the brine supply container 84*s*.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93*s* from bottom to top; when the flow control apparatus is under the third working state, the water treatment system can make the solution in the brine supply container 84*s* flow into the water treatment container 91*s* via the outer opening 9101*s* of the water treatment device 90*s* of the water treatment system; when the flow control apparatus is under the fourth working state, the water treatment system can supplement treated water into the brine supply container 84*s*; when the flow control apparatus is under the fifth working state, the water treatment system can achieve washing the water treatment unit 93*s* from top to bottom; when the flow control apparatus is under a sixth working state, the water treatment system can achieve supplementing raw water into the brine supply container 84*s*.

The flow control apparatus of the present embodiment may comprise nine equal divisions and the first channel of the first flow controlling element covers three equal divisions, which is beneficial in increasing the diameters of the water channels of the flow control apparatus and the rate of flow; wherein the flow control apparatus employs a technical solution of downflow brine intaking and regeneration. Because an industrial water softening machine is mostly provided to employ a great amount of the resin and the resin layer is easily scattered, so it employs a downflow regeneration, which can hold the resin layer in a stable state during the process of regenerating and not to be scattered so as to ensure a stable water quality in the water treating working state; wherein the flow control apparatus can use softened water or raw water for supplementing water, which is an important character of the flow control apparatus of the present embodiment, that is, the flow control apparatus of the present embodiment can meet the demands of different customers; at the same time, the softened water supplement is beneficial in decreasing the hardness of the brine solution of the brine supply container and increasing the regeneration efficiency thereof, and decreasing salt bridges in the brine supply container and helping the brine to be dissolved; wherein the flow control apparatus of the present embodiment has a very good aligning order of working states as flows: water treating working state->>backwash working state->>downflow brine intaking working state->>softened water supplement working state->>forwardwash working state, so the flow control apparatus is able to help to finish all of working states when the moving valve disc rotates for a single circle, which decreases the rotating distance of the moving valve disc and prolongs the life-span of the flow control apparatus.

Referring to FIG. 219 to FIG. 2223 of the drawings of the present disclosure, a flow control apparatus according to a thirty-sixth preferred embodiment of the present disclosure is illustrated, which is adapted for being used for controlling fluid to flow in multiple directions, wherein the flow control apparatus comprises a first flow controlling element 10*t* and a second flow controlling element 20*t* provided rotatably on the first flow controlling element 10*t*, wherein the first flow controlling element 10*t* comprises a first flow controlling body 11*t*, wherein the first flow controlling body 11*t* comprises a top end 111*t*, wherein the top end 111*t* defines a first flow controlling side 100*t*; wherein the second flow controlling element 20*t* comprises a second flow controlling body 21*t*, wherein the second flow controlling body 21*t* comprises a bottom end 211*t* and an upper end 212*t* upwardly extended from the bottom, wherein the bottom end 211*t* defines a second flow controlling side 200*t*, wherein the first flow controlling side 100*t* of the first flow controlling element 10*t* is adapted for contacting physically with the second flow controlling side 200*t* of the second flow controlling element 20*t*.

As shown in FIG. 221A to FIG. 221B, the first flow controlling body 11*t* of the flow control apparatus further comprises a first center portion 1111*t*, a first edge portion 1112*t* and a first middle portion 1113*t* extended between the first center portion 1111*t* and the first edge portion 1112*t*, wherein the bottom end 211*t* of the second flow controlling body 21*t* of the second flow controlling element 20*t* further comprises a second center portion 2111*t*, a second edge portion 2112*t* and a second middle portion 2113*t* extended between the second center portion 2111*t* and the second edge portion 2112*t*, wherein the flow control apparatus has a first channel 101*t*, a second channel 102*t*, a third channel 103*t*, a fourth channel 104*t*, a fifth channel 105*t*, a seventh channel 107*t* and an eighth channel 108*t* provided respectively in the first flow controlling body 11*t* of the first flow controlling element 10*t*, and a ninth channel 109*t*, tenth channel 1010*t* and an eleventh channel 1011*t* provided respectively in the second flow controlling body 21*t* of the second flow controlling element 20*t*, wherein the first channel 101*t* is downwardly extended from the first flow controlling side 100*t* of the first flow controlling element 10*t*; wherein the second channel 102*t* is downwardly extended from the first flow controlling side 100*t* of the first flow controlling element 10*t*; wherein the third channel 103*t* is downwardly extended from the first flow controlling side 100*t* of the first flow controlling element 10*t*; wherein the fourth channel 104*t* is downwardly extended from the first flow controlling side 100*t* of the first flow controlling element 10*t*; wherein the fifth channel 105*t* is downwardly extended from the first flow controlling side 100*t* of the first flow controlling element 10*t*; wherein the seventh channel 107*t* is downwardly extended from the first flow controlling side 100*t* of the first flow controlling element 10*t*; wherein the eighth channel 108*t* is downwardly extended from the first flow controlling side 100*t* of the first flow controlling element 10*t*, wherein the ninth channel 109*t* is extended upwardly from the second flow controlling side 200*t* of the bottom end 211*t* of the second flow controlling body 21*t* and extended from the second middle portion 2113*t* of the second flow controlling body 21*t* to the second edge portion 2112*t* and defines a ninth opening 1091*t* communicated with an outer space thereof; wherein the tenth channel 1010*t* is extended from the second flow controlling side 200*t* of the bottom end 211*t* of the second flow controlling body 21*t* and extended from second middle portion 2113*t* of the bottom end 211*t* of the second flow controlling body 21*t* to the second edge portion 2112*t*; wherein the eleventh channel 1011*t* is extended upwardly from the second flow controlling side 200*t* of the bottom end 211*t* of the second flow controlling body 21*t* and penetrates through the second flow controlling body 21*t* of the second flow controlling element 20*t*. Preferably, the first channel 101*t*, the second channel 102*t*, the third channel 103*t*, the fourth channel 104*t*, the fifth channel 105*t* and the sixth channel 106*t* are respectively provided in the first middle portion 1113*t* of the top end 111*t* of the first flow controlling body 11*t*; the tenth channel 1010*t* is extended upwardly from the second middle portion 2113*t* of the bottom end 211*t* of the second flow controlling body 21*t* to the second edge portion 2112*t*.

As shown in FIG. 222A to FIG. 222E, the second flow controlling element 20*t* is able to rotate relative to the first flow controlling element 10*t* so that the flow control apparatus has a first working state, a second working state, a third working state, a fourth working state and a fifth working state, wherein when the flow control apparatus is in the first working state, the ninth channel 109*t* is communicated with the first channel 101*t*, wherein the tenth channel 1010*t* is communicated with the second channel 102*t* and the third channel 103*t*; wherein when the control apparatus is in the second working state, the ninth channel 109*t* is communicated with the second channel 102*t*, and the eleventh channel 1011*t* is communicated with the first channel 101*t*; wherein when the flow control apparatus is in the third working state, the ninth channel 109*t* is communicated with the fourth channel 104*t*, the tenth channel 1010*t* is communicated with the eighth channel 108*t* and the seventh channel 107*t*, the eleventh channel 1011*t* is communicated with the first channel 101*t*; wherein when the flow control apparatus is in the fourth working state, the ninth channel 109*t* is communicated with the first channel 101*t*; the tenth channel 1010*t* is communicated with the second channel 102*t* and the fifth channel 105*t*; wherein when the flow control apparatus is in the fifth working state, the ninth channel 109*t* of the flow control apparatus is communicated with the first channel 101*t*, and the eleventh channel 1011*t* is communicated with the seventh channel 107*t*. Preferably, when the flow control apparatus is in the first working state, the eleventh channel 1011*t* is communicated with the eighth channel 108*t*; when the flow control apparatus is in the second working state, the tenth channel 1010*t* is communicated with the first channel 101*t*; when the flow control apparatus is in the fourth working state, the eleventh channel 1011*t* is communicated with the third channel 103*t*; when the flow control apparatus is in the fifth working state, the tenth channel 1010*t* is communicated with the third channel 103*t* and the eighth channel 108*t*.

Preferably, when the flow control apparatus is in the first working state, the fourth channel 104*t*, the fifth channel 105*t* and the seventh channel 107*t* are respectively blocked by the second flow controlling element 20*t*; when the flow control apparatus is in the second working state, the third channel 103*t*, the fourth channel 104*t*, the fifth channel 105*t*, the seventh channel 107*t* and the eighth channel 108*t* are respectively blocked by the second flow controlling element 20*t*; when the flow control apparatus is in the third working state, the second channel 102*t*, the third channel 103*t* and the fifth channel 105*t* are blocked by the second flow controlling element 20*t*; when the flow control apparatus is in the fourth working state, the fourth channel 104*t*, the seventh channel 107*t* and the eighth channel 108*t* are blocked by the second flow controlling element 20*t*; when the flow control apparatus is in the fifth working state, the second channel 102*t*, the fourth channel 104*t* and the fifth channel 105*t* is blocked by the second flow controlling element 20*t*.

As shown in FIG. 220B, the flow control apparatus further comprises a thirteenth channel 1013*t*, wherein the thirteenth channel 1013*t* is provided in the first flow controlling body 11*t* of the first flow controlling element 10*t* and extended between the fifth channel 105*t* and the eighth channel 108*t* so as to communicate the fifth channel 105*t* with the eighth channel 108*t*. Preferably, the thirteenth channel 1013*t* is extended downwardly from the first flow controlling side 100*t* of the first flow controlling element 10*t* to define an channel opening 10131*t* facing up, wherein the second flow controlling element 20*t* further comprises a sealing element 22*t*, wherein the sealing element 22*t* is extended outwardly from the second edge portion 2112*t* of the second flow controlling body 21*t* of the second flow controlling element 20*t* and adapted for sealing the channel opening 10131*t* of the thirteenth channel 1013*t* when the second flow controlling element 20*t* rotates relative to the first flow controlling element 10*t*. More preferably, the thirteenth channel 1013*t* is not communicated with the first channel 101*t*, the second channel 102*t*, the third channel 103*t*, the fourth channel 104*t* and the seventh channel 107*t*.

It is worth mentioning that the first channel 101*t*, the second channel 102*t*, the third channel 103*t*, the fourth channel 104*t*, the fifth channel 105*t*, the seventh channel 107*t* and the eighth channel 108*t* of the flow control apparatus are respectively and spacedly provided in the first flow controlling body 11*t* of the first flow controlling element 10*t*; the ninth channel 109*t*, the tenth channel 1010*t* and the eleventh channel 1011*t* are respectively and spacedly provided in the second flow controlling body 21*t* of the second flow controlling element 20*t*.

Alternatively, each of the first flow controlling side 100*t* of the first flow controlling body 11*m* of the first flow controlling element 10*t* and the second flow controlling side 200*t* of the second flow controlling body 21*m* of the second flow controlling element 20*t* is circular-shaped, wherein the first channel 101*t*, the second channel 102*t*, the third channel 103*t*, the fourth channel 104*t*, the fifth channel 105*t*, the seventh channel 107*t* and the eighth channel 108*t* are respectively and radially provided in the first flow controlling side 100*t* of the first flow controlling element 10*t*, and the ninth channel 109*t*, the tenth channel 1010*t* and the eleventh channel 1011*t* are respectively and radially provided in the second flow controlling side 200*t* of the second flow controlling element 20*t*.

As shown in FIG. 221A and FIG. 221B, the first channel 101*t*, the fourth channel 104*t*, the fifth channel 105*t*, the second channel 102*t*, the third channel 103*t*, the eighth channel 108*t* and the seventh channel 107*t* of the flow control apparatus are arranged clockwise in the first flow controlling body 11*t* of the first flow controlling element 10*t* in the order thereof; the ninth channel 109*t*, the tenth channel 1010*t* and the eleventh channel 1011*t* of the flow control apparatus are arranged clockwise in the second flow controlling body 21*t* of the second flow controlling element 20*t* in the order thereof.

Alternatively, the first channel 101*t*, the fourth channel 104*t*, the fifth channel 105*t*, the second channel 102*t*, the third channel 103*t*, the eighth channel 108*t* and the seventh channel 107*t* of the flow control apparatus are arranged counter-clockwise in the first flow controlling body 11*t* of the first flow controlling element 10*t* in the order thereof; the ninth channel 109*t*, the tenth channel 1010*t* and the eleventh channel 1011*t* of the flow control apparatus are arranged counter-clockwise in the second flow controlling body 21*t* of the second flow controlling element 20*t* in the order thereof.

As shown in FIG. 221A and FIG. 221B, wherein the first flow controlling side 100*t* of the first flow controlling element 10*t* of the flow control apparatus has a center section 1000*t* shown by a chain line, wherein the center section 1000*t* is provided in the first center portion 1111*t* of the top end 111*t* of the first flow controlling body 11*t* of the first flow controlling element 10*t*, wherein the remaining portion of the first flow controlling side 100*t* is clockwise and evenly divided into a first section 1001*t*, a second section 1002*t*, a third section 1003*t*, a fourth section 1004*t*, a fifth section 1005*t*, a sixth section 1006*t*, a seventh section 1007*t*, an eighth section 1008*t* and a ninth section 1009*t*, as shown by chain lines; wherein the second flow controlling side 200*t* of the second flow controlling element 20*t* of the flow control apparatus has a center division 2000*t*, wherein the center division 2000*t* is provided in the second center portion 2111*t* of the bottom end 211*t* of the second flow controlling body 21*t* of the second flow controlling element 20*t*, wherein the remaining portion of the second flow controlling side 200*t* is clockwise and evenly divided into a first division 2001*t*, a second division 2002*t*, a third division 2003*t*, a fourth division 2004*t*, a fifth division 2005*t*, a sixth division 2006*t*, a seventh division 2007*t*, an eighth division 2008*t* and a ninth division 1009*t*; wherein the first channel 101*t* is downwardly extended from the first section 1001*t*, the second section 1002*t* and the third section 1003*t* of the first flow controlling side 100*t*; the fourth channel 104*t* is downwardly extended from the fourth section 1004*t* of the first flow controlling side 100*t*; the fifth channel 105*t* is downwardly extended from the fifth section 1005*t* of the first flow controlling side 100*t*; the second channel 102*t* is downwardly extended from the sixth section 1006*t* of the first flow controlling side 100*t*; the third channel 103*t* is downwardly extended from the seventh section 1007*t* of the first flow controlling side 100*t*; the eighth channel 108*t* is downwardly extended from the eighth section 1008*t* of the first flow controlling side 100*t*; the seventh channel 107*t* is downwardly extended from the ninth section 1009*t* of the first flow controlling side 100*t*; the ninth channel 109*t* is upwardly extended from the first division 2001*t* of the second flow controlling side 200*t*; the tenth channel 1010*t* is upwardly extended from the fifth division 2005*t* and the sixth division 2006*t* of the second flow controlling side 200*t* to the upper end 212*t*; the eleventh channel 1011*t* is upwardly extended from the seventh division 2007*t* of the second flow controlling side 200*t*. Alternatively, the remaining portion of the first flow controlling side 100*t* of the first flow controlling element 10*t* may be counter-clockwise and evenly divided, and the remaining portion of the second flow controlling side 200*t* of the second flow controlling element 20*t* may be counter-clockwise and evenly divided.

Preferably, the first channel 101*t* is downwardly and outwardly extended from the first flow controlling side 100*t* of the first flow controlling element 10*t*; the second channel 102*t* is downwardly and outwardly extended from the first flow controlling side 100*t* of the first flow controlling element 10*t*; the third channel 103*t* is downwardly and outwardly extended from the first flow controlling side 100*t* of the first flow controlling element 10*t*; the fourth channel 104*t* is downwardly and outwardly extended from the first flow controlling side 100*t* of the first flow controlling element 10*t*; the fifth channel 105*t* is downwardly and outwardly extended from the first flow controlling side 100*t* of the first flow controlling element 10*t*; the seventh channel 107*t* is downwardly and outwardly extended from the first flow controlling side 100*t* of the first flow controlling element 10*t*; the eighth channel 108*t* is downwardly and outwardly extended from the first flow controlling side 100*t* of the first flow controlling element 10*t*.

An alternative of the flow control apparatus according to the thirtieth embodiment of the present disclosure is shown in FIG. 221D and FIG. 221E, alternatively, the first flow controlling body 11*t* of the flow control apparatus further comprises a first center portion 1111*t*, a first edge portion 1112*t* and a first middle portion 1113*t* extended between the first center portion 1111*t* and the first edge portion 1112*t*, wherein the flow control apparatus further comprises a twelfth channel 1012*t* provided in the first center portion 1111*t* and extended downwardly from the first flow controlling side 100*t*, and the eleventh channel 1011*t* is extended upwardly from the second flow controlling side 200*t* of the bottom end 211*t* of the second flow controlling body 21*t* to the upper end 212*t* and extended from the second center portion 2111*t* of the second flow controlling element 20*t* to the second edge portion 2112*t*. Preferably, the center section 1000*t* of the first flow controlling side 100*t* is provided in the first center portion 1111*t* of the top end 111*t* of the first flow controlling body 11*t* of the first flow controlling element 10*t*, and the eleventh channel 1011*t* is upwardly extended from the seventh division 2007*t* and the center division 2000*t* of the second flow controlling side 200*t*.

As shown in FIG. 220A, the flow control apparatus further comprises a casing 30*t* according to the thirty-sixth embodiment of the present disclosure, wherein the casing 30*t* comprises a casing body 31*t*, wherein the casing body 31*t* has an outer side wall 312*t* and an inner side wall 311*t* and defines an inner chamber 300*t*, wherein the first flow controlling element 10*t* is adapted for being provided in the inner chamber 300*t* and the first flow controlling side 100*t* of the first flow controlling element 10*t* is provided to face up, wherein the first flow controlling body 11*t* of the first flow controlling element 10*t* further comprises a lower end 112*t* downwardly extended from the top end 111*t*, wherein the lower end 112*t* of the first flow controlling body 11*t* of the first flow controlling element 10*m* is connected with the inner side wall 311*t* of the casing body 31*t* of the casing 30*t* and divides spacedly the inner chamber 300*t* into a first receiving chamber 3001*t* and a second receiving chamber 3002*t*, wherein the second flow controlling element 20*t* is adapted for being provided in the first receiving chamber 3001*t* and the second flow controlling side 200*t* of the second flow controlling element 20*t* is provided to face down, wherein the casing 30*t* has a first opening 301*t*, a second opening 302*t*, a third opening 303*t* and a fourth opening 304*t*, wherein the first receiving chamber 3001*t* is respectively communicated with the first opening 301*t* and the ninth channel 109*t*; the second opening 302*t* is communicated with the third channel 103*t* of the flow control apparatus; the third opening 303*t* is communicated with the fourth channel 104*t* of the flow control apparatus; the fourth opening 304*m* is communicated with the fifth channel 105*t* and the eighth channel 108*t* of the flow control apparatus. Preferably, the first receiving chamber 3001*t* is respectively communicated with the first opening 301*t* and the ninth opening 1091*t* of the ninth channel 109*t*. More preferably, the lower end 112*t* of the first flow controlling body 11*t* of the first flow controlling element 10*t* is integrated with the inner side wall 311*t* of the casing body 31*t* of the casing 30*t*.

As shown in FIG. 220A, the flow control apparatus further comprises a flow separating element 40*t* provided in the second receiving chamber 3002*t* and extended downwardly form the first flow controlling body 11*t*, wherein the flow separating element 40*t* has a second flow guiding chamber 402*t* communicated with the second channel 102*t* and the seventh channel 107*t* of the flow control apparatus, and the flow separating element 40*t* and the casing body 31*t* of the casing 30*t* define a first flow guiding chamber 401*t* therebetween, wherein the first flow guiding chamber 401*t* is communicated with the first channel 101*t*.

As shown in FIG. 220A, the flow control apparatus further comprises a flow guiding element 50*t*, wherein the flow guiding element 50*t* comprises a flow guiding body 51*t*, wherein the flow guiding body 51*t* defines a first flow guiding channel 510*t*, wherein the flow guiding body 51*t* of the flow guiding element 50*t* is upwardly extended from the second flow controlling body 21*t* of the second flow controlling element 20*t* and the first flow guiding channel 510*t* of the first flow guiding element 50*t* is communicated with the eleventh channel 1011*t* of the flow control apparatus.

As shown in FIG. 221A to FIG. 221C, and FIG. 220B, the flow control apparatus further comprises a wear-resistant member 60*t* detachably provided between the first flow controlling element 10*t* and the second flow controlling element 20*t*, wherein the wear-resistant member 60*t* is capable of sealing the channel opening 10131*t* of the thirteenth channel 1013*t*, wherein the wear-resistant member 60*t* comprises a wear-resistant body 61*t*, wherein the wear-resistant body 61*t* has a wear-resistant side 610*t* adapted for contacting physically with the second flow controlling side 200*t* of the second flow controlling body 21*t*, wherein the wear-resistant side 610*t* is treated by a wear-resistant process to minimize the force of friction, which is resulted from the rotating of the first flow controlling body 11*t* of the first flow controlling element 10*t* relative to the second flow controlling body 21*t* of the second flow controlling element 20*t* so as to prolong the life-span of the flow control apparatus. The wear-resistant member 60*t* is further sized and shaped to match the first flow controlling side 100*t* of the first flow controlling element 10*t* and the wear-resistant body 61*t* of the wear-resistant member 60*t* and spacedly defines a first port 601*t*, a second port 602*t*, a third port 603*t*, a fourth port 604*t*, a fifth port 605*t*, a seventh port 607*t* and an eighth port 608*t*, wherein the first port 601*t*, the second port 602*t*, the third port 603*t*, the fourth port 604*t*, the fifth port 605*t*, the seventh port 607*t* and the eighth port 608*t* are respectively sized and shaped to match the first channel 101*t*, the second channel 102*t*, the third channel 103*t*, the fourth channel 104*t*, the fifth channel 105*t*, the seventh channel 107*t* and the eighth channel 108*t* of the flow control apparatus.

It is worth mentioning that when the flow control apparatus further comprises a twelfth channel 1012*t* provided in the first center portion 1111*t* of the top end 111*t* of the first flow controlling body 11*t* of the first flow controlling element 10*t*, the wear-resistant member 60*t* further has a twelfth port 6012*t* corresponding to the twelfth channel 1012*t*, as shown in FIG. 221F.

As shown in FIG. 223, the flow control apparatus further comprises an injector 70*t*, wherein the injector 70*t* is provided in the outer side wall 312*t* of the casing body 31*t* of the casing 30*t* of the flow control apparatus, wherein the injector 70*t* is respectively communicated with the third opening 303*t* and the fourth opening 304*t* of the casing 30*t*.

As shown in FIG. 220A, the flow control apparatus further comprises an auxiliary unit 80*t*, wherein the auxiliary unit 80*t* comprises a driving element 81*t* upwardly extended from the second flow controlling body 21*t* of the second flow controlling element 20*t*, wherein the driving element 81*t* is adapted for driving the second flow controlling body 21*t* of the second flow controlling element 20*t* of the flow control apparatus to rotate relative to the first flow controlling body 11*t* of the first flow controlling element 10*t*. The auxiliary unit 80*t* further comprises a fixing element 82*t* extended upwardly from the driving element 81*t*, wherein the fixing element 82*t* is adapted for holding the driving element 81*t* at a position to hold the second flow controlling body 21*t* of the second flow controlling element 20*t* at a position. Preferably, the driving element 81*t* of the auxiliary unit 80*t* of the flow control apparatus is integrated with the flow guiding body 51*t* of the flow guiding element 50*t*.

Referring to FIG. 223, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90*t*, wherein the water treatment device 90*t* comprises a water treatment container 91*t*, a liquid collecting unit 92*t* and a water treatment unit 93*t*, wherein the water treatment container 91*t* has a water treatment chamber 900*t* and an upper opening 910*t*, the liquid collecting unit 92*t* comprises a central pipe 921*t*, the water treatment unit 93*t* is adapted for being received in the water treatment chamber 900*t*, the central pipe 921*t* is adapted for being extended downwardly through the upper opening 910*t* to enter into the water treatment chamber 900*t*, and the central pipe 921*t* and the upper opening 910*t* defines an outer opening 9, 101*t*, wherein the central pipe 921*t* has an upper opening 9211*t* and a lower opening 9212*t*, wherein the liquid in the water treatment container 91*t*, such as water, is adapted for being treated by the water treatment unit 93*t* and flows from the lower opening 9212*t* of the central pipe 921*t* of the liquid collecting unit 92*t* into the central pipe 921*m* and flows out of the central pipe 921*t*; preferably, the water treatment unit 93*t* provided in the water treatment container 91*t* comprises water treatment material, such as softening resin, activated carbon or the like, or the combination thereof.

It is worth mentioning that the outer opening 9101*t* of the water treatment device 90*t* of the water treatment system may be communicated with the first channel 101*t*, or with the second channel 102*t* and the seventh channel 107*t* of the flow control apparatus, wherein the upper opening 9211*t* of the central pipe 921*t* of the liquid collecting unit 92*t* of the water treatment device 90*t* may be communicated with the first channel 101*t*, or the second channel 102*t* and the seventh channel 107*t* of the flow control apparatus; wherein when the outer opening 9101*t* of the water treatment device 90*t* is communicated with the first channel 101*t* of the flow control apparatus, the upper opening 9211*t* of the central pipe 921*t* of the liquid collecting unit 92*t* of the water treatment device 90*t* is communicated with the second channel 102*t* and the seventh channel 107*t* of the flow control apparatus; when the outer opening 9101*t* of the water treatment device 90*t* of the water treatment system is communicated with the second channel 102*t* and the seventh channel 107*t* of the flow control apparatus, the upper opening 9211*t* of the central pipe 921*t* of the liquid collecting unit 92*t* of the water treatment device 90*t* is communicated with the first channel 101*t* of the flow control apparatus.

As shown in FIG. 223, the flow control apparatus further comprises a brine supply container 84*t*, wherein the injector 70*t* may be communicated with the brine supply container 84*t*, wherein when the flow control apparatus is under the third working state, the fluid from the third opening 303*t* may flow into the injector 70*t* and make the liquid in the brine supply container 84*t* flow into the fourth opening 304*t* of the casing 30*t*. Preferably, the outer opening 9101*t* of the water treatment device 90*t* of the water treatment system and the upper opening 9211*t* of the central pipe 921*t* of the water treatment device 90*t* are respectively adapted to be communicated with the first flow guiding chamber 401*t* and the second flow guiding chamber 402*t* of the flow control apparatus, wherein when the outer opening 9101*t* of the water treatment device 90*t* is communicated with the first flow guiding chamber 401*t* of the flow control apparatus, the upper opening 9211*t* of the central pipe 921*t* of the water treatment device 90*t* is communicated with the second flow guiding chamber 402*t* of the flow control apparatus, and when the flow control apparatus is under the third working state, the fluid from the brine supply container 84*t* can flow through the injector 70*t* and flow into the seventh channel 107*t*, and then flow into the water treatment container 91*t* via the second flow guiding chamber 402*t* and the central pipe 921*t* of the liquid collecting unit 92*t* of the water treatment device 90*t*. And when the outer opening 9101*t* of the water treatment device 90*t* of the water treatment system is communicated with the second flow guiding chamber 402*t*, the upper opening 9211*t* of the central pipe 921*t* of the water treatment device 90*t* is communicated with the first flow guiding chamber 401*t* of the flow control apparatus, and when the flow control apparatus is under the third working state, the fluid from the brine supply container 84*t* can flow through the injector 70*t* and flow into the seventh channel 107*t*, and then flow into the water treatment container 91*t* via the second flow guiding chamber 401*t* and the outer opening 9101*t* of the water treatment device 90*t*. In other words, when the outer opening 9101*t* of the water treatment device 90*t* is communicated with the first flow guiding chamber 401*t* of the flow control apparatus and the upper opening 9211*t* of the central pipe 921*t* of the water treatment device 90*t* is communicated with the second flow guiding chamber 402*t* of the flow control apparatus, the fluid from the brine supply container 84*t* can flow through the water treatment unit 93*t* from bottom to top; and when the outer opening 9101*t* of the water treatment device 90*t* is communicated with the second flow guiding chamber 402*t* of the flow control apparatus and the upper opening 9211*t* of the central pipe 921*t* of the water treatment device 90*t* is communicated with the first flow guiding chamber 401*t* of the flow control apparatus, the fluid from the brine supply container 84*t* can flow through the water treatment unit 93*t* from top to bottom. Preferably, the liquid in the brine supply container 84*t* is regeneration solution for regenerating the water treatment unit 93*t* of the water treatment device 90*t*, so by controlling the communicating type that the outer opening 9101*t* and the upper opening 9211*t* of the central pipe 921*t* of the water treatment device 90*t* are communicated with the flow control apparatus to control the regeneration solution from the brine supply container 84*t* of the water treatment unit 93*t* to regenerate and elute the water treatment unit 93*t*.

Similarly, when the outer opening 9101*t* of the water treatment device 90*t* is communicated with the second flow guiding chamber 402*t* and the upper opening 9211*t* of the central pipe 921*t* of the water treatment device 90*t* is communicated with the first flow guiding chamber 401*t*, and when the flow control apparatus is under the first working state and the liquid flows from the flow control apparatus into the water treatment container 91*t*, the liquid flows through the water treatment unit 93*t* from bottom to top.

It is worth mentioning that when the flow control apparatus is under the second working state, the ninth channel 109*t* is communicated with the second channel 102*t* and the eleventh channel 1011*t* is communicated with the first channel 101*t* such that the waste water from the water treatment container 91*t* of the water treatment device 90*t* is able to be drained upwardly via the eleventh channel 1011*t*; when the flow control apparatus is under the third working state, the ninth channel 109*t* is communicated with the fourth channel 104*t*, the tenth channel 1010*t* is communicated with the seventh channel 107*t* and the eighth channel 108*t*, the eleventh channel 1011*t* is communicated with the first channel 101*t* such that the waste water from the water treatment container 91*t* of the water treatment device 90*t* is able to be drained via the eleventh channel 1011*t*; when the flow control apparatus is under the fifth working state, the ninth channel 109*t* of the flow control apparatus is communicated with the first channel 101*t*, and the eleventh channel 1011*t* is communicated with the seventh channel 107*t* such that the waste water from the water treatment container 91*t* of the water treatment device 90*t* is able to be drained via the eleventh channel 1011*t*. So the waste water from the water treatment system may be upwardly drained via the eleventh channel 1011*t* such that the eleventh channel 1011*t* for drainage does not reduce the sizes of the first channel 101*t*, the second channel 102*t*, the third channel 103*t*, the fourth channel 104*t*, the fifth channel 105*t*, the seventh channel 107*t* and the eighth channel 108*t* of the flow control apparatus and decreases the interference resulted from the first channel 101*t*, the second channel 102*t*, the third channel 103*t*, the fourth channel 104*t*, the fifth channel 105*t*, the seventh channel 107*t* and the eighth channel 108*t* provided in the first flow controlling body 11*t* of the first flow controlling element 10*t*. In other words, because the eleventh channel 1011*t* upwardly penetrates through the second flow controlling body 21*t* of the second flow controlling element 20*t*, so the waste water from the water treatment system may flow through the eleventh channel 1011*t* and flow upwardly into the flow guiding element 50*t* to be drained via the first flow guiding channel 510*t* of the flow guiding element 50*t*.

As shown in FIG. 223 is an operation schematic diagram of the water treatment system installed with the flow control apparatus of the present disclosure, as shown in FIG. 222A, when the flow control apparatus is under the first working state, the water treatment system is in a water treating state, raw water (water to be processed) may flow from the first opening 301*t* of the casing 30*t* of the flow control apparatus into the ninth channel 109*t* and the first channel 101*t*, and then flow through the outer opening 9101*t* of the water treatment system and flow into the water treatment chamber 900*t* of the water treatment system, and then flow upwardly into the second channel 102*t* and the third channel 103*t* of the flow control apparatus via the central pipe 921*t* of the liquid collecting unit 92*t* of the water treatment system, and then flow out through the second opening 302*t* of the casing 30*t* of the flow control apparatus;

as shown in FIG. 222B, when the flow control apparatus is under the second working state, the water treatment system is in a backwash state, raw water (water to be processed) may flow from the first opening 301*t* of the casing 30*t* of the flow control apparatus into the ninth channel 109*t* and the second channel 102*t*, and then flow through the upper opening 9211*t* of the central pipe 921*t* of the water treatment system and flow through the water treatment chamber 900*t* of the water treatment system from bottom to top, and then flow into the first channel 101*t* of the flow control apparatus via the outer opening 9101*t* of the water treatment system, and then flow out through the eleventh channel 1011*t* and the first flow guiding channel 510*t;* as shown in FIG. 222C, when the flow control apparatus is under the third working state, the water treatment system is in an upflow brine intaking state, raw water (water to be processed) may flow from the first opening 301*t* of the casing 30*t* of the flow control apparatus into the ninth channel 109*t* and the fourth channel 104*t*, and then flow through the third opening 303*t* into the injector 70*t* to be injected, and after being mixed with the liquid from the brine supply container 84*t*, the mixture may flow into the fourth opening 304*t*, and then flow through the thirteen channel 1013*t* and flow into the eighth channel 108*t*, and then flow into the seventh channel 107*t*, and then flow through the water treatment chamber 900*t* from bottom to top via the upper opening 9211*t* of the water treatment system, and then flow through the first channel 101*t* via the outer opening 9101*t* of the water treatment system, at last flow out through the eleventh channel 1011*t* and the first flow guiding channel 510*t;* as shown in FIG. 222D, when the flow control apparatus is under the fourth working state, the water treatment system is in a softened water supplement state and the softened water is made from the water treatment chamber 900*t*, raw water (water to be processed) may flow from the third opening 301*t* of the casing 30*t* into the ninth channel 109*t* and the first channel 101*t* and flow into the water treatment chamber 900*t* of the water treatment system via the outer opening 9101*t* of the water treatment system, and then flow into the second channel 102*t* and the fifth channel 105*t* via the central pipe of the water treatment device of the water treatment system, and then flow into the injector 70*t* via the fourth opening 304*t* to supplement water into the brine supply container 84*t;*

As shown in FIG. 222E, when the flow control apparatus is under the fifth working state, the water treatment system is in a forwardwash state, raw water (water to be processed) may flow from the first opening 301*t* of the casing 30*t* of the flow control apparatus into the ninth channel 109*t* and the first channel 101*t*, and then flow into the water treatment chamber 900*t* via the outer opening 9101*t* of the water treatment system and flow upwardly into the seventh channel 107*t* via the central pipe 921*t* of the liquid collecting unit 92*t* of the water treatment system, and then flow out via the eleventh channel 1011*t* and the first flow guiding channel 510*t*.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93*t* from bottom to top; when the flow control apparatus is under the third working state, the water treatment system can make the solution in the brine supply container 84*t* flow into the water treatment container 91*t* via the upper opening 9211*t* of the central pipe 921*t* of the water treatment device 90*t*; when the flow control apparatus is under the fourth working state, the water treatment system can supplement treated water into the brine supply container 84*t*; when the flow control apparatus is under the fifth working state, the water treatment system can achieve washing the water treatment unit 93*t* from top to bottom.

The flow control apparatus of the present embodiment may comprise nine equal divisions and the first channel of the first flow controlling element covers three equal divisions, which is beneficial in increasing the diameters of the water channels of the flow control apparatus and the rate of flow; wherein the flow control apparatus employs a technical solution of upflow brine intaking and regeneration achieving a higher regeneration efficiency than downflow brine intaking and regeneration among domestic small-capacity water softeners using softening resin as treating material and brine as regenerating agent, and it can save brine; wherein the flow control apparatus of the present embodiment employs a technical solution of softened water supplement, which is beneficial in decreasing the hardness of the brine solution of the brine supply container and increasing the regeneration efficiency thereof, and decreasing salt bridges in the brine supply container and helping the brine to be dissolved; wherein the flow control apparatus of the present embodiment has an anticipated aligning order of working states as flows: water treating working state->>softened water supplement working state->>backwash working state->>upflow brine intaking working state->>forwardwash working state, wherein the softened water supplement working state is next to the water treating working state, so the flow control apparatus of the present embodiment can supplement water before the regeneration working state and backwash after the water supplement working state so as to decrease the rotating distance of the moving valve disc and prolongs the life-span of the flow control apparatus.

Referring to FIG. 224 to FIG. 226B of the drawings of the present disclosure, a flow control apparatus according to a thirty-seventh preferred embodiment of the present disclosure is illustrated, which is adapted for being used for controlling fluid to flow in multiple directions, wherein the flow control apparatus comprises a first flow controlling element 10$u$ and a second flow controlling element 20$u$ provided rotatably on the first flow controlling element 10$u$, wherein the first flow controlling element 10$u$ comprises a first flow controlling body 11$u$, wherein the first flow controlling body 11$u$ comprises a top end 111$u$, wherein the top end 111$u$ defines a first flow controlling side 100$u$; wherein the second flow controlling element 20$u$ comprises a second flow controlling body 21$u$, wherein the second flow controlling body 21$u$ comprises a bottom end 211$u$ and an upper end 212$u$ upwardly extended from the bottom, wherein the bottom end 211$u$ defines a second flow controlling side 200$u$, wherein the first flow controlling side 100$u$ of the first flow controlling element 10$u$ is adapted for contacting physically with the second flow controlling side 200$u$ of the second flow controlling element 20$u$.

As shown in FIG. 226A to FIG. 226B, the top end 111$u$ of the first flow controlling element 10$u$ of the flow control apparatus further comprises a first center portion 1111$u$, a first edge portion 1112$u$ and a first middle portion 1113$u$ extended between the first center portion 1111$u$ and the first edge portion 1112$u$, wherein the bottom end 211$u$ of the second flow controlling body 21$u$ of the second flow controlling element 20$u$ further comprises a second center portion 2111$u$, a second edge portion 2112$u$ and a second middle portion 2113$u$ extended between the second center portion 2111$u$ and the second edge portion 2112$u$, wherein the flow control apparatus has a first channel 101$u$, a second channel 102$u$, a third channel 103$u$, a fourth channel 104$u$, a fifth channel 105$u$, a seventh channel 107$u$ and an eighth channel 108$u$ provided in the first flow controlling body 11$u$ of the first flow controlling element 10$u$, and a ninth channel 109$u$, a tenth channel 109$u$ and an eleventh channel 1011$u$ provided in the bottom end 211$u$ of the second flow controlling body 21$u$ of the second flow controlling element 20$u$, wherein the first channel 101$u$ is downwardly extended from the first flow controlling side 100$u$ of the first flow controlling element 10$u$; wherein the second channel 102$u$ is downwardly extended from the first flow controlling side 100$u$ of the first flow controlling element 10$u$; wherein the third channel 103$u$ is downwardly extended from the first flow controlling side 100$u$ of the first flow controlling element 10$u$ and defines a third channel opening 1031$u$ provided in the first flow controlling side 100$u$; wherein the fourth channel 104$u$ is downwardly extended from the first flow controlling side 100$u$ of the first flow controlling element 10$u$; wherein the fifth channel 105$u$ is downwardly extended from the first flow controlling side 100$u$ of the first flow controlling element 10$u$; wherein the seventh channel 107$u$ is downwardly extended from the first flow controlling side 100$u$ of the first flow controlling element 10$u$; wherein the eighth channel 108$u$ is downwardly extended from the first flow controlling side 100$u$ of the first flow controlling element 10$u$; wherein the ninth channel 109$u$ is extended upwardly and outwardly from the second flow controlling side 200$u$ of the bottom end 211$u$ of the second flow controlling body 21$u$ and defines a ninth opening 1091$u$ communicated with outer space thereof; wherein the tenth channel 1010$u$ is extended from the second flow controlling side 200$u$ of the bottom end 211$u$ of the second flow controlling body 21$u$ to the upper end 212$u$; wherein the eleventh channel 1011$u$ is extended upwardly from the second flow controlling side 200$u$ of the bottom end 211$u$ of the second flow controlling body 21$u$ and penetrates through the second flow controlling body 21$u$ of the second flow controlling element 20$u$. Preferably, the first channel 101$u$ is extended from the first middle portion 1113$u$ of the top end 111$u$ of the first flow controlling body 11$u$ of the first flow controlling body 11$u$ to the first edge portion 1112$u$; the second channel 102$u$, the fourth channel 104$u$, the fifth channel 105$u$, the seventh channel 107$u$ and the eighth channel 108$u$ are respectively provided in the first middle portion 1113$u$ of the top end 111$u$ of the first flow controlling body 11$u$ and the third channel 103$u$ is provided in the first edge portion 1112$u$ of the top end 111$u$ of the first flow controlling body 11$u$ and is provided in an outside of the second channel 102$u$; the eleventh channel 1011$u$ is extended upwardly from the second middle portion 2113$u$ of the bottom end 211$u$ of the second flow controlling body 21$u$.

As shown in FIG. 227A to FIG. 227E, the second flow controlling element 20$u$ is able to rotate relative to the first flow controlling element 10$u$ so that the flow control apparatus has a first working state, a second working state, a third working state, a fourth working state, and a fifth working state, wherein when the flow control apparatus is in the first working state, the ninth channel 109$u$ is communicated with the first channel 101$u$, wherein the tenth channel 1010$u$ is communicated with the third channel 103$u$ and the second channel 102$u$; wherein when the control apparatus is in the second working state, the ninth channel 109$u$ is communicated with the second channel 102$u$, and the eleventh channel 1011$u$ is communicated with the first channel 101$u$, the third channel 103$u$ is communicated with an outer space of the first flow controlling element 10$u$; wherein when the flow control apparatus is in the third working state, the ninth channel 109$u$ is communicated with the fourth channel 104$u$, the tenth channel 1010$u$ is communicated with the seventh channel 107$u$ and the eighth channel 108$u$, the eleventh channel 1011$u$ is communicated with the first channel 101$u$, the third channel 103$u$ is communicated with an outer space of the first flow controlling element 10$u$; wherein when the flow control apparatus is in the fourth working state, the ninth channel 109$u$ is communicated with the first channel 101$u$; the tenth channel 1010$u$ is communicated with the second channel 102$u$, the third channel 103$u$ and the fifth channel 105$u$; wherein when the flow control apparatus is in the fifth working state, the ninth channel 109$u$ of the flow control apparatus is communicated with the first channel 101$u$, and the eleventh channel 1011$u$ is communicated with the seventh channel 107$u$, the third channel 103$u$ is communicated with an outer space of the first flow controlling element 10$u$. Preferably, when the flow control apparatus is in the first working state, the eleventh channel 1011$u$ is communicated with the eighth channel 108; when the flow control apparatus is in the second working state, the tenth channel 1010 is communicated with the first channel 101; when the flow control apparatus is in the fourth working state, the eleventh channel 1011 is blocked by the first flow controlling element 10$u$; when the flow control apparatus is in the fifth working state, the tenth channel 1010 is communicated with the eighth channel 108.

Preferably, when the flow control apparatus is in the first working state, the fourth channel 104$u$, the fifth channel 105$u$ and the seventh channel 107$u$ are blocked by the second flow controlling element 20$u$; when the flow control apparatus is in the second working state, the fourth channel 104$u$, the fifth channel 105$u$, the seventh channel 107$u$ and the eighth channel 108$u$ are blocked by the second flow controlling element 20$u$; when the flow control apparatus is in the third working state, the second channel 102$u$ and the fifth channel 105*u* are blocked by the second flow controlling element 20*u*; when the flow control apparatus is in fourth working state, the fourth channel 104*u*, the seventh channel 107*u* and the eighth channel 108*u* are blocked by the second flow controlling element 20*u*; when the flow control apparatus is in the fifth working state, the second channel 103*u*, the fourth channel 104*u* and the fifth channel 105*u* are blocked by the second flow controlling element 20*u*.

As shown in FIG. 225B, the flow control apparatus further comprises a thirteenth channel 1013*u*, wherein the thirteenth channel 1013*u* is provided in the first flow controlling body 11*u* of the first flow controlling element 10*u* and extended between the fifth channel 105*u* and the eighth channel 108*u* to communicate the fifth channel 105*u* with the eighth channel 108*u*. Preferably, the thirteenth channel 1013*u* of the flow control apparatus is downwardly extended from the first flow controlling side 100*u* and defines an channel opening 10131*u* facing up, wherein the second flow controlling element 20*u* further comprises a sealing element 22*u*, wherein the sealing element 22*u* is extended outwardly from the second edge portion 2112*u* of the second flow controlling body 21*u* of the second flow controlling element 20*u*, and when the second flow controlling element 20*u* rotates relative to the first flow controlling element 10*u*, the sealing element 22*u* is capable of blocking the channel opening 10131*u* of the thirteenth channel 1013*u*. More preferably, the thirteenth channel 1013*u* of the flow control apparatus is not directly communicated with the first channel 101*u*, the second channel 102*u*, the third channel 103*u*, the fourth channel 104*u* and the seventh channel 107*u*.

It is worth mentioning that the first channel 101*u*, the second channel 102*u*, the third channel 103*u*, the fourth channel 104*u*, the fifth channel 105*u*, the seventh channel 107*u* and the eighth channel 108*u* of the flow control apparatus are respectively and spacedly provided in the first flow controlling body 11*u* of the first flow controlling element 10*u*; the ninth channel 109*u*, the tenth channel 1010*u* and the eleventh channel 1011*u* are respectively and spacedly provided in the second flow controlling body 21*u* of the second flow controlling element 20*u*.

Alternatively, each of the first flow controlling side 100*u* of the first flow controlling body 11*u* of the first flow controlling element 10*u* and the second flow controlling side 200*u* of the second flow controlling body 21*u* of the second flow controlling element 20*u* is circular-shaped, wherein the first channel 101*u*, the second channel 102*u*, the third channel 103*u*, the fourth channel 104*u*, the fifth channel 105*u*, the seventh channel 107*u* and the eighth channel 108*u* are radially provided in the first flow controlling side 100*u* of the first flow controlling element 10*u*, and the ninth channel 109*u*, the tenth channel 1010*u* and the eleventh channel 1011*u* are radially provided in the second flow controlling side 200*u* of the second flow controlling element 20*u*.

As shown in FIG. 226A and FIG. 226B, the first channel 101*u*, the fourth channel 104*u*, the fifth channel 105*u*, the second channel 102*u* and the third channel 103*u*, the eighth channel 108*u* and the seventh channel 107*u* of the flow control apparatus are arranged clockwise in the first flow controlling body 11*u* of the first flow controlling element 10*u* in the order thereof; the ninth channel 109*u*, the tenth channel 1010*u* and the eleventh channel 1011*u* of the flow control apparatus are arranged clockwise in the second flow controlling body 21*u* of the second flow controlling element 20*u* in the order thereof.

Alternatively, the eighth channel 108*u*, the seventh channel 107*u*, the first channel 101*u*, the fourth channel 104*u*, the fifth channel 105*u* and the second channel 102*u* of the flow control apparatus are arranged counter-clockwise in the first flow controlling body 11*u* of the first flow controlling element 10*u* in the order thereof, and the third channel 103*u* is next to second channel 102*u*; the ninth channel 109*u*, the tenth channel 1010*u* and the eleventh channel 1011*u* of the flow control apparatus are arranged counter-clockwise in the second flow controlling body 21*u* of the second flow controlling element 20*u* in the order thereof.

As shown in FIG. 226B, the second flow controlling element 20*u* of the flow control apparatus further comprises an extension portion 22*u*, wherein the extension portion 22*u* is extended outwardly and downwardly from the second edge portion 2112*u* of the bottom end 211*u* of the second flow controlling element 20*u*, wherein the tenth channel 1010*u* is extended from the second middle portion 2113*u* of the bottom end 211*u* of the second flow controlling element 20*u* into the extension portion 22*u* of the second flow controlling element 20*u* and extended upwardly, wherein when the flow control apparatus is under the first working state and the fourth working state, the tenth channel 1010*u* is communicated with the third channel 103*u*. In other words, the tenth channel 1010*u* is extended in the second middle portion 2113*u* of the bottom end 211*u* of the second flow controlling element 20*u* and the extension portion 22*u* of the second flow controlling element 20*u*.

As shown in FIG. 226A to FIG. 226C, the first flow controlling side 100*u* of the first flow controlling element 10*u* of the flow control apparatus has a center section 1000*u* shown by a chain line, wherein the center section 1000*u* is provided in the first center portion 1111*u* of the top end 111*u* of the first flow controlling body 11*u* of the first flow controlling element 10*u*, wherein the remaining portion of the first flow controlling side 100*u* is clockwise and evenly divided into a first section 1001*u*, a second section 1002*u*, a third section 1003*u*, a fourth section 1004*u*, a fifth section 1005*u*, a sixth section 1006*u*, a seventh section 1007*u*, an eighth section 1008*u* and a ninth section 1009*u*, as shown by chain lines; wherein the second flow controlling side 200*u* of the second flow controlling element 20*u* of the flow control apparatus has a center division 2000*u*, wherein the center division 2000*u* is provided in the second center portion 2111*u* of the bottom end 211*u* of the second flow controlling body 21*u* of the second flow controlling element 20*u*, wherein the remaining portion of the second flow controlling side 200*u* is clockwise and evenly divided into a first division 2001*u*, a second division 2002*u*, a third division 2003*u*, a fourth division 2004*u*, a fifth division 2005*u*, a sixth division 2006*u*, a seventh division 2007*u*, an eighth division 2008*u* and a ninth division 1009*u*; wherein the first channel 101*u* is downwardly extended from the first section 1001*u*, the second section 1002*u* and the third section 1003*u* of the first flow controlling side 100*u*; the fourth channel 104*u* is downwardly extended from the fourth section 1004*u* of the first flow controlling side 100*u*; the fifth channel 105*u* is downwardly extended from the fifth section 1005*u* of the first flow controlling side 100*u*; the second channel 102*u* is downwardly extended from the sixth section 1006*u* of the first flow controlling side 100*u*; the third channel 103*u* is downwardly extended from the sixth section 1006*u* and the third channel 103*u* is provided in an outside of the second channel 102*u*; the eighth channel 108*u* is downwardly extended from the eighth section 1008*u* of the first flow controlling side 100*u*; the seventh channel 107*u* is downwardly extended from the ninth section 1009*u* of the first flow controlling side 100*u*; the ninth channel 109*u* is upwardly extended from the first division 2001*u* of the second flow controlling side 200$u$; the tenth channel 1010$u$ is upwardly extended from the fifth division 2005$u$ and the sixth division 2006$u$ of the second flow controlling side 200$u$ to the upper end 212$u$; the eleventh channel 1011$u$ is upwardly extended from the seventh division 2007$u$ of the second flow controlling side 200$u$.

Preferably, the first channel 101$u$, the second channel 102$u$, the third channel 103$u$, the fourth channel 104$u$, the fifth channel 105$u$, the seventh channel 107$u$ and the eighth channel 108$u$ is downwardly and outwardly extended from the first flow controlling side 100$u$ of the first flow controlling element 10$u$.

As shown in FIG. 225A, the flow control apparatus further comprises a casing 30$u$ according to the thirty-seventh embodiment of the present disclosure, wherein the casing 30$u$ comprises a casing body 31$u$, wherein the casing body 31$u$ has an outer side wall 312$u$ and an inner side wall 311$u$ and defines an inner chamber 300$u$, wherein the first flow controlling element 10$u$ is adapted for being provided in the inner chamber 300$u$ and the first flow controlling side 100$u$ of the first flow controlling element 10$u$ is provided to face up, and the second flow controlling element 20$u$ is adapted for being provided in the inner chamber 300$u$ and the second flow controlling side 200$u$ of the second flow controlling element 20$u$ is provided to face down, wherein the first flow controlling body 11$u$ of the first flow controlling element 10$u$ further comprises a lower end 112$u$ downwardly extended from the top end 111$u$, wherein the lower end 112$u$ of the first flow controlling body 11$u$ of the first flow controlling element 10$u$ is connected with the inner side wall 311$u$ of the casing body 31$u$ of the casing 30$u$ and divides spacedly the inner chamber 300$u$ into a first receiving chamber 3001$u$ and a second receiving chamber 3002$u$, wherein the casing 30$u$ has a first opening 301$u$, a second opening 302$u$, a third opening 303$u$ and a fourth opening 304$u$, wherein the first receiving chamber 3001$u$ is respectively communicated with the first opening 301$u$ and the ninth channel 109$u$; the second opening 302$u$ is communicated with the third channel 103$u$ of the flow control apparatus; the third opening 303$u$ is communicated with the fourth channel 104$u$ of the flow control apparatus; the fourth opening 304$u$ is communicated with the fifth channel 105$u$ and the eighth channel 108$u$ of the flow control apparatus. Preferably, the first receiving chamber 3001$u$ is respectively communicated with the first opening 301$u$ and the ninth opening 1091$u$ of the ninth channel 109$u$. More preferably, the lower end 112$u$ of the first flow controlling body 11$u$ of the first flow controlling element 10$u$ is integrated with the inner side wall 311$u$ of the casing body 31$u$ of the casing 30$u$.

As shown in FIG. 225A, the flow control apparatus further comprises a flow separating element 40$u$ provided in second receiving chamber 3002$u$ and extended downwardly form the first flow controlling body 11$u$, wherein the flow separating element 40$u$ has a second flow guiding chamber 402$u$ communicated with the second channel 102$u$ and the seventh channel 107$u$ of the flow control apparatus and the flow separating element 40$u$ and the inner side wall 311$u$ of the casing 30$u$ define a first flow guiding chamber 401$u$ therebetween, wherein the first flow guiding chamber 401$u$ is communicated with the first channel 101$u$.

As shown in FIG. 225A, the flow control apparatus further comprises a flow guiding element 50$u$, wherein the flow guiding element 50$u$ comprises a flow guiding body 51$u$, wherein the flow guiding body 51$u$ defines a first flow guiding channel 510$u$, wherein the flow guiding body 51$u$ of the flow guiding element 50$u$ is upwardly extended from the second flow controlling body 21$u$ of the second flow controlling element 20$u$ and the first flow guiding channel 510$u$ of the first flow guiding element 50$u$ is communicated with the eleventh channel 1011$u$ of the flow control apparatus.

As shown in FIG. 226A to FIG. 226C, and FIG. 225B, the flow control apparatus further comprises a wear-resistant member 60$u$ detachably provided between the first flow controlling element 10$u$ and the second flow controlling element 20$u$, wherein the wear-resistant member 60$u$ comprises a wear-resistant body 61$u$, wherein the wear-resistant body 61$u$ is capable of sealing the channel opening 10131$u$ of the thirteenth channel 1013$u$, wherein the wear-resistant body 61$u$ has a wear-resistant side 610$u$ adapted for contacting physically with the second flow controlling side 200$u$ of the second flow controlling body 21$u$, wherein the wear-resistant side 610$u$ is treated by a wear-resistant process to minimize the force of friction, which is resulted from the rotating of the first flow controlling body 11$u$ of the first flow controlling element 10$u$ relative to the second flow controlling body 21$u$ of the second flow controlling element 20$u$ so as to prolong the life-span of the flow control apparatus. The wear-resistant member 60$u$ is further sized and shaped to match the first flow controlling side 100$u$ of the first flow controlling element 10$u$ and the wear-resistant body 61$u$ of the wear-resistant member 60$u$ spacedly defines a first port 601$u$, a second port 602$u$, a third port 603$u$, a fourth port 604$u$, a fifth port 605$u$, a seventh port 607$u$ and an eighth port 608$u$, wherein the first port 601$u$, the second port 602$u$, the third port 603$u$, the fourth port 604$u$, the fifth port 605$u$, the seventh port 607$p$ and the eighth port 608$u$ are respectively sized and shaped to match the first channel 101$u$, the second channel 102$u$, the third channel 103$u$, the fourth channel 104$u$, the fifth channel 105$u$, the seventh channel 107$u$ and the eighth channel 108$u$ of the flow control apparatus.

It is worth mentioning that when the flow control apparatus further comprises a twelfth channel 1012$u$ provided in the first center portion 1111$u$ of the top end 111$u$ of the first flow controlling body 11$u$ of the first flow controlling element 10$u$, the wear-resistant member 60$u$ further has a twelfth port 6012$u$ corresponding to the twelfth channel 1012$u$, as shown in FIG. 226F.

As shown in FIG. 228, the flow control apparatus further comprises an injector 70$u$, wherein the injector 70$u$ is provided in the outer side wall 312$u$ of the casing body 31$u$ of the casing 30$u$ of the flow control apparatus, wherein the injector 70$u$ is respectively communicated with the third opening 303$u$ and the fourth opening 304$u$ of the casing 30$u$.

As shown in 225A, the flow control apparatus further comprises an auxiliary unit 80$u$, wherein the auxiliary unit 80$u$ comprises a driving element 81$u$ upwardly extended from the second flow controlling body 21$u$ of the second flow controlling element 20$u$, wherein the driving element 81$u$ is adapted for driving the second flow controlling body 21$u$ of the second flow controlling element 20$u$ of the flow control apparatus to rotate relative to the first controlling body 11$u$ of the first flow controlling element 10$u$. The auxiliary unit 80$u$ further comprises a fixing element 82$u$ extended upwardly from the driving element 81$u$, wherein the fixing element 82$u$ is adapted for holding the driving element 81$u$ at a position to hold the second flow controlling body 21$u$ of the second flow controlling element 20$u$ at a position. Preferably, the driving element 81$u$ of the auxiliary unit 80$u$ of the flow control apparatus is integrated with the flow guiding body 51$u$ of the flow guiding element 50$u$.

An alternative of the flow control apparatus according to the thirtieth embodiment of the present disclosure is shown in FIG. 226D and FIG. 226F, wherein the flow control apparatus further comprises a twelfth channel 1012*u* provided in the first center portion 1111*u* and extended downwardly from the first flow controlling side 100*u*, and the eleventh channel 1011*u* is extended upwardly from the second flow controlling side 200*u* of the bottom end 211*u* of the second flow controlling body 21*u* to the upper end 212*u* and extended from the second center portion 2111*u* of the second flow controlling element 20*u* into the second edge portion 2112*u* thereof. Preferably, the first center portion 1111*u* of the top end 111*u* of the first flow controlling body 11*u* of the first flow controlling element 10*u* is provided in the first center section 1000*u* of the first flow controlling side 100*u*, and the eleventh channel 1011*u* is extended from the second edge portion 2112*u* of the second flow controlling element 20*u* into the second center portion 2111*u* and extended upwardly from the seventh division 2007*u* and the center division 2000*u* of the second flow controlling side 200*u* to the upper end 212*u* of the second flow controlling body 21*u*. Preferably, the wear-resistant member 60*u* further has a twelfth port 6012*u*1 corresponding to the twelfth channel 1012*u*. The eleventh channel 1011*u* is extended upwardly from the second flow controlling side 200*u* of the bottom end 211*u* of the second flow controlling body 21*u* to the upper end 212*u* of the second flow controlling body 21*u* and extended from the second edge portion 2112*u* of the second flow controlling element 20*u* into the second center portion 2111*u*.

Referring to FIG. 228, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90*n*, wherein the water treatment device 90*u* comprises a water treatment container 91*u*, a liquid collecting unit 92*u* and a water treatment unit 93*u*, wherein the water treatment container 91*u* has a water treatment chamber 900*u* and an upper opening 910*u*, the liquid collecting unit 92*u* comprises a center pipe 921*u*, the water treatment unit 93*u* is adapted for being received in the water treatment chamber 900*u*, the center pipe 921*u* is adapted for being extended downwardly through the upper opening 910*u* to enter into the water treatment chamber 900*u*, and the center pipe 921*u* and the upper opening 910*u* defines an outer opening 9101*u*, wherein the center pipe 921*u* has an upper opening 9211*u* and a lower opening 9212*u*, wherein the liquid in the water treatment container 91*u*, such as water, is adapted for being treated by the water treatment unit 93*u* and flows from the lower opening 9212*u* of the center pipe 921*u* of the liquid collecting unit 92*u* into the center pipe 921*u* and flows out of the center pipe 921*u*; preferably, the water treatment unit 93*u* provided in the water treatment container 91*u* comprises water treatment material, such as softening resin, activated carbon or the like, or the combination thereof.

It is worth mentioning that the outer opening 9101*u* of the water treatment device 90*u* of the water treatment system may be communicated with the first channel 101*u* of the flow control apparatus, or the second channel 102*u* and the seventh channel 107*u* of the flow control apparatus, the upper opening 9211*u* of the central pipe 921*u* of the liquid collecting unit 92*u* of the water treatment device 90*u* may be communicated with the first channel 101*u* of the flow control apparatus, or the second channel 102*u* and the seventh channel 107*u* of the flow control apparatus; wherein when the outer opening 9101*u* of the water treatment device 90*u* is communicated with the first channel 101*u* of the flow control apparatus, the upper opening 9211*u* of the central pipe 921*u* of the liquid collecting unit 92*u* of the water treatment device 90*u* is communicated with the second channel 102*u* and the seventh channel 107*u* of the flow control apparatus; when the outer opening 9101*u* of the water treatment device 90*u* of the water treatment system is communicated with the second channel 102*u* and the seventh channel 107*u* of the flow control apparatus, the upper opening 9211*u* of the central pipe 921*u* of the liquid collecting unit 92*u* of the water treatment device 90*u* is communicated with the first channel 101*u* of the flow control apparatus.

As shown in FIG. 228, the flow control apparatus further comprises a brine supply container 84*u*, wherein the injector 70*u* may be communicated with the brine supply container 84*u*, wherein when the flow control apparatus is under the third working state, the fluid from the third opening 303*u* may flow into the injector 70*u* and make the liquid in the brine supply container 84*u* flow into the fourth opening 304*u* of the casing 30*u*. Preferably, the outer opening 9101*u* of the water treatment device 90*u* of the water treatment system and the upper opening 9211*u* of the central pipe 921*u* of the water treatment device 90*u* are respectively adapted to be communicated with the first flow guiding chamber 401*u* and the second flow guiding chamber 402*u* of the flow control apparatus, wherein when the outer opening 9101*u* of the water treatment device 90*u* is communicated with the first flow guiding chamber 401*u* of the flow control apparatus, the upper opening 9211*u* of the central pipe 921*u* of the water treatment device 90*u* is communicated with the second flow guiding chamber 402*u* of the flow control apparatus, and when the flow control apparatus is under the third working state, the fluid from the brine supply container 84*p* can flow through the injector 70*u* and flow into the seventh channel 107*u*, and then flow into the water treatment container 91*u* via the second flow guiding chamber 402*u* and the central pipe 921*u* of the liquid collecting unit 92*u* of the water treatment device 90*u*. And when the outer opening 9101*u* of the water treatment device 90*u* of the water treatment system is communicated with the second flow guiding chamber 402*u*, the upper opening 9211*u* of the central pipe 921*u* of the water treatment device 90*u* is communicated with the first flow guiding chamber 401*u* of the flow control apparatus, and when the flow control apparatus is under the third working state, the fluid from the brine supply container 84*u* can flow through the injector 70*u* and flow into the seventh channel 107*u*, and then flow into the water treatment container 91*u* via the second flow guiding chamber 402*u* and the outer opening 9101*u* of the water treatment device 90*u*. In other words, when the outer opening 9101*u* of the water treatment device 90*u* is communicated with the first flow guiding chamber 401*u* of the flow control apparatus and the upper opening 9211*u* of the central pipe 921*u* of the water treatment device 90*u* is communicated with the second flow guiding chamber 402*u* of the flow control apparatus, the fluid from the brine supply container 84*u* can flow through the water treatment unit 93*u* from bottom to top; and when the outer opening 9101*u* of the water treatment device 90*u* is communicated with the second flow guiding chamber 402*u* of the flow control apparatus and the upper opening 9211*u* of the central pipe 921*u* of the water treatment device 90*u* is communicated with the first flow guiding chamber 401*u* of the flow control apparatus, the fluid from the brine supply container 84*u* can flow through the water treatment unit 93*u* from top to bottom.

Preferably, the liquid in the brine supply container 84*u* is regeneration solution for the water treatment unit 93*u* of the water treatment device 90*u*, so by controlling the communicating type that the outer opening 9101*u* and the upper opening 9211*u* of the central pipe 921*u* of the water treatment device 90*u* are communicated with the flow control apparatus to control the regeneration solution from the brine supply container 84*u* of the water treatment unit 93*u* to regenerate and elute the water treatment unit 93*u*.

Similarly, when the outer opening 9101*u* of the water treatment device 90*u* is communicated with the second flow guiding chamber 402*u* and the upper opening 9211*u* of the central pipe 921*u* of the water treatment device 90*u* is communicated with the first flow guiding chamber 401*u*, and when the flow control apparatus is under the first working state and the liquid flows from the flow control apparatus into the water treatment container 91*u*, the liquid flows through the water treatment unit 93*u* from bottom to top.

It is worth mentioning that when the flow control apparatus is under the second working state, the ninth channel 109*u* is communicated with the second channel 102*u* and the eleventh channel 1011*u* is communicated with the first channel 101*u* such that the waste water from the water treatment container 91*u* of the water treatment device 90*u* is able to drain via the eleventh channel 1011*u*; when the flow control apparatus is under the third working state, the ninth channel 109*u* is communicated with the fourth channel 104*u*, the tenth channel 1010*u* is communicated with the seventh channel 107*u* and the eighth channel 108*u*, the eleventh channel 1011*u* is communicated with the first channel 101*u* such that the waste water from the water treatment container 91*u* of the water treatment device 90*u* is able to drain via the eleventh channel 1011*u*; when the flow control apparatus is under the fifth working state, the ninth channel 109*u* of the flow control apparatus is communicated with the first channel 101*u*, and the eleventh channel 1011*u* is communicated with the seventh channel 107*u* such that the waste water from the water treatment container 91*u* of the water treatment device 90*u* is able to drain upwardly via the eleventh channel 1011*u*. So the waste water from the water treatment system upwardly drains via the eleventh channel 1011*u* such that the eleventh channel 1011*u* for drainage does not reduce the sizes of the first channel 101*u*, the second channel 102*u*, the third channel 103*u*, the fourth channel 104*u*, the fifth channel 105*u*, the seventh channel 107*u* and the eighth channel 108*u* of the flow control apparatus and decreases the interference resulted from the first channel 101*u*, the second channel 102*u*, the third channel 103*u*, the fourth channel 104*u*, the fifth channel 105*u*, the seventh channel 107*u* and the eighth channel 108*u* provided in the first flow controlling body 11*u* of the first flow controlling element 10*u*. In other words, because the eleventh channel 1011*u* upwardly penetrates through the second flow controlling body 21*u* of the second flow controlling element 20*u*, so the waste water from the water treatment system may flow through the eleventh channel 1011*u* and flow upwardly into the flow guiding element 50*u* to be drained via the first flow guiding channel 510*u* of the flow guiding element 50*u*.

As shown in FIG. 228 is an operation schematic diagram of the water treatment system installed with the flow control apparatus of the present disclosure, as shown in FIG. 227A, when the flow control apparatus is under the first working state, the water treatment system is in a water treating state, raw water (water to be processed) may flow from the first opening 301*u* of the casing 30*u* of the flow control apparatus into the ninth channel 109*u* and the first channel 101*u*, and then flow through the outer opening 9101*u* of the water treatment system and flow into the water treatment chamber 900*u* of the water treatment system, and then flow upwardly into the second channel 102*u* and the third channel 103*u* of the flow control apparatus via the central pipe 921*u* of the liquid collecting unit 92*u* of the water treatment system, and then flow out through the second opening 302*u* of the casing 30*u* of the flow control apparatus;

as shown in FIG. 227B, when the flow control apparatus is under the second working state, the water treatment system is in a backwash and supplementing raw water state, raw water (water to be processed) may flow from the first opening 301*u* of the casing 30*u* of the flow control apparatus into the ninth channel 109*u* and the second channel 102*u*, and then flow through the upper opening 9211*u* of the central pipe 921*u* of the water treatment system and flow through the water treatment chamber 900*u* of the water treatment system from bottom to top, and then flow into the first channel 101*u* of the flow control apparatus via the outer opening 9101*u* of the water treatment system, and then flow out through the eleventh channel 1011*u* and the first flow guiding channel 510*u*, at the same time, the raw water into the first opening 301*u* of the casing 30*u* may flow into the third channel 103*u*, and then flow out via the second opening 302*u* of the casing 30*u*;

as shown in FIG. 227C, when the flow control apparatus is under the third working state, the water treatment system is in an upflow brine intaking and supplementing raw water state, raw water (water to be processed) may flow from the first opening 301*u* of the casing 30*u* of the flow control apparatus into the ninth channel 109*u* and the fourth channel 104*u*, and then flow through the third opening 303*u* into the injector 70*u* to be injected, and after being mixed with the liquid from the brine supply container 84*u*, the mixture may flow into the fourth opening 304*u*, and then flow through the thirteenth channel 1013*u* and the eighth channel 108*u*, and then flow into the seventh channel 107*u* and flow into the water treatment chamber 900*u* via the upper opening 9211*u* of the central pipe of the liquid collecting unit of the water treatment system from bottom to top, and then flow into the first channel 101*u* via the outer opening 9101*u* of the water treatment system, at last flow out through the eleventh channel 1011*u* and the first flow guiding channel 510*u*, at the same time, the raw water flowing into the first opening 301*u* of the casing 30*u* may flow into the third channel 103*u*, and then flow out via the second opening 302*u* of the casing 30*u*;

as shown in FIG. 227D, when the flow control apparatus is under the fourth working state, the water treatment system is in a treated water supplement and water treating state and the treated water is made from the water treatment chamber 900*u*, wherein raw water (water to be processed) may flow from the first opening 301*u* of the casing 30*u* of the flow control apparatus into the ninth channel 109*u* and the first channel 101*u* of the flow control apparatus, and then flow into the water treatment chamber 900*u* of the water treatment system via the outer opening 9101*u* of the water treatment system, and then flow into the second channel 102*u* via the central pipe of the liquid collecting unit of the water treatment system, and then flow respectively into the fifth channel 105*u* and the third channel 103*u*, and then the water flowing into the fifth channel 105*u* flow into the injector via the fourth opening 304*u* of the casing 30*u* to supplement water into the brine supply container 84*u*, at the same time, the water flowing into the third channel 103*u* may flow out via the second opening 302*u* of the casing 30*u*;

as shown in FIG. 227E, when the flow control apparatus is under the fifth working state, the water treatment system is in a forwardwash and supplementing raw water state, raw water (water to be processed) may flow from the first opening 301*u* of the casing 30*u* of the flow control apparatus into the ninth channel 109*u* and the first channel 101*u* of the flow control apparatus, and flow into the water treatment chamber 900*u* of the water treatment system via the outer opening 9101*u* of the water treatment system, and then flow upwardly into the seventh channel 107*u* of the flow control apparatus via the central pipe of the liquid collecting unit of the water treatment system and flow out through the eleventh channel 1011*u* and the first flow guiding channel 510*u*, at the same time, the raw water flowing into the first opening 301*u* of the casing 30*u* may flow into the third channel 103*u*, and then flow out via the second opening 302*u* of the casing 30*u*.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93*u* from bottom to top; when the flow control apparatus is under the third working state, the water treatment system can make the solution in the brine supply container 84*u* flow into the water treatment container 91*u* via the upper opening 9211*u* of the central pipe of the water treatment device 90*u*; when the flow control apparatus is under the fourth working state, the water treatment system can supplement treated water into the brine supply container 84*u* and supply water for a user via the third channel 103*u* and the second opening 302*u*, wherein because the fourth working state is next to the first working state, so when the flow control apparatus is switched from the first working state to the fourth working state, the water treatment system can continuously supply treated water for the user so as to achieve a water supplement function, which does not impact the water supplying and is a useful function; when the flow control apparatus is under the fifth working state, the water treatment system can achieve washing the water treatment unit 93*u* from top to bottom.

The flow control apparatus of the present embodiment may comprise nine equal divisions and the first channel of the first flow controlling element covers three equal divisions, which is beneficial in increasing the diameters of the water channels of the flow control apparatus and the rate of flow; wherein the flow control apparatus employs a technical solution of upflow brine intaking and regeneration achieving a higher regeneration efficiency than downflow brine intaking and regeneration among domestic small-capacity water softeners using softening resin as treating material and brine as regenerating agent, and it can save brine; wherein the flow control apparatus of the present embodiment employs a technical solution of softened water supplement, which is beneficial in decreasing the hardness of the brine solution of the brine supply container and increasing the regeneration efficiency thereof, and decreasing salt bridges in the brine supply container and helping the brine to be dissolved. It is worth mentioning that the flow control apparatus of the present disclosure can simultaneously supplement softened water and supply softened water. Especially, when the flow control apparatus is switched into the water supplement and water supplying working state, the water treatment system can continuously supply treated water to achieve a water supplement function when softened water supplement is needed (under the first working state, there is no liquid in the brine supply container), which does not impact the water supplying and is a useful function, so as to make that the brine supply container of the water treatment system has not to be always filled with solution for regenerating. Because the brine solution can produce a pressure impacting the life-span of the brine supply container and result in brine caking impacting dissolving of brine, So the technology is worth being applied for domestic or industrial products. The flow control apparatus of the present embodiment has an anticipated aligning order of working states as flows: water treating working state->>softened water supplement working state->>backwash working state->>upflow brine intaking working state->>forwardwash working state, wherein the softened water supplement working state is next to the water treating working state, so the flow control apparatus of the present embodiment can supplement water before the regeneration working state and backwash after the water supplement working state so as to decrease the rotating distance of the moving valve disc and prolongs the life-span of the flow control apparatus. And it is worth mentioning that the flow control apparatus of the present embodiment can continuously provide raw water in the backwash working state, the upflow brine intaking working state and the forwardwash working state thereof and provide softened water in the water treating working state and the softened water supplement and supply water working state, so the water treatment system can continuously provide water and meet demands of customers.

Referring to FIG. 229 to FIG. 231B of the drawings of the present disclosure, a flow control apparatus according to a thirty-eighth preferred embodiment of the present disclosure is illustrated, which is adapted for being used for controlling fluid to flow in multiple directions, wherein the flow control apparatus comprises a first flow controlling element 10*v* and a second flow controlling element 20*v* provided rotatably on the first flow controlling element 10*v*, wherein the first flow controlling element 10*v* comprises a first flow controlling body 11*v*, wherein the first flow controlling body 11*v* comprises a top end 111*v*, wherein the top end 111*v* defines a first flow controlling side 100*v*; wherein the second flow controlling element 20*v* comprises a second flow controlling body 21*v*, wherein the second flow controlling body 21*v* comprises a bottom end 211*v* and an upper end 212*v* upwardly extended from the bottom, wherein the bottom end 211*v* defines a second flow controlling side 200*v*, wherein the first flow controlling side 100*v* of the first flow controlling element 10*v* is adapted for contacting physically with the second flow controlling side 200*v* of the second flow controlling element 20*v*.

As shown in FIG. 231A to FIG. 231B, the top end 111*v* of the first flow controlling element 10*v* of the flow control apparatus further comprises a first center portion 1111*v*, a first edge portion 1112*v* and a first middle portion 1113*v* extended between the first center portion 1111*v* and the first edge portion 1112*v*, wherein the bottom end 211*v* of the second flow controlling body 21*v* of the second flow controlling element 20*v* further comprises a second center portion 2111*v*, a second edge portion 2112*v* and a second middle portion 2113*v* extended between the second center portion 2111*v* and the second edge portion 2112*v*, wherein the flow control apparatus has a first channel 101*v*, a second channel 102*v*, a third channel 103*v*, a fourth channel 104*v*, a fifth channel 105*v*, a seventh channel 107*v*, an eighth channel 108*v*, a ninth channel 109*v*, a tenth channel 109*v* and an eleventh channel 1011*v*, wherein the first channel 101*v* is downwardly extended from the first flow controlling side 100*v* of the first flow controlling element 10*v*; wherein the second channel 102$v$ is downwardly extended from the first flow controlling side 100$v$ of the first flow controlling element 10$v$; wherein the third channel 103$v$ is downwardly extended from the first flow controlling side 100$v$ of the first flow controlling element 10$v$; wherein the fourth channel 104$v$ is downwardly extended from the first flow controlling side 100$v$ of the first flow controlling element 10$v$; wherein the fifth channel 105$v$ is downwardly extended from the first flow controlling side 100$v$ of the first flow controlling element 10$v$; wherein the seventh channel 107$v$ is downwardly extended from the first flow controlling side 100$v$ of the first flow controlling element 10$v$; wherein the eighth channel 108$v$ is downwardly extended from the first flow controlling side 100$v$ of the first flow controlling element 10$v$; wherein the ninth channel 109$v$ is extended upwardly and outwardly from the second flow controlling side 200$v$ of the bottom end 211$v$ of the second flow controlling body 21$v$ and defines a ninth opening 1091$v$ communicated with outer space thereof; wherein the tenth channel 1010$v$ is extended outwardly from the second flow controlling side 200$v$ of the bottom end 211$v$ of the second flow controlling body 21$v$; wherein the eleventh channel 1011$v$ is extended upwardly from the second flow controlling side 200$v$ of the bottom end 211$v$ of the second flow controlling body 21$v$ and penetrates through the second flow controlling body 21$v$ of the second flow controlling element 20$v$. Preferably, the first channel 101$v$ is extended from the first middle portion 1113$v$ of the top end 111$v$ of the first flow controlling body 11$v$ of the first flow controlling element 10$v$ into the first edge portion 1112$v$; the second channel 102$v$, the fourth channel 104$v$, the fifth channel 105$v$ and the eighth channel 108$v$ are respectively provided in the first middle portion 1113$v$ of the top end 111$v$ of the first flow controlling body 11$v$; the third channel 103$v$ and the seventh channel 107$v$ are respectively provided in the first edge portion 1112$v$ of the top end 111$v$ of the first flow controlling body 11$v$ and the third channel 103$v$ is provided in an outside of the second channel 102$v$; the ninth channel 109$v$ is extended upwardly from the second middle 2113$v$ of the bottom end 211$v$ of the second flow controlling body 21$v$ and defines a sealing rib 1114$v$ provided in an outside of the ninth channel 109$v$, wherein the sealing rib 1114$v$ is capable of blocking the seventh channel 107$v$ and the third channel 103$v$ on the first flow controlling side 100$v$; wherein the tenth channel 1010$v$ is extended from the second middle portion 2113$v$ of the bottom end 211$v$ of the second flow controlling body 21$v$ into the second edge portion 2112$v$ of the bottom end 211$v$; the eleventh channel 1011$v$ is extended upwardly from the second edge portion 2112$v$ of the bottom end 211$v$ of the second flow controlling body 21$v$ of the second flow controlling element 20$v$.

As shown in FIG. 232A to FIG. 232E, the second flow controlling element 20$v$ is able to rotate relative to the first flow controlling element 10$v$ so that the flow control apparatus has a first working state, a second working state, a third working state, a fourth working state and a fifth working state, wherein when the flow control apparatus is in the first working state, the ninth channel 109$v$ is communicated with the first channel 101$v$, wherein the tenth channel 1010$v$ is communicated with the second channel 102$v$ and the third channel 103$v$; wherein when the control apparatus is in the second working state, the ninth channel 109$v$ is communicated with the second channel 102$v$, and the eleventh channel 1011$v$ is communicated with the first channel 101$v$; wherein when the flow control apparatus is in the third working state, the ninth channel 109$v$ is communicated with the fourth channel 104$v$, the tenth channel 1010$v$ is communicated with the eighth channel 108$v$ and the seventh channel 107$v$, the eleventh channel 1011$v$ is communicated with the first channel 101$v$; wherein when the flow control apparatus is in the fourth working state, the ninth channel 109$v$ is communicated with the first channel 101$v$; the tenth channel 1010$v$ is communicated with the second channel 102$v$, the third channel 103$v$ and the fifth channel 105$v$; wherein when the flow control apparatus is in the fifth working state, the ninth channel 109$v$ of the flow control apparatus is communicated with the first channel 101$v$, and the eleventh channel 1011$v$ is communicated with the seventh channel 107$v$. Preferably, when the flow control apparatus is in the first working state, the eleventh channel 1011$v$ is blocked by the first flow controlling element 10$v$; when the flow control apparatus is in the second working state, the tenth channel 1010$v$ is communicated with the first channel 101$v$; when the flow control apparatus is in the fourth working state, the eleventh channel 1011$v$ is blocked by the first flow controlling element 10$v$; when the flow control apparatus is in the fifth working state, the tenth channel 1010$v$ is communicated with the eighth channel 108$v$. More preferably, when the flow control apparatus is in the first working state, the fourth channel 104$v$, the fifth channel 105$v$, the seventh channel 107$v$ and the eighth channel 108$v$ are blocked by the second flow controlling element 20$v$; when the flow control apparatus is in the second working state, the third channel 103$v$, the fourth channel 104$v$, the fifth channel 105$v$, the seventh channel 107$v$ and the eighth channel 108$v$ are blocked by the second flow controlling element 20$v$; when the flow control apparatus is in the third working state, the second channel 102$v$, the third channel 103$v$ and the fifth channel 105$v$ are blocked by the second flow controlling element 20$v$; when the flow control apparatus is in fourth working state, the fourth channel 104$v$, the seventh channel 107$v$ and the eighth channel 108$v$ are blocked by the second flow controlling element 20$v$; when the flow control apparatus is in the fifth working state, the second channel 102$v$, the third channel 103$v$, the fourth channel 104$v$ and the fifth channel 105$v$ are blocked by the second flow controlling element 20$v$.

As shown in FIG. 230B, the flow control apparatus further comprises a thirteenth channel 1013$v$, wherein the thirteenth channel 1013$v$ is provided in the first flow controlling body 11$v$ of the first flow controlling element 10$v$ and extended between the fifth channel 105$v$ and the eighth channel 108$v$ to communicate the fifth channel 105$v$ with the eighth channel 108$v$. Preferably, the thirteenth channel 1013$v$ of the flow control apparatus is downwardly extended from the first flow controlling side 100$v$ and defines an channel opening 10131$v$ facing up, wherein the second flow controlling element 20$v$ further comprises a sealing element 22$v$, wherein the sealing element 22$v$ is extended outwardly from the second edge portion 2112$v$ of the second flow controlling body 21$v$ of the second flow controlling element 20$v$, and when the second flow controlling element 20$v$ rotates relative to the first flow controlling element 10$v$, the sealing element 22$v$ is capable of blocking the channel opening 10131$v$ of the thirteenth channel 1013$v$. More preferably, the thirteenth channel 1013$v$ of the flow control apparatus is not directly communicated with the first channel 101$v$, the second channel 102$v$, the third channel 103$v$, the fourth channel 104$v$ and the seventh channel 107$v$.

More preferably, the flow control apparatus further has a standby working state, wherein the flow control apparatus further is under the standby working state, the tenth channel 1010$v$ is communicated with the fourth channel 104$v$ and the fifth channel 105$v$; the eleventh channel 1011$v$ is communicated with the third channel 103*v*; the first channel 101*v*, the second channel 102*v*, the seventh channel 107*v* and the eighth channel 108*v* of the flow control apparatus are blocked by the second flow controlling element 20*v*, and the ninth channel 109*v* is not communicated with the first channel 101*v*, the second channel 102*v*, the third channel 103*v*, the fourth channel 104*v*, the fifth channel 105*v*, the seventh channel 107*v* and the eighth channel 108*v*.

It is worth mentioning that the first channel 101*v*, the second channel 102*v*, the third channel 103*v*, the fourth channel 104*v*, the fifth channel 105*v*, the seventh channel 107*v* and the eighth channel 108*v* of the flow control apparatus are respectively and spacedly provided in the first flow controlling body 11*v* of the first flow controlling element 10*v*; the ninth channel 109*v*, the tenth channel 1010*v* and the eleventh channel 1011*v* are respectively and spacedly provided in the second flow controlling body 21*v* of the second flow controlling element 20*v*, as shown in FIG. 231A and FIG. 231B.

Alternatively, each of the first flow controlling side 100*v* of the first flow controlling body 11*v* of the first flow controlling element 10*v* and the second flow controlling side 200*v* of the second flow controlling body 21*v* of the second flow controlling element 20*v* is circular-shaped, wherein the first channel 101*v*, the second channel 102*v*, the third channel 103*v*, the fourth channel 104*v*, the fifth channel 105*v*, the seventh channel 107*v* and the eighth channel 108*v* are radially provided in the first flow controlling side 100*v* of the first flow controlling element 10*v*, and the ninth channel 109*v*, the tenth channel 1010*v* and the eleventh channel 1011*u* are radially provided in the second flow controlling side 200*v* of the second flow controlling element 20*v*.

As shown in FIG. 231A and FIG. 231B, the first channel 101*v*, the fourth channel 104*v*, the fifth channel 105*v*, the second channel 102*v* and the third channel 103*v*, the eighth channel 108*v* and the seventh channel 107*v* of the flow control apparatus are arranged clockwise in the first flow controlling body 11*v* of the first flow controlling element 10*v* in the order thereof; the ninth channel 109*v*, the tenth channel 1010*v* and the eleventh channel 1011*v* of the flow control apparatus are arranged clockwise in the second flow controlling body 21*v* of the second flow controlling element 20*v* in the order thereof.

The first channel 101*v*, the fourth channel 104*v*, the fifth channel 105*v*, the second channel 102*v* and the third channel 103*v*, the eighth channel 108*v* and the seventh channel 107*v* of the flow control apparatus are arranged counter-clockwise in the first flow controlling body 11*v* of the first flow controlling element 10*v* in the order thereof; the ninth channel 109*v*, the tenth channel 1010*v* and the eleventh channel 1011*v* of the flow control apparatus are arranged counter-clockwise in the second flow controlling body 21*v* of the second flow controlling element 20*v* in the order thereof.

As shown in FIG. 231A to FIG. 231B, the first flow controlling side 100*v* of the first flow controlling element 10*v* of the flow control apparatus has a center section 1000*v* shown by a chain line, wherein the center section 1000*v* is provided in the first center portion 1111*v* of the top end 111*v* of the first flow controlling body 11*v* of the first flow controlling element 10*v*, wherein the remaining portion of the first flow controlling side 100*v* is clockwise and evenly divided into a first section 1001*v*, a second section 1002*v*, a third section 1003*v*, a fourth section 1004*v*, a fifth section 1005*v*, a sixth section 1006*v*, a seventh section 1007*v*, an eighth section 1008*v* and a ninth section 1009*v*, as shown by chain lines; wherein the second flow controlling side 200*v* of the second flow controlling element 20*v* of the flow control apparatus has a center division 2000*v*, wherein the center division 2000*v* is provided in the second center portion 2111*v* of the bottom end 211*v* of the second flow controlling body 21*v* of the second flow controlling element 20*v*, wherein the remaining portion of the second flow controlling side 200*v* is clockwise and evenly divided into a first division 2001*v*, a second division 2002*v*, a third division 2003*v*, a fourth division 2004*v*, a fifth division 2005*v*, a sixth division 2006*v*, a seventh division 2007*v*, an eighth division 2008*v* and a ninth division 1009*v*; wherein the first channel 101*v* is downwardly extended from the first section 1001*v*, the second section 1002*v* and the third section 1003*v* of the first flow controlling side 100*v*; the fourth channel 104*v* is downwardly extended from the fourth section 1004*v* of the first flow controlling side 100*v*; the fifth channel 105*v* is downwardly extended from the fifth section 1005*v* of the first flow controlling side 100*v*; the second channel 102*v* and the third channel 103*v* are respectively and downwardly extended from the sixth section 1006*v* of the first flow controlling side 100*v* and the third channel 103*v* is provided in an outside of the second channel 102*v*; the eighth channel 108*v* is downwardly extended from the eighth section 1008*v* of the first flow controlling side 100*v*; the seventh channel 107*v* is downwardly extended from the ninth section 1009*v* of the first flow controlling side 100*v*; the ninth channel 109*v* is upwardly extended from the first division 2001*v* of the second flow controlling side 200*v*; the tenth channel 1010*v* is upwardly extended from the fifth division 2005*v* and the sixth division 2006*v* of the second flow controlling side 200*v*; the eleventh channel 1011*v* is upwardly extended from the seventh division 2007*v* of the second flow controlling side 200*v*.

Preferably, the first channel 101*v*, the second channel 102*v*, the third channel 103*v*, the fourth channel 104*v*, the fifth channel 105*v*, the seventh channel 107*v* and the eighth channel 108*v* is downwardly and outwardly extended from the first flow controlling side 100*v* of the first flow controlling element 10*v*.

As shown in FIG. 230A, the flow control apparatus further comprises a casing 30*v* according to the thirty-eighth embodiment of the present disclosure, wherein the casing 30*v* comprises a casing body 31*v*, wherein the casing body 31*v* has an outer side wall 312*v* and an inner side wall 311*v* and defines an inner chamber 300*v*, wherein the first flow controlling element 10*v* is adapted for being provided in the inner chamber 300*v* and the first flow controlling side 100*v* of the first flow controlling element 10*v* is provided to face up, and the second flow controlling element 20*v* is adapted for being provided in the inner chamber 300*v* and the second flow controlling side 200*v* of the second flow controlling element 20*v* is provided to face down, wherein the first flow controlling body 11*v* of the first flow controlling element 10*v* further comprises a lower end 112*v* downwardly extended from the top end 111*v*, wherein the lower end 112*v* of the first flow controlling body 11*v* of the first flow controlling element 10*v* is connected with the inner side wall 311*v* of the casing body 31*v* of the casing 30*v* and divides spacedly the inner chamber 300*v* into a first receiving chamber 3001*v* and a second receiving chamber 3002*v*, wherein the casing 30*v* has a first opening 301*v*, a second opening 302*v*, a third opening 303*v* and a fourth opening 304*v*, wherein the first receiving chamber 3001*v* is respectively communicated with the first opening 301*v* and the ninth channel 109*v*; the second opening 302*v* is communicated with the third channel 103*v* of the flow control apparatus; the third opening 303*v* is communicated with the fourth channel 104*v* of the flow control apparatus; the fourth opening 304*v* is communicated with the fifth channel 105*v* and the eighth channel 108*v* of the flow control apparatus. Preferably, the first receiving chamber 3001*v* is respectively communicated with the first opening 301*v* and the ninth opening 1091*v* of the ninth channel 109*v* such that the first receiving chamber 3001*v* is respectively communicated with the first opening 301*v* and the ninth channel 109*v*.

As shown in FIG. 230A, the flow control apparatus further comprises a flow separating element 40*v* provided in second receiving chamber 3002*v* and extended downwardly form the first flow controlling body 11*v*, wherein the flow separating element 40*v* has a second flow guiding chamber 402*v* communicated with the second channel 102*v* and the seventh channel 107*v* of the flow control apparatus and the flow separating element 40*v* and the inner side wall 311*v* of the casing 30*v* define a first flow guiding chamber 401*v* therebetween, wherein the first flow guiding chamber 401*v* is communicated with the first channel 101*v*.

As shown in FIG. 230A, the flow control apparatus further comprises a flow guiding element 50*v*, wherein the flow guiding element 50*v* comprises a flow guiding body 51*v*, wherein the flow guiding body 51*v* defines a first flow guiding channel 510*v*, wherein the flow guiding body 51*v* of the flow guiding element 50*v* is upwardly extended from the second flow controlling body 21*v* of the second flow controlling element 20*v* and the first flow guiding channel 510*v* of the first flow guiding element 50*v* is communicated with the eleventh channel 1011*v* of the flow control apparatus.

As shown in FIG. 231A to FIG. 231C, and FIG. 230B, the flow control apparatus further comprises a wear-resistant member 60*v* detachably provided between the first flow controlling element 10*v* and the second flow controlling element 20*v*, wherein the wear-resistant member 60*v* comprises a wear-resistant body 61*v*, wherein the wear-resistant body 61*v* is capable of sealing the channel opening 10131*v* of the thirteenth channel 1013*v*, wherein the wear-resistant body 61*v* has a wear-resistant side 610*v* adapted for contacting physically with the second flow controlling side 200*v* of the second flow controlling body 21*v*, wherein the wear-resistant side 610*v* is treated by a wear-resistant process to minimize the force of friction, which is resulted from the rotating of the first flow controlling body 11*v* of the first flow controlling element 10*v* relative to the second flow controlling body 21*v* of the second flow controlling element 20*v* so as to prolong the life-span of the flow control apparatus. The wear-resistant member 60*v* is further sized and shaped to match the first flow controlling side 100*v* of the first flow controlling element 10*v* and the wear-resistant body 61*v* of the wear-resistant member 60*v* spacedly defines a first port 601*v*, a second port 602*v*, a third port 603*v*, a fourth port 604*v*, a fifth port 605*v*, a seventh port 607*v* and an eighth port 608*v*, wherein the first port 601*v*, the second port 602*v*, the third port 603*v*, the fourth port 604*v*, the fifth port 605*v*, the seventh port 607*p* and the eighth port 608*v* are respectively sized and shaped to match the first channel 101*v*, the second channel 102*v*, the third channel 103*v*, the fourth channel 104*v*, the fifth channel 105*v*, the seventh channel 107*v* and the eighth channel 108*v* of the flow control apparatus.

As shown in FIG. 233, the flow control apparatus further comprises an injector 70*v*, wherein the injector 70*v* is provided in the outer side wall 312*v* of the casing body 31*v* of the casing 30*v* of the flow control apparatus, wherein the injector 70*v* is respectively communicated with the third opening 303*v* and the fourth opening 304*v* of the casing 30*v*.

As shown in 230A, the flow control apparatus further comprises an auxiliary unit 80*v*, wherein the auxiliary unit 80*v* comprises a driving element 81*v* upwardly extended from the second flow controlling body 21*v* of the second flow controlling element 20*v*, wherein the driving element 81*v* is adapted for driving the second flow controlling body 21*v* of the second flow controlling element 20*v* of the flow control apparatus to rotate relative to the first controlling body 11*v* of the first flow controlling element 10*v*. The auxiliary unit 80*v* further comprises a fixing element 82*v* extended upwardly from the driving element 81*v*, wherein the fixing element 82*v* is adapted for holding the driving element 81*v* at a position to hold the second flow controlling body 21*v* of the second flow controlling element 20*v* at a position. Preferably, the driving element 81*v* of the auxiliary unit 80*v* of the flow control apparatus is integrated with the flow guiding body 51*v* of the flow guiding element 50*v*.

An alternative of the flow control apparatus according to the thirty-eighth embodiment of the present disclosure is shown in FIG. 231D and FIG. 231F, wherein the flow control apparatus further comprises a twelfth channel 1012*v* provided in the first center portion 1111*v* and extended downwardly from the first flow controlling side 100*v*, and the eleventh channel 1011*v* is extended upwardly from the second flow controlling side 200*v* of the bottom end 211*v* of the second flow controlling body 21*v* to the upper end 212*v* and extended from the second center portion 2111*v* of the second flow controlling element 20*v* into the second edge portion 2112*v* thereof. Preferably, the first center portion 1111*v* of the top end 111*v* of the first flow controlling body 11*v* of the first flow controlling element 10*v* is provided in the first center section 1000*v* of the first flow controlling side 100*v*, and the eleventh channel 1011*v* is extended from the second edge portion 2112*v* of the second flow controlling element 20*v* into the second center portion 2111*v* and extended upwardly from the seventh division 2007*v* and the center division 2000*v* of the second flow controlling side 200*v* to the upper end 212*v* of the second flow controlling body 21*v*. Preferably, the wear-resistant member 60*v* further has a twelfth port 6012*v* corresponding to the twelfth channel 1012*v*. In other words, the eleventh channel 1011*v* is extended upwardly from the second flow controlling side 200*v* of the bottom end 211*v* of the second flow controlling body 21*v* to the upper end 212*v* of the second flow controlling body 21*v* and extended from the second edge portion 2112*v* of the second flow controlling element 20*v* into the second center portion 2111*v*.

Referring to FIG. 233, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90*v*, wherein the water treatment device 90*v* comprises a water treatment container 91*v*, a liquid collecting unit 92*v* and a water treatment unit 93*v*, wherein the water treatment container 91*v* has a water treatment chamber 900*v* and an upper opening 910*v*, the liquid collecting unit 92*v* comprises a center pipe 921*v*, the water treatment unit 93*v* is adapted for being received in the water treatment chamber 900*v*, the center pipe 921*v* is adapted for being extended downwardly through the upper opening 910*v* to enter into the water treatment chamber 900*v*, and the center pipe 921*v* and the upper opening 910*v* defines an outer opening 9101*v*, wherein the center pipe 921*v* has an upper opening 9211*v* and a lower opening

9212*v*, wherein the liquid in the water treatment container 91*v*, such as water, is adapted for being treated by the water treatment unit 93*v* and flows from the lower opening 9212*v* of the center pipe 921*v* of the liquid collecting unit 92*v* into the center pipe 921*v* and flows out of the center pipe 921*v*; preferably, the water treatment unit 93*v* provided in the water treatment container 91*v* comprises water treatment material, such as softening resin, activated carbon or the like, or the combination thereof.

It is worth mentioning that the outer opening 9101*v* of the water treatment device 90*v* of the water treatment system may be communicated with the first channel 101*v* of the flow control apparatus, or the second channel 102*v* and the seventh channel 107*v* of the flow control apparatus, the upper opening 9211*v* of the central pipe 921*v* of the liquid collecting unit 92*v* of the water treatment device 90*v* may be communicated with the first channel 101*v* of the flow control apparatus, or the second channel 102*v* and the seventh channel 107*v* of the flow control apparatus; wherein when the outer opening 9101*v* of the water treatment device 90*v* is communicated with the first channel 101*v* of the flow control apparatus, the upper opening 9211*v* of the central pipe 921*v* of the liquid collecting unit 92*v* of the water treatment device 90*v* is communicated with the second channel 102*v* and the seventh channel 107*v* of the flow control apparatus; when the outer opening 9101*v* of the water treatment device 90*v* of the water treatment system is communicated with the second channel 102*v* and the seventh channel 107*v* of the flow control apparatus, the upper opening 9211*v* of the central pipe 921*v* of the liquid collecting unit 92*v* of the water treatment device 90*v* is communicated with the first channel 101*v* of the flow control apparatus.

As shown in FIG. 233, the flow control apparatus further comprises a brine supply container 84*v*, wherein the injector 70*v* may be communicated with the brine supply container 84*v*, wherein when the flow control apparatus is under the third working state, the fluid from the third opening 303*v* may flow into the injector 70*v* and make the liquid in the brine supply container 84*v* flow into the fourth opening 304*v* of the casing 30*v*. Preferably, the outer opening 9101*v* of the water treatment device 90*v* of the water treatment system and the upper opening 9211*v* of the central pipe 921*v* of the water treatment device 90*v* are respectively adapted to be communicated with the first flow guiding chamber 401*v* and the second flow guiding chamber 402*v* of the flow control apparatus, wherein when the outer opening 9101*v* of the water treatment device 90*v* is communicated with the first flow guiding chamber 401*v* of the flow control apparatus, the upper opening 9211*v* of the central pipe 921*v* of the water treatment device 90*v* is communicated with the second flow guiding chamber 402*v* of the flow control apparatus, and when the flow control apparatus is under the third working state, the fluid from the brine supply container 84*p* can flow through the injector 70*v* and flow into the seventh channel 107*v*, and then flow into the water treatment container 91*v* via the second flow guiding chamber 402*v* and the central pipe 921*v* of the liquid collecting unit 92*v* of the water treatment device 90*v*. And when the outer opening 9101*v* of the water treatment device 90*v* of the water treatment system is communicated with the second flow guiding chamber 402*v*, the upper opening 9211*v* of the central pipe 921*v* of the water treatment device 90*v* is communicated with the first flow guiding chamber 401*v* of the flow control apparatus, and when the flow control apparatus is under the third working state, the fluid from the brine supply container 84*v* can flow through the injector 70*v* and flow into the seventh channel 107*v*, and then flow into the water treatment container 91*v* via the second flow guiding chamber 402*v* and the outer opening 9101*v* of the water treatment device 90*v*. In other words, when the outer opening 9101*v* of the water treatment device 90*v* is communicated with the first flow guiding chamber 401*v* of the flow control apparatus and the upper opening 9211*v* of the central pipe 921*v* of the water treatment device 90*v* is communicated with the second flow guiding chamber 402*v* of the flow control apparatus, the fluid from the brine supply container 84*v* can flow through the water treatment unit 93*v* from bottom to top; and when the outer opening 9101*v* of the water treatment device 90*v* is communicated with the second flow guiding chamber 402*v* of the flow control apparatus and the upper opening 9211*v* of the central pipe 921*v* of the water treatment device 90*v* is communicated with the first flow guiding chamber 401*v* of the flow control apparatus, the fluid from the brine supply container 84*v* can flow through the water treatment unit 93*v* from top to bottom. Preferably, the liquid in the brine supply container 84*v* is regeneration solution for the water treatment unit 93*v* of the water treatment device 90*v*, so by controlling the communicating type that the outer opening 9101*v* and the upper opening 9211*v* of the central pipe 921*v* of the water treatment device 90*v* are communicated with the flow control apparatus to control the regeneration solution from the brine supply container 84*v* of the water treatment unit 93*v* to regenerate and elute the water treatment unit 93*v*.

Similarly, when the outer opening 9101*v* of the water treatment device 90*v* is communicated with the second flow guiding chamber 402*v* of the flow control apparatus and the upper opening 9211*v* of the central pipe 921*v* of the water treatment device 90*v* is communicated with the first flow guiding chamber 401*v* of the flow control apparatus, and when the flow control apparatus is under the first working state and the liquid flows from the flow control apparatus into the water treatment container 91*v*, the liquid flows through the water treatment unit 93*v* from bottom to top so as to make the water treatment unit 93*v* be lifted up by the liquid, and at this moment, if want to change the working state, in order to prevent the resin layer of the water treatment unit 93*v* from being scattered, the resin layer of the water treatment unit 93*v* need to naturally fall, so the standby working state of the flow control apparatus has to be next to the first working state to prevent the water flow interference resulted from crossing over other working states, which is produced when the first working state and the standby working state do not neighbor to each other and the flow control apparatus is switched from the first working state into the standby working state.

It is worth mentioning that when the flow control apparatus is under the second working state, the ninth channel 109*v* is communicated with the second channel 102*v* and the eleventh channel 1011*v* is communicated with the first channel 101*v* such that the waste water from the water treatment container 91*v* of the water treatment device 90*v* is able to drain via the eleventh channel 1011*v*; when the flow control apparatus is under the third working state, the ninth channel 109*v* is communicated with the fourth channel 104*v*, the tenth channel 1010*v* is communicated with the seventh channel 107*v* and the eighth channel 108*v*, the eleventh channel 1011*v* is communicated with the first channel 101*v* such that the waste water from the water treatment container 91*v* of the water treatment device 90*v* is able to drain via the eleventh channel 1011*v*; when the flow control apparatus is under the fifth working state, the ninth channel 109*v* of the flow control apparatus is communicated with the first channel 101*v*, and the eleventh channel 1011*v* is communicated with the seventh channel 107*v* such that the waste water from the water treatment container 91*v* of the water treatment device 90*v* is able to drain upwardly via the eleventh channel 1011*v*. So the waste water from the water treatment system upwardly drains via the eleventh channel 1011*v* such that the eleventh channel 1011*v* for drainage does not reduce the sizes of the first channel 101*v*, the second channel 102*v*, the third channel 103*v*, the fourth channel 104*v*, the fifth channel 105*v*, the seventh channel 107*v* and the eighth channel 108*v* of the flow control apparatus and decreases the interference resulted from the first channel 101*v*, the second channel 102*v*, the third channel 103*v*, the fourth channel 104*v*, the fifth channel 105*v*, the seventh channel 107*v* and the eighth channel 108*v* provided in the first flow controlling body 11*v* of the first flow controlling element 10*v*. In other words, because the eleventh channel 1011*v* upwardly penetrates through the second flow controlling body 21*v* of the second flow controlling element 20*v*, so the waste water from the water treatment system may flow through the eleventh channel 1011*v* and flow upwardly into the flow guiding element 50*v* to be drained via the first flow guiding channel 510*v* of the flow guiding element 50*v*.

As shown in FIG. 233 is an operation schematic diagram of the water treatment system installed with the flow control apparatus of the present disclosure, as shown in FIG. 232A, when the flow control apparatus is under the first working state, the water treatment system is in a water treating state, raw water (water to be processed) may flow from the first opening 301*v* of the casing 30*v* of the flow control apparatus into the ninth channel 109*v* and the first channel 101*v*, and then flow through the outer opening 9101*v* of the water treatment system and flow into the water treatment chamber 900*v* of the water treatment system, and then flow upwardly into the second channel 102*v* and the third channel 103*v* of the flow control apparatus via the central pipe 921*v* of the liquid collecting unit 92*v* of the water treatment system, and then flow out through the second opening 302*v* of the casing 30*v* of the flow control apparatus;

as shown in FIG. 232B, when the flow control apparatus is under the second working state, the water treatment system is in a backwash state, raw water (water to be processed) may flow from the first opening 301*v* of the casing 30*v* of the flow control apparatus into the ninth channel 109*v* and the second channel 102*v*, and then flow through the upper opening 9211*v* of the central pipe 921*v* of the water treatment system and flow through the water treatment chamber 900*v* of the water treatment system from bottom to top, and then flow into the first channel 101*v* of the flow control apparatus via the outer opening 9101*v* of the water treatment system, and then flow out through the eleventh channel 1011*v* and the first flow guiding channel 510*v;* as shown in FIG. 232C, when the flow control apparatus is under the third working state, the water treatment system is in an upflow brine intaking state, raw water (water to be processed) may flow from the first opening 301*v* of the casing 30*v* of the flow control apparatus into the ninth channel 109*v* and the fourth channel 104*v*, and then flow through the third opening 303*v* into the injector 70*v* to be injected, and after being mixed with the liquid from the brine supply container 84*v*, the mixture may flow into the fourth opening 304*v*, and then flow through the thirteen channel 1013*v* and flow into the eighth channel 108*v*, and then flow into the seventh channel 107*v*, and then flow through the water treatment chamber 900*v* from bottom to top via the upper opening 9211*v* of the water treatment system, and then flow through the first channel 101*v* via the outer opening 9101*v* of the water treatment system, at last flow out through the eleventh channel 1011*v* and the first flow guiding channel 510*v;* as shown in FIG. 232D, when the flow control apparatus is under the fourth working state, the water treatment system is in a treated water supplement and water treating state and the treated water is made from the water treatment chamber 900*v*, wherein raw water (water to be processed) may flow from the first opening 301*v* of the casing 30*v* of the flow control apparatus into the ninth channel 109*v* and the first channel 101*v* of the flow control apparatus, and then flow into the water treatment chamber 900*v* of the water treatment system via the outer opening 9101*v* of the water treatment system, and then flow into the second channel 102*v* via the central pipe of the liquid collecting unit of the water treatment system, and then flow respectively into the fifth channel 105*v* and the third channel 103*v*, and then the water flowing into the fifth channel 105*v* flow into the injector via the fourth opening 304*v* of the casing 30*v* to supplement water into the brine supply container 84*v*, at the same time, the water flowing into the third channel 103*v* may flow out via the second opening 302*v* of the casing 30*v;*

As shown in FIG. 232E, when the flow control apparatus is under the fifth working state, the water treatment system is in a forwardwash state, raw water (water to be processed) may flow from the first opening 301*v* of the casing 30*v* of the flow control apparatus into the ninth channel 109*v* and the first channel 101*v*, and then flow into the water treatment chamber 900*v* via the outer opening 9101*v* of the water treatment system and flow upwardly into the seventh channel 107*v* via the central pipe 921*v* of the liquid collecting unit 92*v* of the water treatment system, and then flow out through the eleventh channel 1011*v* and the first flow guiding channel 510*v*.

As shown in FIG. 232F, when the flow control apparatus is under the standby working state, raw water may flow via the first opening 301*v* of the casing 30*v* of the flow control apparatus, but it cannot flow into the first flow controlling element 10*v*.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93*v* from bottom to top; when the flow control apparatus is under the third working state, the water treatment system can make the solution in the brine supply container 84*v* flow into the water treatment container 91*v* via the upper opening 9211*v* of the central pipe of the water treatment device 90*v*; when the flow control apparatus is under the fourth working state, the water treatment system can supplement treated water into the brine supply container 84*v* and supply water for a user via the third channel 103*v* and the second opening 302*v*, wherein because the fourth working state is next to the first working state, so when the flow control apparatus is switched from the first working state to the fourth working state, the water treatment system can continuously supply treated water for the user so as to achieve a water supplement function, which does not impact the water supplying and is a useful function; when the flow control apparatus is under the fifth working state, the water treatment system can achieve washing the water treatment unit 93*v* from top to bottom; when the flow control apparatus is under the standby working state, the water treatment apparatus stops working and is under a standby state.

Further, the first working state of the flow control apparatus is neighboring to the standby working state, so when a user wants to adjust the water treatment system in a softening working state being in a standby working state or a shutdown working state, the user just need to drive the first flow controlling element 20*v* of the flow control apparatus to rotate for a shortest distance to achieve the working state switch of the water treatment system. In other words, the first working state and the standby working state of the flow control apparatus are successive in achieving such that the working state switch of the water treatment system installed with the flow control apparatus of the present disclosure meets consumer's usage habits and decreases the rotating distance of the second flow controlling body 21*v* of the second flow controlling element 20*v* relative to the first flow controlling body 11*v* of the first flow controlling element 10*v* when the water treatment system is switched between two different working state so as to minimize the wear and tear between the second flow controlling element 20*v* and the first flow controlling element 10*v* and prolong the life-span thereof.

The flow control apparatus of the present disclosure has advantages, especially, it has a standby working state and the standby working state is next to the water treatment working state (the first working state). Because the first working state and the standby working state are successive each other on the action such that the operations switch type of the water treatment system of the present disclosure better meets a consumer's usage habits and decreases the rotating distance of the second flow controlling body of the second flow controlling element relative to the first flow controlling body of the first flow controlling element when the water treatment system is switched between two different working state so as to minimize the wear and tear between the second flow controlling element and the first flow controlling element and prolong the life-span thereof. Especially, in industry application, under the first working state, the water treatment unit may be provided in the water treatment chamber in a floating manner to receiving more filtering material therein, in the regeneration working state, the water treatment unit has to be naturally fallen and the standby working state of the present flow control apparatus can exactly help the resin layer to fall naturally. More especially, in order to prevent the resin layer being scattered when the water treatment unit falls, the standby working state is preferably neighboring to the first working state to prevent the water flow interference resulted from the working state switch crossing over the other working states. The flow control apparatus of the present embodiment can achieve the above function. The flow control apparatus of the present embodiment may comprise nine equal divisions and the first channel of the first flow controlling element covers three equal divisions, which is beneficial in increasing the diameters of the water channels of the flow control apparatus and the rate of flow; wherein the flow control apparatus employs a technical solution of upflow brine intaking and regeneration achieving a higher regeneration efficiency than downflow brine intaking and regeneration among domestic small-capacity water softeners using softening resin as treating material and brine as regenerating agent, and it can save brine; wherein the flow control apparatus of the present embodiment employs a technical solution of softened water supplement, which is beneficial in decreasing the hardness of the brine solution of the brine supply container and increasing the regeneration efficiency thereof, and decreasing salt bridges in the brine supply container and helping the brine to be dissolved. It is worth mentioning that the flow control apparatus of the present disclosure can simultaneously supplement softened water and supply softened water. Especially, when the flow control apparatus is switched into the water supplement and water supplying working state, the water treatment system can continuously supply treated water to achieve a water supplement function when softened water supplement is needed (under the first working state, there is no liquid in the brine supply container), which does not impact the water supplying and is a useful function, so as to make that the brine supply container of the water treatment system has not to be always filled with solution for regenerating. Because the brine solution can produce a pressure impacting the life-span of the brine supply container and result in brine caking impacting dissolving of brine, So the technology is worth being applied for domestic or industrial products. The flow control apparatus of the present embodiment has an anticipated aligning order of working states as flows: water treating working state->>softened water supplement working state->>standby state->>backwash working state->>upflow brine intaking working state->>forwardwash working state, wherein the softened water supplement working state is next to the water treating working state, so the flow control apparatus of the present embodiment can supplement water before the regeneration working state and backwash after the water supplement working state so as to decrease the rotating distance of the moving valve disc and prolongs the life-span of the flow control apparatus.

Referring to FIG. 234 to FIG. 236B of the drawings of the present disclosure, a flow control apparatus according to a thirty-ninth preferred embodiment of the present disclosure is illustrated, which is adapted for being used for controlling fluid to flow in multiple directions, wherein the flow control apparatus comprises a first flow controlling element 10*x* and a second flow controlling element 20*x* provided rotatably on the first flow controlling element 10*x*, wherein the first flow controlling element 10*x* comprises a first flow controlling body 11*x*, wherein the first flow controlling body 11*x* comprises a top end 111*x*, wherein the top end 111*x* defines a first flow controlling side 100*x*; wherein the second flow controlling element 20*x* comprises a second flow controlling body 21*x*, wherein the second flow controlling body 21*x* comprises a bottom end 211*x* and an upper end 212*x* upwardly extended from the bottom, wherein the bottom end 211*x* defines a second flow controlling side 200*x*, wherein the first flow controlling side 100*x* of the first flow controlling element 10*x* is adapted for contacting physically with the second flow controlling side 200*x* of the second flow controlling element 20*x*.

As shown in FIG. 236A to FIG. 236B, the top end 111*x* of the first flow controlling element 10*x* of the flow control apparatus further comprises a first center portion 1111*x*, a first edge portion 1112*x* and a first middle portion 1113*x* extended between the first center portion 1111*x* and the first edge portion 1112*x*, wherein the bottom end 211*x* of the second flow controlling body 21*x* of the second flow controlling element 20*x* further comprises a second center portion 2111*x*, a second edge portion 2112*x* and a second middle portion 2113*x* extended between the second center portion 2111*x* and the second edge portion 2112*x*, wherein the flow control apparatus has a first channel 101*x*, a second channel 102*x*, a third channel 103*x*, a fourth channel 104*x*, a fifth channel 105*x*, a seventh channel 107*x*, an eighth channel 108*x*, a ninth channel 109*x*, a tenth channel 109*x* and an eleventh channel 1011*x*, wherein the first channel 101*x* is downwardly extended from the first flow controlling side 100*x* of the first flow controlling element 10*x*; wherein the second channel 102*x* is downwardly extended from the first flow controlling side 100x of the first flow controlling element 10x; wherein the third channel 103x is downwardly extended from the first flow controlling side 100x of the first flow controlling element 10x; wherein the fourth channel 104x is downwardly extended from the first flow controlling side 100x of the first flow controlling element 10x; wherein the fifth channel 105x is downwardly extended from the first flow controlling side 100x of the first flow controlling element 10x; wherein the seventh channel 107x is downwardly extended from the first flow controlling side 100x of the first flow controlling element 10x; wherein the eighth channel 108x is downwardly extended from the first flow controlling side 100x of the first flow controlling element 10x; wherein the ninth channel 109x is extended upwardly and outward from the second flow controlling side 200x of the bottom end 211x of the second flow controlling body 21x and defines a ninth opening 1091x communicated with outer space thereof; wherein the tenth channel 1010x is extended upwardly from the second flow controlling side 200x of the bottom end 211x of the second flow controlling body 21x; wherein the eleventh channel 1011x is extended upwardly from the second flow controlling side 200x of the bottom end 211x of the second flow controlling body 21x and penetrates through the second flow controlling body 21x of the second flow controlling element 20x. Preferably, the first channel 101x is extended from the first middle portion 1113x of the top end 111x of the first flow controlling body 11x of the first flow controlling element 10x into the first edge portion 1112x; the second channel 102x, the fourth channel 104x, the fifth channel 105x, the seventh channel 107x and the eighth channel 108x are respectively provided in the first middle portion 1113x of the top end 111x of the first flow controlling body 11x; the third channel 103x is provided in the first edge portion 1112x of the top end 111x of the first flow controlling body 11x and the third channel 103x is provided in an outside of the second channel 102x; the ninth channel 109x is extended upwardly from the second middle 2113x of the bottom end 211x of the second flow controlling body 21x and defines a sealing rib 1114x provided in an outside of the ninth channel 109x, wherein the sealing rib 1114x is adapted for blocking the third channel 103x on the first flow controlling side 100x; wherein the tenth channel 1010x is extended from the second middle portion 2113x of the bottom end 211x of the second flow controlling body 21x into the second edge portion 2112x of the bottom end 211x; the eleventh channel 1011x is extended upwardly from the second middle portion 2113x of the bottom end 211x of the second flow controlling body 21x of the second flow controlling element 20x.

As shown in FIG. 237A to FIG. 237E, the second flow controlling element 20x is able to rotate relative to the first flow controlling element 10x so that the flow control apparatus has a first working state, a second working state, a third working state, a fourth working state and a fifth working state, wherein when the flow control apparatus is in the first working state, the ninth channel 109x is communicated with the first channel 101x, wherein the tenth channel 1010x is communicated with the second channel 102x and the third channel 103x; wherein when the control apparatus is in the second working state, the ninth channel 109x is communicated with the second channel 102x, and the eleventh channel 1011x is communicated with the first channel 101x; wherein when the flow control apparatus is in the third working state, the ninth channel 109x is communicated with the fourth channel 104x, the tenth channel 1010x is communicated with the eighth channel 108x and the seventh channel 107x, the eleventh channel 1011x is communicated with the first channel 101x; wherein when the flow control apparatus is in the fourth working state, the ninth channel 109x is communicated with the first channel 101x, the tenth channel 1010x is communicated with the second channel 102x, the third channel 103x and the fifth channel 105x; wherein when the flow control apparatus is in the fifth working state, the ninth channel 109x of the flow control apparatus is communicated with the first channel 101x, and the eleventh channel 1011x is communicated with the seventh channel 107x. Preferably, when the flow control apparatus is in the first working state, the eleventh channel 1011x is communicated with the eighth channel 108x; when the flow control apparatus is in the second working state, the tenth channel 1010x is communicated with the first channel 101x; when the flow control apparatus is in the fifth working state, the tenth channel 1010x is communicated with the eighth channel 108x. More preferably, when the flow control apparatus is in the first working state, the fourth channel 104x, the fifth channel 105x and the seventh channel 107x are blocked by the second flow controlling element 20x; when the flow control apparatus is in the second working state, the third channel 103x, the fourth channel 104x, the fifth channel 105x, the seventh channel 107x and the eighth channel 108x are blocked by the second flow controlling element 20x; when the flow control apparatus is in the third working state, the second channel 102x, the third channel 103x and the fifth channel 105x are blocked by the second flow controlling element 20x; when the flow control apparatus is in fourth working state, the fourth channel 104x, the seventh channel 107x and the eighth channel 108x are blocked by the second flow controlling element 20x, the eleventh channel 1011x is blocked by the first flow controlling element 10x; when the flow control apparatus is in the fifth working state, the second channel 102x, the third channel 103x, the fourth channel 104x and the fifth channel 105x are blocked by the second flow controlling element 20x.

As shown in FIG. 235B, the flow control apparatus further comprises a thirteenth channel 1013x, wherein the thirteenth channel 1013x is provided in the first flow controlling body 11x of the first flow controlling element 10x and extended between the fifth channel 105x and the eighth channel 108x to communicate the fifth channel 105x with the eighth channel 108x. Preferably, the thirteenth channel 1013x of the flow control apparatus is downwardly extended from the first flow controlling side 100x and defines an channel opening 10131x facing up, wherein the second flow controlling element 20x further comprises a sealing element 22x, wherein the sealing element 22x is extended outwardly from the second edge portion 2112x of the second flow controlling body 21x of the second flow controlling element 20x, and when the second flow controlling element 20x rotates relative to the first flow controlling element 10x, the sealing element 22x is capable of blocking the channel opening 10131x of the thirteenth channel 1013x. More preferably, the thirteenth channel 1013x of the flow control apparatus is not directly communicated with the first channel 101x, the second channel 102x, the third channel 103x, the fourth channel 104x and the seventh channel 107x.

It is worth mentioning that the first channel 101x, the second channel 102x, the third channel 103x, the fourth channel 104x, the fifth channel 105x, the seventh channel 107x and the eighth channel 108x of the flow control apparatus are respectively and spacedly provided in the first flow controlling body 11x of the first flow controlling element 10x; the ninth channel 109x, the tenth channel 1010x and the eleventh channel 1011x are respectively and spacedly provided in the second flow controlling body 21*x* of the second flow controlling element 20*x*, as shown in FIG. 236A and FIG. 236B.

Alternatively, each of the first flow controlling side 100*x* of the first flow controlling body 11*x* of the first flow controlling element 10*x* and the second flow controlling side 200*x* of the second flow controlling body 21*x* of the second flow controlling element 20*x* is circular-shaped, wherein the first channel 101*x*, the second channel 102*x*, the third channel 103*x*, the fourth channel 104*x*, the fifth channel 105*x*, the seventh channel 107*x* and the eighth channel 108*x* are radially provided in the first flow controlling side 100*x* of the first flow controlling element 10*x*, and the ninth channel 109*x*, the tenth channel 1010*x* and the eleventh channel 1011*x* are radially provided in the second flow controlling side 200*x* of the second flow controlling element 20*x*.

As shown in FIG. 236A and FIG. 236B, the first channel 101*x*, the fourth channel 104*x*, the fifth channel 105*x*, the second channel 102*x* and the third channel 103*x*, the eighth channel 108*x* and the seventh channel 107*x* of the flow control apparatus are arranged clockwise in the first flow controlling body 11*x* of the first flow controlling element 10*x* in the order thereof; the ninth channel 109*x*, the tenth channel 1010*x* and the eleventh channel 1011*x* of the flow control apparatus are arranged clockwise in the second flow controlling body 21*x* of the second flow controlling element 20*x* in the order thereof.

Alternatively, the first channel 101*x*, the fourth channel 104*x*, the fifth channel 105*x*, the second channel 102*x* and the third channel 103*x*, the eighth channel 108*x* and the seventh channel 107*x* of the flow control apparatus are arranged counter-clockwise in the first flow controlling body 11*x* of the first flow controlling element 10*x* in the order thereof; the ninth channel 109*x*, the tenth channel 1010*x* and the eleventh channel 1011*x* of the flow control apparatus are arranged counter-clockwise in the second flow controlling body 21*x* of the second flow controlling element 20*x* in the order thereof.

As shown in FIG. 236A to FIG. 236B, the first flow controlling side 100*x* of the first flow controlling element 10*x* of the flow control apparatus has a center section 1000*x* shown by a chain line, wherein the center section 1000*x* is provided in the first center portion 1111*x* of the top end 111*x* of the first flow controlling body 11*x* of the first flow controlling element 10*x*, wherein the remaining portion of the first flow controlling side 100*x* is clockwise and evenly divided into a first section 1001*x*, a second section 1002*x*, a third section 1003*x*, a fourth section 1004*x*, a fifth section 1005*x*, a sixth section 1006*x*, a seventh section 1007*x*, an eighth section 1008*x* and a ninth section 1009*x*, as shown by chain lines; wherein the second flow controlling side 200*x* of the second flow controlling element 20*x* of the flow control apparatus has a center division 2000*x*, wherein the center division 2000*x* is provided in the second center portion 2111*x* of the bottom end 211*x* of the second flow controlling body 21*x* of the second flow controlling element 20*x*, wherein the remaining portion of the second flow controlling side 200*x* is clockwise and evenly divided into a first division 2001*x*, a second division 2002*x*, a third division 2003*x*, a fourth division 2004*x*, a fifth division 2005*x*, a sixth division 2006*x*, a seventh division 2007*x*, an eighth division 2008*x* and a ninth division 1009*x*; wherein the first channel 101*x* is downwardly extended from the first section 1001*x*, the second section 1002*x* and the third section 1003*x* of the first flow controlling side 100*x*; the fourth channel 104*x* is downwardly extended from the fourth section 1004*x* of the first flow controlling side 100*x*; the fifth channel 105*x* is downwardly extended from the fifth section 1005*x* of the first flow controlling side 100*x*; the second channel 102*x* and the third channel 103*x* are respectively and downwardly extended from the sixth section 1006*x* of the first flow controlling side 100*x* and the third channel 103*x* is provided in an outside of the second channel 102*x*; the eighth channel 108*x* is downwardly extended from the eighth section 1008*x* of the first flow controlling side 100*x*; the seventh channel 107*x* is downwardly extended from the ninth section 1009*x* of the first flow controlling side 100*x*; the ninth channel 109*x* is upwardly extended from the first division 2001*x* of the second flow controlling side 200*x*; the tenth channel 1010*x* is upwardly extended from the fifth division 2005*x* and the sixth division 2006*x* of the second flow controlling side 200*x*; the eleventh channel 1011*x* is upwardly extended from the seventh division 2007*x* of the second flow controlling side 200*x*.

Preferably, the first channel 101*x*, the second channel 102*x*, the third channel 103*x*, the fourth channel 104*x*, the fifth channel 105*x*, the seventh channel 107*x* and the eighth channel 108*x* is downwardly and outwardly extended from the first flow controlling side 100*x* of the first flow controlling element 10*x*.

As shown in FIG. 235A, the flow control apparatus further comprises a casing 30*x* according to the thirty-ninth embodiment of the present disclosure, wherein the casing 30*x* comprises a casing body 31*x*, wherein the casing body 31*x* has an outer side wall 312*x* and an inner side wall 311*x* and defines an inner chamber 300*x*, wherein the first flow controlling element 10*x* is adapted for being provided in the inner chamber 300*x* and the first flow controlling side 100*x* of the first flow controlling element 10*x* is provided to face up, and the second flow controlling element 20*x* is adapted for being provided in the inner chamber 300*x* and the second flow controlling side 200*x* of the second flow controlling element 20*x* is provided to face down, wherein the first flow controlling body 11*x* of the first flow controlling element 10*x* further comprises a lower end 112*x* downwardly extended from the top end 111*x*, wherein the lower end 112*x* of the first flow controlling body 11*x* of the first flow controlling element 10*x* is connected with the inner side wall 311*x* of the casing body 31*x* of the casing 30*x* and divides spacedly the inner chamber 300*x* into a first receiving chamber 3001*x* and a second receiving chamber 3002*x*, wherein the casing 30*x* has a first opening 301*x*, a second opening 302*x*, a third opening 303*x* and a fourth opening 304*x*, wherein the first receiving chamber 3001*x* is respectively communicated with the first opening 301*x* and the ninth channel 109*x*; the second opening 302*x* is communicated with the third channel 103*x* of the flow control apparatus; the third opening 303*x* is communicated with the fourth channel 104*x* of the flow control apparatus; the fourth opening 304*x* is communicated with the fifth channel 105*x* and the eighth channel 108*x* of the flow control apparatus. Preferably, the first receiving chamber 3001*x* is respectively communicated with the first opening 301*x* and the ninth opening 1091*x* of the ninth channel 109*x* such that the first receiving chamber 3001*x* is respectively communicated with the first opening 301*x* and the ninth channel 109*x*.

As shown in FIG. 235A, the flow control apparatus further comprises a flow separating element 40*x* provided in second receiving chamber 3002*x* and extended downwardly form the first flow controlling body 11*x*, wherein the flow separating element 40*x* has a second flow guiding chamber 402*x* communicated with the second channel 102*x* and the seventh channel 107*x* of the flow control apparatus and the flow separating element 40x and the inner side wall 311x of the casing 30x define a first flow guiding chamber 401x therebetween, wherein the first flow guiding chamber 401x is communicated with the first channel 101x.

As shown in FIG. 235A, the flow control apparatus further comprises a flow guiding element 50x, wherein the flow guiding element 50x comprises a flow guiding body 51x, wherein the flow guiding body 51x defines a first flow guiding channel 510x, wherein the flow guiding body 51x of the flow guiding element 50x is upwardly extended from the second flow controlling body 21x of the second flow controlling element 20x and the first flow guiding channel 510x of the first flow guiding element 50x is communicated with the eleventh channel 1011x of the flow control apparatus.

As shown in FIG. 236A to FIG. 236C, and FIG. 235B, the flow control apparatus further comprises a wear-resistant member 60x detachably provided between the first flow controlling element 10x and the second flow controlling element 20x, wherein the wear-resistant member 60x comprises a wear-resistant body 61x, wherein the wear-resistant body 61x is capable of sealing the channel opening 10131x of the thirteenth channel 1013x, wherein the wear-resistant body 61x has a wear-resistant side 610x adapted for contacting physically with the second flow controlling side 200x of the second flow controlling body 21x, wherein the wear-resistant side 610x is treated by a wear-resistant process to minimize the force of friction, which is resulted from the rotating of the second flow controlling body 21x of the second flow controlling element 20x relative to the first flow controlling body 11x of the first flow controlling element 10x so as to prolong the life-span of the flow control apparatus. The wear-resistant member 60x is further sized and shaped to match the first flow controlling side 100x of the first flow controlling element 10x and the wear-resistant body 61x of the wear-resistant member 60x spacedly defines a first port 601x, a second port 602x, a third port 603x, a fourth port 604x, a fifth port 605x, a seventh port 607x and an eighth port 608x, wherein the first port 601x, the second port 602x, the third port 603x, the fourth port 604x, the fifth port 605x, the seventh port 607x and the eighth port 608x are respectively sized and shaped to match the first channel 101x, the second channel 102x, the third channel 103x, the fourth channel 104x, the fifth channel 105x, the seventh channel 107x and the eighth channel 108x of the flow control apparatus.

As shown in FIG. 238, the flow control apparatus further comprises an injector 70x, wherein the injector 70x is provided in the outer side wall 312x of the casing body 31x of the casing 30x of the flow control apparatus, wherein the injector 70x is respectively communicated with the third opening 303x and the fourth opening 304x of the casing 30x.

As shown in 235A, the flow control apparatus further comprises an auxiliary unit 80x, wherein the auxiliary unit 80x comprises a driving element 81x upwardly extended from the second flow controlling body 21x of the second flow controlling element 20x, wherein the driving element 81x is adapted for driving the second flow controlling body 21x of the second flow controlling element 20x of the flow control apparatus to rotate relative to the first controlling body 11x of the first flow controlling element 10x. The auxiliary unit 80x further comprises a fixing element 82x extended upwardly from the driving element 81x, wherein the fixing element 82x is adapted for holding the driving element 81x at a position to hold the second flow controlling body 21x of the second flow controlling element 20x at a position. Preferably, the driving element 81x of the auxiliary unit 80x of the flow control apparatus is integrated with the flow guiding body 51x of the flow guiding element 50x.

An alternative of the flow control apparatus according to the thirty-ninth embodiment of the present disclosure is shown in FIG. 236D to FIG. 236F, wherein the flow control apparatus further comprises a twelfth channel 1012x provided in the first center portion 1111x and extended downward from the first flow controlling side 100x, and the eleventh channel 1011x is extended upwardly from the second flow controlling side 200x of the bottom end 211x of the second flow controlling body 21x to the upper end 212x and extended between the second middle portion 2113x of the bottom end 211x of the second flow controlling body 21x of the second flow controlling element 20x and the second center portion 2111x of the bottom end 211x. Preferably, the first center portion 1111x of the top end 111x of the first flow controlling body 11x of the first flow controlling element 10x is provided in the first center section 1000x of the first flow controlling side 100x, and the eleventh channel 1011x is extended between the second middle portion 2113x of the bottom end 211x of the second flow controlling element 20x and the second center portion 2111x of the bottom end 211x and extended upwardly from the seventh division 2007x and the center division 2000x of the second flow controlling side 200x to the upper end 212x of the second flow controlling body 21x. Preferably, the wear-resistant member 60x further has a twelfth port 6012x corresponding to the twelfth channel 1012x. The eleventh channel 1011x is extended upwardly from the second flow controlling side 200x of the bottom end 211x of the second flow controlling body 21x to the upper end 212x of the second flow controlling body 21u and extended from the second middle portion 2113x of the bottom end 211x of the second flow controlling element 20x into the second center portion 2111x of the bottom end 211x.

Referring to FIG. 238, an example for explaining the flow control apparatus of the present disclosure may be used for a fluid treatment system and/or a flow control system, such as a water treatment system, is provided, wherein the water treatment system comprises at least one flow control apparatus of the present disclosure and at least one water treatment device communicated with the flow control apparatus, such as a water treatment device 90x, wherein the water treatment device 90x comprises a water treatment container 91x, a liquid collecting unit 92x and a water treatment unit 93x, wherein the water treatment container 91x has a water treatment chamber 900x and an upper opening 910x, the liquid collecting unit 92x comprises a center pipe 921x, the water treatment unit 93x is adapted for being received in the water treatment chamber 900x, the center pipe 921x is adapted for being extended downwardly through the upper opening 910x to enter into the water treatment chamber 900x, and the center pipe 921x and the upper opening 910x defines an outer opening 9101x, wherein the center pipe 921x has an upper opening 9211x and a lower opening 9212x, wherein the liquid in the water treatment container 91x, such as water, is adapted for being treated by the water treatment unit 93u and flows from the lower opening 9212x of the center pipe 921x of the liquid collecting unit 92x into the center pipe 921x and flows out of the center pipe 921x; preferably, the water treatment unit 93x provided in the water treatment container 91x comprises water treatment material, such as softening resin, activated carbon or the like, or the combination thereof.

It is worth mentioning that the outer opening 9101x of the water treatment device 90x of the water treatment system may be communicated with the first channel 101x of the flow control apparatus, or the second channel 102x and the seventh channel 107*x* of the flow control apparatus, the upper opening 9211*x* of the central pipe 921*x* of the liquid collecting unit 92*x* of the water treatment device 90*x* may be communicated with the first channel 101*x* of the flow control apparatus, or the second channel 102*x* and the seventh channel 107*x* of the flow control apparatus; wherein when the outer opening 9101*x* of the water treatment device 90*x* is communicated with the first channel 101*x* of the flow control apparatus, the upper opening 9211*x* of the central pipe 921*x* of the liquid collecting unit 92*x* of the water treatment device 90*x* is communicated with the second channel 102*x* and the seventh channel 107*x* of the flow control apparatus; when the outer opening 9101*x* of the water treatment device 90*x* of the water treatment system is communicated with the second channel 102*x* and the seventh channel 107*x* of the flow control apparatus, the upper opening 9211*x* of the central pipe 921*x* of the liquid collecting unit 92*x* of the water treatment device 90*x* is communicated with the first channel 101*x* of the flow control apparatus.

As shown in FIG. 238, the flow control apparatus further comprises a brine supply container 84*x*, wherein the injector 70*x* may be communicated with the brine supply container 84*x*, wherein when the flow control apparatus is under the third working state, the fluid from the third opening 303*x* may flow into the injector 70*x* and make the liquid in the brine supply container 84*x* flow into the fourth opening 304*x* of the casing 30*x*. Preferably, the outer opening 9101*x* of the water treatment device 90*x* of the water treatment system and the upper opening 9211*x* of the central pipe 921*x* of the water treatment device 90*x* are respectively adapted to be communicated with the first flow guiding chamber 401*x* and the second flow guiding chamber 402*x* of the flow control apparatus, wherein when the outer opening 9101*x* of the water treatment device 90*x* is communicated with the first flow guiding chamber 401*x* of the flow control apparatus, the upper opening 9211*x* of the central pipe 921*x* of the water treatment device 90*x* is communicated with the second flow guiding chamber 402*x* of the flow control apparatus, and when the flow control apparatus is under the third working state, the fluid from the brine supply container 84*x* can flow through the injector 70*x* and flow into the seventh channel 107*x*, and then flow into the water treatment container 91*x* via the second flow guiding chamber 402*x* and the central pipe 921*x* of the liquid collecting unit 92*x* of the water treatment device 90*x*. And when the outer opening 9101*x* of the water treatment device 90*x* of the water treatment system is communicated with the second flow guiding chamber 402*x*, the upper opening 9211*x* of the central pipe 921*x* of the water treatment device 90*x* is communicated with the first flow guiding chamber 401*x* of the flow control apparatus, and when the flow control apparatus is under the third working state, the fluid from the brine supply container 84*x* can flow through the injector 70*x* and flow into the seventh channel 107*x*, and then flow into the water treatment container 91*x* via the second flow guiding chamber 402*x* and the outer opening 9101*x* of the water treatment device 90*x*. In other words, when the outer opening 9101*x* of the water treatment device 90*x* is communicated with the first flow guiding chamber 401*x* of the flow control apparatus and the upper opening 9211*x* of the central pipe 921*x* of the water treatment device 90*x* is communicated with the second flow guiding chamber 402*x* of the flow control apparatus, the fluid from the brine supply container 84*x* can flow through the water treatment unit 93*x* from bottom to top; and when the outer opening 9101*x* of the water treatment device 90*x* is communicated with the second flow guiding chamber 402*x* of the flow control apparatus and the upper opening 9211*x* of the central pipe 921*x* of the water treatment device 90*x* is communicated with the first flow guiding chamber 401*x* of the flow control apparatus, the fluid from the brine supply container 84*x* can flow through the water treatment unit 93*x* from top to bottom. Preferably, the liquid in the brine supply container 84*x* is regeneration solution for the water treatment unit 93*x* of the water treatment device 90*x*, so by controlling the communicating type that the outer opening 9101*x* and the upper opening 9211*x* of the central pipe 921*x* of the water treatment device 90*x* are communicated with the flow control apparatus to control the regeneration solution from the brine supply container 84*x* of the water treatment unit 93*x* to regenerate and elute the water treatment unit 93*x*.

Similarly, when the outer opening 9101*x* of the water treatment device 90*x* is communicated with the second flow guiding chamber 402*x* of the flow control apparatus and the upper opening 9211*x* of the central pipe 921*x* of the water treatment device 90*x* is communicated with the first flow guiding chamber 401*x* of the flow control apparatus, and when the flow control apparatus is under the first working state and the liquid flows from the flow control apparatus into the water treatment container 91*x*, the liquid flows through the water treatment unit 93*x* from bottom to top.

It is worth mentioning that when the flow control apparatus is under the second working state, the ninth channel 109*x* is communicated with the second channel 102*x* and the eleventh channel 1011*x* is communicated with the first channel 101*x* such that the waste water from the water treatment container 91*x* of the water treatment device 90*x* is able to drain via the eleventh channel 1011*x*; when the flow control apparatus is under the third working state, the ninth channel 109*x* is communicated with the fourth channel 104*x*, the tenth channel 1010*x* is communicated with the seventh channel 107*x* and the eighth channel 108*x*, the eleventh channel 1011*x* is communicated with the first channel 101*x* such that the waste water from the water treatment container 91*x* of the water treatment device 90*x* is able to drain via the eleventh channel 1011*x*; when the flow control apparatus is under the fifth working state, the ninth channel 109*x* of the flow control apparatus is communicated with the first channel 101*x*, and the eleventh channel 1011*x* is communicated with the seventh channel 107*x* such that the waste water from the water treatment container 91*x* of the water treatment device 90*x* is able to drain upwardly via the eleventh channel 1011*x*. So the waste water from the water treatment system upwardly drains via the eleventh channel 1011*x* such that the eleventh channel 1011*x* for drainage does not reduce the sizes of the first channel 101*x*, the second channel 102*x*, the third channel 103*x*, the fourth channel 104*x*, the fifth channel 105*x*, the seventh channel 107*x* and the eighth channel 108*x* of the flow control apparatus and decreases the interference resulted from the first channel 101*x*, the second channel 102*x*, the third channel 103*x*, the fourth channel 104*x*, the fifth channel 105*x*, the seventh channel 107*x* and the eighth channel 108*x* provided in the first flow controlling body 11*x* of the first flow controlling element 10*x*. In other words, because the eleventh channel 1011*x* upwardly penetrates through the second flow controlling body 21*x* of the second flow controlling element 20*x*, so the waste water from the water treatment system may flow through the eleventh channel 1011*x* and flow upwardly into the flow guiding element 50*x* to be drained via the first flow guiding channel 510*x* of the flow guiding element 50*x*.

As shown in FIG. 238 is an operation schematic diagram of the water treatment system installed with the flow control apparatus of the present disclosure, as shown in FIG. 237A, when the flow control apparatus is under the first working state, the water treatment system is in a water treating state, raw water (water to be processed) may flow from the first opening 301*x* of the casing 30*x* of the flow control apparatus into the ninth channel 109*x* and the first channel 101*x*, and then flow through the outer opening 9101*x* of the water treatment system and flow into the water treatment chamber 900*x* of the water treatment system, and then flow upwardly into the second channel 102*x* and the third channel 103*x* of the flow control apparatus via the central pipe 921*x* of the liquid collecting unit 92*x* of the water treatment system, and then flow out through the second opening 302*x* of the casing 30*x* of the flow control apparatus;

as shown in FIG. 237B, when the flow control apparatus is under the second working state, the water treatment system is in a backwash state, raw water (water to be processed) may flow from the first opening 301*x* of the casing 30*x* of the flow control apparatus into the ninth channel 109*x* and the second channel 102*x*, and then flow through the upper opening 9211*x* of the central pipe 921*x* of the water treatment system and flow through the water treatment chamber 900*x* of the water treatment system from bottom to top, and then flow into the first channel 101*x* of the flow control apparatus via the outer opening 9101*x* of the water treatment system, and then flow out through the eleventh channel 1011*x* and the first flow guiding channel 510*x;* as shown in FIG. 237C, when the flow control apparatus is under the third working state, the water treatment system is in an upflow brine intaking state, raw water (water to be processed) may flow from the first opening 301*x* of the casing 30*x* of the flow control apparatus into the ninth channel 109*x* and the fourth channel 104*x*, and then flow through the third opening 303*x* into the injector 70*x* to be injected, and after being mixed with the liquid from the brine supply container 84*x*, the mixture may flow into the fourth opening 304*x*, and then flow through the thirteenth channel 1013*x* and flow into the eighth channel 108*x*, and then flow into the seventh channel 107*x*, and then flow through the water treatment chamber 900*x* from bottom to top via the upper opening 9211*x* of the water treatment system, and then flow through the first channel 101*x* via the outer opening 9101*x* of the water treatment system, at last flow out through the eleventh channel 1011*x* and the first flow guiding channel 510*x;* as shown in FIG. 237D, when the flow control apparatus is under the fourth working state, the water treatment system is in a treated water supplement and water treating state and the treated water is made from the water treatment chamber 900*x*, wherein raw water (water to be processed) may flow from the first opening 301*x* of the casing 30*x* of the flow control apparatus into the ninth channel 109*x* and the first channel 101*x* of the flow control apparatus, and then flow into the water treatment chamber 900*x* of the water treatment system via the outer opening 9101*x* of the water treatment system, and then flow into the second channel 102*x* via the central pipe of the liquid collecting unit of the water treatment system, and then flow respectively into the fifth channel 105*x* and the third channel 103*x*, and then the water flowing into the fifth channel 105*x* flow into the injector 70*x* via the fourth opening 304*x* of the casing 30*x* to supplement water into the brine supply container 84*x*, at the same time, the water flowing into the third channel 103*x* may flow out via the second opening 302*x* of the casing 30*x;*

As shown in FIG. 237E, when the flow control apparatus is under the fifth working state, the water treatment system is in a forwardwash state, raw water (water to be processed) may flow from the first opening 301*x* of the casing 30*x* of the flow control apparatus into the ninth channel 109*x* and the first channel 101*x*, and then flow into the water treatment chamber 900*x* via the outer opening 9101*x* of the water treatment system and flow upwardly into the seventh channel 107*x* via the central pipe 921*x* of the liquid collecting unit 92*x* of the water treatment system, and then flow out through the eleventh channel 1011*x* and the first flow guiding channel 510*x*.

It is appreciated that for a water treatment system installed with the flow control apparatus of the present disclosure, when the flow control apparatus is under the first working state, the water treatment system can achieve treating water; when the flow control apparatus is under the second working state, the water treatment system can achieve washing the water treatment unit 93*x* from bottom to top; when the flow control apparatus is under the third working state, the water treatment system can make the solution in the brine supply container 84*x* flow into the water treatment container 91*x* via the upper opening 9211*x* of the central pipe of the water treatment device 90*x*; when the flow control apparatus is under the fourth working state, the water treatment system can supplement treated water into the brine supply container 84*x* and supply water for a user via the third channel 103*x* and the second opening 302*x*, wherein because the fourth working state is next to the first working state, so when the flow control apparatus is switched from the first working state to the fourth working state, the water treatment system can continuously supply treated water for the user so as to achieve a water supplement function, which does not impact the water supplying and is a useful function; when the flow control apparatus is under the fifth working state, the water treatment system can achieve washing the water treatment unit 93*x* from top to bottom.

The flow control apparatus of the present embodiment may comprise nine equal divisions and the first channel of the first flow controlling element covers three equal divisions, which is beneficial in increasing the diameters of the water channels of the flow control apparatus and the rate of flow; wherein the flow control apparatus employs a technical solution of upflow brine intaking and regeneration achieving a higher regeneration efficiency than downflow brine intaking and regeneration among domestic small-capacity water softeners using softening resin as treating material and brine as regenerating agent, and it can save brine; wherein the flow control apparatus of the present embodiment employs a technical solution of softened water supplement, which is beneficial in decreasing the hardness of the brine solution of the brine supply container and increasing the regeneration efficiency thereof, and decreasing salt bridges in the brine supply container and helping the brine to be dissolved. It is worth mentioning that the flow control apparatus of the present disclosure can simultaneously supplement softened water and supply softened water. Especially, when the flow control apparatus is switched into the water supplement and water supplying working state, the water treatment system can continuously supply treated water to achieve a water supplement function when softened water supplement is needed (under the first working state, there is no liquid in the brine supply container), which does not impact the water supplying and is a useful function, so as to make that the brine supply container of the water treatment system has not to be always filled with solution for regenerating. Because the brine solution can produce a pressure impacting the life-span of the brine supply container and result in brine caking impacting dissolving of brine, So the technology is worth being applied for domestic or industrial products. The flow control apparatus of the present embodiment has an anticipated aligning order of working states as flows: water treating working state->>softened water supplement working state->>backwash working state->>upflow brine intaking working state->>forwardwash working state, wherein the softened water supplement working state is next to the water treating working state, so the flow control apparatus of the present embodiment can supplement water before the regeneration working state and backwash after the water supplement working state so as to decrease the rotating distance of the moving valve disc and prolongs the life-span of the flow control apparatus.

It is appreciated that the flow control apparatus of the present disclosure may be used for controlling a fluid to flow, so the flow control apparatus of the present disclosure can be used for controlling all kinds of fluids to flow, which include but are not limited to gas fluids and/or liquid flows. So "water", "water flow" and/or liquid are only used to illustrate the present disclosure and not intended to limit the scope of the present disclosure.

The above descriptions are only used for illustrating the preferred embodiments, and it should be pointed out that all modifications and equivalents without departing from the principles of the present disclosure that may occur to one skilled in the art are within the spirit and scope of the present disclosure. So all simple alternatives and modifications, for example, the changes of shapes of those holes provided in the fixed valve disc or moving valve disc and position adjustments of the water inlet channel, the communicating blind recess and the draining channel are still within the scope of the present disclosure.

What is claimed is:

1. A flow control apparatus, comprising:

a first flow controlling element, wherein the first flow controlling element comprises a first flow controlling body, wherein the first flow controlling body comprises a top end, wherein the top end defines a first flow controlling side; and a second flow controlling element provided rotatably on the first flow controlling element, wherein the second flow controlling element comprises a second flow controlling body, wherein the second flow controlling body has a bottom end and an upper end extended from the bottom end, wherein the bottom end defines a second flow controlling side, wherein the first flow controlling side of the first flow controlling element is adapted for contacting physically with the second flow controlling side of the second flow controlling element, wherein the top end of the first flow controlling body of the first flow controlling element comprises a first center portion, a first edge portion and a first middle portion extended between the first center portion and the first edge portion, and the bottom end of the second flow controlling body of the second flow controlling element comprises a second center portion, a second edge portion and a second middle portion extended between the second center portion and the second edge portion, wherein the flow control apparatus has a first channel, a second channel, a third channel, a fourth channel, a fifth channel, a ninth channel, a tenth channel and an eleventh channel, wherein the first channel, the second channel, the third channel, the fourth channel and the fifth channel are respectively provided in the first flow controlling body of the first flow controlling element; the ninth channel, the tenth channel and the eleventh channel are respectively provided in the second flow controlling body of the second flow controlling element, wherein the first channel is extended downwardly from the first flow controlling side; the second channel is extended downwardly from the first flow controlling side; the third channel is extended downwardly from the first flow controlling side; the fourth channel is extended downwardly from the first flow controlling side; the fifth channel is extended downwardly from the first flow controlling side, wherein the ninth channel is extended upwardly from the second flow controlling side of the bottom end of the second flow controlling body and extended from the second middle portion of the bottom end of the second flow controlling body to the second edge portion and defines a ninth opening communicated with an outer space thereof; the tenth channel is extended upwardly from the second flow controlling side of the bottom end of the second flow controlling body to the upper end and extended from the second center portion of the bottom end of the second flow controlling body to the second edge portion; the eleventh channel is extended upwardly from the second flow controlling side of the bottom end of the second flow controlling body and penetrates through the second flow controlling body of the second flow controlling element.

2. The flow control apparatus, as recited in claim 1, wherein the flow control apparatus has a first working state, a second working state, a third working state, a fourth working state, and a fifth working state, wherein when the flow control apparatus is in the first working state, the ninth channel is communicated with the first channel, wherein the tenth channel is communicated with the third channel and the second channel; wherein when the control apparatus is in the second working state, the ninth channel is communicated with the second channel, and the eleventh channel is communicated with the first channel; wherein when the flow control apparatus is in the third working state, the ninth channel is communicated with the fourth channel, the tenth channel is communicated with the second channel and the fifth channel, the eleventh channel is communicated with the first channel; wherein when the flow control apparatus is in the fourth working state, the ninth channel is communicated with the fifth channel; wherein when the flow control apparatus is in the fifth working state, the ninth channel of the flow control apparatus is communicated with the first channel, and the eleventh channel is communicated with the second channel; wherein the flow control apparatus further has a standby working state, wherein when the flow control apparatus is in the standby working state, the ninth channel of the flow control apparatus is not communicated with the first channel, the second channel, the third channel, the fourth channel and the fifth channel of the flow control apparatus.

3. The flow control apparatus, as recited in claim 2, wherein the first channel, the fifth channel, the fourth channel, the second channel and the third channel of the flow control apparatus are orderly arranged clockwise in the first flow controlling body of the first flow controlling element; the ninth channel, the eleventh channel and the tenth channel of the flow control apparatus are orderly arranged clockwise in the second flow controlling body of the second flow controlling element.

4. The flow control apparatus, as recited in claim 3, wherein the first channel, the second channel, the third channel, the fourth channel and the fifth channel of the flow control apparatus are respectively and spacedly provided in the first flow controlling body of the first flow controlling element; the ninth channel, the tenth channel and the eleventh channel are respectively and spacedly provided in the second flow controlling body of the second flow controlling element, wherein the first flow controlling side of the first flow controlling element of the flow control apparatus has a center section, wherein the center section is provided in the first center portion of the top end of the first flow controlling body of the first flow controlling element, wherein the remaining portion of the first flow controlling side is clockwise and evenly divided into a first section, a second section, a third section, a fourth section, a fifth section, a sixth section, a seventh section and an eighth section; wherein the second flow controlling side of the second flow controlling element of the flow control apparatus has a center division, wherein the center division is provided in the second center portion of the bottom end of the second flow controlling body of the second flow controlling element, wherein the remaining portion of the second flow controlling side is clockwise and evenly divided into a first division, a second division, a third division, a fourth division, a fifth division, a sixth division, a seventh division and an eighth division; wherein the first channel is downwardly extended from the first section and the second section of the first flow controlling side; the fifth channel is downwardly extended from the third section of the first flow controlling side; the fourth channel is downwardly extended from the fifth section of the first flow controlling side; the second channel is downwardly extended from the center section and the sixth section of the first flow controlling side; the third channel is downwardly extended from the seventh section of the first flow controlling side; the ninth channel is upwardly extended from the first division of the second flow controlling side; the eleventh channel is upwardly extended from the fifth division of the second flow controlling side; the tenth channel is upwardly extended from the seventh division and the center division of the second flow controlling side to the upper end.

5. The flow control apparatus, as recited in claim 4, wherein when the flow control apparatus is in the second working state, the tenth channel is communicated with the second channel; when the flow control apparatus is in the fourth working state, the tenth channel is communicated with the first channel and the second channel; when the flow control apparatus is in the fifth working state, the tenth channel is communicated with the second channel; wherein when the flow control apparatus is in the first working state, the fifth channel is blocked by the second flow controlling element; when the flow control apparatus is in the second working state, the fourth channel and the fifth channel are blocked by the second flow controlling element; when the flow control apparatus is in the fourth working state, the fourth channel is blocked by the second flow controlling element; when the flow control apparatus is in the fifth working state, the fourth channel and the fifth channel are blocked by the second flow controlling element; when the flow control apparatus is in the standby working state, the tenth channel of the flow control apparatus is communicated with the second channel, the eleventh channel is blocked by the first flow controlling element.

6. The flow control apparatus, as recited in claim 5, wherein when the flow control apparatus is in the fourth working state, the eleventh channel is communicated with the third channel; when the flow control apparatus is in the second working state, the third working state or the fifth working state, the third channel is blocked by the second flow controlling element; wherein each of the first flow controlling side of the first flow controlling body of the first flow controlling element and the second flow controlling side of the second flow controlling body of the second flow controlling element is circular-shaped, wherein the first channel, the second channel, the third channel, the fourth channel and the fifth channel are radially provided in the first flow controlling side of the first flow controlling element, and the ninth channel and the tenth channel are radially provided in the second flow controlling side of the second flow controlling element; wherein the first channel, the fifth channel, the third channel and the fourth channel are extended outwardly from the first middle portion of the top end of the first flow controlling body of the first flow controlling element to the first edge portion of the top end; the second channel is extended from the first center portion of the top end of the first flow controlling body of the first flow controlling element to the first edge portion of the top end.

7. The flow control apparatus, as recited in claim 6, further comprising a casing , wherein the casing comprises a casing body, wherein the casing body has an outer side wall and an inner side wall and defines an inner chamber, wherein the first flow controlling element is adapted for being provided in the inner chamber and the first flow controlling side of the first flow controlling element is provided to face up, and the second flow controlling element is adapted for being provided in the inner chamber and the second flow controlling side of the second flow controlling element is provided to face down, wherein the first flow controlling body of the first flow controlling element further comprises a lower end downwardly extended from the top end, wherein the lower end of the first flow controlling body of the first flow controlling element is connected with the inner side wall of the casing body of the casing and divides spacedly the inner chamber into a first receiving chamber and a second receiving chamber, wherein the casing has a first opening, a second opening, a third opening and a fourth opening, wherein the first receiving chamber is respectively communicated with the first opening and the ninth opening of the ninth channel; the second opening is communicated with the third channel of the flow control apparatus; the third opening is communicated with the fourth channel of the flow control apparatus; the fourth opening is communicated with the fifth channel.

8. The flow control apparatus, as recited in claim 2, further comprising a casing , wherein the casing comprises a casing body, wherein the casing body has an outer side wall and an inner side wall and defines an inner chamber, wherein the first flow controlling element is adapted for being provided in the inner chamber and the first flow controlling side of the first flow controlling element is provided to face up, and the second flow controlling element is adapted for being provided in the inner chamber and the second flow controlling side of the second flow controlling element is provided to face down, wherein the first flow controlling body of the first flow controlling element further comprises a lower end downwardly extended from the top end, wherein the lower end of the first flow controlling body of the first flow controlling element is connected with the inner side wall of the casing body of the casing and divides spacedly the inner chamber into a first receiving chamber and a second receiving chamber, wherein the casing has a first opening, a second opening, a third opening and a fourth opening, wherein the first receiving chamber is respectively communicated with the first opening and the ninth opening of the ninth channel; the second opening is communicated with the third channel of the flow control apparatus; the third opening is communicated with the fourth channel of the flow control apparatus; the fourth opening is communicated with the fifth channel.

9. The flow control apparatus, as recited in claim 7, further comprising a wear-resistant member detachably provided between the first flow controlling element and the second flow controlling element, wherein the wear-resistant member comprises a wear-resistant body, wherein the wear-resistant body has a wear-resistant side adapted for contacting physically with the second flow controlling side of the second flow controlling body, wherein the wear-resistant member is sized and shaped to match the first flow controlling side of the first flow controlling element and the wear-resistant body of the wear-resistant member defines spacedly a first port, a second port, a third port, a fourth port and a fifth port, wherein the first port, the second port, the third port, the fourth port and the fifth port are respectively sized and shaped to match the first channel, the second channel, the third channel, the fourth channel and the fifth channel of the flow control apparatus.

10. A flow control apparatus, comprising:

a first flow controlling element, wherein the first flow controlling element comprises a first flow controlling body, wherein the first flow controlling body comprises a top end, wherein the top end defines a first flow controlling side; and a second flow controlling element provided rotatably on the first flow controlling element, wherein the second flow controlling element comprises a second flow controlling body, wherein the second flow controlling body has a bottom end and an upper end extended from the bottom end, wherein the bottom end defines a second flow controlling side, wherein the first flow controlling side of the first flow controlling element is adapted for contacting physically with the second flow controlling side of the second flow controlling element, wherein the flow control apparatus has a first channel, a second channel, a third channel, a fourth channel, a fifth channel and a seventh channel provided respectively in the first flow controlling body of the first flow controlling element, and a ninth channel, a tenth channel and an eleventh channel provided respectively in the second flow controlling body of the second flow controlling element, wherein the first channel is downwardly extended from the first flow controlling side of the first flow controlling element; wherein the second channel is downwardly extended from the first flow controlling side of the first flow controlling element; wherein the third channel is downwardly extended from the first flow controlling side of the first flow controlling element; wherein the fourth channel is downwardly extended from the first flow controlling side of the first flow controlling element; wherein the fifth channel is downwardly extended from the first flow controlling side of the first flow controlling element; the seventh channel is downwardly extended from the first flow controlling side of the first flow controlling element, wherein the bottom end of the second flow controlling body of the second flow controlling element further comprises a second center portion, a second edge portion and a second middle portion extended between the second center portion and the second edge portion, wherein the ninth channel is extended upwardly from the second flow controlling side of the bottom end of the second flow controlling body and extended from the second middle portion of the second flow controlling body to the second edge portion and defines a ninth opening communicated with an outer space thereof; wherein the tenth channel is extended from the second flow controlling side of the bottom end of the second flow controlling body to the upper end and extended from second middle portion of the bottom end of the second flow controlling body to the second edge portion; wherein the eleventh channel is extended upwardly from the second flow controlling side of the bottom end of the second flow controlling body and penetrates through the second flow controlling body of the second flow controlling element.

11. The flow control apparatus, as recited in claim 10, wherein the flow control apparatus has a first working state, a second working state, a third working state, a fourth working state, a fifth working state and a sixth working state, wherein when the flow control apparatus is in the first working state, the ninth channel is communicated with the first channel, wherein the tenth channel is communicated with the second channel and the third channel; wherein when the control apparatus is in the second working state, the ninth channel is communicated with the second channel, and the eleventh channel is communicated with the first channel; wherein when the flow control apparatus is in the third working state, the ninth channel is communicated with the fourth channel, the tenth channel is communicated with the fifth channel and the seventh channel, the eleventh channel is communicated with the first channel; wherein when the flow control apparatus is in the fourth working state, the ninth channel is communicated with the first channel; the tenth channel is communicated with the second channel and the fifth channel; wherein when the flow control apparatus is in the fifth working state, the ninth channel of the flow control apparatus is communicated with the first channel, and the eleventh channel is communicated with the seventh channel; wherein when the flow control apparatus is in the sixth working state, the ninth channel of the flow control apparatus is communicated with the fifth channel.

12. The flow control apparatus, as recited in claim 11, wherein the first flow controlling side of the first flow controlling element of the flow control apparatus has a center section, wherein the remaining portion of the first flow controlling side is clockwise and evenly divided into a first section, a second section, a third section, a fourth section, a fifth section, a sixth section, a seventh section, an eighth section and a ninth section, wherein the second flow controlling side of the second flow controlling element of the flow control apparatus has a center division, wherein the center division is provided in the second center portion of the bottom end of the second flow controlling body of the second flow controlling element, wherein the remaining portion of the second flow controlling side is clockwise and evenly divided into a first division, a second division, a third division, a fourth division, a fifth division, a sixth division, a seventh division, an eighth division and a ninth division; wherein the first channel is downwardly extended from the first section, the second section and the third section of the first flow controlling side; the seventh channel is downwardly extended from the fourth section of the first flow controlling side; the fifth channel is downwardly extended from the fifth section and the sixth section of the first flow controlling side; the fourth channel is downwardly extended from the ninth section of the first flow controlling side; the ninth channel is upwardly extended from the first division of the second flow controlling side; the tenth channel is upwardly extended from the fifth division and the sixth division of the second flow controlling side to the upper end.

13. The flow control apparatus, as recited in claim 12, wherein when the flow control apparatus is in the second working state, the tenth channel is communicated with the first channel; when the flow control apparatus is in the fifth working state, the tenth channel is communicated with the fifth channel; when the flow control apparatus is in the sixth working state, the tenth channel is communicated with the first channel and the fourth channel, wherein when the flow control apparatus is in the first working state, the fourth channel and the seventh channel are blocked by the second flow controlling element; when the flow control apparatus is in second working state, the fourth channel, the fifth channel and the seventh channel are blocked by the second flow controlling element; when the flow control apparatus is in the third working state, the second channel is blocked by the second flow controlling element; when the flow control apparatus is in the fourth working state, the fourth channel and the seventh channel are blocked by the second flow controlling element; when the flow control apparatus is in the fifth working state, the second channel and the fourth channel are blocked by the second flow controlling element; when the flow control apparatus is in the sixth working state, the second channel and the seventh channel are blocked by the second flow controlling element.

14. The flow control apparatus, as recited in claim 13, wherein the first channel, the second channel, the third channel, the fourth channel, the fifth channel and the seventh channel of the flow control apparatus are respectively and spacedly provided in the first flow controlling body of the first flow controlling element; the ninth channel, the tenth channel and the eleventh channel are respectively and spacedly provided in the second flow controlling body of the second flow controlling element;

wherein the first channel, the seventh channel, the fifth channel, the second channel, the third channel and the fourth channel of the flow control apparatus are orderly arranged clockwise in the first flow controlling body of the first flow controlling element; the ninth channel, the eleventh channel and the tenth channel of the flow control apparatus are orderly arranged clockwise in the second flow controlling body of the second flow controlling element.

15. The flow control apparatus, as recited in claim 14, wherein the second channel is downwardly extended from the seventh section of the first flow controlling side; the third channel is downwardly extended from the eighth section of the first flow controlling side; wherein when the flow control apparatus is in the sixth working state, the eleventh channel is communicated with the third channel; wherein when the flow control apparatus is in the second working state, the third working state, fourth working state or the fifth working state, the third channel is blocked by the second flow controlling element.

16. The flow control apparatus, as recited in claim 15, wherein the eleventh channel is upwardly extended from the fourth division of the second flow controlling side, wherein when the flow control apparatus is in fourth working state, the eleventh channel is blocked by the first flow controlling element.

17. The flow control apparatus, as recited in claim 15, wherein the first flow controlling body of the flow control apparatus further comprises a first center portion, a first edge portion and a first middle portion extended between the first center portion and the first edge portion, wherein the flow control apparatus further comprises a twelfth channel provided in the first center portion of the top end of the first flow controlling body of the first flow controlling element and extended downwardly from the first flow controlling side, wherein the eleventh channel is extended upwardly from the second flow controlling side of the bottom end of the second flow controlling body to the upper end and extended from the second center portion of the second flow controlling element to the second edge portion; wherein the eleventh channel is upwardly extended from the fourth division and the center division of the second flow controlling side.

18. The flow control apparatus, as recited in claim 11, the flow control apparatus further comprises a casing, wherein the casing comprises a casing body, wherein the casing body has an outer side wall and an inner side wall and defines an inner chamber, wherein the first flow controlling element is adapted for being provided in the inner chamber and the first flow controlling side of the first flow controlling element is provided to face up, and the second flow controlling element is adapted for being provided in the inner chamber and the second flow controlling side of the second flow controlling element is provided to face down, wherein the first flow controlling body of the first flow controlling element further comprises a lower end downwardly extended from the top end, wherein the lower end of the first flow controlling body of the first flow controlling element is connected with the inner side wall of the casing body of the casing and divides spacedly the inner chamber into a first receiving chamber and a second receiving chamber, wherein the casing has a first opening, a second opening, a third opening and a fourth opening, wherein the first receiving chamber is respectively communicated with the first opening and the ninth opening; the second opening is communicated with the third channel of the flow control apparatus; the third opening is communicated with the fourth channel of the flow control apparatus; the fourth opening is communicated with the fifth channel of the flow control apparatus.

19. The flow control apparatus, as recited in claim 16, wherein each of the first flow controlling side of the first flow controlling body of the first flow controlling element and the second flow controlling side of the second flow controlling body of the second flow controlling element is circular-shaped, wherein the first channel, the second channel, the third channel, the fourth channel, the fifth channel and the seventh channel are radially provided in the first flow controlling side of the first flow controlling element, and the ninth channel and the tenth channel are radially provided in the second flow controlling side of the second flow controlling element;

wherein the flow control apparatus further comprises a casing, wherein the casing comprises a casing body, wherein the casing body has an outer side wall and an inner side wall and defines an inner chamber, wherein the first flow controlling element is adapted for being provided in the inner chamber and the first flow controlling side of the first flow controlling element is provided to face up, and the second flow controlling element is adapted for being provided in the inner chamber and the second flow controlling side of the second flow controlling element is provided to face down, wherein the first flow controlling body of the first flow controlling element further comprises a lower end downwardly extended from the top end, wherein the lower end of the first flow controlling body of the first flow controlling element is connected with the inner side wall of the casing body of the casing and divides spacedly the inner chamber into a first receiving chamber and a second receiving chamber, wherein the casing has a first opening, a second opening, a third opening and a fourth opening, wherein the first receiving chamber is respectively communicated with the first opening and the ninth opening; the second opening is communicated with the third channel of the flow control apparatus; the third opening is communicated with the fourth channel of the flow control apparatus; the fourth opening is communicated with the fifth channel of the flow control apparatus.

20. The flow control apparatus, as recited in claim 17, wherein each of the first flow controlling side of the first flow controlling body of the first flow controlling element and the second flow controlling side of the second flow controlling body of the second flow controlling element is circular-shaped, wherein the first channel, the second channel, the third channel, the fourth channel, the fifth channel and the seventh channel are radially provided in the first flow controlling side of the first flow controlling element, and the ninth channel and the tenth channel are radially provided in the second flow controlling side of the second flow controlling element;

wherein the flow control apparatus further comprises a casing, wherein the casing comprises a casing body, wherein the casing body has an outer side wall and an inner side wall and defines an inner chamber, wherein the first flow controlling element is adapted for being provided in the inner chamber and the first flow controlling side of the first flow controlling element is provided to face up, and the second flow controlling element is adapted for being provided in the inner chamber and the second flow controlling side of the second flow controlling element is provided to face down, wherein the first flow controlling body of the first flow controlling element further comprises a lower end downwardly extended from the top end, wherein the lower end of the first flow controlling body of the first flow controlling element is connected with the inner side wall of the casing body of the casing and divides spacedly the inner chamber into a first receiving chamber and a second receiving chamber, wherein the casing has a first opening, a second opening, a third opening and a fourth opening, wherein the first receiving chamber is respectively communicated with the first opening and the ninth opening; the second opening is communicated with the third channel of the flow control apparatus; the third opening is communicated with the fourth channel of the flow control apparatus; the fourth opening is communicated with the fifth channel of the flow control apparatus.

21. A flow control apparatus, comprising:

a first flow controlling element, wherein the first flow controlling element comprises a first flow controlling body, wherein the first flow controlling body comprises a top end, wherein the top end defines a first flow controlling side; and a second flow controlling element provided rotatably on the first flow controlling element, wherein the second flow controlling element comprises a second flow controlling body, wherein the second flow controlling body has a bottom end and an upper end extended from the bottom end, wherein the bottom end defines a second flow controlling side, wherein the first flow controlling side of the first flow controlling element is adapted for contacting physically with the second flow controlling side of the second flow controlling element, wherein the top end of the first flow controlling element of the flow control apparatus further comprises a first center portion, a first edge portion and a first middle portion extended between the first center portion and the first edge portion, wherein the bottom end of the second flow controlling body of the second flow controlling element further comprises a second center portion, a second edge portion and a second middle portion extended between the second center portion and the second edge portion, wherein the flow control apparatus has a first channel, a second channel, a third channel, a fourth channel, a fifth channel, a seventh channel, an eighth channel, a ninth channel, a tenth channel and an eleventh channel, wherein the first channel, the second channel, the third channel, the fourth channel, the fifth channel, the seventh channel and the eighth channel are respectively and downwardly extended from the first flow controlling side of the first flow controlling element; wherein the ninth channel is extended upwardly from the second flow controlling side of the bottom end of the second flow controlling body and defines a ninth opening communicated with outer space thereof; wherein the tenth channel is extended from the second flow controlling side of the bottom end of the second flow controlling body to the upper end; wherein the eleventh channel is extended upwardly from the second flow controlling side of the bottom end of the second flow controlling body and penetrates through the second flow controlling body of the second flow controlling element .

22. The flow control apparatus, as recited in claim 21, wherein the second flow controlling element is able to rotate relative to the first flow controlling element so that the flow control apparatus has a first working state, a second working state, a third working state, a fourth working state, and a fifth working state, wherein when the flow control apparatus is in the first working state, the ninth channel is communicated with the first channel, wherein the tenth channel is communicated with the third channel and the second channel; wherein when the control apparatus is in the second working state, the ninth channel is communicated with the second channel, and the eleventh channel is communicated with the first channel, wherein when the flow control apparatus is in the third working state, the ninth channel is communicated with the fourth channel, the tenth channel is communicated with the seventh channel and the eighth channel, the eleventh channel is communicated with the first channel, wherein when the flow control apparatus is in the fourth working state, the ninth channel is communicated with the first channel; the tenth channel is communicated with the second channel and the fifth channel; wherein when the flow control apparatus is in the fifth working state, the ninth channel of the flow control apparatus is communicated with the first channel, and the eleventh channel is communicated with the seventh channel.

23. The flow control apparatus, as recited in claim 22, wherein the first channel, the second channel, the third channel, the fourth channel, the fifth channel, the seventh channel and the eighth channel of the flow control apparatus are respectively and spacedly provided in the first flow controlling body of the first flow controlling element; the ninth channel, the tenth channel and the eleventh channel are respectively and spacedly provided in the second flow controlling body of the second flow controlling element;

wherein the first flow controlling side of the first flow controlling element of the flow control apparatus has a center section, wherein the center section is provided in the first center portion of the top end of the first flow controlling body of the first flow controlling element, wherein the remaining portion of the first flow controlling side is clockwise and evenly divided into a first section, a second section, a third section, a fourth section, a fifth section, a sixth section, a seventh section, an eighth section and a ninth section, and the second flow controlling side of the second flow controlling element of the flow control apparatus has a center division, wherein the center division is provided in the second center portion of the bottom end of the second flow controlling body of the second flow controlling element, wherein the remaining portion of the second flow controlling side is clockwise and evenly divided into a first division, a second division, a third division, a fourth division, a fifth division, a sixth division, a seventh division, an eighth division and a ninth division; wherein the first channel is downwardly extended from the first section, the second section and the third section of the first flow controlling side; the fourth channel is downwardly extended from the fourth section of the first flow controlling side; the fifth channel is downwardly extended from the fifth section of the first flow controlling side; the second channel is downwardly extended from the sixth section of the first flow controlling side; the eighth channel is downwardly extended from the eighth section of the first flow controlling side; the seventh channel is downwardly extended from the ninth section of the first flow controlling side; the ninth channel is upwardly extended from the first division of the second flow controlling side; the tenth channel is upwardly extended from the fifth division and the sixth division of the second flow controlling side; the eleventh channel is upwardly extended from the seventh division of the second flow controlling side .

24. The flow control apparatus, as recited in claim 23, wherein the first channel, the fourth channel, the fifth channel, the second channel and the third channel, the eighth channel and the seventh channel of the flow control apparatus are orderly arranged clockwise in the first flow controlling body of the first flow controlling element; the ninth channel, the tenth channel and the eleventh channel of the flow control apparatus are orderly arranged clockwise in the second flow controlling body of the second flow controlling element .

25. The flow control apparatus, as recited in claim 24, wherein when the flow control apparatus is in the second working state, the tenth channel is communicated with the first channel; when the flow control apparatus is in the fifth working state, the tenth channel is communicated with the eighth channel; when the flow control apparatus is in the first working state, the fourth channel, the fifth channel and the seventh channel are blocked by the second flow controlling element; when the flow control apparatus is in the second working state, the fourth channel, the fifth channel, the seventh channel and the eighth channel are blocked by the second flow controlling element; when the flow control apparatus is in the third working state, the second channel and the fifth channel are blocked by the second flow controlling element; when the flow control apparatus is in the fourth working state, the fourth channel, the seventh channel and the eighth channel are blocked by the second flow controlling element; when the flow control apparatus is in the fifth working state, the second channel, the fourth channel and the fifth channel are blocked by the second flow controlling element.

26. The flow control apparatus, as recited in claim 25, wherein the flow control apparatus further comprises a twelfth channel provided in the first center portion and extended downwardly from the first flow controlling side, and the eleventh channel is extended upwardly from the second flow controlling side of the bottom end of the second flow controlling body to the upper end and extended from the second center portion of the second flow controlling element to the second edge portion, wherein the eleventh channel is upwardly extended from the seventh division and the center division of the second flow controlling side to the upper end of the second flow controlling body.

27. The flow control apparatus, as recited in claim 25, wherein the second channel, the fourth channel, the fifth channel, the seventh channel and the eighth channel are respectively provided in the first middle portion of the top end of the first flow controlling body; the third channel is downwardly extended from the sixth section of the first flow controlling side; the third channel is provided in the first edge portion of the top end of the first flow controlling body and is provided in an outside of the second channel; the eleventh channel is extended upwardly from the second middle portion of the bottom end of the second flow controlling body;

wherein the second flow controlling element of the flow control apparatus further comprises an extension portion, wherein the extension portion is extended outwardly and downwardly from the second edge portion of the bottom end of the second flow controlling element, wherein the tenth channel is extended from the second middle portion of the bottom end of the second flow controlling element into the extension portion of the second flow controlling element and extended upwardly;

wherein when the flow control apparatus is in the second working state, the third working state and the fifth working state, the third channel is communicated with an outer space of the first flow controlling element, wherein when the flow control apparatus is in the fourth working state, the tenth channel is communicated with the second channel, the third channel and the fifth channel, and the eleventh channel is blocked by the first flow controlling element.

28. The flow control apparatus, as recited in claim 25, wherein the second channel, the third channel, the fourth channel, the fifth channel, the seventh channel and the eighth channel are respectively provided in the first middle portion of the top end of the first flow controlling body; the tenth channel is extended from the second middle portion of the bottom end of the second flow controlling body into the second edge portion; the eleventh channel is extended upwardly from the second middle portion of the bottom end of the second flow controlling body;

wherein when the flow control apparatus is in the second working state and the third working state, the third channel is blocked by the second flow controlling element; wherein when the flow control apparatus is in the fourth working state, the eleventh channel is communicated with the third channel; when the flow control apparatus is in the fifth working state, the tenth channel is communicated with the third channel;

wherein the third channel is downwardly extended from the seventh section of the first flow controlling side.

29. The flow control apparatus, as recited in claim 27, wherein the flow control apparatus further comprises a thirteenth channel, wherein the thirteenth channel is provided in the first flow controlling body of the first flow controlling element and extended between the fifth channel and the eighth channel to communicate the fifth channel with the eighth channel; wherein the thirteenth channel of the flow control apparatus is downwardly extended from the first flow controlling side and defines an channel opening facing up, wherein the second flow controlling element further comprises a sealing element, wherein the sealing element is extended outwardly from the second edge portion of the second flow controlling body of the second flow controlling element, and the sealing element is capable of blocking the channel opening of the thirteenth channel; wherein the thirteenth channel of the flow control apparatus is not directly communicated with the first channel, the second channel, the third channel, the fourth channel and the seventh channel.

30. The flow control apparatus, as recited in claim 28, wherein the flow control apparatus further comprises a thirteenth channel, wherein the thirteenth channel is provided in the first flow controlling body of the first flow controlling element and extended between the fifth channel and the eighth channel to communicate the fifth channel with the eighth channel; wherein the thirteenth channel of the flow control apparatus is downwardly extended from the first flow controlling side and defines an channel opening facing up, wherein the second flow controlling element further comprises a sealing element, wherein the sealing element is extended outwardly from the second edge portion of the second flow controlling body of the second flow controlling element, and the sealing element is capable of blocking the channel opening of the thirteenth channel; wherein the thirteenth channel of the flow control apparatus is not directly communicated with the first channel, the second channel, the third channel, the fourth channel and the seventh channel.

31. The flow control apparatus, as recited in claim 22, wherein the flow control apparatus further comprises a casing, wherein the casing comprises a casing body, wherein the casing body has an outer side wall and an inner side wall and defines an inner chamber, wherein the first flow controlling element is adapted for being provided in the inner chamber and the first flow controlling side of the first flow controlling element is provided to face up, and the second flow controlling element is adapted for being provided in the inner chamber and the second flow controlling side of the second flow controlling element is provided to face down, wherein the first flow controlling body of the first flow controlling element further comprises a lower end downwardly extended from the top end, wherein the lower end of the first flow controlling body of the first flow controlling element is connected with the inner side wall of the casing body of the casing and divides spacedly the inner chamber into a first receiving chamber and a second receiving chamber, wherein the casing has a first opening, a second opening, a third opening and a fourth opening, wherein the first receiving chamber is respectively communicated with the first opening and the ninth opening; the second opening is communicated with the third channel of the flow control apparatus; the third opening is communicated with the fourth channel of the flow control apparatus; the fourth opening is communicated with the fifth channel of the flow control apparatus.

32. The flow control apparatus, as recited in claim 29, wherein the flow control apparatus further comprises a casing, wherein the casing comprises a casing body, wherein the casing body has an outer side wall and an inner side wall and defines an inner chamber, wherein the first flow controlling element is adapted for being provided in the inner chamber and the first flow controlling side of the first flow controlling element is provided to face up, and the second flow controlling element is adapted for being provided in the inner chamber and the second flow controlling side of the second flow controlling element is provided to face down, wherein the first flow controlling body of the first flow controlling element further comprises a lower end downwardly extended from the top end, wherein the lower end of the first flow controlling body of the first flow controlling element is connected with the inner side wall of the casing body of the casing and divides spacedly the inner chamber into a first receiving chamber and a second receiving chamber, wherein the casing has a first opening, a second opening, a third opening and a fourth opening, wherein the first receiving chamber is respectively communicated with the first opening and the ninth opening; the second opening is communicated with the third channel of the flow control apparatus; the third opening is communicated with the fourth channel of the flow control apparatus; the fourth opening is communicated with the fifth channel of the flow control apparatus.

33. The flow control apparatus, as recited in claim 31, wherein the flow control apparatus further comprises a twelfth channel provided in the first center portion and extended downwardly from the first flow controlling side, and the eleventh channel is extended upwardly from the second flow controlling side of the bottom end of the second flow controlling body to the upper end and extended from the second center portion of the second flow controlling element into the second edge portion, wherein the eleventh channel is upwardly extended from the seventh division and the center division of the second flow controlling side to the upper end.

* * * * *